US012265953B1

(12) United States Patent
Harrison et al.

(10) Patent No.: US 12,265,953 B1
(45) Date of Patent: Apr. 1, 2025

(54) SYSTEMS, METHODS, AND PROGRAM PRODUCTS FOR NON-CUSTODIAL TRADING OF DIGITAL ASSETS ON A DIGITAL ASSET EXCHANGE

(71) Applicant: Gemini IP, LLC, New York, NY (US)

(72) Inventors: Thomas Hungerford Harrison, New York, NY (US); Thomas Vaniotis, New York, NY (US); Brian Keogh, Rye, NY (US); Noah Cornwell, Berkeley Heights, NJ (US); Neeraj Mishra, Mountain Lakes, NJ (US); Ira Auerbach, Arverne, NY (US); Jack Sutton, New Canaan, CT (US)

(73) Assignee: Gemini IP, LLC, New York, NY (US)

( * ) Notice: Subject to any disclaimer, the term of this patent is extended or adjusted under 35 U.S.C. 154(b) by 381 days.

(21) Appl. No.: 17/684,226

(22) Filed: Mar. 1, 2022

Related U.S. Application Data

(60) Provisional application No. 63/156,736, filed on Mar. 4, 2021.

(51) Int. Cl.

| | |
|---|---|
| ***G06Q 40/00*** | (2023.01) |
| ***G06Q 20/06*** | (2012.01) |
| ***G06Q 20/36*** | (2012.01) |
| ***G06Q 40/03*** | (2023.01) |
| ***G06Q 40/04*** | (2012.01) |
| ***H04L 9/00*** | (2022.01) |
| ***H04L 9/08*** | (2006.01) |
| ***H04L 9/32*** | (2006.01) |

(52) U.S. Cl.

CPC ........... *G06Q 20/065* (2013.01); *G06Q 20/36* (2013.01); *G06Q 40/03* (2023.01); *G06Q 40/04* (2013.01); *H04L 9/0825* (2013.01); *H04L 9/3213* (2013.01); *H04L 9/50* (2022.05); *G06Q 2220/00* (2013.01); *H04L 2209/56* (2013.01)

(58) Field of Classification Search

CPC .. G06Q 20/06; G06Q 20/06536; G06Q 40/03; G06Q 40/04; G06Q 2220/00; H04L 9/08; H04L 9/32; H04L 9/50; H04L 9/0852; H04L 9/3213; H04L 2209/56

USPC .................................................. 705/4, 35–45

See application file for complete search history.

(56) References Cited

U.S. PATENT DOCUMENTS

| | | | | |
|---|---|---|---|---|
| 9,892,460 | B1 * | 2/2018 | Winklevoss | G06Q 40/04 |
| 10,269,009 | B1 * | 4/2019 | Winklevoss | G06Q 20/36 |
| 10,354,325 | B1 * | 7/2019 | Skala | G06Q 40/04 |
| 10,438,290 | B1 * | 10/2019 | Winklevoss | G06Q 40/06 |
| 11,282,139 | B1 * | 3/2022 | Winklevoss | G06Q 40/04 |
| 2017/0103390 | A1 * | 4/2017 | Wilson, Jr. | G06Q 40/06 |
| 2019/0028276 | A1 * | 1/2019 | Pierce | G06Q 20/02 |
| 2020/0042961 | A1 * | 2/2020 | McDonald | G06Q 20/405 |
| 2020/0042989 | A1 * | 2/2020 | Ramadoss | G06Q 50/167 |
| 2020/0250752 | A1 * | 8/2020 | Sugarman | H04L 9/3239 |

(Continued)

FOREIGN PATENT DOCUMENTS

WO WO-2019245635 A1 * 12/2019 ............ G06Q 20/00

*Primary Examiner* — Cho Yiu Kwong
*Assistant Examiner* — Mohammed H Mustafa
(74) *Attorney, Agent, or Firm* — Lee & Hayes, P.C.

(57) ABSTRACT

The present invention generally relates to computer systems, methods and program products that allow a digital asset exchange to provide an option to customers to lend all or a portion of the digital assets associated with at least a first blockchain and held by the exchange on behalf of the customer in exchange for payments such as interest.

20 Claims, 235 Drawing Sheets

(56) References Cited

U.S. PATENT DOCUMENTS

| | | | | |
|---|---|---|---|---|
| 2022/0076331 | A1* | 3/2022 | Filter | G06Q 20/3276 |
| 2023/0342773 | A1* | 10/2023 | Bose | G06Q 40/02 |

* cited by examiner

Transaction Ledger 115

| Transaction ID | Date | Fee |
|---|---|---|
| f06dbf23bc69b7fc155f337<br>3aa6e41cdc1c75da613685<br>95c017b13d7b7c16552 | 2014-06-24<br>20:41:32 | 0 |
| 9cd9cef3b96936c8c3a1b7c<br>1f6a0de17a3cfcf94c575b7<br>92638bef85c069de58 | 2014-06-24<br>20:41:32 | 0.0001 |
| 5f3fb8557633e61e9ab20e<br>b461552a97423c7b3a38b7<br>414e7c672d41efd9c830 | 2014-06-24<br>20:41:32 | 0 |
| 535936b199bb3fcbc8d15e<br>e38bb735c6929dd360ea05<br>e27a19514bc4be82d69f | 2014-06-24<br>20:41:32 | 0.00005 |
| 4616da18de8943f33da984<br>12a6fc8f70c5c0843637d7f<br>b28b9ea9986f31b55ef | 2014-06-24<br>20:41:32 | 0.0001 |

| Transaction Ledger 115 | |
|---|---|
| Origin Identifiers | Amount from Origin |
| 19Zmw5kMbkTjA7qRUdUEiwLqgRaMRRLDkh<br>19Zmw5kMbkTjA7qRUdUEiwLqgRaMRRLDkh | 500<br>500 |
| 1EvwbspD9jYbH2ZSq6TFbPxftkM8ej5YqP | 45.9983 |
| 15u7FXhfiaW7EYWwiv2ayA9duahXb85Rnv | 303.92706127 |
| 1JW8RphYjfsnTyV4W62GHpm9QhA2wVPvap | 18.0475292 |
| 1GD64WARGDLYG71WTTgCpRMpePr1BnmGij | 5 |

FIG. 2-2

Transaction Ledger 115

| Destination Identifiers | Destination Amount |
|---|---|
| 122BNoyhmuUt9G9mdEm3mN4nb73c1UgNKt | 1000 |
| 1PXdpLs2k3ETn9vcL4SRp3UiHxHiiMJzXb<br>18S6XTQKH2uUS1GG965Rncn8YmS6jhtkGC | 42.1724747<br>3.8257253 |
| 17ZQyJ7KtgfNhGVWVLc8gdDi6ByyRUqZ8G<br>12eqJZbQpRoYqa6BxGtWq8pBd5UpwZqCek | 154.77363532<br>149.15342595 |
| 1Bv9zL9SkSWp3pgVDtrVtTNQafFaukXoUk<br>1GnhQNChqguuqgGAtVuijmqxPtk8PZy4EV | 17.2974792<br>0.75 |
| 1Hrj1qUAer7yUNP8pPxSmhQoifGqW3NfFA<br>1NRNnusa3D4sxxzig5fvwmX1thDnR9w3ZJ<br>1GD64WARGDLYG71WTTgCpRMpePr1BnmGij | 3.45703882<br>0.01388369<br>1.52897749 |

S2002: providing a first designated key pair including a first designated public key of an underlying digital asset and a corresponding first designated private key, wherein the first designated private key is stored on a first computer system which is connected to the distributed public transaction ledger through the internet

↓

S2004: providing a second designated key pair including a second designated public key of the underlying digital asset and a corresponding second designated private key, wherein the second designated private key is stored on a second computer system which is not operatively or physically connected to the distributed public transaction ledger or internet

↓

S2006: providing first smart contract instructions (e.g. proxy smart contract instructions) for a digital asset token associated with a first contract address associated with the underlying digital asset

↓

S2008: providing second contract instructions (e.g. print limiter smart contract instructions) for the digital asset token associated with a second contract address associated with the underlying digital asset

↓

S2010: providing third smart contract instructions (e.g. custodian smart contract instructions) for the digital asset token associated with a third contract address associated with the underlying digital asset

S2102: providing a first designated key pair including a first designated public key of an underlying digital asset and a corresponding first designated private key, wherein the first designated private key is stored on a first computer system which is connected to the distributed public transaction ledger through the internet

↓

S2104: providing a second designated key pair including a second designated public key of the underlying digital asset and a corresponding second designated private key, wherein the second designated private key is stored on a second computer system which is not operatively or physically connected to the distributed public transaction ledger or internet

↓

S2106: providing first smart contract instructions (e.g. proxy smart contract instructions) for a digital asset token associated with a first contract address associated with the underlying digital asset

↓

S2108: providing second contract instructions (e.g. print limiter smart contract instructions) for the digital asset token associated with a second contract address associated with the underlying digital asset

↓

CONTINUED WITH FIG. 16A-2

FIG. 16A-1

S5002: Provide one or more exchange account databases comprising information for exchange accounts, and further comprising institutional account information for a subset of exchange accounts S5004: Provide an orders database comprising digital math-based asset purchase and sell order information.

S5006: Provide an electronic ledger comprising, for each of the plurality of exchange accounts, fiat account balance data and digital math-based asset account balance data.

S5008: Receive, from a first user device, a first purchase electronic digital math-based asset purchase order.

S5010: Verify that first fiat account balance data indicating a first fiat account balance of a purchaser insured fiat account associated with the institutional exchange account at least equals the purchase order fiat amount.

S5012: Store, in the orders database, the first purchase order information.

S5014: Receive, from a second user electronic device, a first electronic digital math-based asset sell order.

S5016: Verify that first digital math-based asset account balance data indicating a first digital math-based asset account balance of a seller digital math-based asset account associated with the second exchange account at least equals the sell order quantity.

CONTINUED WITH FIG 33-2

FIG. 33-1

FIG. 35F
Buy BTC
$32,203.23
37.2324
$35,392.32
$258.23
$12.28
$428.29 - $412.34
Open Orders
Transaction History

FIG. 35G
Buy BTC
$32,203.23
37.2324
$35,392.32
$258.23
$12.28
$428.29 - $412.34
Open Orders
Transaction History

FIG. 39
Digital Asset Kiosk 2005
Digital Asset Kiosk Display 2110
CPU 2112
Check Storage 2134
Digital Asset Request Module 2156
Computer-Readable Memory 2114
Counter 2136
Exchange Module 2158
Input Device 2116
Communications Portals 2138
Accounts Module 2160
Card Reader 2118
Printer 2140
Deposit Module 2162
Wireless Reader 2120
User Authentication Module 2142
Withdrawal Module 2164
Biometric Reader 2122
Reader Module(s) 2144
Fund Transfer Module 2166
Scanner/Imager 2124
Check Recognition Module 2146
Payment Module 2168
Cash Deposit Device 2126
Cash Recognition Module 2148
Insurance Module 2170
Cash Storage 2128
Counting Module 2150
Preferences Module 2172
Cash Dispenser 2130
Digital Asset Wallet Module 2152
User Profile Module 2174
Check Deposit Device 2132
Digital Asset Transfer Module 2154
Transaction History Module 2176

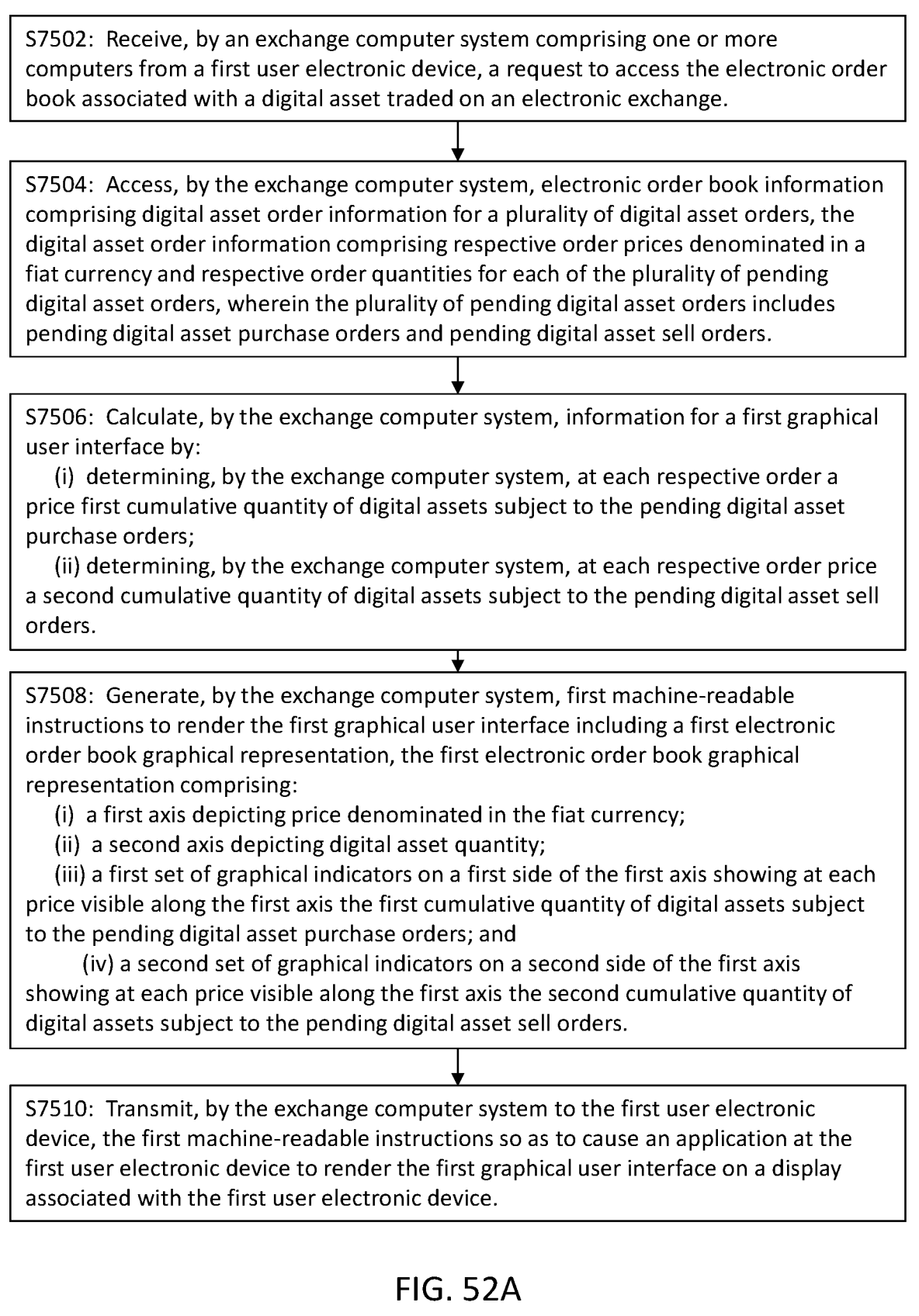

S7502: Receive, by an exchange computer system comprising one or more computers from a first user electronic device, a request to access the electronic order book associated with a digital asset traded on an electronic exchange.

S7504: Access, by the exchange computer system, electronic order book information comprising digital asset order information for a plurality of digital asset orders, the digital asset order information comprising respective order prices denominated in a fiat currency and respective order quantities for each of the plurality of pending digital asset orders, wherein the plurality of pending digital asset orders includes pending digital asset purchase orders and pending digital asset sell orders.

S7506: Calculate, by the exchange computer system, information for a first graphical user interface by:
(i) determining, by the exchange computer system, at each respective order a price first cumulative quantity of digital assets subject to the pending digital asset purchase orders;
(ii) determining, by the exchange computer system, at each respective order price a second cumulative quantity of digital assets subject to the pending digital asset sell orders.

S7508: Generate, by the exchange computer system, first machine-readable instructions to render the first graphical user interface including a first electronic order book graphical representation, the first electronic order book graphical representation comprising:
(i) a first axis depicting price denominated in the fiat currency;
(ii) a second axis depicting digital asset quantity;
(iii) a first set of graphical indicators on a first side of the first axis showing at each price visible along the first axis the first cumulative quantity of digital assets subject to the pending digital asset purchase orders; and
(iv) a second set of graphical indicators on a second side of the first axis showing at each price visible along the first axis the second cumulative quantity of digital assets subject to the pending digital asset sell orders.

S7510: Transmit, by the exchange computer system to the first user electronic device, the first machine-readable instructions so as to cause an application at the first user electronic device to render the first graphical user interface on a display associated with the first user electronic device.

FIG. 52A

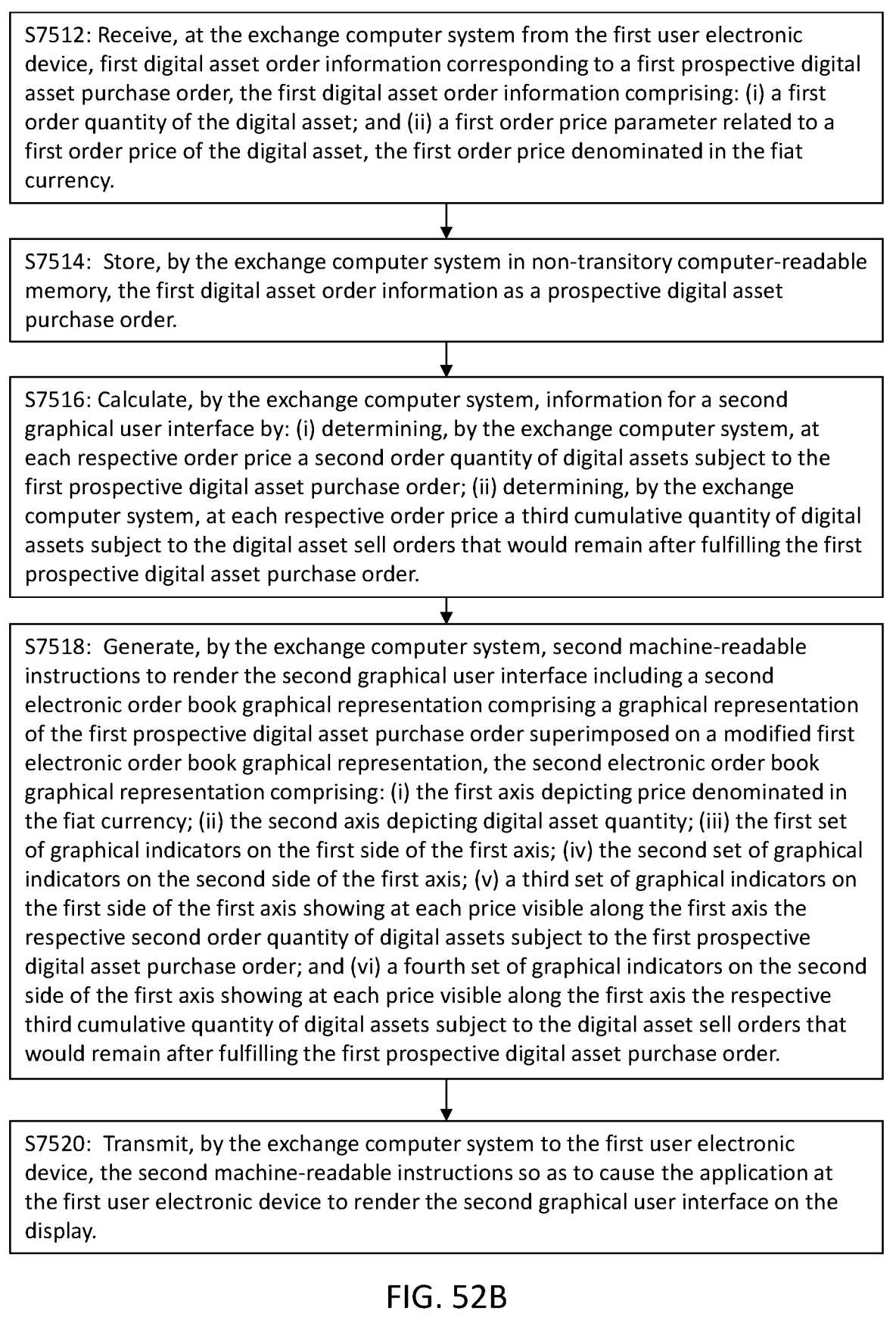

S7512: Receive, at the exchange computer system from the first user electronic device, first digital asset order information corresponding to a first prospective digital asset purchase order, the first digital asset order information comprising: (i) a first order quantity of the digital asset; and (ii) a first order price parameter related to a first order price of the digital asset, the first order price denominated in the fiat currency.

↓

S7514: Store, by the exchange computer system in non-transitory computer-readable memory, the first digital asset order information as a prospective digital asset purchase order.

↓

S7516: Calculate, by the exchange computer system, information for a second graphical user interface by: (i) determining, by the exchange computer system, at each respective order price a second order quantity of digital assets subject to the first prospective digital asset purchase order; (ii) determining, by the exchange computer system, at each respective order price a third cumulative quantity of digital assets subject to the digital asset sell orders that would remain after fulfilling the first prospective digital asset purchase order.

↓

S7518: Generate, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising: (i) the first axis depicting price denominated in the fiat currency; (ii) the second axis depicting digital asset quantity; (iii) the first set of graphical indicators on the first side of the first axis; (iv) the second set of graphical indicators on the second side of the first axis; (v) a third set of graphical indicators on the first side of the first axis showing at each price visible along the first axis the respective second order quantity of digital assets subject to the first prospective digital asset purchase order; and (vi) a fourth set of graphical indicators on the second side of the first axis showing at each price visible along the first axis the respective third cumulative quantity of digital assets subject to the digital asset sell orders that would remain after fulfilling the first prospective digital asset purchase order.

↓

S7520: Transmit, by the exchange computer system to the first user electronic device, the second machine-readable instructions so as to cause the application at the first user electronic device to render the second graphical user interface on the display.

FIG. 52B

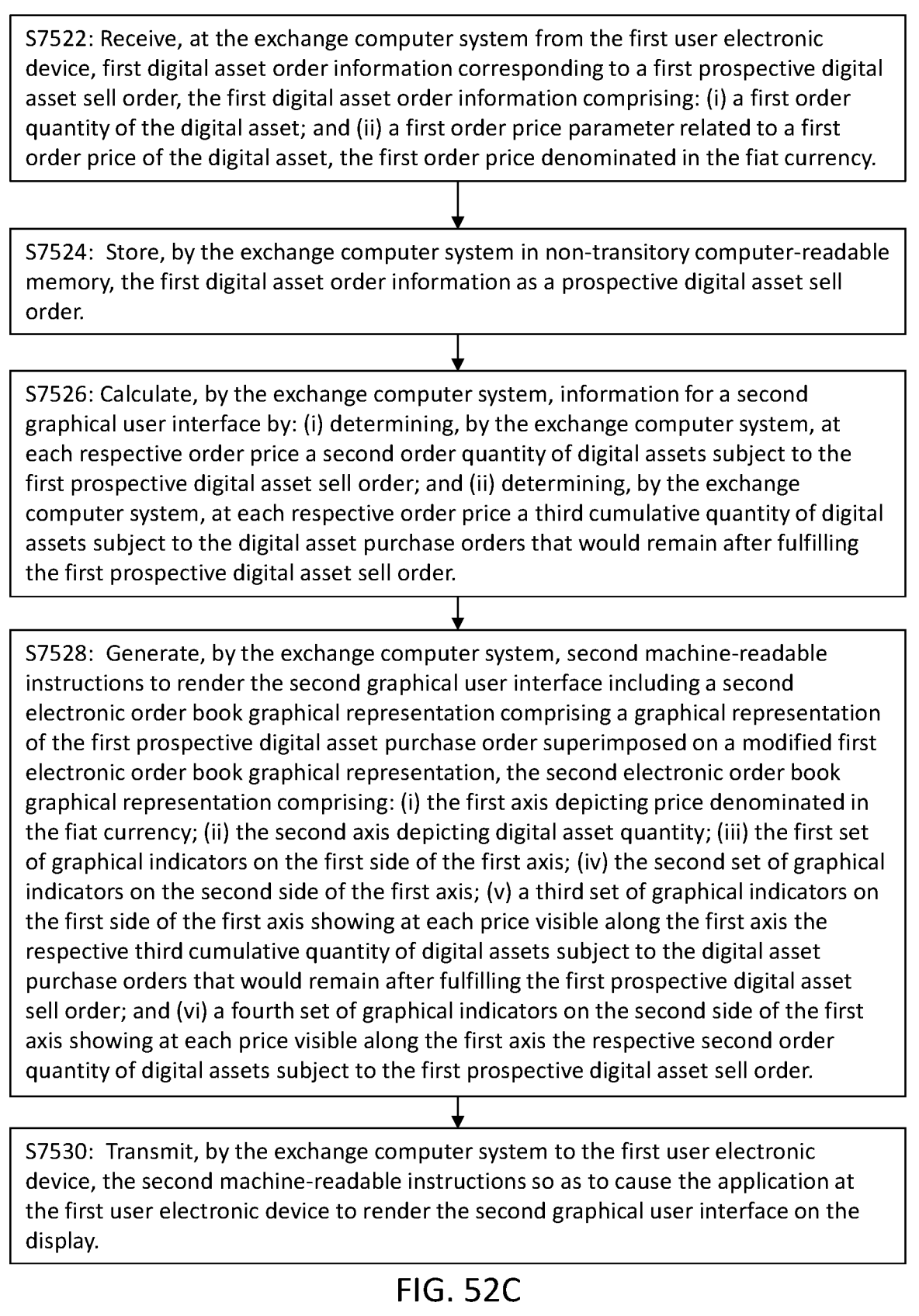

S7522: Receive, at the exchange computer system from the first user electronic device, first digital asset order information corresponding to a first prospective digital asset sell order, the first digital asset order information comprising: (i) a first order quantity of the digital asset; and (ii) a first order price parameter related to a first order price of the digital asset, the first order price denominated in the fiat currency.

↓

S7524: Store, by the exchange computer system in non-transitory computer-readable memory, the first digital asset order information as a prospective digital asset sell order.

↓

S7526: Calculate, by the exchange computer system, information for a second graphical user interface by: (i) determining, by the exchange computer system, at each respective order price a second order quantity of digital assets subject to the first prospective digital asset sell order; and (ii) determining, by the exchange computer system, at each respective order price a third cumulative quantity of digital assets subject to the digital asset purchase orders that would remain after fulfilling the first prospective digital asset sell order.

↓

S7528: Generate, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising: (i) the first axis depicting price denominated in the fiat currency; (ii) the second axis depicting digital asset quantity; (iii) the first set of graphical indicators on the first side of the first axis; (iv) the second set of graphical indicators on the second side of the first axis; (v) a third set of graphical indicators on the first side of the first axis showing at each price visible along the first axis the respective third cumulative quantity of digital assets subject to the digital asset purchase orders that would remain after fulfilling the first prospective digital asset sell order; and (vi) a fourth set of graphical indicators on the second side of the first axis showing at each price visible along the first axis the respective second order quantity of digital assets subject to the first prospective digital asset sell order.

↓

S7530: Transmit, by the exchange computer system to the first user electronic device, the second machine-readable instructions so as to cause the application at the first user electronic device to render the second graphical user interface on the display.

FIG. 52C

| Time (ET) | Highest Bid ($)* | Lowest Ask ($)* | Indicative Price ($) | Auction Qty (BTC) | Diff ($) | Diff (%) |
|---|---|---|---|---|---|---|
| 15:59:30 | 604.98 | 605.48 | 604.25 | 1600.00 | -0.97 | -0.16 |
| 15:59:15 | 604.98 | 605.45 | 604.25 | 1600.00 | -0.97 | -0.16 |
| 15:59:00 | 604.98 | 605.44 | 604.48 | 1148.70 | -0.73 | -0.12 |
| 15:58:00 | 605.47 | 605.48 | 604.48 | 1155.26 | -1.00 | -0.16 |
| 15:57:00 | 605.47 | 605.48 | 604.49 | 1100.00 | -0.99 | -0.16 |
| 15:56:00 | 605.47 | 605.48 | 604.90 | 1103.11 | -0.58 | -0.09 |
| 15:55:00 | 605.47 | 605.48 | 604.25 | 1141.90 | -1.23 | -0.20 |

*Highest Bid ($) and Lowest Ask ($) are from the continuous trading order book at the time of the indicative or final auction event.*

S5508: ...the first response including one or more of the following:

(1) Customer identification information associated with the first customer;

(2) a first digital asset account balance associated with the first customer;

(3) a second digital asset account balance associated with the first customer;

(4) a transfer option to transfer one or more digital assets into an interest-bearing account associated with the first customer;

(5) interest information associated with a second digital asset account associated with the first customer/ and/or (6) a purchase option to purchase one or more digital assets into an interest-bearing account associated with the first customer

FIG. 55A-2

Exemplary First Request 5510

Customer Identification No. 12345

Account 1: 10 Digital Assets (Interest 1)
Account 2: 100 Digital Assets (Interest 2)

Transfer Option:
To Account: [Account 1 or 2]
From Account: [Account 1 or 2]

FIG. 55A-3

Decentralized Lending Smart Contract
5512

Decentralized Lending Smart Contract Public Address
5512A

Decentralized Lending Smart Contract Instructions
5512B

- Create tokens module 5514
- Transfer tokens module 5516
- Destroy tokens module 5518
- Redeem tokens module 5520
- Deposit module 5522
- Calculate interest module 5524
- Return module 5526
- Third party module 5528
- Withdrawal module 5530

FIG. 55A-4

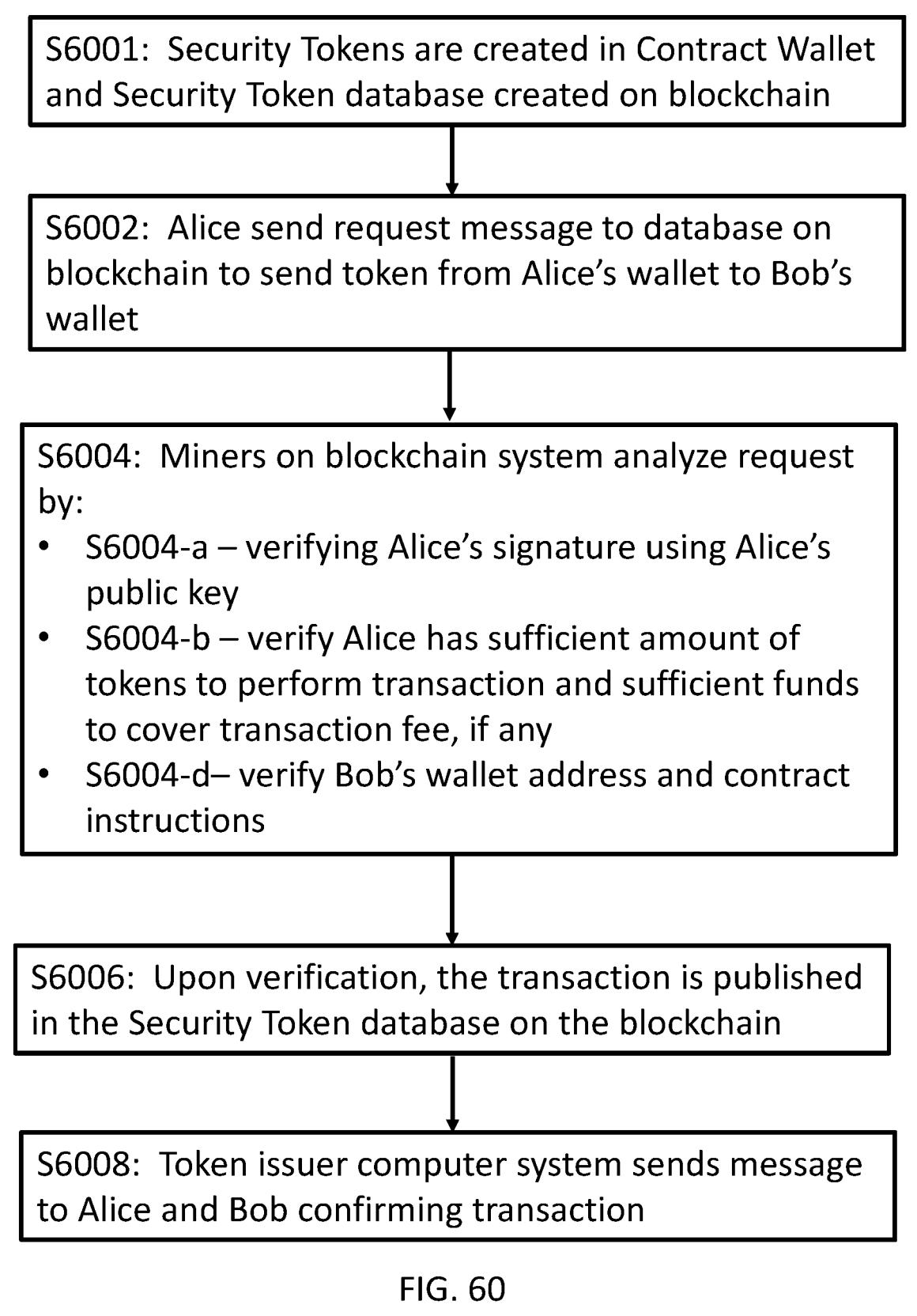

S6001: Security Tokens are created in Contract Wallet and Security Token database created on blockchain

↓

S6002: Alice send request message to database on blockchain to send token from Alice's wallet to Bob's wallet

↓

S6004: Miners on blockchain system analyze request by:

- S6004-a – verifying Alice's signature using Alice's public key
- S6004-b – verify Alice has sufficient amount of tokens to perform transaction and sufficient funds to cover transaction fee, if any
- S6004-d– verify Bob's wallet address and contract instructions

↓

S6006: Upon verification, the transaction is published in the Security Token database on the blockchain

↓

S6008: Token issuer computer system sends message to Alice and Bob confirming transaction

FIG. 60

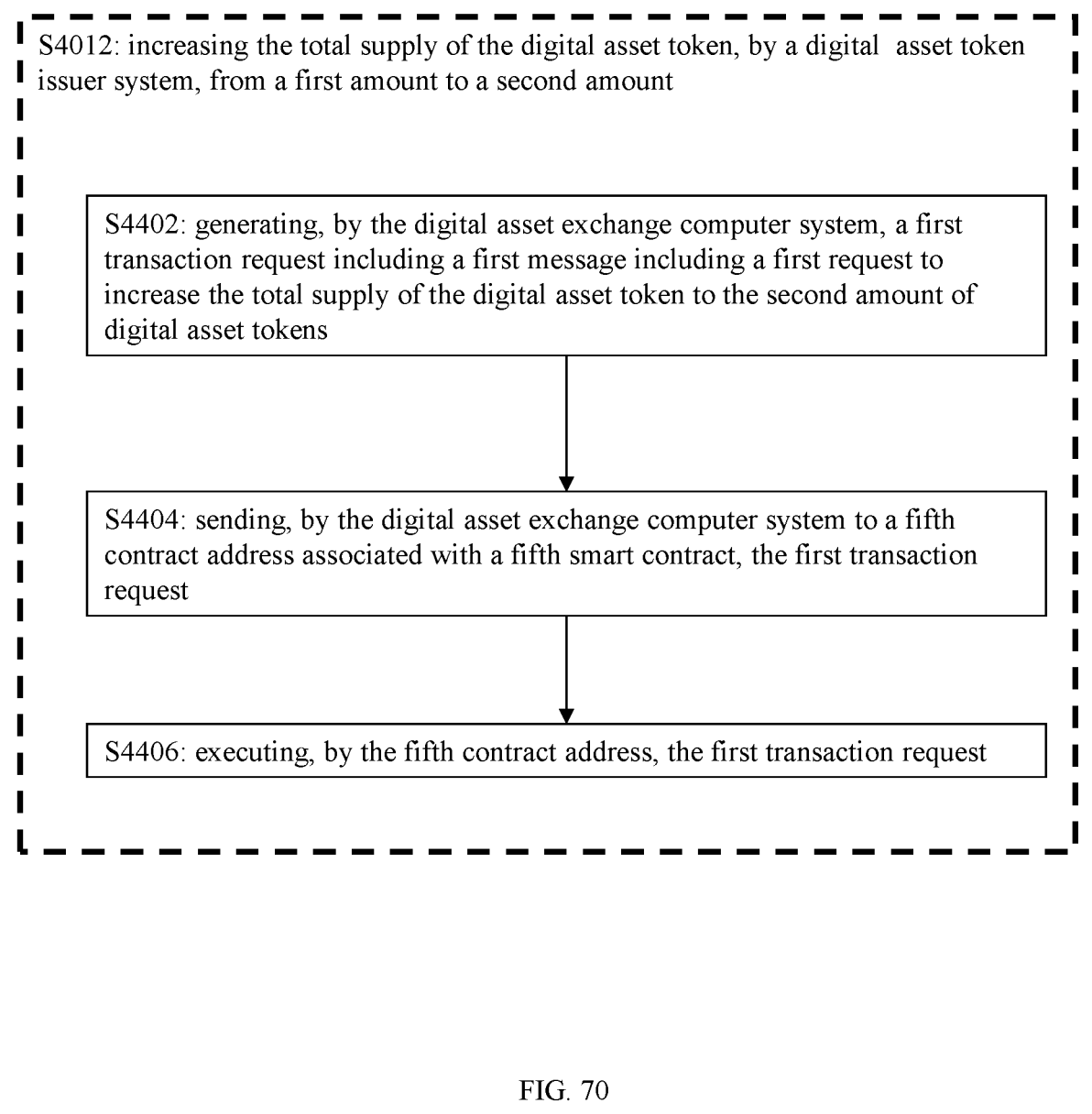

S4012: increasing the total supply of the digital asset token, by a digital asset token issuer system, from a first amount to a second amount S4402: generating, by the digital asset exchange computer system, a first transaction request including a first message including a first request to increase the total supply of the digital asset token to the second amount of digital asset tokens

↓

S4404: sending, by the digital asset exchange computer system to a fifth contract address associated with a fifth smart contract, the first transaction request

↓

S4406: executing, by the fifth contract address, the first transaction request

FIG. 70

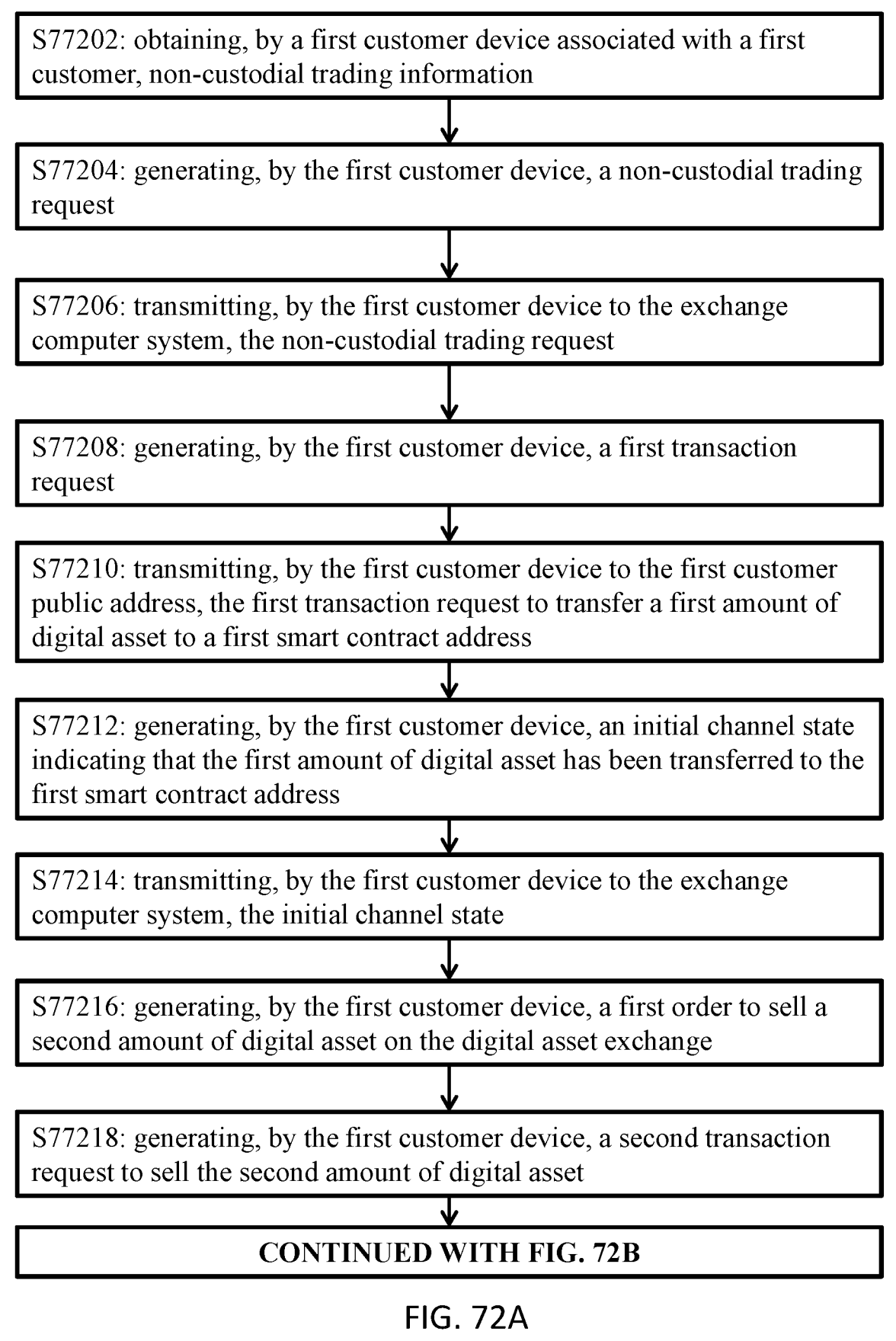

S77202: obtaining, by a first customer device associated with a first customer, non-custodial trading information S77204: generating, by the first customer device, a non-custodial trading request S77206: transmitting, by the first customer device to the exchange computer system, the non-custodial trading request S77208: generating, by the first customer device, a first transaction request S77210: transmitting, by the first customer device to the first customer public address, the first transaction request to transfer a first amount of digital asset to a first smart contract address S77212: generating, by the first customer device, an initial channel state indicating that the first amount of digital asset has been transferred to the first smart contract address S77214: transmitting, by the first customer device to the exchange computer system, the initial channel state S77216: generating, by the first customer device, a first order to sell a second amount of digital asset on the digital asset exchange S77218: generating, by the first customer device, a second transaction request to sell the second amount of digital asset

CONTINUED WITH FIG. 72B

FIG. 72A

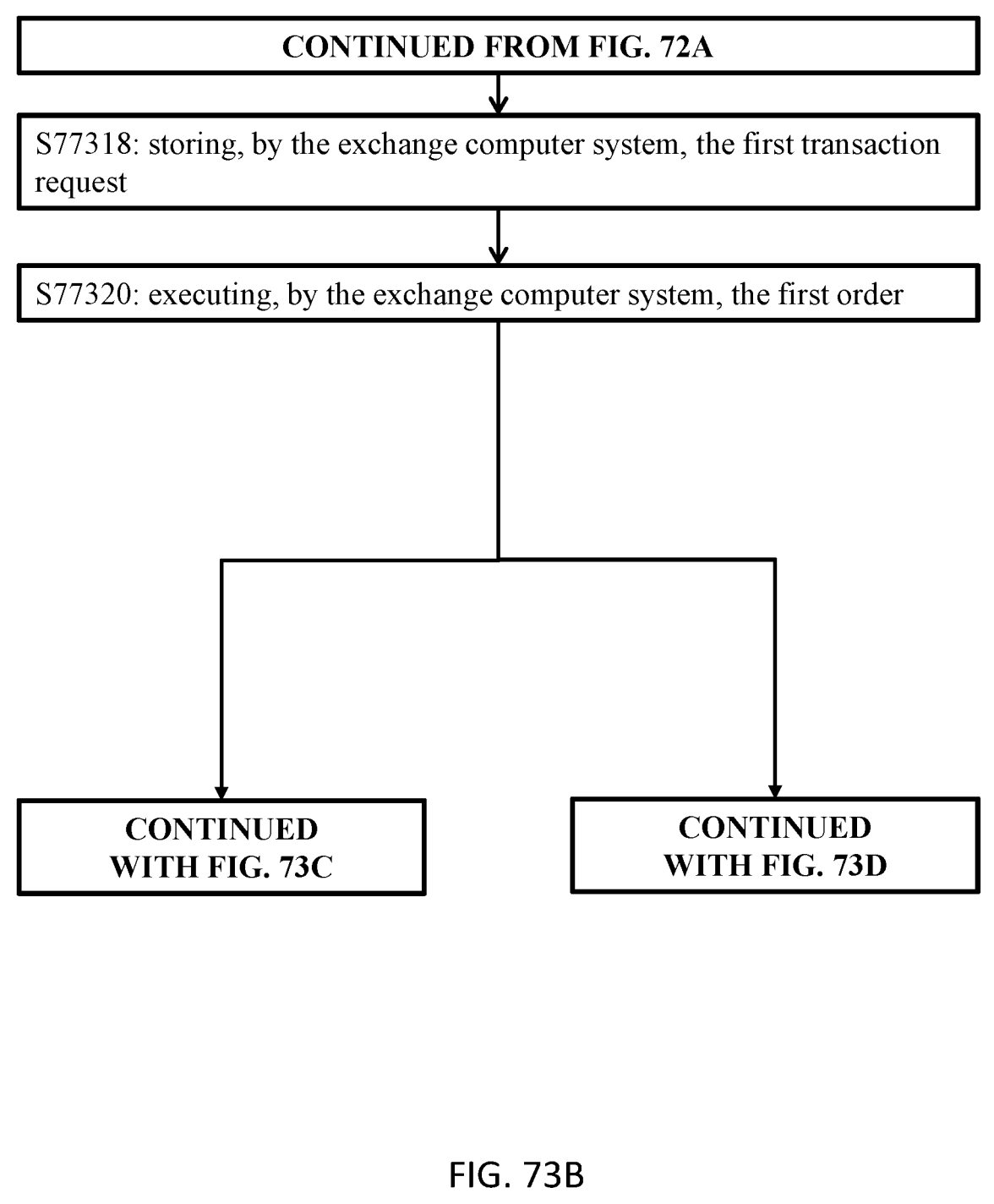

CONTINUED FROM FIG. 72A

S77318: storing, by the exchange computer system, the first transaction request

S77320: executing, by the exchange computer system, the first order

CONTINUED WITH FIG. 73C

CONTINUED WITH FIG. 73D

FIG. 73B

CONTINUED FROM FIG. 77A-2

CONTINUED WITH FIG. 77C-2

SYSTEMS, METHODS, AND PROGRAM PRODUCTS FOR NON-CUSTODIAL TRADING OF DIGITAL ASSETS ON A DIGITAL ASSET EXCHANGE

CROSS-REFERENCE TO RELATED APPLICATIONS

The present application is related to U.S. Provisional Patent Application Ser. No. 63/156,736 entitled "SYSTEMS, METHODS, AND PROGRAM PRODUCTS FOR NON-CUSTODIAL TRADING OF DIGITAL ASSETS ON A DIGITAL ASSET EXCHANGE," filed on Mar. 4, 2021, the entire contents of which is incorporated herein by reference in its entirety.

BACKGROUND

The exchange of digital assets, including those based on blockchain technology, on digital asset exchanges has become more commonplace. One technical problem that digital asset exchanges encounter is that current blockchain technology does not allow for loaning and paying interest on assets held by the digital asset exchange. Described herein are improvements to digital asset exchanges.

BRIEF DESCRIPTION OF THE DRAWINGS

Exemplary embodiments of the present invention will be described with references to the accompanying figures, wherein:

FIGS. 2-1, 2-2, and 2-3 are an exemplary screen shot of an excerpt of an exemplary bitcoin transaction log showing addresses in accordance with exemplary embodiments of the present invention;

FIG. 3 is an exemplary exchange agent interface in accordance with exemplary embodiments of the present invention;

FIGS. 4A-1 and 4A-2 are schematic drawings of an exemplary collection of systems for increasing the total supply of digital asset tokens on an underlying blockchain in accordance with exemplary embodiments of the present invention;

FIGS. 6A, 6B, 6C, 6D-1, and 6D-2 are flow charts of exemplary processes for generating digital asset accounts and securely storing the keys corresponding to each account in accordance with exemplary embodiments of the present invention;

FIGS. 13A-1 and 13A-2 are schematic drawings of an exemplary process for increasing the ceiling of a print limiter in accordance with exemplary embodiments of the present invention;

FIGS. 13B-1 and 13B-2 are schematic drawings of an exemplary process for increasing the ceiling of a print limiter in accordance with exemplary embodiments of the present invention;

FIG. 15A-1 is a flowchart of an exemplary process of increasing the total supply of tokens of a digital asset token using off-line keys in accordance with exemplary embodiments of the present invention;

FIGS. 16A-1 and 16A-2 are flowcharts of an exemplary process of increasing the total supply of tokens of a digital asset token in accordance with exemplary embodiments of the present invention;

FIGS. 29-1, 29-2, and 29-3 are exemplary flow charts of a processes for digital asset exchange account creation and account funding in accordance with exemplary embodiments of the present invention;

FIGS. 33-1 and 33-2 are exemplary flow charts of operational transaction processes of a digital math-based asset electronic exchange in accordance with exemplary embodiments of the present invention;

FIGS. 49A-1, 49A-2, and 49B are flow charts of exemplary processes for performing foreign exchange transactions in accordance with exemplary embodiments of the present invention;

FIGS. 52A-C are flow charts of exemplary processes for generating graphical user interfaces representing an electronic order book in accordance with exemplary embodiments of the present invention.

FIG. 55A-1 is an exemplary flow chart illustrating the one or more databases operatively connected to a digital asset exchange system in accordance with exemplary embodiments of the present invention;

FIG. 55A-2 is an exemplary flow chart illustrating the information that may be included in the display of the graphical user interface of the first request in accordance with exemplary embodiments of the present invention;

FIG. 55A-3 is an exemplary screenshot illustrating information included in a response to the first request in accordance with exemplary embodiments of the present invention;

FIG. 55A-4 is an exemplary flowchart illustrating a more detailed example of the first smart contract instructions in accordance with exemplary embodiments of the present invention;

FIG. 55A-5 is an exemplary flow chart illustrating the one or more databases operatively connected to a digital asset exchange system in accordance with exemplary embodiments of the present invention;

FIG. 55A-6 is an exemplary flow chart of an exemplary process for receiving and verifying a request to transfer a digital asset into an interest-bearing account in accordance with exemplary embodiments of the present invention;

FIG. 55A-7 is an exemplary flow chart of an exemplary process for transferring digital assets into an interest-bearing account in accordance with exemplary embodiments of the present invention;

FIGS. 57-1, 57-2, and 57-3 are exemplary database structure(s) for order book databases on a digital asset exchange in accordance with exemplary embodiments of the present invention;

FIG. 58-1 is a schematic diagram of exemplary structures of a digital asset exchange system for performing block trades in accordance with exemplary embodiments of the present invention;

FIG. 58-2 is the exchange computer system of FIG. 58-1 in accordance with exemplary embodiments of the present invention;

FIGS. 59, 59A-1. 59A-2, and 59A-3 are schematic flows of exemplary messages of various exemplary block trades in accordance with exemplary embodiments of the present invention; and FIG. 60 is an exemplary flow chart of the process of sending tokens from Alice to Bob on the Ethereum blockchain in accordance with exemplary embodiments of the present invention;

FIG. 70 is a flow chart of a process for increasing a total supply of digital asset tokens in accordance with exemplary embodiments of the present invention;

FIGS. 72A-72H are flow charts of a process for non-custodial trading on a digital asset exchange in accordance with exemplary embodiments of the present invention;

FIGS. 73A-73D are flow charts of a process for non-custodial trading on a digital asset exchange in accordance with exemplary embodiments of the present invention;

FIG. 77A-1 and FIG. 77A-2 are exemplary flow charts of a process to set up an automatic payment in accordance with exemplary embodiments of the present invention;

FIG. 77C-1 and FIG. 77C-2 are exemplary flow charts of a process to set up an automatic payment in accordance with exemplary embodiments of the present invention;

FIG. 78A, FIG. 78B, and FIGS. 78C-1 through 78C-4 are exemplary flow charts of a process for loyalty rewards in accordance with exemplary embodiments of the present invention.

DETAILED DESCRIPTION

Digital Math-Based Assets and Bitcoin

Figure 1:
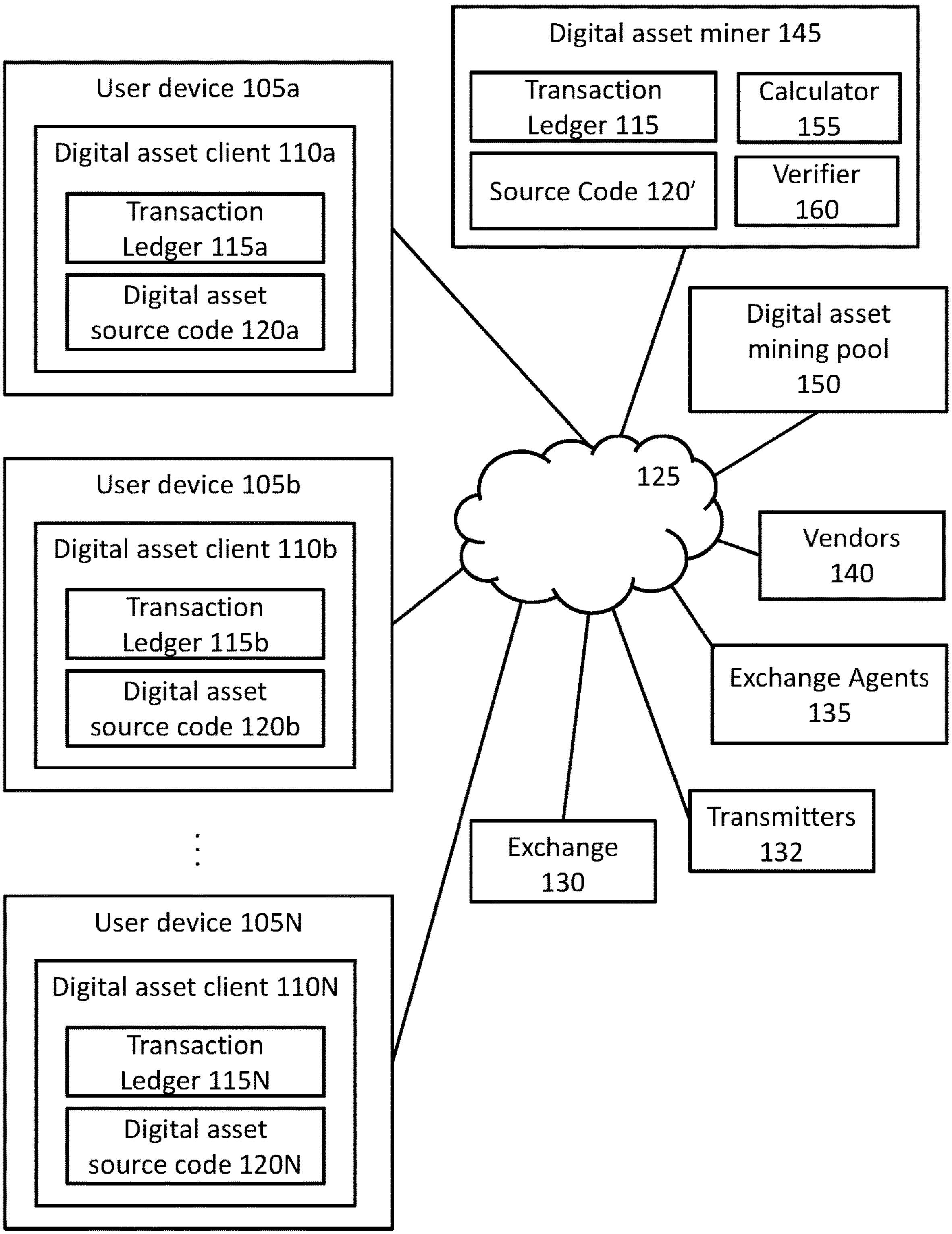
FIG. 1 is a schematic diagram of a digital asset network in accordance with exemplary embodiments of the present invention.

A digital math-based asset is a kind of digital asset based upon a computer generated mathematical and/or cryptographic protocol that may, among other things, be exchanged for value and/or be used to buy and sell goods or pay for services. A digital math-based asset may be a non-tangible asset that is not based upon a governmental rule, law, regulation, and/or backing. The Bitcoin system represents one form of digital math-based asset.

A bitcoin may be a unit of the Bitcoin digital math-based asset. Other examples of digital math-based assets include Bitcoin, Namecoins, Litecoins, PPCoins, Tonal bitcoins, bitcoin cash, zcash, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto-.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), security tokens, and/or non-fungible token (such as Cryptokitties), to name a few. In embodiments, digital math-based assets, such as bitcoin, may be accepted in trade by merchants, other businesses, and/or individuals in many parts of the world.

Digital assets may also include "tokens," which like other digital assets can represent anything from loyalty points to vouchers and IOUs to actual objects in the physical world. Tokens can also be tools, such as in-game items, for interacting with other smart contracts. A token is a "smart contract" running on top of a blockchain network (such as the Ethereum Blockchain, the Bitcoin Blockchain, to name a few). As such, it is a set of code with an associated database. In embodiments, the database may be maintained by an issuer. The code describes the behavior of the token, and the database is basically a table with rows and columns tracking who owns how many tokens.

In embodiments, a smart contract may be a computer protocol intended to digitally facilitate, verify, or enforce the negotiation or performance of credible transactions without third parties. In embodiments, smart contracts may also allow for the creation of tokens.

In embodiments, a digital math-based asset may be based on an open source mathematical and/or cryptographic protocol, which may exist on a digital asset network, such as a Bitcoin network or an Ethereum network. The network may be centralized, e.g., run by one or more central servers, or decentralized, e.g., run through a peer-to-peer network. Digital math-based assets may be maintained, tracked, and/or administered by the network.

A digital math-based asset system may use a decentralized electronic ledger system, which may be maintained by a plurality of physically remote computer systems. Such a ledger may be a public transaction ledger, which may track asset ownership and/or transactions in a digital math-based asset system. The ledger may be a decentralized public transaction ledger, which can be distributed to users in the network, e.g., via a peer-to-peer sharing. Ledger updates may be broadcast to the users across the network. Each user may maintain an electronic copy of all or part of the ledger, as described herein. In embodiments, a digital asset system may employ a ledger that tracks transactions (e.g., transfers of assets from one address to another) without identifying the assets themselves.

In embodiments, a digital asset ledger, such as the Bitcoin blockchain or the Ethereum blockchain, can be used to achieve consensus and to solve double-spending problems where users attempt to spend the same digital assets in more than one transaction. In embodiments, before a transaction may be cleared, the transaction participants may need to wait for some period of time, e.g., a six-confirmation wait (typically one hour in the context of the Bitcoin network, 15 minutes in the context of the Litecoin network, to name a few), before feeling confident that the transaction is valid, e.g., not a double count. Each update to the decentralized electronic ledger (e.g., each addition of a block to the Bitcoin blockchain or the Ethereum blockchain) following execution of a transaction may provide a transaction confirmation. After a plurality of updates to the ledger, e.g., 6 updates, the transaction may be confirmed with certainty or high certainty.

In embodiments, a blockchain can be a public transaction ledger of the digital math-based asset network, such as the Bitcoin network or the Ethereum network. For example, one or more computer systems (e.g., miners) or pools of computer systems (e.g., mining pools) can solve algorithmic equations allowing them to add records of recent transactions (e.g., blocks), to a chain of transactions. In embodiments, miners or pools of miners may perform such services in exchange for some consideration such as an upfront fee (e.g., a set amount of digital math-based assets) and/or a payment of transaction fees (e.g., a fixed amount or set percentage of the transaction) from users whose transactions are recorded in the block being added. In embodiments, digital assets in the form of a digital asset token, such as Gas, may be used to pay such fees.

The digital asset network (e.g., Bitcoin network or Ethereum network) may timestamp transactions by including them in blocks that form an ongoing chain called a blockchain. In embodiments, the addition of a block may occur periodically, e.g., approximately every 15 seconds, every 2.5 minutes or every 10 minutes, to name a few. Such blocks cannot be changed without redoing the work that was required to create each block since the modified block. The longest blockchain may serve not only as proof of the sequence of events but also records that this sequence of events was verified by a majority of the digital asset network's computing power. The blockchain recognized by the nodes corresponding to the majority of computing power, or some other consensus mechanism will become the accepted blockchain for the network. In embodiments, confirmation of a transaction may be attained with a high degree of accuracy following the addition of a fixed number of blocks to the blockchain (e.g., six blocks) after a transaction was performed and first recorded on the blockchain. As long as a majority of computing power (or some other consensus mechanism) is controlled by nodes that are not cooperating to attack the network, they will generate the longest blockchain of records and outpace attackers.

There are a variety of consensus mechanisms (or protocols) that may be used to verify transactions recorded in a blockchain. A few non-limiting examples of these mechanisms are discussed below, however, other protocols may be used in accordance with exemplary embodiments of the present invention.

For example, the proof of control protocol is one example of a consensus mechanism and is used, for example, in the Bitcoin blockchain. A more detailed discussion of proof of control protocols can be found in co-pending U.S. patent application Ser. No. 15/920,042, filed Mar. 13, 2018 and entitled SYSTEMS, METHODS, AND PROGRAM PRODUCTS FOR VERIFYING G DIGITAL ASSETS HELD IN A CUSTODIAL DIGITAL ASSET WALLET, the entire content of which is hereby incorporated herein by reference.

The proof of stake protocol is another optional protocol that may be implemented by blockchains. In this type of protocol, the validator's stake is represented by the amount of digital assets held. Validators accept, reject or otherwise validate a block to be added to the blockchain based on the amount of digital assets held by the Validator on the blockchain. If the Validators are successful in validating and adding the block, such a protocol, in embodiments, will award successful Validators are a fee in proportion to their stake.

The delegated proof of stake protocol is another protocol that is available and is, for example, used by the EOS blockchain. In this protocol, blocks are produced in a fixed number in rounds (e.g., 21 for EOS). At the start of every such round, block producers are chosen. A number less than all of the producers (e.g., 20 in EOS) are automatically chosen while a corresponding number are chosen proportional to the number of their votes relative to other producers. In embodiments, the remaining producers may be shuffled using a pseudorandom number derived from the block time, for example. In embodiments, other forms of randomized selection may be used. To ensure that regular block production is maintained, in embodiments, block time is kept to short (e.g., 3 seconds for EOS) and producers may be punished for not participating by being removed from consideration. In embodiments, a producer has to produce a minimal number of blocks, e.g., at least one block every 24 hours to be in consideration. All the nodes will, by default, not switch to a fork which does not include any blocks not finalized by a sufficient majority (e.g., 15 of the 21 producers) regardless of chain length. Thus, in EOS, each block must gain 15 of 21 votes for approval to be considered a part of the chain.

In embodiments, a delegated byzantine fault tolerance protocol may be used as a consensus mechanism. For example, NEO uses this type of protocol. In this protocol, one of the bookkeeping nodes is randomly chosen as a "speaker." The speaker then looks at all the demands of the "citizens," (e.g., all of the holders of the digital asset), and creates a "law" (e.g., a rule governing the protocol). The speaker then calculates a "happiness factor" of these laws to see if the number is enough to satisfy the citizen's needs or not. The speaker then passes the happiness factor down to the delegates (e.g., the other bookkeeping nodes). The delegates may then individually check the speaker's calculations. If the speaker's number matches the delegate's number, then the delegates give their approval, and if not, then they give their disapproval. In embodiments, a sufficient majority (e.g., 66% in NEO) of the delegates need to give their approval for the law to pass, i.e. for the block to be added. If a sufficient majority is not obtained (e.g., less than 66% approval), then a new speaker is chosen, and the process starts again.

Ripple uses an algorithm in which each server gathers all valid transactions that have not yet been applied and makes them public. Each server then amalgamates these transactions and votes on the veracity of each. Transactions that receive at least a minimum number of yes votes will move into another round of voting. A minimum of 80% approval is required before a transaction is applied.

These and other protocols may be used to generate a blockchain in accordance with exemplary embodiments of the present invention.

In embodiments, transaction messages can be broadcast on a best effort basis, and nodes can leave and rejoin the network at will. Upon reconnection, a node can download and verify new blocks from other nodes to complete its local copy of the blockchain.

In the exemplary Bitcoin system, a bitcoin is defined by a chain of digitally-signed transactions that began with its creation as a block reward through bitcoin mining. Each owner transfers bitcoin to the next by digitally signing them over to the next owner in a bitcoin transaction, which is published to and added onto a block on the blockchain. A payee can then verify each previous transaction, e.g., by analyzing the blockchain, to verify the chain of ownership.

Other examples of different types of blockchains noted above that are consistent with embodiments of present invention pose unique problems. Certain currencies present unique challenges in that transactions and/or wallets or digital asset addresses associated therewith may be shielded (e.g., not viewable by the public on the ledger). For example, Monero is based on the CryptoNight proof-of-work hash algorithm and possesses significant algorithmic differences relating to blockchain obfuscation. Monero provides a high level of privacy and is fungible such that every unit of the currency can be substituted by another unit. Monero is therefore different from public-ledger cryptocurrencies such as Bitcoin, where addresses with coins previously associated with undesired activity can be blacklisted and have their coins refused by others.

In embodiments, "proof of brain" may be a type of token reward algorithm used in social media blockchain systems that encourages people to create and curate content. In embodiments, proof of brain may enable token distribution by upvote and like-based algorithms, which may be integrated with websites to align incentives between application owners and community members to spur growth.

In particular, ring signatures mix spender's address with a group of others, making it more difficult to establish a link between each subsequent transaction. In addition, Monero provides "stealth addresses" generated for each transaction which make it difficult, if not impossible to discover the actual destination address of a transaction by anyone else other than the sender and the receiver. Further, the "ring confidential transactions" protocol may hide the transferred amount as well. Monero is designed to be resistant to application-specific integrated circuit mining, which is commonly used to mine other cryptocurrencies such as Bitcoin, however, it can be mined somewhat efficiently on consumer grade hardware such as x86, x86-64, ARM and GPUs, to name a few.

Another example of a modified blockchain consistent with exemplary embodiments of the present invention discussed above is Darkcoin. Darkcoin adds an extra layer of privacy by automatically combining any transaction its users make with those of two other users-a feature it calls Darksend-so that it will be more difficult to analyze the blockchain to determine where a particular user's money ended up.

Yet another example of a modified blockchain consistent with embodiments of the present invention discussed above is Zcash. The Zcash network supports different types of transactions including: "transparent" transactions and "shielded" transactions. Transparent transactions use a transparent address (e.g., "t-address"). In embodiments, transactions between two t-addresses behave like Bitcoin transactions and the balance and amounts transferred are publicly visible on the Zcash blockchain. Unlike the Bitcoin Blockchain, the Zcash network may also support shielded transactions using a shield address (e.g., "z-address"). In embodiments, the "z-address" provides privacy via zero-knowledge succinct noninteractive arguments of knowledge (e.g., "zk-SNARKS" or "zero-knowledge proofs"). The balance of a z-address is not publicly visible on the Zcash blockchain the amount transferred into and out of a z-address is private if between two z-addresses but may be public if between a z-address and a t-address.

In embodiments, a digital asset based on a blockchain, may in turn include special programming, often referred to as "smart contracts", which allow for the creation of "tokens", which in turn are digital assets based on digital assets. In embodiments, tokens may be ERC-20 tokens, and used in conjunction with ERC-20 token standard as a programming language. In embodiments, other protocols may be used including but not limited to ERC-223 and ERC-721, to name a few. In embodiments, smart contracts may be written on other smart contracts to provide for increased functionality. One non-limiting example of this type of structure is the open source Cryptokittens game in which digital kittens are provided as ERC-721 tokens with a series of smart contracts provided to define how the kittens will interact with each other and with users. Cryptokitty is a non-fungible token. A non-fungible token may be stored on a peer-to-peer distributed network in the form of a blockchain network (or other distributed networks). Examples of non-fungible tokens include one or more of the following: Cryptokitties, Cryptofighters, Decentraland, Etherbots, Ethermon, Rare peppes, Spells of Genesis, Crafty. Superarre, Terra0, Unico, to name a few. In embodiments, non-fungible tokens, (e.g., 5 Crytpokitties) may be transferable and accounted for as a digital asset token on an underlying blockchain network (e.g., Ethereum Network). In embodiments, a first non-fungible token (e.g. a First CryptoKitty) may have attributes (e.g. characteristics of a non-fungible token) that are different from a second non-fungible token (e.g. a Second CryptoKitty), even if both are the same type of non-fungible token (e.g., a CryptoKitty). For example, the First CryptoKitty may be a striped CryptoKitty, while the Second CryptoKitty may be a droopy-eyed CryptoKitty. In embodiments, the attributes of each non-fungible tokens may be customizable. In embodiments, programming modules may be added to and/or transferred with programming modules associated with specific tokens. By way of illustration, a first token, e.g., a Cryptokitten Tiger, may purchase a second token, e.g., a digital "hat," that will then become associated with the first token to be a Tiger with a hat, and remain with the first token when transferred. Thus, by way of illustration, in the context of example embodiments of the present invention, the first token could be, e.g., a security token, and the second token could be, e.g., an account holding tokens, or a right to request tokens from another account as discussed below. If the first token is transferred, the second token would transfer with the ownership of the first token.

For example, digital assets can include tokens, which like other digital assets that can represent anything from loyalty points to vouchers and IOUs to actual objects in the physical world. Tokens can also be tools, such as in-game items, for interacting with other smart contracts. A token is a smart contract running on top of a blockchain network (such as the Ethereum Blockchain, the Bitcoin Blockchain, to name a few). As such, it is a set of code with an associated database. In embodiments, the database may be maintained by an issuer. In embodiments, the database may be included as part of the blockchain. In embodiments, the ledger may be maintained in the first instance as a database in a sidechain by the issuer or agent of the issuer and subsequently published and stored as part of a blockchain. The code describes the behavior of the token, and the database is basically a table with rows and columns tracking who owns how many tokens.

If a user or another smart contract within the blockchain network (such as the Ethereum Network) sends a message to that token's contract in the form of a "transaction," the code updates its database.

So, for instance, as illustrated in FIG. 60, using a token based on the Ethereum Network for illustration purposes, when a wallet app sends a message to a token's contract address to transfer funds from Alice to Bob, the following proceed occurs.

asset address for transactions as necessary. In embodiments, a Security Token database is maintained in a blockchain, such as the Ethereum blockchain, for example. In embodiments, the ledger may be maintained in the first instance as a database in a sidechain by the issuer or agent and subsequently published and stored as part of a blockchain. In embodiments, Security Tokens may be generated on the fly, however, in this case, the Contract Wallet may be associated with a hot wallet, or a Supplementary Wallet authorized to perform such operations may be used, and may be a hot wallet with the Contract Wallet remaining a cold wallet. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein by reference. In embodiments, Contract Wallets may be maintained by the token issuer and which would hold the private key associated with the token on an associated device. In embodiments, Contract Wallets may be provided on a user computer device and hold the private key associated with the token. In such embodiments, a user computer device may include a software application to provide secure access to the token issuer such that the user can engage in transactions.

By way of illustration, an ERC-20 Contract can include the following representative type of functions as shown in Table 1-1 in its programming of a Smart Contract associated with a particular token, such as a security token:

TABLE 1-1

```
// ----------------------------------------------------------------------------
// ERC Token Standard #20 Interface
// https://github.com/ethereum/EIPs/blob/master/EIPS/eip-20-token-standard.md
// ----------------------------------------------------------------------------
contract ERC20Interface {
    function total Supply( ) public constant returns (uint);
    function balanceOf(address tokenOwner) public constant returns (uint balance);
        function allowance(address tokenOwner, address spender) public constant returns
(uint remaining);
    function transfer(address to, uint tokens) public returns (bool success);
      function approve(address spender, uint tokens) public returns (bool success);
        function transferFrom(address from, address to, uint tokens) public returns (bool
success);

      event Transfer(address indexed from, address indexed to, uint tokens);
      event Approval(address indexed tokenOwner, address indexed spender, uint tokens);
```

In step S6001, at the token issuer computer system, Security Tokens are created. In embodiments, each Security Token may have an "ERC-20 Contract Wallet Address" ("Contract Address") which is used to write a smart contract. In embodiments, the smart contract may include instructions to perform at least: (1) token creation, (2) token transfer, (3) token destruction; and (4) updating smart contract coding. In embodiments, the Contact Address may be associated with a designated cold storage wallet associated with the token issuer. In embodiments, the Contract Address may be associated with a designated hot storage wallet associated with the token issuer. In embodiments, the Contract Address may be associated with a designated cold storage wallet associated with the token issuer, but may also give at least some permission to perform operations by one or more hot wallets associated with the token issuer and/or a token administrator on behalf of the token issuer. Security Tokens may be created in batches (for example, 100,000 tokens worth $100,000 U.S. dollars) in the "Contract Wallet" or Contract Address and later moved to a hot wallet or associates digital Some of the tokens may invlude further information describing the token contract such as shown in Table 2-1:

TABLE 2-1

```
string public constant name = "Token Name";
string public constant symbol = "SYM";
  uint8 public constant decimals = 18; //
18 is the most common number of decimal places
```

In Step S6002, Alice's wallet, or associated digital asset address, may send a request message to the database maintained by the blockchain including: (a) Alice's ethereum digital asset address, which is typically associated with a digital wallet (Source Address); (b) token identification information; (c) amount of token to be transferred; and (d) Bob's ethereum digital asset address (Destination Address). In embodiments, if a fee is charged for the transaction, fee payment information may also be required and provided. For example, on the Ethereum network, an amount of Gas tokens may be required from the sender to pay for processing of the transaction into a block on the blockchain. In embodiments, the message may include a proposed fee amount and/or fee proposal including a limit in e.g., Gas. The request message will also be digitally signed by Alice's private key.

In Step S6004, when miners on the blockchain receive the transaction request directed to the contract wallet or associated digital asset address, with the request message, miners on the blockchain will confirm the transaction, including verifying that the message was properly signed by Alice. In Step S1004-*b*, the miners may verify that Alice has sufficient amount of tokens to perform the requested transaction, for example, by comparing Alice's balance against Alice's token balance as indicated on the blockchain. In Step S1004-*c*, the validity of Bob's digital asset address (the Destination Address) may also be confirmed by the miners. The miners may also compare the request with smart contract coding and instructions included in the Contract Address. The transaction fee discussed above is paid to the miners for confirming the transaction as noted above.

In Step S6006, if the request is verified the transaction is published in the Security Token database of the blockchain reflecting a debit against Alice's token holdings and a corresponding credit to Bob's token holdings (less any applicable fees).

In Step S6008, response messages to the digital asset addresses of both Alice and Bob may be sent to reflect that the transaction was successfully processed. In embodiments, such messages may include information including: (i) the source digital asset address; (ii) the destination digital asset address; (iii) the amount of tokens transferred; and/or (iv) the new balances for each digital asset address or associated digital wallet. In embodiments, the message may include a proposed fee amount and/or fee proposal including a limit in e.g., Gas. In embodiments, Alice, Bob, and/or third parties may view the balances and transaction information based on the information stored in the blockchain, by, e.g., viewing token balances at websites like etherscan.io, to name a few.

In contrast to tokens, a blockchain based digital asset (such as ether) is hard coded into the blockchain (e.g., the Ethereum Blockchain) itself. It is sold and traded as a cryptocurrency, and it also powers the network (e.g., the Ethereum Network) by allowing users to pay for smart contract transaction fees. (In some networks, transactions fees may be paid for in digital assets, such as tokens (e.g., Gas) or blockchain based digital assets (e.g., bitcoin). In the Ethereum Network, all computations typically have a cost based on other digital assets, such as Gas.

In embodiments, when tokens are sent to or from a Contract Address, for example, a fee may be charged for that transaction (in this case, a request to the token's contract to update its database) in, e.g., some form of digital asset, such as ether, bitcoin, Gas, to name a few. In embodiments, the message may include a proposed fee amount and/or fee proposal including a limit in digital asset, e.g., ether, bitcoin or Gas. This payment is then collected by a miner who confirms the transaction in a block, which then gets added to the blockchain.

Figure 3:
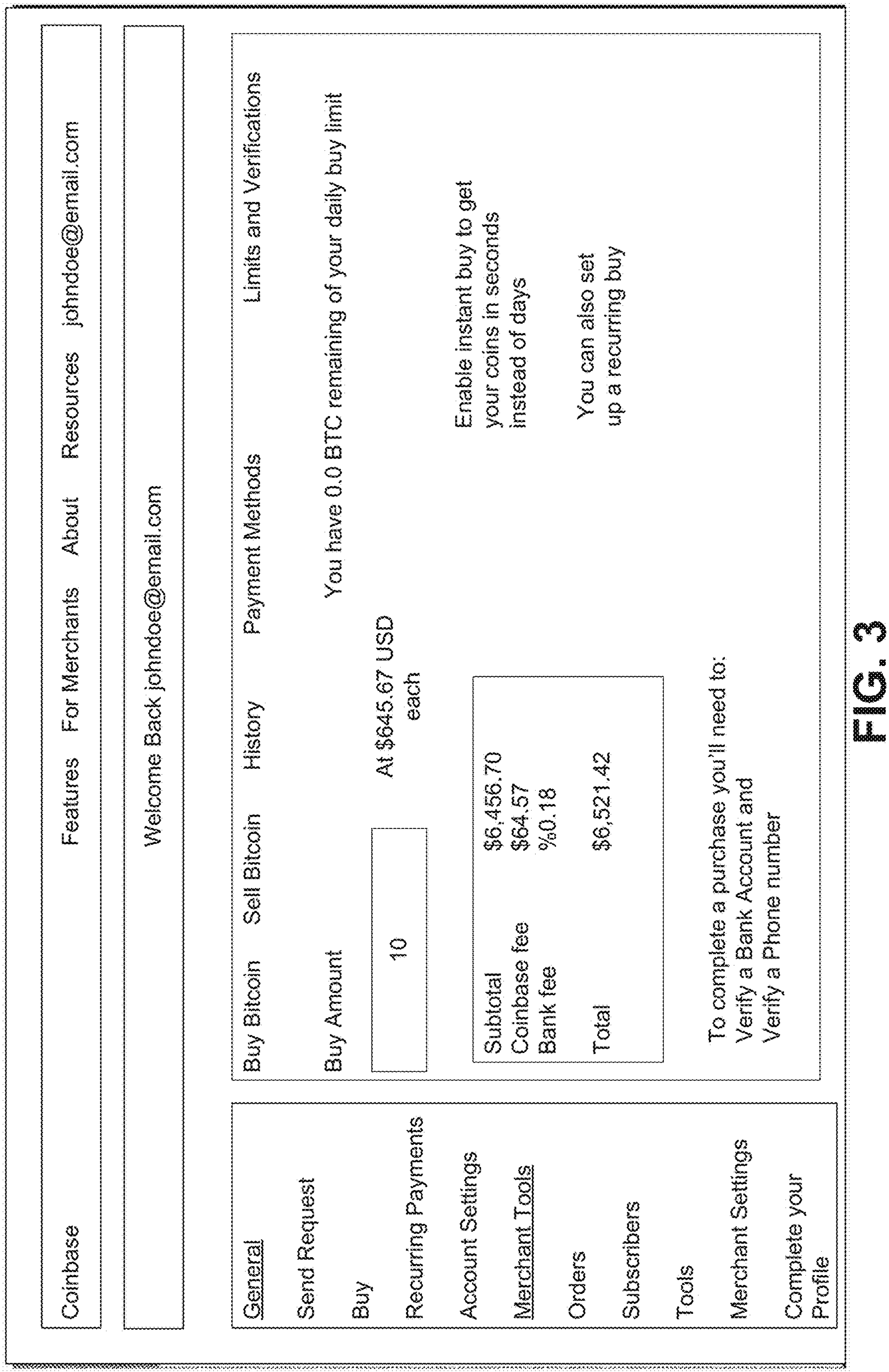
Figures 1, 4A:
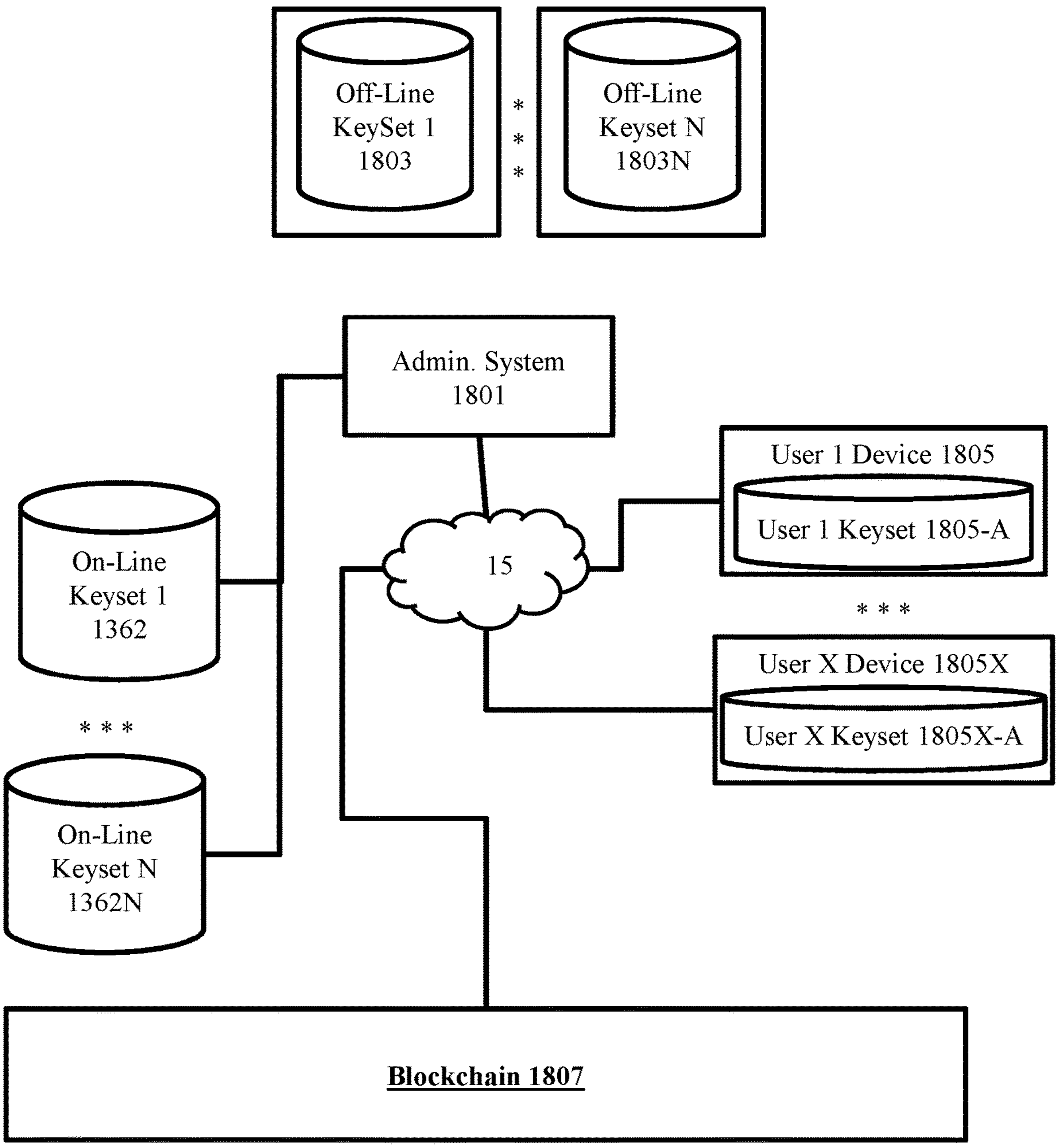
Figures 2, 4A:
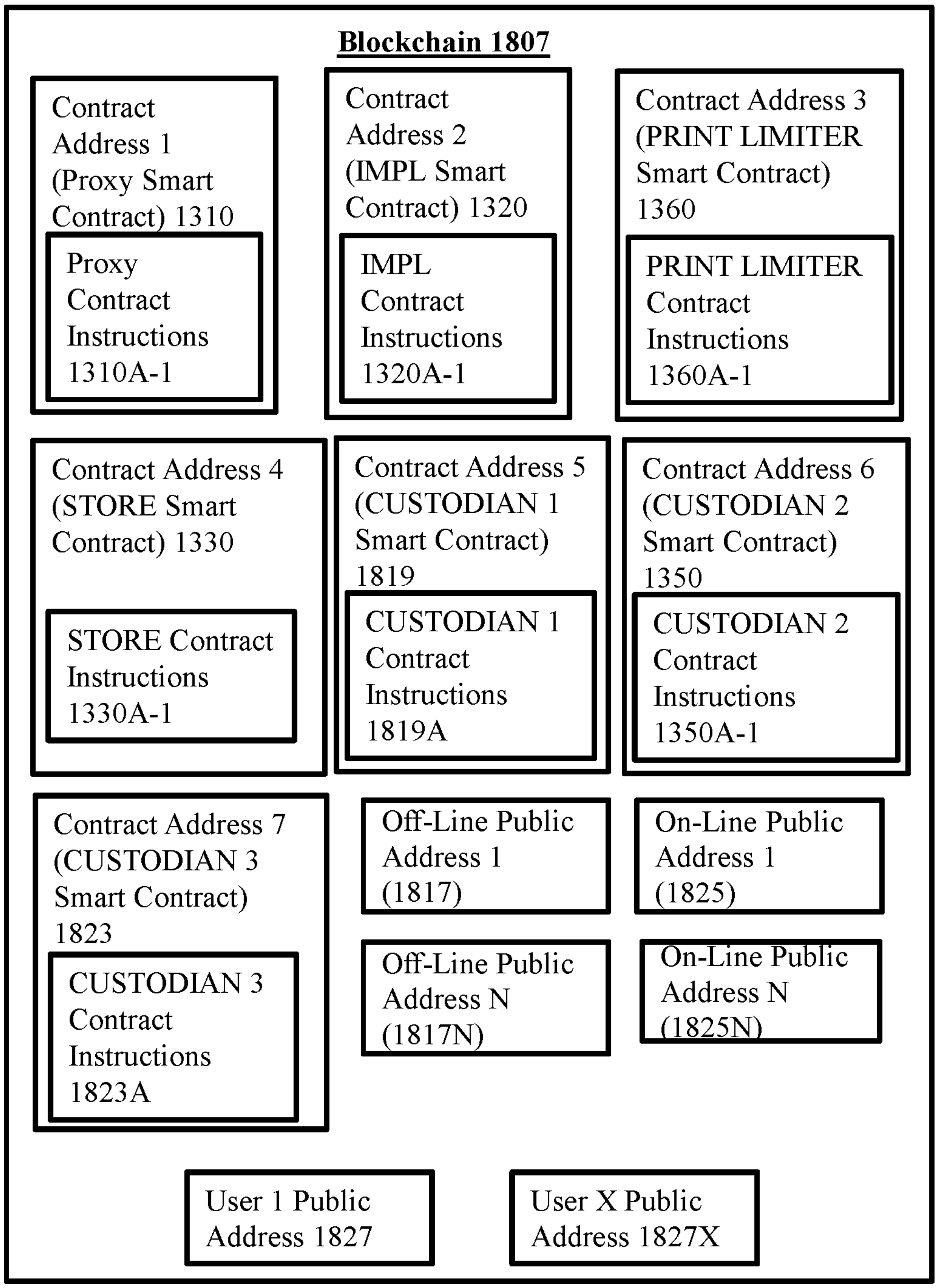

FIGS. 2-1, 2-2, and 2-3 are an exemplary screen shot of an excerpt of a bitcoin transaction log or transaction ledger 115 showing digital asset account identifiers (e.g., addresses) corresponding to origin and destination accounts for each transaction and amount information for each transaction in accordance with exemplary embodiments of the present invention. The exemplary log 115 includes transaction identifiers, date and/or time information, fee information, digital asset account identifiers for the origin accounts, digital asset account identifiers for the destination accounts, and amounts transferred to and from each account. Such a ledger may also include description information (such as notes describing a transaction, e.g. "rent payment") and/or balance information, to name a few. Other forms of transaction logs can be used consistent with exemplary embodiments of the present invention. In an exemplary embodiment the description information may be included as a message in a request for a transaction, as is discussed in detail with respect to FIGS. 53 and 54 and discussed below. The description information discussed above thus may also be used to confirm control of over a particular account.

As can be seen in FIGS. 2-1, 2-2. And 2-3, digital asset transfers may begin from a single origin and be sent to a single destination or multiple destinations. Similarly, digital assets may be transferred from multiple origins to one or more destinations.

Figure 2A:
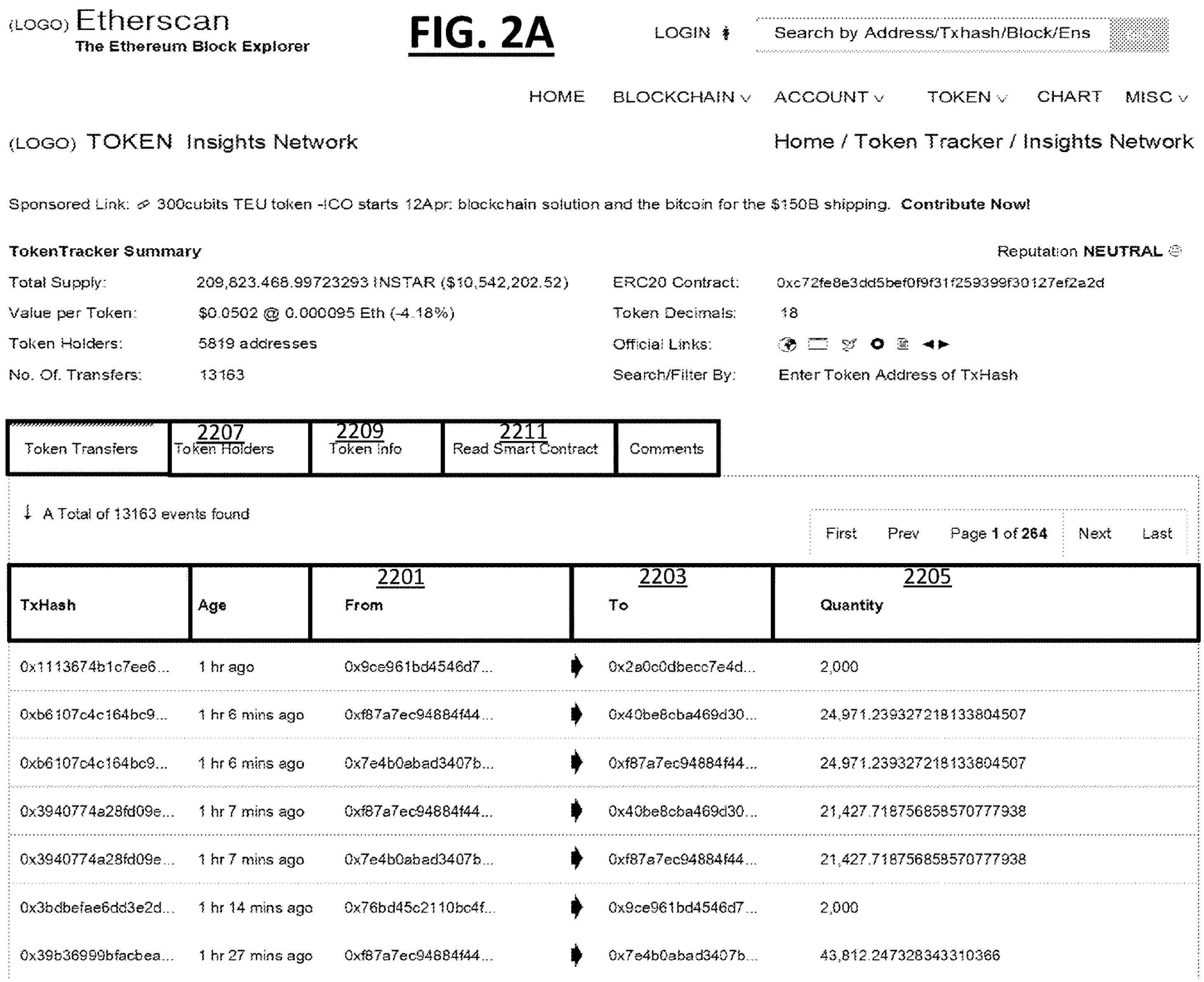
FIG. 2A is an exemplary screen shot of a Security Token ledger in accordance with exemplary embodiments of the present invention.

FIG. 2A illustrates a screenshot showing an exemplary embodiment of a token ledger for a Gas token. This particular screenshot shows a specific example the token ledger for the Gas token provided by etherscan.io. As illustrated the ledger illustrates, in chronological order, a series of transactions identifying the source address 2201 and destination address 2203 along with the quantity of tokens 2205 transferred in each transaction. In embodiments, the Security Token ledger of the present application may be similar to that illustrated in FIG. 2A. In embodiments, as illustrated in FIG. 2A, the Security Token ledger may also include the option to identify all Token holders 2207 as well as options to view token details 2209 and to view the contract details 2211. Similarly, in embodiments, a token ledger of the present application may be similar to that illustrated in FIG. 2A. Digital asset ledgers may be maintained in the form of a database. Such a database may be maintained on a blockchain or off a blockchain as a sidechain which may later be published to the blockchain.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a Bitcoin network by example. Of course, other digital asset networks, such as the Ethereum network, can be used with embodiments of the present invention. A digital math-based asset network, such as a Bitcoin network, may be an online, end-user to end-user network hosting a public transaction ledger 115 and governed by source code 120 comprising cryptologic and/or algorithmic protocols. A digital asset network can comprise a plurality of end users, a . . . N, each of which may access the network using one or more corresponding user device 105*a*, 105*b*, . . . 105N. In embodiments, user devices 105 may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, each user device 105 can run a digital asset client 110, e.g., a Bitcoin client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction leger 115*a* (contained on a user device 105*a*) should correspond with the electronic transaction ledgers 115*b* . . . 115N (contained on user devices 105*b* . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the Bitcoin network (Bitcoin clients) include Bitcoin-Qt and Bitcoin Wallet, to name a few. In embodiments, some of the transactions on the public ledger may be encrypted or otherwise shielded so that only authorized users may access ledger information about such transactions or wallets.

In addition, a digital asset network, such as a Bitcoin network, may include one or more digital asset exchange 130, such as Bitcoin exchanges (e.g., BitFinex, BTC-e). Digital asset exchanges may enable or otherwise facilitate the transfer of digital assets, such as bitcoin, and/or conversions involving digital assets, such as between different digital assets and/or between a digital asset and non-digital assets, currencies, to name a few. The digital asset network may also include one or more digital asset exchange agents 135, e.g., a Bitcoin exchange agent. Exchange agents 135 may facilitate and/or accelerate the services provided by the exchanges. Exchanges 130, transmitters 132, and/or exchange agents 135 may interface with financial institutions (e.g., banks) and/or digital asset users. Transmitters 132 can include, e.g., money service businesses, which could be licensed in appropriate geographic locations to handle financial transactions. In embodiments, transmitters 132 may be part of and/or associated with a digital asset exchange 130. Like the user devices 105, digital asset exchanges 130, transmitters 132, and exchange agents 135 may be connected to the data network 125 through wired, wireless, or other connections. They may be connected directly and/or indirectly to each other and/or to one or more user device 105 or other entity participating in the digital asset system.

Digital assets may be sub-divided into smaller units or bundled into blocks or baskets. For example, for bitcoin, subunits, such as a Satoshi, as discussed herein, or larger units, such as blocks of bitcoin, may be used in exemplary embodiments. Each digital asset, e.g., bitcoin, may be subdivided, such as down to eight decimal places, forming 100 million smaller units. For at least bitcoin, such a smaller unit may be called a Satoshi. Other forms of division can be made consistent with embodiments of the present invention.

In embodiments, the creation and transfer of digital math-based assets can be based on an open source mathematical and/or cryptographic protocol, which may not be managed by any central authority. Digital assets can be transferred between one or more users or between digital asset accounts and/or storage devices (e.g., digital wallets) associated with a single user, through a network, such as the Internet, via a computer, smartphone, or other electronic device without an intermediate financial institution. In embodiments, a single digital asset transaction can include amounts from multiple origin accounts transferred to multiple destination accounts. Accordingly, a transaction may comprise one or more input amounts from one or more origin digital asset accounts and one or more output amounts to one or more destination accounts. Origin and destination may be merely labels for identifying the role a digital asset account plays in a given transaction; origin and destination accounts may be the same type of digital asset account.

In embodiments, a digital math-based asset system may produce digital asset transaction change. Transaction change refers to leftover digital asset amounts from transactions in digital asset systems, such as Bitcoin, where the transactions are comprised of one or more digital inputs and outputs. A digital asset account can store and/or track unspent transaction outputs, which it can use as digital inputs for future transactions. In embodiments, a wallet, third-party system, and/or digital asset network may store an electronic log of digital outputs to track the outputs associated with the assets contained in each account. In digital asset systems such as Bitcoin, digital inputs and outputs cannot be subdivided. For example, if a first digital asset account is initially empty and receives a transaction output of 20 BTC (a bitcoin unit) from a second digital asset account, the first account then stores that 20 BTC output for future use as a transaction input. To send 15 BTC, the first account must use the entire 20 BTC as an input, 15 BTC of which will be a spent output that is sent to the desired destination and 5 BTC of which will be an unspent output, which is transaction change that returns to the first account. An account with digital assets stored as multiple digital outputs can select any combination of those outputs for use as digital inputs in a spending transaction. In embodiments, a digital wallet may programmatically select outputs to use as inputs for a given transaction to minimize transaction change, such as by combining outputs that produce an amount closest to the required transaction amount and at least equal to the transaction amount.

In embodiments, the present invention can be used to be compatible with the Libra Network and the Move Programming language as described in the following disclosures, each of which is hereby incorporated by reference herein: (1) Move: A Language With Programmable Resources (available at: https://developers.libra.org/docs/move-paper); (2) The Libra White Paper (available at: libra.org/en-US/white-paper/); (3) The Libra Reserve (available at: https://libra.org/en-US/about-currency-reserve/); (4) The Libra Association (available at: libra.org/en-US/association-council-principles/); (5) State Machine Replication in the Libra Blockchain (available at: developers.libra.org/docs/state-machine-replication-paper); (6) Moving Toward Permissionless Consensus (available at: libra.org/en-US/permissionless-blockchain/); and (7) The Libra Blockchain (available at: developers.libra.org/docs/the-libra-blockchain-paper).

In embodiments, the present invention may be compatible with one or more fiat-backed digital assets, which may be: a fiat-backed digital asset token (e.g. a Gemini Dollar), a stable value digital asset token, and/or Libra, to name a few. In embodiments, the fiat-backed digital asset may be backed by one or more amounts of one or more types of the following assets: one or more types of fiat (e.g., U.S. Dollars, Euro, Yen, British Pound, Swiss Franc, Canadian Dollar, Australian Dollar, New Zealand Dollar, Kuaiti Dinar, Bahrain Dinar, Oman Rial, Jordan Dinar, Cayman Island Dollar, South African Rand, Mexican Pesos, Renmembi, to name a few); bank accounts in such fiat; one or more government securities denominated in such fiat (e.g., U.S. treasury certificates); municipal bonds or other government issued bonds, shares in exchange trade funds holding currencies or currency future contracts, one or more stocks; one or more bonds; one or more certificate of deposits ("CD"); to name a few. In embodiments, other forms of backed digital assets may also be used, where the assets may also include other digital assets, other physical assets (like real estate and/or inventors), securities, equities, bonds, commodities (e.g., gold, silver, diamonds, crops, oil, to name a few), or financial instruments (e.g., futures, puts, calls, credit default swaps, to name a few) one or more pieces of real estate, gold, diamonds and/or a combination thereof, to name a few. In embodiments, may be only one kind of asset (e.g., dollars held in a bank or government security or CD, to name a few) or a basket of assets (e.g., multiple fiats, e.g., dollars, euros, yet, to name a few). In embodiments, the value of the fiat-backed digital asset may fluctuate with the value of the assets backing the fiat-backed digital assets. The underlying value of the fiat-backed digital asset, in embodiments, may be updated in real-time, substantially real-time, periodically, and/or aperiodically, to name a few.

Referring again to FIG. 1, a digital asset network may include digital asset miners 145. Digital asset miners 145 may perform operations associated with generating or minting new digital assets, and/or operations associated with confirming transactions, to name a few. Digital asset miners 145 may collaborate in one or more digital asset mining pools 150, which may aggregate power (e.g., computer processing power) so as to increase output, increase control, increase likelihood of minting new digital assets, increase likelihood of adding blocks to a blockchain, to name a few.

In embodiments, the processing of digital asset transactions, e.g., bitcoin transactions, can be performed by one or more computers over a distributed network, such as digital asset miners 145, e.g., bitcoin miners, and/or digital asset mining pools 150, e.g., bitcoin mining pools. In embodiments, mining pools 150 may comprise one or more miners 145, which miners 145 may work together toward a common goal. Miners 145 may have source code 120', which may govern the activities of the miners 145. In embodiments, source code 120' may be the same source code as found on user devices 105. These computers and/or servers can communicate over a network, such as an internet-based network, and can confirm transactions by adding them to a ledger 115, which can be updated and archived periodically using peer-to-peer file sharing technology. For example, a new ledger block could be distributed on a periodic basis, such as approximately every 10 minutes. In embodiments, the ledger may be a blockchain. Each successive block may record transactions that have occurred on the digital asset network. In embodiments, all digital asset transactions may be recorded as individual blocks in the blockchain. Each block may contain the details of some or all of the most recent transactions that are not memorialized in prior blocks. Blocks may also contain a record of the award of digital assets, e.g., bitcoin, to the miner 145 or mining pool 150 who added the new block, e.g., by solving calculations first.

A miner 145 may have a calculator 155, which may solve equations and/or add blocks to the blockchain. The calculator 155 may be one or more computing devices, software, or special-purpose device, to name a few. In embodiments, in order to add blocks to the blockchain, a miner 145 may be required to map an input data set (e.g., the blockchain, plus a block of the most recent transactions on the digital asset network, e.g., transactions on the Bitcoin network, and an arbitrary number, such as a nonce) to a desired output data set of predetermined length, such as a hash value. In embodiments, mapping may be required to use one or more particular cryptographic algorithms, such as the SHA-256 cryptographic hash algorithm or script, to name a few. In embodiments, to solve or calculate a block, a miner 145 may be required to repeat this computation with a different nonce until the miner 145 generates a SHA-256 hash of a block's header that has a value less than or equal to a current target set by the digital asset network. In embodiments, each unique block may only be solved and added to the blockchain by one miner 145. In such an embodiment, all individual miners 145 and mining pools 150 on the digital asset network may be engaged in a competitive process and may seek to increase their computing power to improve their likelihood of solving for new blocks. In embodiments, successful digital asset miners 145 or mining pools 150 may receive an incentive, such as, e.g., a fixed number of digital assets (e.g., bitcoin) and/or a transaction fee for performing the calculation first and correctly and/or in a verifiable manner.

In embodiments, the cryptographic hash function that a miner 145 uses may be one-way only and thus may be, in effect, irreversible. In embodiments, hash values may be easy to generate from input data, such as valid recent network transaction(s), blockchain, and/or nonce, but neither a miner 145 nor other participant may be able to determine the original input data solely from the hash value. Other digital asset networks may use different proof of work algorithms, such as a sequential hard memory function, like script, which may be used for Litecoin. As a result, generating a new valid block with a header less than the target prescribed by the digital asset network may be initially difficult for a miner 145, yet other miners 145 can easily confirm a proposed block by running the hash function at least once with a proposed nonce and other identified input data. In embodiments, a miner's proposed block may be added to the blockchain once a defined percentage or number of nodes (e.g., a majority of the nodes) on the digital asset network confirms the miner's work. A miner 145 may have a verifier 160, which may confirm other miners' work. A verifier 160 may be one or more computers, software, or specialized device, to name a few. A miner 145 that solved such a block may receive the reward of a fixed number of digital assets and/or any transaction fees paid by transferors whose transactions are recorded in the block. "Hashing" may be viewed as a mathematical lottery where miners that have devices with greater processing power (and thus the ability to make more hash calculations per second) are more likely to be successful miners 145. In embodiments, as more miners 145 join a digital asset network and as processing power increases, the digital asset network may adjust the complexity of the block-solving equation to ensure that one newly-created block is added to the blockchain approximately every ten minutes. Digital asset networks may use different processing times, e.g., approximately 2.5 minutes for Litecoin, approximately 10 minutes for Bitcoin, to name a few.

In addition to archiving transactions, a new addition to a ledger can create or reflect creation of one or more newly minted digital assets, such as bitcoin. In embodiments, new digital math-based assets may be created through a mining process, as described herein. In embodiments, the number of new digital assets created can be limited. For example, in embodiments, the number of digital assets (e.g., bitcoin) minted each year is halved every four years until a specified year, e.g., 2140, when this number will round down to zero. At that time no more digital assets will be added into circulation. In the exemplary embodiment of bitcoin, the total number of digital assets will have reached a maximum of 21 million assets in denomination of bitcoin. Other algorithms for limiting the total number of units of a digital math-based asset can be used consistent with exemplary embodiments of the present invention. For example, the Litecoin network is anticipated to produce 84 million Litecoin. In embodiments, the number of digital assets may not be capped and thus may be unlimited. In embodiments, a specified number of coins may be added into circulation each year, e.g., so as to create a 1% inflation rate.

In embodiments, the mining of digital assets may entail solving one or more mathematical calculations. In embodiments, the complexity of the mathematical calculations may increase over time and/or may increase as computer processing power increases. In embodiments, result of solving the calculations may be the addition of a block to a blockchain, which may be a transaction ledger, as described further below. Solving the calculations may verify a set of transactions that has taken place. Solving the calculations may entail a reward, e.g., a number of digital math-based assets and/or transaction fees from one or more of the verified transactions.

Different approaches are possible for confirming transactions and/or creating new assets. In embodiments, a digital asset network may employ a proof of work system. A proof of work system may require some type of work, such as the solving of calculations, from one or more participants (e.g., miners 145) on the network to verify transactions and/or create new assets. In embodiments, a miner 145 can verify as many transactions as computationally possible. A proof of work system may be computationally and/or energy intensive. In embodiments, the network may limit the transactions that a miner 145 may verify.

In embodiments, a digital asset network may employ a proof of stake system. In a proof of stake system, asset ownership may be tied to transaction verification and/or asset creation. Asset ownership can include an amount of assets owned and/or a duration of ownership. The duration of ownership may be measured linearly as time passes while a user owns an asset. In an exemplary embodiment, a user holding 4% of all digital assets in a proof of stake system can generate 4% of all blocks for the transaction ledger. A proof of stake system may not require the solution of complex calculations. A proof of stake system may be less energy intensive than a proof of work system. In embodiments, a hybrid of proof of work and proof of stake systems may be employed. For example, a proof of work system may be employed initially, but as the system becomes too energy intensive, it may transition to a proof of stake system.

Proof or work and proof of stake are both examples of consensus algorithms. Such consensus algorithms have as their goal providing a method of reaching consensus to improve the system whether it be on ways of improving transactions, upgrading the network, etc.

In embodiments, asset creation and/or transaction confirmation can be governed by a proof of stake velocity system. Proof of stake velocity may rely upon asset ownership where the function for measuring duration of ownership is not linear. For example, an exponential decay time function may ensure that assets more newly held correspond to greater power in the system. Such a system can incentivize active participation in the digital math-based asset system, as opposed to storing assets passively.

In embodiments, a proof of burn system may be employed. Proof of burn may require destroying assets or rendering assets un-spendable, such as by sending them to an address from which they cannot be spent. Destroying or rendering assets unusable can be an expensive task within the digital math-based asset system, yet it may not have external costs such as the energy costs that can be associated with mining in a proof of work system.

Blockchains can include a consensus generating protocol through which the network determines whether a transaction is valid, included in the ledger and in what order each transaction should be included. Examples of such facilities can include mining, proof of work, proof of stake protocols, to name a few.

In embodiments, the fiat-backed digital asset may be tied to a distributed transaction ledger which may be maintained on a peer-to-peer network that includes a plurality of geographically distributed computer systems. In embodiments, the distributed transaction ledger may be public, private, semi-private, and/or semi-public, to name a few. For example, the distributed transaction ledger may be published publicly available to anyone who wants to see it. As another example, the distributed transaction ledger may not be published and, to be able to access the distributed transaction ledger, a user may send a query the peer-to-peer network.

The peer-to-peer network, in embodiments, may be: the Ethereum Network, the Libra Network, the Neo Network, the Bitcoin Network, and/or the Stellar Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g. memory of the digital asset security token issuer system). In embodiments, the digital asset security token database may be maintained and stored on the plurality of geographically distributed computer systems in the peer-to-peer network.

In embodiments, the distributed transaction ledger may include a fiat-backed digital asset database. In embodiments, the fiat-backed digital asset data base may be maintained on a sidechain. A sidechain, in embodiments, may refer to a portion of the distributed transaction ledger. For example, an administrator, user, and/or trusted entity may maintain a portion of the distributed transaction ledger and/or an electronic copy of a portion of the distributed transaction ledger. A trusted entity in embodiments, and as used herein, may refer to one or more of: a trusted entity, a digital asset exchange, a portal (e.g. MasterCard, Visa, to name a few), a digital asset exchange, an administrator, and/or a custodian, to name a few. In embodiments, a portion of the distributed transaction ledger, in the context of a Merkel Tree, may refer to one or more "leafs" of the Merkel Tree, one or more statuses of the Merkel Tree, and/or a complete Merkel Tree with one or more past transactions being "pruned." In the context of a blockchain, the portion of the distributed transaction ledger may be one or more blocks of the blockchain. The information on the sidechain may be updated periodically or aperiodically. For example, the information on the sidechain may be updated, published, and stored on the peer-to-peer network at predetermined times (e.g. twice a day, once a day, once a week, once a month, and/or once a quarter, to name a few). As another example, the information on the sidechain may be updated, published and stored on the peer-to-peer network after the execution of a transaction and/or the execution of a batch of transactions. As yet another example, the information on the sidechain may be updated, published and stored on the peer-to-peer network after the commitment of a transaction and/or the commitment of a batch of transactions. A transaction, for example, may be committed by a consensus of trusted entities of the peer-to-peer network.

In embodiments, the peer-to-peer network may utilize one or more protocols and/or programs for security purposes. For example, the peer-to-peer network may utilize a byzantine fault tolerance protocol as a consensus mechanism. As another example, the peer-to-peer network may utilize a whitelist for the execution of a transaction and/or the transfer of funds. As yet another example, the peer-to-peer network may also utilize one or more of the following: encryption, point-to-point encryption, two-factor authentication, and/or tokenization, to name a few.

Digital Asset Accounts and Transaction Security

Digital assets may be associated with a digital asset account, which may be identified by a digital asset address. A digital asset account can comprise at least one public key and at least one private key, e.g., based on a cryptographic protocol associated with the particular digital asset system, as discussed herein. One or more digital asset accounts may be accessed and/or stored using a digital wallet, and the accounts may be accessed through the wallet using the keys corresponding to the account.

Public Keys

A digital asset account identifier and/or a digital wallet identifier may comprise a public key and/or a public address. Such a digital asset account identifier may be used to identify an account in transactions, e.g., by listing the digital asset account identifier on a decentralized electronic ledger (e.g., in association with one or more digital asset transactions), by specifying the digital asset account identifier as an origin account identifier, and/or by specifying the digital asset account identifier as a destination account identifier, to name a few. The systems and methods described herein involving public keys and/or public addresses are not intended to exclude one or the other and are instead intended generally to refer to digital asset account identifiers, as may be used for other digital math-based asset(s). A public key may be a key (e.g., a sequence, such as a binary sequence or an alphanumeric sequence) that can be publicly revealed while maintaining security, as the public key alone cannot decrypt or access a corresponding account. A public address may be a version of a public key. In embodiments, a public key may be generated from a private key, e.g., using a cryptographic protocol, such as the Elliptic Curve Digital Signature Algorithm ("ECDSA").

In exemplary embodiments using bitcoin, a public key may be a 512-bit key, which may be converted to a 160-bit key using a hash, such as the SHA-256 and/or RIPEMD-160 hash algorithms. The 160-bit key may be encoded from binary to text, e.g., using Base58 encoding, to produce a public address comprising non-binary text (e.g., an alphanumeric sequence). Accordingly, in embodiments, a public address may comprise a version (e.g., a shortened yet not truncated version) of a public key, which may be derived from the public key via hashing or other encoding. In embodiments, a public address for a digital wallet may comprise human-readable strings of numbers and letters around 34 characters in length, beginning with the digit 1 or 3, as in the example of 175tWpb8K1S7NmH4Zx6rewF9WQrcZv245 W. The matching private key may be stored in a digital wallet or mobile device and protected by a password or other techniques and/or devices for providing authentication.

In embodiments, other cryptographic algorithms may be used such as: (1) The elliptic curve Diffie-Hellman (ECDH) key agreement scheme; (2) The Elliptic Curve Integrated Encryption Scheme (ECIES), also known as Elliptic Curve Augmented Encryption Scheme or simply the Elliptic Curve Encryption Scheme; (3) The Elliptic Curve Digital Signature Algorithm (ECDSA) which is based on the Digital Signature Algorithm; (4) The deformation scheme using Harrison's p-adic Manhattan metric; (5) The Edwards-curve Digital Signature Algorithm (EdDSA) which is based on Schnorr signature and uses twisted Edwards curves; (6) The ECMQV key agreement scheme which is based on the MQV key agreement scheme; and/or (7) The ECQV implicit certificate scheme, to name a few.

In other digital asset networks, other nomenclature mechanisms may be used, such as a human-readable string of numbers and letters around 34 characters in length, beginning with the letter L for Litecoin or M or N for Namecoin or around 44 characters in length, beginning with the letter P for PPCoin, to name a few.

Private Keys

A private key in the context of a digital math-based asset, such as bitcoin, may be a sequence such as a number that allows the digital math-based asset, e.g., bitcoin, to be transferred or spent. In embodiments, a private key may be kept secret to help protect against unauthorized transactions. In a digital asset system, a private key may correspond to a digital asset account, which may also have a public key or other digital asset account identifier. While the public key may be derived from the private key, the reverse may not be true.

In embodiments, related to the Bitcoin system, every Bitcoin public address has a matching private key, which can be saved in the digital wallet file of the account holder. The private key can be mathematically related to the Bitcoin public address and can be designed so that the Bitcoin public address can be calculated from the private key, but importantly, the same cannot be done in reverse.

A digital asset account, such as a multi-signature account, may require a plurality of private keys to access it. In embodiments, any number of private keys may be required. An account creator may specify the number of required keys (e.g., 2, 3, 5, to name a few) when generating a new account. More keys may be generated than are required to access and/or use an account. For example, 5 keys may be generated, and any combination of 3 of the 5 keys may be sufficient to access a digital asset account. Such an account setup can allow for additional storage and security options, such as backup keys and multi-signature transaction approval, as described herein.

Because a private key provides authorization to transfer or spend digital assets such as bitcoin, security of the private key can be important. Private keys can be stored via electronic computer files, but they may also be short enough that they can be printed or otherwise written on paper or other media. An example of a utility that allows extraction of private keys from an electronic wallet file for printing purposes is Pywallet. Other extraction utilities may also be used consistent with the present invention.

In embodiments, a private key can be made available to a program or service that allows entry or importing of private keys in order to process a transaction from an account associated with the corresponding public key. Some wallets can allow the private key to be imported without generating any transactions while other wallets or services may require that the private key be swept. When a private key is swept, a transaction is automatically broadcast so that the entire balance held by the private key is sent or transferred to another address in the wallet and/or securely controlled by the service in question.

In embodiments, using Bitcoin clients, such as BlockChain.info's My Wallet service and Bitcoin-QT, a private key may be imported without creating a sweep transaction.

In embodiments, a private key, such as for a Bitcoin account, may be a 256-bit number, which can be represented in one or more ways. For example, a private key in a hexadecimal format may be shorter than in a decimal format. For example, 256 bits in hexadecimal is 32 bytes, or 64 characters in the range 0-9 or A-F. The following is an example of a hexadecimal private key:

E9 87 3D 79 C6 D8 7D C0 FB 6A 57 78 63 33 89 F4 45 32 13 30 3D A6 1F 20 BD 67 FC 23 3A A3 32 62

In embodiments, nearly every 256-bit number is a valid private key. Specifically, any 256-bit number between 0x1 and 0xFFFF FFFF FFFF FFFF FFFF FFFF FFFF FFFE BAAE DCE6 AF48 A03B BFD2 5E8C D036 4141 is a valid private key. In embodiments, the range of valid private keys can be governed by the secp256k1 ECDSA standard used by Bitcoin. Other standards may also be used.

In embodiments, a shorter form of a private key may be used, such as a base 58 Wallet Import format, which may be derived from the private key using Base58 and/or Base58Check encoding. The Wallet Import format may be shorter than the original private key and can include built-in error checking codes so that typographical errors can be automatically detected and/or corrected. For private keys associated with uncompressed public keys, the private key may be 51 characters and may start with the number 5. For example, such a private key may be in the following format:

5Kb8kLf9zgWQnogidDA76MzPL6TsZZY36h-WXMssSzNydYXYB9KF

In embodiments, private keys associated with compressed public keys may be 52 characters and start with a capital L or K.

In embodiments, when a private key is imported, each private key may always correspond to exactly one Bitcoin public address. In embodiments, a utility that performs the conversion can display the matching Bitcoin public address.

The Bitcoin public address corresponding to the sample above is:

1CC3X2gu58d6wXUWMffpuzN9JAfTUWu4Kj

In embodiments, a mini private key format can be used. Not every private key or Bitcoin public address has a corresponding mini private key; they have to be generated a certain way in order to ensure a mini private key exists for an address. The mini private key is used for applications where space is critical, such as in QR codes and in physical bitcoin. The above example has a mini key, which is:

SzavMBLoXU6kDrgtUVmffv

In embodiments, any bitcoin sent to the designated address 1CC3X2gu58d6wXUWMffpuzN9JAfTUWu4Kj can be transferred or spent by anybody who knows the private key in any of the three formats (e.g., hexadecimal, base 58 wallet format, or mini private key). That includes bitcoin presently at the address, as well as any bitcoin that are ever sent to it in the future. The private key is only needed to transfer or spend the balance, not necessarily to see it. In embodiments, the bitcoin balance of the address can be determined by anybody with the public Block Explorer at http://www.blockexplorer.com/address/1CC3X2gu58d6wXUWMffpuzN9JAfTUWu4Kj—even if without access to the private key.

In embodiments, a private key may be divided into segments, encrypted, printed, and/or stored in other formats and/or other media, as discussed herein.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital crypto-currency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

In embodiments, a digital wallet may be a custodial digital wallet. Further, the custodial digital wallet may be a segregated custodial wallet or a commingled custodial wallet. Segregated custodial digital wallets hold digital assets for the benefit of a single customer or entity. Commingled custodial accounts hold digital assets for multiple users or customers of the custodian. Segregated custodial wallets are useful for institutional clients, mutual funds and hedge funds, for example.

While many digital asset holders may hold their digital assets in their own wallets, various custodial services, like Gemini custodial services exist. In embodiments, the present invention may be used with custodial wallets. In embodiments, custodial wallets may be commingled custodial wallets which commingle digital assets from more than one client. In embodiments, custodial wallets may be segregated custodial wallets, in which digital assets for a specific client is held using one or more unique digital asset addresses maintained by the custodial service. For segregated custodial wallets, the amount of digital assets held in such wallet(s) may be verified and audited on their respective blockchain. In embodiments, segregated custodial accounts may be used for digital asset holders such as hedge funds, mutual funds, exchange traded funds, to name a few. Proof of control as described herein may be implemented to verify the amount of assets held in custodial wallets, including both segregated custodial wallets and commingled custodial wallets.

Signatures

A transaction may require, as a precondition to execution, a digital asset signature generated using a private key and associated public key for the digital asset account making the transfer. In embodiments, each transaction can be signed by a digital wallet or other storage mechanism of a user sending a transaction by utilizing a private key associated with such a digital wallet. The signature may provide authorization for the transaction to proceed, e.g., authorization to broadcast the transaction to a digital asset network and/or authorization for other users in a digital asset network to accept the transaction. A signature can be a number that proves that a signing operation took place. A signature can be mathematically generated from a hash of something to be signed, plus a private key. The signature itself can be two numbers such as r and s. With the public key, a mathematical algorithm can be used on the signature to determine that it was originally produced from the hash and the private key, without needing to know the private key. Signatures can be either 73, 72, or 71 bytes long, to name a few.

In embodiments, the ECDSA cryptographic algorithm may be used to ensure that digital asset transactions (e.g., bitcoin transactions) can only be initiated from the digital wallet holding the digital assets (e.g., bitcoin). Alternatively, or in addition, other algorithms may be employed.

In embodiments, a transaction from a multi-signature account may require digital asset signatures from a plurality of private keys, which may correspond to the same public key and/or public address identifying the multi-signature digital asset account. As described herein, a greater number of private keys may be created than is necessary to sign a transaction (e.g., 5 private keys created and only 3 required to sign a transaction). In embodiments, private keys for a multi-signature account may be distributed to a plurality of users who are required to authorize a transaction together. In embodiments, private keys for a multi-signature account may be stored as backups, e.g., in secure storage, which may be difficult to access, and may be used in the event that more readily obtainable keys are lost. As noted above, there are a variety of cryptographic algorithms that may be used.

Market Places

A digital asset market place, such as a Bitcoin market place, can comprise various participants, including users, vendors, exchanges, exchange agents, and/or miners/mining pools. The market contains a number of digital asset exchanges, which facilitate trade of digital assets using other currencies, such as United States dollars. Exchanges may allow market participants to buy and sell digital assets, essentially converting between digital assets (e.g., bitcoin) and currency, legal tender, and/or traditional money (e.g., cash). In embodiments, a digital asset exchange market can include a global exchange market for the trading of digital assets, which may contain transactions on electronic exchange markets. In embodiments, a digital asset exchange market can also include regional exchange markets for the trading of digital assets, which may contain transactions on electronic exchange markets. In accordance with the present invention, exchanges and/or transmitters may also be used to facilitate other transactions involving digital assets, such as where digital assets are being transferred from differently denominated accounts or where the amount to transfer is specified in a different denomination than the digital asset being transferred, to name a few. Gemini Trust Company LLC ("Gemini") at (www.gemini.com) is an example of a digital asset exchange 130. By example, registered users of Gemini may buy and sell digital assets such as Bitcoin and Ether in exchange for fiat such as U.S. dollars or other digital assets, such as Ether and Bitcoin, respectively. A Bitcoin exchange agent 135 can be a service that acts as an agent for exchanges, accelerating the buying and selling of bitcoin as well as the transfer of funds to be used in the buying and/or selling of bitcoin. Coinbase is an example of a company that performs the role of a Bitcoin exchange agent 135. Coinbase engages in the retail sale of bitcoin, which it obtains, at least in part, from one or more exchanges. FIG. 3 illustrates an exemplary Coinbase website interface for buying bitcoin. Other Coinbase options include "Sell Bitcoin," "Send Money," "Request Money," and "Recurring Payments." Other options could also be made available consistent with exemplary embodiments of the present invention.

In addition to the services that facilitate digital asset transactions and exchanges with cash, digital asset transactions can occur directly between two users. In exemplary uses, one user may provide payment of a certain number of digital assets to another user. Such a transfer may occur by using digital wallets and designating the public key of the wallet to which funds are being transferred. As a result of the capability, digital assets may form the basis of business and other transactions. Digital math-based asset transactions may occur on a global scale without the added costs, complexities, time and/or other limits associated with using one or more different currencies.

Vendors 140 may accept digital assets as payment. A vendor 140 may be a seller with a digital wallet that can hold the digital asset. In embodiments, a vendor may use a custodial wallet. In embodiments, a vendor 140 may be a larger institution with an infrastructure arranged to accept and/or transact in digital assets. Various vendors 140 can offer banknotes and coins denominated in bitcoin; what is sold is really a Bitcoin private key as part of the coin or banknote. Usually, a seal has to be broken to access the Bitcoin private key, while the receiving address remains visible on the outside so that the bitcoin balance can be verified. In embodiments, a debit card can be tied to a Bitcoin wallet to process transactions.

Digital Asset Exchange

In embodiments, one form of trusted entity that may be an issuer of tokens or an agent of the issuer is a digital asset exchange or bank. In embodiments, the trusted entity may maintain a token database on a blockchain. In embodiments, the trusted entity may maintain the token database off chain as a sidechain which may be periodically or aperiodically published to a blockchain as discussed elsewhere.

In some embodiments, the trusted entity may be a digital asset exchange. A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

In embodiments, the issuer of the token may be a digital asset exchange, a bank, a trust, or other trusted entity. In the context where a digital asset exchange may act as an issuer for token, or as an agent of the issuer, a digital asset exchange computer system may maintain a ledger as one or more databases associated with the token. Such a database may include an electronic log of all transactions, including the source wallet, the destination wallet, the timestamp of the transaction, the amount of the transaction (e.g., the number of tokens), and/or the balance in each wallet before and/or after the transaction. In embodiments, the database may include a list of wallet addresses and balances in each wallet of the token. In embodiments, the issuer may maintain the database by using a smart contract in association with a Contract Digital Address as part of a blockchain network, such as the Ethereum Network. In embodiments, the ledger may be maintained in a database as a sidechain which is periodically, or aperiodically, published to a blockchain such as the Ethereum blockchain. In embodiments, the ledger may be maintained directly on the blockchain.

Figure 26:
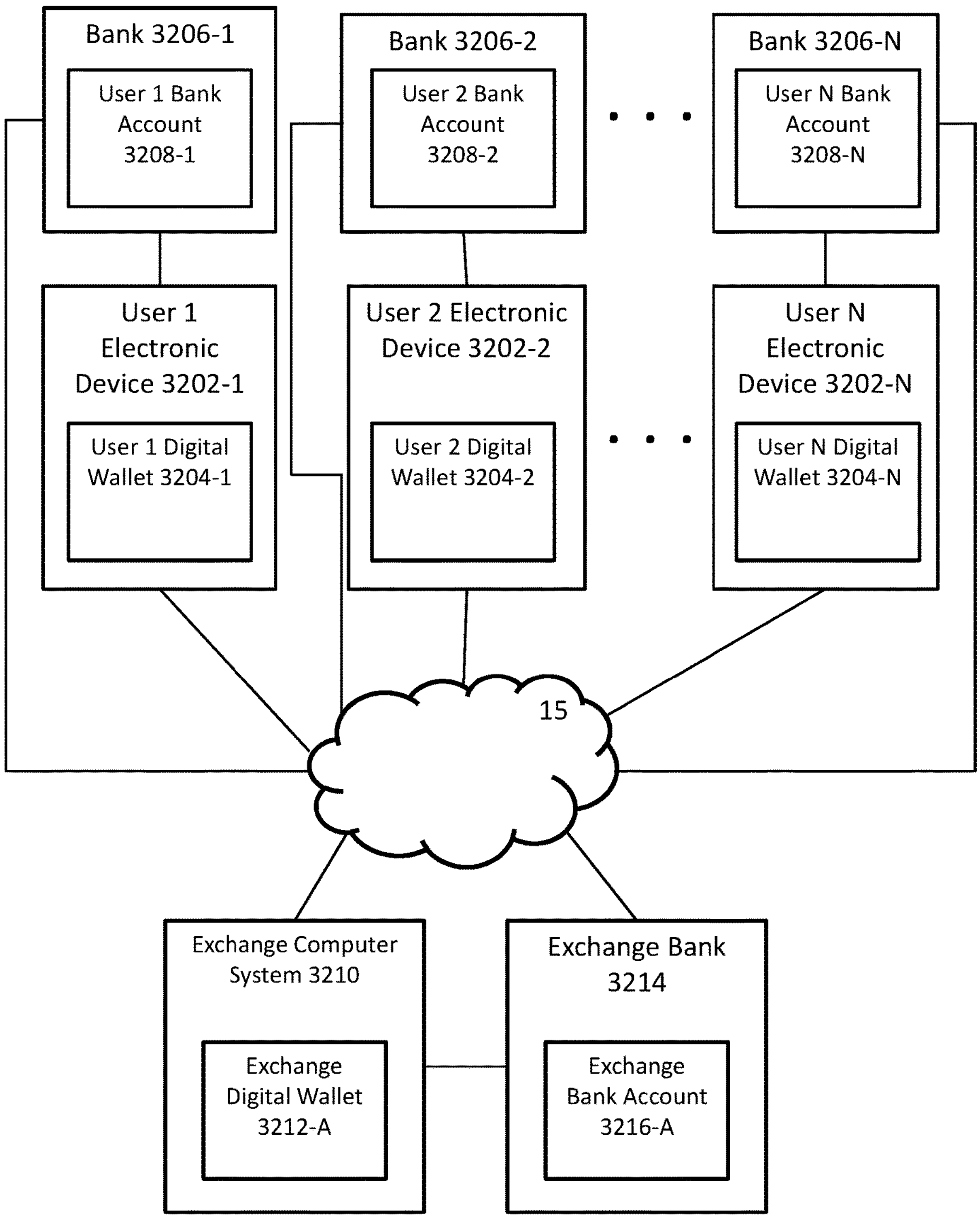
FIG. 26 is an exemplary exchange agent interface in accordance with exemplary embodiments of the present invention.

FIG. 26 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., U.S. Dollars, Euros, Yen, to name a few) in exchange for digital assets (e.g., bitcoin, ether, litecoin, dogecoin, to name a few). Digital asset sellers may exchange digital assets (e.g., bitcoin, ether, litecoin, dogecoin, to name a few) for fiat (e.g., U.S. Dollars, Euro, Yen, to name a few). In embodiments, instead of fiat, other forms of digital assets may also be used.

In embodiments, users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204. In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, or digital asset address associated with a digital wallet, or electronic account. In embodiments, a digital wallet may be stored on a user electronic device, such as a mobile electronic device, or other computing device.

Users may also have user bank accounts 3208 held at one or more banks 3206. In embodiments, users may be able to access their bank accounts from a user electronic device 3202 and/or from a digital wallet 3204 or digital address associated therewith.

A digital asset exchange computer system 3210 can include software running on one or more processors, as discussed herein, as well as computer-readable memory comprising one or more database. A digital asset exchange can include one or more exchange digital wallets 3212, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third party. Upon receipt by the appropriate recipient of the requisite amount of digital assets, the exchange may authorize the release of the fiat currency to the digital asset seller. In embodiments, an exchange may hold, e.g., as custodian, fiat in bank accounts and digital assets in digital wallets at associated digital asset addresses. In embodiments, instead of using bank accounts, other stable investment instruments such as money market mutual funds, treasury bills, certificates of deposits, low risk bonds, to name a few, may be used.

Figure 27A:
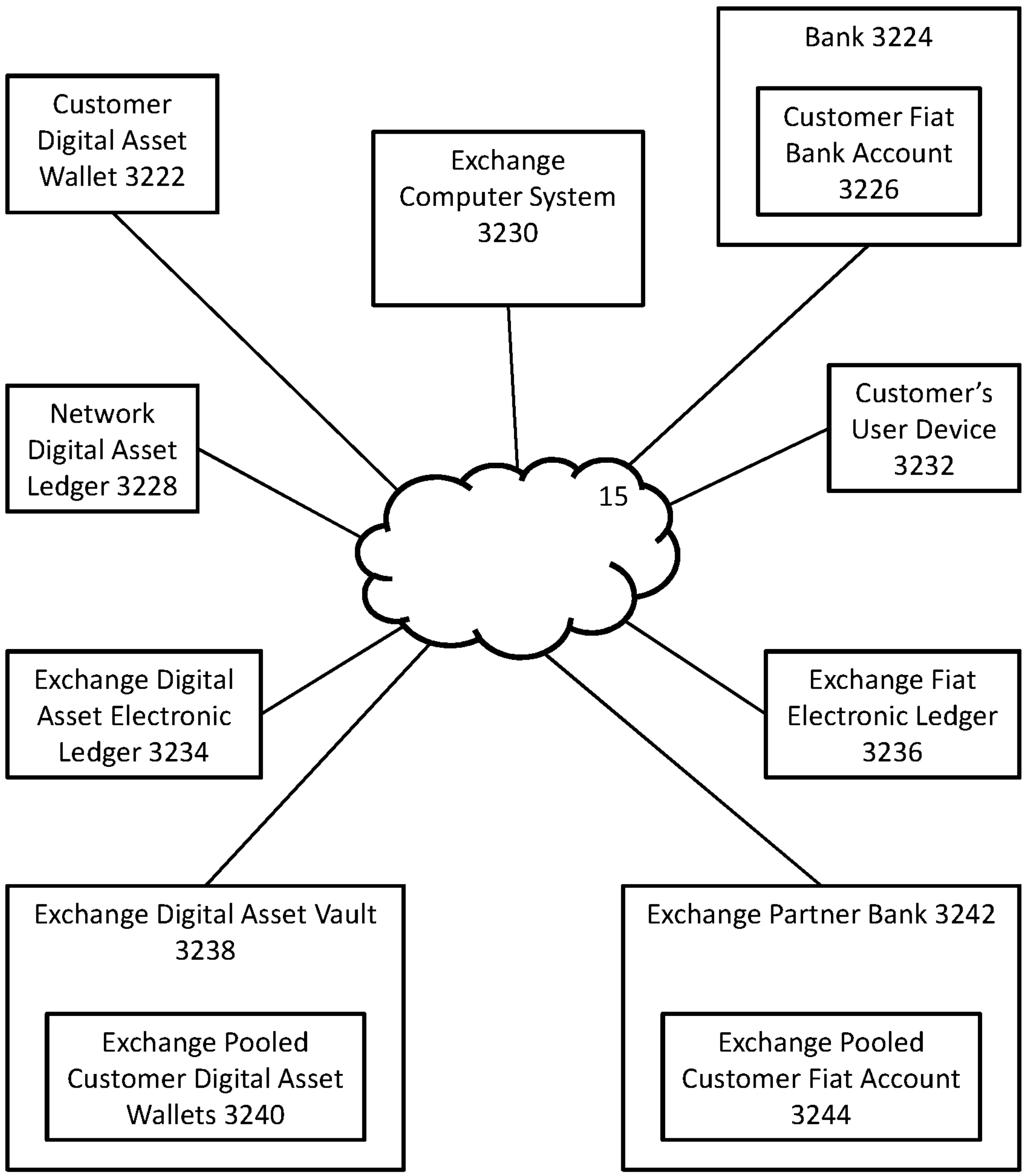
FIGS. 27A-B are schematic diagrams illustrating participants in a digital asset exchange in accordance with exemplary embodiments of the present invention.

FIG. 27A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets at associated digital asset addresses 3222 (e.g., bitcoin wallets), customer banks 3224 having customer fiat bank accounts 3226, a digital asset network ledger 3228 (e.g., the Bitcoin blockchain), a digital asset network (e.g., the Bitcoin network), one or more exchange customers using one or more customer user device 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240 with associated digital asset addresses. In embodiments, the exchange may have a single partner bank 3242 with a pooled exchange customer fiat account 3244. Such an account may be associated with insurance protection.

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin or ether) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known. Accordingly, the exchange may require new exchange customers to provide valid (e.g., complying with certain types, such as a driver's license or passport, or complying with certain characteristics) photo identification, a current address, a current bill, such as a utility bill, biometric information (e.g., a fingerprint or hand scan), and/or bank account information. A user on-boarding module can include back-end computer processes to verify and store user data as well as a front-end user interface by which a user can provide information to the exchange, select options, and/or receive information (e.g., through a display). The user on-boarding module can provide the front-end interface to one or more user devices and/or platforms, such as a computer, mobile phone (e.g., running an exchange-related mobile application), and/or digital asset kiosk, to name a few.

Figure 27B:
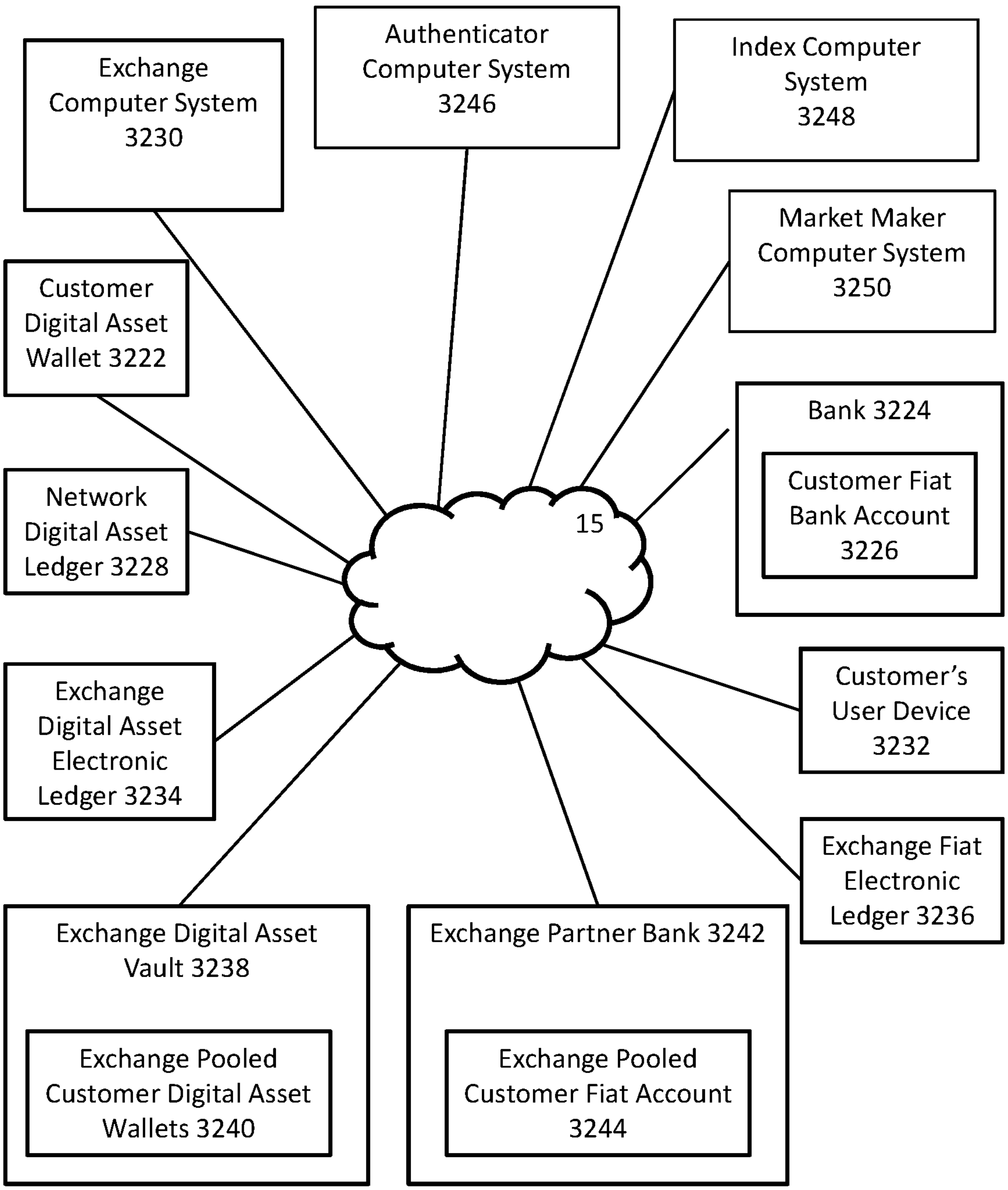

FIG. 27B shows another schematic diagram illustrating entities associated with a digital asset exchange in an exemplary embodiment of the present invention. In addition to the participants described with respect to FIG. 27A, a digital asset exchange may communicate with an authenticator computer system 3246 (to authenticate users, e.g., using multi-factor authentication and/or comparisons to databases of flagged users, to name a few), an index computer system 3248 (e.g., for generating and/or providing a digital asset index, which may be a price index), and/or a market maker computer system 3250. A market maker may be an exchange user that provides liquidity for the exchange, by purchasing or selling digital assets.

In embodiments, an exchange computer system may calculate different fees for a market maker. The fee calculation may vary with market conditions, such as price, digital asset supply (e.g., sell orders), and digital asset demand (e.g., buy orders). In embodiments, transaction fees charged by an exchange may be different for purchase and sale transactions. Fees may be based upon a user's identity, a user's transaction history, the quantity of digital assets and/or fiat currency associated with a user account, a rate schedule associated with a particular account or account type (e.g., there could be different rates for institutional or foreign users), time of day, and/or whether the user is operating as a market maker or a market taker for a given transaction, to name a few.

Figure 28A:
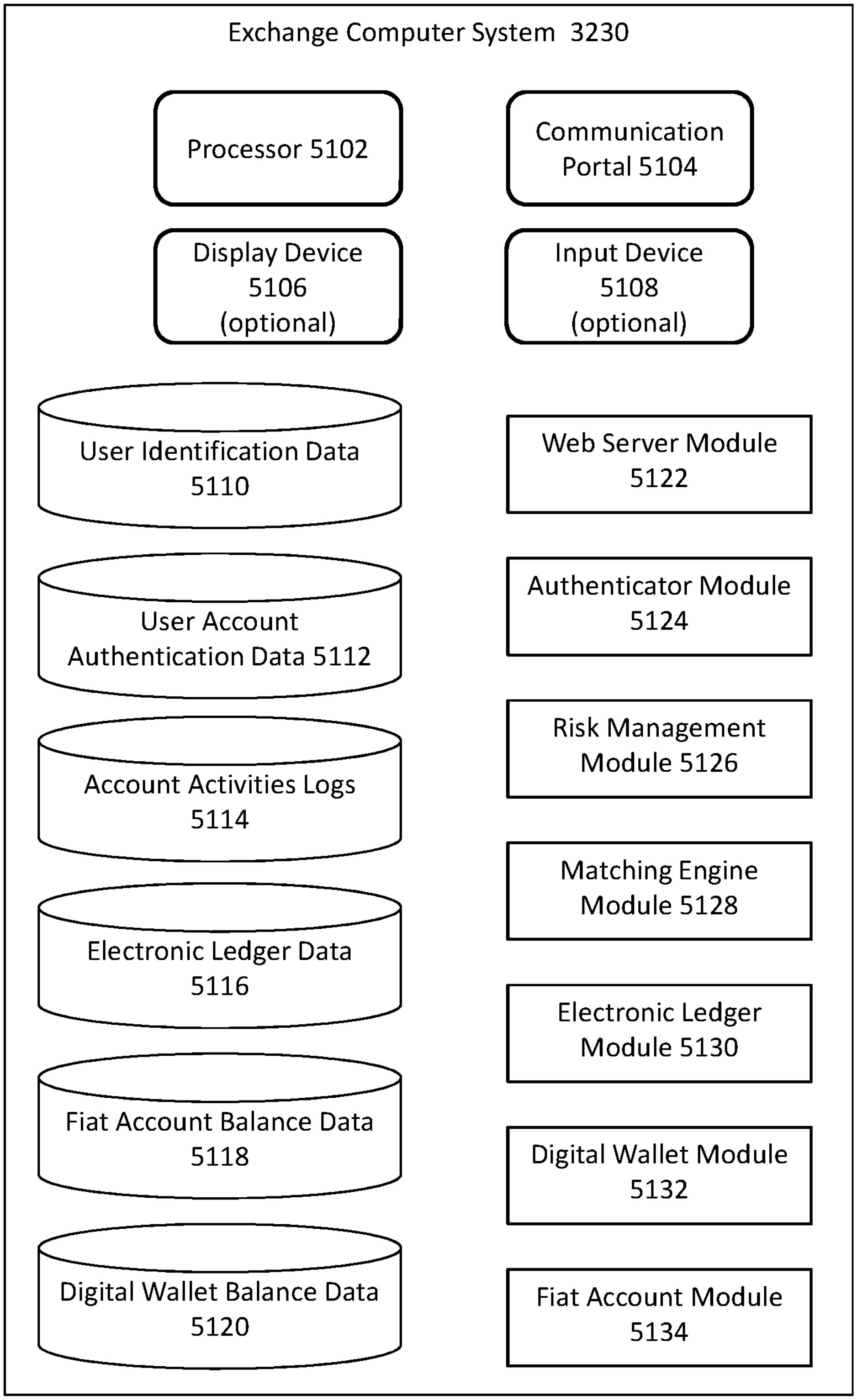
FIGS. 28A-B are schematic diagrams of exemplary exchange computer systems in accordance with exemplary embodiments of the present invention.
Figure 28B:
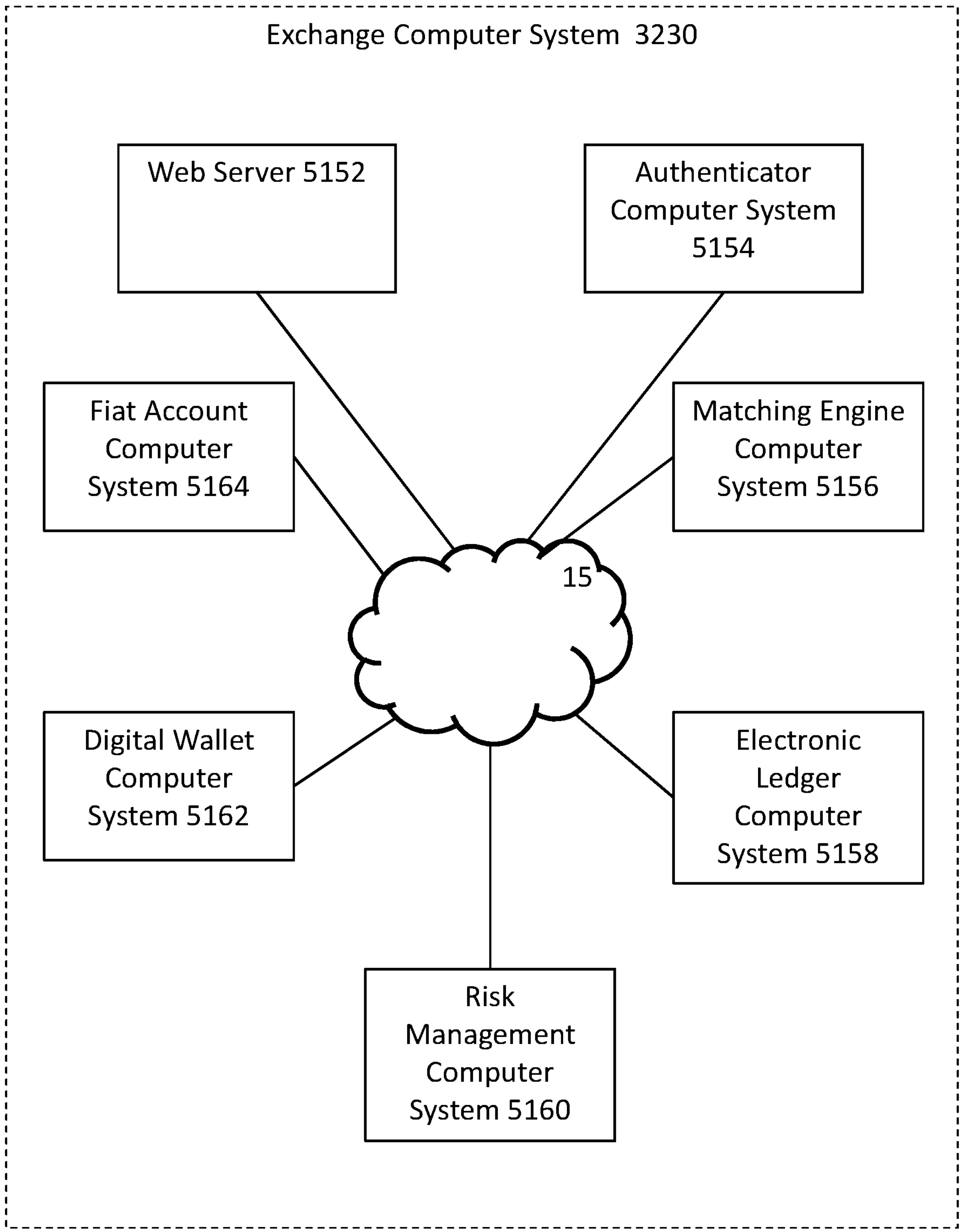

FIGS. 28A-B are schematic diagrams of exemplary exchange computer systems in accordance with exemplary embodiments of the present invention. FIG. 28A shows hardware, data, and software modules, which may run on one or more computers. FIG. 28B shows an exemplary distributed architecture for the exchange computer system.

As shown in FIG. 28A, an exchange computer system 3230 can include one or more processors 5102, a communication portal 5104 (e.g., for sending and/or receiving data), a display device 5106, and/or an input device 5108. The exchange computer system 3230 can also include non-transitory computer-readable memory with one or more database and data stored thereon. Data can include user identification data 5110 (e.g. know your customer data obtained during the user onboarding process), user account authentication data 5112 (e.g., login credentials, multi-factor authentication data, and/or anti-money laundering verifications), account activities logs 5114, electronic ledger data 5116, fiat account balance data 5118, and/or digital wallet balance data 5120. One or more software modules may be stored in the memory and running or configured to run on the one or more processors. Such modules can include a web server module 5122, authenticator module 5124, risk management module 5126, matching engine module 5128, electronic ledger module 5130, digital wallet module 5132, and/or fiat account module 5134. The processes performed by such modules, the data produced thereby and/or the data accessed thereby are described herein.

Account activities log 5114 may track all user requests received by the exchange computer system. The computer system may generate usage statistics and/or analyze user activity for patterns, e.g., to detect fraudulent behavior.

In embodiments, the risk management module 5126 may analyze user activity logs (e.g., access logs, transaction logs, user electronic requests, website navigation logs, mobile application usage logs, to name a few) to identify behavioral patterns, anomalies, and/or potentially fraudulent activity (such as fraudulent electronic requests).

In embodiments, an exchange may conduct user or account verification procedures. In embodiments, these user or account verification procedures may comprise participating with third-party vendors in connection with certain Know Your Customer services. In embodiments, an exchange may implement alternative anti-money laundering (AML) measures. In embodiments, AML measures may include monitoring each transaction on the digital asset exchange for particular factors (e.g., amounts of transaction, location of transaction, volume of activity, to name a few). In the United States, the exchange may provide a user on-boarding mechanism that receives a user registration request, receives a user domicile (e.g., a state of domicile), and/or directs the user to an anti-money laundering user interface based upon the domicile. In embodiments, this interface may be generated at a user device using display data transmitted from the exchange computer system.

A matching engine 5128 may apply a continuous order book price time priority matching algorithm. In embodiments, the matching engine may apply option points at low and/or high frequencies.

As shown in FIG. 28B an exchange computer system can include a web server 5152, an authenticator computer system 5154, a matching engine computer system 5156, an electronic ledger computer system 5158, a risk management computer system 5160, a digital wallet computer system 5162, and/or a fiat account computer system 5164. The exchange computer system 3230 may communicate with one or more external computer systems, such as bank computer systems, index computer systems, user computer system (e.g., institutional or individual users), and/or user electronic devices. Each computer system may comprise one or more computers and/or one or more processors, a communication portal, display devices, and/or input devices, to name a few.

A web server 5152 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination.

An authenticator computer system 5154 may perform authentication of user login credentials, multi-factor authentication, and/or compare users against databases, such as government databases, for compliance with anti-money laundering laws and/or regulations.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets with associated digital asset addresses, generate instructions for digital wallet key storage and/or retrieval, allocate digital assets among digital wallets, track digital assets, store digital asset, and/or transfer digital assets, to name a few.

The digital wallets may include both hot wallets and cold wallets. In embodiments, sufficient digital assets will be stored in one or more hot wallets to allow for liquidity. The amount of digital assets stored in the one or more hot wallets may be determined based on historical averages of trading on the exchange. In embodiments, remaining digital assets will preferably be held in cold wallets. A more detailed discussion of hot wallets and cold wallets is presented in U.S. Pat. No. 9,892,460, issued Feb. 13, 2018 and entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein by reference.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few. Accordingly, the fiat account computer system may communicate with one or more external systems, such as a bank computer system. In embodiments, the fiat account computer system may process withdrawals. In embodiments, the omnibus or pooled accounts for holding fiat are maintained in a bank or other institution such that these accounts are eligible for insurance under the Federal Deposit Insurance Corporation (FDIC). In order to qualify for FDIC insurance, an account must typically be associated with specific user identification information, e.g., a user name, address and social security number, by way of example, to name a few. Accordingly, in embodiments, fiat accounts may be associated with individuals who are positively identified.

FIGS. 29-1, 29-2, and 29-3 are exemplary flow charts for processes for digital asset exchange account creation and account funding in accordance with exemplary embodiments of the present invention. The processes may be performed by an exchange computer system, which may comprise one or more computers. In embodiments, any steps in the processes may be performed by third-party computer systems, which may be operatively connected to the exchange computer system, e.g., through the Internet. The processes may be performed in conjunction with a user interface, such as a website or mobile application on a smart phone, which can receive user inputs and/or display content to the user. In a step S4702, an exchange computer system may receive an electronic request for a new exchange account. Upon receiving such a request, the exchange computer system may perform account creation, identity verification, fiat account funding, and/or digital asset account funding processes.

Referring to the account creation process shown in FIGS. 29-1, 29-2, and 29-3, in a step S4704 the exchange computer system may receive account options and/or account information. Account options can include an account type (e.g., individual, business, investor, to name a few), which may correspond to different features, fees, limits, and/or services, such as the ability to transact once a day or multiple times a day, the ability to withdraw funds immediately or once a day, and/or access to a trading API, to name a few. Account information can include a username, password, contact information, actual name of user, location or domicile of user, to name a few. In a step S4706 the exchange computer system may configure customer authentication settings, which may involve setting up two-factor authentication for the user on one or more user devices.

Referring to the identity verification process shown in FIGS. 29-1, 29-2, and 29-3, in a step S4710 the exchange computer system may receive proof of identity information, which can include a scan of a government-issued identification document (e.g., a driver's license, a passport, a social security card), a copy of a utility bill, a photograph, biometric information (e.g., a fingerprint, palm scan, eye scan, to name a few), and/or identifying information such as a social security number or other government issued identification number, to name a few. In a step S4712 the exchange computer system may analyze the identity information, which may include verifying the information against one or more databases of identity information. Analyzing identity information may comprise verifying the accuracy of the information and/or determining eligibility for participation in the exchange (e.g., based on domicile and/or minimum age, to name a few). In a step S4714 the exchange computer system may provide to a user device a notification of approval, a notification of rejection, or a notification that additional information is required.

Referring to the fiat account funding process shown in FIGS. 29-1, 29-2, and 29-3, in a step S4720 the exchange computer system may receive fiat funding account information. Such information can include a bank account number (e.g., a routing number), a bank name, an account type, and/or an account holder's name, to name a few. In a step S4722, the exchange computer system may perform one or more validation transactions using the fiat funding account. Such transaction may comprise small deposits into the fiat funding account. In a step S4724, the exchange computer system may receive validation transaction information, which may include a transaction amount, date, and/or time. In a step S4726, the exchange computer system may electronically authorize use of the fiat funding account and/or request a funding transfer. Accordingly, the exchange computer system may provide an electronic notification, e.g., via email, via a website, and/or via a mobile phone application (e.g., via a push notification), to name a few, that the fiat funding account is authorized for use with the exchange. A customer may electronically initiate a transaction, e.g., through an exchange-provided user interface or user electronic device operatively connected to the exchange, to transfer funds to the exchange. In a step S4728, the exchange computer system may receive an electronic notification indicating that funds were received, e.g., in an exchange bank account at a partner bank, from the customer fiat funding account. In a step S4730, the exchange computer system can update an exchange customer account with the received funds. Updating an exchange customer account can comprise electronically updating a fiat electronic ledger stored one or more computer readable media operatively connected to the exchange computer system to reflect the received funds and/or updating a display of the amount of funds in the account or a data ledger on a user computer device or on a printed and/or digitally transmitted receipt provided to the user and/or a user device.

Referring to the digital asset account funding process shown in FIGS. 29-1, 29-2, and 29-3, in a step S4734, the exchange computer system can receive an initial transfer of digital assets. In a step S4736, the exchange computer system can receive a confirmation of clearance of the digital asset transfer. In a step S4738, the exchange computer system can update an exchange customer account with the received digital assets. Updating an exchange customer account can include making an electronic entry in an exchange digital asset electronic ledger and/or providing a notification that the digital assets are received.

Figure 30A:
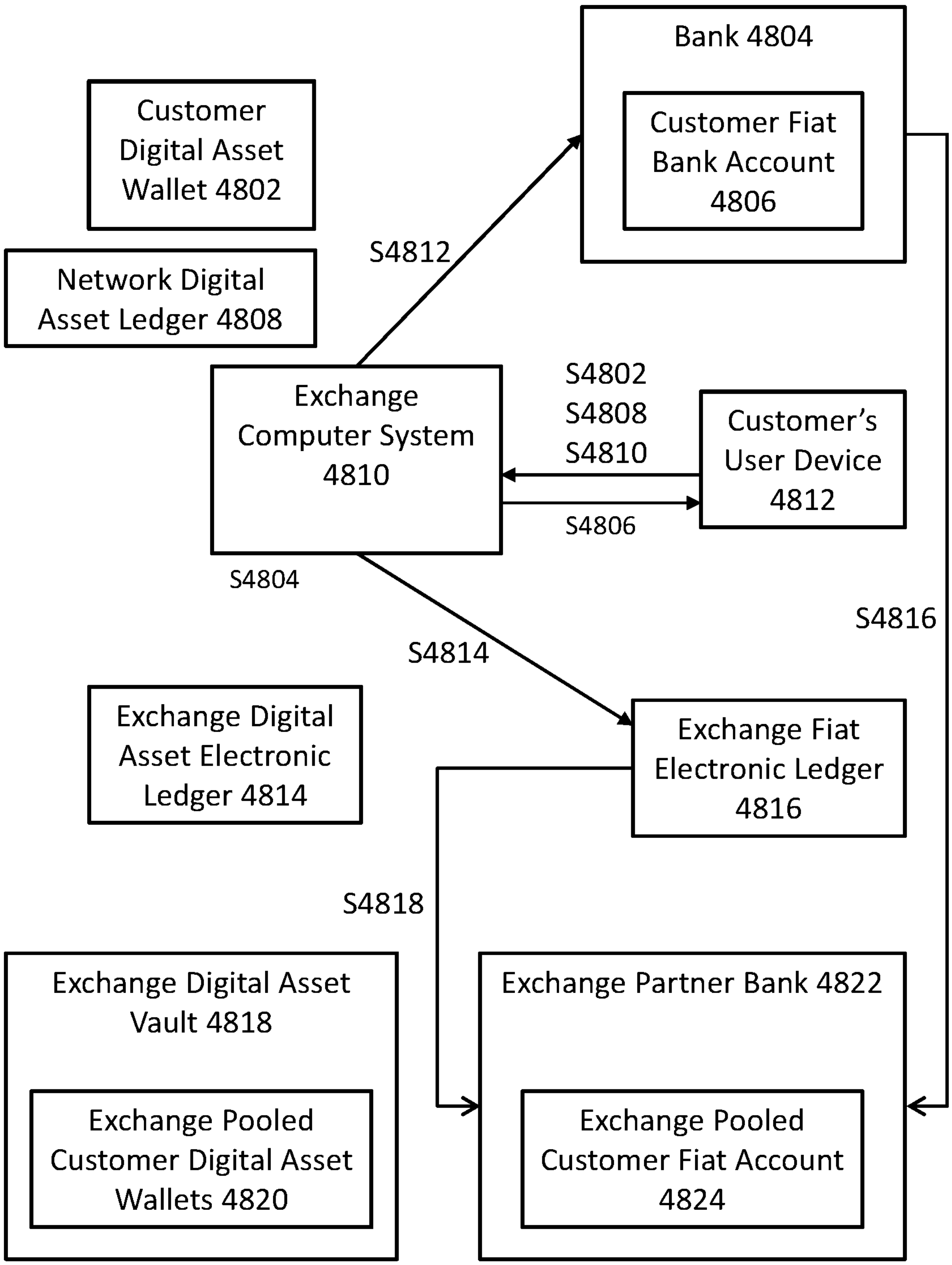
FIGS. 30A-B are an exemplary schematic diagram and corresponding flow chart of a process for digital asset exchange customer account fiat funding via an exchange-initiated request in accordance with exemplary embodiments of the present invention.
Figure 30B:
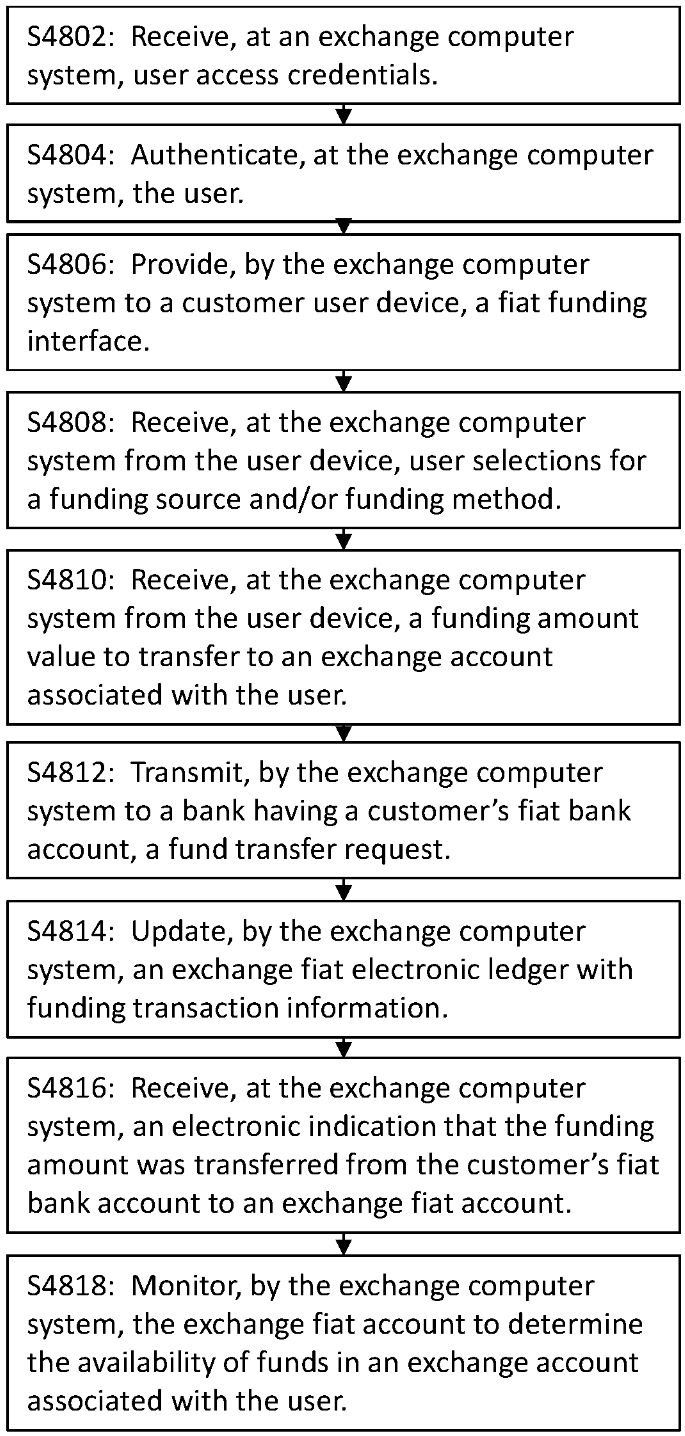

FIG. 30A is an exemplary schematic diagram of an exchange, and FIG. 30B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820 with associated digital asset addresses. Any of these entities or components may communicate directly and/or indirectly, e.g., through a data network, such as the Internet. In embodiments, encryption and/or other security protocols may be used. These entities and components are further described with respect to FIG. 27A.

Referring to FIG. 30B, in a step S4802 the exchange computer system can receive, e.g., from a user device, user access credentials. In a step S4804, the exchange computer system can authenticate the user, such as by verifying the received access credentials. In a step S4806, the exchange computer system may provide to a customer user device a fiat funding interface. In a step S4808, the exchange computer system may receive from the user device user selections for a funding source and/or funding method. The funding source may identify a bank account or other fiat account. The funding method may identify ACH transfer or wire transfer, to name a few. In a step S4810, the exchange computer system can receive from the user device a funding amount value to transfer to an exchange account associated with the user. In embodiments, S4808 and S4810 may be a single step. Accordingly, the exchange computer system may receive from a user electronic device a user electronic request comprising a funding amount and a funding method, wherein the funding method is an ACH transfer and the request further identifies a verified user bank account.

In a step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In a step S4814, the exchange computer system can update an exchange fiat electronic ledger with the funding transaction information. In a step S4816, the exchange computer system can receive an electronic indication that the funding amount was transferred from the customer's fiat bank account to an exchange fiat account, e.g., at a partner bank. In a step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

Figure 30C:
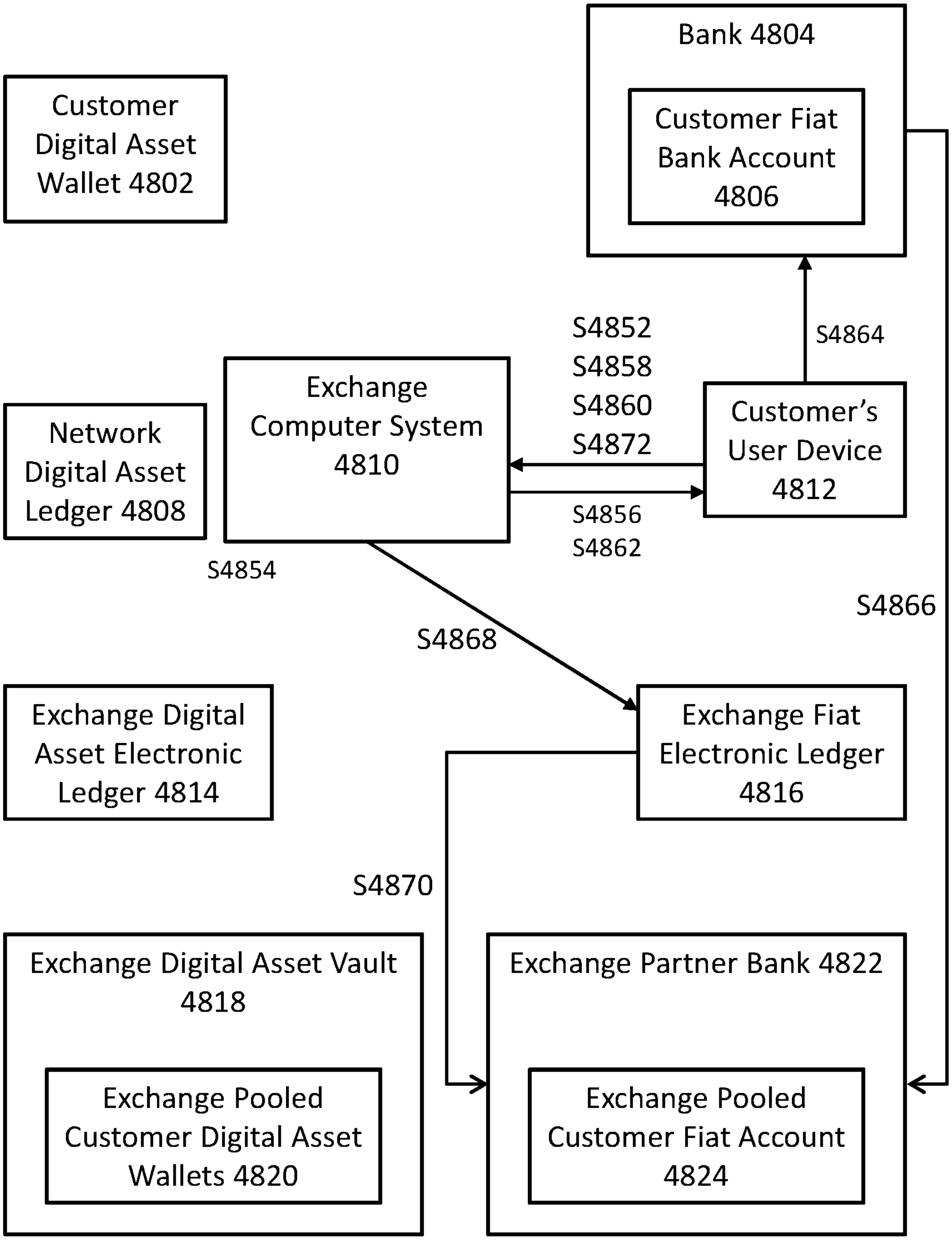
FIGS. 30C-E are an exemplary schematic diagram and corresponding flow chart of a process for digital asset exchange customer account fiat funding via a customer-initiated request in accordance with exemplary embodiments of the present invention.
Figure 30D:
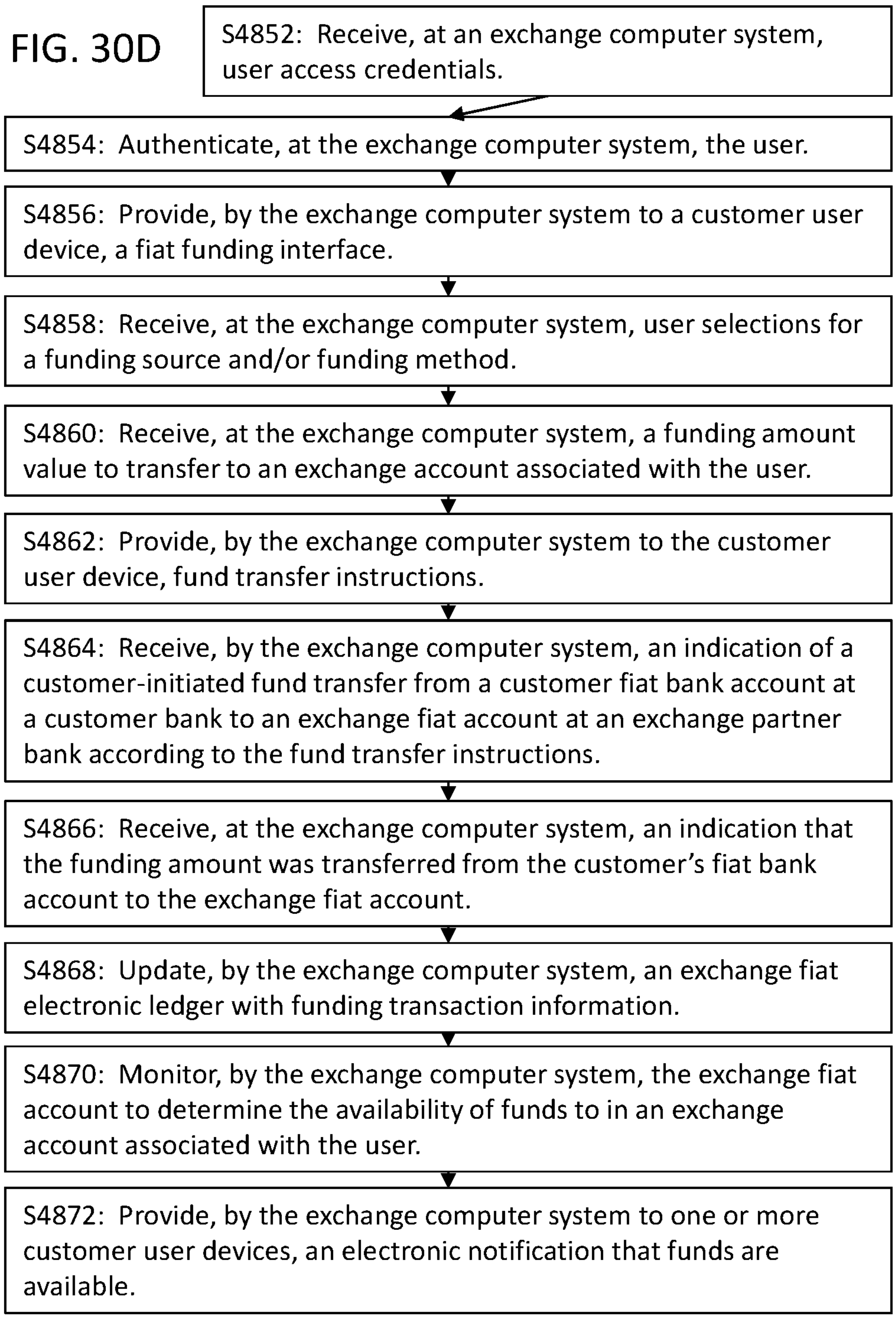

FIG. 30C is an exemplary schematic diagram of an exchange, and FIG. 30D is a corresponding flow chart of a process for digital asset exchange customer account fiat funding via a customer-initiated request, such as a wire transfer, in accordance with exemplary embodiments of the present invention. The components and entities associated with an exchange that are shown in FIG. 30C are described with respect to FIG. 27A.

FIG. 30D is a flow chart showing an exemplary process for digital asset exchange customer account fiat funding. In a step S4852, an exchange computer system can receive user access credentials. In a step S4854, the exchange computer system can authenticate the user by verifying the received access credentials. Verifying the access credentials can comprise comparing the credentials to a secure credentials database. In a step S4856, the exchange computer system can provide to a customer user device a fiat funding interface. In a step S4858, the exchange computer system can receive from the customer user device, user selections for a funding source and/or funding method. The funding method may be a customer-initiated method, such as a wire transfer. In a step S4860, the exchange computer system can receive a funding amount value to transfer to an exchange account associated with the user. In a step S4862, the exchange computer system can provide to the customer user device fund transfer instruction, e.g., wire instructions. In a step S4864, the exchange computer system may receive an electronic indication of a customer-initiated fund transfer from a customer fiat bank account a customer bank to an exchange fiat account at an exchange partner bank according to the fund transfer instructions. In embodiments, step S4864 may be skipped. In a step S4866, the exchange computer system may receive an indication that the funding amount was transferred from the customer's fiat bank account to the exchange fiat account. In a step S4868, the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872, the exchange computer system can provide an electronic notification to one or more customer user devices that funds are available for use on the exchange.

Figure 30E:
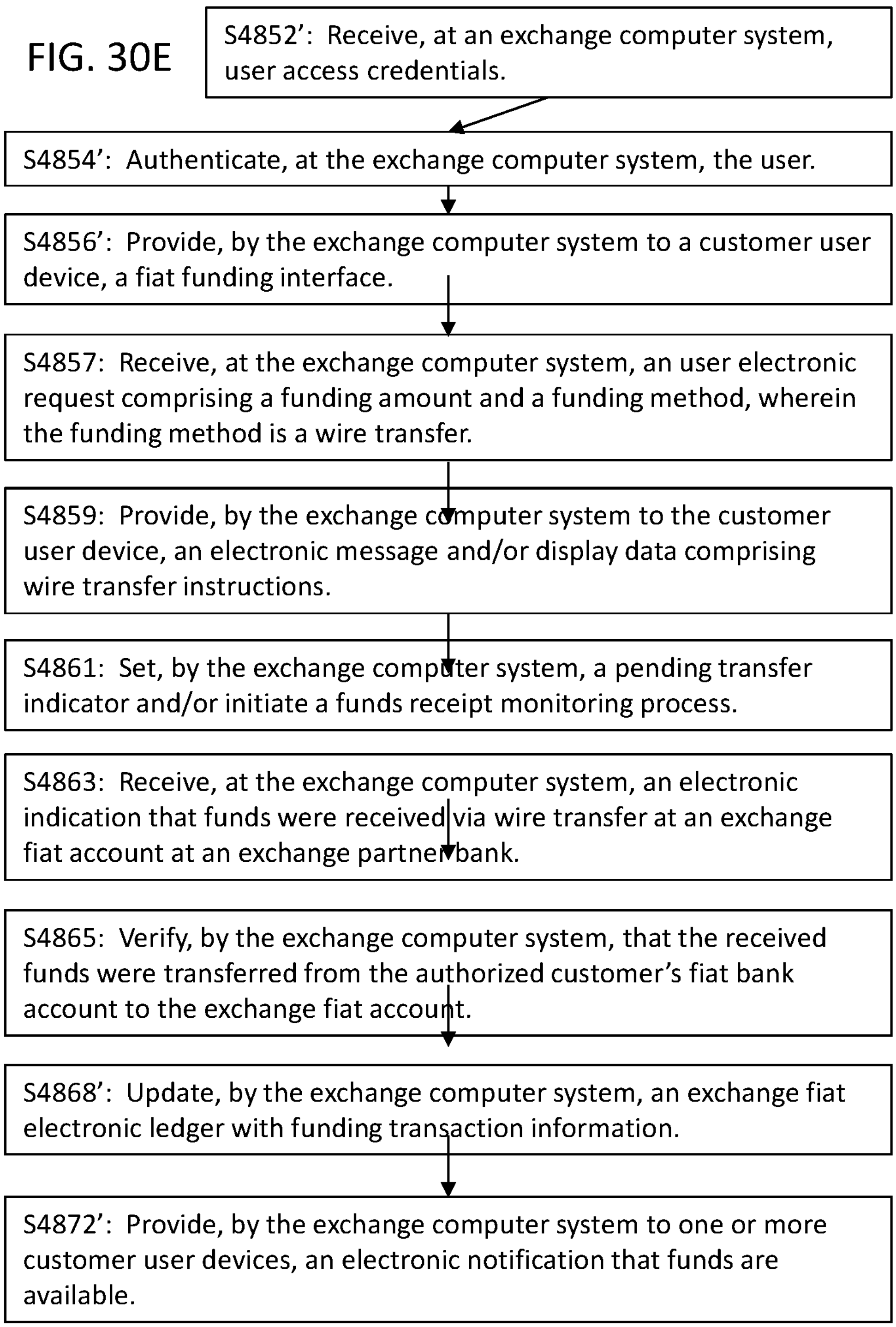

FIG. 30E is a flow chart showing another exemplary process for digital asset exchange customer account fiat funding. In a step S4852', an exchange computer system can receive user access credentials. In a step S4854', the exchange computer system can authenticate the user by verifying the received access credentials. Verifying the access credentials can comprise comparing the credentials to a secure credentials database. In a step S4856', the exchange computer system can provide to a customer user device a fiat funding interface. In a step S4857, the exchange computer system can receive a user electronic request comprising a funding amount and a funding method (e.g., a wire transfer). In a step S4859, the exchange computer system can provide to the customer user device, an electronic message and/or display data comprising wire transfer instructions. In a step S4861, the exchange computer system can set a pending transfer indicator and/or initiate a funds receipt monitoring process. In a step S4863, the exchange computer system can receive an electronic indication that funds were received via wire transfer at an exchange fiat account at an exchange partner bank. In a step S4865, the exchange computer system can verify that the received funds were transferred from the authorized customer's fiat bank account to the exchange fiat account. In a step S4868', the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872', the exchange computer system can provide an electronic notification to one or more customer user devices that funds are available for use on the exchange.

Figure 31A:
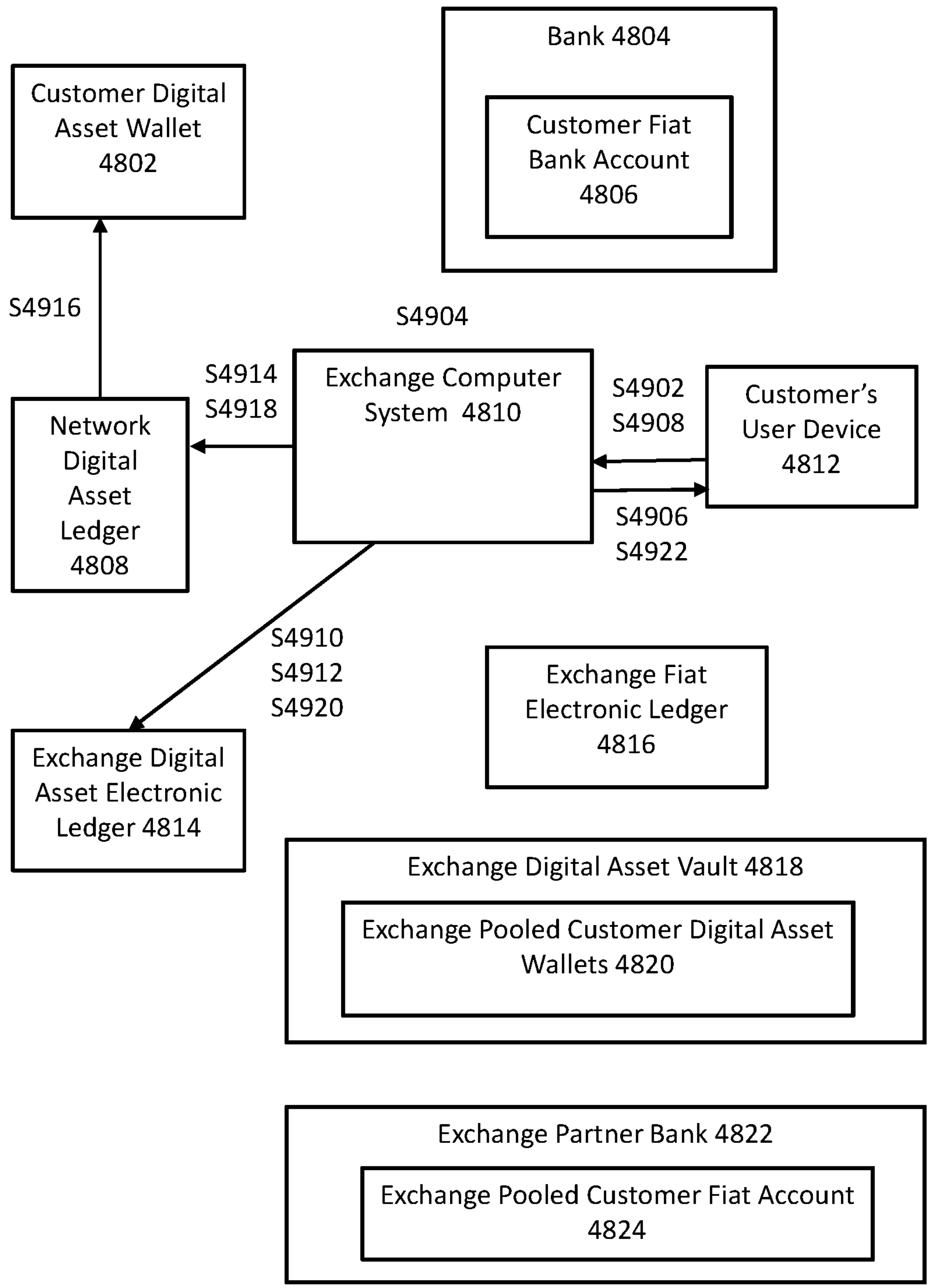
FIGS. 31A-B are a schematic diagram and corresponding flow chart of a process for digital asset exchange account digital asset withdrawal in accordance with exemplary embodiments of the present invention.
Figure 31B:
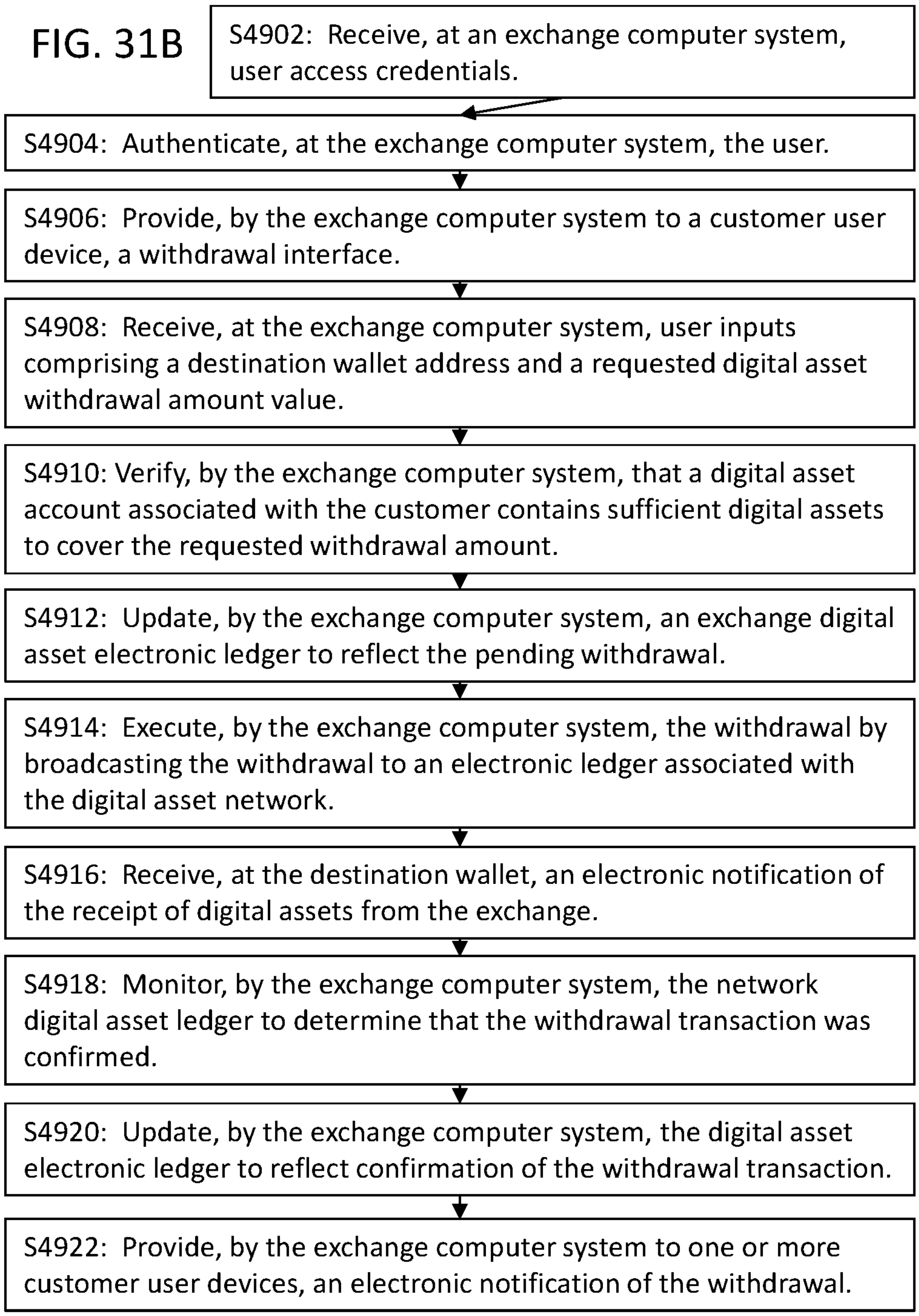

FIG. 31A is an exemplary schematic diagram of an exchange, and FIG. 31B is a corresponding flow chart of a process for digital asset exchange account digital asset withdrawal in accordance with exemplary embodiments of the present invention. The components and entities associated with an exchange that are shown in FIG. 31A are described herein with respect to FIG. 27A.

Referring to FIG. 31B, in a step S4902, an exchange computer system can receive user access credentials. User access credentials can include any of a username, password, fingerprints, access card scan (e.g., swipe of a card associated with the exchange and having a magnetic strip), and/or a pin (e.g., a number provided via SMS, other text message service, or email for multi-factor authentication), to name a few. In a step S4904, the exchange computer system can authenticate the user based upon the received user access credentials. In a step S4906, the exchange computer system may provide to a customer user device a withdrawal interface. In a step S4908, the exchange computer system may receive from the customer user device user inputs comprising at least a destination digital asset address, typically associated with a destination digital wallet and a requested digital asset withdrawal amount value. In a step S4910, the exchange computer system may verify that a digital asset account associated with the customer contains sufficient digital assets to cover the requested withdrawal amount. In embodiments, such verification can comprise reading a digital asset electronic ledger and/or determining a customer digital asset balance, e.g., based on summing transactions recorded on a digital asset electronic ledger. In a step S4912, the exchange computer system may update an exchange digital asset electronic ledger to reflect the pending withdrawal. In embodiments, recording an entry in the electronic ledger prior to the withdrawal may be performed to prevent double spending. In other embodiments, such a step may be skipped. In a step S4914, the exchange computer system may execute the withdrawal, e.g., by broadcasting the withdrawal to a digital asset network electronic ledger, e.g., the Bitcoin Blockchain, the Ethereum Blockchain, to name a few. In a step S4916, the destination wallet may receive an electronic notification of the receipt of digital assets from the exchange. In a step S4918, the exchange computer system may monitor the network digital asset ledger to determine whether and/or when the withdrawal transaction is confirmed. In a step S4920, the exchange computer system may update the digital asset electronic ledger, e.g., by debiting the withdrawal amount from the customer's exchange account, to reflect confirmation of the withdrawal transaction. In a step S4922, the exchange computer system may provide to one or more customer user devices an electronic notification of the withdrawal. Such a notification can include at least the customer's new digital asset balance.

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain and/or loss reporting system and a transaction history system. A fraud analysis system can monitor transactions to detect fraudulent and/or unauthorized transactions.

Exchange Digital Asset Storage Structure

Deposited customer fiat may be held in a pooled fiat account maintained in a partner bank. Meanwhile, digital assets held by the exchange may be maintained in pooled digital addresses associated with pooled digital wallets, such as aggregated custodial wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated offline with transactions generated offline, e.g., on an isolated computer, and transferred to a networked computer via a temporary physical connection or manual transfer. Isolated computer systems are physically and operationally isolated from other computer systems. For example, an isolated computer system may be an air gapped computer system. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 bitcoin), and/or certain defined fiat amounts (e.g., $100 worth of bitcoin) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. These exchange operated wallets may be maintained in trust by the exchange for each customer as associated digital asset addresses. Transactions may be processed by the digital asset network, e.g., the Bitcoin network. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets with associated digital asset addresses. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key to each custodial wallet whether it be segregated or commingled. Transactions may be made between different custodial wallets or between custodial wallets and exchange customer wallets in the manner described above.

Centralized Digital Asset Exchange

In embodiments, the exchange may hold customer fiat currency and/or digital assets in centralized, pooled accounts or wallets. As discussed herein, the exchange may maintain an electronic ledger to record transactions among users of the exchange. Separate electronic fiat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counter-party to the transaction. Transaction amount limits may be place on such transactions and/or additional fees may be charged.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the fiat assets recorded in the fiat account may be U.S. Dollars held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and fiat account.

In embodiments, a digital asset exchange may accept payment methods (e.g., credit card transactions; Automated Clearing House (ACH) debits, wire transfers, digital asset transactions, to name a few) for purchases of digital assets.

In embodiments, users may utilize sub-accounts subordinate to the master account. In embodiments, sub-accounts can be used as entities for traders, or can be used by machines associated with an owner, as discussed in U.S. patent application Ser. No. 15/071,902, filed Mar. 16, 2016 and entitled AUTONOMOUS DEVICES, which is expressly incorporated herein by reference.

In embodiments, a digital asset exchange may hold digital math-based assets and/or fiat currency in trust for users before, during and after a trade. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, fiat currency may be transmitted to a digital asset exchange's omnibus account. In embodiments, the exchange may transmit fiat currency back to a user upon receiving a request from a user.

In embodiments, a digital asset exchange may comply with relevant laws and regulations whereby the exchange may operate in a highly regulated banking environment and permit necessary supervision by relevant legal authorities.

In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction.

In embodiments, the exchange may permit trading twenty-four hours a day, seven days a week. In embodiments, the exchange may shut down for scheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for fiat currency or buy digital math-based assets with fiat currency if the user holds sufficient fiat currency in its associated account prior to initiating the transaction.

In embodiments, as discussed herein, exchange customers looking to buy digital assets may be matched to customers looking to sell digital assets, which matching may be performed by an exchange trading engine. Transaction volumes and prices may be based at least in part upon bids and asks that are received by the trading engine from the customers.

Figure 32:
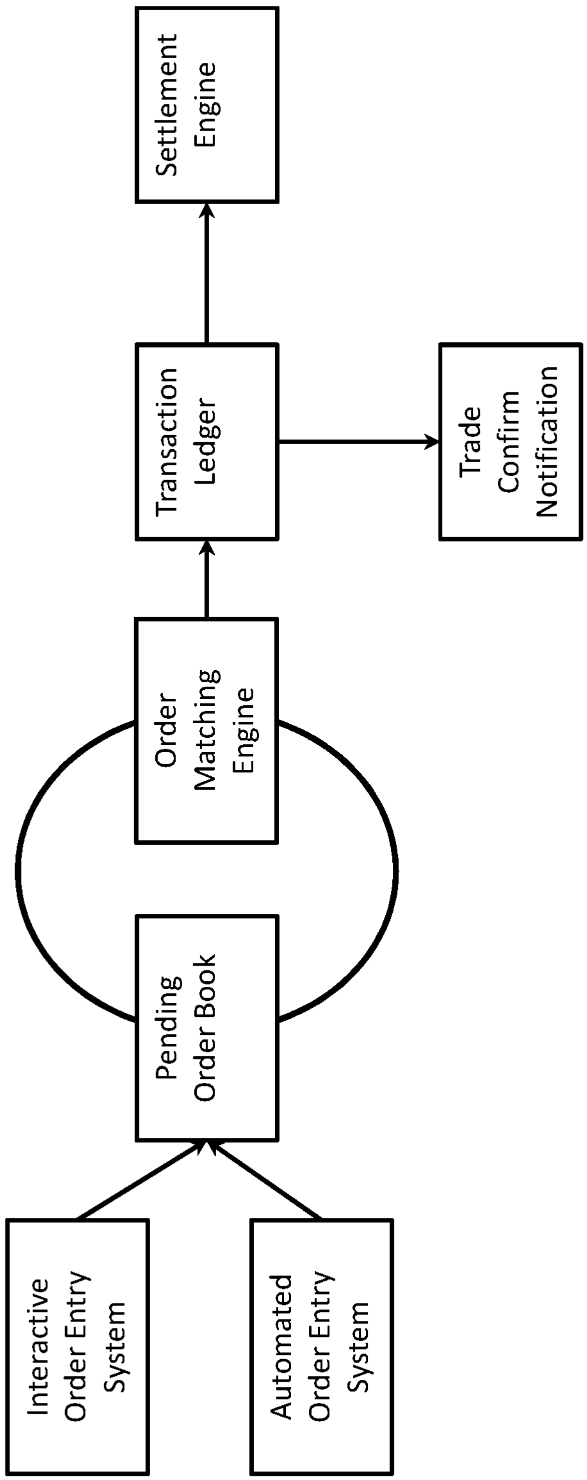
FIG. 32 is an exemplary schematic diagram of a digital asset exchange transaction system in accordance with exemplary embodiments of the present invention.

FIG. 32 illustrates an exemplary embodiment of an exchange trading system in accordance with embodiments of the present invention. An interactive order entry system may provide one or more interfaces through which exchange customers may initiate exchange transactions. An automated order entry system may comprise one or more trading APIs that allow customer computer-initiated transactions. Orders may be electronically stored in an electronic pending order book. An exchange order matching engine, which can comprise a computer system, may match bids and asks or otherwise match buyers and sellers of pending transactions. A transaction ledger may track transactions. A settlement engine may process the transactions, which may include providing trade confirmations or otherwise carrying out the transactions.

In embodiments, a digital asset exchange may employ systems and methods to manage and/or reduce digital asset transaction change. Digital asset transaction change refers to leftover digital asset amounts from transactions in digital asset systems, such as Bitcoin, where the transactions are comprised of one or more digital inputs and outputs. A wallet stores unspent transaction outputs, which it can use as digital inputs for future transactions. In embodiments, a wallet or third-party system may store an electronic log of digital outputs to track the outputs associated with the assets contained in each wallet. In digital asset systems such as Bitcoin, digital inputs and outputs cannot be subdivided. For example, if a first wallet is initially empty and receives a transaction output of 20 BTC from a second wallet, the first wallet then stores that 20 BTC output for future use as a transaction input. To send 15 BTC, the first wallet must use the 20 BTC as an input, 15 BTC of which will be a spent output that is sent to the desired destination and 5 BTC of which will be an unspent output, which is transaction change that returns to the first wallet. A wallet with digital assets stored as multiple digital outputs can select any combination of those outputs for use as digital inputs in a spending transaction.

For transactions involving sending digital assets from exchange wallets to non-exchange wallets (e.g., when a user requests a withdrawal of digital assets from the user's exchange account), a digital asset exchange may employ systems and methods to reduce transaction change, e.g., to avoid a temporary decrease in liquidity due to the unavailability of funds during a transaction confirmation period, to which the change in systems such as Bitcoin is subject.

To manage and/or reduce transaction change, in embodiments, an exchange may maintain wallets containing varying sized digital outputs so that an output or combination of outputs can be selected as digital input for a transaction, where the total input amount can have a size either equal to or greater than but close to the transaction amount. Accordingly, the exchange may employ a wallet balancing module running one or more balancing algorithms on one or more processors to distribute digital assets to wallets in digital outputs of various sizes and various quantities of each size. These output sizes and quantities thereof may be predetermined and programmed into the wallet balancing module and/or may be adjusted algorithmically to better reduce transaction change in light of actual current or historical exchange transaction activity. Wallet balancing operations may be performed continuously, periodically throughout a day, once a day (e.g., at midnight), once a week, at some other interval, as balancing is required for one or more transactions, and/or as the wallet balancing module determines a wallet imbalance that exceeds a threshold tolerable imbalance. In embodiments, an exchange wallet balancing module may perform balancing operations after receiving a digital asset withdrawal request from a user and before transferring the digital assets to the user.

An exchange may also reduce transaction change by programming multiple outputs for a single transaction. In embodiments, digital asset withdrawals may be processed only at specified times or periodically, e.g., in the morning and in the evening. Such a system may facilitate batch processing of withdrawals using multiple digital transaction outputs. In embodiments, digital asset storage or protection services, such as insurance or storage warranties, may be offered through a digital asset exchange. Transaction insurance or warranties may also be offered, e.g., to guarantee an exchange transaction for a particular volume at a particular price.

Order Book Types

In embodiments, of a digital asset exchange in accordance with the present invention, one or more types of order books may be used. For example, in embodiments, a digital asset exchange may feature central limit order books that follow a price-time priority model.

In embodiments, a continuous order book and/or auction order book may be used with any pair of digital assets and/or digital asset and fiat currency. For example, In embodiments, the following trading pairs and order books may be available:

| | Continuous Order Book | Auction Order Book |
|---|---|---|
| BTC/USD | Yes | Yes |
| ETH/USD | Yes | Yes |
| ETH/BTC | Yes | No |

In the above example, BTC/USD is a pairing of Bitcoin with U.S. dollars, ETH/USD is a pairing of Ether and U.S. Dollars and ETH/BTC is a pairing of Ether and Bitcoin.

In embodiments, both a continuous order book and an auction order book may not be available, for example, an auction order book may not be available for an ETH/BTC pairing. In embodiments, however, an auction could be provided based on digital currency to digital currency pairings, such as ETH/BTC. In embodiments, other pairings may also be available such as other digital assets with other fiat currencies, or other digital asset pairs.

In embodiments, a digital asset exchange may operate during limited hours, or may operate 24 hours a day, seven days a week, except for brief maintenance periods.

In embodiments, clients may submit as many orders as desired with any of the execution options described below. Alternatively, in embodiments, the number of orders may be restricted.

In embodiments, a digital asset exchange may be a full reserve exchange in which all orders are fully funded. In full reserve exchange embodiments, a client's outstanding interest on orders books of the digital asset exchange cannot exceed their account balance at any time and all open orders reduce a client's available balance until such orders are fulfilled or canceled. In other embodiments, a digital set exchange may offer margin trading.

Order Types

In embodiments, a digital asset exchange may support the following order types and execution options:

| | Description | Specifies Price | Can Trade Against Resting Orders | Can Rest on Continuous Order Book | Can Trade in Auction |
|---|---|---|---|---|---|
| Market | Filled immediately against resting orders at the current best available price. | No | Yes | No | No |
| Limit | Filled at or better than a specified price. Any quantity that is not filled rests on the continuous order book until it is filled or canceled. | Yes | Yes | Yes | Yes |
| Limit: Immediate-or-Cancel (IOC) | Filled immediately at or better than a specified price. Any quantity that is not filled immediately is canceled and does not rest on the continuous order book. | Yes | Yes | No | No |
| Limit: Maker-or-Cancel (MOC) | Rests on the continuous order book at a specified price. If any quantity can be filled immediately, the entire order is canceled. | Yes | No | Yes | Yes |

-continued

| | Description | Specifies Price | Can Trade Against Resting Orders | Can Rest on Continuous Order Book | Can Trade in Auction |
|---|---|---|---|---|---|
| Limit: Auction-Only (AO) Limit | Rests on the auction order book and is filled at or better than a specified price at the conclusion of an auction. Any quantity that is not filled is canceled. | Yes | No | No | Yes |

It will be appreciated that in embodiments, different combinations of order types may be available and in embodiments, additional order types may be available and some order types may not be available. In embodiments, order types may differ for pairings of digital assets and/or fiat currencies.

Continuous Order Book

In embodiments, a digital asset exchange may have a continuous book. The continuous book may support market orders and/or limit orders.

In embodiments, a continuous order book may be implemented, by way of example, in accordance with the following:

1. Alice places a limit order to buy 16.65 BTC at a price of 5885.65 USD.
2. Bob places a limit order to sell 21.84 BTC at a price of 5924.85 USD.
3. Both orders rest on continuous order book.

Limit Orders

In embodiments, limit orders have a side, a limit price in fiat (e.g. USD) and a quantity in digital asset (e.g., Bitcoin or Ether). Example:

Execution Options

In embodiments, continuous book limit orders support the following execution options:

Option 1: Standard (Good Until Canceled)

The order may be filled in part or fully before being booked. The order will rest on the book until complete filled or cancelled.

Option 2: Immediate or Cancel

The order never rests on the book. The order is filled to the extent possible based on existing orders on the order book, and any remainder is cancelled.

Option 3: Market or Cancel

The order rests on the book to add liquidity. The order will be cancelled if any part of it would be filled immediately.

Market Buys in the Continuous Book

In embodiments, a continuous book may offer market buys. Market buys may be placed with a gross notional value in fiat (e.g., USD). A fee may be deducted from the gross amount. Market buys are filled against resting orders on the book. Any remainder to the order is cancelled when filled. As a circuit breaker, in embodiments, a threshold may be applied to a market buy, e.g., filling up a market buy up to a fixed percentage (e.g., 20%) or an aggregate amount (e.g., x digital assets or y fiat) against the market at time of order, with the remainder of the order being cancelled.

In embodiments, market buys in the continuous book may be implemented, by way of example, in accordance with the following:

1. Charlie wants to buy 5000 USD worth of bitcoin. He places a market buy order that is immediately filled against Bob's resting limit order to sell 21.849 BTC at a price of 5924.98 USD.
2. Charlie receives 0.84177499 BTC which his 4987.50 USD worth of BTC at the current market price of 5924.98 USD. 4968.50 USD is the net notional value of Charlie's market buy, which is the 5000 USD gross notional value of the market buy less his 12.50 USD fee.
3. Bob's limit sell continues to rest on the books with a remaining quantity of 21.007225 BTC.

Market Sells in the Continuous Book

In embodiments, a continuous book may offer market sells. Market sells are placed with a quantity in digital assets. As a circuit breaker, in embodiments, a threshold may be applied to a market sell, e.g., filing up a market sell up to a fixed percentage (e.g., 20%) or an aggregate amount (e.g., x digital assets or y fiat) against the market at time of order, with the remainder of the order being cancelled.

In embodiments, market sells in the continuous book may be implemented, by way of example, in accordance with the following:

1. David wants to sell 3 BTC at whatever the market price is. He places a market sell order that immediately crosses with Alice's resting limit order to buy 16.65 BTC at a price of 5885.65 USD.
2. David nets 17,612.81 USD form his market sell. 17,656.95 USD less his 44.14 USD fee.
3. Alice's limit buy continues to rest on the books with a remainder quantity of 13.65 BTC.

Priority of Matching on Continuous Book

In embodiments, the priority of matching orders resting on the books may be filled in using price time priority.

In embodiments, priority of matching orders resting on the books filled in using price time priority may be implemented. In embodiments, resting limit order could also be filled on a continuous book in price-time priority. In embodiments, resting limit order filled on a continuous book in price-time priority may be implemented.

Auctions

Auction Order Book

In embodiments, a digital asset exchange may have an auction order book. In embodiments, the auction order book is blind but the public auction events contain information that allows market participants to understand when there is an imbalance of buy or sell interest. In embodiments, the auction order book supports auction-only (AO) market and limit orders. These orders rest until the auction runs, at which time the orders will be either filled or cancelled. In general, self-trading should not be not allowed. An incoming order that would cross with a resting order on the auction book from the same account is cancelled.

In embodiments, a digital asset exchange in accordance with the present invention may conduct auctions for certain trading pairs periodically (e.g., every day (including weekends and holidays)) and/or aperiodically (e.g., a specific announced time, which may be irregular). Such auctions offer a technical advantage of fostering moments of elevated liquidity and price discovery.

In embodiments, the auction order book may have time constraints, so that auction order windows may only be placed within a specified time window. Thus, the auction order book for a given auction may open a set time period in advance of the auction (e.g., 8 hours before the auction begins), as the opening of the auction order window. For example, if an auction is set to begin at 4:00 p.m. Eastern Standard Time, the Auction could begin at 8:00 a.m. Eastern Standard Time, as illustrated above.

In embodiments, once an auction window opens, auction-only order may not be cancelled after the final indicated price has been published, e.g., one minute before the auction runs. In the above example, that would be 3:59 p.m.

In embodiments, auction-only orders may be accepted up until the auction runs.

In embodiments, auction only orders placed outside of the auction order window may be rejected.

Auction Event

In embodiments, at a set time period before the auction begins, e.g., 10 minutes, an indicative auction event window may be opened. An indicative auction event is a simulation of what would happen if the auction ran at that point in time. In embodiments, an indicative auction uses the same pricing algorithm as the final auction price determination. In embodiments, although the auction order book is blind, indicative auction events show when there is a buy/sell interest imbalance so participants may adjust their orders.

During an indicative auction window, indicative results may be published at set time intervals, such as once a minute, twice a minute, four times a minute, to name a few, and will continue to be published until the indicative auction window closes. In embodiments, the indicative auction window will not close until the auction is run.

In the example above, for an auction beginning at 4:00 p.m. Eastern Standard Time, an indicative auction window may be opened 10 minutes prior at 3:50 p.m. Eastern Standard Time. Indicate results are published once a minute starting at the opening of the indicative auction window at 3:50 p.m. Eastern Standard Time, 10 minutes before the 4:00 p.m. auction. Starting at one minute before the auction window, 3:59 p.m. Eastern Standard Time, the indicative price may be published every 15 seconds. An indicative auction window will close when the auction window opens at 4:00 p.m., with the last indicative price published at 3:59:45 p.m. Eastern Time. Of course, other time periods can be used to set the opening and closing of the indicative auction windows and one or more intervals of publication can be used in that windows.

Figure 54:
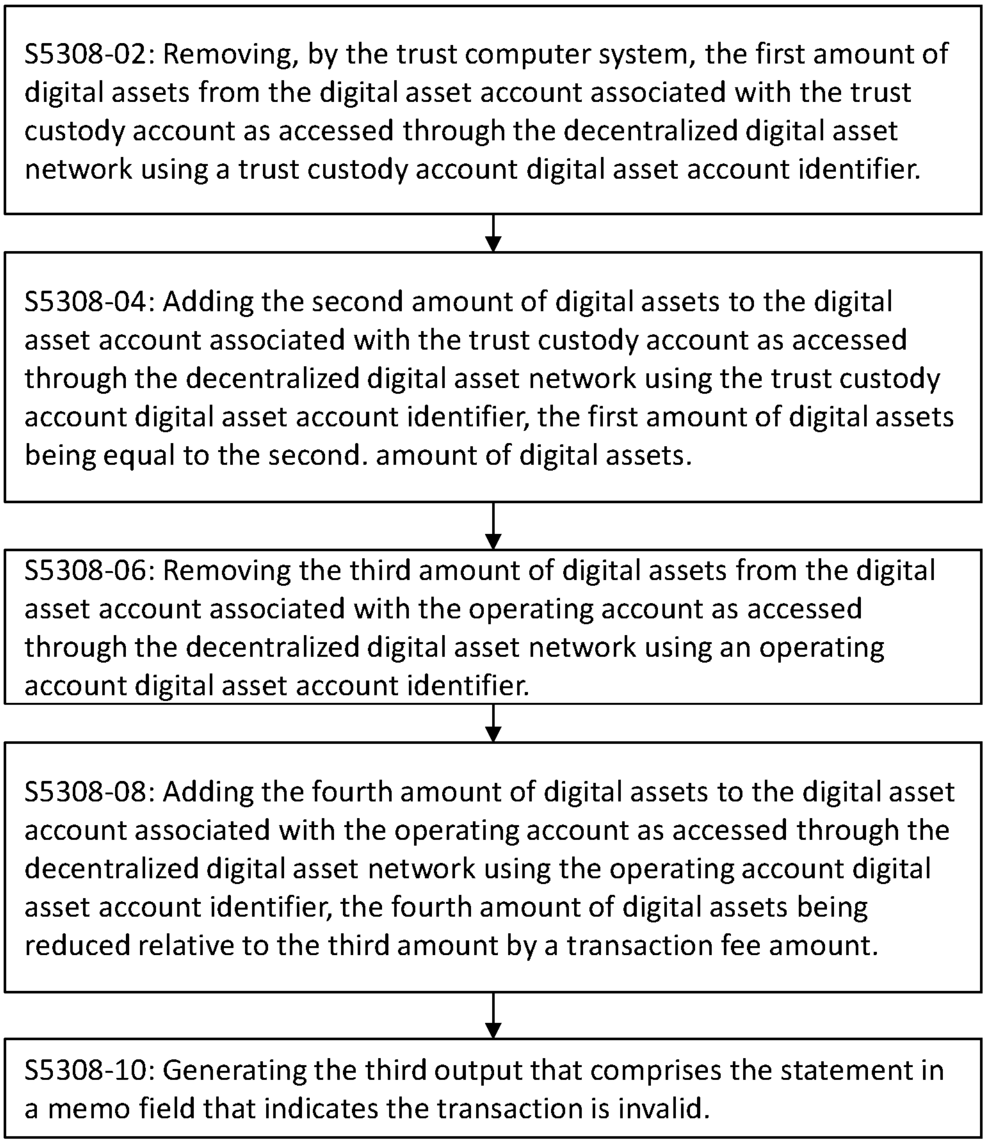
FIG. 54 is an exemplary flow chart illustrating the steps used to perform a transaction as part of the method to provide proof of control of the custodial account.
Figure 54A:
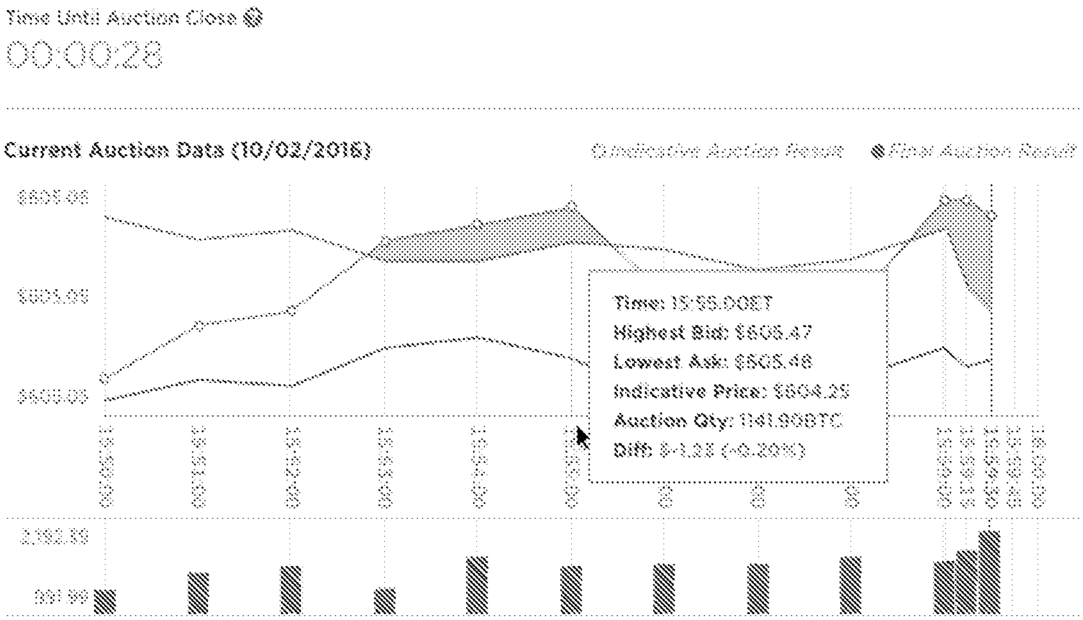
FIG. 54A illustrates an example of indicative auction results as may be published during an indicative auction window.

FIG. 54A illustrates an example of indicative auction results as may be published during an indicative auction window.

In embodiments, the final auction run at a final auction run time, e.g., 4:00 p.m. Eastern Standard Time in the above examples. In embodiments, at the final auction run time, no more orders on the continuous or auction order books are accepted. In embodiments, the midpoint of the best bid and best ask from the auction price will be taken as the auction collar price. In embodiments, an index value may be taken as the auction collar price.

The final auction price for every auction is established as the price that executes the greatest aggregate quantity and minimizes the imbalance between buy and sell orders across both the auction and continuous order books. The imbalance is defined as the absolute value of the difference between total buy orders and total sell orders at a given price across both the auction and continuous order books. Other pairings and timings may be used in accordance with the embodiments of the present invention.

Within this auction design, the market is open to accepting orders until the time the auction algorithm runs.

Limit Orders for Auctions

In embodiments, limits order may be placed in auctions. Typically, limit orders have a side (e.g., buy or sell), a limit price in fiat (e.g., USD), and a quantity in digital asset (e.g., BTC).

In embodiments, once a limit order is placed for an auction, the order will rest until the auction runs and the auction window closes.

In embodiments, if the auction succeeds, limit orders will be filled based on:

1. Price-time priority
2. If the auction price is equal to the limit price or a price improvement (auction price is lower than the limit buy order or higher than the limit sell order).

Market Orders for Auctions

In embodiments, auction-only market buys and sells are like their continuous book counterparts except that they will rest on the book until they are cancelled or the auction runs. If the auction succeeds, auction-only market orders may be filled according to time priority, unlike in the continuous book where market orders are filled immediately. Although uncommon, auction-only market orders may be partially filled or even unfilled. This can happen when the auction has an unusually large buy-sell interest imbalance.

Auction Example

In an example, there are two prices, $99 and $100, that will execute the greatest aggregate quantity across both the auction and continuous order books, which is 30. However, at the $99 price, the imbalance between buy and sell orders is greater than it is at the $100 price. As a result, the final auction price will be $100 because this price executes the greatest aggregate quantity and minimizes the imbalance between buy and sell orders across both the auction and continuous order books.

Priority of Limit Orders

In embodiments, all limit orders at the same specified price are treated equally and executed in the order in which they were received. Partially filled resting limit orders retain their priority until canceled.

Auction Methodology

In embodiments, a Walrasian auction that seeks to identify the price with the greatest aggregate quantity may be employed. In such embodiments, each possible price is tested summing up buy and sell quantities. The price that would execute the greatest possible "wins" may be selected. In embodiments, in the event of a tie between two or more prices that would execute the same quantity, the exchange may select the price that minimizes the imbalance between the buy and sell orders across the auction order book and/or the auction and continuous order books. In embodiments, in the event of a tie between two or more adjacent prices that would execute the same quantity, the auction price may be the midpoint of the two adjacent prices. In embodiments, in the event of a tie between two or more adjacent prices that would execute the same quantity, the auction price may be the price that is closest to the collar price. In the event that the two prices are equally close to the collar price, the auction price may be the midpoint of the two prices.

In embodiments, the auction price is established as the price that executes the greatest aggregate quantity (i.e. auction quantity) across both the auction-only and continuous order books. It is possible that there is not an exact match between buy and sell interest at this price, and some orders will be partially filled or not be filled at all. Auction-only market orders may be filled by time priority. To avoid time conflicts, the market may be paused for a brief period (e.g., milliseconds) while the final price, quantity, and controls are calculated.

In embodiments, in order to provide the most liquidity to the marketplace, resting limit orders on the continuous order book may be used in the auction price and quantity calculations. In embodiments, for a resting limit order to be eligible for inclusion, the auction price must be equal to or better than the resting limit price (less than or equal to for bids, or greater than or equal to for asks). Resting limit orders on the continuous order book may be filled according to time priority and are subject to improvements in price.

In embodiments, the auction may fail if an equilibrium cannot be achieved, for example, if the auction quantity is zero. A zero-auction quantity could occur when no auction orders are received, or if only one-way auction orders are received (e.g., buy only or sell only orders). In embodiments, a collar may also be placed on the auction. For example, a collar may be placed on the auction price, by using fixed percentage (e.g., 1 percent, 5 percent, 10 percent) of a benchmark against the continuous book price at given time period or set of time period. In embodiments, the benchmark could be a midpoint of the spot price of the continuous book price at the given time period—e.g., auction price. In embodiments, the benchmark could be a weighted average (such as a time weighted average, volume weighted average, or time and volume weighted average) of the continuous book during a pre-set window (e.g., 10 minutes for before auction, 1 hour before the auction, 12 hours before the auction, 24 hours before the auction, to name a few).

In embodiments, digital asset exchange computer system 3230 may set a collar for the auction trade, including a collar minimum and a collar maximum. First, the digital asset exchange computer system 3230 may access, from at least a first database stored on a computer readable medium operatively connected to the digital asset computer system, pricing data associated with the first pair at a predefined time associated with a time of the auction trade order. In embodiments, pricing data can include a spot price. In embodiments, a pricing data may be based on the last transaction immediately prior to the auction. In embodiments, a pricing data may be based on an average of the most recent bid/ask price for the digital asset. In embodiments, the pricing data may be set based on a blended digital asset price as discussed elsewhere herein. For example, a single exchange digital asset price could be determined based on a volume weighted average and/or time weighted average of recent digital asset pricing. In embodiments, a blended digital asset price may be based on a pricing from digital assets taken from a plurality of exchanges (such as qualified exchanges). In embodiments, pricing data may be a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed. The digital asset exchange computer system 3230 may calculate a collar minimum for the auction based on the pricing data less an amount equal to a first percentage of the pricing data, and a collar maximum for the auction based on the pricing data plus an amount equal to the first percentage of the pricing data. Thus, a collar may be based on a spot price at the time for the auction, plus or minus a defined range, such as a percentage of the spot price or other pricing data. In embodiments, the collar could be set using percentages such as 1%, 2%, 3%, 5%, 10% of the spot price or other pricing data, to name a few. By way of illustration, if a 5% collar is used with a spot price of 1 BTC=USD$10,000, the collar would be set at between USD$9,500 and USD$10,500.

Accordingly, in embodiments, in sub step S5604*a*, the digital asset exchange computer system 3230 may retrieve a current pricing information (e.g., bid/ask price) from continuous trading order book 5702*a* associated with a first digital asset pairing and establish a spot price for the first digital asset pairing. As noted above, in embodiments, the spot price may be the average of the current bid/ask price or may be the price used in the last transaction in the continuous trading book, to name a few. In embodiments, the spot price may be a blended digital asset price, in which one or more different order books from one or more digital asset exchanges or index databases may be required to be accessed to obtain such price. In embodiments, the blended digital asset price may be obtained by being calculated and/or by accessing a blended digital asset price database (not shown). In sub step S5604*b*, the digital asset exchange computer system may establish the collar, for example, based on adding and/subtracting a fixed percentage of the spot price to the spot price as discussed above, for example.

In embodiments, the collar may be a blended digital asset price consisting of 4 digital asset exchanges' executed trade data for a 10 minute period volume weighted with 5% of the highest priced trades and 5% of the lowest priced trades removed.

In embodiments, the digital asset exchange computer system 3230 may determine whether the price in the auction is within the limits of the collar determined above (e.g., at or above the collar minimum and at or below the collar maximum).

In embodiments, if the final auction price falls outside the collar, the auction may also fail.

In embodiments, in the event auction fails, the exchange may cancel all the auction-only orders unfilled, close the auction and/or publish as market data for the auction that it failed, either with or without a reason for such failure. In embodiments, where the auction fails because the final auction price falls outside the collar, the price and quantity of the auction that would have otherwise been executed may be published as part of the market data, with an indication that the auction failed.

In embodiments, if the event auction succeeds, the digital asset exchange may fill all eligible auction only and/or continuous book order by strict time priority. In embodiments, continuous book orders may not be filled. The digital asset exchange may also notify the market participants whose orders were filled, such as through the alert system discussed herein. In embodiments, the digital asset exchange may also notify the market participants whose orders were not filled, such as through the alert system discussed herein. The digital asset exchange may also cancel all remaining unfilled and partially filled auction-only orders to the extent such partially filled auction-only orders remain unfiled. The digital asset exchange may then close the auction order book for this auction window. In embodiments, the digital asset exchange may publish a market data auction event showing the outcome of the auction through, for example, an API or other electronic publication. In embodiments, historical trades may show a bulk trade event for the auction volume.

In embodiment, normal operations, such as continuous order book trading, may resume once the auction process is completed.

In embodiments, in addition to publishing the final auction price and whether or not it failed, the collar price may also be published as part of an API or other electronic publication.

Market Place Controls

In embodiments, marketplace controls may be put in place in an effort to foster a fair and orderly market. Examples of marketplace controls can include one or more of the following:

Orders: Automatic cancellation of any order, or the remaining portion of any order, on a continuous order book that would move the market price by more than a defined percentage (e.g., 20%) in either direction, as compared to the prior prevailing market price;

Auctions: Automatic cancellation of an auction if the final auction price deviates from the collar price by more than five percent in either direction at the time the auction runs; and Self-trade prevention: a digital asset exchange may prohibit a client from crossing with itself on a continuous order book or with itself on an auction order book.

In embodiments, other controls may be put in place consistent with the present invention.

Clearly Erroneous Transaction Policy

A digital asset exchange may, in embodiments, declare a transaction null and void when it is determined to be clearly erroneous.

Marketplace Disruptions

Errors or disruptions may occur on an exchange during the order entry, order matching, or trading process. In embodiments, if any such errors or disruptions occur, the digital asset exchange may cancel any order and/or reverse any trade, in whole or in part.

Market Data

In embodiments, the results of each auction may be made available as pricing data for a digital asset though, e.g., an API. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage.

In embodiments, auction order book data may not be publicly available. In embodiments, auction order book data may be available with a time delay after each auction completes through, e.g., an API. In embodiments, auction data, like other digital asset pricing data, may be used an input to a blended digital asset price, or other index or benchmark.

In embodiments, a digital asset exchange may publish market data using APIs, such as public REST APIs and private REST APIs. Public REST APIs may provide market data such as: current order book, recent trading activity and/or trade history, to name a few. Private REST APIs allows participants to manage both orders and funds, by for example, placing and/or cancelling orders, viewing active orders, viewing trading history and/or trade volume, retrieving available balances, to name a few.

Notifications

In embodiments, individual auction-only and continuous order book market participants may be notified their order has been filled via an email, sms, push notification, or other message and/or a status update on their activity feed. In embodiments, the same alerting system may be used for continuous order book execution.

Decentralized Digital Asset Exchange

Figure 34A:
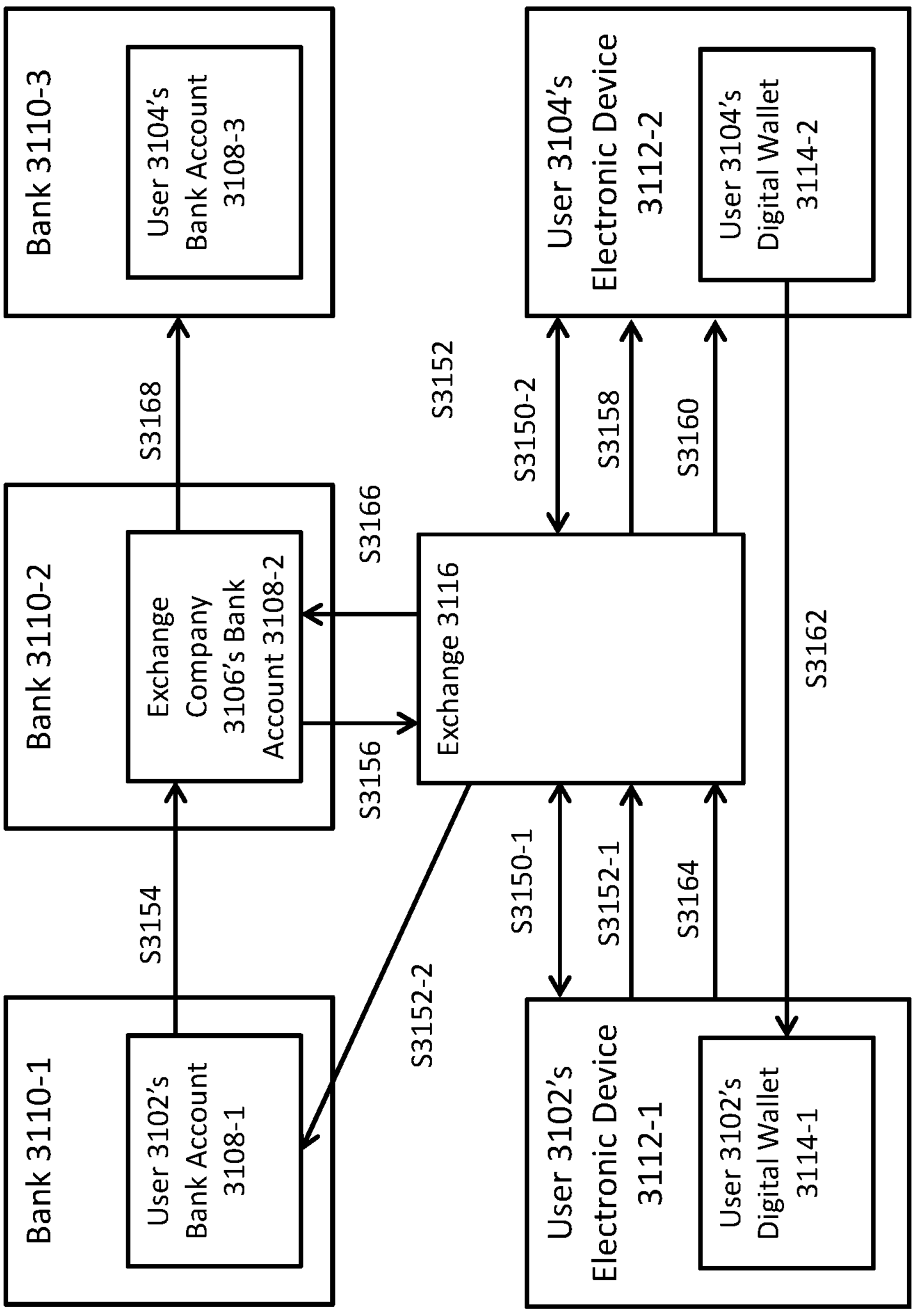
FIGS. 34A-B are a schematic diagram and corresponding flow chart showing participants in and processes for a digital asset exchange system in accordance with exemplary embodiments of the present invention.
Figure 34B:
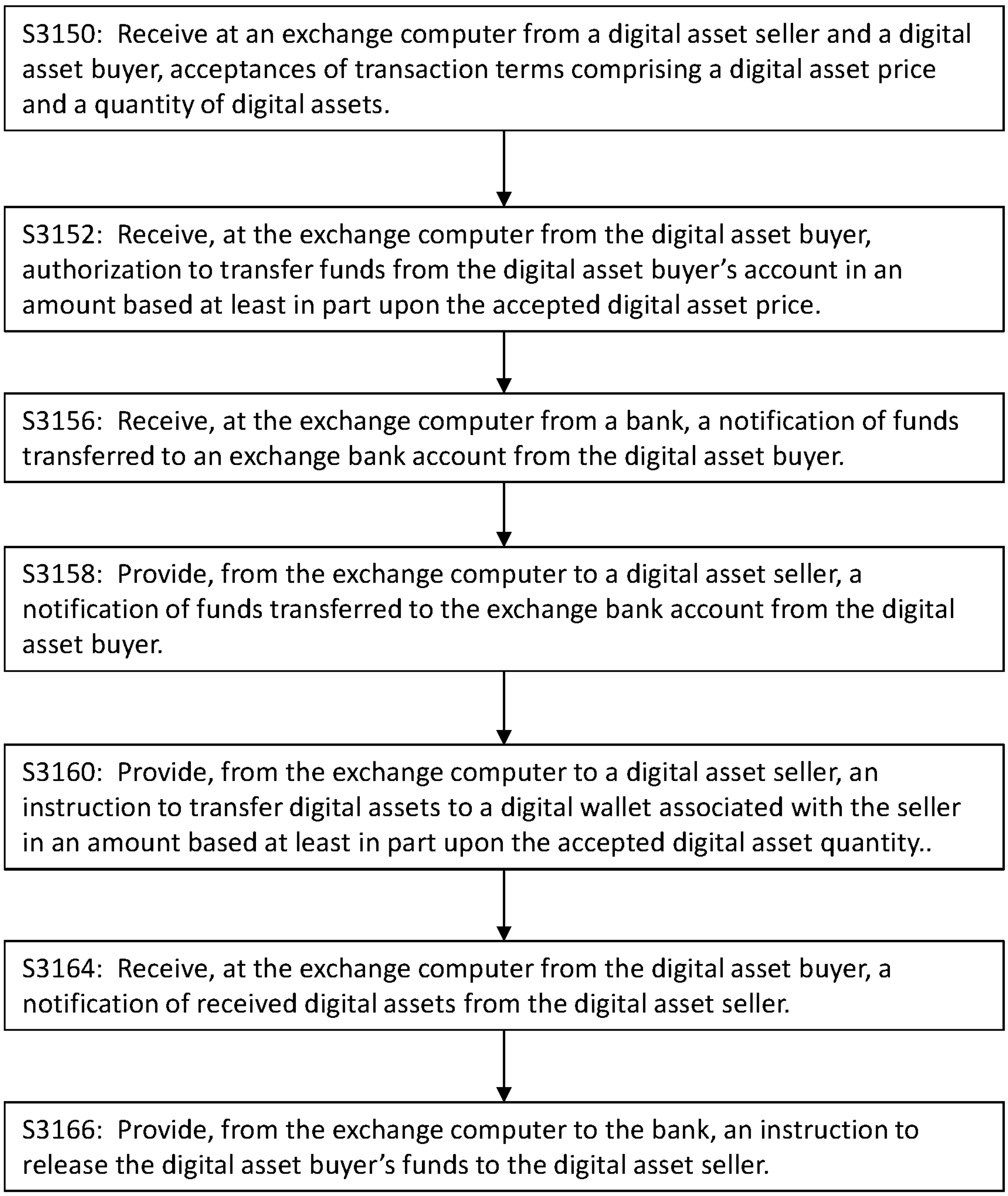

FIGS. 34A-B are a schematic diagram and corresponding flow chart showing participants in and processes for a digital asset exchange system in accordance with exemplary embodiments of the present invention. A digital asset exchange may provide conversions among digital math-based assets and fiat currencies. In embodiments, conversions may be performed between differently denominated digital math-based assets. In embodiments, a digital asset exchange may facilitate the buying and selling of digital assets in exchange for other digital assets, non-digital assets, fiat currencies, or other financial instruments. The parties to such a transaction may be individuals, organizations, and or institutions. In embodiments, the exchange itself or its operator or owner may be the counter-party to an exchange transaction.

FIG. 34B is a flow chart corresponding to the digital asset exchange system illustrated in FIG. 34A. In a step S3150, one or more exchange computers comprising an exchange computer system may receive from a digital asset buyer acceptances of transaction terms comprising a digital asset price and a quantity of digital assets.

In a step S3152, the exchange computer system may receive from the digital asset buyer authorization to transfer funds from the digital asset buyer's account in an amount based at least in part upon the accepted digital asset price.

In a step S3156, the exchange computer system may receive from a bank, a notification of funds transferred to an exchange bank account from the digital asset buyer.

In a step S3158, the exchange computer system may provide to a digital asset seller a notification of funds transferred to the exchange bank account from the digital asset buyer.

In a step S3160, the exchange computer system may provide to a digital asset seller, an instruction to transfer digital assets to a digital wallet associated with the seller in an amount based at least in part upon the accepted digital asset quantity. In embodiments, the digital asset seller may transfer digital assets to a digital wallet associated with (e.g., owned by and/or operated by) the exchange. The exchange may hold such funds in escrow until the buyer's payment is received, e.g. into a bank account (for fiat currencies) or into a digital wallet (for other digital assets).

In a step S3164, the exchange computer system may receive from the digital asset buyer a notification of received digital assets from the digital asset seller.

In a step S3166, the exchange computer system may provide to the bank, an instruction to release the digital asset buyer's funds to the digital asset seller.

In another embodiment, the exchange can act as a counter-party to transactions where digital assets are bought and/or sold for a differently denominated digital asset or a fiat currency. In embodiments, the system illustrated in FIG. 34A can be used to perform exchange transactions with multiple counter-parties. An exchange computer system may identify a digital asset seller and a plurality of buyers. The exchange computer system may determine, obtain, or receive (e.g., from computers, digital asset kiosks, or user electronic devices associated with the buyers) public addresses of digital asset wallets associated with the buyers. The exchange computer system may also determine, obtain, or receive digital wallet information (e.g., public address, public key, and/or private key) associated with the seller. In embodiments, wallet information of any exchange participant may be stored by the exchange computer system in one or more databases, which may be accessed as part of a transaction. A participant in an exchange transaction may also input (e.g., via downloadable software or a website associated with the exchange) and/or otherwise transmit to the exchange required digital wallet information from which to send or in which to receive digital assets. The exchange computer system may use the digital wallet information of the exchange transaction participants to generate transaction instructions. For example, the exchange computer system may pre-program instructions to transfer a certain amount of digital assets from the seller wallet to each buyer wallet. The exchange computer system may also input the digital wallet access credentials (e.g., a public and private key) so that the transaction may proceed.

In embodiments, a digital asset exchange (e.g., digital asset exchange 5306, digital asset exchange computer system 5302, and/or the digital asset exchange computer system described in connection with FIG. 17A through FIG. 17E, the descriptions of each applying herein) may enable a plurality of users to obtain interest on one or more digital assets (e.g., one or more amounts of one or more types of digital assets) over a period of time. For example, one or more users may transfer an amount of the one or more digital assets to one or more interest-bearing accounts associated with the one or more users. In embodiments, a interest-bearing account may include one or more of the following: DDAs, MMDAs, NOW accounts, stable value funds, one or more digital asset wallets, credit interest programs, and/or a combination thereof, to name a few. In embodiments, the digital asset exchange 5306 may be associated with one or more third party institutions.

For example, the digital asset exchange 5306 may, to earn interest, transfer one or more digital assets from one or more interest-bearing accounts associated with the one or more users (e.g. customers of the digital asset exchange) to one or more accounts associated with a third party institution (an intermediary). The third party institution, continuing the example, may make one or more interest payments or otherwise provide for a return after one or more periods of time (e.g., an investment of 100 BITCOIN™ may return 10 BITCOIN™ after 3 months) to the digital asset exchange 5306 and/or the one or more interest bearing accounts, which may return a portion or all of the interest payments to the one or more users (e.g., the 10 BITCOIN™ minus one or more fees). Continuing the example, in embodiments, the third party institution may continue to make payments to the digital asset exchange 5306 until a predetermined amount of time elapses (e.g., one payment over the predetermined amount of time, two payments over the predetermined amount of time . . . n payments over the predetermined time, to name a few). In embodiments, the third party institution may return the original investment (alternatively, the original investment minus one or more fees) to the digital asset exchange 5306 or the one or more interest-bearing accounts, which may return a portion or all of the original investment to the one or more users (e.g., the 10 BITCOIN™ minus one or more fees).

In embodiments, the third party institution may only provide one payment to the digital asset exchange 5306 or the one or more interest-bearing accounts (i.e., for the purposes of this example, only one payment from the third party to the digital asset exchange 5306). The one payment, in embodiments, may include the interest payment and/or the original investment (or minus the one or more fees), to name a few. In embodiments, as described in the above example, the third party institution may provide one or more payments to the digital asset exchange 5306, the one or more payments may include one or more of the following: one or more interest payments, a portion of the original investment, the original investment, and/or a combination thereof, to name a few. Third party institutions, in embodiments, may include one or more of the following: banks, credit unions, registered investment advisors, broker-dealers, brokerage institutions, asset managers, trust companies, retirement programs, additional institutions providing interest-bearing accounts (insured or not insured) or other investment accounts (e.g., money fund, exchange traded fund, etc.), other financial institutions or intermediaries, and/or a combination thereof, to name a few. Additional institutions may include, by way of example, institutions holding, managing, and/or providing cash management vehicles and/or cash management accounts, such as DDAs, MMDAs, NOW accounts, CDs, stable value funds, credit interest programs, to name a few. In embodiments, third party institutions may hold omnibus accounts and/or individual customer accounts. In embodiments, one or more third party institutions associated with the digital asset exchange 5306 may hold one or more of the following account types: single accounts, certain retirement accounts, joint accounts, revocable trust accounts, irrevocable trust accounts, employee benefit plan accounts, municipalities, corporations, non-profits, individuals, partnerships, retirement accounts, pension accounts, and/or a combination thereof, to name a few.

Figure 55A:
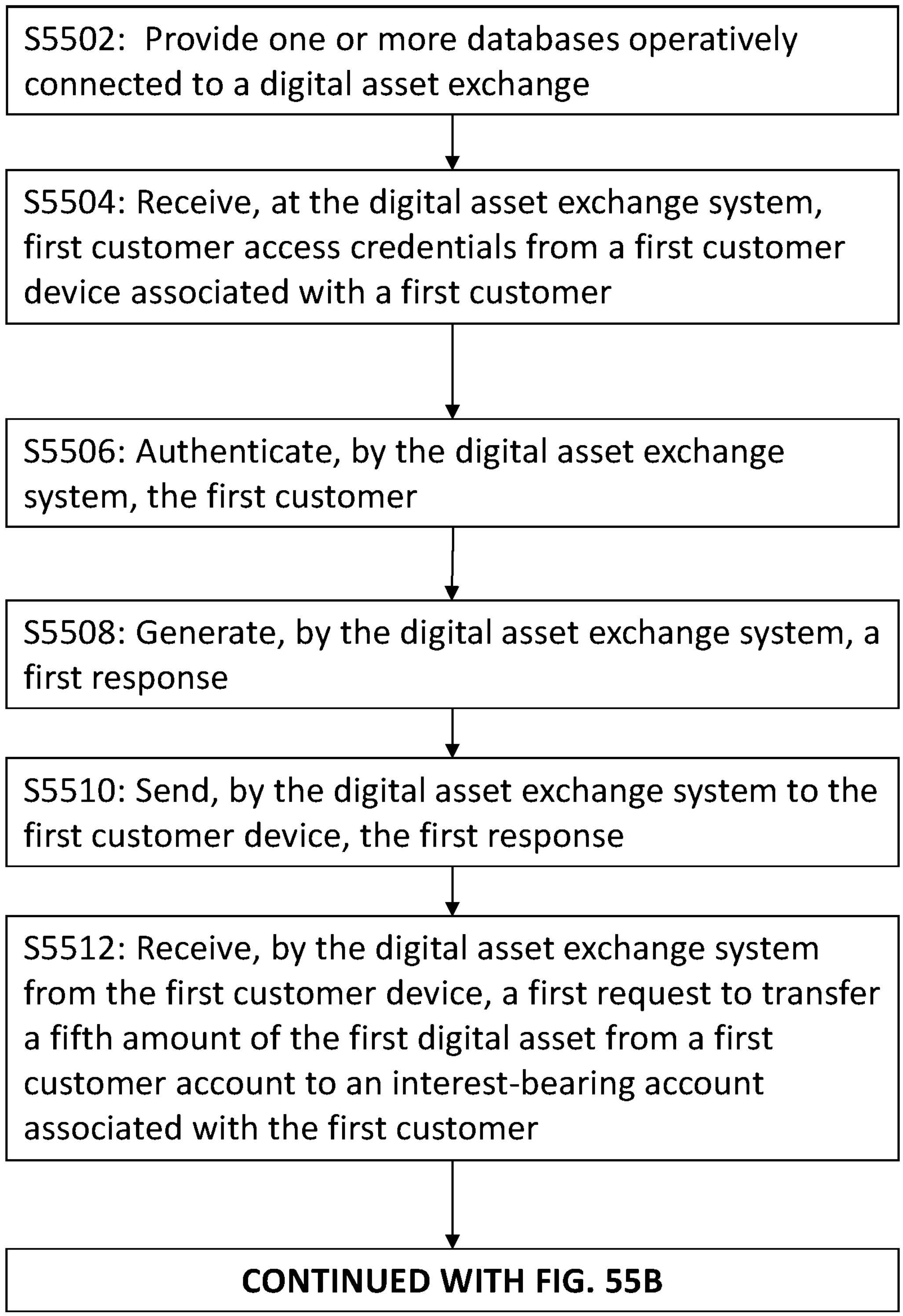
FIGS. 55A-C, are flow charts of exemplary processes for providing interest on an amount of a digital asset in accordance with exemplary embodiments of the present invention.

An exemplary process for providing interest on an amount of digital asset is illustrated in connection with FIG. 55A through FIG. 55C. Referring to FIG. 55A, in embodiments, an exemplary process for providing interest on one or more digital assets may begin with step S5502. At step S5502, in embodiments, the one or more databases operatively connected to a digital asset exchange system (e.g., digital asset exchange 5306 via digital asset exchange computer system 5302) are provided. The one or more databases, in embodiments, may include (as illustrated in connection with FIG. 55A-1) First Electronic Exchange Ledger Database 5502, Second Electronic Interest Ledger Database 5504, Third Electronic Ledger Database 5506. In embodiments, a Fourth Electronic Reserve Ledger Database 5508 may be provided as well. As illustrated in FIG. 55A-5, the one or more databases may include one or more of the following: First Electronic Exchange Ledger Database 5502, Second Electronic Interest Ledger Database 5504, Third Electronic Ledger Database 5506, Fifth Electronic Fiat Ledger Database 5514, and/or a combination thereof, to name a few. The one or more databases may include an electronic log of all transactions associated with exchange accounts, interest-bearing accounts, intermediary accounts, and/or reserve accounts associated with the plurality of users, including, for example, the source account, the destination account, the timestamp of the transaction, the amount of the transaction (e.g., the amount of the first digital asset), and/or the balance in each account before and/or after the transaction. In embodiments, the one or more databases may include a list of account addresses and balances in each account transactions associated with exchange accounts, interest-bearing accounts, intermediary accounts, and/or reserve accounts associated with the plurality of users. In embodiments, the one or more ledgers stored in the one or more databases may be maintained as a sidechain which is periodically, or aperiodically, published to a blockchain such as the Ethereum blockchain. In embodiments, the one or more ledgers may be published directly to the blockchain.

In embodiments, the one or more databases may be stored remotely and/or be accessible by the digital asset exchange system. In embodiments, the one or more databases may be accessible via memory 5302-C and/or 5306-C. A more detailed description of an exemplary embodiment of step S5502, is illustrated in connection with FIG. 55A-1 and FIG. 55A-5. Referring to FIG. 55A-1, in embodiments, the provided one or more databases may include one or more of the following: (1) a first electronic exchange ledger associated with a first digital asset including, for each customer, exchange account information including a first digital asset account balance indicating a first amount of the first digital asset (e.g., First Electronic Exchange Ledger Database 5502); (2) a second electronic interest ledger associated with the first digital asset including, for each customer, interest-bearing account information including a second digital asset account balance indicating a second amount of the first digital asset and respective interest information (e.g., Second Electronic Interest Ledger Database 5504); (3) a the third electronic ledger associated with an intermediary, including, for each customer, intermediary account information including a third digital asset balance indicating a third amount of the first digital asset and respective return information (e.g., Third Electronic Ledger Database 5506); (4) a fourth electronic reserve ledger associated with the first digital asset, including, for each customer, reserve account information including a fourth digital asset balance indicating a fourth amount of the first digital asset (e.g., Fourth Electronic Reserve Ledger Database 5508); a fifth electronic exchange ledger associated with a second digital asset, including, for each customer, exchange account information including a second digital asset account balance indicating a fifth amount of the second digital asset (which may be similar in description to the first electronic exchange ledger and the First Electronic Exchange Ledger Database 5502, the descriptions of which applying herein); a sixth electronic reserve ledger associated with a first fiat balance indicating a sixth amount of fiat (e.g., Sixth Electronic Fiat Database 5514); and/or a seventh electronic intermediary ledger associated with a second intermediary, including for each customer, exchange account information including a second intermediary account balance indicating a seventh amount of the second digital asset (which may be similar in description to the First Electronic Exchange Ledger Database 5502 and/or the Third Electronic Ledger Database 5506, the descriptions of which applying herein), to name a few. In embodiments, the First Electronic Exchange Ledger Database 5502, the Second Electronic Interest Ledger Database 5504, the Third Electronic Ledger Database 5506, and/or the Fourth Electronic Reserve Ledger Database 5508 may be combined and/or dispersed between one or more databases. For example, at least two databases may include one or more of the following: the First Electronic Exchange Ledger Database 5502, the Second Electronic Interest Ledger Database 5504, the Third Electronic Ledger Database 5506, and/or the Fourth Electronic Reserve Ledger Database 5508. As another example, the First Electronic Exchange Ledger Database 5502, the Second Electronic Interest Ledger Database 5504, and/or Reserve Ledger Database 5508 may be stored in a first database and/or the Third Electronic Ledger Database 5506 may be stored in a second database.

The First Electronic Exchange Ledger Database 5502, in embodiments, may include the first electronic exchange ledger associated with the digital asset exchange and one or more first digital assets. In embodiments, the First Electronic Exchange Ledger Database 5502 may be associated with the digital asset exchange and a first digital asset. The first electronic exchange ledger, which may be included in the First Electronic Exchange Ledger Database 5502 may include, for each user (customer) of a plurality of users (e.g., customers of the digital asset exchange), account information associated with each respective customer. The one or more exchange accounts in embodiments, may each be an account with the digital asset exchange. In embodiments, one or more exchange accounts may be maintained in an omnibus account or an aggregated account including deposits of the first digital asset associated with multiple customers or users. Each respective customer exchange account may include, in embodiments, an account balance (e.g., a first account balance) associated with an amount (e.g., a first amount) of the one or more first digital assets (e.g., a first digital asset) held in the respective one or more exchange accounts (e.g., a respective customer exchange account). In embodiments, the first amount may represent an amount of the first digital asset available for transfer via the digital asset exchange. The first digital asset, in embodiments, may be maintained on a distributed public transaction ledger in the form of a blockchain that is maintained by a blockchain network including a plurality of geographically distributed computer systems in a peer-to-peer network.

The Second Electronic Interest Ledger Database 5504, in embodiments, may include the second electronic interest ledger associated with the digital asset exchange and one or more first digital assets. In embodiments, the Second Electronic Interest Ledger Database 5504 may be associated with the digital asset exchange and one or more first digital assets. The second electronic interest ledger which may include the Second Electronic Interest Ledger Database 5504 may include, for each user of the plurality of users, interest-bearing account information associated with each of one or more interest-bearing accounts associated with a respective one or more users of the plurality of users. The one or more interest-bearing accounts, in embodiments, may each be an account with the digital asset exchange. In embodiments, one or more interest-bearing accounts may be an omnibus account including deposits of the first digital asset associated with the respective one or more users. The one or more interest-bearing accounts may include, in embodiments, an account balance (e.g., a second account balance) associated with an amount (e.g., a second amount) of the one or more first digital assets (e.g., the first digital asset) held in a respective interest-bearing account (e.g., a respective customer interest-bearing account). In embodiments, the second amount may represent an amount of the first digital asset earning interest in the respective customer interest-bearing account. The one or more interest-bearing accounts may include, in embodiments, interest information (e.g., respective interest information). The interest information, in embodiments, may include one or more amounts of interests (e.g., a first amount of interest, a second amount of interest . . . an Nth amount of interest). In embodiments, the interest information may include one or more of the following: an amount of interest denominated in the first digital asset, an amount of interest denominated in fiat, an amount of interest denominated in a second digital asset, as amount if interest denominated in both the first digital asset and the second digital asset, a first interest rate, a second interest rate, and/or a combination thereof, to name a few. The second digital asset, in embodiments, may be a stable value token. The first interest rate, in embodiments, may be applicable for a first period of time. In embodiments, the second interest rate may be applicable for a second period of time. The first period of time and the second period of time, in embodiments, may be the same or different from one another. In embodiments, the interest information may include one or more interest amounts associated with the respective customer interest-bearing account. For example, the interest information may include one or more interest payments (e.g., the first interest amount and/or the second interest amount described below in connection with step S5522) associated with the respective customer interest-bearing account.

The Third Electronic Ledger Database 5506, in embodiments, may include the third electronic ledger associated with an intermediary, for example, a third party institution. The third electronic ledger which may be included in the Third Electronic Ledger Database 5506, in embodiments, may include, for each user of the plurality of users, intermediary account information associated with each a respective customer intermediary account associated with a respective customer. In embodiments, each respective customer intermediary account may be an account with the intermediary, third party institution, and/or the digital asset exchange. In embodiments, one or more intermediary accounts may be an omnibus account including deposits of the first digital asset associated with multiple users. Each respective customer intermediary account may include, in embodiments, an account balance (e.g., a third account balance) associated with an amount (e.g., a third amount) of the one or more first digital assets (e.g., the first digital asset) held in the respective intermediary customer account (e.g., a respective customer intermediary account). In embodiments, the third amount may represent an amount of the first digital asset which is loaned to one or more third parties (e.g., the third party institution). In embodiments, a portion of the third amount of the first digital asset may be loaned to one or more third parties. The third amount, in embodiments, may represent an amount of the first digital asset traded on the digital asset exchange or another digital asset exchange by one or more third parties (e.g., the third party institution) associated with the respective one or more intermediary accounts. The one or more intermediary accounts may include, in embodiments, return information (e.g., respective return information). The return information, in embodiments, may indicate a return to be provided to the respective one or more users for allowing the loan of at least a portion of the third amount of the first digital asset. The return information, in embodiments, may indicate a return (e.g., one or more payments based on the third amount of digital assets) to be provided to the respective one or more users for allowing the trade of at least a portion of the third amount of the first digital asset. In embodiments, the return information may include one or more of the following: a first return amount, a first return rate, a return payment schedule, and/or a combination thereof, to name a few. The first return amount, in embodiments, may be: denominated in the first digital asset, denominated in fiat, denominated in a second digital asset, a return rate, and/or a combination thereof. In embodiments, the second digital asset may be a stable value token. The first return rate, in embodiments, may include one or more of the following: a first return rate for a first period of time, a second return rate for a second period of time, and/or a combination thereof. The return payment schedule, in embodiments, may indicate when (e.g., a calendar date, day, month, year, and/or time, to name a few) all or a portion of a return amount (e.g., a payment, the first return amount) is scheduled to be made to the respective one or more users. The payment schedule may indicate when and how much of the return amount is to be dispersed to the respective one or more users. In embodiments, the return payment schedule may indicate that disbursements (all or a portion of the return amount) are to be made periodically or aperiodically. In embodiments, one or more interest bearing accounts, in embodiments, may be associated with one or more intermediary systems. The one or more intermediary systems, in embodiments, may include one or more brokers, one or more lenders, one or more agents of one or more brokers, one or more agents of one or more lenders, and/or a combination thereof, to name a few.

The Fourth Electronic Reserve Ledger Database 5508 may include the fourth electronic reserve ledger associated with the digital asset exchange and one or more first digital assets. In embodiments, the Fourth Electronic Reserve Ledger Database 5508 may be associated with the digital asset exchange and one or more first digital assets. In embodiments, the fourth electronic ledger which may be included in the Fourth Electronic Reserve Ledger Database 5508 may include, for each user of the plurality of users, reserve account information associated with a respective reserve account associated with each respective customer. The one or more reserve accounts, in embodiments, may each be an account with the digital asset exchange. In embodiments, one or more reserve accounts may be an omnibus account including deposits of the first digital asset associated with multiple users or customers. The reserve account information may include, in embodiments, an account balance (e.g., a fourth account balance) associated with an amount (e.g., a fourth amount) of the one or more first digital assets (e.g., the first digital asset) held in a respective reserve account (e.g., a respective customer reserve account) for each customer. In embodiments, the account balance may be associated with an amount of fiat, an amount of a first digital asset, an amount of a second digital asset and/or a combination of the above. In embodiments, the one or more reserve accounts adhere to one or more reserve rules accessible by the digital asset exchange. The one or more reserve rules, in embodiments, may be designed to maintain a ratio between the third amount of the first digital asset and the fourth amount of the first digital asset. The one or more reserve rules, in embodiments, may be designed to maintain a ratio between the third amount of the first digital asset and an amount of fiat.

In embodiments, the one or more databases may include a fifth electronic ledger stored in a fifth electronic exchange ledger database. The fifth electronic ledger, in embodiments, may be associated with a second digital asset. In embodiments, the fifth electronic ledger may include, for each user of the plurality of users: second exchange account information associated with each respective customer exchange account. In embodiments, the second exchange account information, for each user of the plurality of users, may include a fifth digital asset account balance with associated with a first amount of the second digital asset held in the respective customer exchange account. In embodiments, the first amount of the second digital asset may represent an amount of the second digital asset that is available for transfer via the digital asset exchange into the respective customer interest-bearing account. The fifth electronic ledger database may include the fifth electronic ledger and may be similar to the First Electronic Ledger Database 5502 described herein connection with FIG. 55A-1, the description of which applying herein. For example, in embodiments where the second digital asset is transferred from and/or into the respective customer exchange account associated with the second digital asset, the digital asset exchange computer system may update the fifth electronic ledger to reflect transfer of the amount of second digital asset transferred in and/or out of the respective customer exchange account.

Referring to FIG. 55A-5, in embodiments, the one or more databases may include a sixth electronic fiat ledger stored in a sixth electronic exchange ledger database (e.g., the fiat ledger associated with the Sixth Electronic Fiat Ledger Database 5514). The sixth electronic fiat ledger, in embodiments, may be associated with a first fiat. In embodiments, the sixth electronic ledger may include, for each user of the plurality of users: first fiat account information associated with each respective customer exchange fiat account. In embodiments, the first fiat account information, for each user of the plurality of users, may include a sixth account balance of the respective customer exchange fiat account. The sixth account balance, in embodiments, may indicate a first amount of the first fiat. In embodiments, the first amount of fiat may represent an amount of the fiat that is available for transfer via the digital asset exchange into the respective customer interest-bearing account. In embodiments, the first amount of fiat may represent an amount of the fiat that is available to purchase one or more digital assets via the digital asset exchange. The purchased digital assets, in embodiments, may be deposited directly into the respective exchange account associated with the first customer. In embodiments, the purchased digital assets may be deposited directly into the respective customer interest-bearing account (a more detailed description of which is located below in connection with the description of the process illustrated in FIG. 55A-6 and FIG. 55A-7, the descriptions of which applying herein). The sixth electronic ledger database may be similar to the First Electronic Ledger Database 5502 described herein connection with FIG. 55A-1, the description of which applying herein. For example, in embodiments where fiat is transferred from and/or into the respective customer exchange fiat account associated with fiat, the digital asset exchange computer system may update the sixth electronic ledger to reflect transfer of the amount of first fiat transferred in and/or out of the respective customer exchange account. The first fiat, for example, may be one or more of the following: USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few.

In embodiments, the one or more databases may include a seventh electronic ledger stored in a seventh electronic ledger database. In embodiments, the seventh electronic ledger may be a second intermediary electronic ledger associated with a second intermediary and may provide second return. The second intermediary electronic ledger, in embodiments, may include, for each user of the plurality of users, a fifth digital asset account balance indicating a sixth amount of the first digital asset associated with a second respective customer intermediary account. The second respective customer interest-bearing account, in embodiments, may be associated with the first respective customer interest-bearing account. In embodiments, the one or more databases may include one or more additional intermediary electronic ledgers which may be associated with additional intermediaries.

In embodiments, the First Electronic Exchange Ledger Database 5502, the Second Electronic Interest Ledger Database 5504, the Third Electronic Ledger Database 5506, the Fourth Electronic Reserve Ledger Database 5508, the fifth electronic exchange ledger database, the sixth electronic exchange ledger database, and/or the seventh electronic exchange ledger database may each be stored on one or more computer-readable media operatively connected to a digital asset exchange computer system associated with the digital asset exchange. For example the First Electronic Exchange Ledger Database 5502, the Second Electronic Interest Ledger Database 5504, Reserve Ledger Database 5508, the fifth electronic exchange ledger database, the Sixth Electronic Fiat Ledger Database 5514, and/or the seventh electronic intermediary ledger database may be stored on memory 5302-C. Continuing the example, the digital asset exchange 5306 would access the First Electronic Exchange Ledger Database 5502 via the digital asset exchange computer system 5302. In embodiments, the First Electronic Exchange Ledger Database 5502, the Second Electronic Interest Ledger Database 5504, Reserve Ledger Database 5508, the fifth electronic exchange ledger database, the Sixth Electronic Fiat Ledger Database 5514, and/or the seventh electronic intermediary ledger database may be maintained and/or stored on a plurality of geographically distributed computer systems in the peer-to-peer network. The First Electronic Exchange Ledger Database 5502, the Second Electronic Interest Ledger Database 5504, Reserve Ledger Database 5508, the fifth electronic exchange ledger database, the Sixth Electronic Fiat Ledger Database 5514, and/or the seventh electronic intermediary ledger database, in embodiments, may be maintained and/or stored on a blockchain (e.g., the blockchain 1807) and/or off a blockchain as a sidechain which may later be published, periodically or aperiodically, to the blockchain.

Referring back to FIG. 55A, in embodiments, the process may continue with step S5504. At step S5504, in embodiments, the digital asset exchange system may receive first customer access credentials from a first customer device (e.g., first user device 105*a*) associated with a first user (first customer) of the plurality of users (customers of the digital asset exchange). First customer (e.g., first user) access credentials may include one or more of a username, password, biometric data access card scan (e.g., swipe of a card associated with the exchange and having a magnetic strip), and/or a pin (e.g., a number provided via SMS, other text message service, or email for multi-factor authentication), to name a few. For example, the first customer access credentials may include a user name and password associated with the first user. In embodiments, multi-factor authentication may be used for the first user to access the first user's accounts with the digital asset exchange. In embodiments, the multi-factor authentication may include the use of an authorization code that is sent to a predetermined user device, e-mail address, or mobile phone number, to name a few, associated with the first user, for example, as used in AUTHY® (AUTHY® is a registered trademark of Twilio, Inc.). In embodiments, other multi-factor verifications may be used, such as identification of a user device associated with the first user based on phone number or mobile network, location information and shared secret verification, to name a few.

Once the first customer access credentials are received by the digital asset exchange system, the digital asset exchange system may authenticate the received access credentials (at step S5506), and, if verified, grant the first user access. In embodiments, the digital asset exchange may authenticate the first customer access credentials by associating the first user access credentials with at least one of a respective customer digital asset exchange account, a respective customer interest-bearing account, a respective customer reserve account, and/or a combination thereof. In embodiments, if the first user access credentials are not or cannot be authenticated, the digital asset exchange system may prevent access and notify the first user of the denied access (e.g., via a notification). In embodiments, the first customer access credentials may be similar to user identification data 5110 and/or user authentication data 5112 described above in connection with FIG. 5A, the description of which applying herein.

Figure 55B:
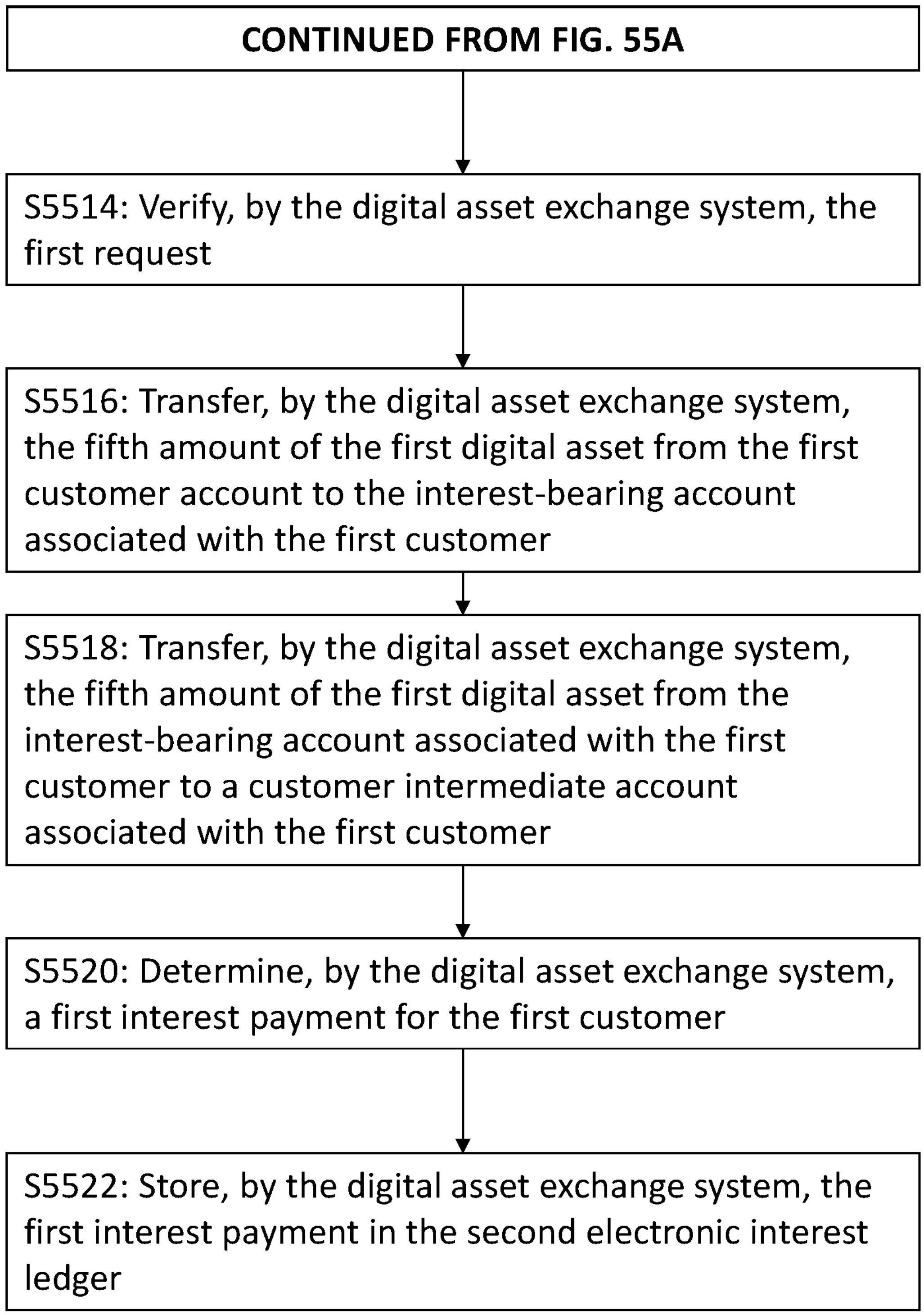
Figure 55C:
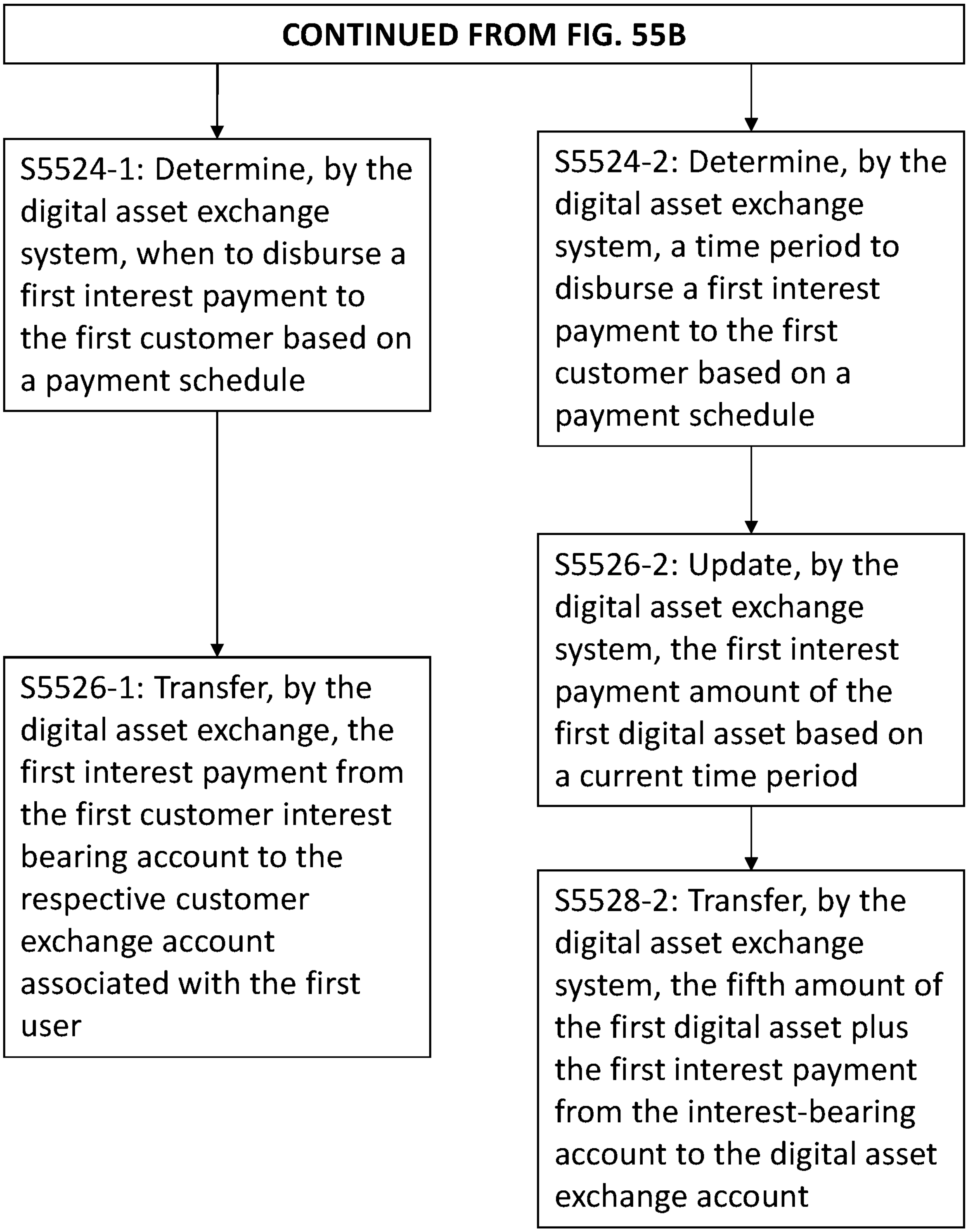
Figures 1, 55A:
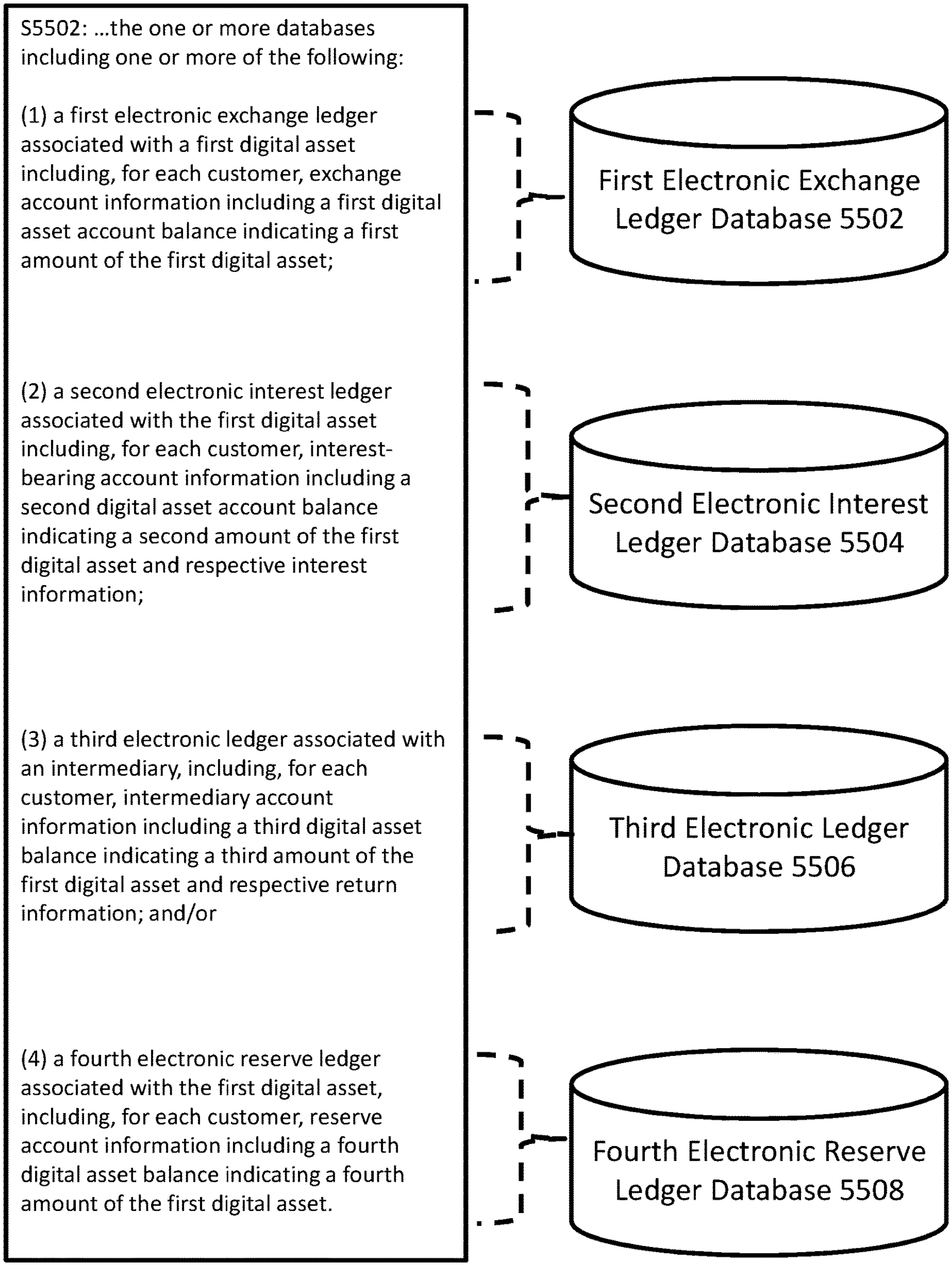
Figures 5, 55A:
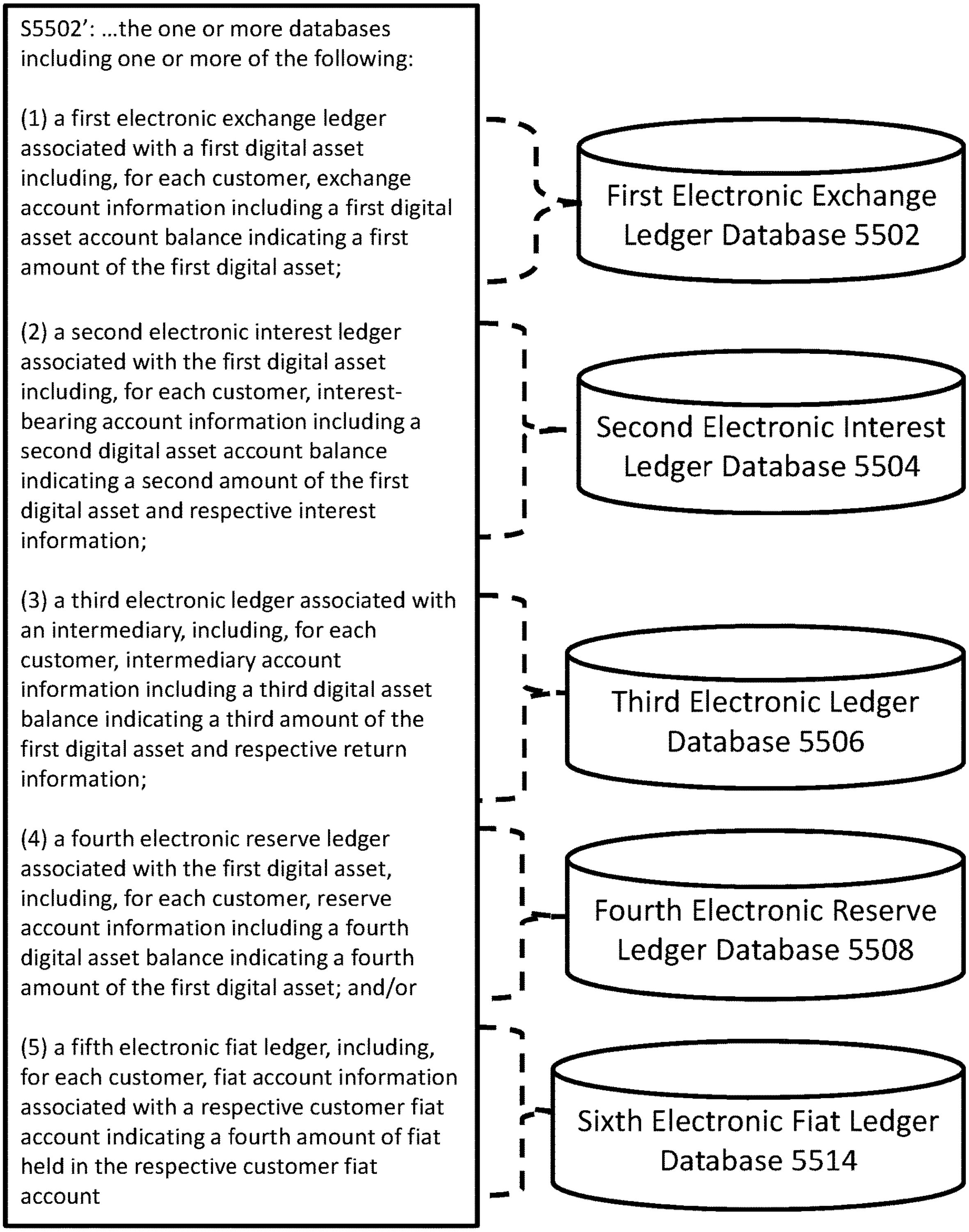
Figure 79A:
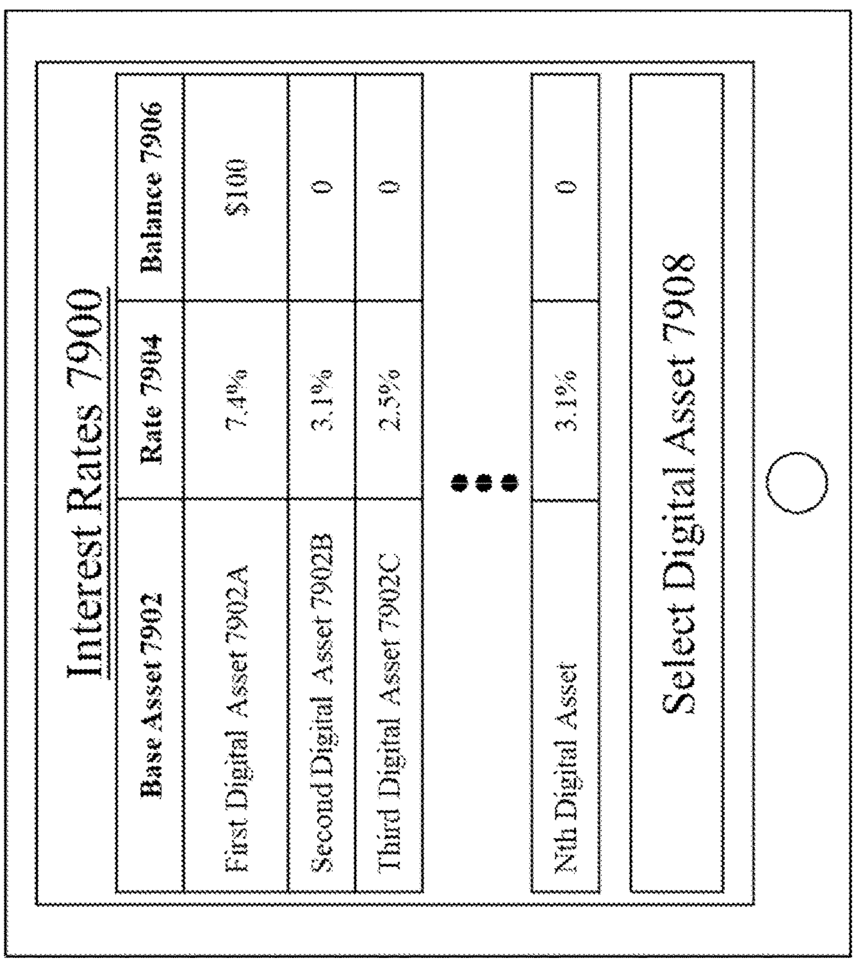
FIGS. 79A through 79C are exemplary diagrams illustrating exemplary graphical user interfaces in accordance with exemplary embodiments of the present invention.
Figure 79B:
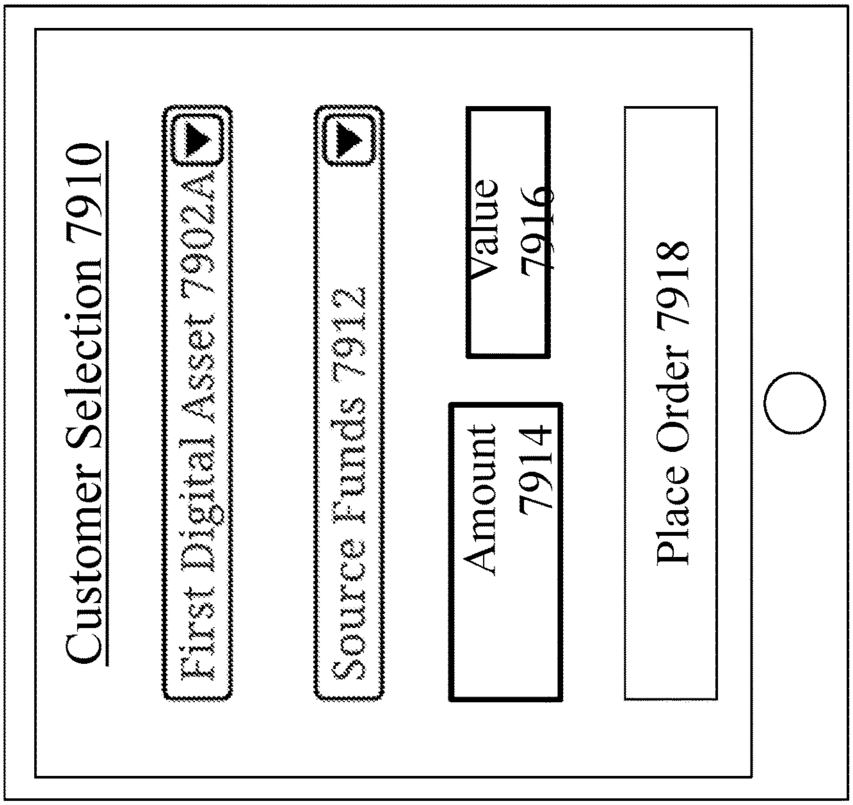
Figure 79C:
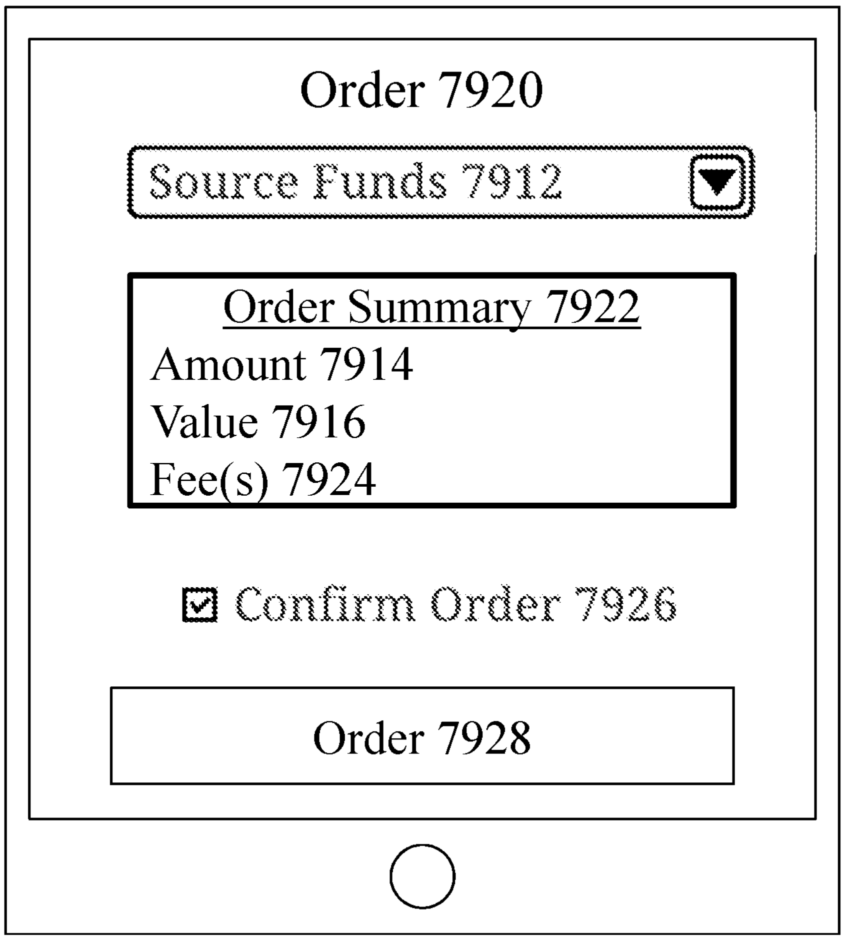

The process of FIG. 55A through FIG. 55C, in embodiments, may continue with step S5508. At step S5508, in embodiments, the digital asset exchange computer system may generate a first response. The first response, in embodiments, may include computer-readable instructions, that, when executed by the first user device, cause the first user device to display a first graphical user interface on a display associated with the first user device. The first graphical user interface, in embodiments, may include information associated with the first user and/or the accounts associated with the first user and the digital asset exchange. For example, referring to FIG. 55A-2, the first graphical user interface (of the first request) displayed may include: customer identification information associated with the first user (e.g., one or more of an identification including letters, numbers and/or symbols; a public address associated with the respective user; a username; the respective user's name; the respective user's address; intermediary selection information (described below in more detail in connection with FIG. 55C, the description of which applying herein) and/or all or part of the respective user's social security number, by way of example, to name a few), a first digital asset account balance associated with the first user; a second digital asset account balance associated with the first user; a transfer option to transfer one or more digital assets into an interest-bearing account associated with the first user (e.g., the account associated with the second digital asset account balance); interest information associated with the account associated with the second digital asset account balance; an option to purchase and directly deposit into an interest-bearing account associated with the first user, and/or a combination thereof, to name a few. An exemplary request is illustrated in connection with FIG. 79A. Referring to FIG. 79A, in embodiments, the exemplary request may include one or more interest rates 7900. Interest Rates 7900, in embodiments, may include one or more of the following: a base asset 7902 (e.g., first digital asset 7902A, Second Digital Asset 7902B, Third Digital Asset 7902C . . . Nth Digital Asset, to name a few); rate 7904 (e.g., the offered interest rate for the respective base asset 7902); balance 7902 (e.g., the respective customer balance associated with the respective base asset 7902); an option to select the digital asset 7908, and/or a combination thereof, to name a few. An additional exemplary request is illustrated in connection with FIG. 79B. Referring to FIG. 79B, in embodiments, the request may be for a customer selection 7910 where the customer can: select the base asset 7902 (illustrated as the first digital asset 7902A), select a source for the purchase and/or transfer (e.g., source funds 7912, select an amount 7914 and/or value 7916 of the first digital asset, place the order 7918 and/or a combination thereof, to name a few. The source funds 7912, in embodiments, may refer to one or more of the following: a digital asset account associated with the respective customer (e.g., the respective digital asset exchange account), a fiat account associated with the respective customer, a third-party bank account (e.g., for a wire transfer), a credit card, a debit card, and/or a combination thereof, to name a few. In embodiments, each order may be confirmed prior to execution. For example, the digital asset exchange computer system may generate and send order confirmations after receiving the inputted response to the first request. For example, referring to FIG. 79C, the order 7920 confirmation may include order summary 7922 which may include the amount 7914, value, and/or any applicable fee(s) 7924. The order 7920 confirmation, in embodiments, may include a box to check to confirm the order 7926. The order 7920 confirmation, in embodiments, may include an input for the customer to select (e.g., order 7928) to indicate the order is confirmed. An additional exemplary request is illustrated in connection with FIG. 55A-3. Referring to FIG. 55A-3, in embodiments, an Exemplary First Request 5510 includes the following: a customer identification (Customer Identification No. 1234), a first digital asset account balance (10 Digital assets), a first digital asset interest (Interest 1), a second digital asset account balance (100 Digital assets); a second digital asset interest (Interest 2), and a transfer option. As shown in FIG. 55A-3, Exemplary First Request 5510's transfer option may enable the respective user to choose an account to transfer from (e.g., Account 1 or Account 2) and an account to transfer to (e.g., Account 1 or Account 2). In embodiments, the Exemplary first request may include an option to transfer a portion (e.g., 100%, 50%, maximum allowable) of a digital asset into an interest-bearing account.

Referring back to FIG. 55A, the process may continue with step S5510. At step S5510, in embodiments, the first request is sent by the digital asset exchange system to the first customer device (e.g., via network 125). The first customer device, in embodiments, may receive the first request. Upon receiving the first request, the first customer device, in embodiments, may execute the computer-readable instructions and display the first graphical user interface.

In embodiments, the process may continue with the first customer device generating and sending a request to transfer an amount (e.g., a fifth amount) of the one or more first digital assets (e.g., the first digital asset) from an exchange account associated with the first customer (e.g., the respective customer exchange account) to an interest bearing account (e.g., the respective customer interest bearing account). The request, in embodiments, may be generated via the transfer option of the first request. In embodiments, the request may be sent by the first customer device to the digital asset exchange system via network 125.

In embodiments, the process may continue with step S5512. At step S5512, in embodiments, the digital asset exchange system may receive, from the first customer device, the first request. The first request, in embodiments, may be to transfer a fifth amount of the first digital asset from a first customer account associated with the first customer to an interest-bearing account associated with the first customer. The first request, for example, may include one or more of the following: identification information associated with the first digital asset (e.g., information indicating the type of digital asset), the fifth amount of the first digital asset, first source information associated with the first customer exchange account, first destination information associated with the customer interest-bearing account, first customer access credentials, a first public address (e.g., a first digital address) on the blockchain associated with the first customer, a second public address (e.g., a second digital address) on the blockchain associated with the first customer and/or the digital asset exchange, and/or a combination thereof, to name a few. In embodiments, the first source information may include a first digital address (e.g., the first public address) associated with the underlying blockchain of the first digital asset and/or the respective customer exchange account associated with the first customer. The first digital address, in embodiments, may be associated with one or more of the following: an omnibus account associated with the plurality of users, and/or a segregated account associated with the first customer, to name a few. The first destination information, in embodiments, may include a second digital address (e.g., the second public address) associated with the underlying blockchain and/or the respective customer interest bearing account associated with the first customer. The second digital address, in embodiments, may be associated with one or more of the following: an omnibus account associated with the plurality of users, and/or a segregated account associated with the first customer, to name a few.

Figures 6, 55A:
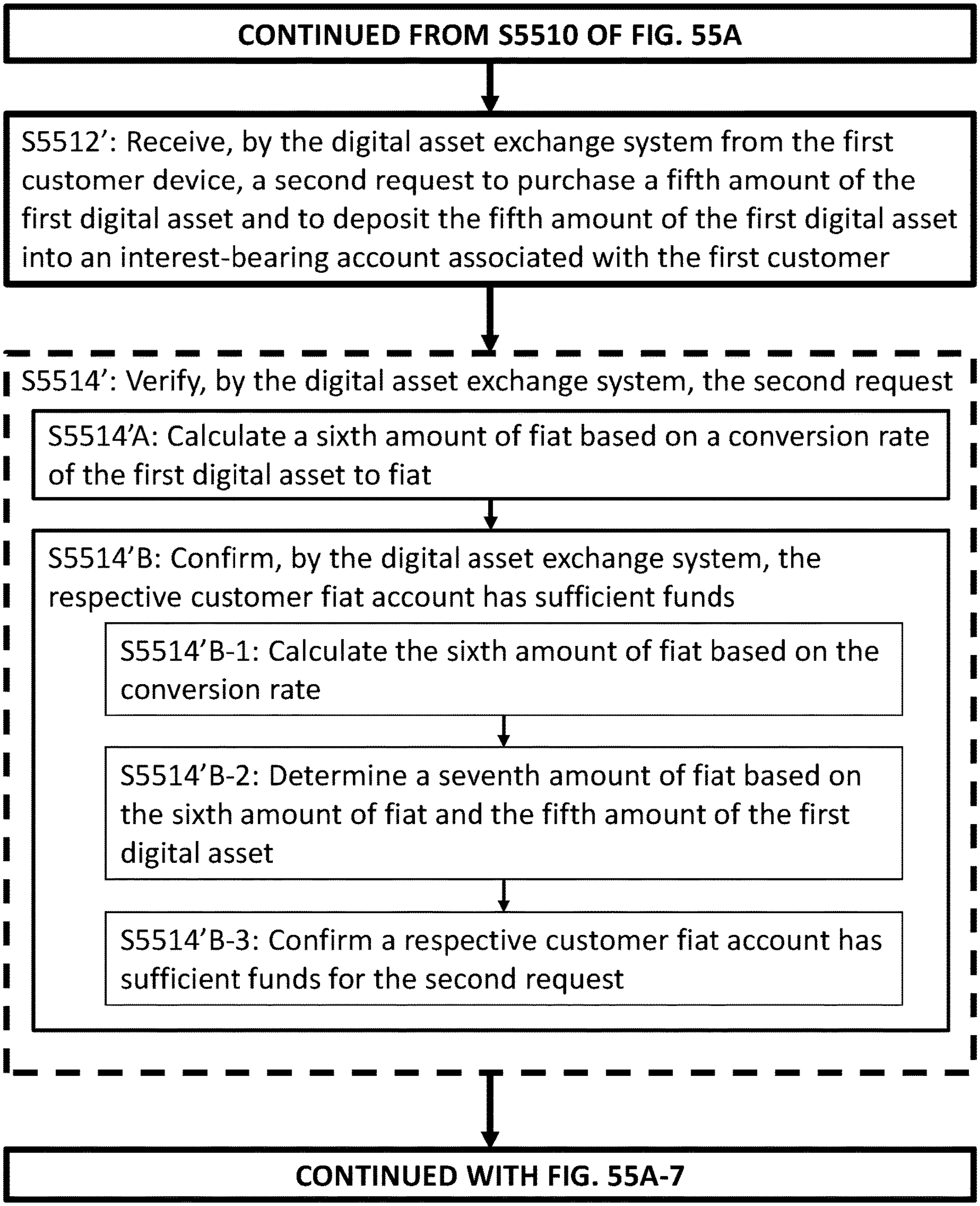
Figures 7, 55A:
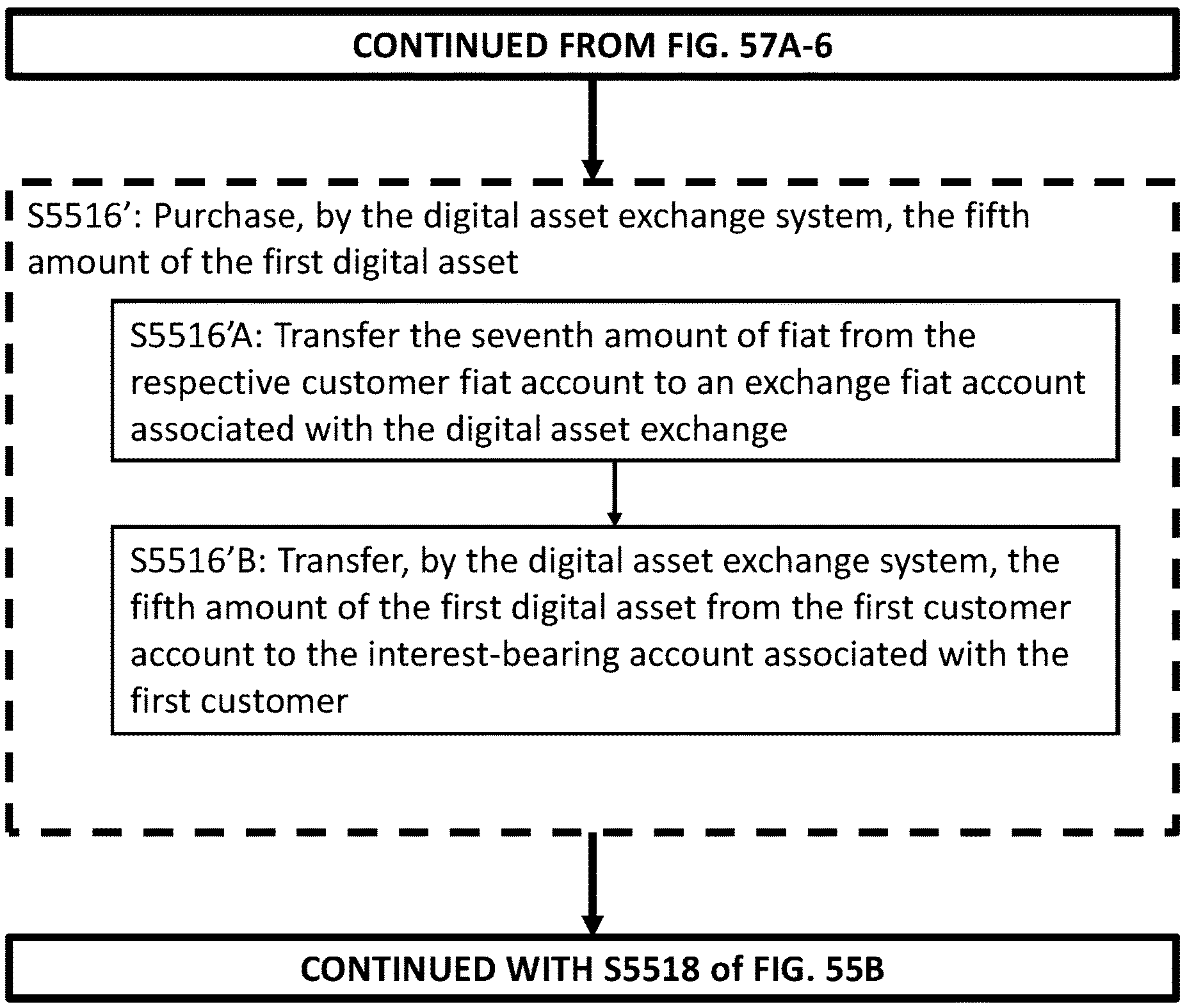

Referring back to step S5510, in embodiments, the process may continue with step S5512'. Referring to FIG. 55A-6, at step S5512', in embodiments, the digital asset exchange system may receive a second request to purchase a fifth amount of the first digital asset and to deposit the fifth amount of the first digital asset into an interest-bearing account associated with the first customer. For example, the first customer may want to purchase the fifth amount of the first digital asset and deposit the fifth amount into the first customer's interest bearing account. The purchase, in embodiments, may be a request to purchase the fifth amount of the first digital asset, using a balance of a respective fiat account associated with the first customer (e.g., the sixth account balance). The second request, may include one or more of the following: the fifth amount of the first digital asset, first source information associated with the respective fiat customer exchange account, first destination information associated with the customer interest-bearing account, first customer access credentials, a first public address on the blockchain associated with the first customer, a second public address on the blockchain associated with the first customer and/or the digital asset exchange, and/or a combination thereof, to name a few. The description of the second request herein, may be similar to the description of the first request in connection with step S5512 of FIG. 55A, the description of which applying herein.

In embodiments, step S5512' may continue with step S5514'. At step S5514', in embodiments, the digital asset exchange system verifies the second request. Verifying the second request, in embodiments, may begin with step S5514'A where the digital asset exchange system may calculate a sixth amount of fiat based on a conversion rate of the first type of digital asset to the first type of fiat. The conversion rate, in embodiments, may be accessible via the digital asset exchange computer system associated with the digital asset exchange. In embodiments, the conversion rate may be obtained from a third-party and/or a trust third-party. In embodiments the conversion rate may be an average and/or weighted average of one or more conversion rates sourced from multiple parties including, in embodiments, the digital asset exchange. In embodiments, step S5514'A may continue with S5514'B where the digital asset exchange system confirms the customer fiat account has sufficient funds to purchase the fifth amount of the first digital asset. Confirming the first customer has sufficient funds, in embodiments, may begin with step S5514'B-1 where the sixth amount of fiat is calculated based on the conversion rate. The sixth amount of fiat, in embodiments, may include fiat for the purchase of the fifth amount of the first digital asset. The sixth amount of fiat, in embodiments, may be obtained from the customer fiat account. In embodiments, the sixth amount of fiat may be obtained from the digital asset exchange. In embodiments, at step S5514'B-2, the digital asset exchange determines a seventh amount of fiat based on the sixth amount of fiat and the fifth amount of the first digital asset. The seventh amount of fiat, in embodiments, may include fiat for the purchase of the fifth amount of the first digital asset and fees associated with one or more transactions to obtain the fifth amount of the first digital asset. In embodiments, the seventh amount of fiat may be the sixth amount of fiat. The confirmation of sufficient funds, in embodiments, may continue with step S5514'B-3 where the digital asset exchange system confirms the customer fiat account has sufficient funds for the second request. For example, the digital asset exchange system may confirm the customer fiat account has a balance equal to or greater than the seventh amount of fiat. As another example, the digital asset exchange system may confirm the customer fiat account has a balance equal to or greater than the sixth amount of fiat.

If, in embodiments, the customer fiat account has an insufficient balance, the digital asset exchange system may, for example, decline the transaction. Continuing the example, the digital asset exchange system, in embodiments, may generate and send a notification to the first customer device indicating the transaction was declined and/or why the transaction was declined. As another example, the digital asset exchange system may partially execute the transaction, utilizing the balance of the customer fiat account. Continuing the example, the digital asset exchange system, in embodiments, may generate and send a notification to the first customer device indicating the partially executed transaction and/or why the transaction was partially executed. As another example, the digital asset exchange system may partially execute the transaction, utilizing the balance of the customer fiat account. Continuing the example, the difference between the balance of the customer fiat account and the seventh amount of fiat may be made up by one or more digital assets in the customer exchange account. Continuing the example, the digital asset exchange system, in embodiments, may generate and send a notification to the first customer device indicating the partially executed transaction and/or the digital assets used to make up the difference.

Figure 7:
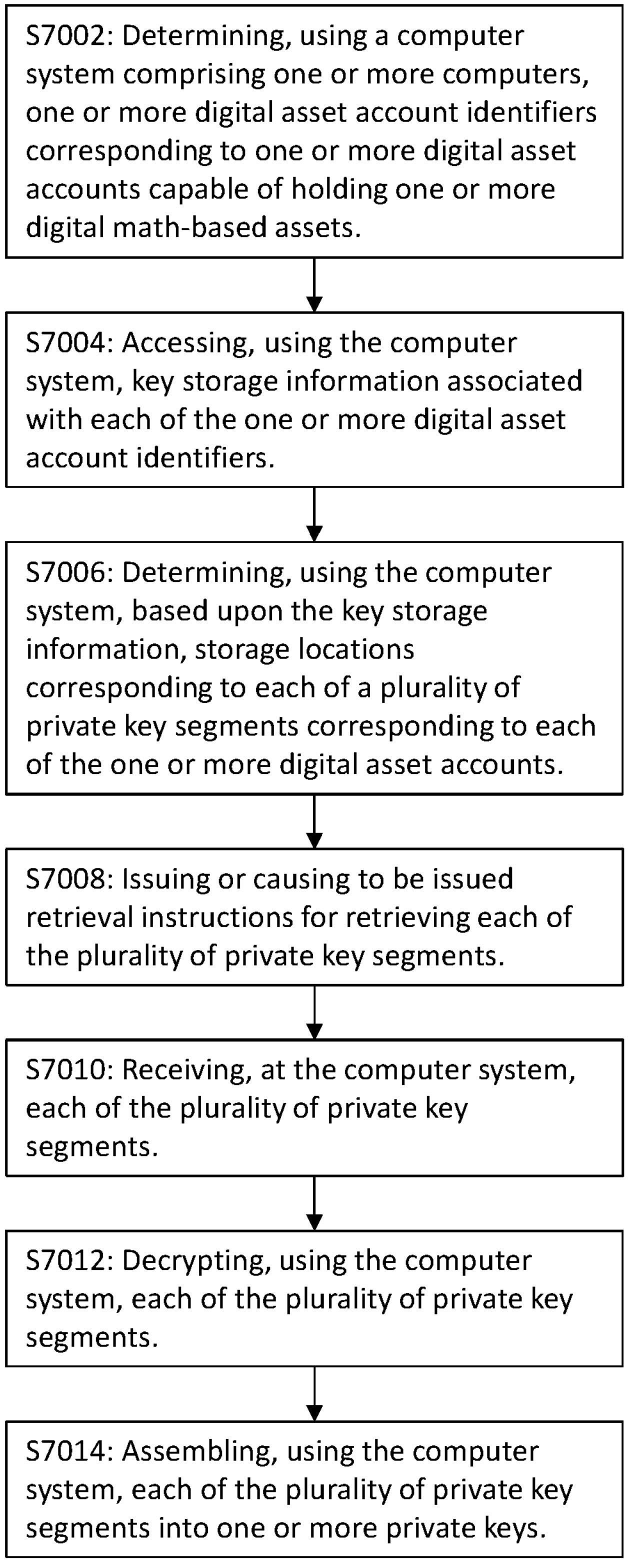
FIG. 7 is a flow chart of an exemplary process for retrieving securely stored keys associated with a digital asset account in accordance with exemplary embodiments of the present invention.

Referring to FIG. 55A-7, in embodiments, step S5514' may be followed by step S5516'. At step S5516', in embodiments, the digital asset exchange may purchase the fifth amount of the first digital asset to the interest-bearing account associated with the first customer. Step S5516', in embodiments, may begin with step S5516'A where the digital asset exchange system may transfer the seventh amount of fiat from the respective customer fiat account to an exchange fiat account associated with the digital asset exchange. In embodiments, the transfer of the seventh amount of fiat may be a ledger transaction (which may be similar to the ledger transactions described throughout this application, the description of which applying herein). In embodiments, the purchase of the fifth amount of the first digital asset may be a blockchain transaction (which may be similar to the blockchain transactions described throughout this application, the description of which applying herein). In embodiments, step S5516' may continue with step S5516'B. At step S5516'B, in embodiments, the digital asset exchange system may transfer the fifth amount of the first digital asset from the first customer account to the interest-bearing account associated with the first customer. In embodiments, the transfer of the fifth amount of the first digital asset may be a ledger transaction (which may be similar to the ledger transactions described throughout this application, the description of which applying herein). In embodiments, the transfer of the fifth amount of the first digital asset may be a blockchain transaction (which may be similar to the blockchain transactions described throughout this application, the description of which applying herein). In embodiments, step S5516' may continue with step S5518 of FIG. 55B.

Referring back to FIG. 55A. In embodiments, the process of FIG. 55A through FIG. 55C may continue with FIG. 55B. Referring to FIG. 55B, in embodiments, the process may continue with step S5514. At step S5514, in embodiments, the digital asset exchange system may verify the first request. The request, in embodiments, may be verified by determining whether the first customer has sufficient funds to cover the first request. For example, the digital asset exchange system may confirm that the fifth amount of the first digital asset is less than or equal to the first digital asset account balance associated with the first customer. In embodiments, the digital asset exchange may verify access credentials associated with the first user to verify the first request. If, for example, the first request cannot be verified, the digital asset exchange system may deny the first request and/or notify the first customer of the reason(s) why the first request was denied.

In embodiments, the process illustrated in connection with FIG. 55A through FIG. 55C may continue with step S5516. At step S5516, in embodiments, the digital asset exchange computer system may execute the verified first request by transferring the amount of the one or more first digital assets. For example, the digital asset exchange computer system may transfer the fifth amount of the first digital asset from the first customer account to the interest-bearing account associated with the first customer. In embodiments, the transfer of the fifth amount of the first digital asset may be executed via a ledger (e.g., the first electronic exchange ledger stored in the First Electronic Exchange Ledger Database 5502).

For example, transferring the fifth amount of the first digital asset may begin with the digital asset exchange system updating the first electronic exchange ledger which may be included in the First Electronic Exchange Ledger Database 5502 to reflect the transfer of the fifth amount of the first digital asset out of the respective customer exchange account (and/or the fifth amount plus the reserve amount) and/or updating the second electronic interest ledger to update the the respective customer interest-bearing account. Continuing the example, the digital asset exchange system may update the second electronic interest ledger which may be included in the Second Electronic Interest Ledger Database 5504 to reflect the transfer of the fifth amount of the first digital asset into the respective customer interest bearing account; and/or the respective interest information associated with the fifth amount of the first digital asset (and/or the fifth amount less the reserve amount). In embodiments, the example may continue with the digital asset exchange system calculating a reserve amount associated with the fifth amount of the first digital asset. The reserve amount, in embodiments, may be calculated based on at least one reserve requirement (e.g., the one or more reserve rules described above) and the fifth amount of the first digital asset. Continuing the example, the calculated reserve amount may be transferred by updating the fourth electronic reserve ledger which may be included in the Fourth Electronic Reserve Ledger Database 5508 to reflect transfer of the reserve amount to the respective customer reserve account. In embodiments, the digital asset exchange system may update the second electronic interest ledger which may be included in the Second Electronic Interest Ledger Database 5504 to reflect the transfer of the fifth amount of the first digital asset less the reserve amount into the respective customer interest bearing account. In embodiments, the fourth electronic reserve ledger may not be used at all and there may be no respective customer reserve account for each customer of the digital asset exchange.

In embodiments, the digital asset exchange may transfer the fifth amount of digital assets by generating a first transfer message. The first transfer message, in embodiments, may include instructions to transfer: the fifth amount of the first digital asset from the first digital address to the second digital address; the fifth amount of the first digital asset less the reserve amount from the first digital address to the second digital address; the reserve amount of first digital asset from the first digital address to a third digital address associated with the respective customer reserve account; and/or a combination thereof. Continuing the example, the first transfer message, in embodiments, may be published by the digital asset exchange system to a plurality of geographically distributed computer systems in a peer-to-peer network. In embodiments, the published instructions may be verified and/or executed by the plurality of geographically distributed computer systems in the peer-to-peer network. The executed transactions associated with the first transfer message, in embodiments, may be published by the plurality of geographically distributed computer systems in the peer-to-peer network.

In embodiments, the process illustrated in connection with FIG. 55A through FIG. 55C may continue with step S5518. At step S5518, in embodiments, the digital asset exchange system may transfer the fifth amount of the first digital asset from the interest-bearing account associated with the first customer to a customer intermediate account associated with the first customer, an intermediary between the digital asset exchange, and/or one or more third party institutions. The digital asset exchange system, for example, may transfer the fifth amount of the first digital asset by first updating the second electronic interest ledger which may be included in the Second Electronic Interest Ledger Database 5504 to reflect the transfer of the fifth amount of the first digital asset out of the respective customer interest bearing account. Continuing the example, the digital asset exchange system may update the second electronic ledger which may be included in the Third Electronic Ledger Database 5506 to reflect the transfer of the fifth amount of the first digital asset into the respective customer intermediate account. As another example, in embodiments, the digital asset exchange system may transfer the fifth amount of the first digital asset by updating the second electronic interest ledger which may be included in the Second Electronic Interest Ledger Database 5504 to reflect the transfer of the fifth amount of the first digital asset less a reserve amount out of the respective customer interest bearing account. Continuing the example, the digital asset exchange system may update the third electronic ledger which may be included in the Third Electronic Ledger Database 5506 to reflect the transfer of the fifth amount of the first digital asset less the reserve amount into the respective customer intermediary account. The digital asset exchange system, continuing the example, may update the Fourth Electronic Reserve Ledger Database 5508 to reflect the transfer of the reserve amount into the respective customer reserve account.

In embodiments, the digital asset exchange may transfer at least a portion of the fifth amount of digital assets by generating a second transfer message. The second transfer message, in embodiments, may include instructions to transfer: at least a portion of the fifth amount of the first digital asset from the second digital address associated with the respective customer interest bearing account to a fourth digital address associated with the respective customer intermediary account; the fifth amount of the first digital asset less the reserve amount from the second digital address to the fourth digital address; the reserve amount of first digital asset from the first digital address to the third digital address. Continuing the example, the second transfer message, in embodiments, may be published by the digital asset exchange system to a plurality of geographically distributed computer systems in a peer-to-peer network. In embodiments, the published instructions may be verified and/or executed by the plurality of geographically distributed computer systems in the peer-to-peer network. The executed transactions associated with the second transfer message, in embodiments, may be published by the plurality of geographically distributed computer systems in the peer-to-peer network.

In embodiments the second digital address is associated with a smart contract. For example, the second digital address (e.g., decentralized lending smart contract address 5512A) may be associated with the decentralized lending smart contract 5512. The second digital address (and the exemplary smart contracted associated therewith), in embodiments, may be similar to the decentralized lending smart contract address 5512A (and the decentralized lending smart contract 5512), described above in connection with FIG. 55A-4, the entire description of the decentralized lending smart contract 5512 applying herein.

In embodiments, the digital asset exchange or intermediary may be associated with a smart contract including smart contract instructions on the blockchain enabled to provide decentralized lending to one or more users. The digital asset exchange system, in such embodiments, may generate a second message including instructions to transfer at least a portion of the fifth amount of the first digital asset to a fourth digital address associated with the smart contract and a respective customer intermediate account. The second message, in embodiments, may be published to the distributed public transaction ledger in the form of the blockchain. The published message, in embodiments, may be verified and/or executed by the plurality of geographically distributed computer systems in the peer-to-peer network. In embodiments, the fourth digital address (e.g., decentralized lending smart contract address 5512A) may include first smart contract instructions (e.g., decentralized lending smart contract instructions 5512B). A more detailed example of the first smart contract instructions is described in connection with FIG. 55A-4. For example, referring to FIG. 55A-4, a decentralized lending smart contract 5512 may have public address 5512A on the blockchain 6803 and smart contract instructions 5512B saved as part of the blockchain 6803. In embodiments, the decentralized lending smart contract address 5512A may be associated with one or more proxy smart contracts which may then issue calls to one or more other smart contracts having their own smart contract addresses on the blockchain 6803.

Figure 78A:
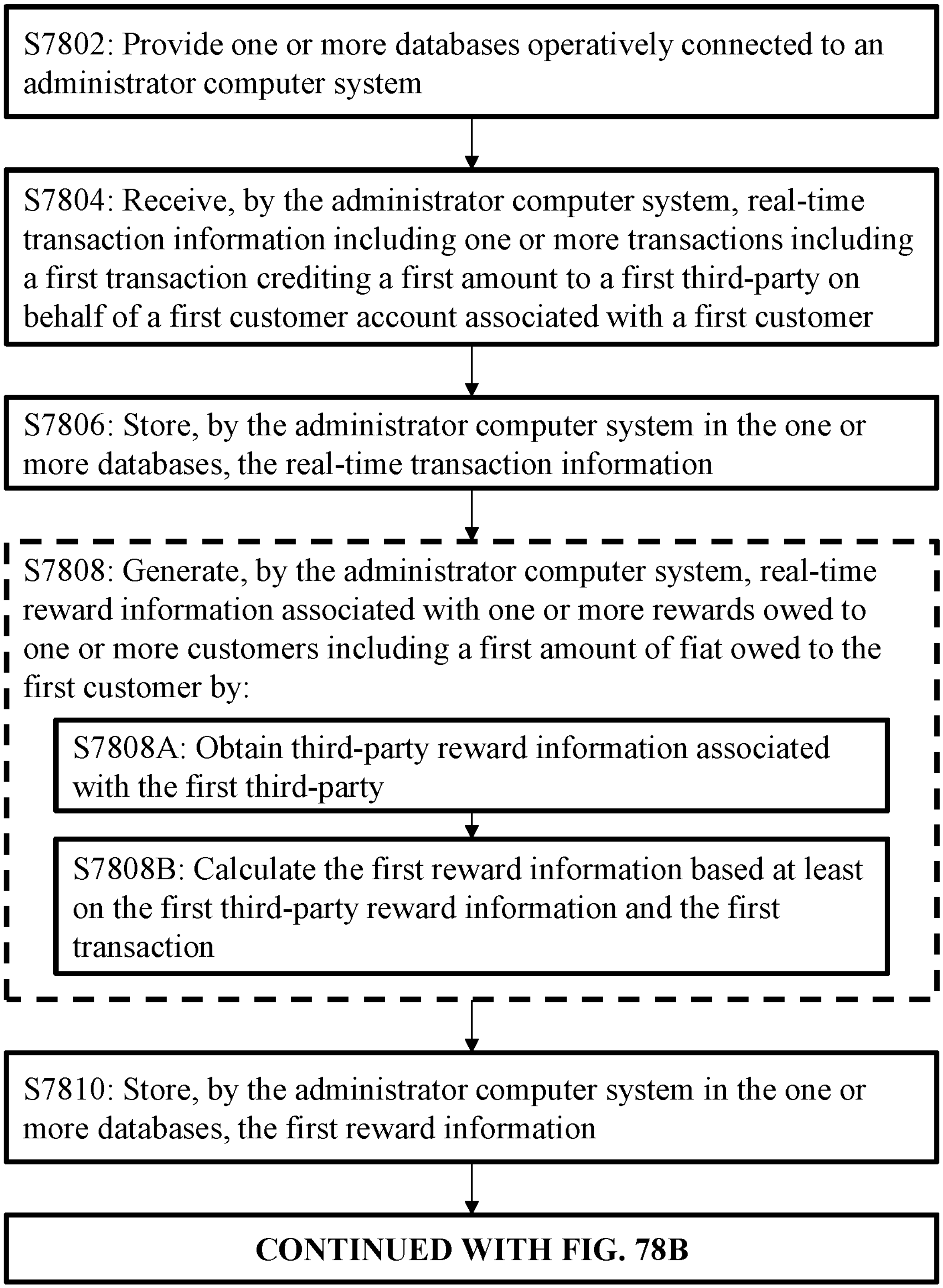
Figure 78B:
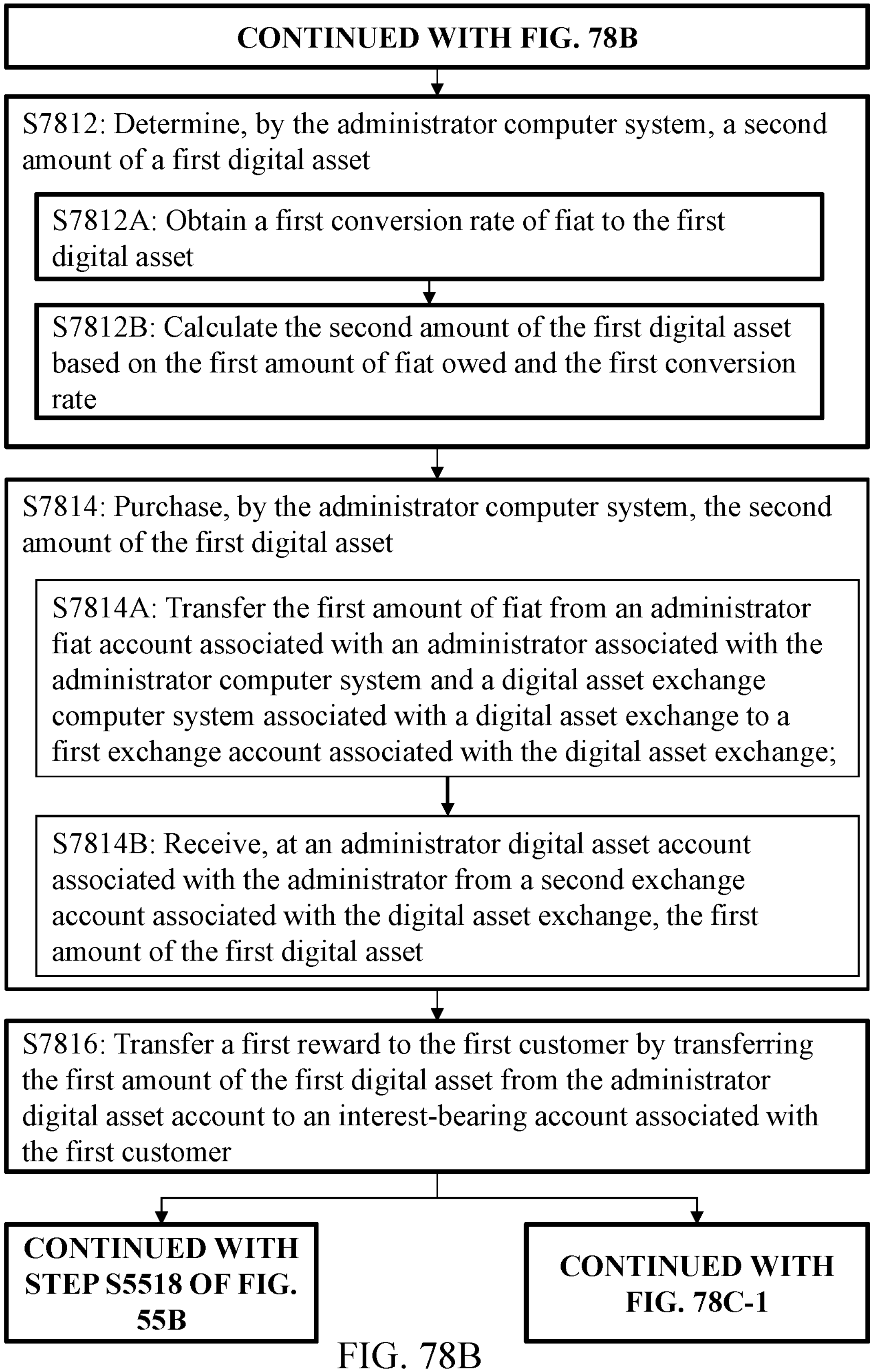
Figures 1, 78C:
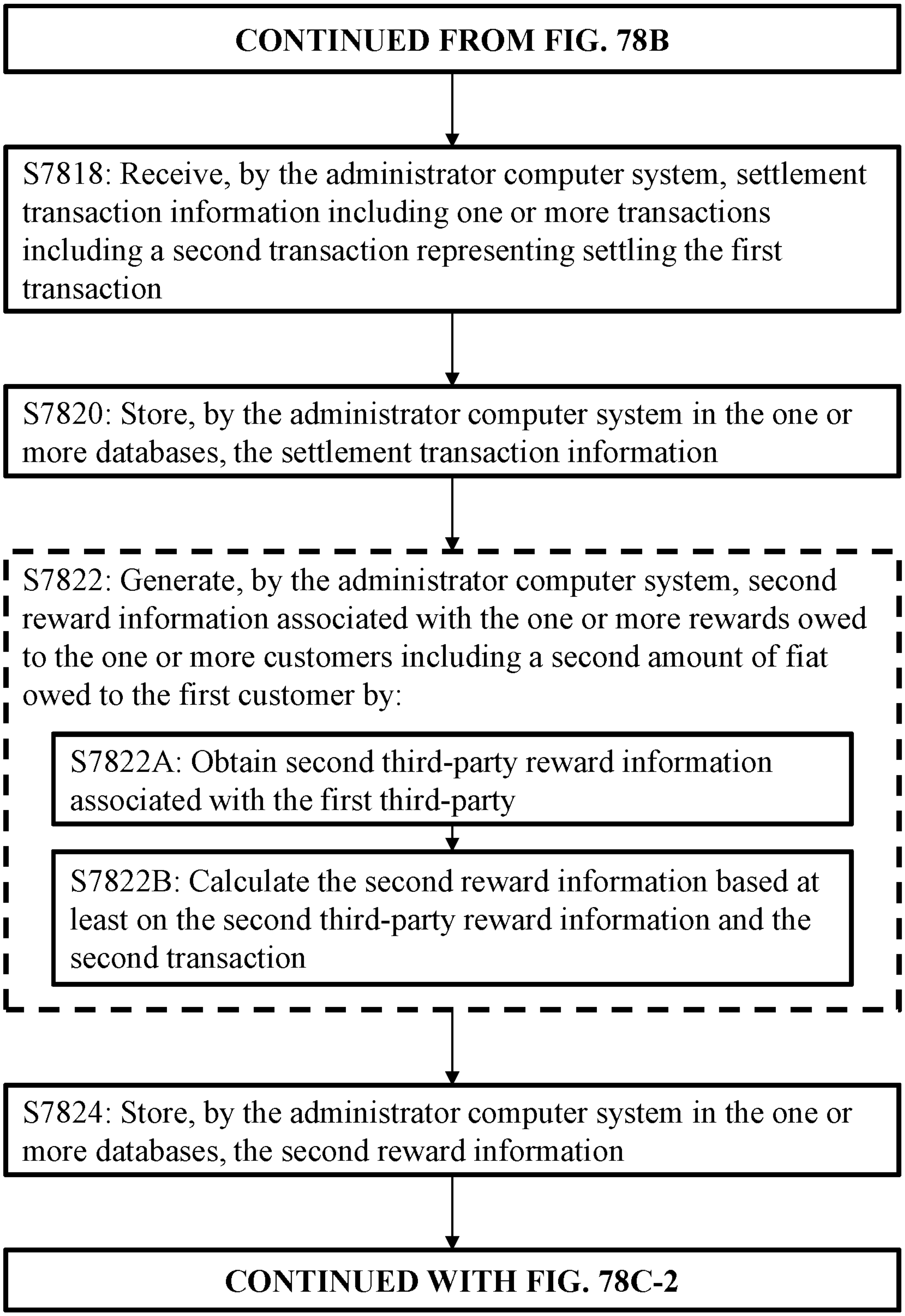
Figures 2, 78C:
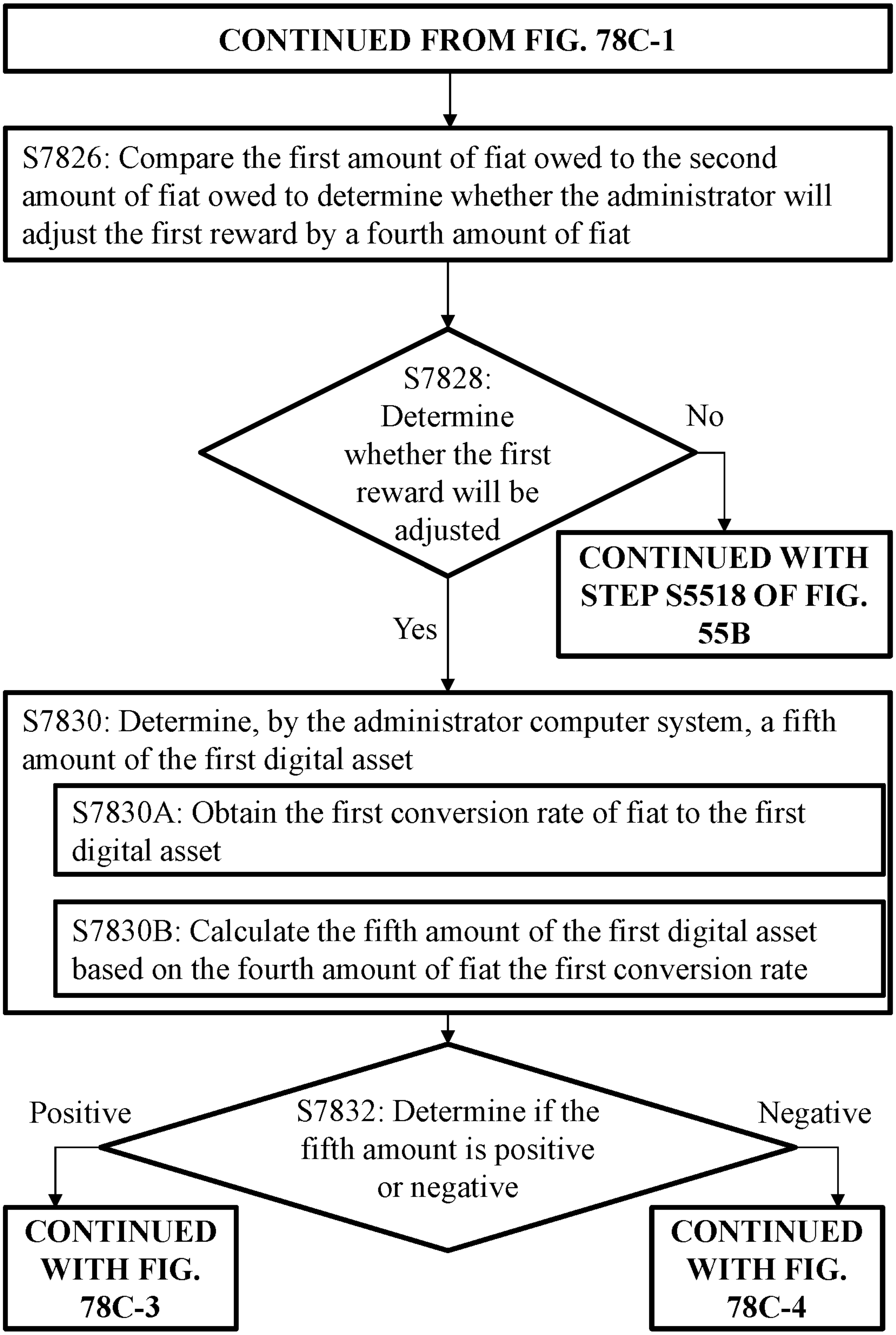
Figures 3, 78C:
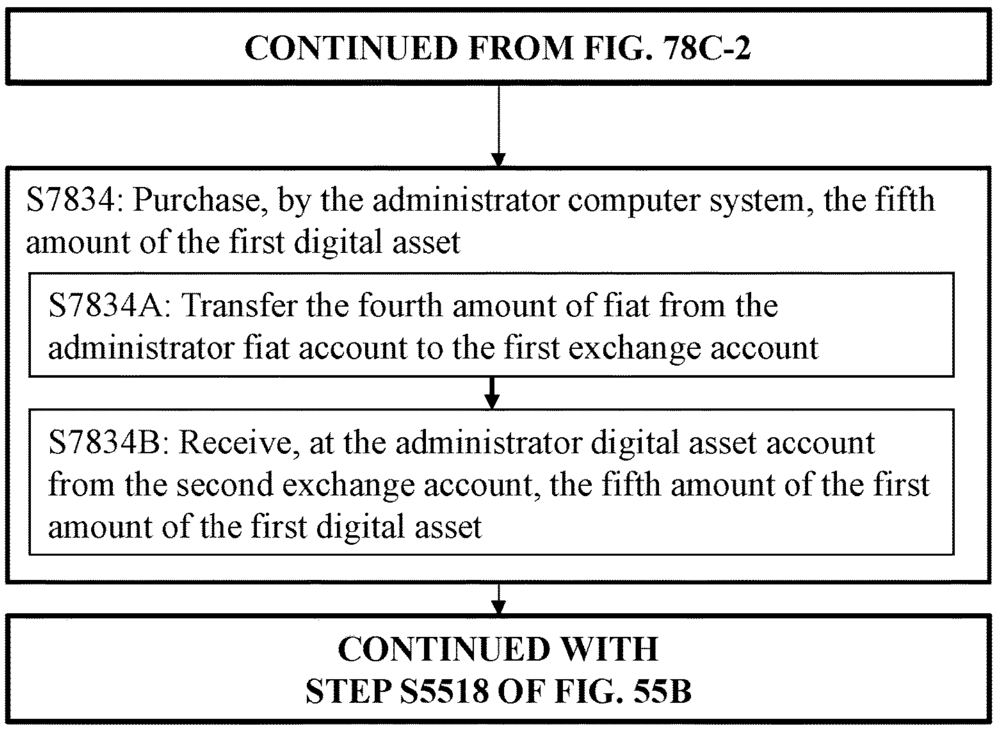
Figures 4, 78C:
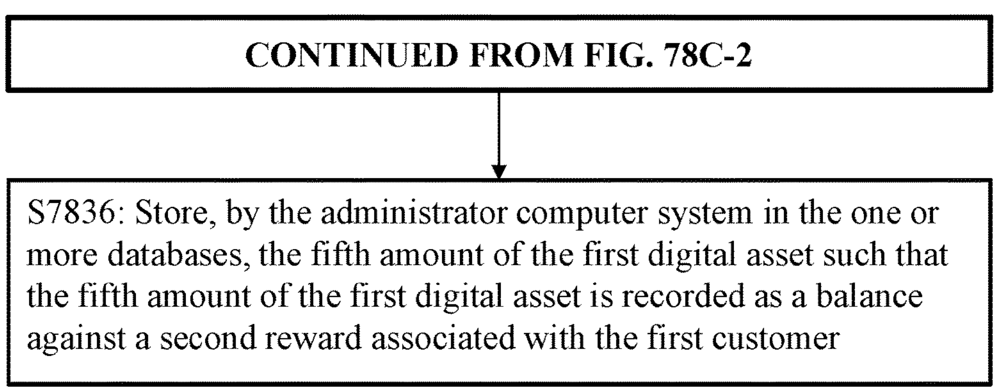

As illustrated in FIG. 55A-4, a decentralized lending smart contract 5512 may be provided on the underlying blockchain 6803 associated with decentralized lending smart contract public address 5512A. The decentralized lending smart contract 5512 may also include a plurality of instruction modules, saved as part of the blockchain 6803 that collectively make up the smart contract associated with decentralized lending. By way of illustration, in embodiments, such modules may include modules of instructions such as: (1) Create tokens module 5514; (2) Transfer tokens module 5516; (3) Destroy tokens module 5518; (4) Redeem tokens module 5520; (5) Deposit module 5522; (6) Calculate interest module 5524; (7 Return module 5526; (8) Third party module 5528; (9) Withdrawal module 5530 and/or a combination thereof, to name a few.

In embodiments, the Create tokens module 5514 may include one or more instructions related to creating lending tokens associated with decentralized lending. For example, in exchange for a first amount of a first digital asset, the decentralized lending smart contract 5512 may create one or more lending tokens that represent the first amount of the first digital asset lent to the decentralized lending smart contract 5512 for third party lending or trading. Such instructions may specify one or more authorized key pairs or contract addresses that may be authorized to create lending tokens under specified conditions. In embodiments, the Create tokens module 5514 may include instructions on increasing the lending token supply. In embodiments, the Create tokens module 5514 may include instructions on how to create new lending tokens within pre-approved lending token supply limits, how to create new lending tokens within a pre-approved amount of the lending token supply limits and a predetermined amount of the first digital asset held, and/or how to assign newly created or "minted" lending tokens to specific designated public addresses or contract addresses on the underlying blockchain 6803 associated with the respective customer and/or the digital asset exchange.

In embodiments, the Transfer tokens module 5516, may include instructions related to transferring the lending tokens. In embodiments, such transfer instructions may include rules by which certain transfer are allowed or blocked and may specify one or more key pair or contract addresses that may be authorized to perform one or more types of transfer operations. In embodiments, the Transfer tokens module 5516 may include authorization instructions related to transferring lending tokens and/or digital assets associated with the lending tokens (e.g., the first digital asset) to specific designated public addresses or contract addresses on the underlying blockchain 6803.

In embodiments, the Destroy tokens module 5518 may include instructions related to destroying (e.g., burning) lending tokens. In embodiments, the Destroy tokens module 5518 may include instructions relates to when, and with what authority, lending tokens associated with one or more specified addresses shall be destroyed or "burned", and thus removed from the lending token supply. In embodiments, lending tokens may be burned or destroyed when they are redeemed by the respective customer and/or the digital asset exchange in exchange for the fifth amount of the digital asset. In embodiments, lending tokens may be destroyed upon return of the fifth amount of the digital asset and a return amount provided by the intermediary in exchange for lending of the fifth amount of digital asset.

In embodiments, the Redeem tokens module 5520, in embodiments, may include instructions related to redeeming one or more lending tokens (e.g., the second digital asset) for an amount of digital asset (e.g., the first digital asset). In embodiments, the Redeem tokens module 5520 may include instructions to determine a first amount of digital asset to transfer in exchange for redeeming one or more lending tokens. For example, a lending tokens may be redeemed for the fifth amount of the first digital asset. In embodiments, the amount of digital asset to return in exchange for the redemption of one or more lending tokens may be made based on one or more of the following: interest/return information associated with the lending tokens; an amount of digital asset transferred to the decentralized lending smart contract 5512; an amount of time elapsed since the transfer of the amount of digital asset to the decentralized lending smart contract 5512; the types of digital asset transferred to the decentralized lending smart contract 5512; one or more third party institutions associated with the lending of the amount of the digital asset; one or more reserve rules (e.g., rules stored by the digital asset exchange and/or rules stored on the blockchain 6803 as part of the decentralized lending smart contract instructions 5512B); and/or a combination thereof, to name a few. In embodiments, the Redeem tokens module 5520 may include instructions on when, and with whose authority, lending tokens associated with one or more specified addresses shall be redeemed and, in embodiments, whether the redeemed lending tokens will be destroyed or "burned" as discussed above, and thus removed from the lending token supply. In embodiments, the Redeem tokens module 5520 may include authorization instructions related to accessing data supplied by a first authorized third party database (i.e. administrator system 6801), as discussed in further detail elsewhere.

The Deposit module 5522 may further include instructions to track and monitor one or more transfers of digital assets to the decentralized lending smart contract 5512. The Deposit module 5522, in embodiments, for example, may track one or more of the following: the public address(es) associated with each transfer of digital assets to the decentralized lending smart contract 5512, the date of each transfer, the time of each transfer, the amount of each transfer, and/or a combination thereof, to name a few. In embodiments, the Deposit module 5522 may include deposit instructions associated with the receipt of digital assets by the decentralized lending smart contract 5512. In embodiments, the Deposit module may include instructions or a call to issue one or more lending tokens based on the deposit of the digital assets.

The Calculate interest module 5524, in embodiments, may include instructions to calculate interest or a return accrued by the digital assets lent via the decentralized lending smart contract 5512. In embodiments, the Calculate interest module 5524 may include instructions to calculate the interest of each deposit of digital assets based on one or more of the following: interest information or return information associated with the lending tokens; an amount of digital asset transferred to the decentralized lending smart contract 5512; an amount of time elapsed since the transfer of the amount of digital asset to the decentralized lending smart contract 5512; the types of digital asset transferred to the decentralized lending smart contract 5512; one or more third party institutions associated with the lending of the amount of the digital asset; one or more reserve rules (e.g., rules stored by the digital asset exchange and/or rules stored on the blockchain 6803 as part of the decentralized lending smart contract instructions 5512B); and/or a combination thereof, to name a few.

In embodiments, the Return module 5526 may include instructions to calculate and/or authorize payments in exchange for the amount of digital asset transferred and held at the decentralized lending smart contract 5512. For example, the Return module 5526 may include authority to access information indicating the type of payment (e.g., one time return and redemption, an interest payment without redemption, payments in accordance with a payment schedule, to name a few). In embodiments, the Return module 5526 may communicate with Calculate interest module 5524, Deposit module 5522, and/or Redeem tokens module 5520 to determine the return payment and/or redemption payment. For example, the Return module 5526 may confirm the balance of the digital asset and the calculated interest from the Deposit module 5522 and the Calculate interest module 5524 respectively. In embodiments, the Return module 5526 may include return instructions associated with determining a return amount of digital assets to be provided to the first user in exchange for lending the amount of digital assets to the decentralized lending smart contract 5512. In embodiments, the Return module 5526 may include return payment instructions associated with transferring a payment amount of the first digital asset to the respective customer interest bearing account.

In embodiments, the Third party module 5528 may include authorization instructions related to loaning and trading at least a portion of the amount of digital assets held at the fourth contract address by third parties. For example, the third parties may, in embodiments, include third-party institutions associated with an intermediate account associated with the decentralized lending smart contract 5512. In embodiments, the Third party module 5528 may include third party instructions associated with at least one of: loaning of the at least a portion of the fifth amount of digital assets by third party institutions associated with the intermediary account and/or trading of the at least a portion of the fifth amount of digital assets by third party institutions associated with the intermediary account.

In embodiments, the Withdrawal module 5530 may include authorization instructions related to withdrawing an amount of digital asset lent to the decentralized lending smart contract 5512. For example, the Withdrawal module 5530 may track ownership and custody of digital assets lent to the decentralized lending smart contract 5512. In embodiments, the Withdrawal module 5530 may include instructions on when, and with whose authority, digital assets associated with one or more specified addresses shall be withdrawn. In embodiments, the Withdrawal module 5530 may include withdrawal instructions associated with returning the portion of the fifth amount of the first digital asset to the respective customer. The withdrawal instructions, in embodiments, may include first return payment instructions associated with returning a return payment amount of the first digital asset to the respective customer interest bearing account. In embodiments, the amount of digital assets paid under the withdraw module may be determined in conjunction with the Return module and the Calculate interest module.

In embodiments, decentralized lending smart contract instructions 5512B may include authorization instructions. The authorization instructions, in embodiments, may include authorization instructions related to functions associated with decentralized lending. In embodiments, decentralized lending smart contract instructions 5512B may also include instructions to authorize requests received, the requests, in embodiments, being transaction requests from administrators, user public addresses, and/or other smart contracts, to name a few. The decentralized lending smart contract 5512, in embodiments, may include tokens which may reflect other types of tokens, such as tokens associated with a security, a bond, a financial instrument, a contract, stock, gas tokens, and/or some other kind of token which the parties to the transaction reflect as an appropriate collateral.

In embodiments, the process illustrated in connection with FIG. 55A through FIG. 55C may continue with step S5520. At step S5520, in embodiments, the digital asset exchange system may determine a first interest payment for one or more of the plurality of users/customers—e.g., the first user of the plurality of users. In embodiments, the digital asset exchange may determine the first interest payment based on one or more of the following: respective interest information; an amount of digital asset held in an interest bearing account; an amount of time the amount of digital asset is held in the interest bearing account; the types of digital asset held in the interest bearing account; the one or more third party institutions; an interest amount associated with the interest-bearing account balance of the first digital asset; an interest rate and a period of time that the fifth amount of the first digital asset is held in the respective customer interest bearing account; one or more reserve rules; and/or a combination thereof, to name a few. For example, the first interest payment may be an agreed upon percentage of the balance of digital assets in an interest-bearing account over a period of time (e.g., 2% of 10 BTC over 6 months). In embodiments, the first interest payment may be an agreed upon amount to be paid after an agreed period of time or multiple periods of time.

In embodiments, more than one interest rate may be utilized by the digital asset exchange system. For example, the first interest rate may be used when period of time that the fifth amount of the first digital asset respective second digital asset account balance has been held in the respective customer interest bearing account falls within the first period of time. Continuing the example, a second interest rate is used when the period of time that the respective second digital asset account balance has been held in the respective customer interest bearing account falls within the second period of time.

In embodiments, the digital asset exchange system may determine the interest payment by calculating a net interest payment. The net interest payment, in embodiments, may be calculated by subtracting a reserve amount based on the fourth digital asset balance from a gross interest payment. The net interest payment, in embodiments, may represent the interest payment. In embodiments, the net interest payment minus fees may be the interest payment.

In embodiments, the interest payment may be a first payment of two or more payments associated with the initial transfer of the second amount of the first digital asset to an interest-bearing account. For example, an interest payment may be made to the first user at the end of each month for a year. As another example, an interest payment may be made annually each year the first user has an account balance over 0 in the respective customer interest-bearing account. In embodiments, an interest payment may be made aperiodically. For example, the interest payment may be determined after an account balance of an interest-bearing account reaches a predetermined amount. As another example, the interest payment may be determined and monitored by the digital asset exchange system. Continuing the example, when the interest payment reaches a predetermined amount, the digital asset exchange system may distribute the interest payment to the first user.

The one or more users, in embodiments, may have an account balance from a different transfer (e.g., not included with the fifth amount of the first digital asset) of the first digital asset (e.g., a sixth amount of the first digital asset) and/or may have an account balance including a second digital asset (e.g., a sixth amount of the second digital asset). In embodiments, the digital asset exchange computer system may determine a second interest payment for the first user based in the account balance of the different transfer. The determination of a second interest payment, in embodiments, may be made based on one or more of the following: interest information associated with the sixth amount of the first digital asset held in the respective customer interest bearing account; interest information associated with the sixth amount of the second digital asset; respective interest information; an amount of digital asset held in an interest bearing account; an amount of time the amount of digital asset is held in the interest bearing account; the types of digital asset held in the interest bearing account; the one or more third party institutions; an interest rate and a period of time that the sixth amount of the first digital asset is held in the respective customer interest bearing account; one or more reserve rules; and/or a combination thereof, to name a few. In embodiments, the second interest payment may be further based on a second interest amount. The second interest amount, in embodiments, may be the same as the first interest amount (e.g., as part of a payment schedule) and/or different than the first interest amount. In embodiments, the second interest payment may be further based on a second interest rate and a second period of time that the sixth amount of the first digital asset (or the second digital asset) is held in the respective customer interest bearing account. In embodiments, the second interest payment and the first interest payment may be combined by the digital asset exchange to form one total interest payment.

In embodiments, prior to step S5520, the digital asset exchange system determine the interest-bearing account received a first return from the intermediary account. In such embodiments, for example, the digital asset exchange system may determine the one or more interest payments based on one or more of the following: the first return, respective interest information associated with the fifth (and/or sixth) amount of the first (and/or second) digital asset, the types of digital asset held in the interest bearing account; the one or more third party institutions; an interest rate and a period of time that the fifth amount of the first digital asset is held in the respective customer interest bearing account; one or more reserve rules; and/or a combination thereof, to name a few. In embodiments, the first (and/or second) interest payment is at least a portion of the first return. In embodiments, one or more interest payments may be determined at one or more predetermined times by the digital asset exchange system. One or more interest payments, in embodiments, may be determined aperiodically by the digital asset exchange system.

In embodiments, the one or more returns (e.g., the first return, the second return) may be in the following denomination: fiat, the first digital asset, a second digital asset, and/or a combination thereof, to name a few. The type of fiat, in embodiments, may include one or more of the following: USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few. The first digital asset and/or second digital asset may be a digital math-based asset, such as Bitcoins, Namecoins, Litecoins, PPCoins, Tonal bitcoins, bitcoin cash, zcash, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDU-Care; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; 0x; Aion; Algorand; AMP; Arca; Arweave; Audius; Avalanche; BCB; BCC; Bitcoin SV; Blockstacks; cBAT; cDAI; Cela; Celo; cETH; Chia; Coda; Cosmos; cWBTC; cZRK; Decred; Dfinity; EOS; Eth 2.0; Filecoin; Hedgetrade; ION; Kadena; Kyber Network; Mobilecion; Near; Nervos; Oasis; OmiseGO; PaxG; Polkadot; SKALE; Solana; Stellar; Tezos; Theta; XRP; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), digital finance tokens associated with decentralized lending (such as AMP, Compound, Protocol, Kyber, Uma, Uniswap, Yearn, Aave, to name a few), tokens, and/or non-fungible token (such as Cryptokitties), to name a few. In embodiments, the first digital asset and/or second digital asset may be a digital asset that is supported by its own digital asset network (like ether supported by the Ethereum Network). The first digital asset and/or second digital asset, in embodiments, may be a stable value or fiat-backed token (such as Gemini Dollar), security tokens, and/or non-fungible token (such as Cryptokitties), to name a few. The first digital asset and/or second digital asset, in embodiments, may be a fiat-backed digital asset, for example, a Libra, Diem, or Gemini Dollar.

In embodiments, the process illustrated in connection with FIG. 55A through FIG. 55C may continue with S5522. At step S5522, in embodiments, the digital asset exchange system may store, the first interest payment in the second electronic interest ledger (e.g., in the Second Electronic Interest Ledger Database 5504). In embodiments where more than one interest payment is determined by the digital asset exchange system, each of the two or more interest payments may be stored by the digital asset exchange system in the second electronic interest ledger (e.g., in the Second Electronic Interest Ledger Database 5504). The digital asset exchange system, in embodiments, may store the one or more interest payments such that the one or more interest payments are associated with the first user. The one or more interest payments, in embodiments may be stored in one or more of the following the Second Electronic Interest Ledger Database 5504, memory 5302-C, memory 5306-C, memory operatively connected to the digital asset exchange system, and/or a combination thereof, to name a few. In embodiments, the first interest amount of the first digital asset may be reinvested in the respective customer intermediate account such that the first user may collect an additional return based on the increased deposit.

In embodiments, step S5502 through S5522 may be rearranged or omitted.

In embodiments, the process described in connection with FIG. 55A through FIG. 55C may continue with one or more payments being sent by the digital asset exchange system to the one or more users associated with the first interest payment. The one or more payments, in embodiments, may include one or more of the following: an interest payment (e.g., all or a portion of the first interest payment) in the first digital asset; an interest payment (e.g., all or a portion of the first interest payment) in the second digital asset; a redemption payment of the amount of digital asset transferred to the interest-bearing account (e.g., the second amount of the first digital asset), and/or a combination thereof, to name a few. For example, referring to FIG. 55C, the process may optionally continue with step S5524-1. In embodiments, at step S5524-1, the digital asset exchange system may determine when to disburse a first interest payment (e.g., a first time) to the first customer. For example, the return information associated with the first interest payment may include a payment schedule. The payment schedule, continuing the example, may include information which indicates (e.g., a date and/or time) when to distribute the first interest payment to the first customer. In embodiments, the determination of the first time may be based on one or more of the following: a payment schedule, the first interest payment (e.g., the amount of the first interest payment), an amount of time elapsing, user settings, the third party institution(s), the intermediary(ies), the type of digital asset, the amount of digital asset, the amount of interest bearing accounts associated with the one or more users, and/or a combination thereof, to name a few. In embodiments, the first time may include one or more of the following: one or more calendar dates, one or more times, one or more ranges of calendar date, one or more ranges of time, and/or a combination thereof, to name a few. In embodiments, the return information may indicate that interest payments are to be made periodically or aperiodically. In embodiments, the payment schedule may indicate that interest payments are to be made periodically or aperiodically. In embodiments, the return information may indicate that interest, payments are to be made based on receipt by the respective customer interest bearing account and/or a return from the respective customer intermediary account. In embodiments, the payment schedule indicates that interest payments are made based on receipt by the respective customer interest bearing account and/or a return from the respective customer intermediary account.

In embodiments, the return information may indicate that the interest payment(s) are to be made upon a request that is received by the one or more users (and/or someone acting on the one or more user's behalf). For example, to receive the first interest payment, the first customer device may generate and send a second request to the digital asset exchange system. The second request, in embodiments, may include a request for an interest payment associated with the respective customer interest-bearing account. The digital asset exchange system may receive the request (e.g., which may be similar to the description of step S5512, the description of which applying herein) and verify the request (e.g., which may be similar to step S5514, the description of which applying herein). The second request, in embodiments, may be similar to the first request discussed herein in connection with FIG. 55A through FIG. 55B and the Exemplary First Request 5510, the descriptions of each applying herein.

In embodiments step S5524-1 may include a second time determined by the digital asset exchange. The second time, in embodiments, may be associated with a second interest payment or a second interest rate. In embodiments, the second time may be determined in a manner similar to the determination of the first time, the description of which applying herein. In embodiments, the timing of second interest payment may be determined by the digital asset exchange system when the digital asset exchange system is determining the timing of the first interest payment (e.g., completed in the same step). In embodiments, the timing of the second interest payment may be determined after the first interest payment is transferred to one or more accounts associated with the one or more users.

In embodiments, the process of FIG. 55A through FIG. 55C, may continue with step S5526-1. In embodiments at step S5526-1, the digital asset exchange may transfer the first interest payment from the first customer interest-bearing account to the respective customer exchange account associated with the first user (i.e., executing payment of the first interest payment). In embodiments, the first customer may be associated with one or more accounts, including two or more customer exchange accounts. For example, the first customer may be associated with a first exchange account and a second exchange account. In embodiments, the first customer may transfer digital assets from the first exchange account to the respective customer interest-bearing account. At step S5526-1, continuing the example, in embodiments the digital asset exchange system may transfer the first interest payment from the first customer interest-bearing account to one or more of the first exchange account and/or the second exchange account.

In embodiments, the digital asset exchange system may execute the transfer by updating the second electronic interest ledger (e.g., of the Second Electronic Interest Ledger Database 5504) to reflect the transfer of the first interest payment out of the respective customer interest account exchange account. In embodiments, the digital ass exchange system may update the Second Electronic Interest Ledger Database 5504, the fifth electronic ledger database, the sixth electronic database, the seventh electronic exchange ledger database, and/or a combination thereof, where applicable, to execute the transfer. For example, if the transfer includes fiat, the first digital asset, and the second digital asset, the digital asset exchange system may update the First Electronic Exchange Ledger Database 5502, the fifth electronic exchange ledger, and the sixth electronic exchange ledger to execute the transfer in this example. The transfer may be executed, in embodiments, by the digital asset exchange system updating the first electronic ledger to reflect receipt of the first interest payment of the first digital asset into the respective customer digital asset exchange account. In embodiments, step S5526-1 may include updating the second electronic ledger and the fifth electronic ledger to reflect transfer of the first interest amount of the second digital asset from the respective customer interest bearing account to the respective customer exchange account.

In embodiments, the digital asset exchange may transfer the first payment by generating a third transfer message. The third transfer message, in embodiments, may include instructions to transfer: the first interest payment of the first digital asset from the second digital address to the first digital address; the first interest payment less an amount (e.g., reserve, and/or fees) of the first digital asset from the second digital address to the first digital address; the amount of the first digital asset from the second digital address to the third digital address; the amount of the first digital asset from the second digital address to a fifth digital address associated with the digital asset exchange, intermediary(ies) and/or third party institutions, to name a few; and/or a combination thereof. Continuing the example, the third transfer message, in embodiments, may be published by the digital asset exchange system to a plurality of geographically distributed computer systems in a peer-to-peer network. In embodiments, the published instructions may be verified and/or executed by the plurality of geographically distributed computer systems in the peer-to-peer network. The executed transactions associated with the third transfer message, in embodiments, may be published by the plurality of geographically distributed computer systems in the peer-to-peer network.

In embodiments, the first interest payment may be in the following denomination: fiat, the first digital asset, a second digital asset, and/or a combination thereof, to name a few. The type of fiat, in embodiments, may include one or more of the following: USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few. The first digital asset and/or second digital asset may be a digital math-based asset, such as Bitcoins, Namecoins, Litecoins, PPCoins, Tonal bitcoins, bitcoin cash, zcash, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; 0x; Aion; Algorand; AMP; Arca; Arweave; Audius; Avalanche; BCB; BCC; Bitcoin SV; Blockstacks; cBAT; cDAI; Cela; Celo; cETH; Chia; Coda; Cosmos; cWBTC; cZRK; Decred; Dfinity; EOS; Eth 2.0; Filecoin; Hedgetrade; ION; Kadena; Kyber Network; Mobilecion; Near; Nervos; Oasis; OmiseGO; PaxG; Polkadot; SKALE; Solana; Stellar; Tezos; Theta; XRP; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), digital finance tokens associated with decentralized lending (such as AMP, Compound, Protocol, Kyber, Uma, Uniswap, Yearn, Aave, to name a few), tokens, and/or non-fungible token (such as Cryptokitties), to name a few. In embodiments, the first digital asset and/or second digital asset may be a digital asset that is supported by its own digital asset network (like ether supported by the Ethereum Network). The first digital asset and/or second digital asset, in embodiments, may be a stable value or fiat-backed token (such as Gemini Dollar), security tokens, and/or non-fungible token (such as Cryptokitties), to name a few. The first digital asset and/or second digital asset, in embodiments, may be a fiat-backed digital asset, for example, a Libra, Diem, or Gemini Dollar. In embodiments, the second digital asset may be maintained on a second distributed ledger in the form of a second blockchain a blockchain network including a second plurality of geographically distributed computer systems in a second peer-to-peer network. The second distributed ledger, in embodiments, may be the same as the first distributed ledger. In embodiments, the second distributed ledger is different than the first distributed ledger.

In embodiments, as described herein, the digital asset exchange may be associated with the decentralized lending smart contract 5512. In such embodiments, the first interest payment (and/or subsequent interest payments) may be made to the decentralized lending smart contract public address 5512A. In embodiments, to transfer the first interest payment from the first customer interest-bearing account to the respective customer exchange account associated with the first user, the digital asset exchange system may generate a fourth transfer message including instructions to transfer the first interest payment of the second digital asset from the second digital address to the fourth digital address. The fourth transfer message, in embodiments, may be published by the digital asset exchange to the second distributed ledger in the form of the second blockchain wherein the instructions are executed by the second plurality of geographically distributed computer systems in the second peer-to-peer network. In embodiments, the published message may be verified and/or executed by the second plurality of geographically distributed computer systems in the peer-to-peer network. In embodiments, the digital asset exchange may generate a fourth transfer message including instructions to transfer the fifth amount of the first digital asset from the first address to the second digital address, and, when the fifth amount of digital assets are transferred to the first interest bearing account, transfer to a sixth digital address associated with the second interest bearing account when the fifth amount of the first digital asset is to be transferred to the second interest bearing account. The fourth transfer message, in embodiments, may be published by the digital asset exchange system to the first distributed network. The instructions associated with the fourth transfer request, in embodiments, may be verified and/or executed by the plurality of geographically distributed computer systems in the first peer-to-peer network.

In embodiments, as described in connection with FIG. 55A through FIG. 55C, one or more intermediary systems may act as an intermediary between the third party institutions or otherwise be associated with the third party institutions and the digital asset exchange. In embodiments, prior to and/or as part of each transfer digital assets to and/or from each respective interest bearing account, the digital asset exchange system may select one or more intermediary accounts from a plurality of intermediary accounts to act as an intermediary between the digital asset exchange and one or more third-party institutions. The digital asset exchange system may select one or more intermediary systems based on one or more of the following factors (e.g., selection information): (i) whether the respective intermediary systems are affiliated with one another; (ii) client preference information; (iii) client exclusion information; and/or (iv) an amount of digital asset (first digital asset, second digital asset, and/or combined, to name a few) and/or fiat associated with the respective intermediary (e.g., as compared to a predetermined limit, as compared to other intermediary systems of the plurality of intermediary systems, to name a few), to name a few. Following the selection (and/or during the selection process) of the intermediary or one or more intermediary systems, the digital asset exchange system may transfer the fifth amount of the digital asset from the respective exchange customer account to the first interest bearing account. In embodiments, a second intermediary system may be selected by the digital asset exchange (e.g., when a first and a second digital asset are part of the return). Following the selection (and/or during the selection process) of the second intermediary system, the digital asset exchange system may transfer the first interest payment and/or the fifth amount of the digital asset from the respective exchange customer account to the second interest bearing account.

In embodiments, the respective destination account for interest payments may be selected by the digital asset exchange. In embodiments, the selection, for example, may be based on one or more of the following: a minimum account balance requirement, a maximum account balance requirement, a minimum amount of transaction requirement, a maximum amount of transaction requirement, user preferences, and/or a combination thereof, to name a few. For example, the digital asset exchange system may monitor one or more of the customer exchange interest-bearing accounts to determine whether one or more account balances (e.g., the account balances associated with the first and second respective customer interest-bearing accounts) are in compliance with a minimum account balance requirement by comparing the respective account balance with a predetermined minimum account balance. In embodiments, the digital asset exchange system may transfer the first interest payment and/or the fifth amount of the first digital asset to the first interest-bearing account when the first interest-bearing account balance is below the predetermined minimum balance (and/or the second interest-bearing account when the second interest-bearing account balance is below the predetermined minimum balance). Continuing the example, if neither the first or the second respective customer interest-bearing accounts are below the predetermined minimum balance, the digital asset exchange may select either and/or move onto other factors (e.g., maximum account balance, min/max transactions) to select the account. As another example, the digital asset exchange system may monitor one or more of the customer exchange interest-bearing accounts to determine whether one or more account balances (e.g., the account balances associated with the first and second respective customer interest-bearing accounts) are in compliance with a maximum account balance requirement by comparing the respective account balance with a predetermined maximum account balance. In embodiments, the digital asset exchange system may transfer the first interest payment and/or the fifth amount of the first digital asset to the second interest-bearing account when the first interest-bearing account balance is above the predetermined maximum balance (and/or the first interest-bearing account when the second interest-bearing account balance is above the predetermined maximum balance). Continuing the example, if neither the first or the second respective customer interest-bearing accounts are above the predetermined maximum balance, the digital asset exchange may select either and/or move onto other factors (e.g., min/max transactions) to select the account. In embodiments, the digital asset exchange system may select by default either the first or second respective customer interest-bearing account and, if that default account complies with account requirements, the fifth amount of the first digital asset may be transferred to the default account.

In embodiments, one or more of the interest-bearing accounts may be associated with a minimum account balance requirement, a maximum account balance requirement, a minimum amount of transaction requirement, a maximum amount of transaction requirement, and/or a combination thereof, to name a few. For example, the digital asset exchange system may monitor one or more of the customer exchange interest-bearing accounts to determine whether one or more account balances is in compliance with a minimum account balance requirement by comparing the respective account balance with a predetermined minimum account balance. In embodiments, the second interest-bearing account may drop below a predetermined minimum account balance. Continuing the example, the balance of the second interest-bearing account may be transferred to the first interest-bearing account. In embodiments, the digital asset exchange system may transfer a penalty fee from the first and/or second interest-bearing account when the first and/or second interest-bearing account balance is below the predetermined minimum balance. As another example, the digital asset exchange system may monitor one or more of the customer exchange interest-bearing accounts to determine whether one or more account balances is in compliance with a maximum account balance requirement by comparing the respective account balance with a predetermined maximum account balance. In embodiments, the first interest-bearing account may exceed a predetermined maximum account balance. Continuing the example, the difference between the first interest-bearing account balance and the predetermined maximum may be transferred into the second interest-bearing account (and/or a third interest-bearing account may be created to accommodate the difference).

Referring back to FIG. 55C, in embodiments, as mentioned above, the one or more payments, may include one or more of the following: an interest payment (e.g., all or a portion of the first interest payment) in the first digital asset; an interest payment (e.g., all or a portion of the first interest payment) in the second digital asset; a redemption payment of the amount of digital asset transferred to the interest-bearing account (e.g., the second amount of the first digital asset), and/or a combination thereof, to name a few. As another example, referring to FIG. 55C, the process may optionally continue with step S5524-2. In embodiments, at step S5524-2, the digital asset exchange system may determine a time period (e.g., a calendar date and/or associated time) to disburse a first interest payment (e.g., the first time) to the first customer. The time period, in embodiments, may be determined based on an associated payment schedule. For example, the return information associated with the first interest payment may include a payment schedule which indicates the first time. The payment schedule, continuing the example, may include information which indicates (e.g., a date and/or time) when to distribute the first interest payment to the first customer. In embodiments, the determination of the first time may be based on one or more of the following: a payment schedule, the first interest payment (e.g., the amount of the first interest payment), an amount of time elapsing, a first redemption payment, user settings, the third party institution(s), the intermediary(ies), the type of digital asset, the amount of digital asset, the amount of interest bearing accounts associated with the one or more users, and/or a combination thereof, to name a few. In embodiments, the return information may indicate that redemption and/or interest payments are to be made periodically or aperiodically. In embodiments, the payment schedule may indicate that interest payments and/or redemption payments are to be made periodically or aperiodically. In embodiments, the return information may indicate that interest, payments are to be made based on receipt by the respective customer interest bearing account and/or a return from the respective customer intermediary account. In embodiments, the payment schedule indicates that interest payments and/or redemption payments are made based on receipt by the respective customer interest bearing account and/or a return from the respective customer intermediary account.

In embodiments, the return information may indicate that the interest payment(s) and/or redemption payment(s) are to be made upon a request that is received by the one or more users (and/or someone acting on the one or more user's behalf). For example, to receive the first interest payment (including the first redemption payment), the first customer device may generate and send a second request to the digital asset exchange system. The second request, in embodiments, may include a request for an interest payment and redemption payment associated with the respective customer interest-bearing account (e.g., a request for the balance of the respective customer interest-bearing account and the first interest payment). The digital asset exchange system may receive the request (e.g., which may be similar to the description of step S5512, the description of which applying herein) and verify the request (e.g., which may be similar to step S5514, the description of which applying herein). The second request, in embodiments, may be similar to the first request discussed herein in connection with FIG. 55A through FIG. 55B and the Exemplary First Request 5510, the descriptions of each applying herein. In embodiments, requests for return of the first interest payment and/or redemption payment (in total or in part) may only be accepted when a predetermined amount of time has elapsed. For example, the generated and sent second request may be verified by the digital asset exchange system by first determining whether a predetermined amount of time associated with the first interest payment (and/or redemption payment) has elapsed. If the predetermined amount of time has elapsed, the digital asset exchange may verify the request similar to the verification process in step S5514, the description of which applying herein. In embodiments, if the predetermined amount of time has not elapsed, the digital asset exchange system may refuse the request and/or notify the one or more users associated with the second request of the refusal (and/or reasons for said refusal).

In embodiments, the process of FIG. 55A through FIG. 55C may continue with step S5526-2. At step S5526-2, in embodiments, the by the digital asset exchange system may update the first interest payment amount of the first digital asset based on a current time period. For example, the first interest payment amount may be based on the amount of time that has elapsed since the one or more users transferred the second amount of the first digital asset into the respective customer interest-bearing account. Continuing the example, the digital asset exchange system may update the calculated first interest payment to include the interest accrued to the time of the first interest payment and/or redemption payment.

In embodiments, the process of FIG. 55A through FIG. 55C may continue with step S5528-2. In embodiments at step S5528-2, the digital asset exchange may transfer the first interest payment and the first redemption payment (first interest payment plus the fifth amount of the first digital asset) from the first customer interest-bearing account to the respective customer exchange account associated with the first user (i.e., executing payment of the first interest payment and the redemption payment). In embodiments, the first customer may be associated with one or more accounts, including two or more customer exchange accounts. For example, the first customer may be associated with a first exchange account and a second exchange account. In embodiments, the first customer may transfer digital assets from the first exchange account to the respective customer interest-bearing account. At step S5528-2, continuing the example, in embodiments the digital asset exchange system may transfer the first interest payment and the first redemption payment from the first customer interest-bearing account to one or more of the first exchange account and/or the second exchange account.

In embodiments, the digital asset exchange system may execute the transfer, by updating the second electronic interest ledger (e.g., of the Second Electronic Interest Ledger Database 5504) to reflect the transfer of the first interest payment and the fifth amount of digital asset (e.g., the first redemption payment) out of the respective customer interest account exchange account. In embodiments, the digital ass exchange system may update the Second Electronic Interest Ledger Database 5504, the fifth electronic ledger database, the sixth electronic database, the seventh electronic exchange ledger database, and/or a combination thereof, where applicable, to execute the transfer. For example, if the transfer includes fiat, the first digital asset, and the second digital asset, the digital asset exchange system may update the First Electronic Exchange Ledger Database 5502, the fifth electronic exchange ledger, and the sixth electronic exchange ledger to execute the transfer in this example. As another example, the first account ledger (e.g., the First Electronic Exchange Ledger Database 5502) may be updated to rto reflect receipt of the fifth amount of the first digital asset and the first interest payment amount in the respective customer digital asset exchange account associated with the first customer. The transfer may be executed, in embodiments, by the digital asset exchange system updating the first electronic ledger to reflect receipt of the first interest payment of the first digital asset and the fifth amount of the first digital asset into the respective customer digital asset exchange account. In embodiments, step S5528-2 may include updating the second electronic ledger and the fifth electronic ledger to reflect transfer of the first interest payment and/or equivalent value to the fifth amount of the first digital asset in the form of the second digital asset from the respective customer interest bearing account to the respective customer exchange account. In embodiments, the digital asset exchange system may calculate the exchange rate between the first digital asset and the second digital asset.

In embodiments, the digital asset exchange may transfer the first interest payment and/or the first redemption payment by generating a second transfer message. The second transfer message, in embodiments, may include instructions to transfer: the first interest payment of the first digital asset from the second digital address to the first digital address; the first interest payment less an amount (e.g., reserve, and/or fees) of the first digital asset from the second digital address to the first digital address; the first redemption payment (e.g., the fifth amount of the first digital asset) from the second digital address to the first digital address; the first redemption payment less an amount (e.g., reserve, and/or fees) from the second digital address to the first digital address; the reserve amount of the first digital asset from the third digital address to the first digital address; the fifth amount of the first digital asset and/or the first interest payment from the second digital address to a fifth digital address associated with the digital asset exchange, intermediary(ies) and/or third party institutions, to name a few; and/or a combination thereof. Continuing the example, the second transfer message, in embodiments, may be published by the digital asset exchange system to a plurality of geographically distributed computer systems in a peer-to-peer network. In embodiments, the published instructions may be verified and/or executed by the plurality of geographically distributed computer systems in the peer-to-peer network. The executed transactions associated with the second transfer message, in embodiments, may be published by the plurality of geographically distributed computer systems in the peer-to-peer network.

In embodiments, the first interest payment and/or the first redemption payment may be in the following denomination: fiat, the first digital asset, a second digital asset, and/or a combination thereof, to name a few. The type of fiat, in embodiments, may include one or more of the following: USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few. The first digital asset and/or second digital asset may be a digital math-based asset, such as Bitcoins, Namecoins, Litecoins, PPCoins, Tonal bitcoins, bitcoin cash, zcash, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; 0x; Aion; Algorand; AMP; Arca; Arweave; Audius; Avalanche; BCB; BCC; Bitcoin SV; Blockstacks; cBAT; cDAI; Cela; Celo; cETH; Chia; Coda; Cosmos; cWBTC; cZRK; Decred; Dfinity; EOS; Eth 2.0; Filecoin; Hedgetrade; ION; Kadena; Kyber Network; Mobilecion; Near; Nervos; Oasis; OmiseGO; PaxG; Polkadot; SKALE; Solana; Stellar; Tezos; Theta; XRP; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), digital finance tokens associated with decentralized lending (such as AMP, Compound, Protocol, Kyber, Uma, Uniswap, Yearn, Aave, to name a few), tokens, and/or non-fungible token (such as Cryptokitties), to name a few. In embodiments, the first digital asset and/or second digital asset may be a digital asset that is supported by its own digital asset network (like ether supported by the Ethereum Network). The first digital asset and/or second digital asset, in embodiments, may be a stable value or fiat-backed token (such as Gemini Dollar), security tokens, and/or non-fungible token (such as Cryptokitties), to name a few. The first digital asset and/or second digital asset, in embodiments, may be a fiat-backed digital asset, for example, a Libra, Diem, or Gemini Dollar. In embodiments, the second digital asset may be maintained on a second distributed ledger in the form of a second blockchain a blockchain network including a second plurality of geographically distributed computer systems in a second peer-to-peer network. The second distributed ledger, in embodiments, may be the same as the first distributed ledger. In embodiments, the second distributed ledger is different than the first distributed ledger.

In embodiments, as described herein, the digital asset exchange may be associated with the decentralized lending smart contract 5512. In embodiments, the first interest payment and/or redemption payment may be made to the decentralized lending smart contract public address 5512A. In embodiments, to transfer the first interest payment from the first customer interest-bearing account to the respective customer exchange account associated with the first user, the digital asset exchange system may generate a fourth transfer message including instructions to transfer the first interest payment and/or the redemption payment of the second digital asset from the second digital address to the fourth digital address. The fourth transfer message, in embodiments, may be published by the digital asset exchange to the second distributed ledger in the form of the second blockchain wherein the instructions are executed by the second plurality of geographically distributed computer systems in the second peer-to-peer network. In embodiments, the published message may be verified and/or executed by the second plurality of geographically distributed computer systems in the peer-to-peer network. In embodiments, the digital asset exchange may generate a fourth transfer message including instructions to transfer the first interest payment and/or the fifth amount of the first digital asset from the first address to the second digital address, and, when the first interest payment and/or the fifth amount of digital assets are transferred to the first interest-bearing account, transfer to a sixth digital address associated with the second interest bearing account where the fifth amount of the first digital asset is to be transferred to the second interest bearing account. The fourth transfer message, in embodiments, may be published by the digital asset exchange system to the first distributed network. The instructions associated with the fourth transfer request, in embodiments, may be verified and/or executed by the plurality of geographically distributed computer systems in the first peer-to-peer network.

In embodiments, as described in connection with FIG. 55A through FIG. 55C, one or more intermediary systems may act as an intermediary between the third party institutions and the digital asset exchange. In embodiments, prior to and/or as part of each transfer digital assets to and/or from each respective interest bearing account, the digital asset exchange system may select one or more intermediary systems from a plurality of intermediary systems to act as an intermediary between the digital asset exchange and one or more third-party institutions. The selection of intermediary systems, in embodiments, may be similar to the selection of intermediary systems described in connection with step S5526-1, the description of which applying herein.

In embodiments, the respective destination account for interest payments and/or redemption payments or the first amount of the first digital asset may be selected by the digital asset exchange. In embodiments, the selection, for example, may be based on one or more of the following: a minimum account balance requirement, a maximum account balance requirement, a minimum amount of transaction requirement, a maximum amount of transaction requirement, user preferences, and/or a combination thereof, to name a few. For example, the digital asset exchange system may monitor one or more of the customer exchange interest-bearing accounts to determine whether one or more account balances (e.g., the account balances associated with the first and second respective customer interest-bearing accounts) are in compliance with a minimum account balance requirement by comparing the respective account balance with a predetermined minimum account balance. In embodiments, the digital asset exchange system may transfer the first interest payment and/or the fifth amount of the first digital asset to the first interest-bearing account when the first interest-bearing account balance is below the predetermined minimum balance (and/or the second interest-bearing account when the second interest-bearing account balance is below the predetermined minimum balance). Continuing the example, if neither the first or the second respective customer interest-bearing accounts are below the predetermined minimum balance, the digital asset exchange may select either and/or move onto other factors (e.g., maximum account balance, min/max transactions) to select the account. As another example, the digital asset exchange system may monitor one or more of the customer exchange interest-bearing accounts to determine whether one or more account balances (e.g., the account balances associated with the first and second respective customer interest-bearing accounts) are in compliance with a maximum account balance requirement by comparing the respective account balance with a predetermined maximum account balance. In embodiments, the digital asset exchange system may transfer the first interest payment and/or the fifth amount of the first digital asset to the second interest-bearing account when the first interest-bearing account balance is above the predetermined maximum balance (and/or the first interest-bearing account when the second interest-bearing account balance is above the predetermined maximum balance). Continuing the example, if neither the first or the second respective customer interest-bearing accounts are above the predetermined maximum balance, the digital asset exchange may select either and/or move onto other factors (e.g., min/max transactions) to select the account. In embodiments, the digital asset exchange system may select by default either the first or second respective customer interest-bearing account and, if that default account complies with account requirements, the first interest payment and/or the fifth amount of the first digital asset may be transferred to the default account.

In embodiments, the steps of the processes described in connection with FIG. 55A through FIG. 55C may be rearranged or omitted.

In embodiments, one or more customers of a digital asset exchange (e.g., Digital Asset Exchange 6110) may be responsible for one or more recurring payments. A recurring payment, in embodiments, may be one or more charges on a predetermined schedule (e.g. twice a day, once a day, once a week, once a month, and/or once a quarter, to name a few). For example, a first customer may be responsible for a credit card payment once a month. The first customer may, in embodiments, pay one or more of the monthly credit card payments automatically using one or more exchange accounts associated with the digital asset exchange 6110 (e.g., interest-bearing customer exchange accounts, customer exchange accounts, customer fiat accounts, and/or a combination thereof, to name a few). In embodiments, the first user may set up one or more recurring payments via an electronic device associated with the first user (e.g., first user device 6104). One or more exemplary processes for the set-up and execution of a recurring payment is illustrated in connection with FIG. 77A-1, FIG. 77A-2, FIG. 77B, FIG. 77C-1, and FIG. 77C-2. Referring to FIG. 77A-1, a process for the set-up and execution of a recurring payment may, in embodiments, begin with the digital asset exchange system (e.g., 6102) receiving first user access credentials from a first user device (e.g., first user device 6104) associated with a first user. The first user access credentials, in embodiments, may include one or more of the following: username, password, biometric data access card scan (e.g., swipe of a card associated with the exchange and having a magnetic strip), a pin (e.g., a number provided via SMS, other text message service, or email for multi-factor authentication), and/or a combination thereof, to name a few. For example, the first user access credentials may include a user name and password associated with the first user. A multi-factor authentication, in embodiments, may be used for the first user to access the first user's accounts with the digital asset exchange (e.g., digital asset exchange 6110). In embodiments, the multi-factor authentication may include the use of an authorization code that is sent to a predetermined user device associated with the first user, e-mail address associated with the first user, mobile phone number associated with the first user, and/or a combination thereof, to name a few, for example, as used in AUTHY® (AUTHY® is a registered trademark of Twilio, Inc.). In embodiments, other multi-factor verifications may be used, such as identification of a user device associated with the first user based on, for example, phone number and/or one or more of the following: mobile network, location information, and/or shared secret verification, to name a few.

The digital asset exchange system may authenticate the received first user access credentials, and, if verified, grant the first user access. In embodiments, the digital asset exchange may verify the first user access credentials by associating the first user access credentials with at least one of the following: a respective customer digital asset exchange account, a respective customer interest-bearing account, a respective customer reserve account, and/or a combination thereof, to name a few. In embodiments, if the first user access credentials are not or cannot be authenticated, the digital asset exchange system may prevent access and/or notify the first user (e.g., via a predetermined device, physical address, and/or electronic address, to name a few) of the denied access (e.g., via a notification). In embodiments, the first user access credentials may be similar to user identification data 5110 and/or user authentication data 5112 described above in connection with FIG. 5A, the description of which applying herein.

In embodiments, the process for the setup and/or execution of recurring payments may begin and/or continue with step S7702. At step S7702, in embodiments, a digital asset exchange computer system (e.g., the digital asset exchange system 6102) may receive a first request to schedule a first automatic payment. The first request, in embodiments, may be from the first user device associated with the first user and include one or more of: a request to set up the first automatic payment, identification information associated with the first user, identification associated with the first user device, and/or a combination thereof, to name a few.

The process, in embodiments, may continue with step S7704. At step S7704, in embodiments, the digital asset exchange computer system may generate first computer-executable instructions. In embodiments, the first computer-executable instructions may include instructions to display a first graphical user interface (GUI). The first GUI may include a second request for information indicating one or more of: (a) a first user account associated with the first user; (b) a payment type; (c) a preliminary payment amount; (d) a payment date; (e) identification associated with the third-party to which the recurring payment is owed (e.g., company name, address, account information associated with the third-party, instructions on how to pay the third-party, to name a few); (f) a time limitation on the recurring payment; (g) third-party information associated with the third-party to which the recurring payment is owed (e.g., company name, address, account information associated with the third-party, instructions on how to pay the third-party, to name a few); (h) third-party account information associated with the first user and the third-party to which the recurring payment is owed (e.g., company name, address, account information associated with the third-party, instructions on how to pay the third-party, to name a few); and/or (i) a combination thereof, to name a few. In embodiments, the second request may prompt responses from the user—for example—by asking for specific information. The specific information, in embodiments, may be requested using a drop down menu, sliding scale, fill-in, and/or a combination thereof, to name a few. For example, the digital asset exchange may, in response to the first request, generate a response that includes one or more prompts for the user to input information associated with the automatic payment. The automatic payment, in embodiments, may be set up through an API with an automatic payment service associated with the digital asset exchange. The request for information may include a request for identification information associated with a credit card (e.g., name on the card, credit card number, expiration date, CVV number, barcode, and/or a combination thereof, to name a few)—e.g., a credit card associated with the automatic payment and/or a credit card associated with a payment method for the automatic payment, to name a few.

The first user account, in embodiments, may refer to one or more accounts associated with the first user. For example, the first user account may be interest associated with an interest-bearing account associated with the first user and an exchange account associated with the first user. In embodiments, the first user may select a preference—e.g., pay with interest associated with my interest-bearing account, and, if the interest has an insufficient balance, pay with exchange account (and/or if insufficient balance with exchange account, pay with fiat account). As another example, the first user account may be one or more interest bearing accounts (the balance and/or interest accrued) associated with the first user. As another example, the first user account may be one or more exchange accounts (e.g., accounts with a balance of one or more types of digital asset) associated with the first user. As another example, the first user account may be the first user account may a first public address on the blockchain (e.g., blockchain network 1807) associated with the first customer, a second public address on the blockchain associated with the first customer and/or the digital asset exchange, and/or a combination thereof, to name a few.

The preliminary payment amount, in embodiments, may be an amount the user has selected to pay. In embodiments, the preliminary payment amount may be a selected option. For example, the first user may select and/or instruct the digital asset exchange computer system to "make a minimum payment." As another example, the first user may select and/or instruct the digital asset exchange computer system to "pay the full balance." As another example, the first user may select and/or instruct the digital asset exchange computer system to "pay the interest associated with the recurring bill." As another example, the first user may select and/or instruct the digital asset exchange computer system to "pay a percentage of my balance"—inputting and/or selecting a percentage (e.g., 2%, 10%, 20%, 30%, 47%, 73%, 99%, etc.). In embodiments, the preliminary payment amount may be measured in fiat, digital asset, and/or a combination thereof. For example, the preliminary payment may be measured in U.S. Dollars. As another example, the preliminary payment may be measured in BITCOIN. As another example, the preliminary payment may be measured in Pounds and Ether. As another example, the preliminary payment may be measured in a stable value token (e.g., Gemini Dollar).

The payment date, in embodiments, may refer to one or more of the following: a calendar date (e.g., day, month, and/or year), multiple calendar dates (e.g., the 1st of a month and the 15th of a month), a specific day(s) of the month (e.g., the 3rd Thursday, the 1st Monday and 3rd Tuesday, the 1st and 3rd Friday, etc.), a time (e.g., at 4:40 PM, by 5 PM, before 9 AM, to name a few), a time of day (e.g., morning, afternoon, night, etc.), on or before a due date (e.g., a selected option—pay before my due date, pay on my due date, to name a few), a first variable—when the interest accrued in an interest bearing account reaches a predetermined amount (e.g., the value of the payment, a predetermined amount, a predetermined percentage of the payment, to name a few), a second variable—when the value of one or more balances associated with one or more accounts reaches a predetermined amount (e.g., the value of the payment, a predetermined amount, a predetermined percentage of the payment, to name a few), and/or a combination thereof, to name a few.

Limitations on the automatic payment, in embodiments, may refer to one or more of the following: payment is scheduled for a predetermined amount of time (e.g., 1 week, 1 month, 6 months, 1 year, 5 years, the remainder of a year, the remainder of a month, the remainder of a week, one time automatic payment, pay only on specific days (e.g., pay on November 1st and December 4th), etc.), payment is scheduled for a predetermined amount of payments (e.g., 1 payment 3 payments, 10 payments, etc.), and/or a combination thereof, to name a few.

The first computer-executable instructions, in embodiments at step S7706, may be sent by the digital asset exchange computer system to the first user device. In embodiments, the first user device may execute the first computer-executable instructions such that the first GUI is displayed by the first user device. In embodiments, the first computer-executable instructions may be executed by the first user device upon receipt. The first computer-executable instructions, in embodiments, may be executed by the first user device upon an action (e.g., unlocking the first user device, selecting a notification, etc.) by the first user. In embodiments, the first request to schedule the first automatic payment may include information indicating one or more of: (a) a first user account associated with the first user; (b) a payment type (e.g., Digital Asset, Multiple Kinds of Digital Assets, Digital Asset and Fiat, and/or a combination thereof, to name a few); (c) a preliminary payment amount; (d) a payment date; (e) identification associated with the third-party to which the recurring payment is owed; (f) a time limitation on the recurring payment; (g) third-party information associated with the third-party to which the recurring payment is owed; (h) third-party account information associated with the first user and the third-party to which the recurring payment is owed; and/or (i) a combination thereof, to name a few. In such embodiments, the digital asset exchange computer system may generate and send the first computer-executable instructions prior to receiving the first request. In embodiments, the payment information may include identification information associated with a credit card (e.g., name on the card, credit card number, expiration date, CVV number, barcode, and/or a combination thereof, to name a few)—e.g., a credit card associated with the automatic payment and/or a credit card associated with a payment method for the automatic payment, to name a few.

The first user device, in embodiments, may generate a first response to the second request (e.g., the first computer-executable instructions). In embodiments, the first user may input and/or select one or more responses to the one or more prompts in the second request. For example, the first response may include one or more of the following: (a) a first user account associated with the first user; (b) a payment type (e.g., Digital Asset, Multiple Kinds of Digital Assets, Digital Asset and Fiat, and/or a combination thereof, to name a few); (c) a preliminary payment amount; (d) a payment date; (e) identification associated with the third-party to which the recurring payment is owed; (f) a time limitation on the recurring payment; (g) third-party information associated with the third-party to which the recurring payment is owed; (h) third-party account information associated with the first user and the third-party to which the recurring payment is owed; (i) identification information associated with a credit card (e.g., name on the card, credit card number, expiration date, CVV number, barcode, and/or a combination thereof, to name a few) and/or (j) a combination thereof, to name a few. The first user device (and/or another device associated with the first user), may send the first response to the digital asset exchange computer system. At step S7708, in embodiments, the digital asset exchange computer system may receive the first response to the second request.

The process, in embodiments, may continue with step S7710. At step S7710, in embodiments, the digital asset exchange computer system may verify the first response to the second request. In embodiments, the digital asset exchange system may verify the first response by determining whether the first user has sufficient funds to cover the first request (e.g., in the one or more accounts identified by the first user in the first response). For example, the digital asset exchange system may confirm that the one or more identified accounts have a combined value equal to or greater than the value associated with the payment amount. In embodiments, the digital asset exchange may verify access credentials associated with the first user to verify the first response. In embodiments, the digital asset exchange system may verify the first response by determining whether credit associated with the first user is sufficient. In embodiments, the digital asset exchange computer system may verify the first response adheres to format requirements. For example, the format requirements may require the information associated with the first response was input correctly. As another example, the format requirements may verify the information is sufficient to set up an automatic payment. If, for example, the first response cannot be verified, the digital asset exchange computer system may: decline the automatic payment transaction, request additional information, notify the first user of the reason(s) why the first response was declined, notify the first user of the reason(s) why and/or what additional information is required and/or a combination thereof, to name a few.

The process, in embodiments, may continue with step S7712. At step S7712, in embodiments, the digital asset exchange computer system may determine first automatic payment information associated with the first automatic payment based on the first request, the second request, and/or the first response. The first automatic payment information, in embodiments, may include a portion (and/or all)

of the information associated with the first request, the second request, and/or the first response. In embodiments the first automatic payment information may be generated by extracting information from the first request, the second request, and/or the first response. The first automatic payment information, in embodiments, may be generated by populating data fields (and/or data tables) with data based on the first request, the second request, and/or the first response. The first automatic payment information, in embodiments at step S7714, may be stored by the digital asset exchange computer system in memory operatively connected to the digital asset exchange system (e.g., memory 6102-C).

The first automatic payment information, in embodiments, may be used to reference for monitoring, preparing for, and/or executing automatic payments. For example, the digital asset exchange computer system may reference the first automatic payment information to monitor payment dates associated with one or more automatic payments. As another example, the first automatic payment information may be used by the digital asset exchange computer system to populate data fields in a generated transaction.

In embodiments, the digital asset exchange computer system may employ a third-party to monitor payment dates associated with one or more automatic payments. In such embodiments, the digital asset exchange computer system may generate and send monitoring information to a third-party computer system associated with the third-party via a network (e.g., network 125, blockchain network 1807, a combination thereof, to name a few). The monitoring information, in embodiments, may include one or more of the following: (1) the first automatic payment information; (2) the first request; (3) the second request; (4) the first response; (5) a public address associated with the first automatic payment information; and/or (6) a combination thereof, to name a few. In embodiments, the third-party computer system may monitor the payment dates of one or more users, and, as payment dates approach, notify the digital asset exchange computer system and/or the first user device of the upcoming automatic payment. The notification, in embodiments, may include one or more of the following: the third-party to which the payment is due, the payment date, the preliminary payment amount, a current payment amount (e.g., where the user has selected a preference—pay the full amount, pay the minimum amount, to name a few), the one or more user accounts that will be used for the automatic payments, current balance(s) associated with the one or more user accounts, and/or a combination thereof.

In embodiments, the digital asset exchange computer system may employ a third-party computer system may monitor one or more public address associated with the first user. If, for example, the balance associated with the one or more public addresses drops below a predetermined amount, the third-party computer system may notify the digital asset exchange computer system and/or the first user device. The predetermined amount, in embodiments, may be one or more of the following: the preliminary payment amount, a current payment amount, a percentage above the preliminary payment amount and/or a current payment amount, a percentage below the preliminary payment amount and/or a current payment amount, an amount above the preliminary payment amount and/or a current payment amount, an amount below the preliminary payment amount and/or a current payment amount, and/or a combination thereof, to name a few. If, for example, one or more balances drops below the predetermined amount, the digital asset exchange computer system may notify the first user, decline the first automatic payment, and/or a combination thereof, to name a few.

The process, in embodiments, may continue with step S7716 of FIG. 77A-2. Referring to FIG. 77A-2, at step S7716, the digital asset exchange computer system may determine a first payment date associated with the first automatic payment indicates the first automatic payment is due. The determination, in embodiments, may be based one or more of the following: the first automatic payment information, the first response to the second request, the first request, the second request, and/or a combination thereof. In embodiments, the determination may be based on a notification received from a third-party computer system. The notification, in embodiments, may indicate the first automatic payment is due. Step S7716, in embodiments, may be repeated until the first automatic payment is due (e.g., monitoring the first automatic payment).

An exemplary process for determining the first automatic payment is due may begin with step S7716A. At step S7716A, in embodiments, the digital asset exchange computer system may obtain the first automatic payment information associated with the first automatic payment to determine a first payment date associated with the first automatic payment. The first automatic payment date, in embodiments, may be the payment date associated with the first response to the second request. At step S7716B, in embodiments, the digital asset exchange computer system may compare a current date and the first payment date. The comparison, in embodiments, may be to determine the difference between the dates. The difference, in embodiments, may be 0 (e.g., the due date is the current date) and/or have an absolute value greater than 0 (e.g., the due date is after the current date). In embodiments, an automatic payment may require an amount of time to prepare and/or execute. In such embodiments, the first automatic payment may be "due" before the due date to account for the latency. In embodiments, as noted above with the description of monitoring, the digital asset exchange may repeat steps S7716A and S7716B (e.g., monitor) until the difference between the dates is either zero or the absolute value is above zero.

The process, in embodiments, may continue with step S7718. In embodiments, at step S7718, the digital asset exchange computer system may determine a first payment amount associated with the first payment date. The first payment amount, in embodiments, may be the preliminary payment amount. The first payment amount may, in embodiments, be measured in the same units as the payment type associated with the first automatic payment. For example, the first payment amount and the payment type may be a first digital asset. In embodiments, the first payment amount may be measured in different units as the payment type associated with the first automatic payment. For example, the first payment amount may be in fiat, and the payment type may be in a first type of digital asset. In embodiments, the first payment amount may be associated with a selection—e.g., pay the minimum, pay the balance, to name a few. In such embodiments, the digital asset exchange may determine the first payment amount by determining a current balance of the account associated with the first user and the third-party to which the first automatic payment is owed. The current balance may be measured in the same units as the payment type associated with the first automatic payment. In embodiments, the current balance may be measured in different units as the payment type associated with the first automatic payment. In embodiments, the determination may be based on a notification received from a third-party computer system. The notification, in embodiments, may indicate the first payment amount.

An exemplary process for determining the first payment amount may begin with step S7718A. At step S7718A, in embodiments, the digital asset exchange computer system may obtain a first conversion rate of fiat to the type of digital asset. The process may continue with step S7718B. At step S7718B, in embodiments, the digital asset exchange may determine an actual payment amount associated with the first automatic payment. The actual payment amount, in embodiments, may be the preliminary payment amount. In embodiments, the actual payment amount may include fees associated with the first automatic payment. In embodiments, as described above, the first payment amount may be associated with a selection—e.g., pay the minimum, pay the balance, to name a few. In such embodiments, the first actual payment may be determined by the digital asset exchange by determining a current balance of the account associated with the first user and the third-party to which the first automatic payment is owed. The process may continue with step S7718C. At step S7718C, in embodiments, the digital asset exchange may calculate the first payment amount measured in the payment type (e.g., the type of digital asset). The digital asset exchange, in embodiments, may convert the actual payment amount (e.g., measured in fiat) to a second amount (e.g., measured in the type of digital asset associated with the payment type) based on the obtained first conversion rate.

The process, in embodiments, may continue with step S7720. In embodiments, at step S7720, the digital asset exchange computer system may verify that a balance associated with the one or more accounts includes at least the first payment amount. In embodiments, the digital asset exchange computer system may verify that the aforementioned balance is greater than or equal to the first payment amount. For example, if the first payment amount is 1 BITCOIN, the digital asset exchange computer system would verify that one or more accounts associated with the first user includes at least 1 BITCOIN. In embodiments, the balance associated with one or more accounts associated with the first user may be less than the first payment amount. In such embodiments, for example, the digital asset exchange computer system may decline the transaction. Continuing the example, the digital asset exchange system, in embodiments, may generate and send a notification to the first user device indicating the first automatic payment was declined and/or why the first automatic payment was declined. As another example, the digital asset exchange system may partially execute the transaction, utilizing the remaining balance (and/or a predetermined amount of the balance) of the one or more accounts associated with the first user. Continuing the example, the digital asset exchange system, in embodiments, may generate and send a notification to the first customer device indicating the partially executed transaction and/or why the transaction was partially executed. As another example, the digital asset exchange system may partially execute the transaction, utilizing the remaining balance (and/or a predetermined amount of the balance) of the one or more accounts associated with the first user. Continuing the example, the difference between the balance of the one or more accounts and the first payment amount may be made up by balances of one or more additional accounts associated with the first user (e.g., digital asset exchange accounts, fiat exchange accounts, one or more public addresses associated with the first user and/or a combination thereof, to name a few). In embodiments, the digital asset exchange system, may generate and send a request to the first user device requesting authorization to use the balance of the one or more additional accounts. Continuing the example, the digital asset exchange system, in embodiments, may generate and send a notification to the first customer device indicating the partially executed transaction and/or the digital assets used to make up the difference. As another example, if the balance of the one or more accounts includes sufficient funds, the digital asset exchange computer system may pay the minimum payment associated with the first automatic payment.

In embodiments, the first payment will be made using digital assets and/or fiat associated with a customer exchange account and/or customer fiat exchange account respectively. Such embodiments, for example, may continue with step S7722B of FIG. 77B. In embodiments, the first payment will be made using digital assets associated with a customer interest-bearing account and/or proceeds (e.g., interest) from the customer interest-bearing account. Such embodiments, for example, may continue with step S7722C-1. In embodiments, the steps described in connection with FIG. 77A-1 and FIG. 77A-2 may be rearranged or omitted.

Figure 77:
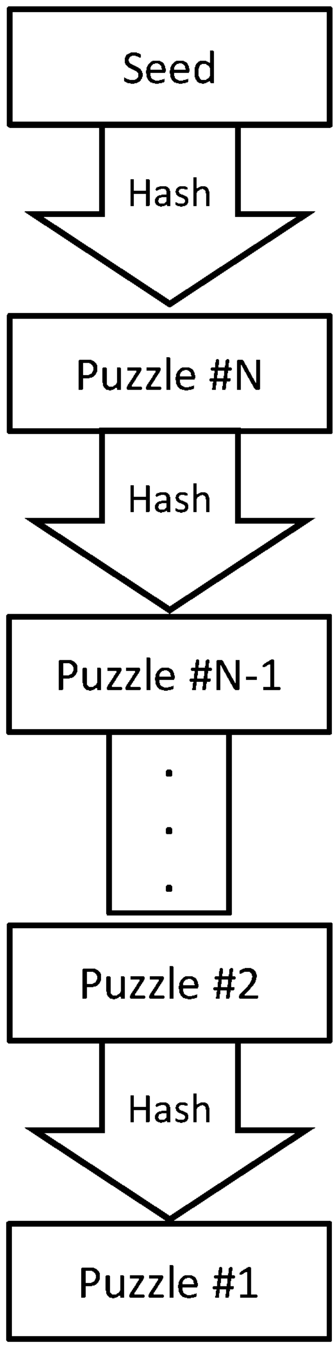
FIG. 77 is an exemplary diagram illustrating an exemplary order of an exemplary asymmetric puzzle sequence in accordance with exemplary embodiments of the present invention.
Figures 1, 77A:
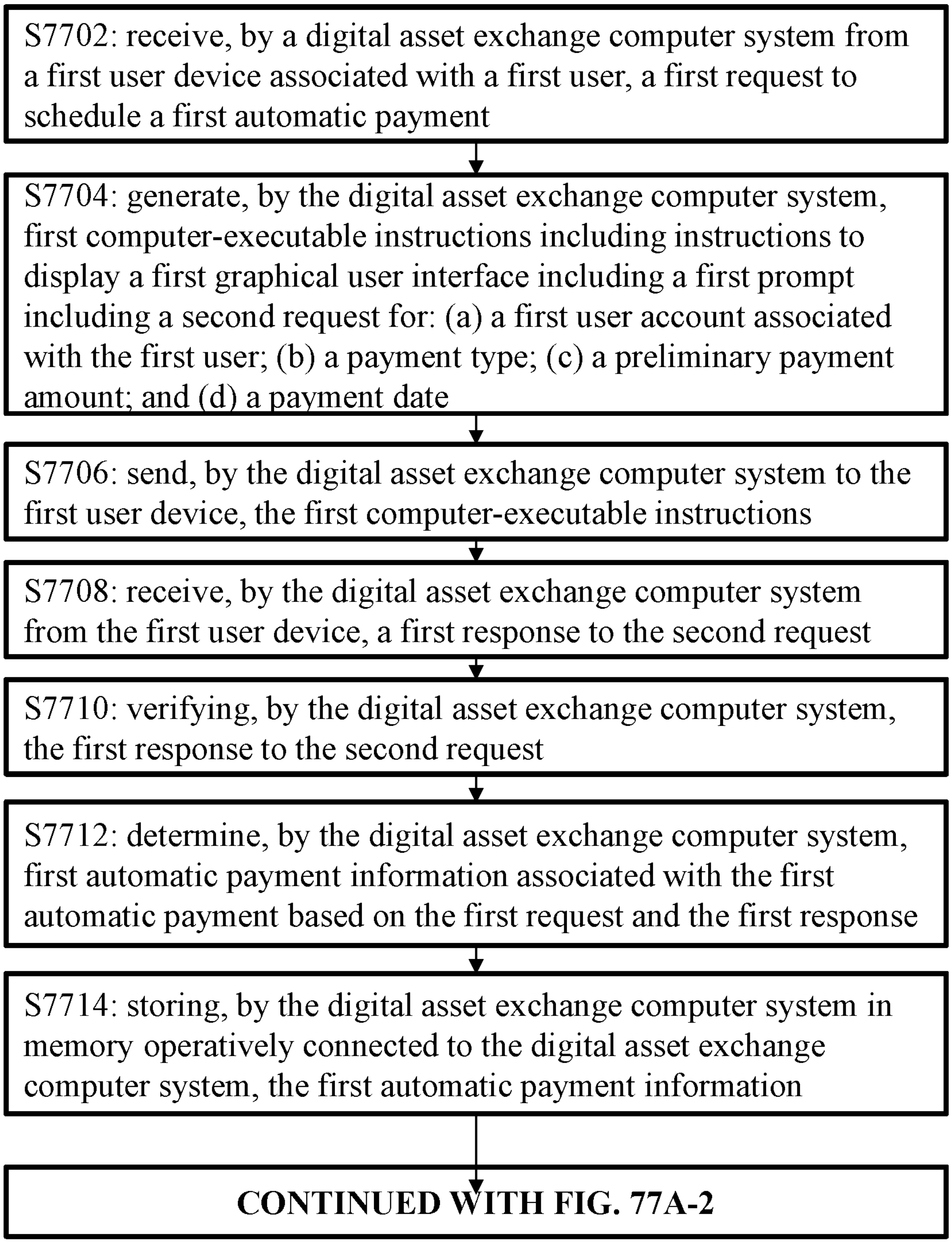
Figures 2, 77A:
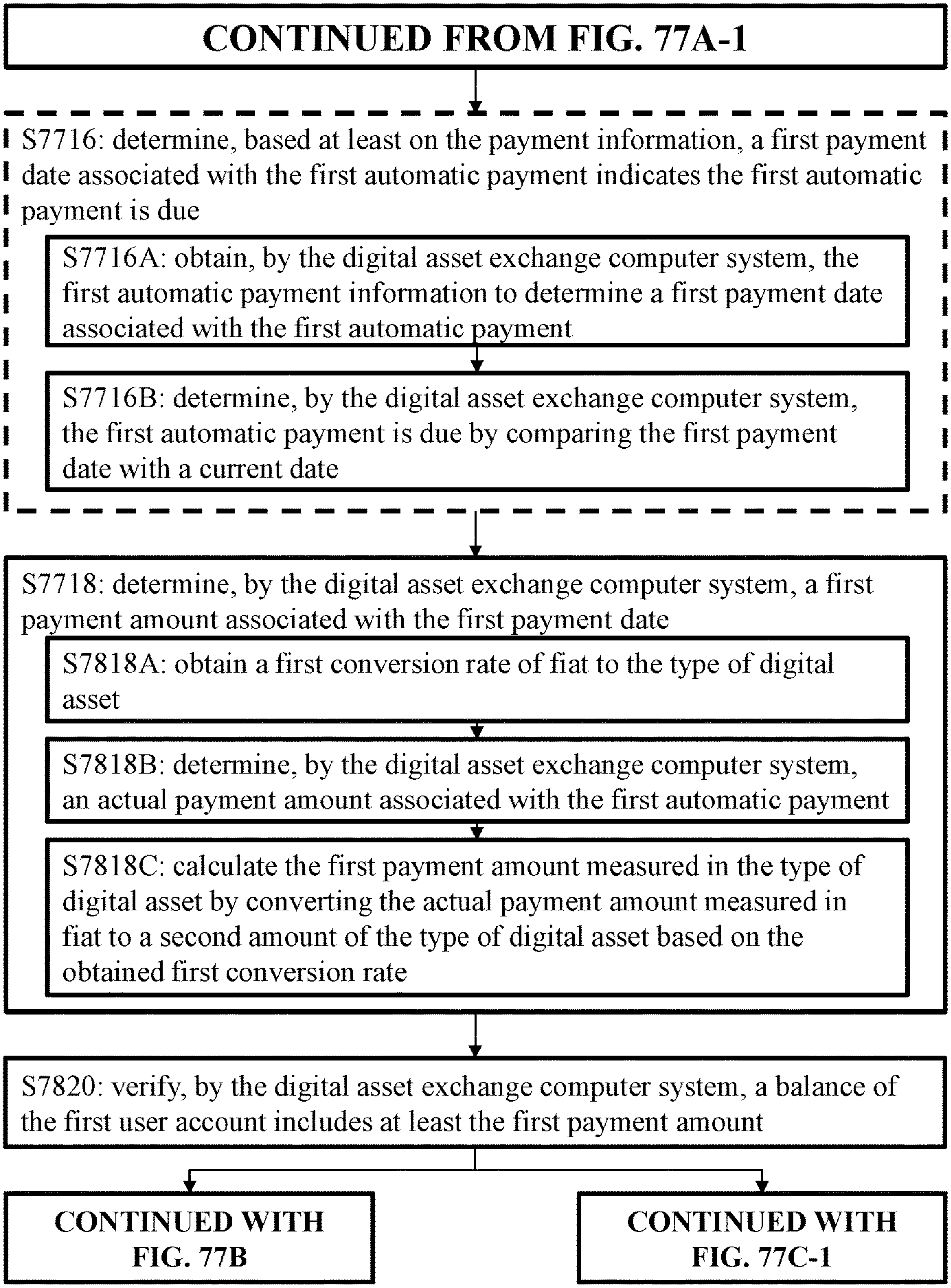
Figure 77B:
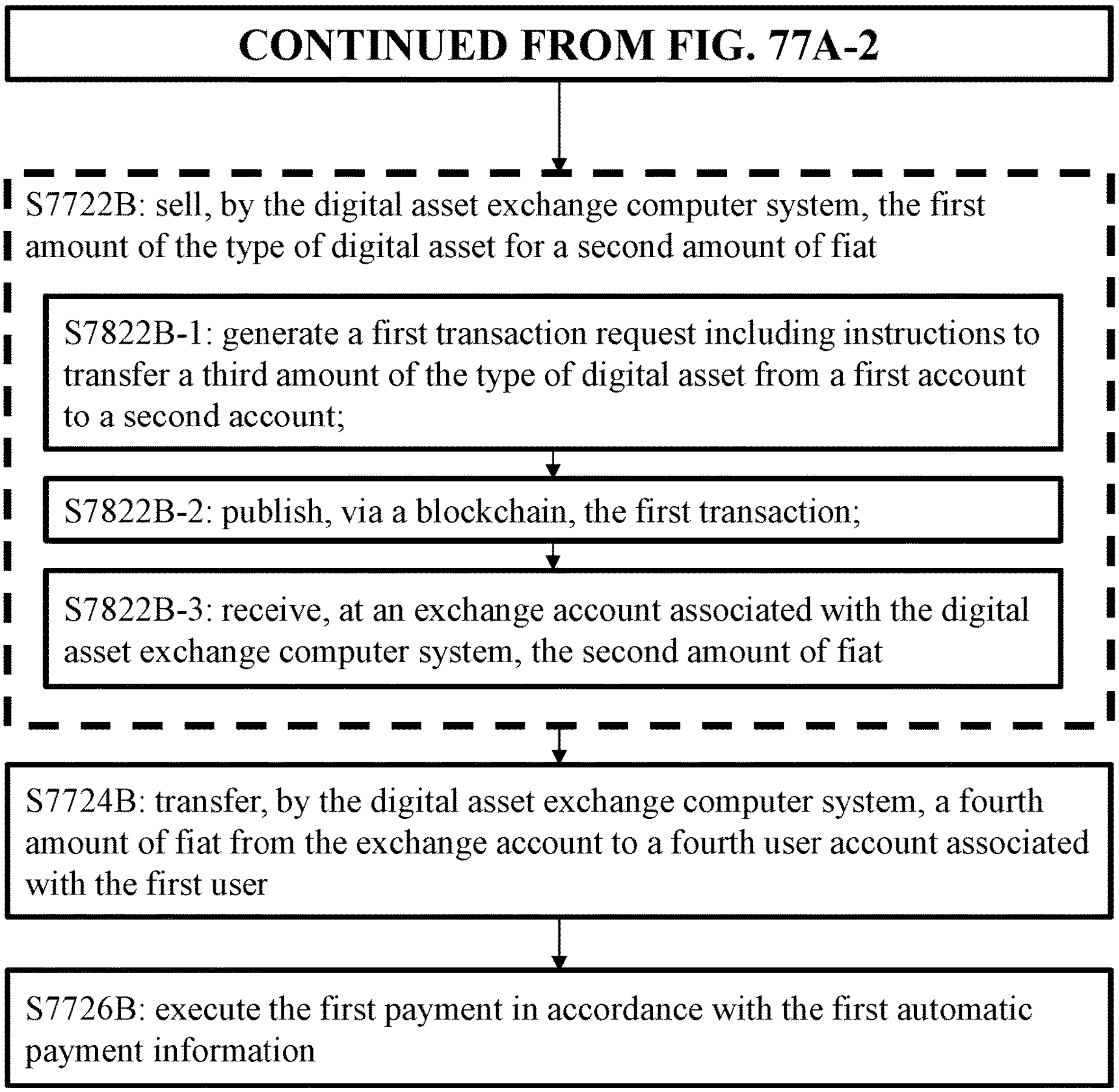
FIG. 77B is an exemplary flow chart of a process to set up an automatic payment in accordance with exemplary embodiments of the present invention.

Referring to FIG. 77B, in embodiments, the process may continue from FIG. 77A-2 with step S7722B. At step S7722B, in embodiments, the digital asset exchange computer system sells the first amount of the first type of digital asset for a second amount of fiat. In embodiments, the second amount of fiat may be greater than or equal to the first payment amount. The second amount of fiat may account for one or more fees associated with the first automatic transaction. In embodiments, the digital asset exchange computer system may sell the first amount of the first type of digital asset via a ledger transaction (e.g., using one or more of digital asset electronic ledger 7112, a first fiat currency electronic ledger 7114, and/or a second fiat currency electronic ledger 7116, to name a few). In embodiments, the proceeds from the sale of the first amount of the first type of digital asset may be received by a fiat account associated with the digital asset exchange. The proceeds from the sale, in embodiments, may be received by a fiat account associated with the first user.

In embodiments, the digital asset exchange computer system may sell the first amount of the first type of digital asset via a blockchain transaction. An exemplary process associated with selling the first amount of the first type of digital asset via a blockchain transaction may begin with step S7722B-1. At step S7722B-1, in embodiments, the digital asset exchange computer system may generate a first transaction request including instructions to transfer a third amount of the first type of digital asset from a first account to a second account. The third amount, in embodiments may account for an amount of fiat to replenish a liquidity reserve account associated with the digital asset exchange. The third amount, in embodiments, may be an amount greater than or equal to the first amount of the first type of digital asset. In embodiments, the third amount may be an amount equal to one or more automatic payments associated with one or more users associated with the digital asset exchange. The first account, in embodiments, may be a public address on a blockchain associated with the first user. In embodiments, the first account may be a public address on a blockchain associated with the digital asset exchange. In embodiments, the second account may be a public address on a blockchain associated with the digital asset exchange. In embodiments, the second account may be a public address on a blockchain associated with a third-party purchasing the third amount of the first type of digital asset. In embodiments, the transaction request may be digitally signed using a private key associated with the first user. In embodiments, the transaction request may be digitally signed with a private key associated with the digital asset exchange. The process may continue with step S7722B-2 where the digital asset exchange computer system, in embodiments, publishes the first transaction request via a blockchain. The publishing of the first transaction request, in embodiments, may result in the execution of the first transaction request, which may result in the third amount of the first type of digital asset being transferred from the first account to the second account. The execution of the transaction request, in embodiments, may result in, at step S7722B-3, the digital asset exchange receiving, at an exchange account associated with the digital asset exchange, the second amount of fiat.

The process, in embodiments, may continue with step S7724B. At step S7724B, in embodiments, the digital asset exchange computer system may transfer a fourth amount of fiat from the exchange account to an account associated with the first user (e.g., one of the one or more accounts from the first automatic payment information). The fourth amount of fiat may be the second amount of fiat. The fourth amount of fiat may be based on a current value of the first type of digital asset (e.g., the third amount of the first type of digital asset may be worth more or less than the second amount of fiat at the time of the sale).

The process, in embodiments, may continue with step S7726B. At step S7726B, the digital asset exchange computer system may execute the first payment in accordance with the first automatic payment information. The first payment may be executed by an automated payment service operatively connected to and/or associated with the digital asset exchange. In embodiments, the first payment may be executed via an ACH payment.

In embodiments, once the first payment is executed, the digital asset exchange computer system may generate a confirmation message indicating execution of the first payment and/or a confirmation number associated with the first payment. The confirmation message, in embodiments, may be sent from the digital asset exchange computer system to the first user device. In embodiments, the first payment may not be executed. In such embodiments, the digital asset exchange computer system may generate a message indicating the failure of the first payment and/or reason(s) for the failure of the first payment). The message, in embodiments, may be from the digital asset exchange computer system to the first user device.

In embodiments, the steps described in connection with FIG. 77A-1, FIG. 77A-2, and FIG. 77B may be rearranged or omitted.

Figures 1, 77C:
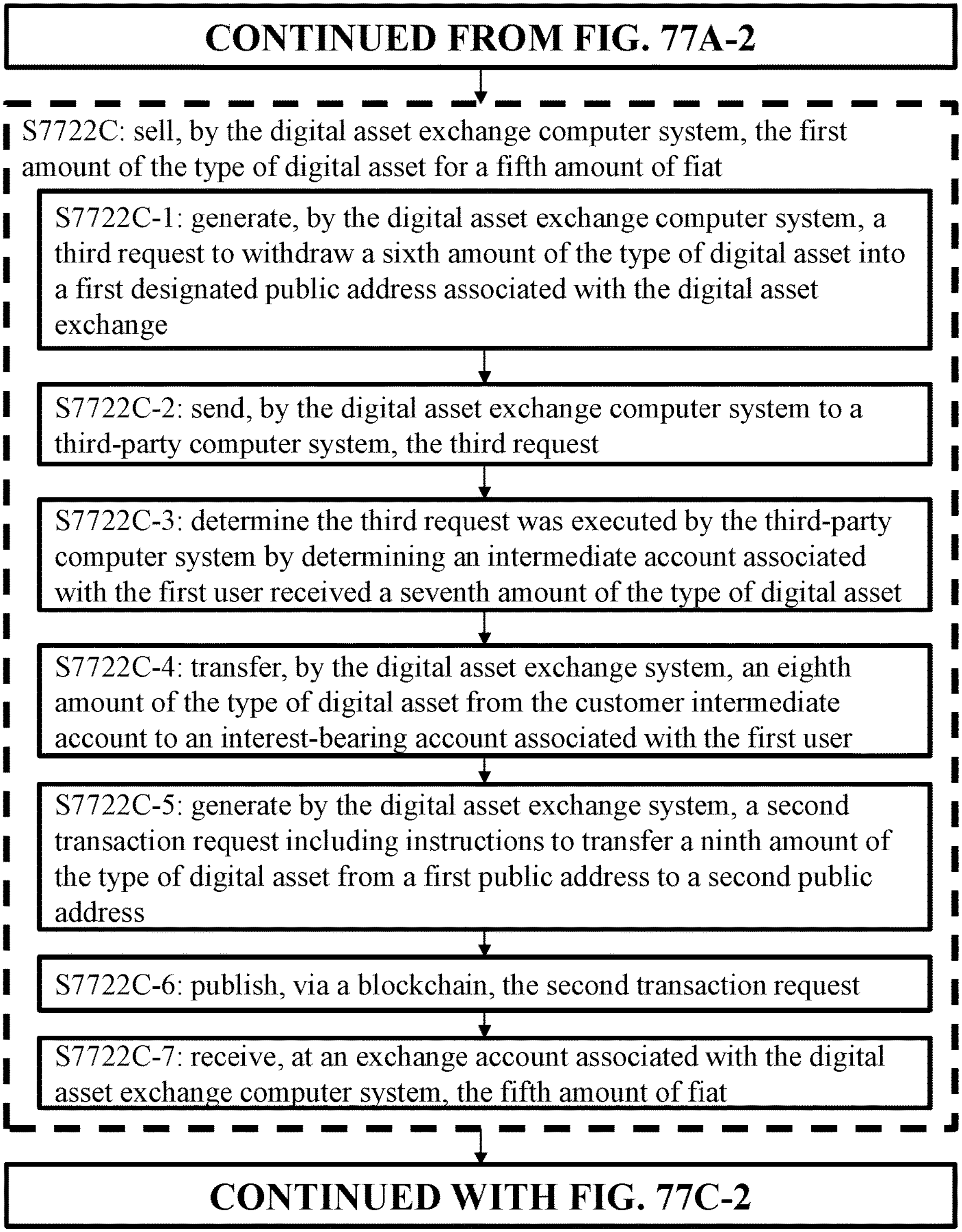
Figures 2, 77C:
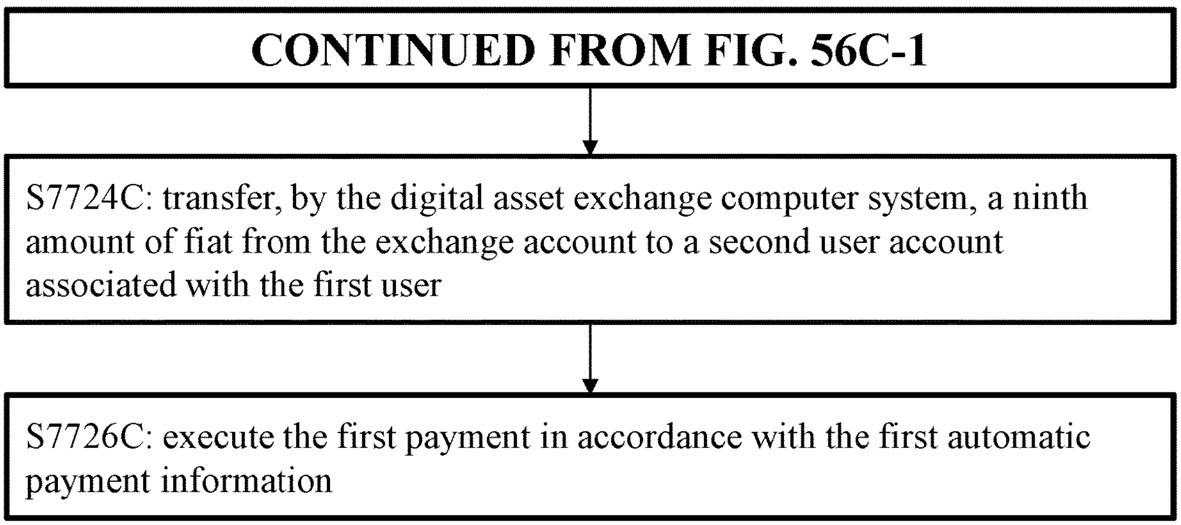

In embodiments, as described above, the process described in connection with FIGS. 77A-1 and 77A-2 may continue with step S7722C of FIG. 77C-1. Referring to FIG. 77C-1, in embodiments, at step S7722C, the digital asset exchange computer system may sell the first amount of the first type of digital asset for a fifth amount of fiat. The first amount of the first type of digital asset, in embodiments, may be digital assets associated with a customer interest-bearing account associated with the first user. In embodiments, the first amount may be proceeds from the digital assets associated with the customer interest-bearing account associated with the first user. The fifth amount of fiat, in embodiments, may refer to the second amount of fiat. In embodiments, the fifth amount of fiat may be less than the second amount of fiat. For example, the first payment may be only partially made by proceeds of the customer interest-bearing account. The remaining portion of the first payment, continuing the example, may be made using digital assets held in a customer digital asset account associated with the first user. are used for a portion of the balance). In embodiments, the fifth amount of fiat may be greater than the second amount of fiat. In embodiments, the fifth amount of fiat may account for one or more of the following: fees associated with the first automatic payment, an increase in the first payment as compared to the preliminary payment information (raises in the minimum payment, raises in the balance owed, etc.), may include an amount of the first digital asset to account for a plurality of customers including the first customer, and/or a combination thereof, to name a few.

An exemplary process for selling the first amount of the first type of digital asset for a fifth amount of fiat may begin with step S7722C-1. At step S7722C-1, in embodiments, the digital asset exchange computer system may generate a third request to withdraw a sixth amount of the first type of digital asset. The third request, in embodiments, may include instructions to transfer the sixth amount of the first type of digital asset from a public address on a blockchain and associated with a third-party computer system to a first designated public address on the blockchain associated and with the digital asset exchange. In embodiments, the third request may include a digitally signed transaction request (e.g., by a private key associated with the digital asset exchange and/or the first user), including instructions to transfer the sixth amount of the first type of digital asset from the public address associated with a third-party computer system to the first designated public address associated with an intermediary computer system (e.g., associated with the third electronic ledger database 5506) and/or the digital asset exchange. The sixth amount of the first type of digital asset, in embodiments, may refer to the first amount of the first type of digital asset. In embodiments, sixth amount of the first type of digital asset may be less than the first amount of the first type of digital asset. For example, the first payment may be only partially made by proceeds of the customer interest-bearing account. The remaining portion of the first payment, continuing the example, may be made using digital assets held in a customer digital asset account associated with the first user. In embodiments, the sixth amount of the first type of digital asset may be greater than the first amount of the first type of digital asset. In embodiments, the sixth amount of the first type of digital asset may account for one or more of the following: fees associated with the first automatic payment, an increase in the first payment as compared to the preliminary payment information (raises in the minimum payment, raises in the balance owed, etc.), may include an amount of the first digital asset to account for a plurality of customers including the first customer, and/or a combination thereof, to name a few.

The process, in embodiments, may continue with step S7722C-2. At step S7722C-2, in embodiments, the digital asset exchange computer system may send the third request to a third-party computer system. The third-party computer system, in embodiments, may refer to a third-party associated with the customer interest-bearing account associated with the first user (e.g., a third-party lender). The request, in embodiments, may also be, or alternatively be published by the digital asset exchange computer system via a blockchain. In embodiments, the publication of the transaction may result in the sixth amount of the first type of digital asset being transferred from the public address associated with the third-party computer system to the designated public address associated with the intermediary computer system and/or the digital asset exchange computer system.

In embodiments, the digital asset exchange computer system may monitor the sent (and/or published) request to determine at step S7722C-3 that the third request was executed by the third-party computer system. In embodiments, the digital asset exchange computer system may monitor the third request by monitoring transactions involving the intermediary computer system. For example, the digital asset exchange computer system may employ a third-party to monitor transactions involving the intermediary computer system. In such embodiments, the digital asset exchange computer system may generate and send monitoring information to a third-party computer system associated with the third-party via a network (e.g., network 125, blockchain network 1807, a combination thereof, to name a few). The monitoring information, in embodiments, may include one or more of the following: (1) one or more accounts associated with the intermediary computer system; (2) the third request; (3) the third-party computer system; (4) the published transaction request; and/or (5) a combination thereof, to name a few. In embodiments, the third-party computer system may monitor the payment dates of one or more users, and, as payment dates approach, notify the digital asset exchange computer system and/or the first user device of the upcoming automatic payment. The notification, in embodiments, may include one or more of the following: the third-party to which the payment is due, the payment date, the preliminary payment amount, a current payment amount (e.g., where the user has selected a preference—pay the full amount, pay the minimum amount, to name a few), the one or more user accounts that will be used for the automatic payments, current balance(s) associated with the one or more user accounts, and/or a combination thereof.

In embodiments, the digital asset exchange may determine the third request was executed by the third-party computer system by determining an intermediate account associated with the first user and the intermediary received a seventh amount of the first type of digital asset. The seventh amount of the first type of digital asset, in embodiments, may refer to the first amount of the first type of digital asset. In embodiments, seventh amount of the first type of digital asset may be less than the first amount of the first type of digital asset. For example, the first payment may be only partially made by proceeds of the customer interest-bearing account. The remaining portion of the first payment, continuing the example, may be made using digital assets held in a customer digital asset account associated with the first user. In embodiments, the seventh amount of the first type of digital asset may be greater than the first amount of the first type of digital asset. In embodiments, the seventh amount of the first type of digital asset may account for one or more of the following: fees associated with the first automatic payment, an increase in the first payment as compared to the preliminary payment information (raises in the minimum payment, raises in the balance owed, etc.), may include an amount of the first digital asset to account for a plurality of customers including the first customer, and/or a combination thereof, to name a few.

The process, in embodiments, may continue with step S7722C-4. At step S7722C-4, in embodiments, the digital asset exchange system may transfer an eighth amount of the first type of digital asset from the customer intermediate account to an interest-bearing account associated with the first user (e.g., a customer intermediate account associated with the first customer, an intermediary between the digital asset exchange, and/or one or more third party institutions). The digital asset exchange system, for example, may transfer the eighth amount of the first digital asset by first updating an electronic ledger (e.g., Second Electronic Interest Ledger Database 5504) to reflect the transfer of the eighth amount of the first type of digital asset into an account associated with the first user (e.g., a customer interest-bearing account, a customer digital asset exchange account, to name a few). As another example, in embodiments, the digital asset exchange system may transfer the eighth amount of the first type of digital asset by updating the electronic ledger which may be included in the Second Electronic Interest Ledger Database 5504 to reflect the transfer of the eighth amount of the first type of digital asset less a reserve amount. The reserve amount transfer to a reserve account associated with the digital asset exchange, continuing the example, may be accounted for by the digital asset exchange system updating an additional electronic ledger which may be included in the Third Electronic Ledger Database 5506 (which may be followed by a transfer of the reserve amount into a customer reserve account—e.g., via the Fourth Electronic Reserve Ledger Database 5508.

In embodiments, the eighth amount of the first digital asset may be sold by the digital asset exchange via a ledger transaction (e.g., using one or more of digital asset electronic ledger 7112, a first fiat currency electronic ledger 7114, and/or a second fiat currency electronic ledger 7116, to name a few). In embodiments, the proceeds from the sale of the eighth amount of the first type of digital asset (e.g., the second amount fiat) may be received by a fiat account associated with the digital asset exchange. The proceeds from the sale, in embodiments, may be received by a fiat account associated with the first user.

In embodiments, the eighth amount of the first digital asset may be sold by the digital asset exchange via a blockchain transaction. An exemplary process associated with selling the eighth amount of the first type of digital asset via a blockchain transaction may begin with (and continuing the process described in FIG. 77C-1) step S7722C-5. At step S7722C-5, in embodiments, the digital asset exchange computer system may generate a second transaction request including instructions to transfer a ninth amount of the first type of digital asset from a first public address to a second public address. The ninth amount, in embodiments may account for an amount of fiat to replenish a liquidity reserve account associated with the digital asset exchange. The ninth amount, in embodiments, may be an amount greater than or equal to the first amount of the first type of digital asset. In embodiments, the ninth amount may be an amount equal to one or more automatic payments associated with one or more users associated with the digital asset exchange. The first public address, in embodiments, may be a public address on a blockchain and associated with the first user. In embodiments, the first public address may be a public address on a blockchain and associated with the digital asset exchange. In embodiments, the second account may be a public address on a blockchain associated with the digital asset exchange. In embodiments, the second public address may be a public address on a blockchain and associated with a third-party purchasing the third amount of the first type of digital asset. In embodiments, the second public address may be a public address on a blockchain and associated with the digital asset exchange. In embodiments, the transaction request may be digitally signed using a private key associated with the first user. In embodiments, the transaction request may be digitally signed with a private key associated with the digital asset exchange.

An exemplary process associated with selling the eighth amount of the first type of digital asset via a blockchain transaction may begin with step S7722C-5. At step S7722C-5, in embodiments, the digital asset exchange computer system may generate a second transaction request including instructions to transfer a ninth amount of the first type of digital asset from a first public address to a second public address. The ninth amount, in embodiments may account for an amount of fiat to replenish a liquidity reserve account associated with the digital asset exchange. The ninth amount, in embodiments, may be an amount greater than or equal to the first amount of the first type of digital asset. In embodiments, the ninth amount may be an amount equal to one or more automatic payments associated with one or more users associated with the digital asset exchange. The first public address, in embodiments, may be a public address on a blockchain and associated with the first user. In embodiments, the first public address may be a public address on a blockchain and associated with the digital asset exchange. In embodiments, the second account may be a public address on a blockchain associated with the digital asset exchange. In embodiments, the second public address may be a public address on a blockchain and associated with a third-party purchasing the third amount of the first type of digital asset. In embodiments, the second public address may be a public address on a blockchain and associated with the digital asset exchange. In embodiments, the transaction request may be digitally signed using a private key associated with the first user. In embodiments, the transaction request may be digitally signed with a private key associated with the digital asset exchange.

The process may continue with step S7822C-6 where the digital asset exchange computer system, in embodiments, publishes the second transaction request via a blockchain. The publishing of the second transaction request, in embodiments, may result in the execution of the second transaction request, which may result in the ninth amount of the first type of digital asset being transferred from the first account to the second account. The execution of the transaction request, in embodiments, may result in, at step S7722C-7, the digital asset exchange receiving, at an exchange account associated with the digital asset exchange, the fifth amount of fiat.

The process, in embodiments, may continue with step S7724C of FIG. 77C-2. Referring to FIG. 77C-2, in embodiments, at step S7724C the digital asset exchange computer system transfers a tenth amount of fiat from the exchange account to a second user account associated with the first user (e.g., a fiat exchange account associated with the first user). The transfer, in embodiments, may be ledger transaction. The tenth amount of fiat may be the fifth amount of fiat. The tenth amount of fiat may be based on a current value of the first type of digital asset (e.g., the third amount of the first type of digital asset may be worth more or less than the second amount of fiat at the time of the sale). The tenth amount of fiat may be the fifth amount of fiat plus fees required for the first payment. The tenth amount of fiat may be the fifth amount of fiat less fees that are required for the first payment.

The process, in embodiments, may continue with step S7726C. At step S7726C, the digital asset exchange computer system may execute the first payment in accordance with the first automatic payment information. The first payment may be executed by an automated payment service operatively connected to and/or associated with the digital asset exchange. In embodiments, the first payment may be executed via an ACH payment.

In embodiments, once the first payment is executed, the digital asset exchange computer system may generate a confirmation message indicating execution of the first payment and/or a confirmation number associated with the first payment. The confirmation message, in embodiments, may be sent from the digital asset exchange computer system to the first user device. In embodiments, the first payment may not be executed. In such embodiments, the digital asset exchange computer system may generate a message indicating the failure of the first payment and/or reason(s) for the failure of the first payment). The message, in embodiments, may be from the digital asset exchange computer system to the first user device.

The above description with regard to charges that are to be paid by automatic payments (e.g., paying a monthly credit card payment) was for exemplary purposes. The one or more charges may, in embodiments, include: charges for goods, charges for services, credit card payments, mortgage payments, utilities, charges for fines, charges for charity, transfers to another account associated with the respective customer, transfers to another account associated to a third-party, and/or a combination thereof, to name a few.

In embodiments, the steps described in connection with FIG. 77A-1, FIG. 77A-2, FIG. 77C-1, and FIG. 77C-2 may be rearranged or omitted.

In embodiments, an administrator operatively connected to an administrator computer system and/or digital asset exchange (e.g., digital asset exchange 6110) operatively connected to a digital asset exchange computer system (e.g., digital asset exchange computer system 6102) may provide one or more rewards to one or more customers based on one or more criteria. Rewards, in embodiments, may include one or more of the following: an amount of digital asset (e.g., stable value token, security token, cryptocurrencies, etc.), an amount of fiat, a coupon, a gift certificate, goods, services, charity, points, and/or a combination thereof, to name a few. In embodiments, the digital asset exchange system may reward customers for one or more of the following: use of accounts associated with the digital asset exchange, use of credit card, payment of credit card, time elapsed since becoming a customer, time elapsed since becoming a credit card holder, use of digital asset exchange account to pay one or more bills (e.g., automatic payment of bills described above in connection with FIGS. 77A-1-77C-2, the description of which applying herein), deposits into accounts associated with the digital asset exchange, and/or a combination thereof, to name a few.

In embodiments a process for providing one or more rewards to one or more customers may begin with FIG. 78A. Referring to FIG. 78A, in embodiments, the process may begin with one or more databases being provided. The one or more databases may be operatively connected to the digital asset exchange computer system. in embodiments, the provided one or more databases may include one or more of the following: (1) a first electronic exchange ledger associated with a first digital asset including, for each customer, exchange account information including a first digital asset account balance indicating a first amount of the first digital asset (e.g., First Electronic Exchange Ledger Database 5502); (2) a second electronic interest ledger associated with the first digital asset including, for each customer, interest-bearing account information including a second digital asset account balance indicating a second amount of the first digital asset and respective interest information (e.g., Second Electronic Interest Ledger Database 5504); (3) a the third electronic ledger associated with an intermediary, including, for each customer, intermediary account information including a third digital asset balance indicating a third amount of the first digital asset and respective return information (e.g., Third Electronic Ledger Database 5506); (4) a fourth electronic reserve ledger associated with the first digital asset, including, for each customer, reserve account information including a fourth digital asset balance indicating a fourth amount of the first digital asset (e.g., Fourth Electronic Reserve Ledger Database 5508); a fifth electronic exchange ledger associated with a second digital asset, including, for each customer, exchange account information including a second digital asset account balance indicating a fifth amount of the second digital asset (which may be similar in description to the first electronic exchange ledger and the First Electronic Exchange Ledger Database 5502, the descriptions of which applying herein); a sixth electronic reserve ledger associated with a first fiat balance indicating a sixth amount of fiat (e.g., Sixth Electronic Fiat Database 5514); a seventh electronic intermediary ledger associated with a second intermediary, including for each customer, exchange account information including a second intermediary account balance indicating a seventh amount of the second digital asset (which may be similar in description to the First Electronic Exchange Ledger Database 5502 and/or the Third Electronic Ledger Database 5506, the descriptions of which applying herein), and/or an eighth electronic reward ledger, including for each customer, customer reward information including reward program information indicating a program type and/or reward point information indicating an amount of rewards, to name a few.

In embodiments, the eighth electronic reward ledger may include reward program information and/or reward point information. The reward program information, in embodiments, may indicate one or more of the following: (1) the requirement information indicating one or more requirements for reward (e.g., use of accounts associated with the digital asset exchange, use of credit card, payment of credit card, time elapsed since becoming a customer, time elapsed since becoming a credit card holder, use of digital asset exchange account to pay one or more bills, deposits into accounts associated with the digital asset exchange, and/or a combination thereof, to name a few); (2) reward type information indicating what the respective customer receives as a reward (e.g., an amount of digital asset, an amount of fiat, a coupon, a gift certificate, goods, services, charity, points, and/or a combination thereof, to name a few); (3) customer information indicating the respective customer and a respective account associated with the respective customer (e.g., to receive the reward(s)); (4) third-party information indicating one or more third parties associated with the requirement information; and/or (5) a combination thereof, to name a few. Reward point information, in embodiments, may indicate one or more of the following: (1) the amount of rewards associated with the respective customer (e.g., amount of digital assets, coupons, fiat, etc.); (2) customer information indicating the respective customer and a respective account associated with the respective customer (e.g., to receive the reward(s)); (4) third-party information indicating one or more third parties associated with the reward(s); and/or (5) a combination thereof, to name a few.

In embodiments, the process may continue with step S7804. At step S7804, in embodiments, the administrator computer system may receive real-time transaction information including one or more transactions including a first transaction crediting a first amount to a first third-party on behalf of a first customer account associated with a first customer.

In embodiments, the process may continue with step S7806. At step S7806, in embodiments, the administrator computer system may store, in the one or more databases, the real-time transaction information.

In embodiments, the process may continue with step S7808. At step S7808, in embodiments, the administrator computer system may generate real-time reward information associated with one or more rewards owed to one or more customers including a first amount of fiat owed to the first customer. For example, at step S7808A, the administrator computer system may obtain third-party reward information associated with the first third-party. Continuing the example, at step S7808B, the administrator computer system may calculate the first reward information based at least on the first third-party reward information and the first transaction.

In embodiments, the process may continue with step S7810. At step S7810, in embodiments, the administrator computer system may store, in the one or more databases, the first reward information.

In embodiments, the process may continue with FIG. 78B. Referring to FIG. 78B, in embodiments, the process may continue with step S7812. At step S7812, in embodiments, the administrator computer system may determine a second amount of a first digital asset. For example, at step S7812A, the administrator computer system may obtain a first conversion rate of fiat to the first digital asset. Continuing the example, the administrator computer system may calculate the second amount of the first digital asset based on the first amount of fiat owed and the first conversion rate.

In embodiments, the process may continue with step S7814. At step S7814, in embodiments, the administrator computer system may purchase the second amount of the first digital asset. For example, the administrator computer system, at step S7814A, may transfer the first amount of fiat from an administrator fiat account associated with an administrator associated with the administrator computer system and a digital asset exchange computer system associated with a digital asset exchange to a first exchange account associated with the digital asset exchange. Continuing the example, at step S7814B, the administrator computer system may receive, at an administrator digital asset account associated with the administrator from a second exchange account associated with the digital asset exchange, the first amount of the first digital asset.

In embodiments, the process may continue with step S7816. At step S7816, in embodiments, the administrator computer system may transfer a first reward to the first customer by transferring the first amount of the first digital asset from the administrator digital asset account to an interest-bearing account associated with the first customer. The process, in embodiments, may continue with step S5518 of FIG. 55B (the descriptions of FIGS. 55A-55C and FIGS. 55A-1-55A-5 applying herein).

The process, in embodiments, may continue with FIG. 78C-1. Referring to FIG. 78C-1, in embodiments, the process may continue with step S7818. At step S7818, in embodiments, the administrator computer system may receive settlement transaction information including one or more transactions including a second transaction representing settling the first transaction.

In embodiments, the process may continue with S7820. At step S7820, in embodiments, the administrator computer system may store, in the one or more databases, the settlement transaction information.

In embodiments, the process may continue with step S7822. A step S7822, in embodiments, the administrator computer system may generate second reward information associated with the one or more rewards owed to the one or more customers including a second amount of fiat owed to the first customer. For example, at step S7822A, the administrator computer system may obtain second third-party reward information associated with the first third-party. Continuing the example, the administrator computer system at step S7822B may calculate the second reward information based at least on the second third-party reward information and the second transaction.

In embodiments, the process may continue with step S7824. At step S7824, in embodiments, the administrator computer system may store, in the one or more databases, the second reward information.

The process, in embodiments, may continue with FIG. 78C-2. Referring to FIG. 78C-2, in embodiments, the process may continue with step S7826. At step S7826, in embodiments, the administrator computer system (and/or a third party associated with the administrator computer system) may compare the first amount of fiat owed to the second amount of fiat owed to determine whether the administrator will adjust the first reward by a fourth amount of fiat.

The process in embodiments, may continue with step S7828. At step S7828, the administrator computer system may, in embodiments based on the comparison, determine whether the first reward will be adjusted. If, the administrator computer system determines the first reward will not be adjusted, in embodiments, the process may continue with step S5518 of FIG. 55B (the descriptions of FIGS. 55A-55C and FIGS. 55A-1-55A-5 applying herein).

In embodiments, the process may continue with step S7830. At step S7830, in embodiments, the administrator computer system may determine a fifth amount of the first digital asset. For example, the administrator computer system may obtain the first conversion rate of fiat to the first digital asset. Continuing the example, the administrator computer system may calculate the fifth amount of the first digital asset based on the fourth amount of fiat the first conversion rate.

The fifth amount, in embodiments, may indicate the reward adjustment (e.g., the amount of the first digital asset). In embodiments, at step S7832, the administrator computer system may determine whether the fifth amount (e.g., the reward adjustment) is positive or negative.

In embodiments, the fifth amount may be positive. In such embodiments, the process may continue with FIG. 78C-3. Referring to FIG. 78C-3, the process, in embodiments, may continue with step S7834. At step S7834, in embodiments, the administrator computer system may purchase the fifth amount of the first digital asset. For example, the administrator computer system at step S7834A may transfer the fourth amount of fiat from the administrator fiat account to the first exchange account. Continuing the example at step S7834, the administrator computer system may receive, at the administrator digital asset account from the second exchange account, the fifth amount of the first amount of the first digital asset. The process, in embodiments may continue with step S5518 of FIG. 55B (the descriptions of FIGS. 55A-55C and FIGS. 55A-1-55A-5 applying herein).

In embodiments, the fifth amount may be negative. In such embodiments, the process may continue with FIG. 78C-4. Referring to FIG. 78C-4, the process may continue with step S7836. At step S7836, in embodiments, the administrator computer system may store, in one or more databases the fifth amount of the first digital asset such that the fifth amount of the first digital asset is recorded as a balance against a second reward associated with the first customer.

The steps of the process described in connection with FIGS. 78A, 78B, and 78C-1 through 78C-4 may be rearranged or omitted.

Generation of Digital Asset Exchange Graphical User Interfaces

The particular systems, methods, and program products of embodiments of the present invention that generate graphical user interface (GUI) provide a solution to electronic order book data visualization problems. The potential for large numbers of orders in an electronic order book creates a technical data visualization problem, whereby it can be difficult for a user (e.g., a trader) to determine how a particular order or prospective order will impact the market or the market within a particular digital asset exchange system or how a particular order will be fulfilled based upon pending orders in a current order book. Embodiments of the present invention provide electronic order book visualization interfaces that include a representation of a prospective order defined by order parameters, which may be edited by the user. Upon editing prospective order parameters, the prospective order graphical representation may be updated to reflect the new parameters. These interfaces can provide a user with an intuitive depiction of both the current market and the effect of the prospective order on the market. The interfaces can also show how a prospective order may be fulfilled, not fulfilled, and/or the degree to which a prospective order will likely be fulfilled based on the current electronic order book. The interfaces also provide an unconventional visualization that can facilitate faster comprehension of the bounds of order book data (e.g., order prices and corresponding order volumes).

FIGS. 35A-L are exemplary screen shots of graphical user interfaces generated and/or provided by an exchange computer system. In embodiments, the exchange computer system may transmit display data to user devices, which can comprise machine-readable instructions to render such user interfaces. User interfaces may be based at least in part upon user activity (transaction histories, order information, such as potential order parameters, actual order parameters, order fulfillment data, order dates and/or times, to name a few) and/or market activity (e.g., prices, historical prices, price movements, high and/or low prices within a time period, transaction volume, order book information, to name a few, either globally or on one or more particular digital asset exchanges). The exchange computer system may track such data, compute such data, generate such data, and/or obtain such data (e.g., via one or more application programming interfaces (APIs)). Data for generating a user interface may be stored in non-transitory computer-readable memory operatively connected to the exchange computer system. The exchange computer system may process logical rules governing user interface content and/or layout to generate display data and/or instructions for rendering an interface at a user electronic device. Such data and/or instructions may be transmitted to the user device, which may render the interface. In embodiments, the user device may execute the machine-readable instructions to render the interface, which may be a dynamic interface that changes in response to user inputs and/or receipt of updated data values.

Figure 35A:
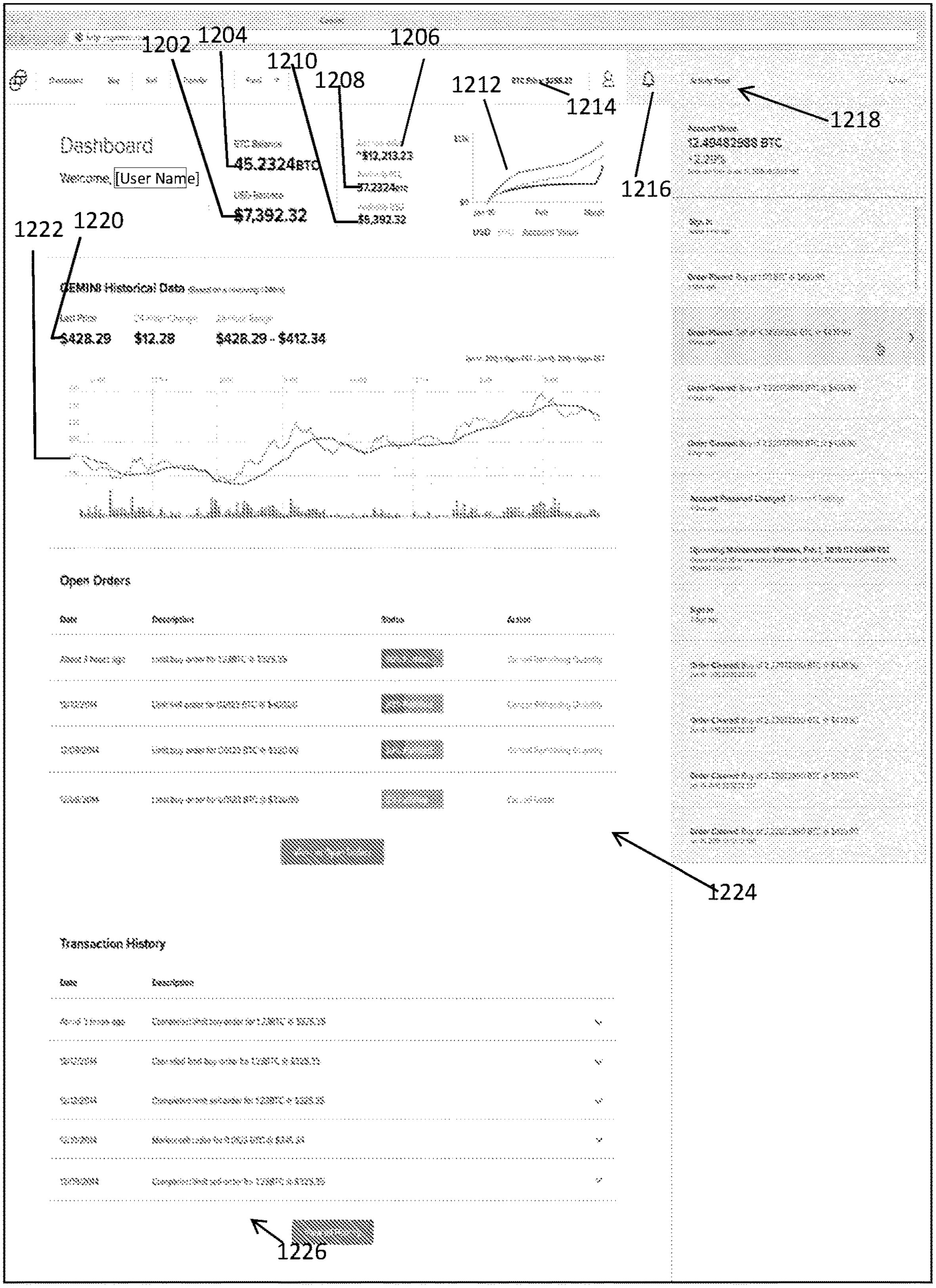
FIGS. 35A-L are exemplary screen shots of user interfaces provided by an exchange computer system in accordance with exemplary embodiments of the present invention.

Turning to FIG. 35A, a screenshot of a GUI for use with a digital asset exchange according to exemplary embodiments described herein is illustrated. The GUI may comprise a dashboard, which may present an overview of user activity (e.g., for a particular user or user account), exchange-wide activity, and/or broader market activity (e.g., based upon one or more exchanges or based upon a digital asset index, to name a few). For example, a current digital asset price 1214 may be displayed. Such price may be the market price based on the electronic order book of the digital asset exchange. In embodiments, such current digital asset price 1214 may be based upon one or more other exchanges and/or digital asset indices, which may provide a blended price (e.g., weighted by transaction volume at each price).

The dashboard GUI may present various information associated with a digital asset exchange, for example, balance information (including fiat currency balances 1202 and/or digital asset balances 1204), account value information (including present, past, and/or predicted values), historical trends, open orders, past orders, and/or user history, to name a few. Accordingly, such a dashboard interface may include account summary information, such as one or more digital asset balances 1204 and/or fiat currency (e.g., U.S. Dollar) balances 1202 associated with a particular user account or master account, which may be an umbrella account with a plurality of user sub-accounts. The dashboard interface may also include an account value 1206, which may be a sum of all digital asset balances and fiat currency balances. In embodiments, the account value may be expressed in digital asset quantities and/or in fiat currency amounts. Accordingly, the exchange computer system may estimate a conversion amount either from a digital asset balance to a fiat currency value or from a fiat currency balance to a digital asset value, which conversions may be based upon order book information for the exchange and/or a digital asset index, such as a current market price. The dashboard interface may also indicate values for available digital assets 1208 and available fiat currencies 1210 associated with a user account. Amounts available may be based upon account balances and pending orders, such as by subtracting pending digital asset purchase order amounts from a fiat currency balance of a user's fiat currency account associated with (e.g., held in custody by) the exchange or subtracting pending digital asset sale order amounts from a digital asset balance of a user's digital asset account associated with (e.g., held in custody by) the exchange. One or more graphs 1212 illustrating account balances and/or total account value, in digital asset amounts or fiat currency amounts, may be provided in the interface. In embodiments, graphs showing each account balance and a total account value may be overlaid on each other.

A dashboard GUI may include options to access different data. Such options may comprise graphical buttons, hyperlinks, text, and/or icons, to name a few. The GUI can include a user account data selection option, settings selection option, and/or a notification selection option 1216, selection of any of which may cause the digital asset exchange computer system to provide respective data, menus, and/or updated GUIs. For example, a notification selection option 1216 may be used to access a notifications menu or notifications listing.

A dashboard GUI may further include exchange historical data 1220, such as a last price (e.g., price for the most recent executed transaction), a 24-hour change (e.g., a delta between the market price 24 hours prior and the current market price), price deltas over different time ranges (e.g., 30 minutes, 1 hour, 12 hours, 1 week, 1 month, 3 months, 1 year, 5 years, to name a few), a 24-hour range (e.g., showing the lowest and highest prices during the interval), and/or price ranges within other time ranges, to name a few. The dashboard GUI may also include a historical price and/or historical volume graph 1222. The graph may show exchange transaction prices over time and/or corresponding exchange transaction volumes over time. The graph may show transaction data from one or more other digital asset exchanges and/or digital asset indices. Any of this data may be overlaid on the graph. For example, digital asset index data may be overlaid on exchange transaction data.

A dashboard GUI may include open orders listing 1224 showing open orders associated with an exchange user account. The open orders listing 1224 may indicate the date, time, and/or approximate time (e.g., about 3 hours ago) at which each order was placed. The listing 1224 may include a description of the order, e.g., order type, such as market or limit, purchase or sell, and/or order parameters, such as digital asset quantity, order price, limit order price, and/or total fiat currency amount. The listing 1224 may include an order status indicator, which may comprise a graphical indication, such as a status bar, of the degree to which each order is filled and/or text indicating the same (e.g., a percentage). The order listing 1224 may also include action options, selection of which may cause the exchange computer system to perform an action, such as canceling an order or canceling the remaining unfulfilled portion of an order. A truncated open order listing 1224 may be presented, which may include an option to view more or view all open orders.

A dashboard GUI may include a transaction history listing 1226. A transaction history may list some or all transactions associated with an exchange user account. A transaction history listing 1226 may indicate the date, time, and/or approximate time (e.g., about 3 hours ago) of each transaction and/or a description of the transaction (e.g., order type and/or order parameters, final order status, such as completed or canceled). In embodiments, the transaction history listing 1226 may include one or more options to display additional information (e.g., order details) for each transaction. A truncated transaction history listing may be provided, which may include an option to display more or all transactions (e.g., a view all history button).

A dashboard GUI may include an activity feed 1218 that displays summary information describing transactions, other actions (e.g., account funding), notifications, market activity, and/or exchange activity, to name a few. An activity feed 1218 may be accessed via a notification selection option 1216. Activity feeds are discussed herein with respect to FIGS. 12K-L.

Figure 35B:
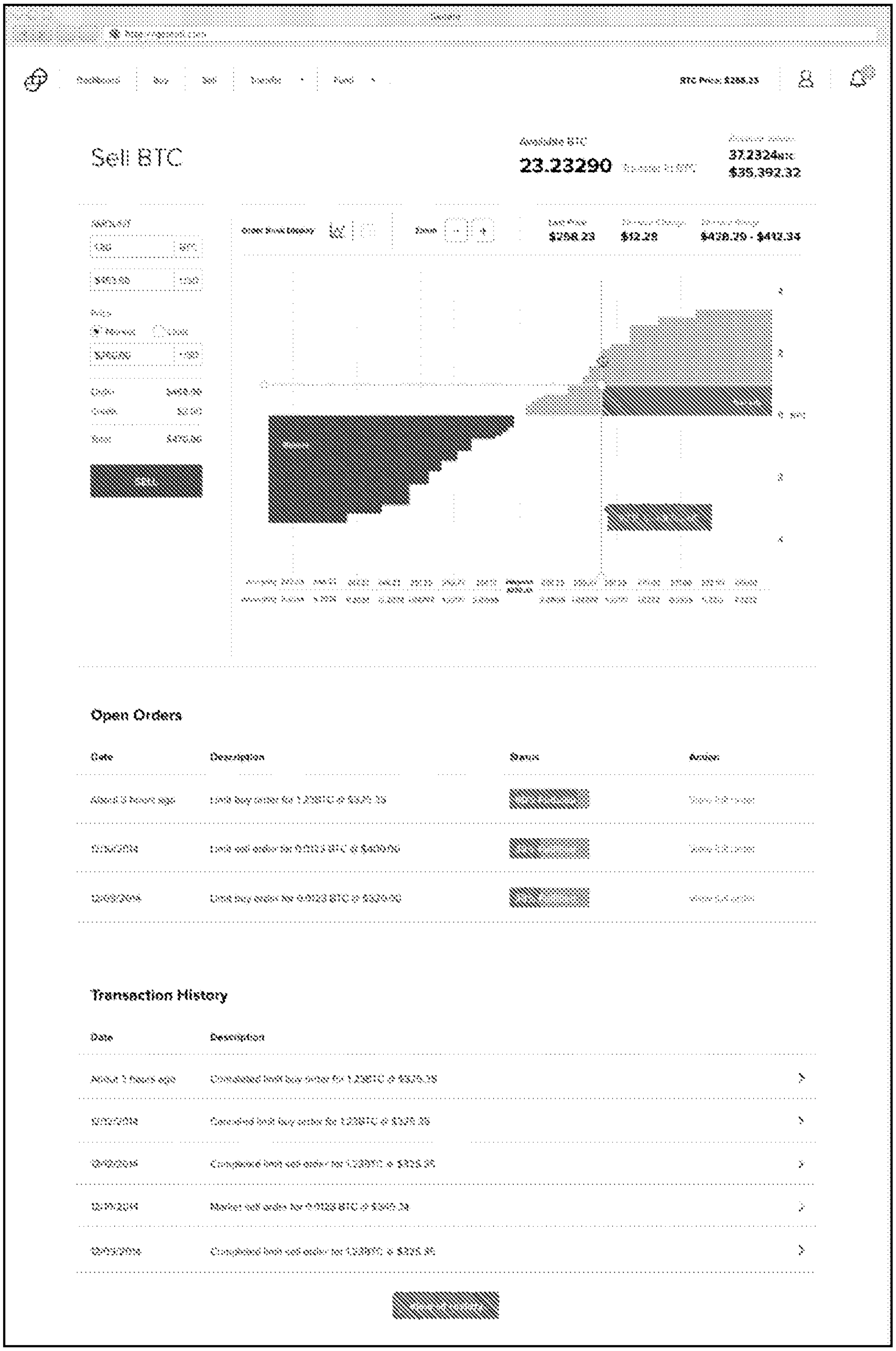

Referring to FIG. 35B, a screenshot of a GUI for use with selling a quantity of digital assets on a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input order parameters for a prospective sell order. Such order parameters can include a desired digital asset amount (e.g., a quantity of bitcoin) to sell, a total fiat amount to be sold (which may be a total digital asset value to be sold denominated in a fiat currency, such as USD), a digital asset price (e.g., a fiat currency amount corresponding to a single unit of digital assets), and/or an order type (e.g., market order, limit order). As shown, a user may designate a value of a digital asset to be sold based upon a market price determined by past and/or current sales of digital assets across a digital asset exchange.

The GUI may include a graphical representation of the order book and the prospective sell order. In embodiments, a first axis, such as the horizontal axis, may show price, and a second axis, such as a vertical axis, may show digital asset quantity. Digital asset quantity may increase in both directions moving away from the price axis. Sell orders may be shown on a first side of the price axis (e.g., above the price axis), while buy orders may be shown on a second side of the price axis (e.g., below the price axis). Accordingly, all pending digital asset sell and purchase orders from the electronic order book may be shown. In embodiments, less than all order may be shown based on the display bounds for one or both axes. A prospective sell order graphical representation may show the digital asset quantity for sale at each price at which it is for sale (e.g., the sell price and higher prices). Such a representation is evident in the dark portion in the upper right quadrant of the graph with respect to the price axis and the digital asset quantity axis taken at the spread point (this dark portion is the bottom right quadrant with respect to the prospective order crosshairs). The prospective sell order graphical representation may also show which pending buy orders from the order book will satisfy the sell order and/or how the sell order, once executed, will modify the existing order book. This can be seen as the dark portion in the lower left quadrant of the graph. A graphical indicator of one or more order parameters (e.g., digital asset quantity and price) may be overlaid on the graph, e.g., near the crosshairs. The exemplary GUI shows a prospective sell limit order with a limit order price above the market price. Accordingly, the order will not be satisfied by the pending purchase orders.

Figure 35C:
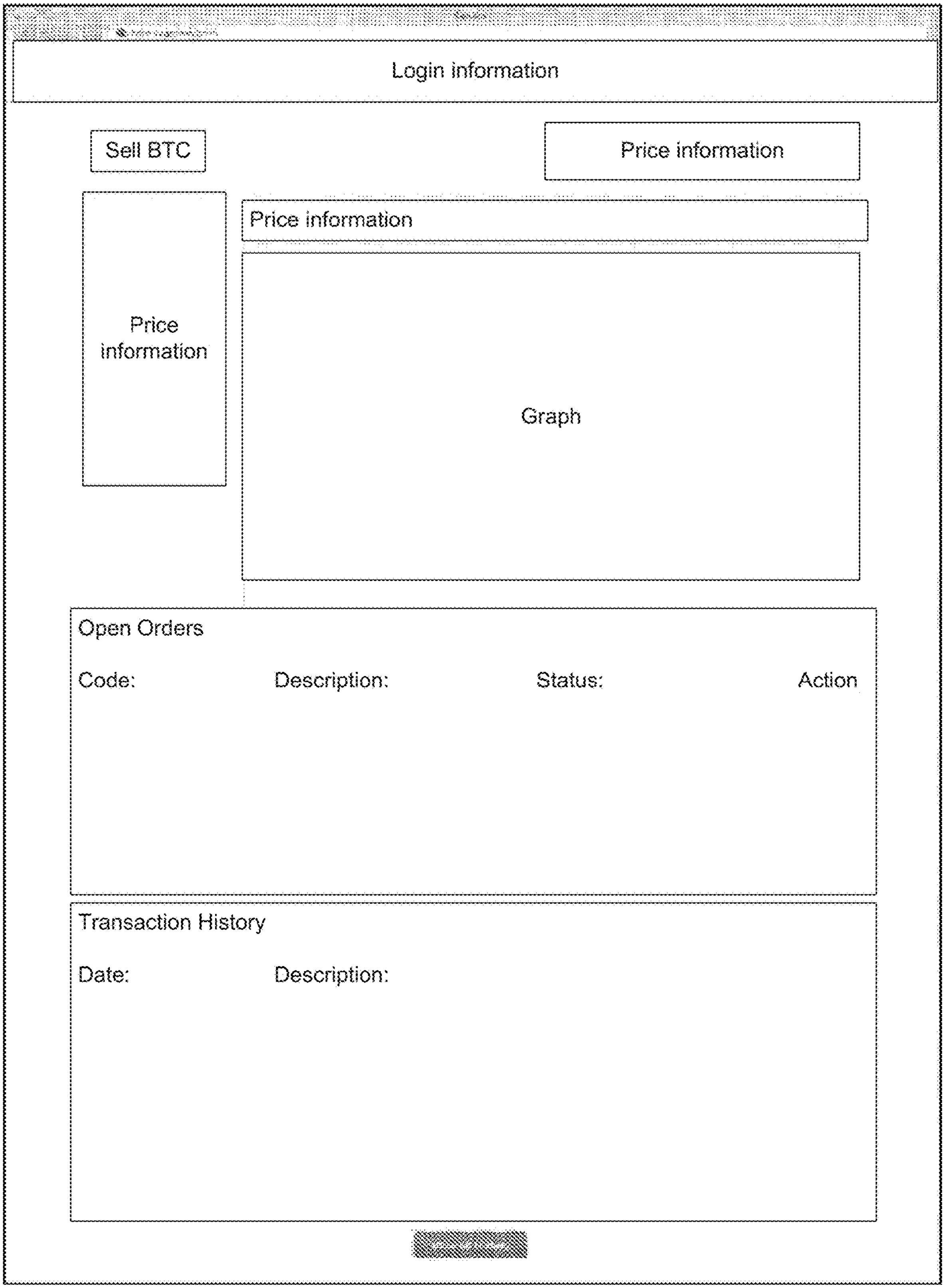

Turning to FIG. 35C, a screenshot of a GUI for use with a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be sold. As shown, a user may designate a value of a digital asset to be sold based upon a price determined by past and/or current purchases of digital assets across a digital asset exchange. The exemplary GUI shows a sell limit order with an order price lower than the market price. Accordingly, at least a portion of the sell limit order will be fulfilled by the pending purchase orders. The upper right quadrant of the graph shows the sell order book. The light colored order book graphical representation may indicate the cumulative volumes at each price that are subject to pending sell orders. In embodiments, it may also include the volumes from the prospective sell order. The dark region in the upper right quadrant may indicate the order volume and order prices (e.g., the sell order limit price and any prices above it). In embodiments, the dark region may only show the portion of the prospective sell order that will be unfulfilled by the pending purchase orders.

Figure 35D:
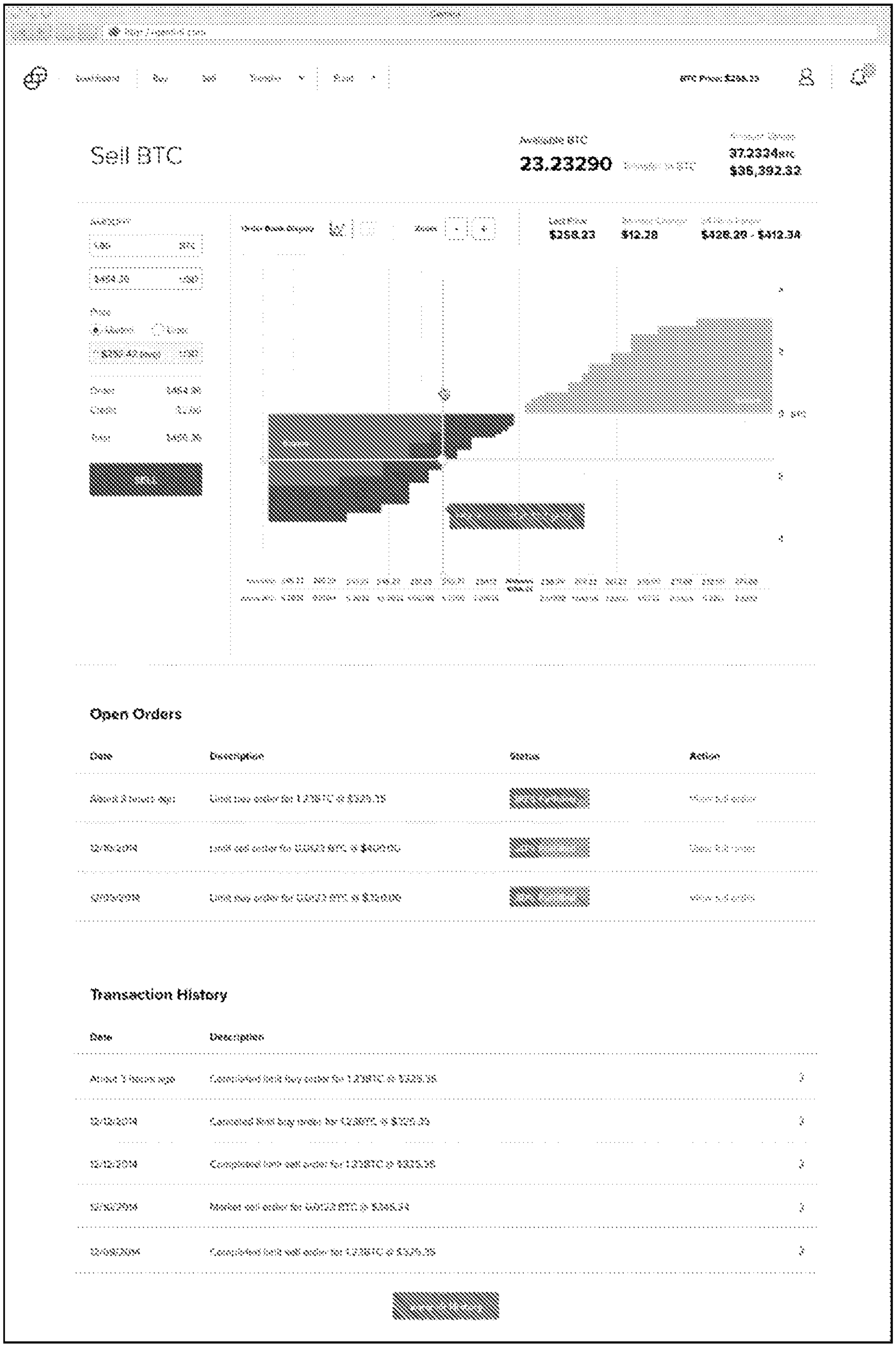
Figure 35E:
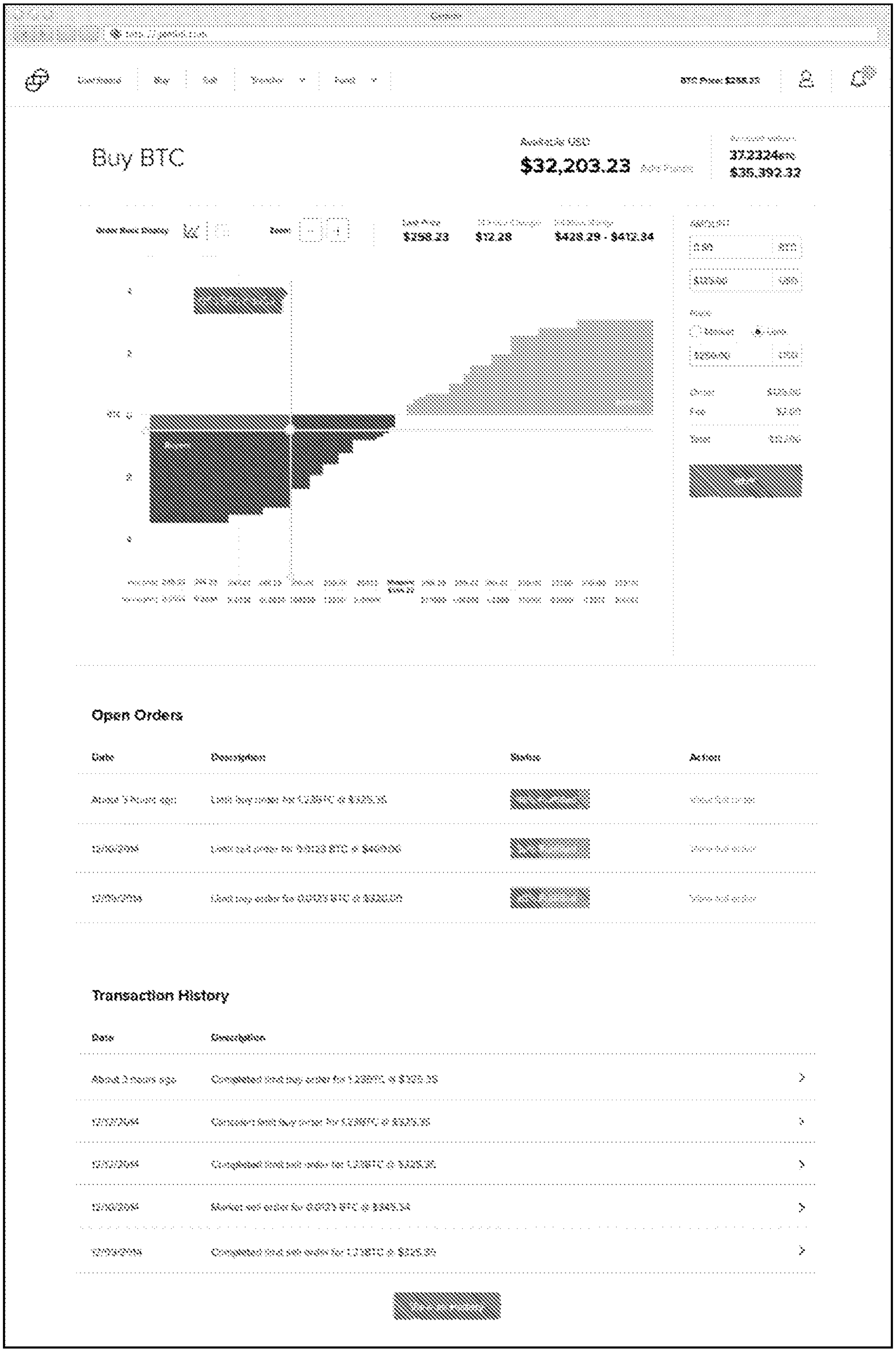

Turning to FIG. 35D, a screenshot of a GUI for use with a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be sold. As shown, a user may designate a value of a digital asset to be sold based upon a past and/or current averaged market value of digital assets traded across a digital asset exchange. The exemplary GUI shows a market sell order. The exchange computer system may execute the order at a current market price. In embodiments, the exchange computer system may place a plurality of market orders to satisfy the order (e.g., until the specified digital asset order quantity is reached and/or until the specified total cost is reached).

Referring to FIG. 12E, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon a price determined by past and/or current purchases of digital assets across a digital asset exchange. The exemplary GUI shows a prospective limit purchase order with an order price lower than the market price. Accordingly, the prospective order will not be satisfied by the existing sell orders. The sell order book graphical representation thus remains unchanged. The light region in the lower left quadrant shows the prospective purchase order.

Figure 35F:

Turning to FIG. 35F, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon a price determined by past and/or current sales of digital assets across a digital asset exchange. The exemplary GUI shows a prospective digital asset limit purchase order with a limit order price higher than the market price. Therefore, at least a portion of the order will be satisfied by the pending sell orders. Thus, the prospective purchase order graphical representation overlaps a portion of the pending sell order book graphical representation. In the upper right quadrant, the dark region shows the projected post-order graphical representation, which reflects that certain sell orders were fulfilled by the prospective purchase order, shifting the remaining sell order book to the right and decreasing the available sell order volume.

Figure 35G:

Turning to FIG. 35G, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon an averaged market value of digital assets traded across a digital asset exchange. The exemplary GUI shows a prospective market purchase order. In the upper right quadrant, the dark region shows a post-order sell order book, which provides a visualization of how the sell order book will be modified by the prospective order. In this case, fulfilling the purchase order volume will reduce the available volume in the sell order book.

Figure 35H:
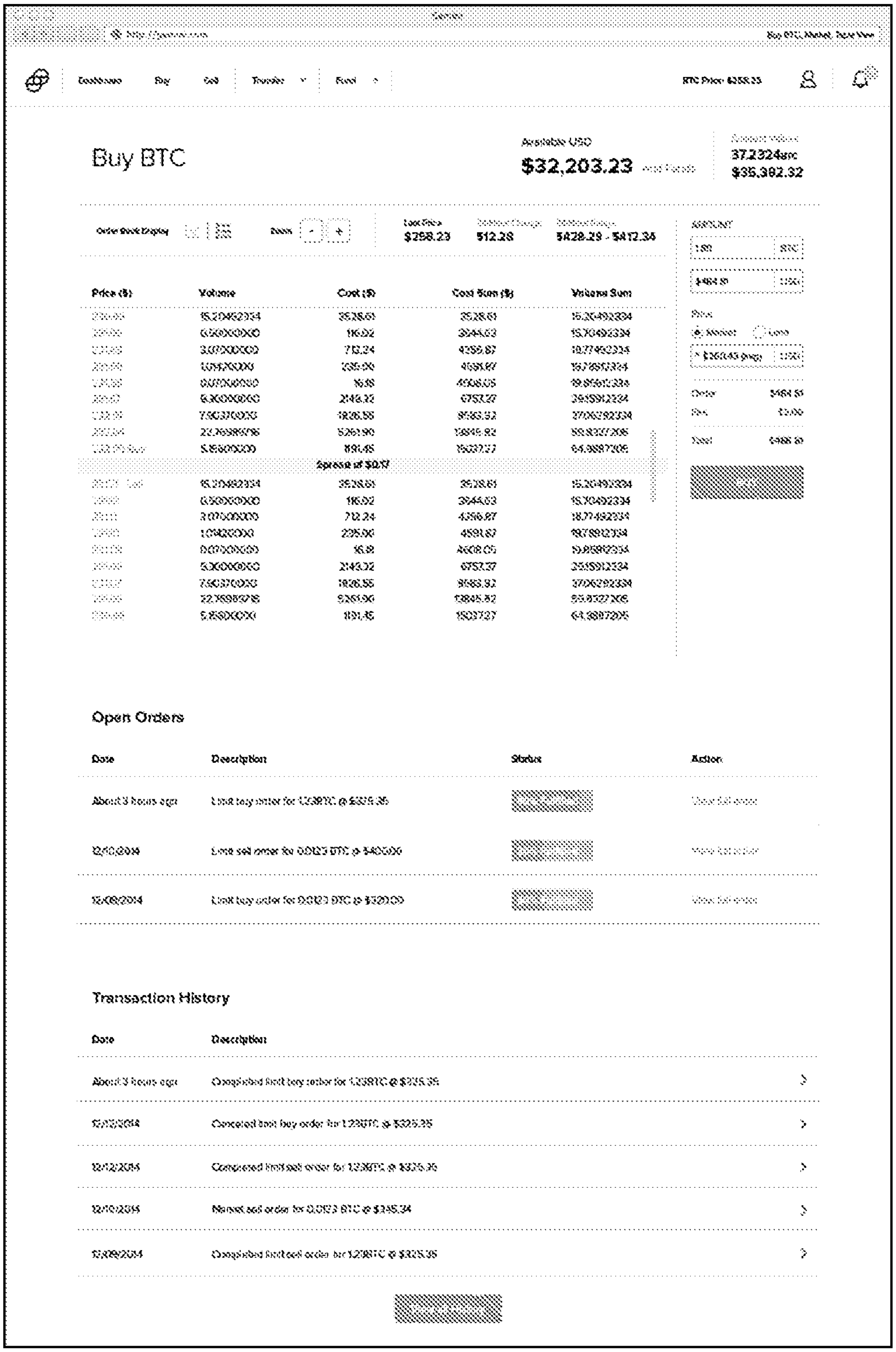
Figure 35I:
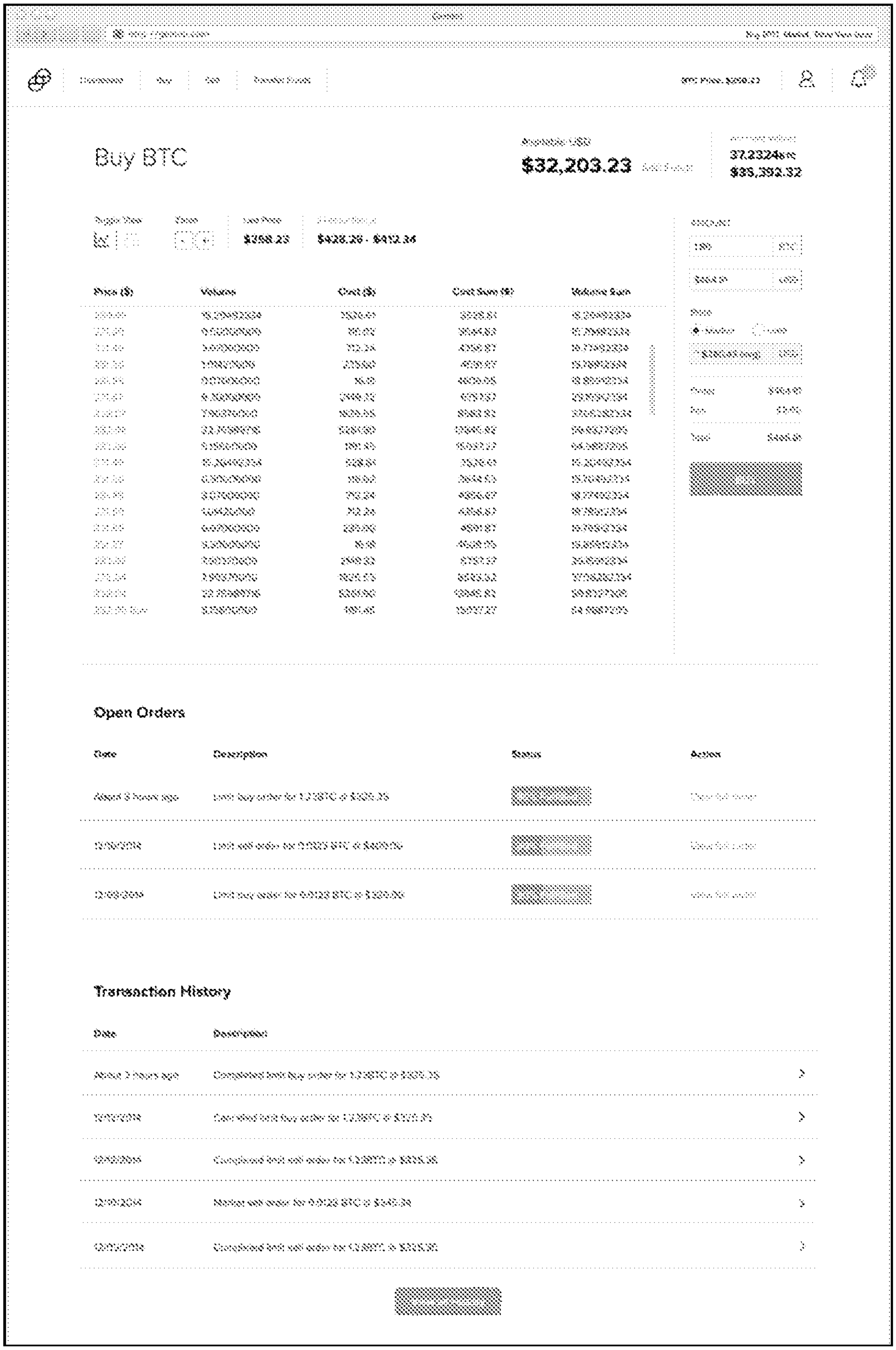
Figure 35J:
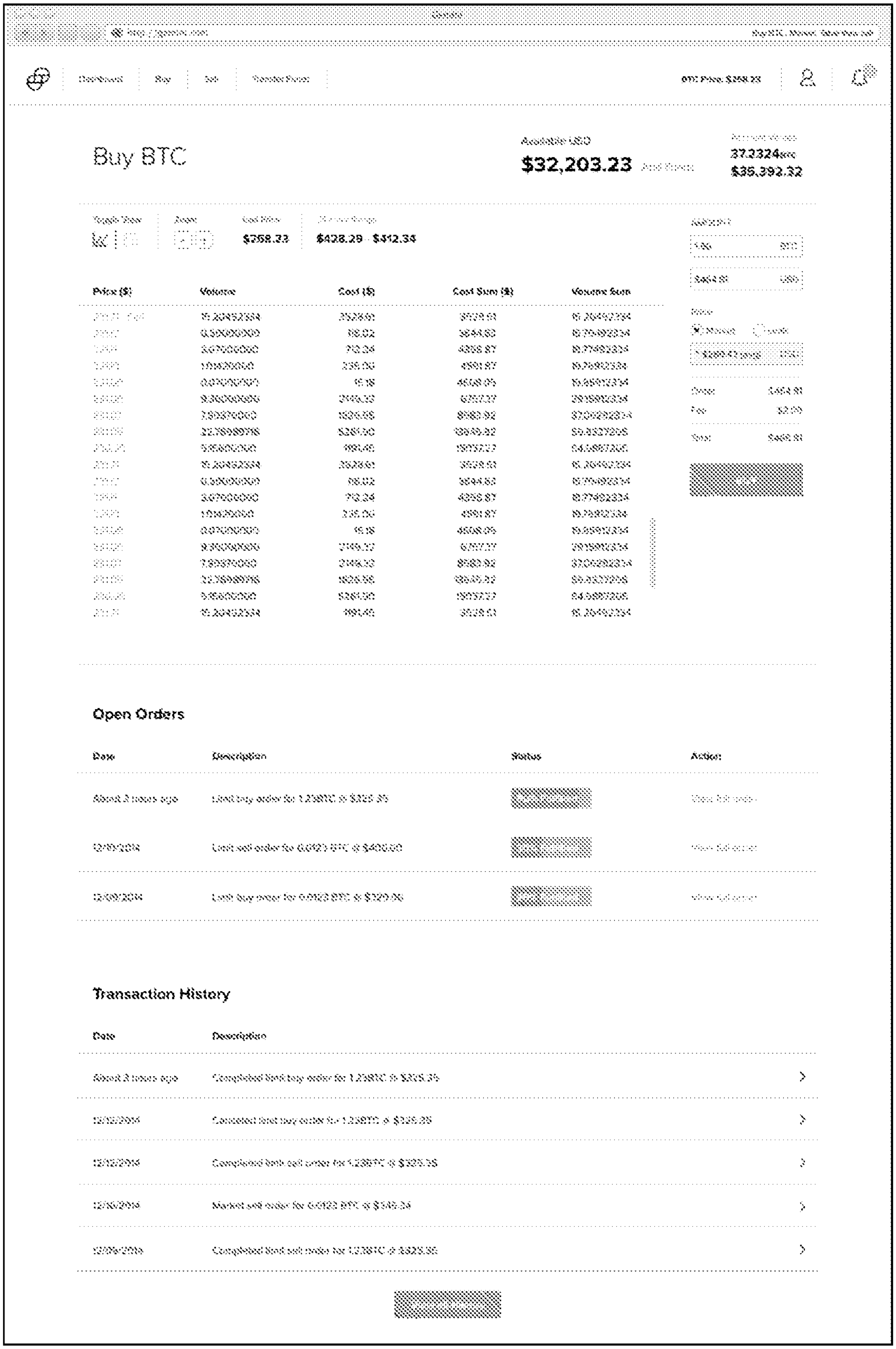

FIGS. 35H-J are screen shots of exemplary graphical user interfaces showing digital asset order listings for pending digital asset orders in an electronic order book in accordance with exemplary embodiments of the present invention. Like the dashboard and order graph GUIs described herein, an order listing GUI may display market activity data, exchange activity data, and/or user account data (e.g., account balances and/or values). An order listing GUI may provide user input fields where a user can specify order parameters, such as order types, order price (e.g., denominated in fiat currency), order amount (e.g., a quantity of digital assets), and/or order value (e.g., a total fiat amount corresponding to a price, such as a user specified price, and a quantity). An order listing GUI may include an open orders listing and/or a transaction history listing.

FIG. 35H shows a listing of pending digital asset orders from an electronic order book of the digital asset exchange, where the listing is centered at a spread value. The pending digital asset orders can include both digital asset purchase orders and digital asset sell orders. A pending order may be an order or portion of an order that is not yet fulfilled. The order listing may include for each order any of an order price (e.g., a price per unit of digital asset), order volume (e.g., a quantity of digital assets), order cost (e.g., the product of the order price and order volume), cost sum (e.g., a cumulative cost that sums the cost of the preceding orders of the same order type approaching the spread value), and a volume sum (e.g., a cumulative volume that sums the order volumes of the preceding orders of the same order type approaching the spread value).

A spread value may be displayed between the listing of pending purchase orders and the listing of pending sell orders. A graphical and/or textual indicator may indicate a current spread value, which may be determined based on the difference between the highest order price for a pending purchase order and the lowest order price for a pending sell order.

The order listings may be arranged according to price. Thus, the sell order listing may be arranged from highest price to lowest price, with the lowest price listed just before the spread value. After the spread value the purchase order listing may start with the highest purchase price and continue to list orders at each subsequent lower order price. In embodiments, the purchase orders may be listed above the spread value, and the sell orders may be listed below. In other embodiments, the sell orders may be listed first, above the spread value, and the purchase orders may be listed below the spread value. In embodiments, a subset of orders may be displayed in the graphical order listing at a given time. For example, a scroll bar may be used to navigate to additional orders towards the top and/or bottom of the list.

FIG. 35I shows an electronic order book listing where the list has been navigated (e.g., scrolled) up to display additional orders (e.g., buy orders).

FIG. 35J shows an electronic order book listing where the list has been navigated (e.g., scrolled) down to display additional orders (e.g., sell orders).

Figure 35K:
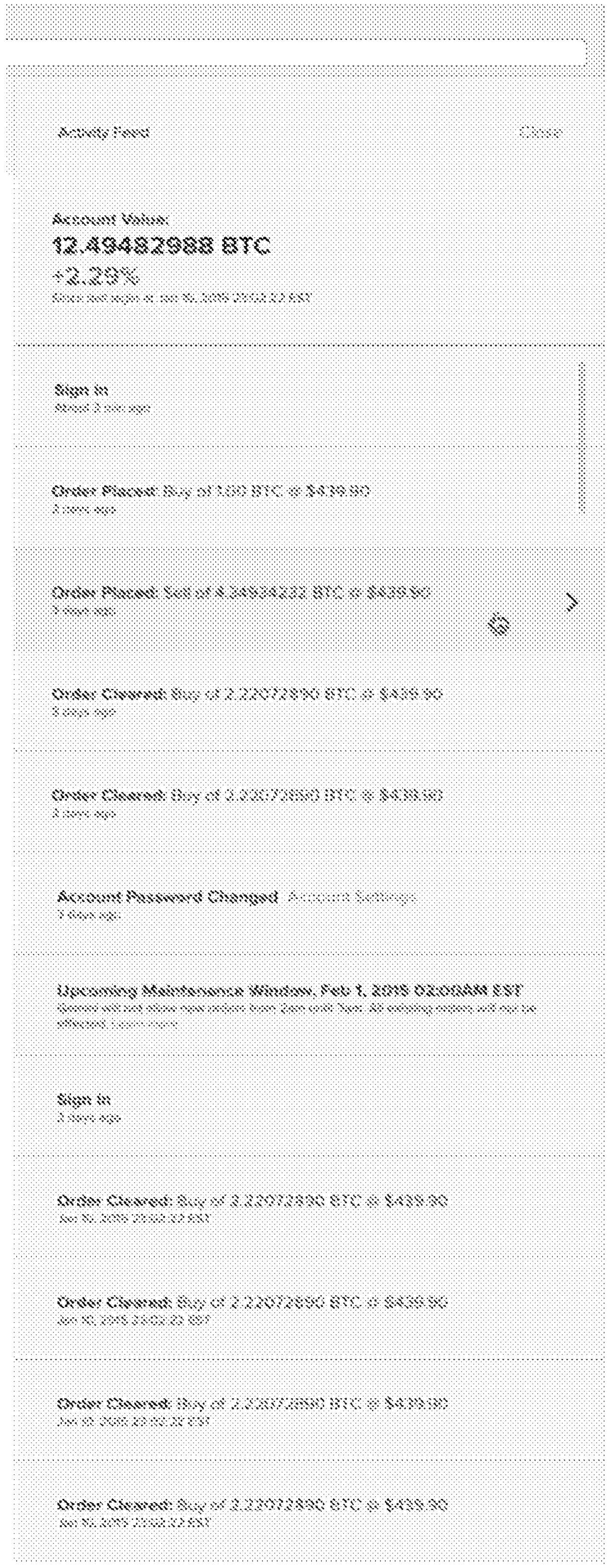
Figure 35L:
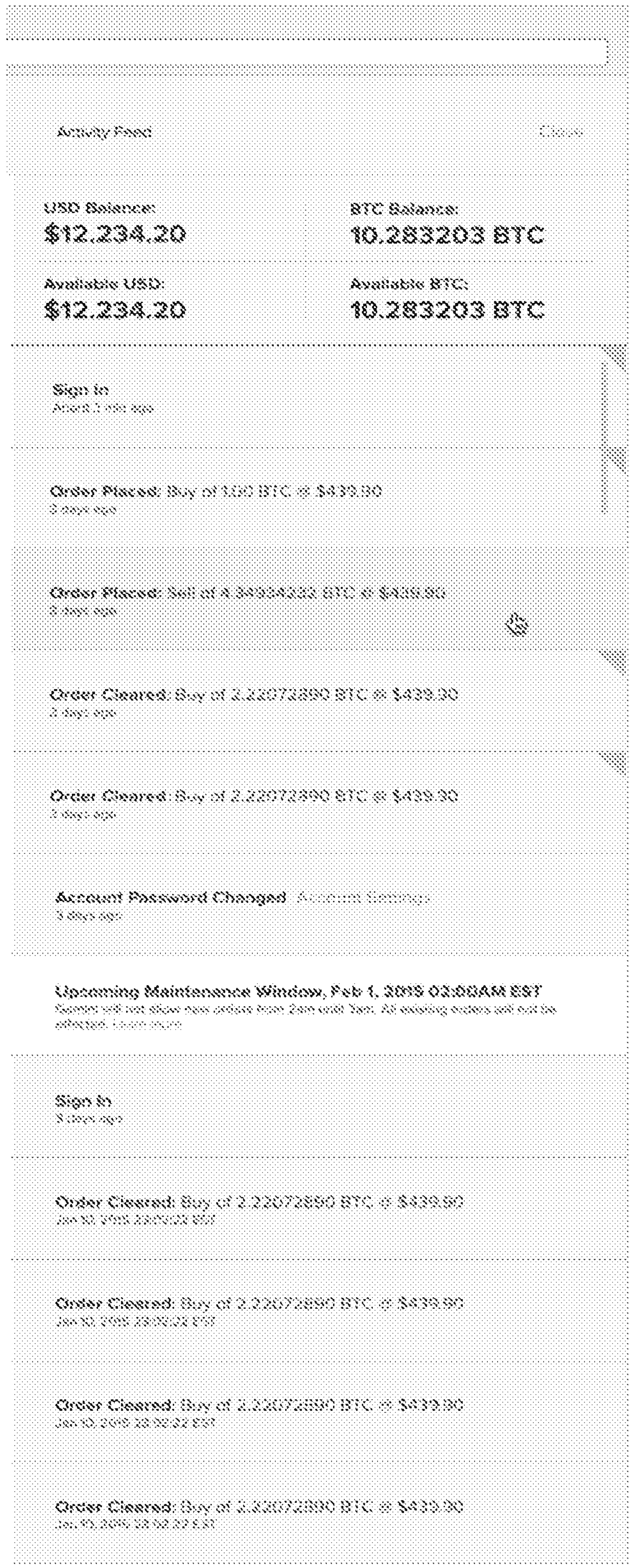

FIGS. 35K-L are screen shots of exemplary graphical user interfaces showing an activity feed related to a user account registered with a digital asset exchange. As illustrated, an activity feed may include account summary information, such as account balances, account values, and/or changes in account value (e.g., over a time period or since a particular time, such as a time of last logon to the exchange computer system). The activity feed may list events, which may be related to user actions (e.g., logging on, placing an order, canceling an order) and/or independent events (e.g., the clearing of an order). Each event may have a description (e.g., order parameters, status information) and/or an associated date and/or time indicator. The activity feed may also display digital asset news events and/or messages (e.g., schedule information for exchange computer system maintenance). Selecting (e.g., clicking, tapping, hovering) an activity feed entry may cause the GUI to display additional information related to the entry. The activity feed may be navigated (e.g., scrolling, selecting a button for additional entries) to display additional entries, which may be older activity feed entries.

FIG. 35L illustrates that unread activity feed entries may comprise an unread indicator, which may comprise a different color (e.g., background color) and/or a graphical representation (e.g., shape, triangle shape, icon, or text in the upper right corner or elsewhere within the entry). The unread indicator may be removed after a user hovers over the respective activity feed entry, selects it (e.g., clicks or taps it), and/or upon a subsequent opening of the activity feed.

FIGS. 50A-E are exemplary screen shots of user interfaces related to purchase transactions provided by an exchange computer system in accordance with exemplary embodiments of the present invention. Each graphical user interface may include navigation options for accessing other user interfaces (e.g., webpages or application GUIs). Such navigation options can include a dashboard selector 7302 (e.g., to access a dashboard GUI), a buy selector 7304 (e.g., to access a buy order GUI), a sell selector 7306 (e.g., to access a sell order GUI), and/or a transfer fund selector 7308 (e.g., to transfer funds to or from the exchange). Additional navigation options may be provided for accessing other GUIs, accessing data, and/or modifying the GUIs (e.g., displaying a menu, such as a drop-down menu, displaying an overlay or graphical panel). These additional navigation options can include a user account selector 7309 and/or an alerts or activity feed selector 7311, which may toggle display of an activity feed 7310. As illustrated, the activity feed 7310 can include user account information 7312, such as a fiat account balance, digital asset account balance, available fiat amount (e.g., not subject to pending orders), and/or available digital asset amount (e.g., not subject to pending orders). In embodiments, where a digital asset exchange handles multiple fiat currencies and/or multiple digital assets, the interface may reflect such summary information for each currency and asset. In embodiments, the GUIs may also include order history listings, which may show completed orders and/or open orders.

The purchase order GUIs may include market summary information and/or exchange summary information 7318 (e.g., last price, 24-hour change, 24-hour range, and/or such values over other time periods). A time indicator may indicate a time at which the summary information was last updated.

Each purchase order GUI may also include purchase order parameter input fields, such as a digital asset quantity input field 7322, which may include a digital asset identifier (e.g., BTC). Such a digital asset identifier may be changeable by a user to select a particular digital asset type for the transaction. Purchase order parameter input fields can also include an order type selector 7324 (e.g., for choosing between market and limit orders), an order price input field 7326, and/or a total cost field 7328. In embodiments, the order price input field 7326 and/or the total cost field 7328 may comprise fiat currency identifiers, which may be changeable to specify or view a price in different fiat currencies. In embodiments, exchange transactions from one digital asset to a second digital asset may be performed, in which case the fiat currency identifiers would be replaced with digital asset identifiers.

In embodiments, the user may input one or more purchase order parameters and the exchange computer system may calculate one or more other purchase order parameters. In embodiments, only a user may change the order price. Accordingly, a user input in the total cost field 7328 may cause the exchange computer system to calculate a digital asset quantity order based at least in part upon the price parameter and/or to populate the calculated digital asset quantity in the digital asset quantity input field 7322. Similarly, a user input in the digital asset quantity input field 7322 may cause the exchange computer system to calculate, based at least in part upon the price parameter, a total cost and/or populate that total cost in the total cost field 7328. In other embodiments, the exchange computer system may be able to calculate and/or re-calculate the order price, in addition to the other order parameters. If two parameters are entered by a user the exchange computer system may calculate the last parameter and/or populate its respective field. If the user then changes one of the three parameters after those fields are each populated the exchange computer system may recalculate one of the parameters (e.g., the second to last parameter input, the third to last parameter input).

Selection of a purchase option 7336 (e.g., a purchase graphical button) may cause the exchange computer system to place a purchase and/or execute an order corresponding to the input order parameters.

Order information based at least in part upon the order parameters may be calculated and displayed in the GUIs. For example, an order sub-total 7330 may be the value from the total cost field 7328. A fees value 7332 may indicate any fees associated with the transaction (e.g., fees charged by the exchange, government fees, to name a few). An order total 7334 may indicate the sum of the order sub-total 7330 and the fees 7332.

Tables, charts, and/or graphs may provide graphical representations of exchange data, such as electronic order book data, prospective order data, and/or pending order data. An order book display type indicator 7320 may be used to toggle between different graphical representation types, such as toggling between an order book graph and an order book listing.

Figure 50A:
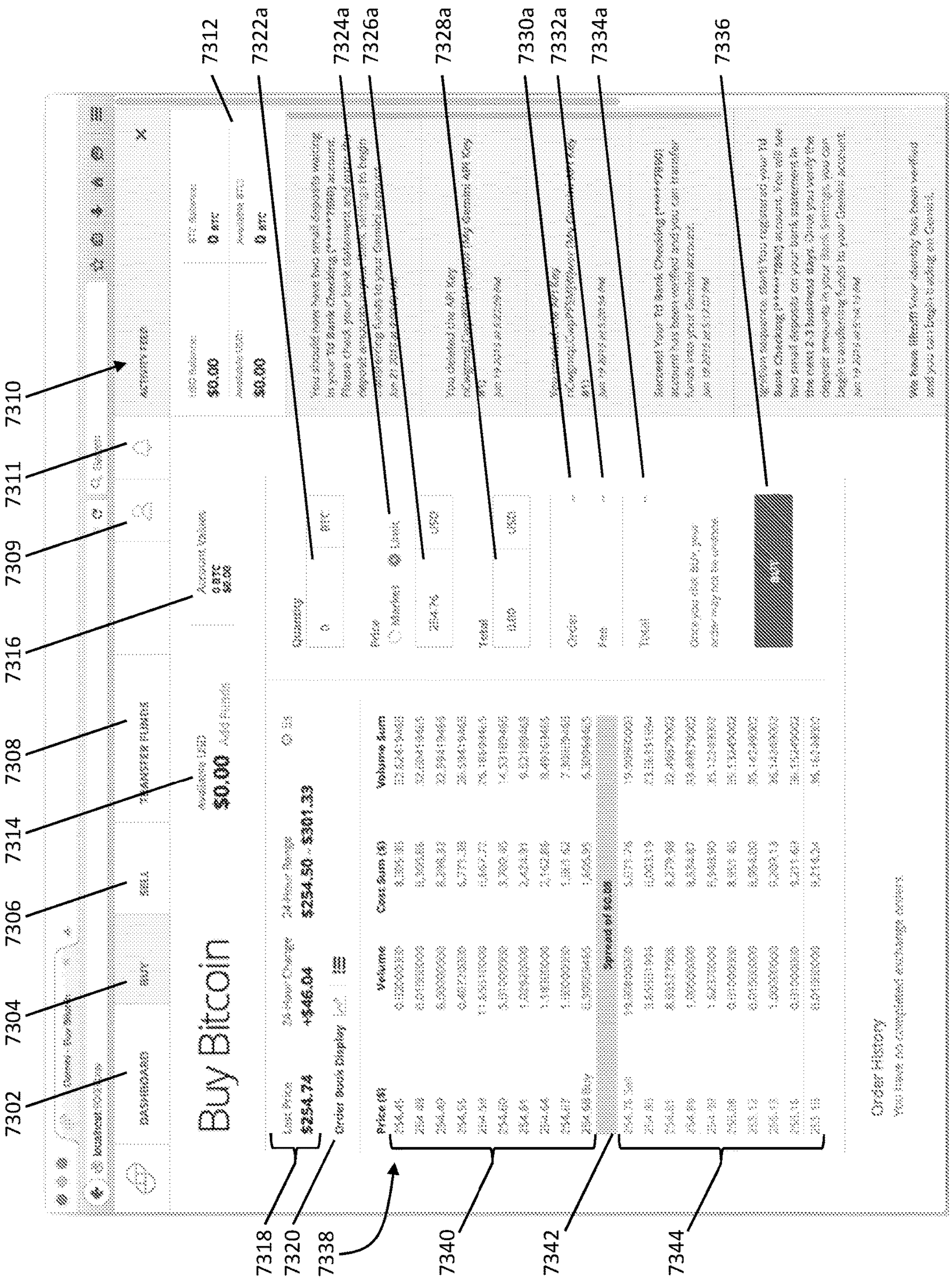
FIGS. 50A-E are exemplary screen shots of user interfaces related to purchase transactions provided by an exchange computer system in accordance with exemplary embodiments of the present invention.

FIG. 50A shows a purchase order graphical user interface comprising an order book listing 7338. The order book listing 7338 may be a table comprising respective entries for each of a plurality of pending digital asset orders. In embodiments, the listing may comprise an entry for each order in the order book. In embodiments, the order book listing can comprise a truncated listing of orders in the exchange order book. Additional entries may be accessed by scrolling through the listing and/or selecting an option to display more entries. An entry may include order parameters such as an order price and/or digital asset volume or quantity. The order book listing 7338 may be arranged according to price, e.g., increasing order price or decreasing order price. A purchase or buy order book listing 7340 may comprise entries for each pending digital asset purchase order, and a sell order book listing 7344 may comprise entries for each pending digital asset sell order. The purchase orders may be grouped together in the purchase order book listing 7340, while the sell orders may be grouped together in the sell order book listing 7344. A graphical representation of a spread value 7342 may be displayed between the purchase and sell order book listings. The spread value graphical representation 7342 may comprise text indicating the spread value, which may be the price difference between the lowest sell order price and the highest purchase order price.

An order book listing entry may also include a cost sum, which may be a sum of the costs (e.g. product of price and digital asset quantity) of all preceding orders in the listing moving away from the spread value. Accordingly, the cost sum will be calculated separately on the buy side and the sell side of the order book listing. Similarly, an entry can include a volume sum, which may comprise a sum of the volumes of the previous order entries in the listing moving away from the spread value. In embodiments, the order book listing 7338 may include an entry for the prospective purchase order, which may be positioned within the purchase order book listing 7340 according to its order price parameter. Such an entry for a prospective order may be rendered with a different color (e.g., font color, background color, border color, to name a few).

Figure 50B:
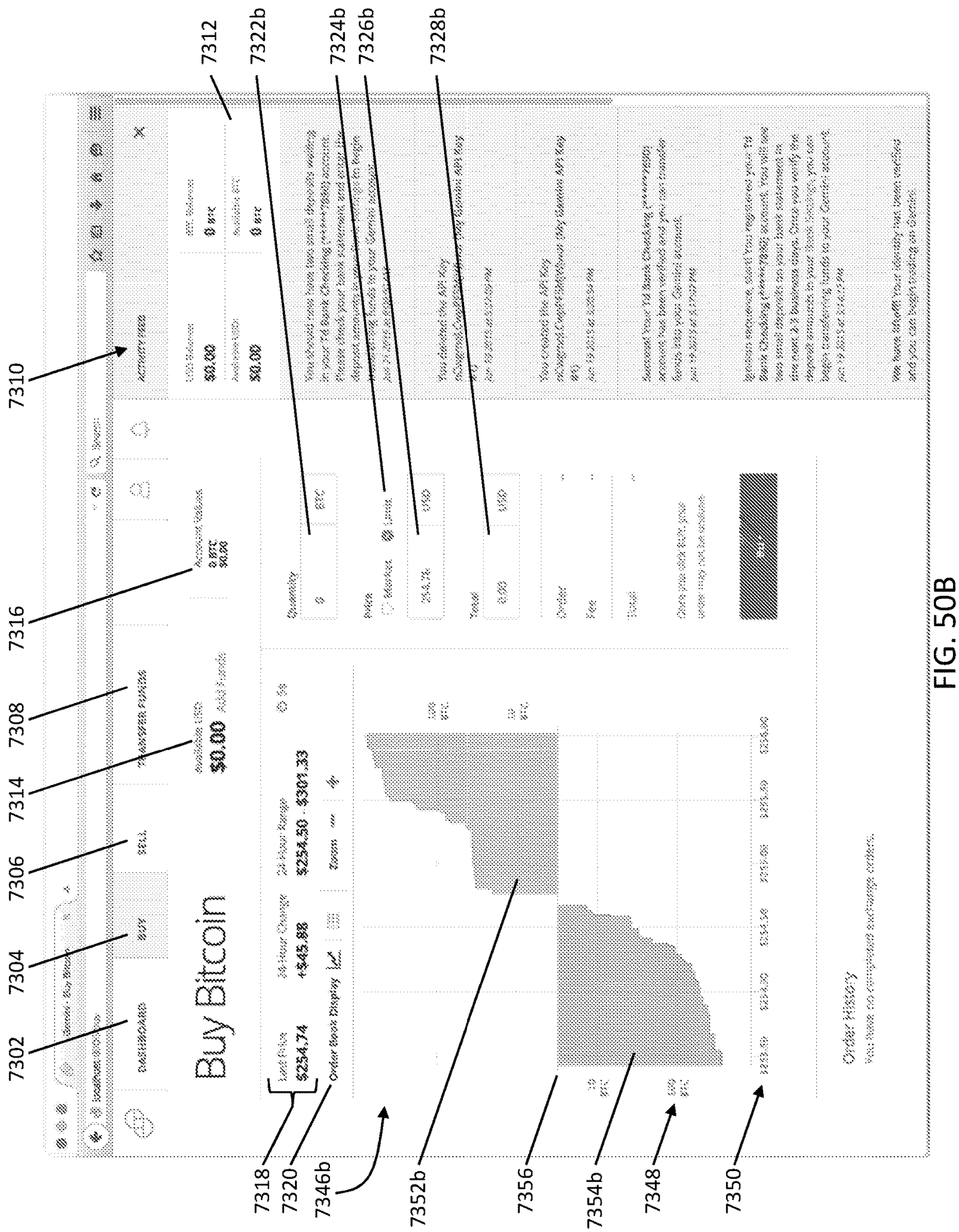

FIG. 50B shows a purchase order GUI comprising an electronic order book graphical representation 7346*b*. The order book graphical representation may have been selected using the order book display type indicator 7320. The order book graphical representation may be a graph having an order price axis 7356, which may be a first axis depicting order prices. It may be a horizontal axis. Price values 7350 may be displayed corresponding to the scaling of the order price axis 7356. The graph may also comprise a digital asset quantity axis 7348, which may extend outward from the order price axis 7356 in two directions, each direction indicating increasing digital asset quantity. In embodiments, the digital asset quantity axis 7348 may have a logarithmic scaling. A first order book graphical representation, which may be a sell order book graphical representation 7352*b*, may be depicted on a first side of (e.g., above) the order price axis 7356. The sell order book graphical representation 7352*b* may show at each order price a corresponding cumulative quantity of digital assets subject to pending digital asset sell orders. A second order book graphical representation, which may be a purchase order book graphical representation 7354*b*, may be depicted on a second side (e.g., below) the order price axis 7356. The purchase order book graphical representation 7354*b* may show at each order price a corresponding cumulative quantity of digital assets subject to pending digital asset purchase orders. A gap along the order price axis 7356 between the sell and purchase order book graphical representations may represent the spread value. In embodiments, a textual indicator of the spread value may be overlaid on the graph.

In embodiments, the order book graphical representations may only show a subset of pending digital asset purchase and/or sell orders. For example, a user may manipulate the scaling of the graph, such as by using zoom controls. A user may navigate the graph by scrolling or panning. In embodiments, the positions of the sell and buy order book graphical representations with respect to the order price axis 7356 may be flipped. The sell and buy order book graphical representations may be rendered using different colors and/or different shading or hatching techniques. For example, the sell order book graphical representation 7352*b* may be rendered as orange while the purchase order book graphical representation 7354*b* may be rendered as blue.

As can be seen, a digital asset quantity input field 7322*b* indicates a quantity of 0 digital assets. Accordingly, the graph may not show any representation corresponding to the prospective order defined by order parameters input by a user and/or calculated by the exchange computer system.

Figure 50C:
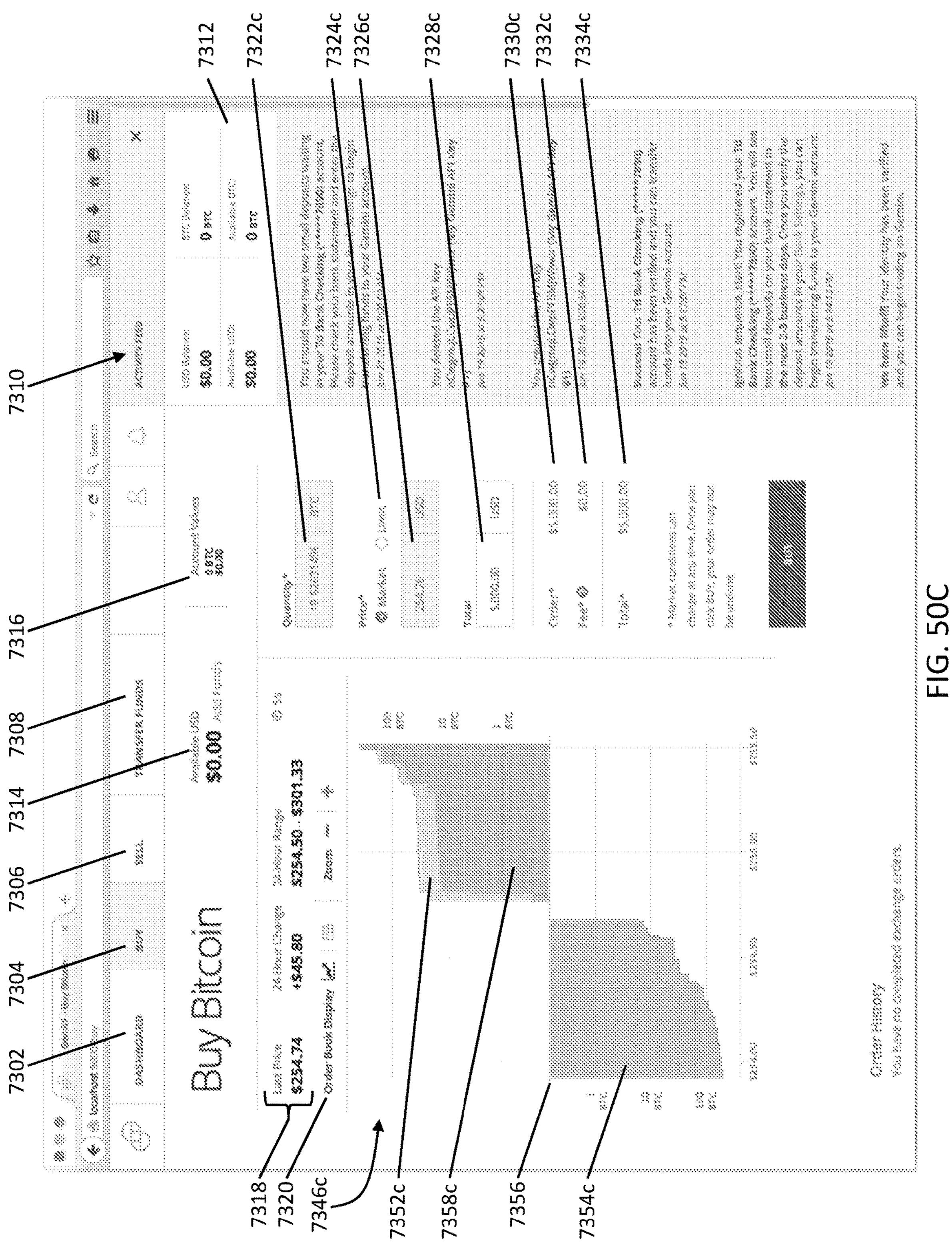

FIG. 50C shows a purchase order GUI comprising a graphical representation 7346*c* showing an electronic order book and prospective market purchase order. The order parameters define a prospective purchase order, which may be not yet submitted and therefore not yet pending on the electronic order book. The order type selector 7324*c* indicates that a market order was selected. Digital asset quantity input field 7322*c* contains a positive non-zero quantity, and accordingly a total cost field 7328*c* contains a positive non-zero quantity. The order price field 7326*c* contains an order price, which may be a current market price determined automatically by the exchange computer system upon a selection of a market order type. In embodiments, the order price for a market order may not be editable by a user. Accordingly, inputting and/or changing the value in the digital asset quantity input field 7322*c* may cause the computer system to calculate and/or re-calculate a corresponding total cost based at least in part upon the current market price. Similarly, inputting and/or changing the value in the total cost field 7328*c* may cause the computer system to calculate and/or re-calculate a corresponding digital asset order quantity based at least in part upon the current market price.

The order book and prospective order graphical representation 7346*c* comprises a sell order book graphical representation 7352*c* showing the pending digital asset sell orders and a purchase order book graphical representation 7354*c* showing the pending digital asset purchase orders. In embodiments, the purchase order book graphical representation 7354*c* may also depict the prospective purchase order data, which may be added to the pending purchase orders or overlaid as a separate graphical representation on the purchase order book graphical representation 7354*c*. In embodiments, the purchase order book graphical representation 7354*c* may show be a post-order purchase order book graphical representation showing the purchase orders that would exist after the prospective order is placed and/or executed. A post-order sell order book graphical representation 7358*c* may be overlaid on the graph to indicate how the prospective order would move the market. Such overlays may be rendered with a different color or a different shade of a color than the existing current order book graphical representations. For the exemplary market purchase order, the exchange computer system may place a series of orders starting with the lowest available price (e.g., whatever volume is available to purchase at the lowest sell order price) and increasing in price until the total cost is reached and/or until the digital asset order quantity is reached.

Figure 50D:
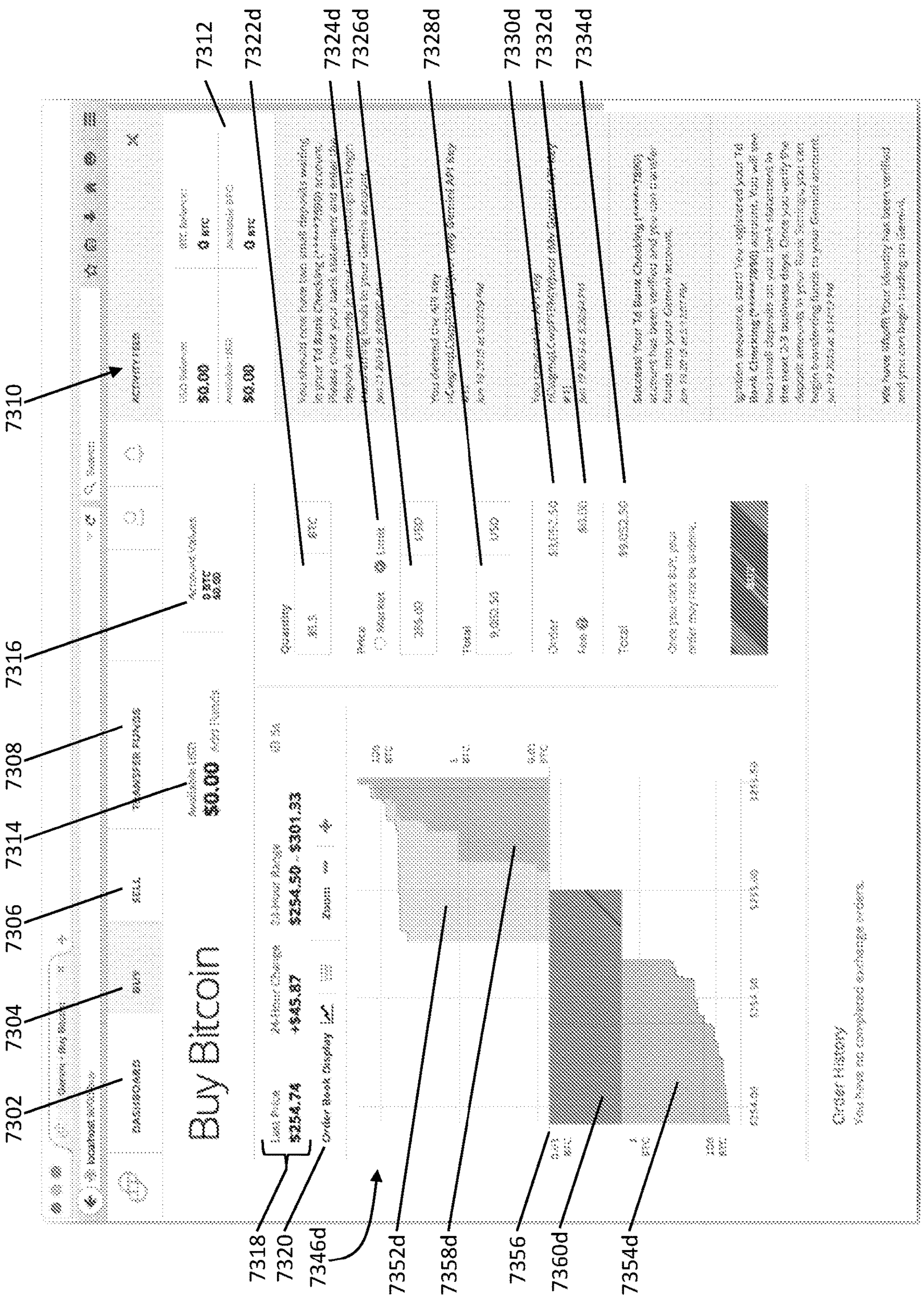

FIG. 50D shows a purchase order GUI comprising a graphical representation 7346*d* showing an electronic order book and prospective limit purchase order. The order type selector 7324*d* indicates a limit order, and the limit order price is specified in input field 7326*d*. The exemplary limit purchase order price is greater than the current market price. The order parameters define a limit order that can be characterized as in the money because at least a portion of the prospective order would be satisfied (e.g., fulfilled) by the currently pending sell orders.

The graph 7346*d* shows the current sell order book graphical representation 7352*d* and a post-order purchase order book graphical representation 7354*d*. This may show the purchase orders that would exist after the prospective limit purchase order is placed and/or executed. Accordingly, where only a portion of the prospective limit purchase order would be satisfied by the existing pending sell orders, the projected remainder of the prospective order may be added to the purchase order book graphical representation 7354*d*. That remainder of the limit purchase order (e.g., the portion that would not be satisfied by the current sell orders) may be represented on the graph by the limit purchase order graphical representation 7360*d*, which is overlaid on the purchase order book graphical representation 7354*d*. It shows the remaining (e.g., unfulfilled) prospective digital asset order quantity at the limit price and lower prices. In embodiments, the limit purchase order graphical representation 7360*d* may be rendered as a darker shade or different shade of the color used to render the current purchase order book graphical representation 7354*d*. Because the exemplary order is a limit order in the money, the remaining limit purchase order graphical representation 7360*d* makes clear that the prospective order exceeds the existing spread point (buying above the spread) and overlaps with some sell order prices, shown in the sell order book graphical representation 7352*d*. The overlapping portion would be fulfilled (e.g., fulfilled upon placement of the prospective order). The graph may include a post-order sell order book graphical representation 7358*d*, which may indicate the data that would compromise the sell order book after the prospective purchase order was placed and/or fulfilled. The remaining limit purchase order graphical representation 7360*d* does not overlap with the post-order sell order book graphical representation 7358*d*, illustrating that the remaining portion would not be fulfilled by the sell orders. Limit orders may be fulfilled by the exchange computer system matching engine in the order in which the orders were placed.

Figure 50E:
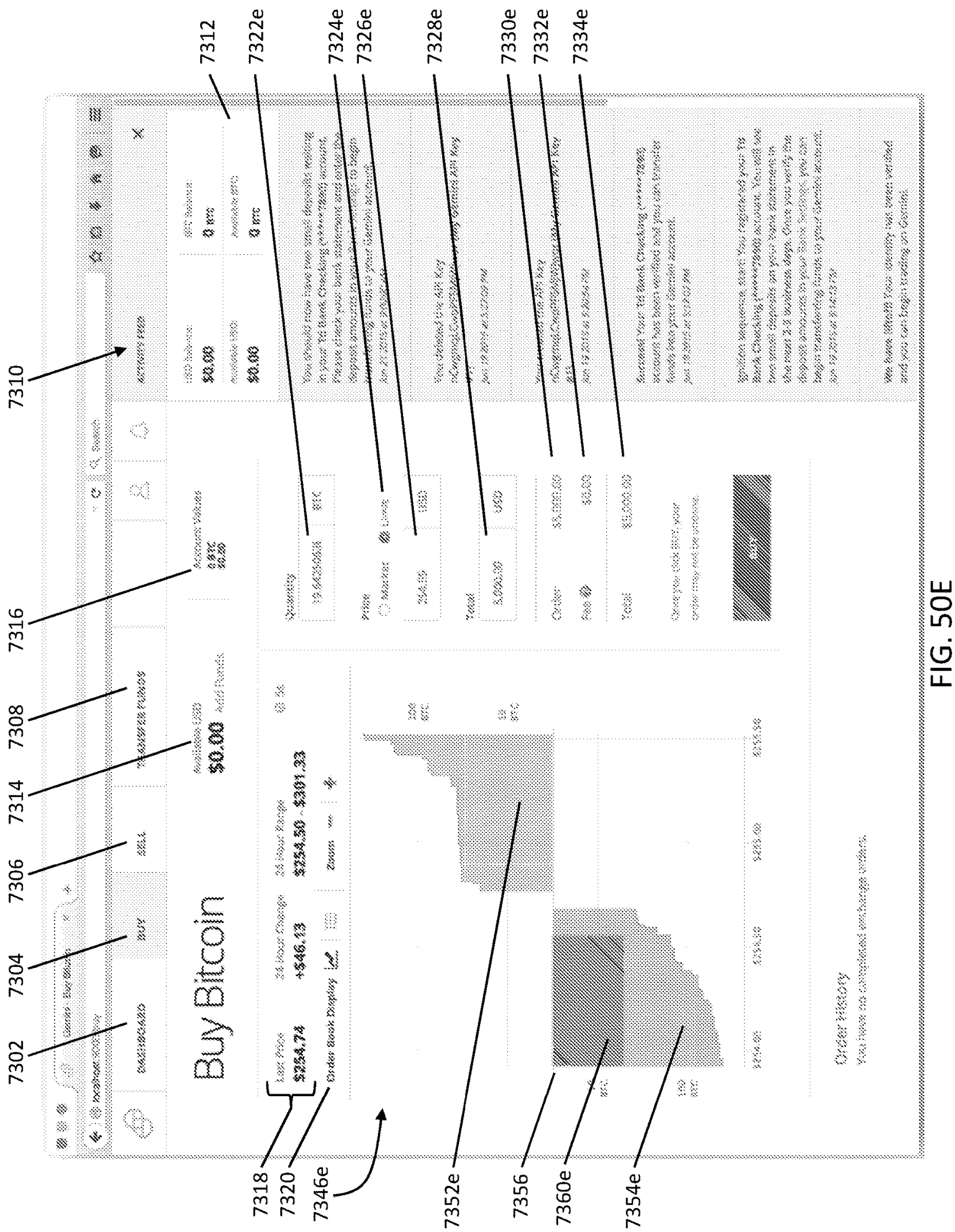

FIG. 50E shows a purchase order GUI comprising a graphical representation 7346*e* showing an electronic order book and prospective limit purchase order. The order type selector 7324*e* indicates a limit order, and the limit order price is specified in input field 7326*e*. The limit purchase order price is lower than the current market price. The order parameters define a limit order that can be characterized as out of the money because the order would not be satisfied by the currently pending sell orders.

The graph 7346*e* shows the current sell order book graphical representation 7352*e* and the purchase order book graphical representation 7354*e*. The limit purchase order is represented on the graph by the limit purchase order graphical representation 7360*e*, which is overlaid on the purchase order book graphical representation 7354*e*. In embodiments, the purchase order book graphical representation 7354*e* may be a post-order representation showing the purchase order book including the prospective purchase order. The limit purchase order graphical representation 7360*e* indicates the digital asset order quantity at the limit price and lower prices. As can be seen, there is no overlap in prices between the prospective purchase order and the sell order book. Accordingly, no portion of the prospective purchase order will be satisfied by the current sell order book. As illustrated, the sell order book will remain unchanged as a result of this purchase order. The purchase order would remain on the books until the user cancels it, until it automatically expires (e.g., in accordance with a predefined order expiry period), and/or until the market moves such that one or more sell orders are placed that satisfy the limit purchase order.

FIGS. 51A-E are exemplary screen shots of user interfaces related to sale transactions provided by an exchange computer system in accordance with exemplary embodiments of the present invention. The sell order GUIs may be rendered similar to the corresponding purchase order GUIs. In embodiments, the order parameter input fields may be located on a different side of the page (e.g., to the left of the order book graphical representation and/or listing instead of to the right).

Figure 51A:
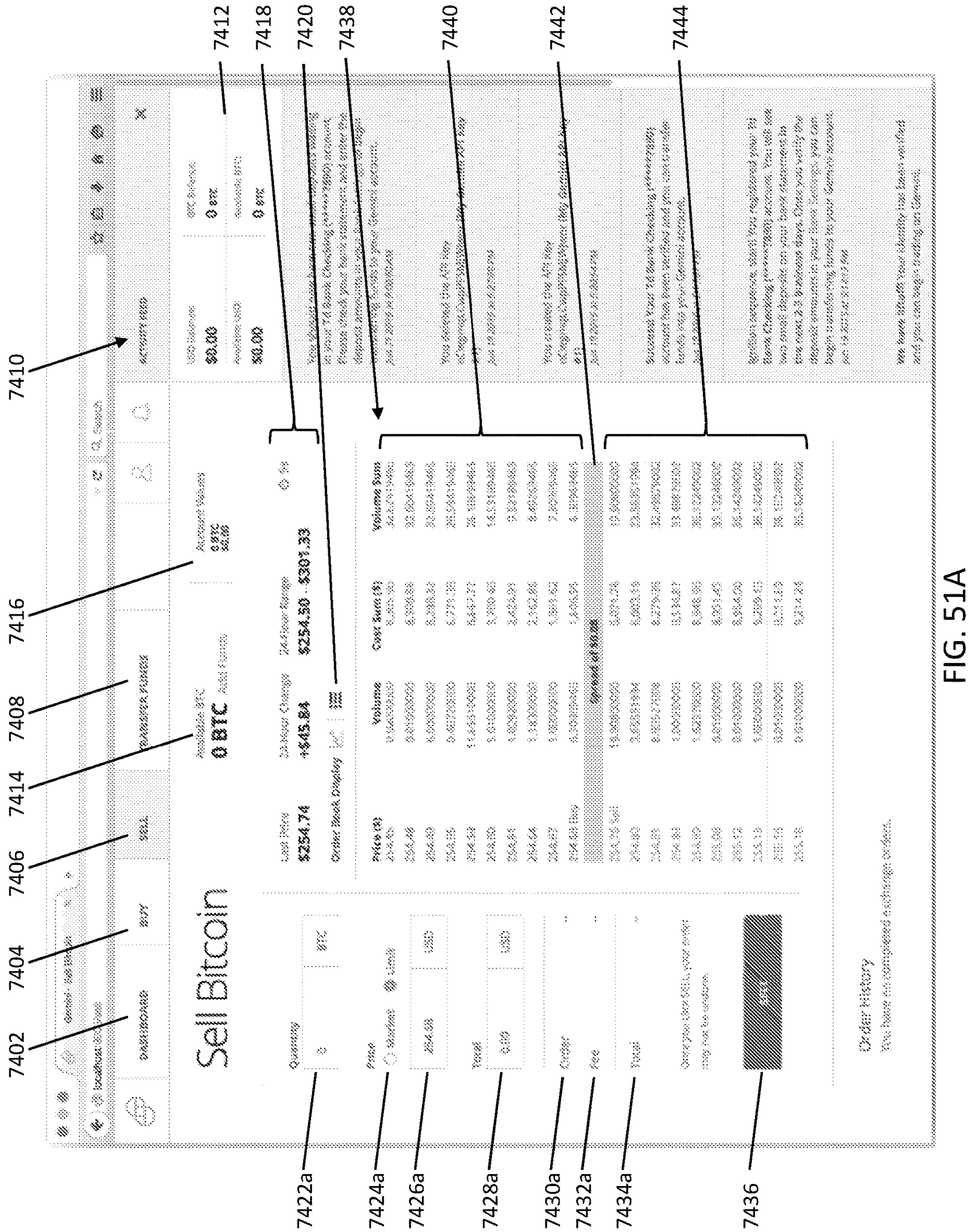
FIGS. 51A-E are exemplary screen shots of user interfaces related to sale transactions provided by an exchange computer system in accordance with exemplary embodiments of the present invention.

FIG. 51A shows a sell order graphical user interface comprising an order book listing 7438. This order book listing may be rendered similar to the order book listing 7348 for a purchase order GUI, described with respect to FIG. 50A.

Figure 51B:
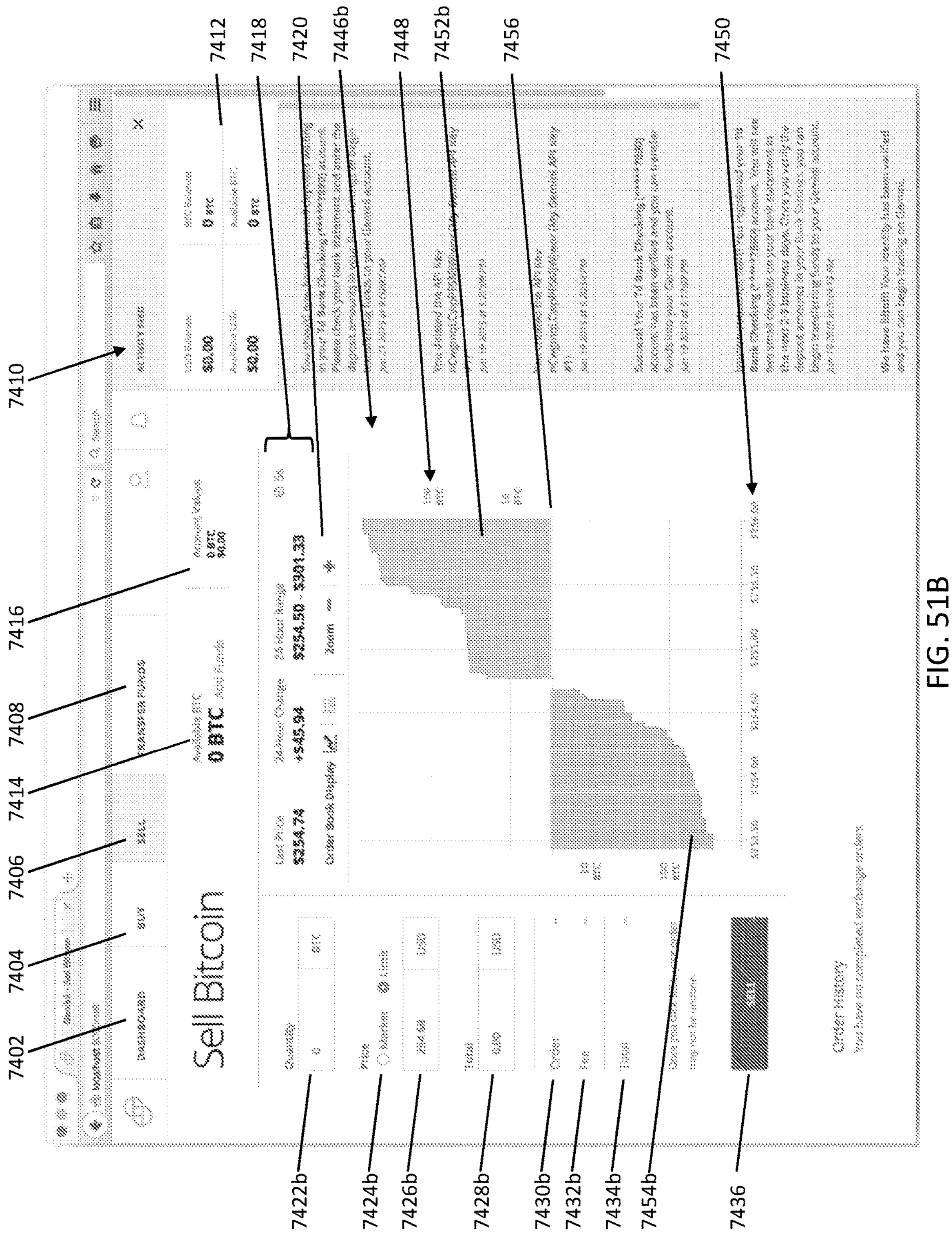

FIG. 51B shows a purchase order GUI comprising an electronic order book graphical representation 7446*b*. No prospective order is illustrated as part of the graphical representation 7446*b* because the digital asset order quantity is zero. As with FIG. 50B, the graph 7446*b* may include a sell order book graphical representation 7452*b* (e.g., above the price axis 7456) and a purchase order book graphical representation 7454*b* (e.g., below the price axis 7456).

Figure 51C:
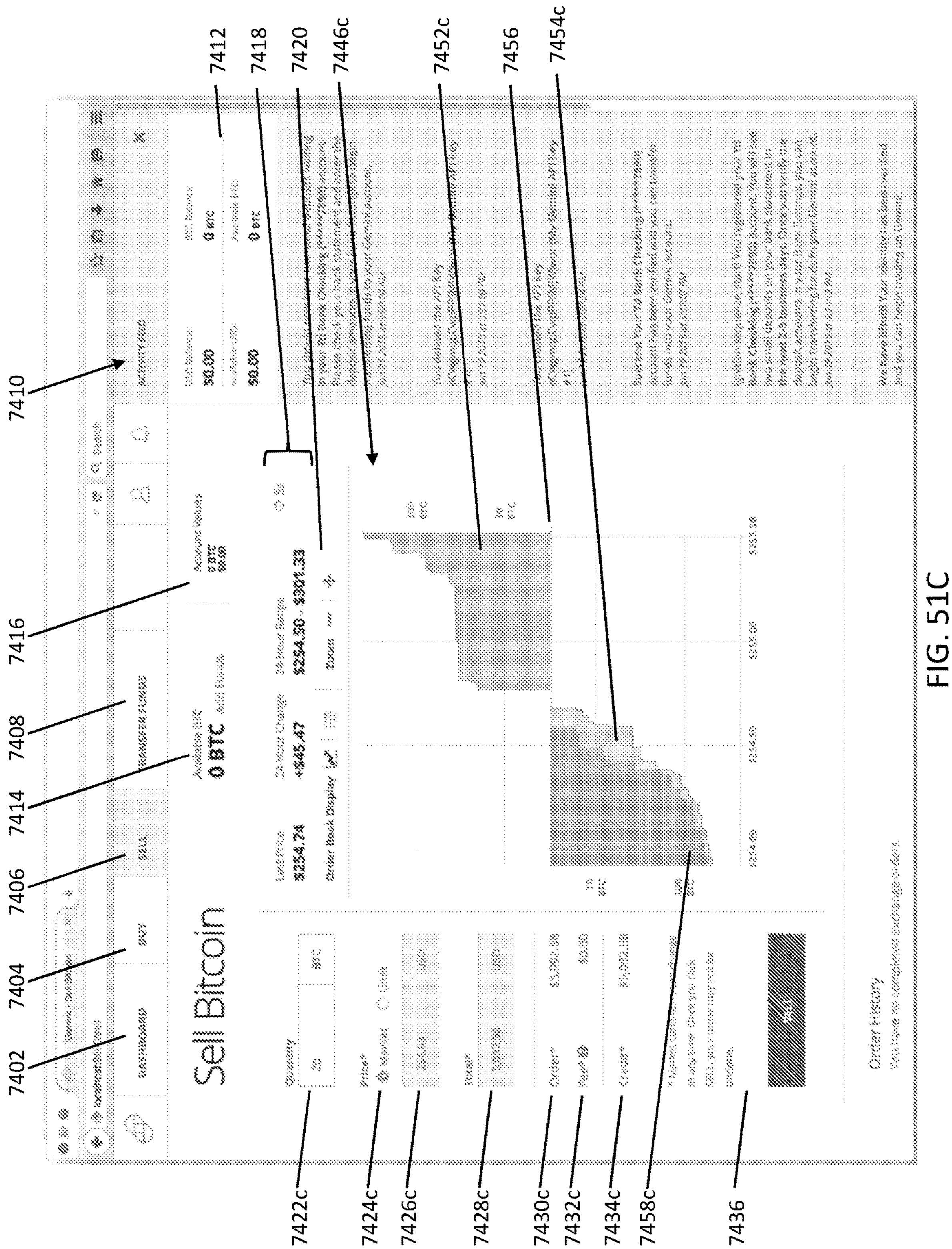

FIG. 51C shows a sell order GUI comprising a graphical representation 7446*c* showing an electronic order book and prospective market sell order. A market order is indicated by the order type selector 7424*c*. The graphical representation 7446*c* includes a sell order book graphical representation 7452*c* showing currently pending sell orders and a purchase order graphical representation 7454*c* showing currently pending purchase orders. A post-order purchase order book graphical representation 7458*c* indicates the cumulative order data that would comprise the purchase order book after placement and/or execution of the prospective sell order defined by the order parameters in the order parameter input fields. As with market purchase orders, a market sell order may cause the exchange computer system to place a plurality of sell orders until the order parameters are satisfied.

Figure 51D:
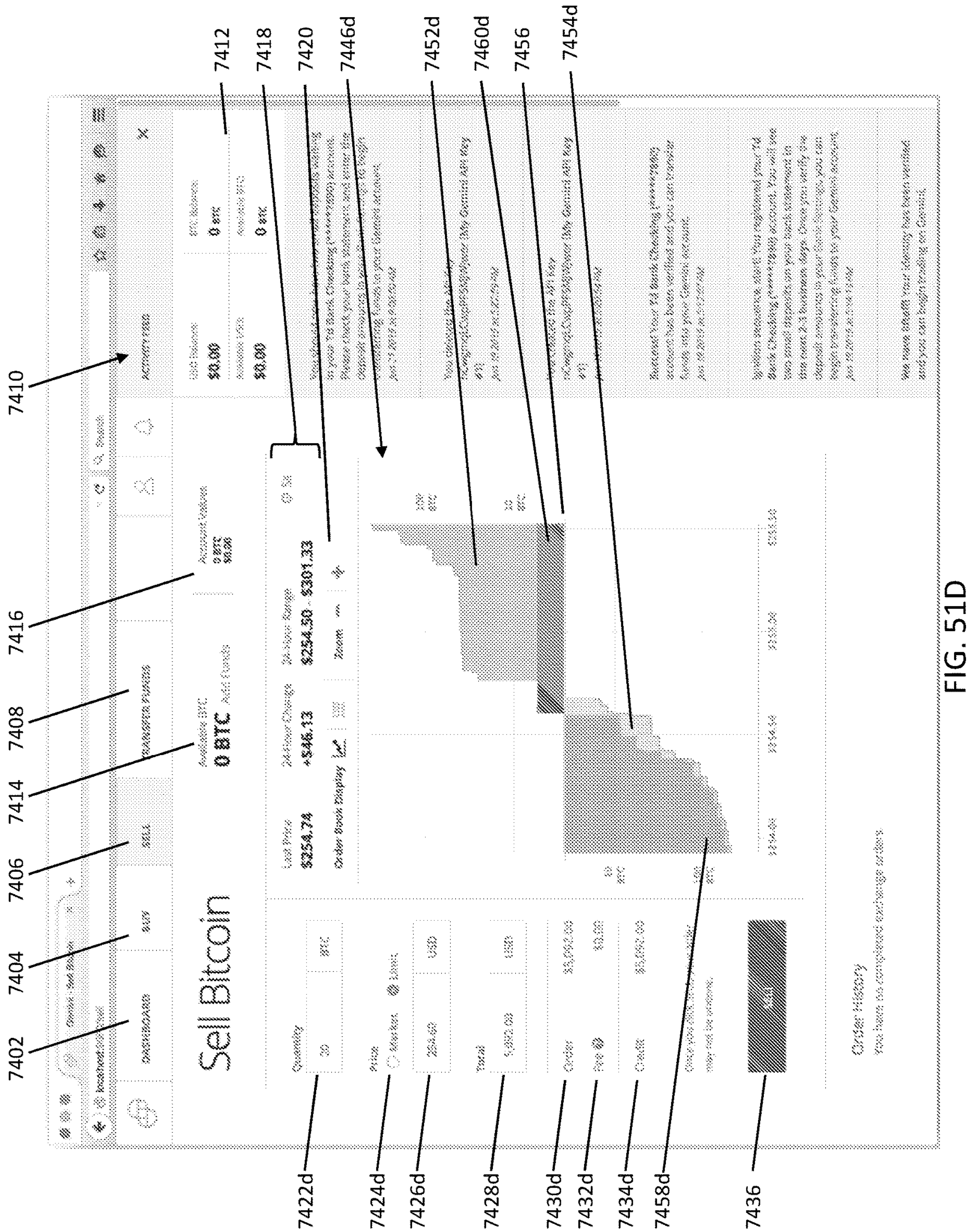

FIG. 51D shows a sell order GUI comprising a graphical representation 7446*d* showing an electronic order book and prospective limit sell order. The limit sell order price specified in field 7426*d* is less than the market price, and therefore the order will be in the money. At least a portion of the sell order will be satisfied by the currently pending purchase orders. The graph 7446*d* includes a sell order book graphical representation 7452*d* and a purchase order book graphical representation 7454*d*. The sell order book graphical representation 7452*d* may show the cumulative pending sell orders as well as the portion of the prospective sell order that would be unfulfilled by the current purchase orders and thus remain on the books. The unfulfilled portion of the prospective limit sell order may be indicated by a remaining prospective sell order graphical representation 7460*d*, which may be overlaid on the graph, e.g., on the sell order book side of the price axis 7456. The prospective sell order graphical representation 7460*d* may indicate the prospective digital asset order quantity at the sell order limit price and higher prices. Meanwhile, a post-order purchase order book graphical representation 7458*d* may be provided in the graph 7446*d*. It may be overlaid on the current purchase order book graphical representation 7454*d*. As can be seen, the prospective sell order overlaps at least some prices at which purchase orders exist shown in the current purchase order book graphical representation 7454*d*. Accordingly, at least a portion of the prospective sell order would be executed upon placement of the order.

Figure 51E:
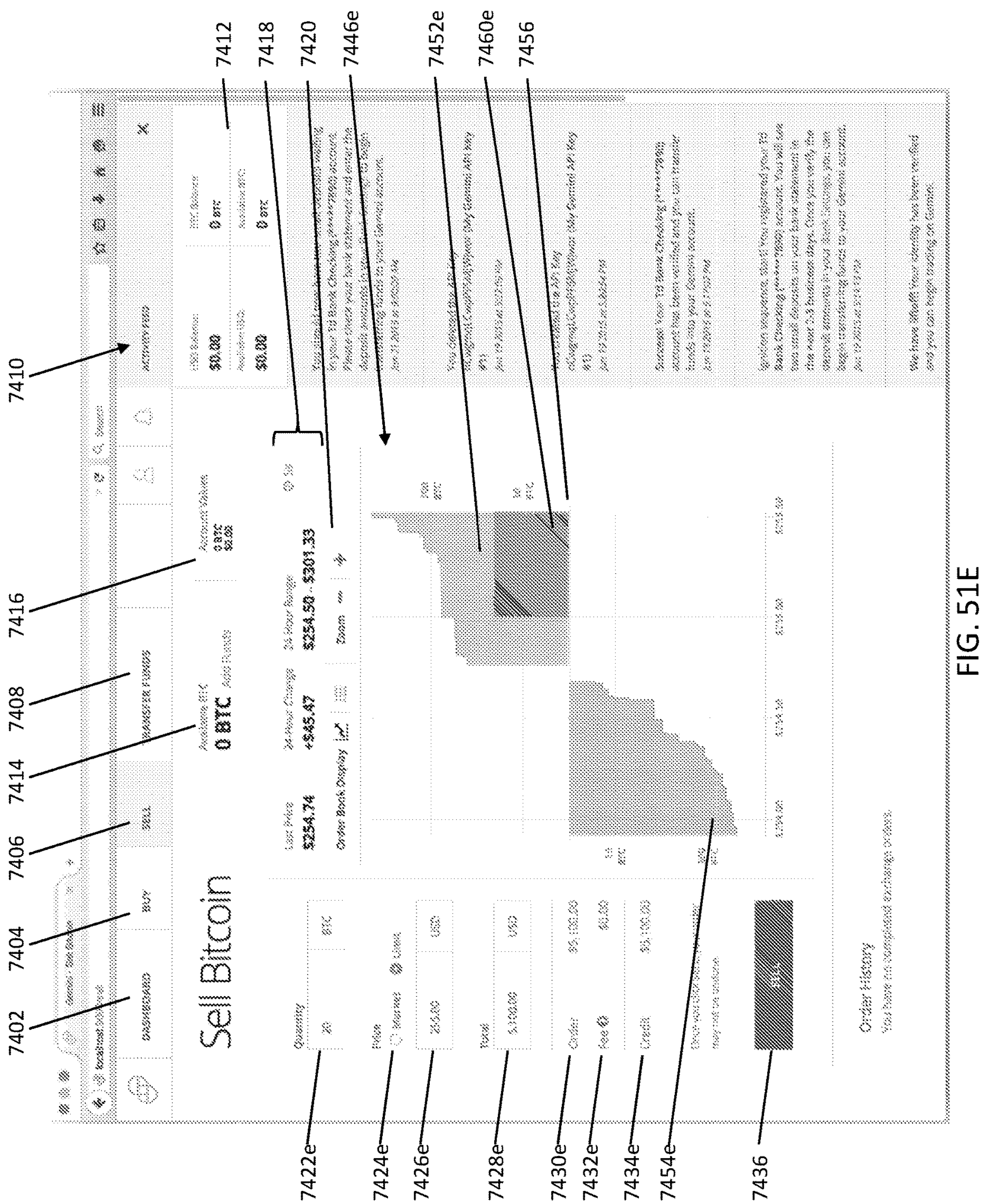

FIG. 51E shows a sell order GUI comprising a graphical representation 7446*e* showing an electronic order book and prospective limit sell order. The limit sell order price specified in field 7426*e* is greater than the market price, and therefore the order will be out of the money. The graph 7446*e* includes a sell order book graphical representation 7452*e* and a purchase order book graphical representation 7454*e*. A prospective sell order graphical representation 7460*e* may show the order parameters of the prospective limit sell order. The prospective digital asset order quantity may be shown at the sell limit price and higher prices. As illustrated, there is no overlap with existing purchase orders. Accordingly, the prospective order would not be satisfied by the current purchase order book, and there is no post-order purchase book graphical representation because there would be no change to the purchase order book due to the prospective order.

It will be understood that information displayed across various exemplary embodiments of GUIs described herein may be displayed in the form of text and/or graphical representations. Such displayed information may be manipulated to a desired configuration by a user, for example, through scaling (such as minimization and maximization), highlighting, coloring, and/or rearrangement, to name a few.

FIGS. 52A-C are flow charts of exemplary processes for generating graphical user interfaces representing an electronic order book in accordance with exemplary embodiments of the present invention. These processes may enable a user of a user electronic device to view an electronic order book graphical representation. Such a representation may be updated automatically and/or dynamically, such as in response to changing data in the electronic order book (e.g., due to new orders, canceled orders, and/or filled or partially filled order), and/or in response to user input of new or changed order parameters). The electronic order book graphical representation can enable the user to view how a prospective order defined by its order parameters may move the market, the degree to which the prospective order will be filled and/or unfilled by currently pending orders, and/or a graphical comparison to the pending orders that comprise the electronic order book. An exchange computer system may interact with an application at a user electronic device (e.g., an installed and/or downloadable application, which may be a dedicated application or a general application, such as a web browser application, carrying out specific instructions provided by the exchange computer system). Interacting with the application can comprise sending and/or receiving data and/or transmitting machine-readable instructions to cause the application to render display content, such as particular graphical user interfaces or updates thereto. Transmitting such instructions to an application may activate it and/or cause it to carry out the instructions. Accordingly, the processes described in herein may dynamically generate graphical user interfaces and/or dynamically provide such graphical user interfaces (e.g., the instructions for rendering the graphical user interfaces) to one or more user electronic devices. In embodiments, the graphical user interface can be rendered by a viewer application on a remote device.

FIG. 52A shows an exemplary process for generating machine-readable instructions to render a graphical user interface comprising an electronic order book graphical representation. In a step S7502, an exchange computer system comprising one or more computers may receive from a user device, a request to access the electronic order book associated with a digital asset traded on an electronic exchange. Such a request may comprise a user selection of an order book display type indicator corresponding to a graphical representation display type.

In a step S7504, the exchange computer system may access, from non-transitory computer-readable memory, electronic order book information comprising digital asset order information for a plurality of digital asset orders. The digital asset order information may comprise respective order prices denominated in a fiat currency and respective order quantities for each of the plurality of pending digital asset orders. The plurality of pending digital asset orders can include pending digital asset purchase orders and pending digital asset sell orders.

In a step S7506, the exchange computer system may calculate information for a first graphical user interface by determining at each respective order a price first cumulative quantity of digital assets subject to the pending digital asset purchase orders; and by determining at each respective order price a second cumulative quantity of digital assets subject to the pending digital asset sell orders.

In a step S7508, the exchange computer system may generate first machine-readable instructions to render the first graphical user interface including a first electronic order book graphical representation. The first electronic order book graphical representation may comprise a first axis depicting price denominated in the fiat currency; a second axis depicting digital asset quantity; a first set of graphical indicators on a first side of the first axis showing at each price visible along the first axis the first cumulative quantity of digital assets subject to the pending digital asset purchase orders; and a second set of graphical indicators on a second side of the first axis showing at each price visible along the first axis the second cumulative quantity of digital assets subject to the pending digital asset sell orders. In embodiments, the first axis may be a horizontal axis and the second axis may be a vertical axis. In embodiments, the axes may be flipped. In embodiments, the second axis may have a logarithmic scale.

In embodiments, the machine-readable instructions may comprise computer code such as Javascript, HTML, CSS to name a few. In embodiments, the machine-readable instructions may comprise data and/or layout instructions in a language associated with one or more user electronic device operating system types (e.g., iOS, Android, Windows, to name a few) and/or associated with applications (e.g., mobile applications) running on user electronic devices. In embodiments, the machine-readable instruction may comprise data such as JSON data.

In a step S7510, the exchange computer system may transmit to the first user electronic device the first machine-readable instructions so as to cause the first user electronic device (e.g., an application running on the first user electronic device, such as a dedicated downloadable application or a web browser application, which may be mobile applications) to render the first graphical user interface on a display associated with the first user electronic device. In embodiments, a web browser running one the first user electronic device may render the first graphical user interface, e.g., in a webpage. In embodiments, the exchange computer system may transmit the first machine-readable instructions to one or more other user electronic devices and/or other computer systems.

FIG. 52B shows an exemplary process for generating machine-readable instructions to render a graphical user interface for display by a viewer application comprising an electronic order book graphical representation and a prospective purchase order graphical representation. In embodiments, a viewer application may in addition to rendering a graphical user interface for display on a display device, such as an LED screen, may also accept user input of data or other information.

In a step S7512, the exchange computer system may receive from the first user electronic device, first digital asset order information corresponding to a first prospective digital asset purchase order. The first digital asset order information comprise a first order quantity of the digital asset and a first order price parameter related to a first order price of the digital asset. In embodiments, the first order price parameter may comprise a market order indicator. Accordingly, the first order price may be a market price. In embodiments, the exchange computer system may automatically determine the market price for the first order price, e.g., upon receipt of a market order indicator. In embodiments, the first order price parameter may comprise a limit order indicator. Accordingly, the first order price may be a limit price, which may be specified by the user.

In a step S7514, the exchange computer system may store in non-transitory computer-readable memory, the first digital asset order information as a prospective digital asset purchase order.

In a step S7516, the exchange computer system may calculate information for a second graphical user interface by determining at each respective order price a second order quantity of digital assets subject to the first prospective digital asset purchase order and by determining at each respective order price a third cumulative quantity of digital assets subject to the digital asset sell orders that would remain after fulfilling the first prospective digital asset purchase order. The exchange computer system may be specifically programmed to perform these non-routine calculations. They generate data values that enable the exchange computer system to generate machine-readable instructions for an unconventional GUI that provides enhanced order book visualization showing the potential impact of a prospective order. The potential impact of the order can include a visualization of how the order fits within the pending orders of the order book and/or how the order, once placed, will increase or decrease the pending cumulative sell order volumes and/or purchase order volumes available in the order book at each price. In embodiments, the second graphical user interface may be an updated version of the first graphical user interface.

In a step S7518, the exchange computer system may generate second machine-readable instructions to render the second graphical user interface including a second electronic order book graphical representation comprising a graphical representation of the first prospective digital asset purchase order superimposed on a modified first electronic order book graphical representation (e.g., modified to comprise a post-order electronic order book representation). The second electronic order book graphical representation may comprise the first axis depicting price denominated in the fiat currency; the second axis depicting digital asset quantity; the first set of graphical indicators on the first side of the first axis; the second set of graphical indicators on the second side of the first axis; a third set of graphical indicators on the first side of the first axis showing at each price visible along the first axis the respective second order quantity of digital assets subject to the first prospective digital asset purchase order; and a fourth set of graphical indicators on the second side of the first axis showing at each price visible along the first axis the respective third cumulative quantity of digital assets subject to the digital asset sell orders that would remain after fulfilling the first prospective digital asset purchase order.

In embodiments, the third set of graphical indicators may not be displayed, such as for a market order. In embodiments, the first prospective digital asset purchase order may be characterized as out of the money, and the third respective cumulative quantity of digital assets at each price may be zero.

In embodiments, at least one of the first axis or the second axis of the first electronic order book graphical representation have a different scale than the corresponding first axis and the corresponding second axis of the second electronic order book graphical representation. In embodiments, the scaling may be changed upon receipt of an electronic request from the user (e.g., via selection of an element, such as a rendered button, of the graphical user interface). In embodiments, the user may navigate and/or scroll along the axes of the graph and/or zoom in and/or out.

In embodiments, the exchange computer may further determine at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. The first set of graphical indicators of the second electronic order book graphical representation may show at each price visible along the first axis the fourth cumulative quantity of digital assets.

In a step S7520, the exchange computer system may transmit to the first user electronic device, the second machine-readable instructions so as to cause the first user electronic device (e.g., an application running on the first user electronic device, e.g., on one or more processors) to render the second graphical user interface on the display. The first user electronic device (e.g., the application running thereon) may render the second electronic order book graphical representation according to the second machine-readable instructions.

FIG. 52C shows an exemplary process for generating machine-readable instructions to render a graphical user interface comprising an electronic order book graphical representation and a prospective sell order graphical representation In a step S7522, the exchange computer system may receive from the first user electronic device, first digital asset order information corresponding to a first prospective digital asset sell order. The first digital asset order information may comprise a first order quantity of the digital asset and a first order price parameter related to a first order price of the digital asset, the first order price denominated in the fiat currency.

In a step S7524, the exchange computer system may store in non-transitory computer-readable memory, the first digital asset order information as a prospective digital asset sell order.

In a step S7526, the exchange computer system may calculate information for a second graphical user interface by determining at each respective order price a second order quantity of digital assets subject to the first prospective digital asset sell order and by determining at each respective order price a third cumulative quantity of digital assets subject to the digital asset purchase orders that would remain after fulfilling the first prospective digital asset sell order. These non-routine calculations enable generation of an unconventional GUI that can show electronic order book data with a visualization that enhances rapid understanding of the bounds of the pending buy and sell orders as well as how the prospective order may interact with the existing orders (e.g., to be fulfilled, partially fulfilled, unfulfilled, and/or to move the market by changing the pending orders that remain on the electronic order book).

In a step S7528, the exchange computer system may generate second machine-readable instructions to render the second graphical user interface including a second electronic order book graphical representation comprising a graphical representation of the first prospective digital asset purchase order superimposed on a modified first electronic order book graphical representation (e.g., modified to comprise a post-order electronic order book graphical representation). The second electronic order book graphical representation may comprise the first axis depicting price denominated in the fiat currency; the second axis depicting digital asset quantity; the first set of graphical indicators on the first side of the first axis; the second set of graphical indicators on the second side of the first axis; a third set of graphical indicators on the first side of the first axis showing at each price visible along the first axis the respective third cumulative quantity of digital assets subject to the digital asset purchase orders that would remain after fulfilling the first prospective digital asset sell order; and a fourth set of graphical indicators on the second side of the first axis showing at each price visible along the first axis the respective second order quantity of digital assets subject to the first prospective digital asset sell order. These machine-readable instructions may provide an unconventional GUI that facilitates order book visualization, including visualization of the degree to which a prospective order may be satisfied and how it may move the market.

In embodiments, the exchange computer system may determine at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. The first set of graphical indicators of the second electronic order book graphical representation may show at each price visible along the first axis the fourth cumulative quantity of digital assets.

In a step S7530, the exchange computer system may transmit to the first user electronic device, the second machine-readable instructions so as to cause an application at the first user electronic device to render the second graphical user interface on the display. The first user electronic device may render the second electronic graphical user interface according to the second machine-readable instructions.

In embodiments, transmitting data and/or machine-readable instructions to a user electronic device and/or to an application on the user electronic device may activate the application and/or cause it to render display content on a display screen.

In embodiments, graphical user interfaces similar to those described herein may be generated to show order book and order information related to other types of exchange transactions, such as a first digital asset to a second digital asset, a first fiat currency to a second fiat currency, or a first commodity to a second commodity, to name a few.

Setup and Storage of Digital Assets and/or Digital Wallets

Digital asset accounts may be securely generated, accessed, and/or used (e.g., for transactions) from a secure administrative portal. In embodiments, the administrative portal, which may be used for key generation, parsing, and/or reassembly, may be a secure system for transacting in digital math based assets comprising a first computer system comprising one or more processors that generate one or more digital wallets and one or more respective private keys and one or more respective public keys, each of the one or more private keys being segmented into one or more private key segments; one or more writing devices operatively connected to the one or more first computer systems, each of the one or more writing devices adapted to write at least one private key segment of a corresponding one of the one or more private keys, along with information correlating the at least one private key segment to one of the one or more public keys; and at least one networked computer comprising one or more processors that access at least one of the digital wallets using a corresponding one of the one or more private keys as reassembled using the corresponding private key segments.

In embodiments, the administrative portal may further comprise a second computer system comprising one or more processors for reassembling the corresponding one of the one or more private keys based on input into the second computer system of the corresponding private key segments. In embodiments, the input device may be a scanner, a keyboard, a touchscreen, a mouse, a microphone, a camera, and/or a digital card reader, to name a few.

In embodiments, the first computer system of the administrative portal and/or the second computer system may not be associated with a network. In embodiments, the first computer system of the administrative portal and the networked computer system may be a common computer system. In embodiments, the second computer system of the administrative portal and the networked computer system may comprise a common computer system. In further embodiments, the first computer system, the second computer system, and the networked computer system may be a common computer system.

In embodiments, referring to FIGS. 4A-4D, the administrative portal may comprise an accounting computer 25 and a secure location 10, as described herein.

Referring to the exemplary embodiment illustrated in FIGS. 4A-1 AND 4A-2, at a secure location 10, a digital asset account holder, administrator, manager, and/or custodian may maintain at least two computers. In embodiments, an administrator, manager, and/or custodian may be contracted to manage one or more digital asset accounts and/or oversee security for the accounts. In embodiments, secure location 10 may be a room with restricted entry. In embodiments, secure location 10 may have a user entry log to provide an access record for the location.

In the exemplary embodiment depicted in FIGS. 4A-1 AND 4A-2, at secure location 10, the first computer may be a networked computer 20, which may comprise one or more computing devices. Networked computer 20 and/or other computers in the system may have the ability to cycle or otherwise change IP addresses. The second computer may be a non-networked, isolated computer 30, which may comprise one or more computing devices. In embodiments, the networked computer 20 and the isolated computer 30 may be separate aspects of one computing device. For example, a hard drive partition may be used to separate the networked and non-networked functions. In embodiments, the computers may comprise one or more processors and/or computer readable memory. Networked computer 20 and isolated computer 30 may be located in close proximity to each other, as in the same room, or may be located in separate locations within secure location 10. It will be appreciated by those in the art that secure location 10 may comprise a plurality of secure locations. In embodiments, isolated computer 30 may be located in a Faraday cage 50. The Faraday cage 50 may prevent electronic eavesdropping or interference from electromagnetic waves. In alternative embodiments, the functions ascribed above to networked computer 20 and isolated computer 30 may be performed by one or more networked and/or isolated computers at one or more locations.

In the exemplary embodiment depicted in FIGS. 4A-1 AND 4A-2, networked computer 20 can communicate with a registry, exchange, other external entities, e.g., APs, and/or all or part of a digital asset network to send and/or receive digital assets (e.g., to create transactions), to compute balances, and/or to transmit or otherwise broadcast signed or otherwise finalized transactions. In embodiments, networked computer 20 may be used to distribute digital assets among one or more digital asset accounts and/or digital wallets. The networked computer 20 may be connected to the Internet directly (e.g., through Ethernet, Wi-Fi, Bluetooth, or any connection known in the art or hereafter developed) or indirectly (e.g., through another computer to which it is directly connected), or may be connected to a network other than the Internet.

In embodiments, the digital assets may be stored in one or more digital wallets residing on one or more computing devices, such as remote servers, personal computers, tablet devices, mobile devices, such as smart phones, or PDAs, to name a few. In the exemplary embodiment of FIGS. 4A-1 AND 4A-2, isolated computer 30 may be used to generate electronic wallets and/or key pairs, which may include both private and public keys. In embodiments, keys comprise strings or alphanumeric characters or other characters, optionally of a pre-determined length, may comprise one or more pieces of computer code, or may comprise other formats of keys known in the art. In embodiments, digital wallets may be created on isolated computer 30 using a "clean-boot" with a bootable CD, such as a Linux Live CD. The specific version of the operating system may be maintained in secret to avoid security risks.

In embodiments, digital asset accounts and/or digital wallets may be generated by an entity upon receipt of a request to transfer digital assets to the entity and/or may be pre-generated at the time that security measures (e.g., a vault storage system) is set up, to name a few. The digital asset accounts each may be associated with unique private-public key pairs (which may include a plurality of private keys). In embodiments, the key pairs may be created as part of the digital wallet creation process. In other embodiments, the key pairs may be created before or after the creation of the one or more digital wallets and associated with the wallets as a separate step. In embodiments, the assets stored in a digital wallet may be accessed with a key pair, even if the original wallet is destroyed or otherwise unavailable. In such embodiments, only the key pair need be maintained and/or stored to retrieve the assets associated with a given digital wallet. Accordingly, in an embodiment of the present invention, digital wallets may be deleted or otherwise destroyed following the storage of their associated keys. Assets may be added to the wallet even after its destruction using the public key. Assets may thus be stored in a wallet after the wallet is destroyed. The wallet may be re-generated using its keys.

In embodiments, the private key may not be used directly with or on the networked computer 20. In embodiments, a public key (without the corresponding private key) may only be able to receive digital assets for deposit purposes. In embodiments, assets may be transferred to a wallet using its public key and without the transferor knowing the private key. Implementation of the foregoing may require customized software, e.g., software that modifies the standard digital asset protocols.

In embodiments, isolated computer 30 may also be used in conjunction with, e.g., one or more printers or other writing devices, to print the key pairs or may be used otherwise to arrange for the storage of one or more aspects and/or portions (or segments or coded and/or encrypted segments) of the key pairs. A printer 32 or other writing device to write, print, or otherwise store the keys may be provided with the isolated computer 30. Such printer(s) and/or other writing device(s) may be connected, directly and/or indirectly, to the isolated computers, such as through hardwire, wireless, or other connection. That device may also be located within a Faraday cage, which may be the same Faraday cage housing isolated computer 30. Storage of the keys is described further below.

In embodiments, one or more isolated computers 30 can be used in conjunction with one or more printers or other writing devices to write, print or otherwise store keys. It will be appreciated by one of skill in the art, that In embodiments, it may be desirable to limit the number or printers or other writing devices to as few as possible to reduce risk of exposure of private keys, while in embodiments it may be desirable to have a larger number of printers or other writing devices to handle the volume of wallets and/or keys that need to be generated and/or written by the system for its operation.

Private keys may be stored in the selected format along with their corresponding public keys. In embodiments, the private key may be stored with a reference number which may correlate the private key to its corresponding public key. The reference number may be (or may be stored as) a number, alphanumeric code, bar code, QR code, to name a few. A reference number master list may identify a private key, the reference number, and the corresponding public key. The reference number master list may be printed or etched on paper or some other substrate, may be stored digitally on a tape CD, DVD, computer hard drive, or other medium, or otherwise stored in a manner known in the art. The substrates or media just described may have any suitable size, including microscopic or nano scales. In embodiments, the reference number master list may be stored in a secure storage chamber 60 at secure location 10. Storage chamber 60 may be a lockbox, fireproof box, or other secure chamber. If storage is electronic or digital, chamber 60 may protect against electromagnetic waves.

The private and/or public keys and/or any reference number may be stored in a variety of formats, as described herein. The keys may be divided into separate segments for storage. For example, a 51-character key may be divided into three 17-character segments. The same reference number that correlates the private key to the public key or an additional reference number or other identifier may indicate which key segments are part of the same key. The reference identifier or another identifier may be provided and stored with the one or more segments to indicate their order in the assembled key. A numbering schema or other convention may also be used to identify the order of key segments. For example, a first segment may begin with an "A", a second segment may begin with a "B", and a third segment may begin with a "C". The key segments may be stored in one or more locations. In embodiments, the key segments may be divided among a plurality of vaults 70, as described herein.

In embodiments, keys and/or key segments may be stored digitally and/or electronically, e.g., on one or more computer hard drive, disk, tape, memory card, flash memory, CD-ROM, and/or DVD, to name a few. In embodiments, the keys and/or key segments may be printed on any substrate, including paper, papyrus, plastic, and/or any substrate known in the art. In embodiments, the substrate may be fireproof or fire resistant, such as a fireproof plastic. The substrate may be resistant to fluids, e.g., water resistant, or otherwise nonabsorbent. Other printing options may be holographic printing, three-dimensional printing, raised printing, such as Braille lettering, and/or invisible ink printing, such as using inks that require a special light and/or treatment, e.g., heat and/or chemicals, for viewing. In embodiments, keys may be etched, e.g., in wood, metal, glass, plastic, or other compositions known in the art, e.g., to produce a card. In embodiments, a magnetic encoding may be used to write to the card. In embodiments, etched or printed keys or key segments may take any shape, such as coin-shaped tokens or rectangular blocks, to name a few. In embodiments, keys or key segments may be printed, etched, or otherwise stored as alphanumeric strings. In embodiments, keys or key segments may be printed, etched, or otherwise stored in a form readable by programmed devices, such as scanners. Such a form may be a QR code, a bar code, another available scannable code format and/or a proprietary code format. In embodiments, quality control operations may ensure that the keys or key segments are printed accurately and/or are able to be read. In embodiments, printed or etched keys or key segments may be coated to prevent reading the key without removing or otherwise altering the coating. Such a coating may be a UV coating and/or may block X-rays or other forms of scanning or reading. The coating may be scratched off to reveal the data contained below it. The back of the substrate may also be coated to prevent reading through the substrate. Such a coating may provide an indication of whether a printed key or key segment was accessed or attempted to be accessed (e.g., it can be detected whether someone scratched the coating away).

In embodiments, security measures may be established and implemented to reduce the risk of digital wallets being compromised. Further, redundancies can be put in place to provide and/or help ensure that any information necessary to access digital math-based assets in digital wallets can be maintained and/or accessed by the account holders as appropriate, necessary, and/or desired.

Multiple private keys may be required to access a digital wallet. Multiple keys may be stored in the same manner as key segments. In embodiments, where a second private key is required, the one or more individuals or systems providing the second key may be located in different administrative portals, different rooms, and/or different geographies from the one or more individuals or systems providing the first private key. Accordingly, a plurality of administrative portals may be employed by secure digital asset storage systems in accordance with the present invention. In embodiments, a plurality of portals may be used for retrieval of stored digital assets (e.g., by requiring a signature or private key from at least two individuals located in at least two different portals). In embodiments, one portal may be used for re-assembling key segments and thus providing one private key, and an individual in a second location may be required to provide a second key or signature before a digital wallet may be accessed. The second key or signature may be encrypted and/or segmented as described herein with respect to a single private key.

In embodiments, a digital wallet may have more than one private key (e.g., multi-signature wallets). The plurality of private keys may be stored securely in the same manner as a single private key. Each private key segment pertaining to a single wallet may be stored in separate vaults, which may be electronic and/or physical vaults. By allowing for multi-signature wallets, the wallet can provide for approval/signature authority from more than one individual or entity as a further means to control access to digital assets held in such wallet. In embodiments, a signature authority may be an automated electronic signature authority, such as a computer or computer system programmed with transaction approval rules. The automated electronic signature authority may only provide a signature when a transaction satisfies the transaction approval rules. In other embodiments, required signature authorities may be individuals who may be located in different administrative portals, different rooms, and/or different geographies. Accordingly, a plurality of administrative portals may be employed by secure digital asset storage systems in accordance with the present invention. In embodiments, one portal may be used for re-assembling key segments and thus providing one private key, and an individual or system in a second location may be required to provide a second key or signature before a digital wallet may be accessed. The second location may be a second portal, a location in a different building, and/or a different geography, to name a few. The second key or signature may be encrypted and/or segmented as described herein with respect to a single private key.

Keys or key segments may be encrypted and/or ciphered, using one or more ciphers, as an additional security measure. The encryption and/or ciphers may be applied by computers running encryption software, separate encryption devices, or by the actions of one or more persons, e.g., prior to input of the encrypted and/or ciphered data into one or more computers. In embodiments, a key may be stored in reverse order and/or translated (e.g., by adding 1 to each digit and/or advancing each alphabetic character by one position in the Western alphabet, by substitution such as by mapping each character to a different character (e.g., A=3, 5=P, to name a few), to name a few). In embodiments, other encryption algorithms can comprise scrambling of a sequence of characters, addition of characters, and/or hashing. Other encryption techniques are possible. See, e.g., David Kahn, The Codebreakers: The Story of Secret Writing, 1967, ISBN 0-684-83130-9. See also, Bruce Schneier, Applied Cryptography, John Wiley & Sons, 1994, ISBN: 0-471-59756-2. The encryption and/or ciphers may protect against use of the keys by an unauthorized entity who obtains the keys or key segments or copies thereof. The encoding and/or cipher may be maintained in secret and applied to decrypt or decode the keys only when keys must be accessed and used. In embodiments, ciphering may refer to an alphanumeric translation or reordering, while encryption may refer to higher level algorithms, including hashing algorithms. In embodiments, encryption and ciphering may refer to the same processes, in which case descriptions herein of processes involving both encryption and ciphering steps may only entail performance of one such step so as not to be repetitive.

Following storage of the key pairs, the key pairs may be erased from isolated computer 30. Erasure may occur using the computer operating system's delete features, customized software or computer code designed to remove the data from computer memory, magnets used to physically erase the data from the computer's storage drives, and/or other techniques known in the art.

A key reader 40 may be provided to assemble, read, and/or de-crypt the keys or key segments. The key reader 40 may be contained within a Faraday cage, which may be the same Faraday cage housing isolated computer 30. The key reader 40 may read keys that are printed, etched, digitally stored, or otherwise stored. Key reader 40 may be a scanner (e.g., photo scanner or bar code scanner), QR reader, laser, computer hardware, CD reader, and/or digital card reader, to name a few. Key reader 40 may include or be operationally connected to a microscope or magnifying device, such as for keys that are printed in microscopic sizes or other small sizes. In embodiments, key reader 40 may be paired with optical character recognition ("OCR") technology to create digitally recognized copies of keys that may have been printed, etched, or otherwise stored in a form not immediately readable by a computer.

In embodiments, key reader 40 may comprise an input device, such as a keyboard, touchscreen, mouse, and/or microphone, to name a few. An input device may be used for manual entry of keys and/or key segments into one or more computers so that the computer may further process the key segments. Key reader 40 may be operationally connected to isolated computer 30, which may be a direct connection (e.g., a USB cable, Ethernet cable, Bluetooth, or Wi-Fi, to name a few). In embodiments, key reader 40 may be operationally connected to networked computer 20. Key reader 40 may be operationally connected to a separate computing device.

In embodiments, reassembled keys may be input directly into a networked computer 20, which may then be used to access one or more digital wallets and/or perform one or more transactions. Key reader 40 and/or corresponding software (e.g., running on a computer operationally connected to the key reader) may be programmed or otherwise designed to assemble key segments into completed keys. Key reader 40 and/or corresponding software (e.g., running on a computer operationally connected to the key reader) may also correlate the private keys with their corresponding public keys, optionally using the reference number master list. In embodiments, one or more pieces of software may be used to retrieve, decrypt, assemble, and/or decipher keys and/or key segments. In embodiments, such software may be run on any of one or more secure storage system computers and/or user devices. In embodiments, multiple authorities may be required to initiate a retrieval of stored private keys.

Figure 4B:
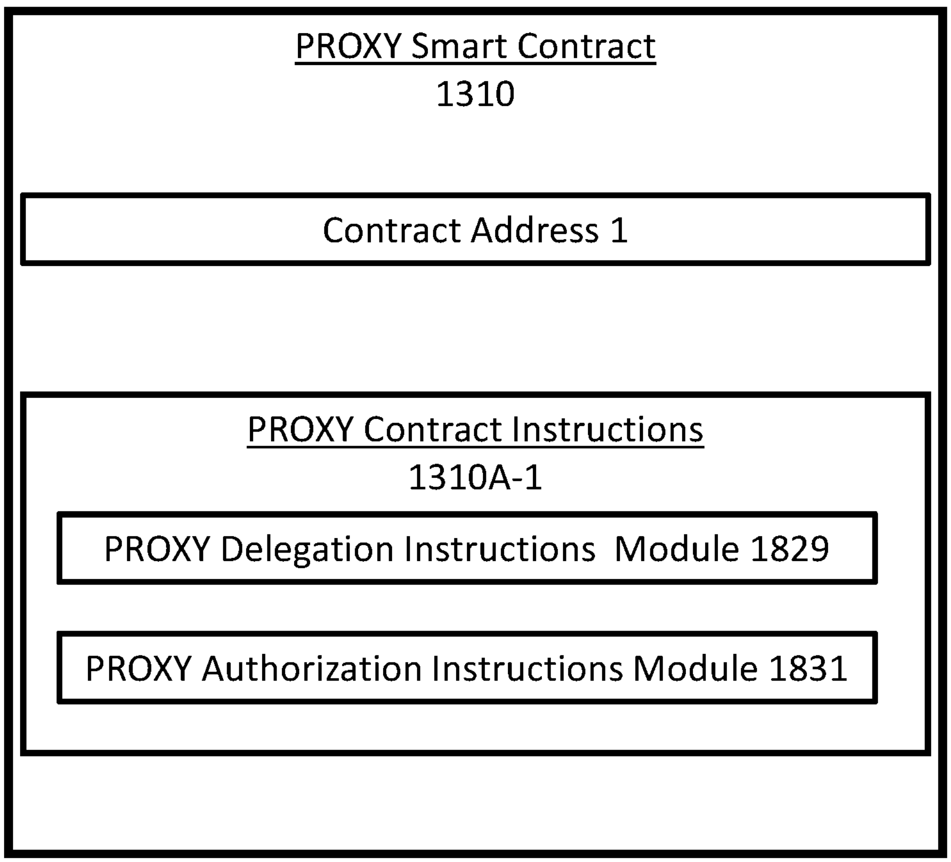
FIG. 4B is a schematic drawing of an exemplary proxy smart contract in accordance with exemplary embodiments of the present invention.
Figure 4C:
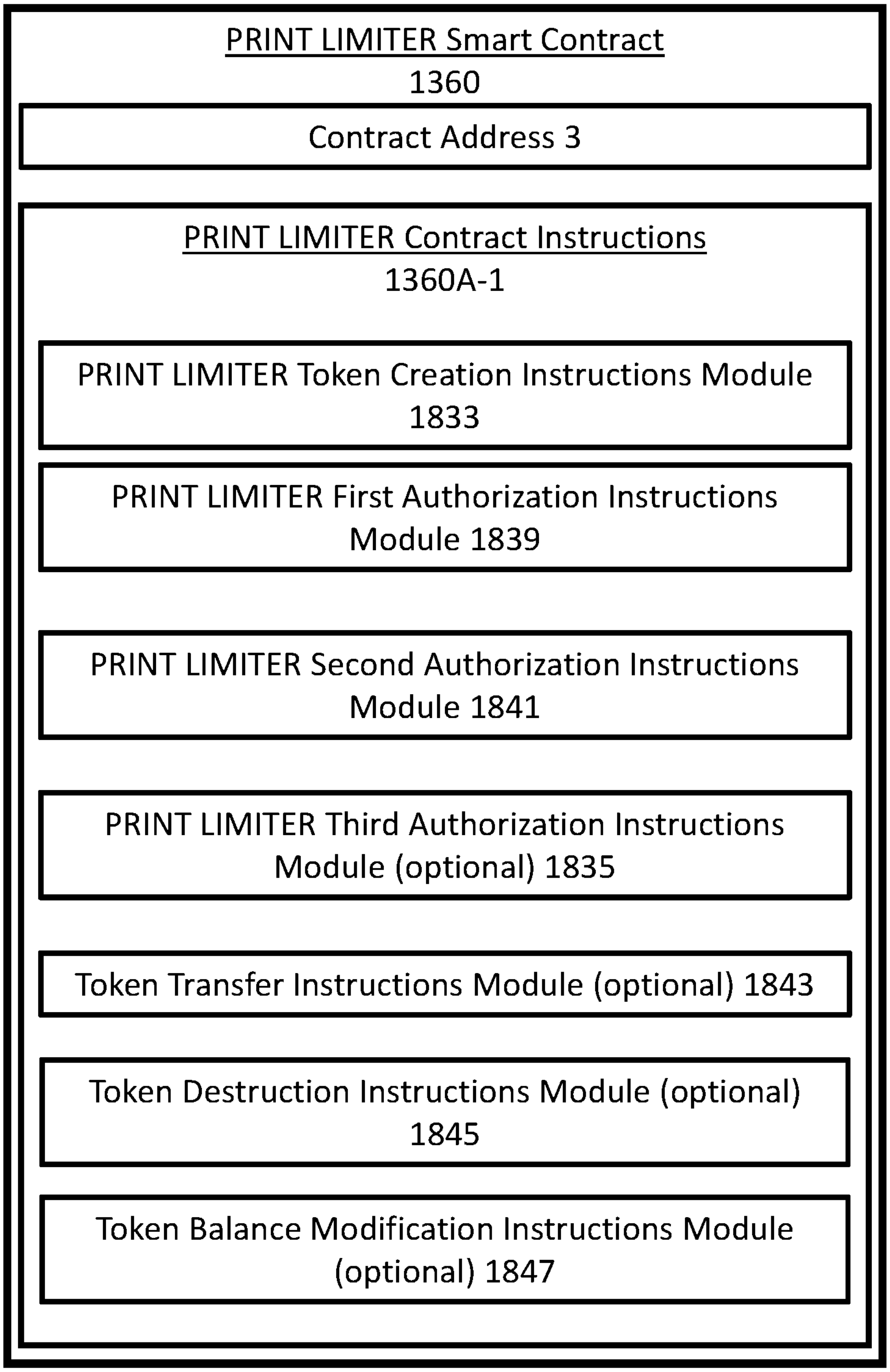
FIG. 4C is a schematic drawing of an exemplary print limiter contract in accordance with exemplary embodiments of the present invention.

In embodiments, a back-up isolated computer 35 and/or a back-up key reader 45 may be provided at secure location 10, as illustrated in FIGS. 4A-4C. The back-up isolated computer 35 and key reader 45 may be contained in a back-up Faraday cage 55, which may be separate from main Faraday cage 50. In embodiments, all or part of the administrative portal may be duplicated and/or backed up. A duplicate administrative portal or portion thereof may be located in a separate geographic area. A duplicate portal may serve as a disaster recovery operations portal.

In embodiments, a digital math-based asset miner, such as a bitcoin miner, may be located at or within the administrative portal. The miner may be one or more computers. In embodiments, the miner may be operationally connected to any of the computers and/or devices at the administrative portal described above.

Figure 4D:
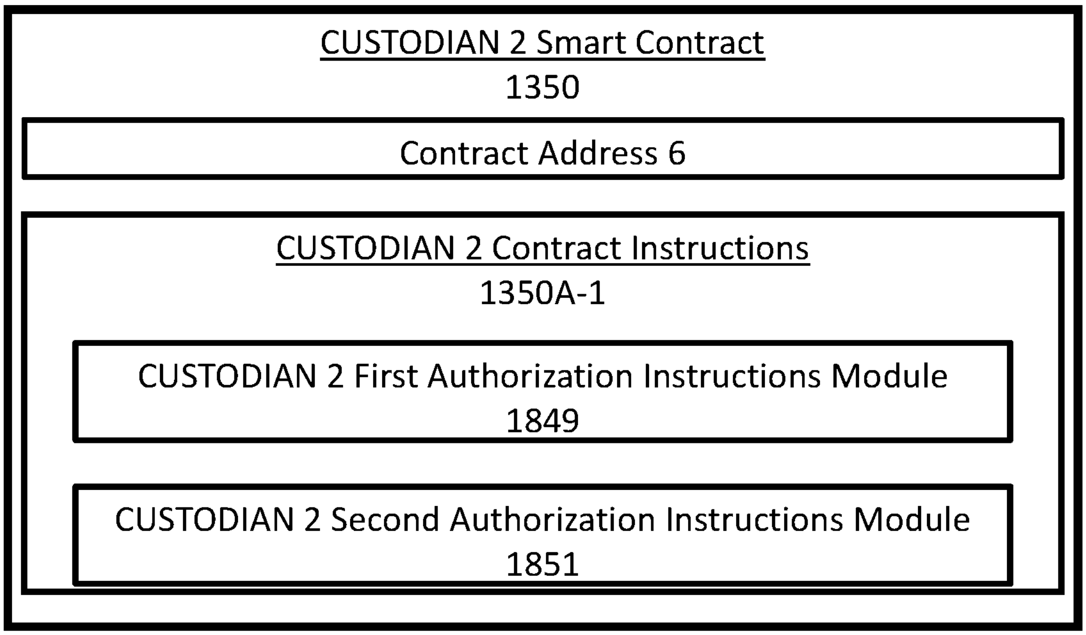
FIG. 4D is a schematic drawing of an exemplary custodian smart contract in accordance with exemplary embodiments of the present invention.

In embodiments, referring to FIG. 4D, the secure location can house one or more networked computers 20, one or more accounting computers 25, one or more digital asset miner computers 65, one or more isolated transaction computers 32 operatively connected to one or more key readers 40, and one or more isolated wallet computers 30', operatively connected to one or more writing devices 32 and, in embodiments, to one or more key readers 40. Each isolated transaction computer 60 and/or isolated wallet computer 30' may be isolated from each other and/or other computers electronically using a secure environment, such as a Faraday cage 50, 60.

One or more vaults 70, 70-1, 70-2, 70-3, 70-N, may be used to hold assets. Vaults may be any secure storage facilities, structures, and/or systems. For example, a vault may be a bank vault or a safety deposit box. Vaults may have appropriately controlled environments (e.g., regulated temperature and/or humidity, to name a few) to enable long-term storage of keys and/or key segments substrates. Vaults may be operated by one or more entities, which may be separate entities. In embodiments, only bonded employees may be permitted access to the vaults. Also, vaults may be located in one or more physical (e.g., geographic) and/or digital (e.g., residing on one or more separate computer servers or hard drives) locations. In embodiments, vaults may be used in conjunction with digital wallets and/or other devices and/or systems known in the art for storing digital assets and/or data.

In the exemplary embodiments of FIGS. 4A-D, the private keys 80 may be divided into three segments, 80-1, 80-2, and 80-3 for storage. Each segment may be stored in a separate one of vaults 70-1, 70-2, and 70-3. In embodiments, two segments, four segments, five segments or another number of segments can be used in accordance with embodiments the present invention. In embodiments, each key segment may be stored in a vault operated by the same entity or by one or more different entities.

In embodiments, one or more duplicate copies of each key or key segment may be produced. Such duplicate copies may be stored in separate vaults, e.g., three sets of keys split into three segments may be stored in nine vaults, four sets of keys split into two segments may be stored in eight vaults, and/or the copies of key segments may be distributed among some other number of vaults, to name a few. See, e.g., FIGS. 9A-9D, to name a few. Duplicate copies may serve as a back-up in case one copy of a key or key segment becomes corrupted, lost, or otherwise unreadable.

In embodiments, vaults may hold the keys in an organized or categorized fashion so as to facilitate location of one or more keys or key segments. In embodiments, a sorting reference number may be used to organize the keys or key segments. The sorting reference number may be the same as the reference number that correlates private and public keys. In embodiments, etched coins or other materials or printed keys or key segments may be stacked or otherwise arranged according to the reference number. In embodiments, an index or card catalog may describe the location of the keys. In embodiments, an automated machine may store and retrieve key segments from storage slots, which machine may receive an input to indicate which keys or key segments to retrieve.

Figure 36A:
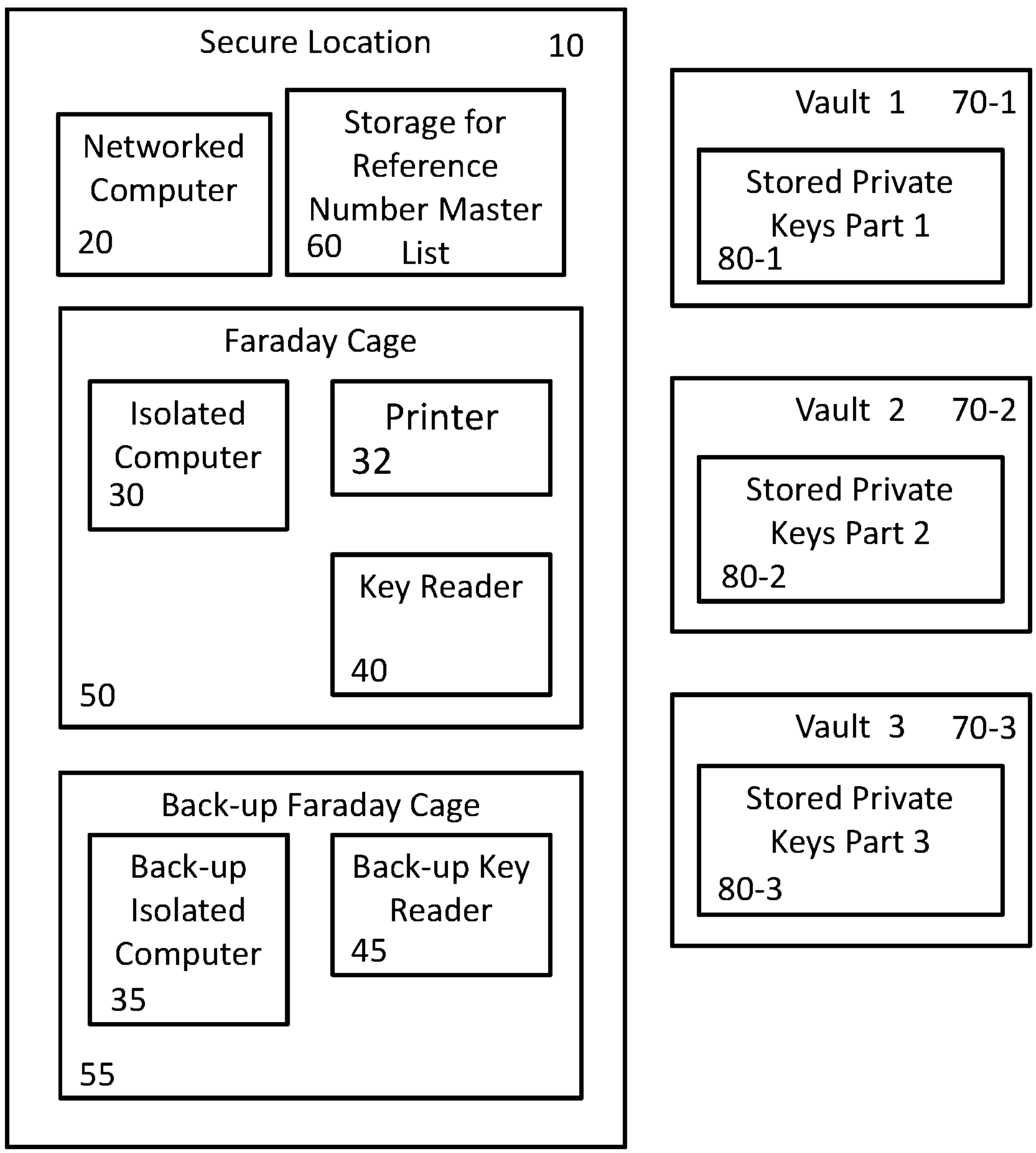
FIGS. 36A-D are exemplary block diagrams of components of security systems for an exchange holding digital math-based assets in accordance with various exemplary embodiments of the present invention.
Figure 36B:
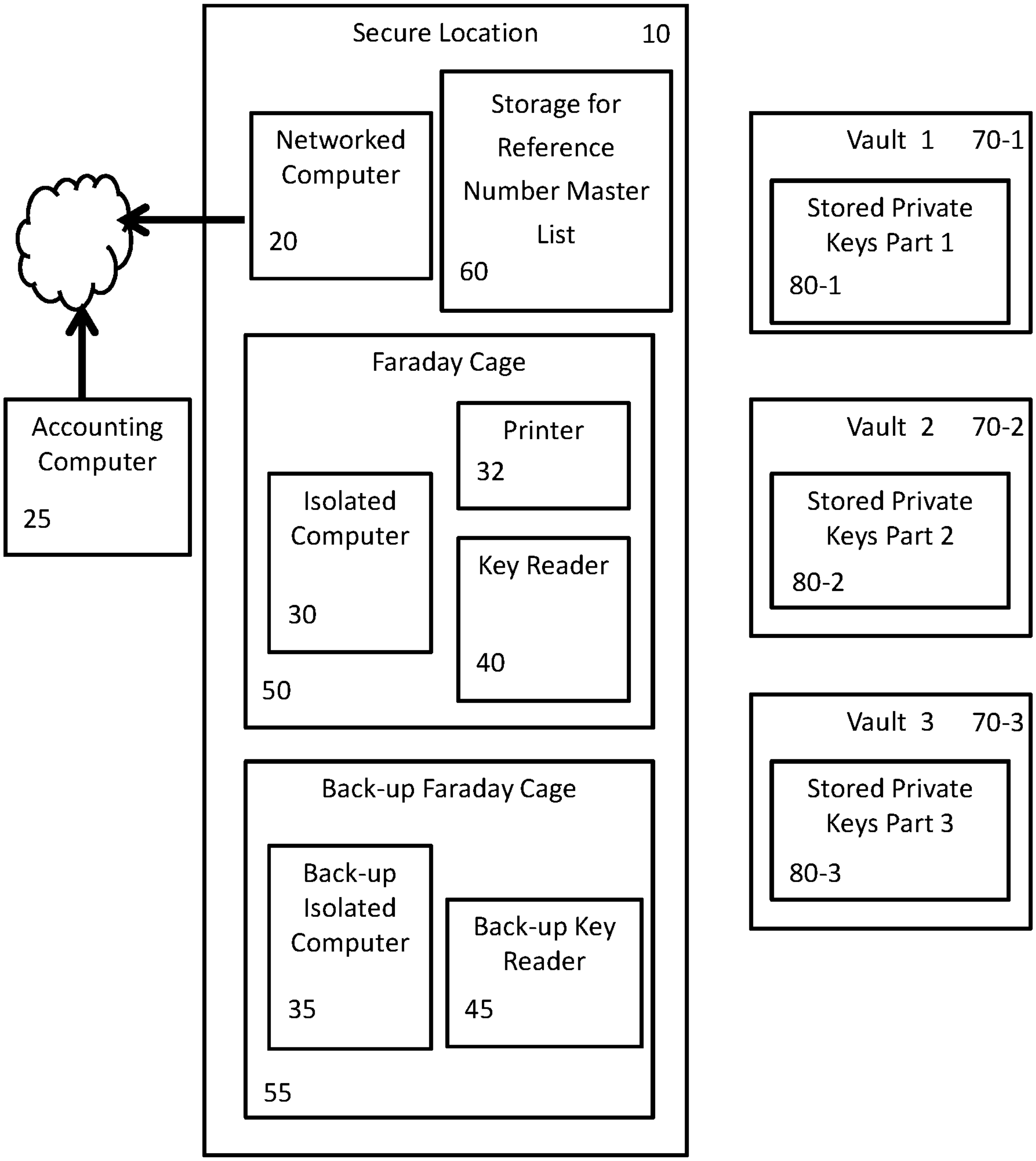
Figure 36C:
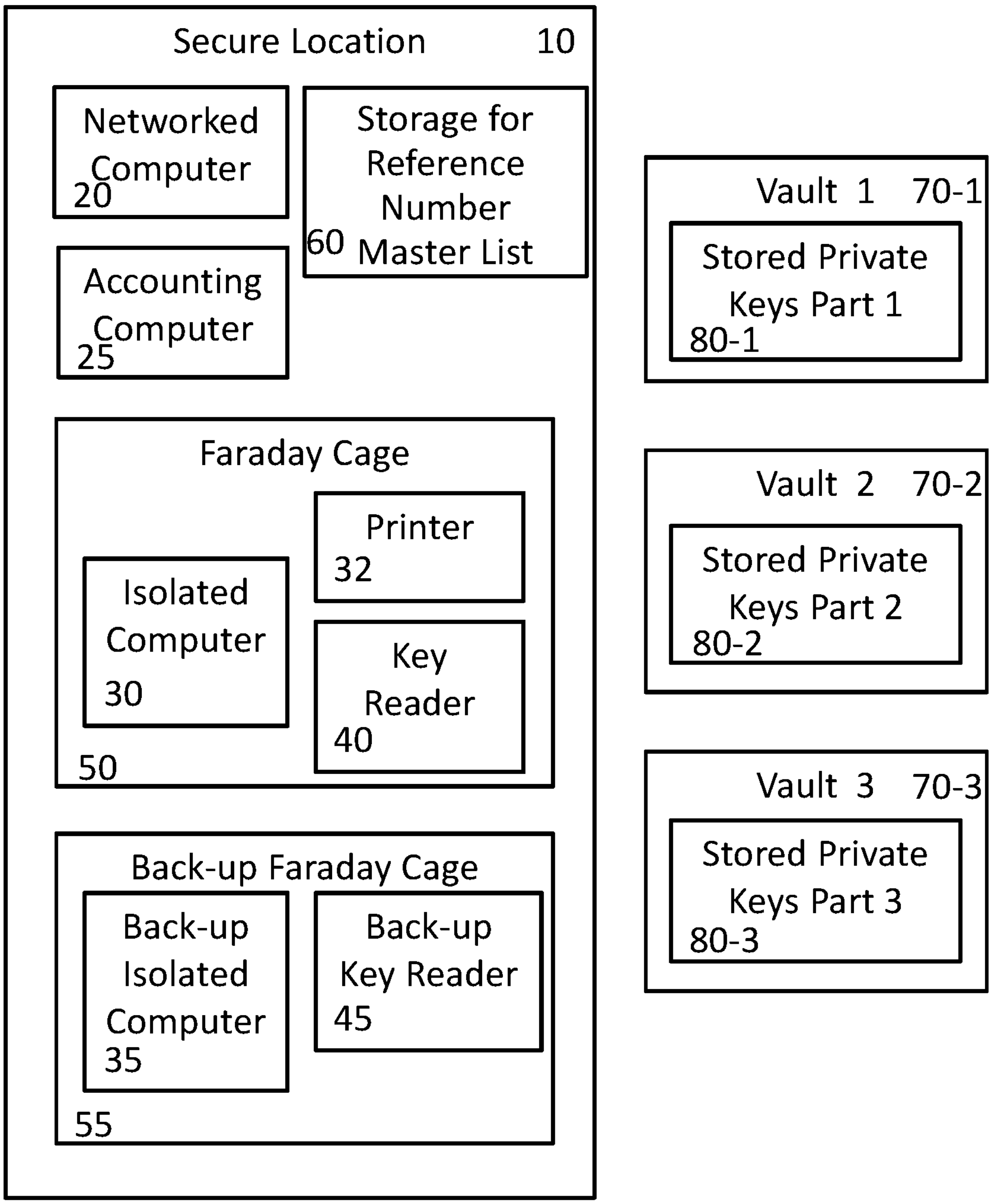

FIGS. 36B and 36C illustrate exemplary embodiments of the present invention where one or more computers 25 running accounting software to account for the assets and/or expenses of an account holder can be located either within the secure location 10 (e.g., FIG. 36B) or outside of the secure location 10 (e.g., FIG. 36C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital crypto-currency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

Figure 28C:
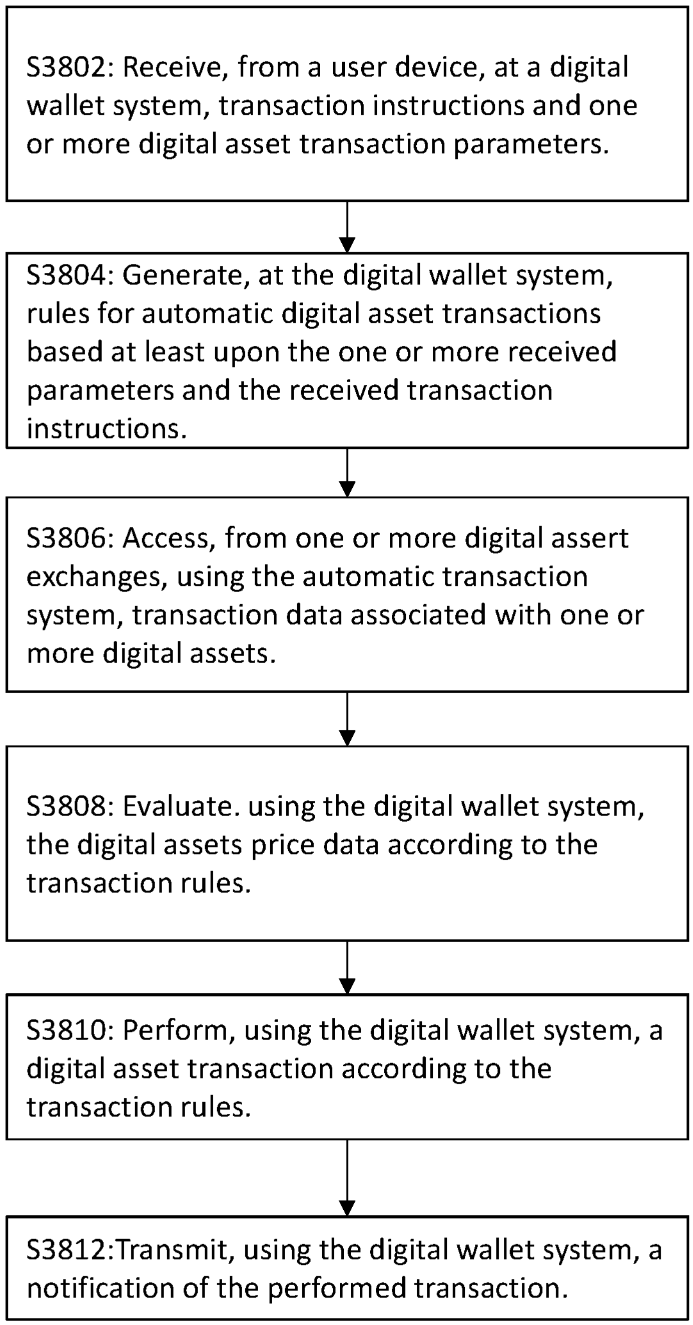
FIG. 28C is an exemplary flow chart for a process for converting from, to or between digital assets in accordance with exemplary embodiments of the present invention.
Figures 1, 29:
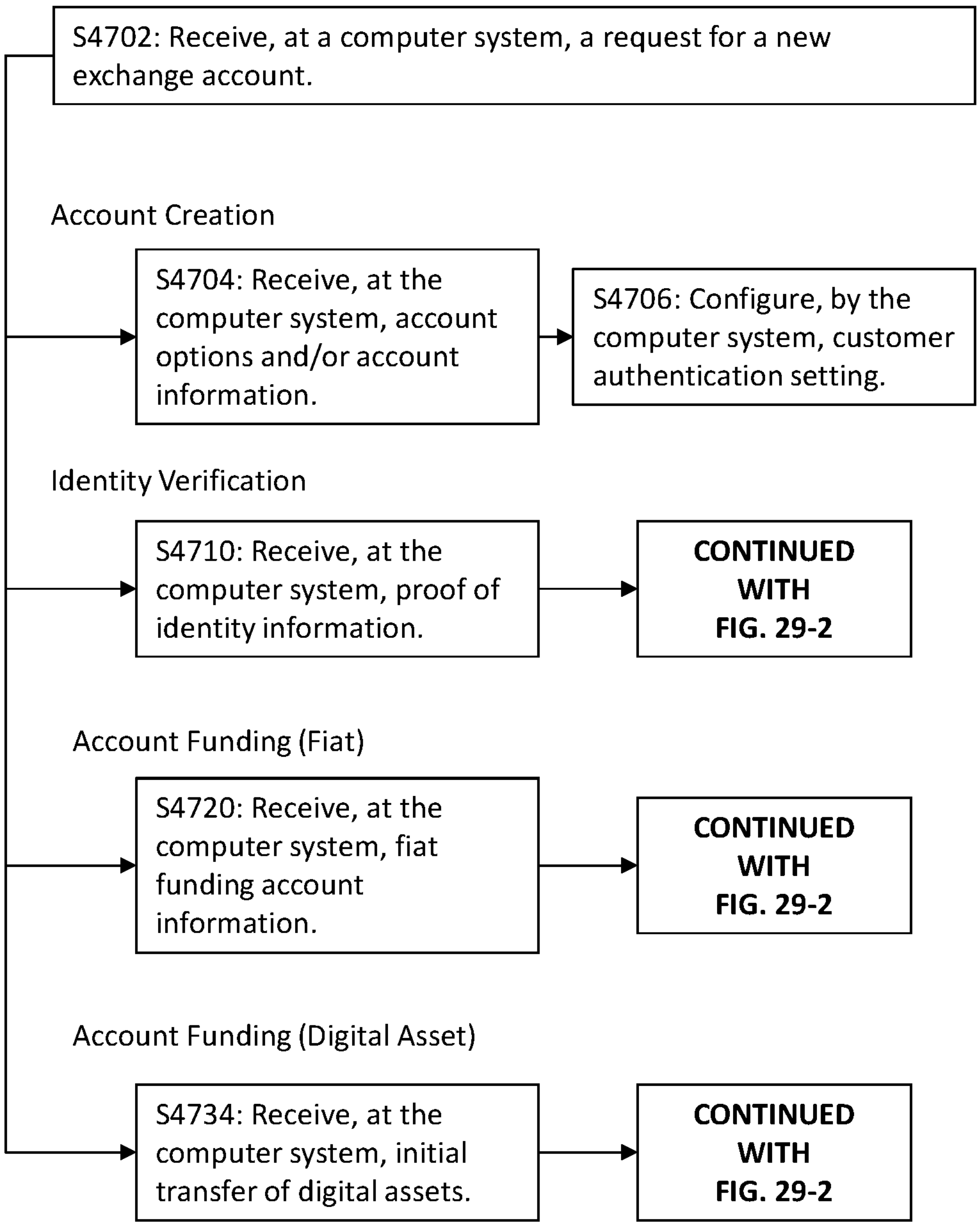
Figures 2, 29:
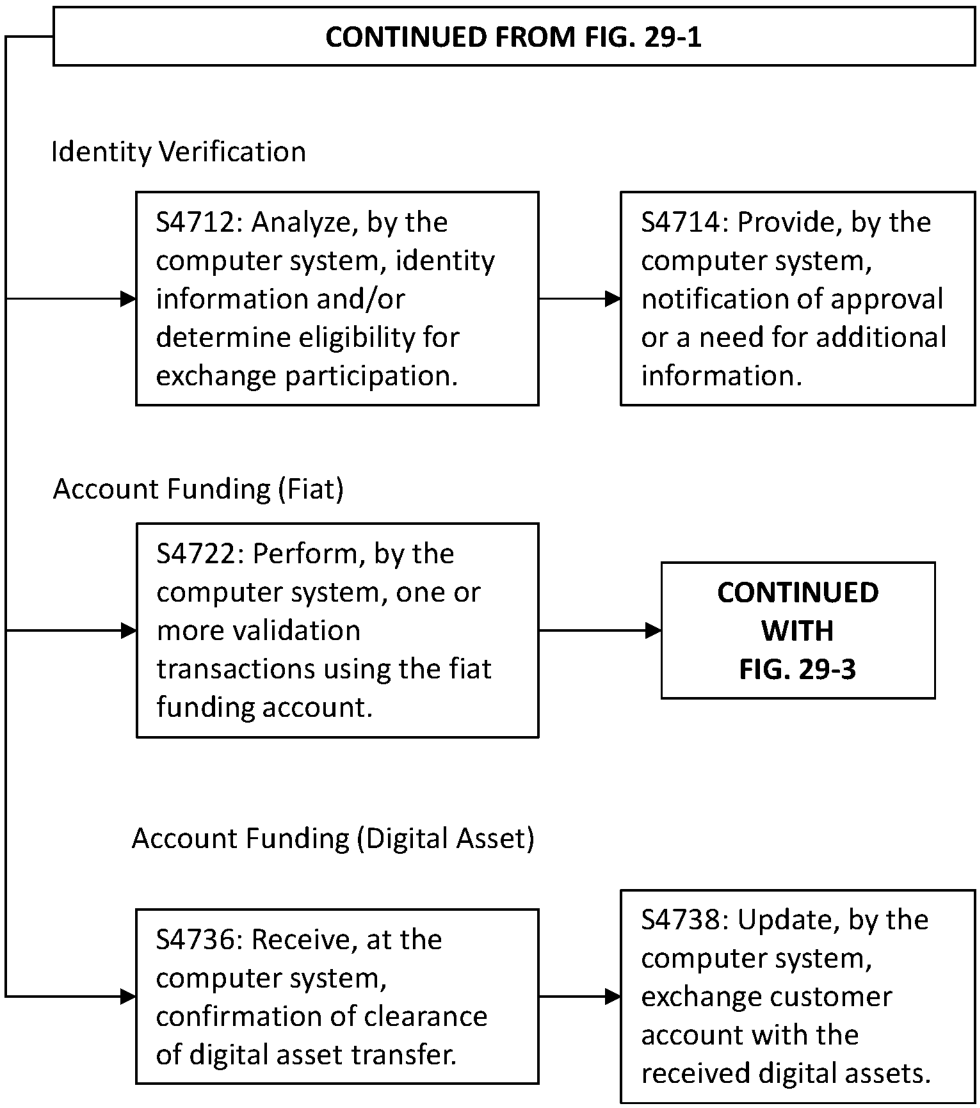
Figures 3, 29:
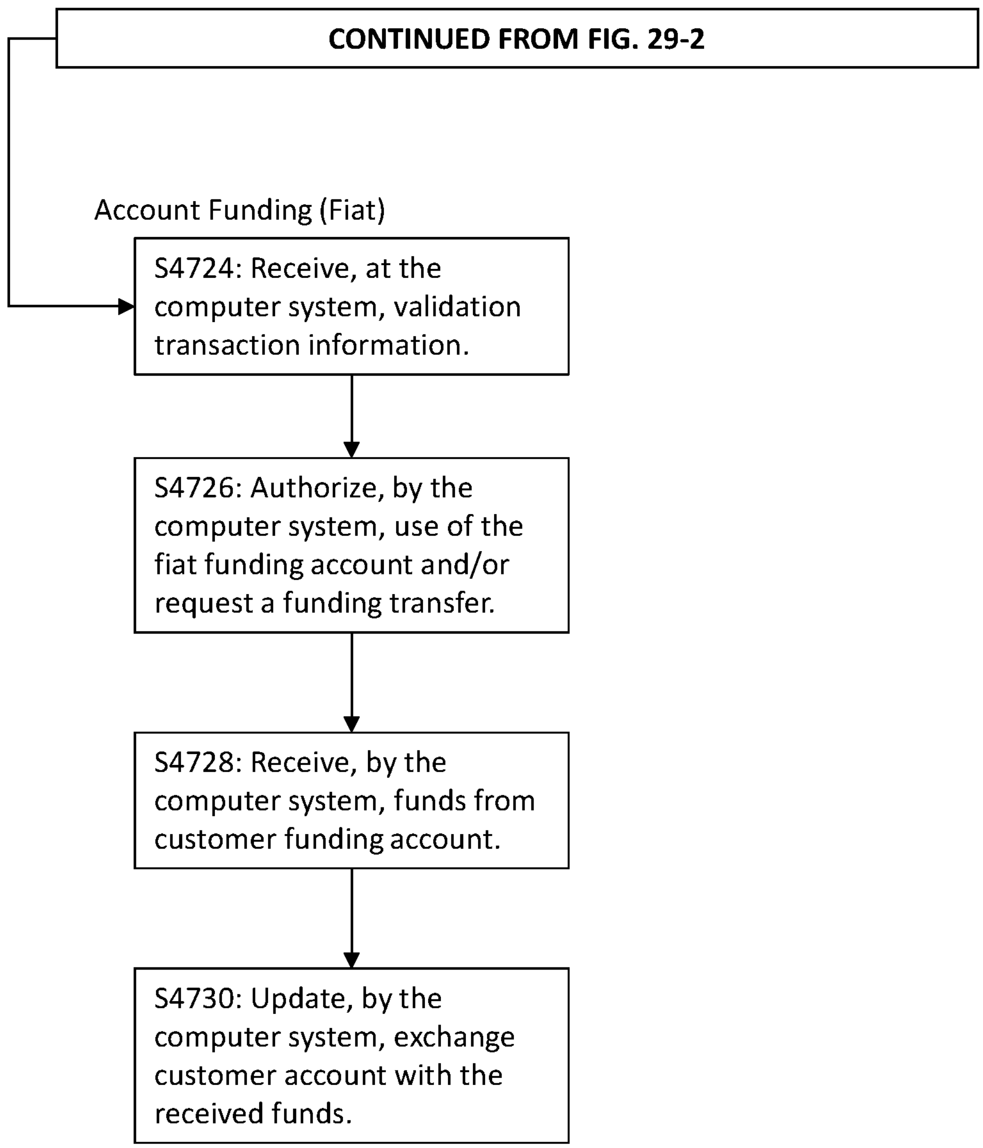

The digital asset exchange computer system 3230 may be used to convert digital assets into fiat or other digital assets as well as to exchange fiat for digital assets. In embodiments, a digital asset exchange computer system 3230 may include one or more databases that are used to store user account authentication data, fiat account data, digital wallet data, digital asset customer account data and transaction data, including transaction parameters and transaction instructions. A digital wallet system is operatively connected to a decentralized digital asset network that uses a decentralized electronic ledger in the form of a blockchain maintained by a plurality of physically remote computer systems to track at least one of asset ownership or transactions in a digital asset exchange system. The digital wallet system includes one or more digital wallet modules. FIG. 28C illustrates an exemplary process by which the digital exchange computer system including the digital wallet system conducts transactions. The digital wallet system receives, from a user device, transaction instructions and one or more transaction parameters associated with a transaction as indicated in step S3802. In embodiments, the transactions parameters include on or more of (1) a digital asset strike price as a threshold for sale of a specified amount of digital assets when the price equals, rises above or falls below a predefined threshold, wherein the amount of digital assets to transact may be specified in a different denomination; (2) digital asset denominations; (3) digital asset amounts; (4) time periods; (5) rates of change; or (6) absolute amounts of change. The transaction instructions include at least one of the following (1) buy; (2) sell; (3) hold; or (4) convert to a different denomination of digital asset or fiat currency.

In embodiments, the digital wallet system generates transaction rules for automatic digital asset transactions based at least the one or more received transaction parameters and the received transaction instructions as indicated at step S3804. The transaction rules include computer code running on the one or more computers to perform a transaction when one or more specified conditions are met or not met, based on the rules.

In embodiments, the digital wallet system accesses transaction data including price data associated with the specified amount of digital assets and stores the transaction data in the one or more databases as indicated in step S3806. In an embodiment the digital wallet system may access the transaction data using an application programming interface of an exchange agent. At step S3808, the digital wallet system evaluates the price data according to the transaction rules and, at step S3810, performs automated transactions when pre-defined conditions are met or not met in accordance with the transaction rules and the price data. This evaluation may include testing the transaction data against one or more logical conditions embodied in the transaction rules. In embodiments, these logical conditions include determining at least one of whether the digital asset price has reached or crossed a threshold value; or whether a rate of change in price has reached or crossed a threshold value. The digital wallet system may format the transaction data to be compatible with the digital wallet system.

In embodiments, at step S3812, the digital wallet system may generate one or more notifications to one or more user devices, with the notices includes at least one of a status update on transactions; notification of at least one of incomplete, pending or failed transactions; a log of all transactions as performed by at least one of the digital wallet system or by a user and a log of all transaction opportunities, including transactions declined or not otherwise authorized and transmits the one or more notifications to the user devices.

The digital asset exchange computer system also includes a fund transfer system including a fiat account funding and redemption system, a digital asset account funding and redemption system operatively connected to the digital wallet system and operatively connected to the decentralized digital asset network and a settlement engine operatively connected to the decentralized digital asset network and configured to carry out transactions. The settlement engine may be configured to process specified customer transactions to purchase or sell digital assets according to a user's instructions, if certain user specified factors are met. The user specified factors include that at least one of digital assets are: (a) within a given price, (b) quantity, or (c) period of time. In embodiments, the settlement engine may perform steps of holding, by the digital asset exchange computer system, funds in escrow until a buyer's payment of fiat is received into a bank account; receiving, by the digital asset exchange computer system from a digital asset buyer device, a notification of received digital assets from a digital asset seller; and providing, by the digital asset exchange computer system to a bank computer system associated with a digital asset exchange bank, n instruction to release the digital asset buyer's funds to the digital asset seller. The settlement engine may include pre-program instructions to transfer an amount of digital assets from a seller wallet to at least one buyer wallet upon the occurrence of user specified conditions.

In embodiments, the transaction may be at least one of formation, buying and selling of derivative products, including call options and put options. In embodiments, the transaction may be at least one or more of digital asset lending, delayed settlements, derivative swaps, futures and forwards.

In embodiments, the digital asset account funding and redemption system is configured to process funding of a digital asset account held by the exchange from an exchange customer by receiving, by the digital asset exchange computer system, an initial transfer of digital assets; receiving, by the digital asset exchange computer system, a confirmation of clearance of the digital asset transfer; and updating, by the digital asset exchange computer system, an existing customer account in the one more or more databases with the received digital assets including making an electronic entry in an exchange digital asset electronic ledger and providing a notification that digital assets are received.

In embodiments, the digital asset account funding and redemption system is configured to process withdrawing a digital asset account held by the exchange from an exchange customer. For example, the digital asset account funding and redemption system may provide a withdrawal interface to a first customer user device associated with a first customer, receive user first withdrawal data including at least a first destination wallet address and a first request digital wallet asset withdrawal amount value from the first customer user device, verify that the first digital asset account associated with the first customer contains sufficient digital assets to cover the requested withdrawal amount by reading a digital asset electronic ledger to determine a first digital asset account balance; update the exchange digital asset electronic ledger to reflect the first withdrawal data as pending, execute a first withdrawal based on the first withdrawal data by broadcasting the first withdrawal to a digital asset network electronic ledger, monitor the network digital asset ledger to determine that a transaction based on the first withdrawal is confirmed and update the digital asset ledger to reflect confirmation of the first withdrawal. In embodiments, the digital wallet system may request authority from a user to proceed with the automated transactions before executing the automated transactions. In embodiments, the digital wallet system may require receipt of a user's authorization before performing a transaction by at least one of telephone dialing a number and entering specified digits, text message, email, or via a computer application or a user's mobile wallet. In embodiments, the digital wallet system will automatically perform the transaction if no response is received within a predetermined amount of time set by a user in advance or by default.

The digital asset exchange computer system may also include a fraud analysis system configured to detect fraudulent and/or unauthorized transactions.

In embodiments, the digital math-based asset is bitcoin. In embodiments, the digital math-based asset is based on a mathematical protocol for proof of work. The mathematical protocol may be open source. In embodiments, the mathematical protocol includes a one-way cryptographic algorithm. In embodiments, the mathematical protocol includes a sequential hard memory function. The digital math-based asset may be based on a mathematical protocol for proof of stake and is open source. In embodiments, the digital math-based asset is based on a cryptographic mathematical protocol. The digital math-based asset may be based on a mathematical protocol for a hybrid of proof of work and proof of stake. The digital math-based asset may be based on a mathematical protocol for proof of stake velocity. The mathematical protocol may rely upon ownership of respective digital math-based asset as a function of duration of ownership. The digital math-based asset may be based on a mathematical protocol for proof of burn.

In embodiments, a number of digital math-based assets in the decentralized digital assert network is limited. In embodiments, a number of digital math-based assets in the decentralized digital assert network is not limited. A specified number of digital math-based assets in the decentralized digital asset network may be added into circulation during a defined time period.

In embodiments, the digital wallet is activated by a private key, which is mathematically related to a public address in a one-way function. In embodiments, the digital wallet includes a multi-signature account which requires a plurality of private keys to access the digital assets held by the multi-signature account. In embodiments, more keys are generated for the multi-signature account than are required to access and/or use an account.

Figure 36D:
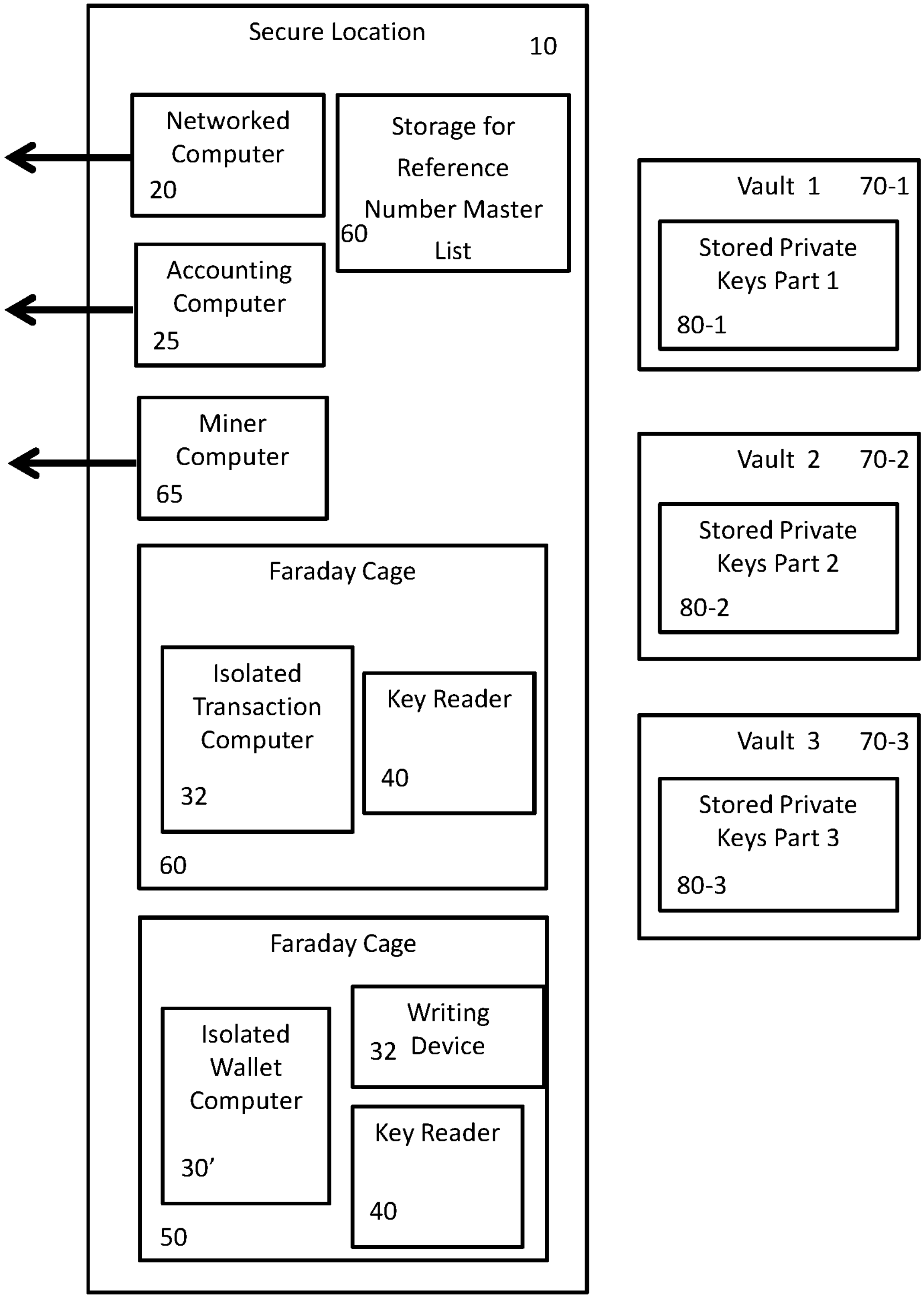

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of exchange withdrawals, deposits, exchange transactions (e.g., purchases and sales), purchase order receipts, and/or sell order receipts, to name a few) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 36D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer. "Air gap, air wall or air gapping" is a network security measure employed on one or more computers to ensure that a secure computer network is physically isolated from unsecured networks, such as the public Internet or an unsecured local area network. The name arises from the technique of creating a network that is physically separated (with a conceptual air gap) from all other networks. To prevent unauthorized data extrusion through electromagnetic or electronic exploits, there is often a specified amount of space between the air gapped system and outside walls and between its wires and the wires for other technical equipment. For a system with extremely sensitive data (such as a private key of a digital asset account), as explained previously, a Faraday cage can be used to prevent electromagnetic radiation (EMR) escaping from the air-gapped equipment.

Figure 5A:
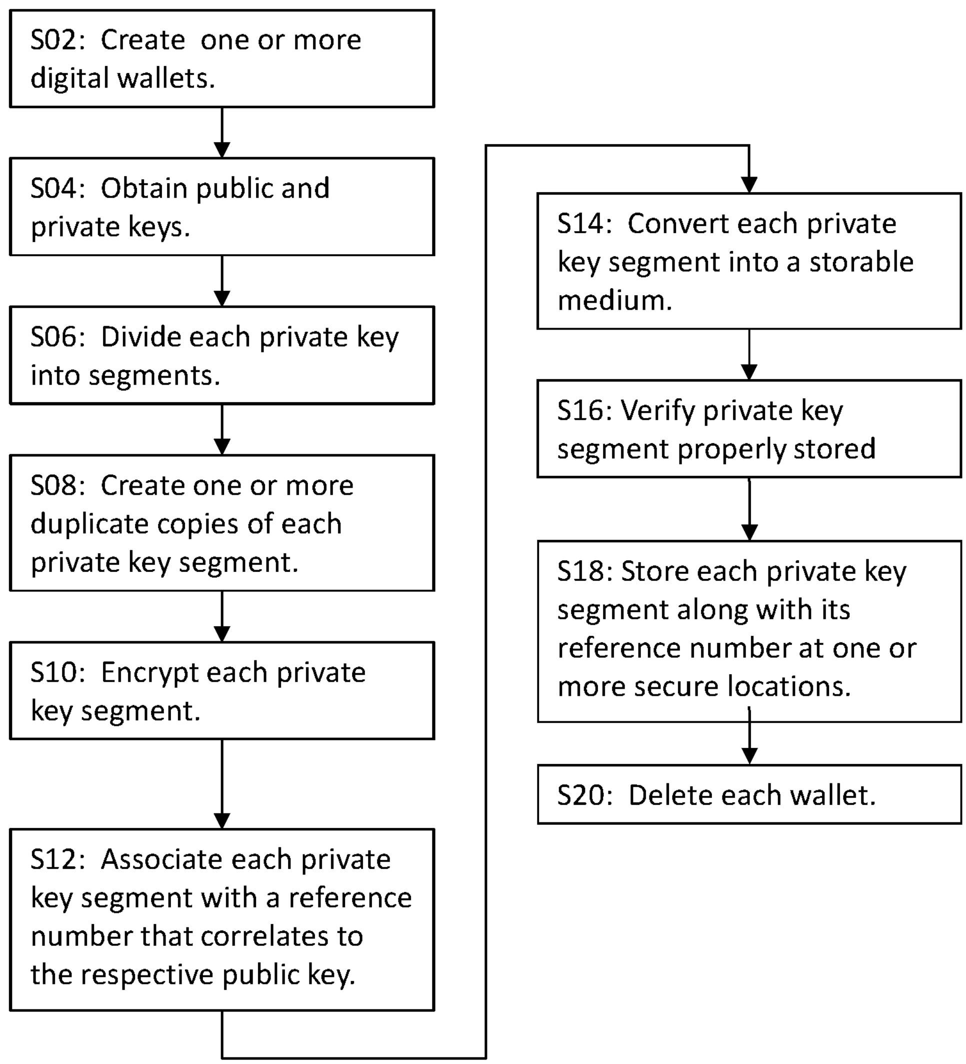
FIGS. 5A and 5B are flow charts of exemplary processes for creating and securing digital wallets in accordance with exemplary embodiments of the present invention.
Figure 5B:
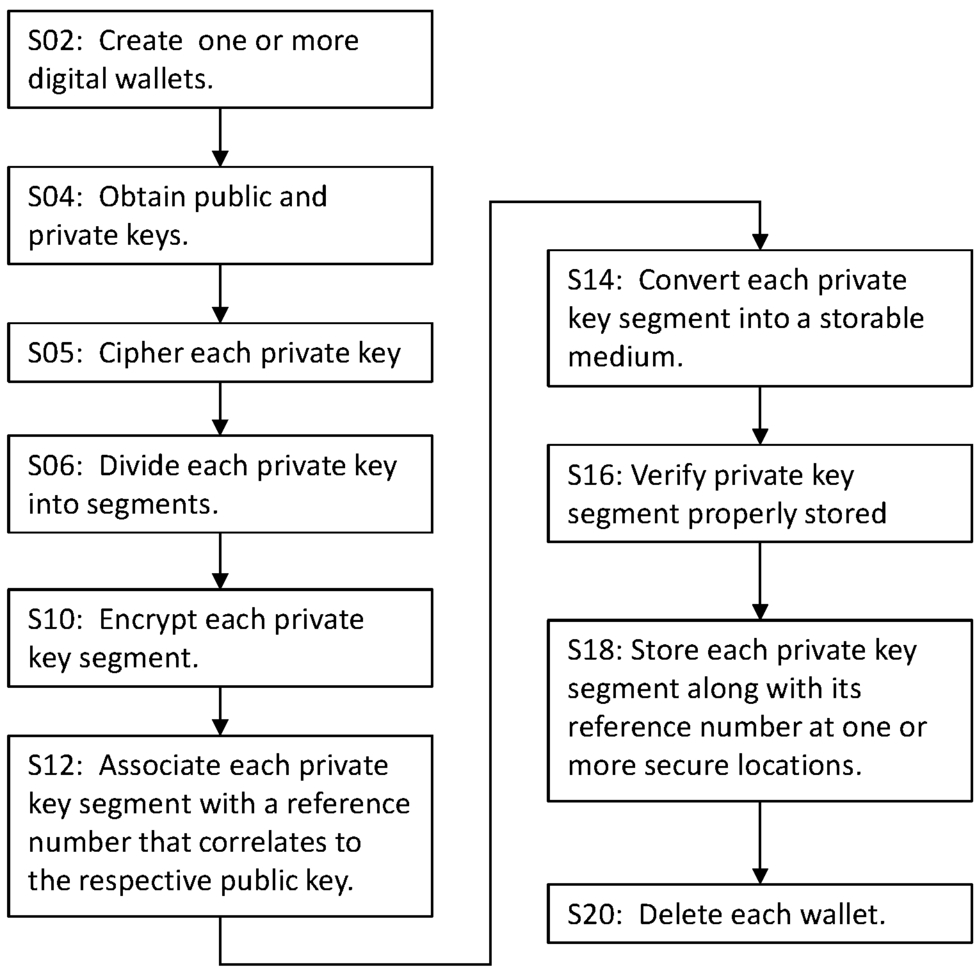

FIG. 5A illustrates an exemplary embodiment of a process for creating digital wallets and storing their keys. In a step S02 one or more digital wallets may be created using one or more isolated wallet computers 30'. In a step S04, the public and private keys associated with the created digital wallets may be obtained using one or more isolated wallet computers 30'. In embodiments, referring to FIG. 5B, in a step S05 each private key may be ciphered. In a step S06, each private key, which may be a ciphered private key following step S05, may be divided into segments. In a step S08, one or more duplicate copies of each private key segment may be created. In some embodiments, the private key may be divided into 2, 3, 4 or more segments. In embodiments, each private key segment may be encrypted or otherwise encoded in a step S10. In embodiments, steps S08 and/or S10 may be skipped. In a step S12, each private key segment may be associated with a reference number, correlating the private key segment to the respective public key and/or indicating the order of the private key segment within the complete key. In a step S14, each encrypted private key segment may be converted to a storable medium, such as by printing each private key segment on paper. In a step S16, the private key segment as converted in the storable medium (e.g., printed) is verified to confirm it was properly and retrievable stored. In embodiments, this step may be skipped. In a step S18, each private key segment is stored along with its reference number at one or more secure locations. In a step S20, each digital wallet is deleted, leaving the stored keys as a means to regenerate the wallets.

Figure 6A:
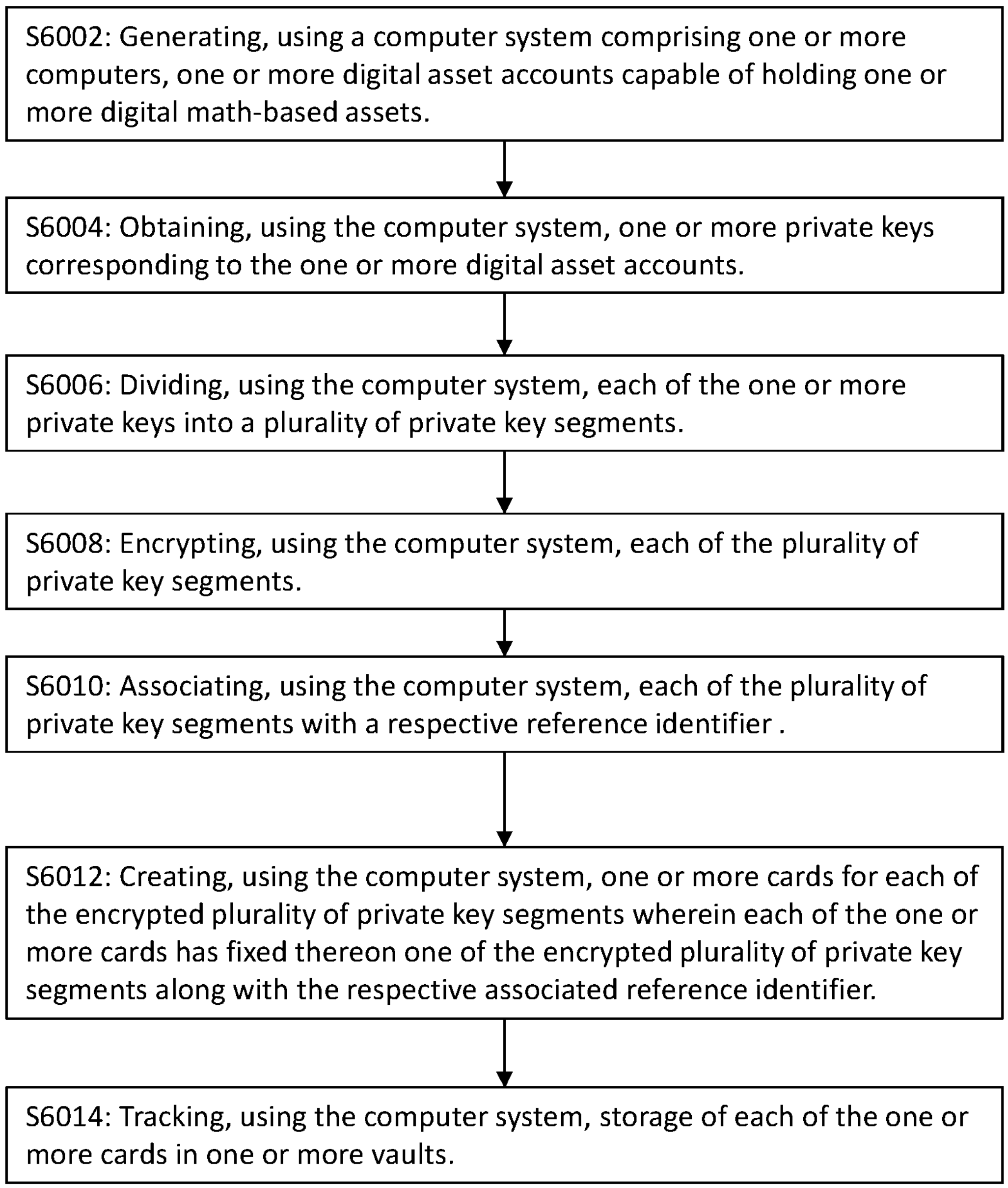

FIG. 6A is a flow chart of a process for generating digital asset accounts and securely storing the keys corresponding to each account. In embodiments, the process may be performed using one or more isolated computers not connected to any external data networks. The isolated computer may comprise a clean copy of an operating system (e.g., a clean boot) stored in computer-readable memory and running on one or more processors.

In a step S6002, a computer system comprising one or more computers may be used to generate one or more digital asset accounts capable of holding one or more digital math-based assets. In embodiments, such accounts may be associated with digital asset ownership and/or possession without physically holding a digital asset in any location. A digital asset software client, which may comprise part of a digital wallet or may be accessed using a digital wallet, may be used to generate the digital asset accounts.

In a step S6004, the computer system may be used to obtain one or more private keys corresponding to the one or more digital asset accounts. In embodiments, the private keys may be generated as part of the digital asset account creation process.

In a step S6006, the computer system may be used to divide each of the one or more private keys into a plurality of private key segments. In embodiments, such as with a multi-signature wallet, at least one private key for each digital asset account may be divided into private key segments.

In a step S6008, the one or more computers may be used to encrypt each of the plurality of private key segments. Encryption can comprise any of the techniques described herein, such as character substitution, scrambling, mapping, and/or hashing, to name a few. The computer system can apply one or more algorithms to perform the encryption. Symmetric and or asymmetric encryption algorithms may be applied.

In a step S6010, the one or more computers may be used to generate and/or associate each of the plurality of private key segments with a respective reference identifier. A reference identifier may be a number, alphanumeric sequence, or other unique sequence that can be used to identify key segments, which may be used for storage and/or retrieval of key segments. The reference identifier for each key segment may be stored on a reference identifier master list, which may be stored electronically and/or on a physical substrate. The reference identifier master list may associate with each other the reference identifiers for key segments corresponding to the same key, and/or may also associate a digital asset account identifier (e.g., a public key or public address) with the key segments.

In a step S6012, the one or more computers may be used to create one or more cards for each of the encrypted plurality of private key segments. Each card may have fixed thereon one of the encrypted plurality of private key segments along with the respective associated reference identifier. The cards may be paper, such as index cards, 8½ in.×11 in. sheets of paper, or other paper products. In other embodiments, the cards may include plastic or metal. The cards may be laminated. A writing device may fix the key segments and reference identifiers to the cards by techniques such as printing, etching, and/or magnetically encoding, to name a few. A scannable code, such as a bar code or QR code, may be used to write the keys to the cards.

In embodiments, collated sets of cards may be produced for a plurality of digital asset accounts. Each set may contain only one card per private key such that the private key segments for a single private key are divided among different sets of cards.

In embodiments, following creation of the one or more cards, quality control steps can be performed. A reading device may be used to read each of the cards to ensure readability.

In a step S6014, the one or more computers may be used to track storage of each of the one or more cards in one or more vaults. Vaults may be geographically remote. Vaults can include bank vaults and/or precious metal vaults. In embodiments, a main set of vaults and one or more sets of backup vaults may be used. A main set of vaults can be located in a geographically proximate area, such as a metropolitan area of a city, while backup sets of vaults may be located in geographically remote areas. The backup vaults may contain duplicate copies of the cards. Vault locations for each card or set of cards may be included on the reference identifier master list.

In embodiments, the process can further include receiving at the computer system a quantity of digital math-based assets and storing those digital assets in the one or more securely stored digital asset accounts. In embodiments, storing the digital asset can comprise transferring the digital assets into accounts with securely stored private keys. Accordingly, storing can comprise generating electronic transfer instructions for an electronic transfer of the quantity of digital math-based assets to the one or more digital asset accounts and broadcasting the electronic transfer instructions to a decentralized electronic ledger maintained by a plurality of physically remote computer systems.

Figure 6B:
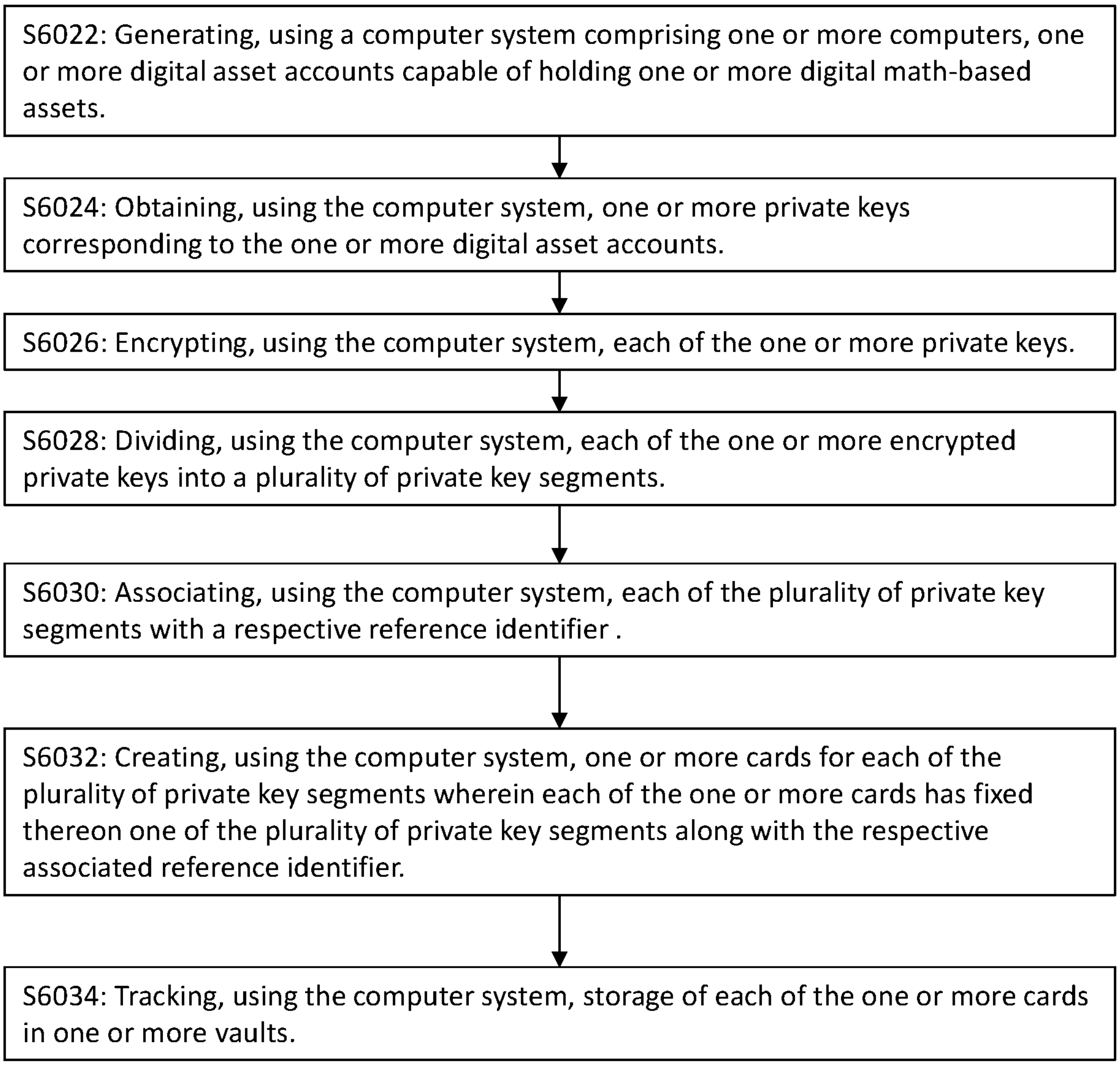

FIG. 6B is a flow chart of another exemplary process for generating digital asset accounts and securely storing the keys corresponding to each account.

In a step S6022, a computer system comprising one or more computers may be used to generate one or more digital asset accounts capable of holding one or more digital math-based assets, as described with respect to step S6002 of FIG. 6A.

In a step S6024, the computer system may be used to obtain one or more private keys corresponding to the one or more digital asset accounts, as described with respect to step S6004 of FIG. 6A.

In a step S6026, the computer system may be used to encrypt each of the one or more private keys.

After encryption, in a step S6028, the computer system may be used to divide each of the encrypted private keys into a plurality of key segments.

In a step S6030, the one or more computers may be used to generate and/or associate each of the plurality of private key segments with a respective reference identifier.

In a step S6032, the one or more computers may be used to create one or more cards for each of the plurality of private key segments.

In a step S6034, the one or more computers may be used to track storage of each of the one or more cards in one or more vaults.

Figure 6C:
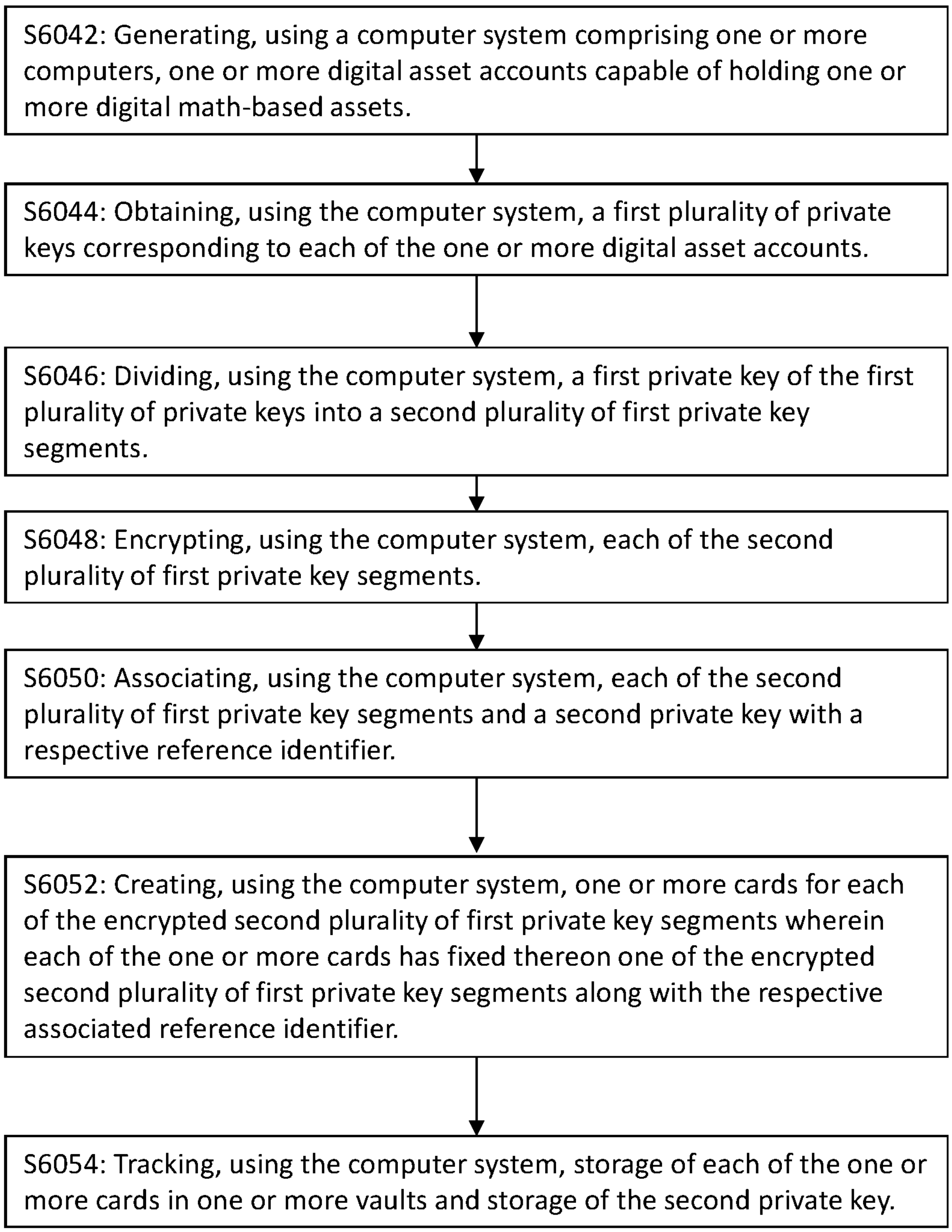

FIG. 6C is a flow chart of another exemplary process for generating digital asset accounts and securely storing the keys corresponding to each account. The exemplary process may generate and store keys for, a multi-signature digital asset account, where at least one of the private keys is divided into a plurality of key segments.

In a step S6042, a computer system comprising one or more computers may be used to generate one or more digital asset accounts capable of holding one or more digital math-based assets.

In a step S6044, the computer system may be used to obtain a first plurality of private keys corresponding to each of the one or more digital asset accounts. Each first plurality of private keys can comprise the private keys of a multi-signature account.

In a step 6046, the computer system may be used to divide a first private key of the first plurality of private keys into a second plurality of first private key segments. For a multi-signature digital asset account at least one of the private keys may be divided into private key segments.

In a step S6048, the computer system may be used to encrypt each of the second plurality of first private key segments. In embodiments, the second key may be encrypted.

In a step S6050, the computer system may be used to generate and/or associate each of the second plurality of first private key segments with a respective reference identifier.

In a step S6052, the computer system may be used to create one or more one or more cards for each of the encrypted second plurality of first private key segments wherein each of the one or more cards has fixed thereon one of the encrypted second plurality of first private key segments along with the respective associated reference identifier. In embodiments, the second key may be written, e.g. using the writing device, to one or more physical substrates, such as paper, plastic, and/or metal. In other embodiments, the second key may be stored electronically.

In a step S6054, the computer system may be used to track storage of each of the cards in one or more vaults, as well as to track storage of the second private key. A reference identifier master list may identify the storage locations of each key and key segment.

Figures 1, 6D:
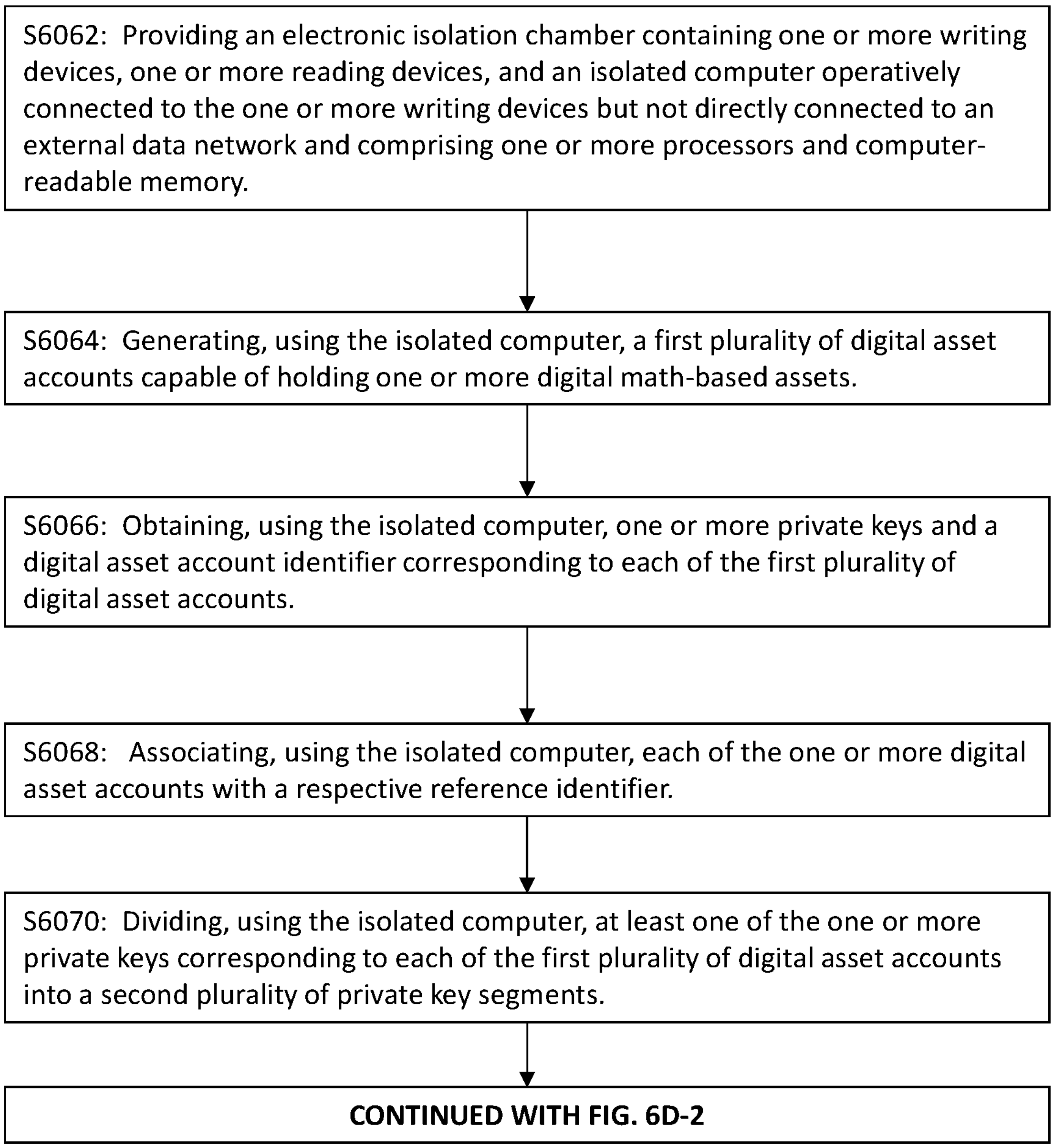
Figures 2, 6D:
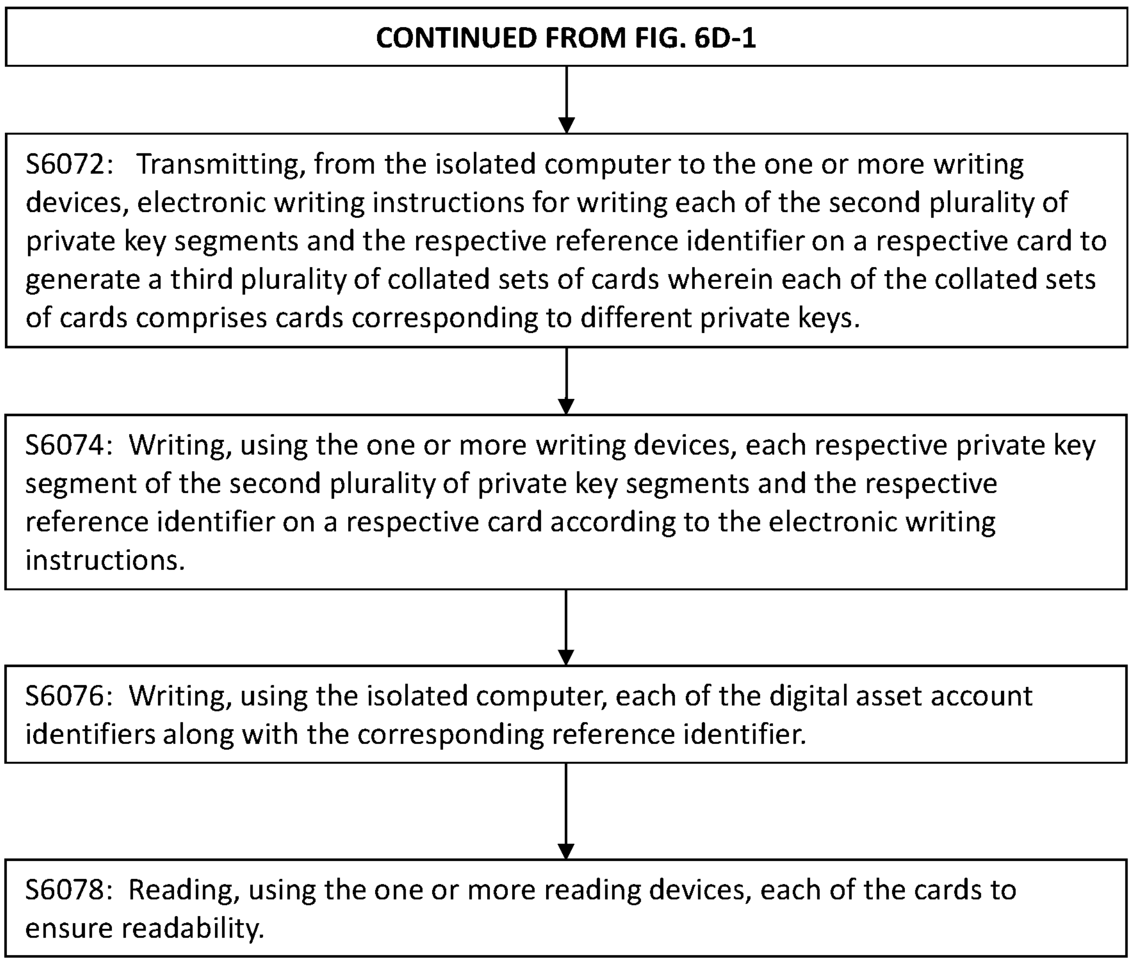

FIGS. 6D-1 and 6D-2 are flow charts of an exemplary process for securely generating digital asset accounts and storing associated keys using a secure portal.

In a step S6062, an electronic isolation chamber may be provided containing one or more writing devices (e.g., printers, engravers, magnetic card encoders, to name a few), one or more reading devices (e.g., scanners, bar code scanners, QR readers, magnetic card readers, to name a few), and an isolated computer operatively connected to the one or more writing devices but not directly connected to an external data network and comprising one or more processors and computer-readable memory.

In a step S6064, the isolated computer may be used to generate a first plurality of digital asset accounts capable of holding one or more digital math-based assets. In embodiments, the first plurality of digital asset accounts may comprise multi-signature digital asset accounts.

In a step S6066, the isolated computer may be used to obtain one or more private keys and a digital asset account identifier corresponding to each of the first plurality of digital asset accounts.

In a step S6068, the isolated computer may be used to associate each of the one or more digital asset accounts with a respective reference identifier. The reference identifier may comprise an alphanumeric sequence. In embodiments, respective reference identifiers may be associated with one or more keys or key segments corresponding to the respective digital asset accounts.

In a step S6070, the isolated computer may be used to divide at least one of the one or more private keys corresponding to each of the first plurality of digital asset accounts into a second plurality of private key segments. In embodiments, each private key segment may be required to regenerate the respective private key. In embodiments, a subset of the second plurality of private key segments (e.g., 3 of 5 keys) could be sufficient to regenerate the respective private key.

In a step S6072, the isolated computer may transmit to the one or more writing devices, electronic writing instructions for writing each of the second plurality of private key segments and the respective reference identifier on a respective card to generate a third plurality of collated sets of cards wherein each of the collated sets of cards comprises cards corresponding to different private keys. In embodiments, the third plurality of collated sets can include one or more duplicate sets for each of the collated sets of cards. In embodiments, the isolated computer may be used to generate the electronic writing instructions prior to transmitting them to the one or more writing devices.

In a step S6074, the one or more writing devices may be used to write each respective private key segment of the second plurality of private key segments and the respective reference identifier on a respective card according to the electronic writing instructions. In embodiments, step S6074 can comprise printing and/or etching each respective private key segment of the plurality of private key segments and the respective reference identifier on respective separate cards. In embodiments, each respective private key segment of the plurality of private key segments may be magnetically encoded on respective separate cards. The respective reference identifiers may be printed on the respective cards, e.g., to be readable without a magnetic card reader. Each respective private key segment of the second plurality of private key segments may be written, e.g., printed, as a scannable code, such as a bar code and/or a QR code.

In a step S6076, the isolated computer may be used to write each of the digital asset account identifiers along with the corresponding reference identifier. In embodiments, step S6076 can further comprise the steps of transmitting, from the isolated computer to the one or more writing devices, second electronic writing instructions for writing each of the digital asset account identifiers along with the corresponding reference identifier, and writing, using the one or more writing devices, each of the digital asset account identifiers along with the corresponding reference identifier according to the second writing instructions. In embodiments, writing according to the second writing instructions can comprise writing to an electronic storage medium, such as a flash drive, hard drive, and/or disc. In embodiments, the electronic storage medium could include a hardware storage module ("HSM"). In embodiments, writing according to the second writing instructions can comprise writing to a physical storage medium, such as paper.

In a step S6078, the one or more reading devices may be used to read each of the cards to ensure readability. In embodiments, step S6078 may be performed after step S6076. In embodiments, step S6078 may be performed before step S6076.

In embodiments, the process illustrated by FIG. 15D can further comprise the step of writing, using the isolated computer, the respective digital asset account identifiers to a removable electronic storage medium, e.g., for transfer to an accounting computer.

In embodiments, the process can further comprise the step of destroying the isolated computer, the one or more writing devices, and the one or more reading devices, or destroying any one of those devices.

In embodiments, the method can further comprise the step of encrypting, using the isolated computer, each of the second plurality of private key segments. In embodiments, encryption techniques can include symmetric-key encryption, asymmetric-key encryption, scrambling, substitution, hashing, or adding characters.

In embodiments, the method can further comprise the step of tracking, using the isolated computer, storage of each of the third plurality of collated sets of cards. In embodiments, each of the third plurality of collated sets of cards may be stored in a vault. In embodiments, each collated set of cards may be stored in a separate vault.

FIGS. 4B and 4C illustrate exemplary embodiments of the present invention where one or more computers 25 running accounting software to account for the assets and/or expenses of an account holder can be located either within the secure location 10 (e.g., FIG. 4B) or outside of the secure location 10 (e.g., FIG. 4C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of ETP redemptions and/or creations) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 4D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer.

FIG. 7 is a flow chart of a process for retrieving securely stored private keys in accordance with exemplary embodiments of the present invention.

In exemplary embodiments, in step S7002, a computer system comprising one or more computers may be used to determine one or more digital asset account identifiers corresponding to one or more digital asset accounts capable of holding one or more digital math-based assets.

In a step S7004, the computer system may be used to access key storage information associated with each of the one or more digital asset account identifiers. In embodiments, the key storage information may comprise a reference identifier associated with one or more stored private key segments.

In a step 7006, the computer system may be used to determine, based upon the key storage information, storage locations corresponding to each of a plurality of private key segments corresponding to each of the one or more digital asset accounts.

In a step 7008, retrieval instructions for retrieving each of the plurality of private key segments may be issued or caused to be issued.

In a step 7010, each of the plurality of private key segments may be received at the computer system.

In a step 7012, the computer system may be used to decrypt each of the plurality of private key segments.

In a step 7014, the computer system may be used to assemble each of the plurality of private key segments into one or more private keys.

In embodiments, the process depicted in FIG. 7 may further comprise the step of accessing, using the computer system, the one or more digital asset accounts associated with the one or more private keys. In further embodiments, the process depicted in FIG. 7 may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

Figure 8:
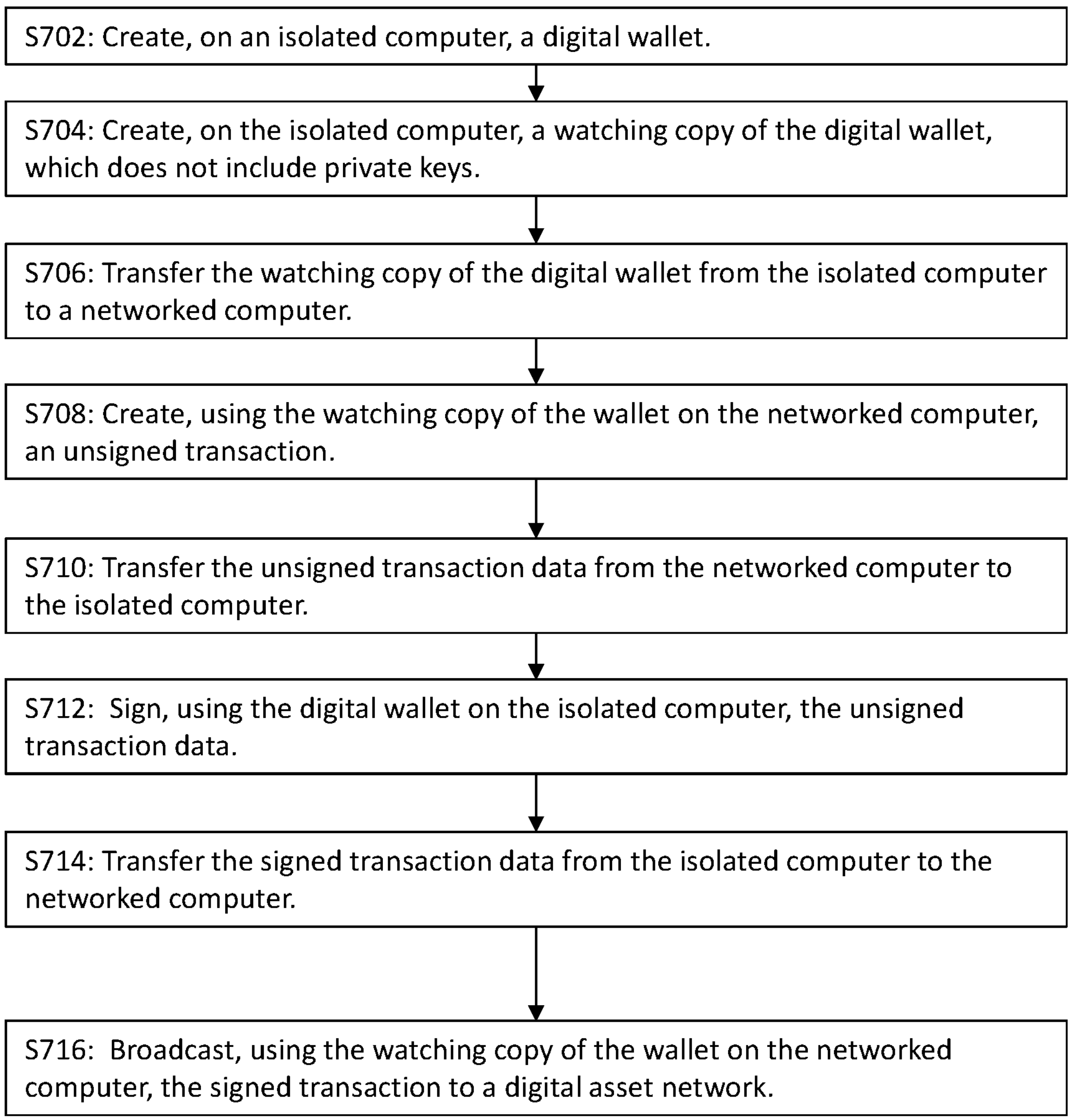
FIG. 8 is a flow chart of a method of performing a secure transaction in accordance with exemplary embodiments of the present invention.

FIG. 8 describes an exemplary method of performing secure transactions. In a step S702, a digital wallet may be created on an isolated computer. In a step S704, a watching copy of the digital wallet, which may not include any private keys, may be created on the isolated computer. In a step S706, the watching copy of the digital wallet may be transferred from the isolated computer to a networked computer. In a step S708, an unsigned transaction may be created using the watching copy of the wallet on the networked computer. In a step S710, data associated with the unsigned transaction may be transferred from the networked computer to the isolated computer. In a step S712, the unsigned transaction data may be signed using the digital wallet on the isolated computer. In a step S714, the signed transaction data may be transferred from the isolated computer to the networked computer. In a step S716, the signed transaction data may be broadcast, using the watching copy of the wallet on the networked computer, to a digital asset network. In embodiments, the broadcast of a signed transaction may complete a transaction and/or initiate a verification process that may be performed by the network.

In embodiments, processes for generating digital asset accounts and/or storing associated keys may be performed by a secure system, e.g., an administrative portal. The system can comprise an electronic isolation chamber, such as a Faraday cage. The system can further comprise one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier. The system can further comprise one or more writing devices located within the electronic isolation chamber and configured to perform the electronic writing instructions, including collating the plurality of cards into the plurality of sets. The system can also comprise one or more reading devices located within the electronic isolation chamber and configured to read the plurality of private key segments along with the respective associated reference identifier from the one or more cards. The reading devices may be used for quality control, to ensure that the cards are readable.

Cold Storage

In embodiments, a digital asset account holder may operate one or more computers to manage, process, and/or store the transactions and/or digital assets. In embodiments, a portion, consisting of some or all, of the digital assets may be stored in cold storage, which involves no outside connections. Cold storage may be a bank vault, a precious metal vault, a lockbox, or some other secure room or area. There may be no communication channels connecting to the cold storage area. In embodiments, electronic vaults may be used. Electronic vaults may comprise cloud storage, one or more hard drives, flash drives, memory cards or like storage technology, to name a few. Electronic vaults may hold one or more keys and/or key segments, which may be encrypted and/or encoded as described herein.

In embodiments, the cold storage may comprise a divided storage system. In a divided storage system, components or portions of components may be stored at multiple locations. Components may be at least digital wallets, public and/or private keys, or assets.

Figure 9A:
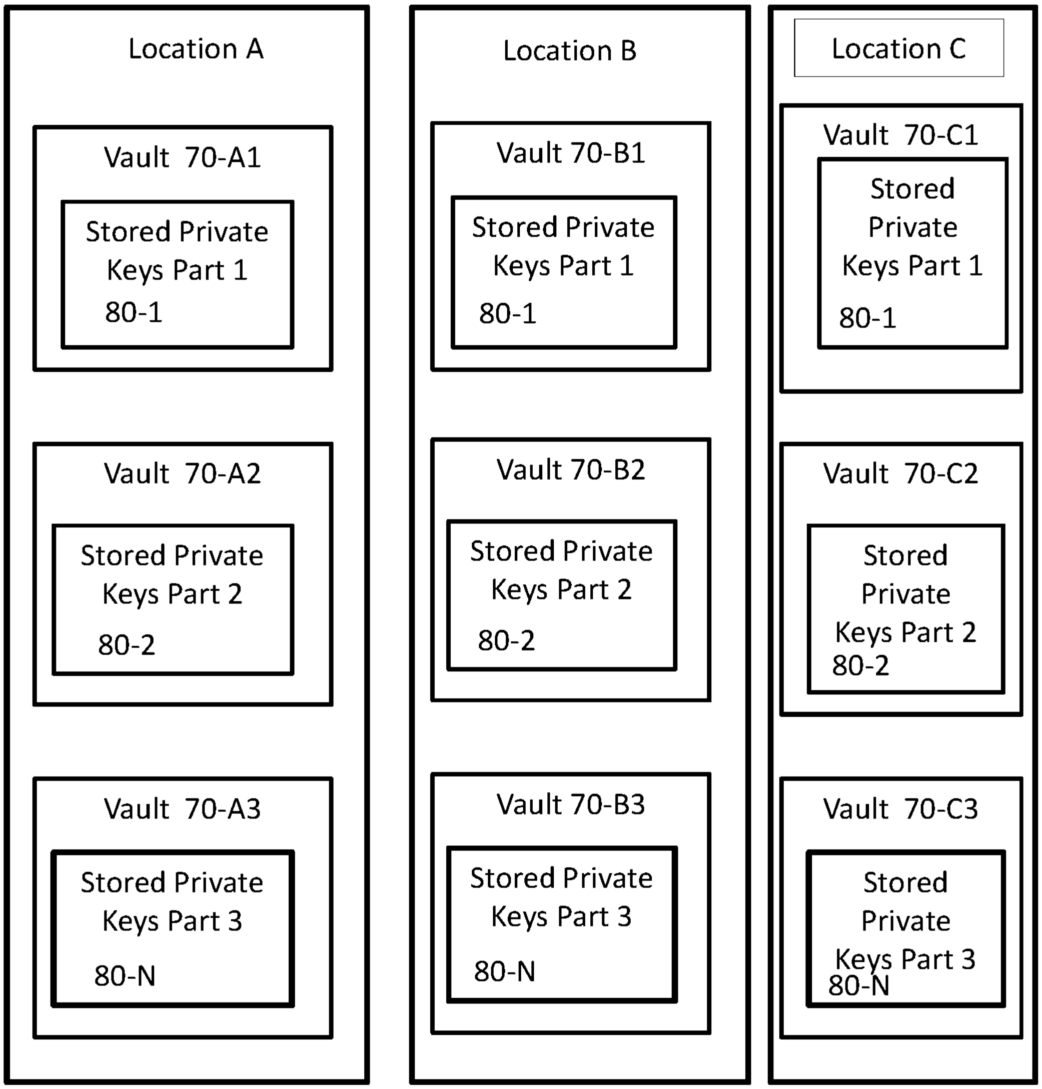
FIGS. 9A-9D are schematic diagrams of cold storage vault systems in accordance with exemplary embodiments of the present invention.

FIG. 9A is a schematic diagram of a cold storage vault system in accordance with exemplary embodiments of the present invention. In embodiments, each private key to be stored in vaults 70 for cold storage may be divided into one or more segments 80. In embodiments, each segment can be stored in a separate vault 70. In this manner, the risk of each of the segments 80 being reassembled into a complete key may be reduced due to the segregation of each piece of each key. Each vault may then be located at different locations, e.g., Locations A, B, and C. In embodiments, each vault (e.g., 70-Aa, 70-A2, 70-A3) may be located at different locations in the same general vicinity (e.g., the general vicinity of Location A, which may be New York City). Each vault may have a user entry log to provide a record of access to the vault and/or may employ security measures to ensure only authorized access.

Duplicate sets of the segmented private keys may then be made and stored in separate vaults (e.g., one duplicate copy divided between Vaults 70-B1, 70-B2, and 70-B3, and another duplicate copy divide between Vaults 70-C1, 70-C2, and 70-C3). Each set of segmented keys 80 may be located in the same general vicinity (e.g., Location B for Vaults 70-B1, 70-B2, and 70-B3 and Location C for Vaults 70-C1, 70-C2, and 70-C3), with each general vicinity being different from other general vicinities (e.g., Location B may be Philadelphia and Location C may be Indianapolis, Indiana). Locations may include domestic and/or international locations. Locations can be selected based on at least one or more of the following parameters: ease of access, level of security, diversity of geographic risk, diversity of security/terror risk, diversity of available security measures, location of suitable vaults in existence (e.g., custodian vaults for a trust associated with an ETP), space available at vaults, jurisdictional concerns, to name a few. In embodiments, three geographic locations can be used wherein Location A is within a short intraday time of transit (e.g., 1 hour), Location B is within a longer intraday time of transit (e.g., 3-4 hours), and Location C is within one or more day times of transit (e.g., 1-2 days). In embodiments, the location of the vaults may be within a distance that allows segments of key pairs to be retrieved within a redemption waiting period (e.g., 3 days). A complete key set (e.g., stored private keys parts 1-3) may be stored in each vault general location (e.g., Location A, Location B, Location C).

Figure 9B:
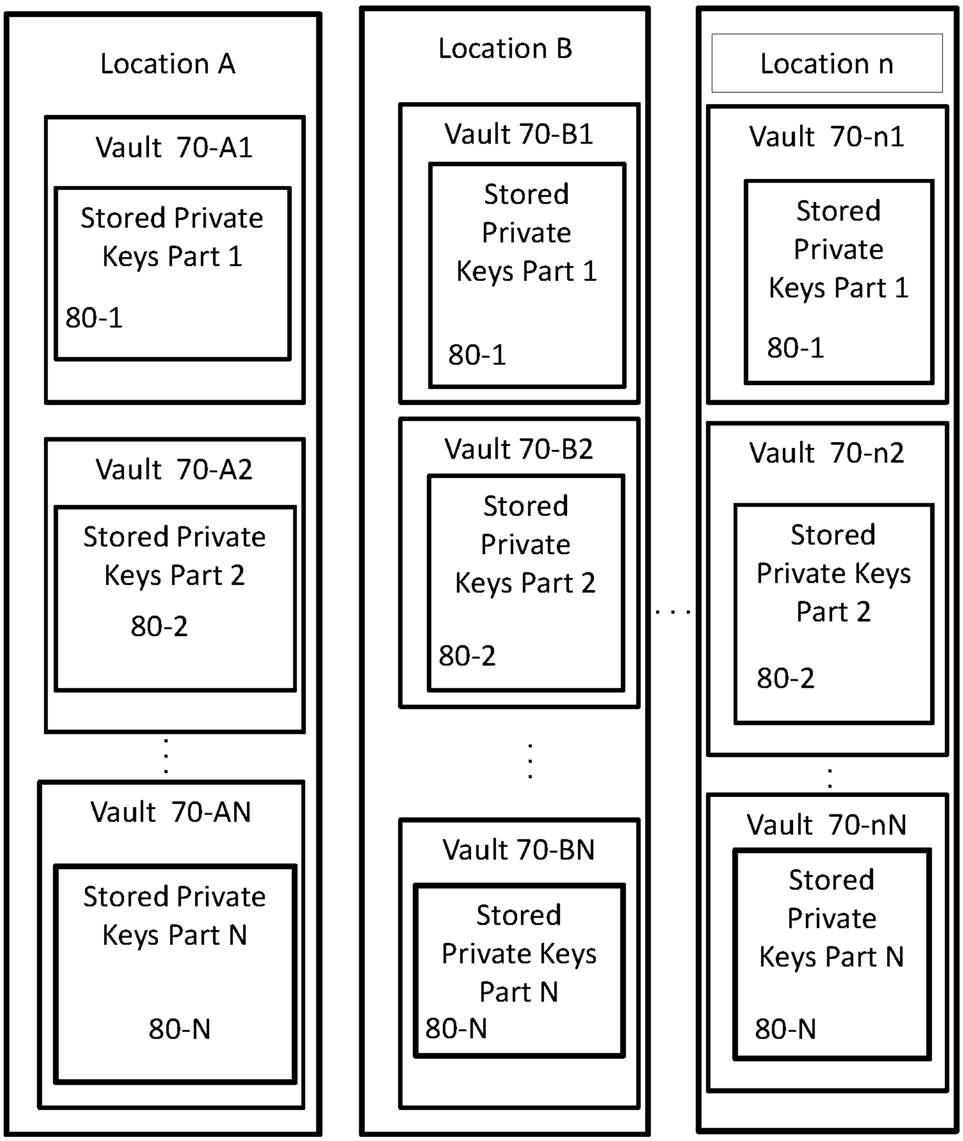

In FIG. 9A, three segments have been used, but other numbers of segments can also be used consistent with embodiments of the present inventions. FIG. 9B illustrates that any number of vault general locations (e.g., A-N) may be used, which may entail n number of complete key sets. In embodiments, the keys may be broken into any number of key segments, 1-N. In embodiments, in order to reassemble one complete key, all N segments may have to be reassembled together.

Figure 9C:
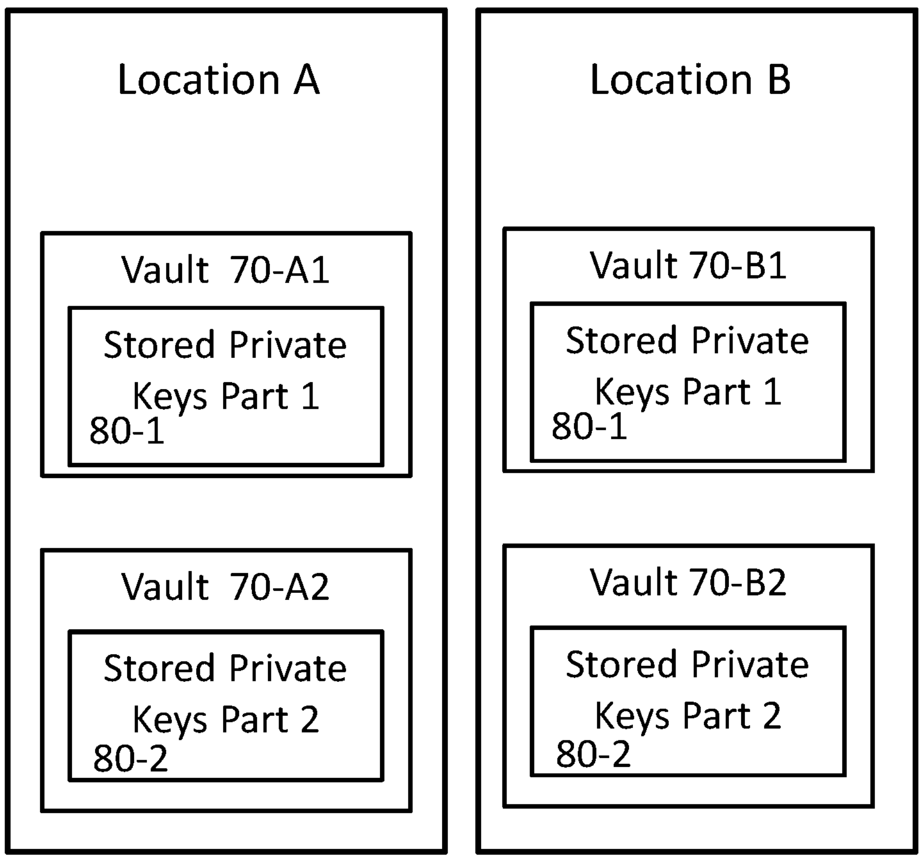

In embodiments, there may be two sets of segmented keys, as illustrated in FIG. 9C, which may be located in two general locations (e.g., A and B). In embodiments, the keys may be parsed into two segments (e.g., 80-1 and 80-2), as illustrated in FIG. 9C.

Figure 9D:
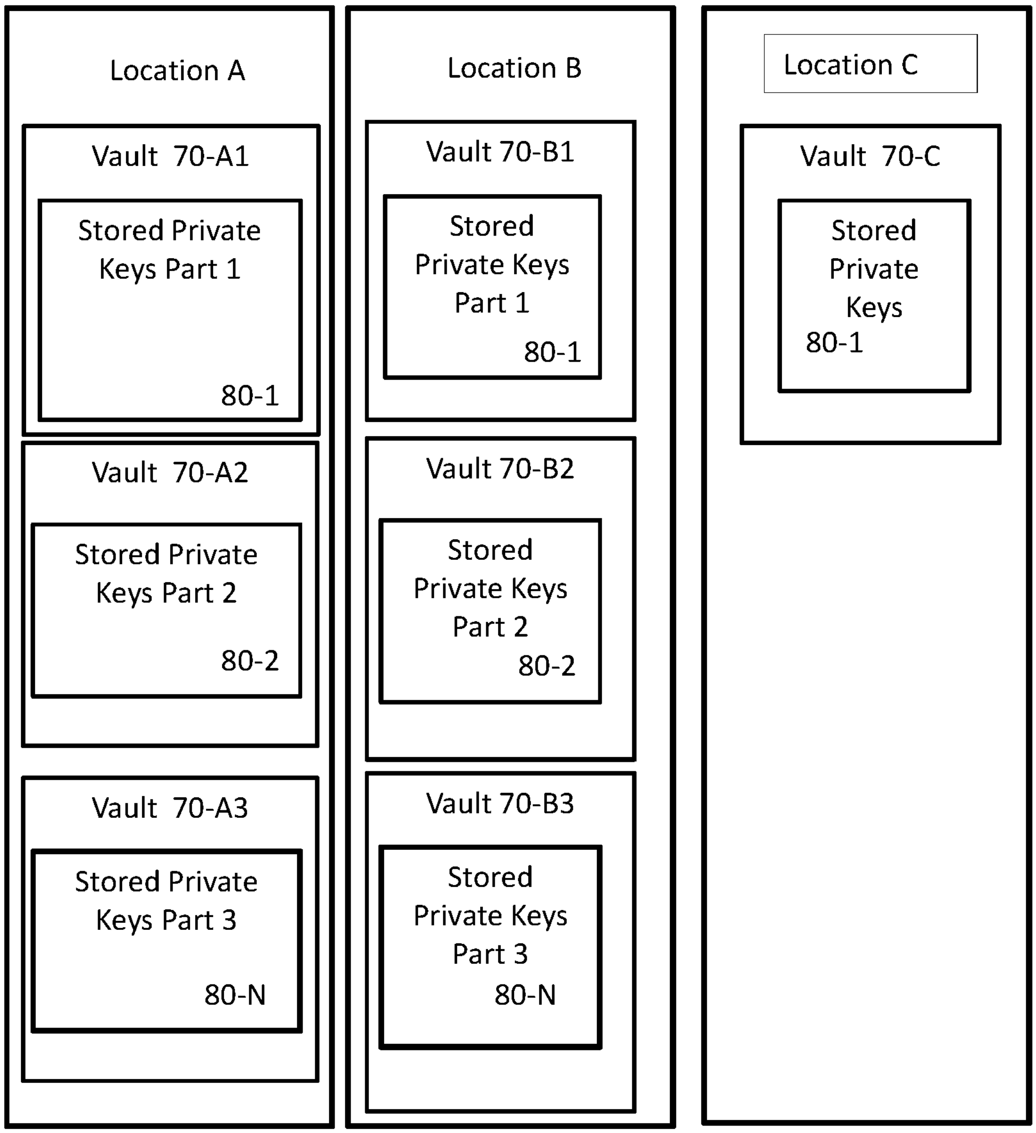

In embodiments, duplicate sets may not be embodied in same form as the original set and/or other duplicate sets. For example, two sets may be stored on paper, and a third set is stored on papyrus. In embodiments, at least one set of segmented keys can be stored on paper, while at least one set is stored on one or more disks, memory sticks, memory cards, tapes, hard drives, or other computer readable media. In embodiments, the same number of segments can be used for each set. In embodiments, a different number of segments can be used for at least two of the sets (e.g., 3 segments for 1 set, and 4 segments for 1 set). In embodiments, different types of coding and/or encryption can be used for at least two sets. FIG. 9D illustrates three sets of key copies, where the third copy 80 stored in vault 70-C may not be divided into segments. Such a key copy may be encrypted like any of the other key segments.

A cold storage back-up may be provided by a one-way electronic data recordation system. The system can function as a write-only ledger. Upon deposit of digital assets into cold storage, the corresponding private keys may be transmitted to the recordation system, which will store a record of the transaction. When digital assets are removed from a wallet, a record of the removal and/or wallet destruction can be sent to the system. In the event that wallet keys must be retrieved, the recordation system can be accessed to determine the wallet keys. Accessing the recordation system to retrieve keys can be designed to be a difficult operation, only to be performed in the event of an emergency need to recover wallet keys.

Key Storage Service

Digital asset storage services and/or digital asset protection may be provided in accordance with the present invention. Digital asset storage may use any of the secure storage systems and methods described herein. In embodiments, a digital asset storage service may be provided to other entities (e.g., a trust associated with an ETP, authorized participants in the trust, retailers, banks, or other digital asset users), to provide secure storage of digital assets. Such a storage service may use any of the security measures described herein. In embodiments, a digital asset storage service may comprise, form a part of, and/or be associated with a digital asset insurance system, as described herein.

Digital asset protection can be digital asset insurance and/or digital asset warranties. Digital asset insurance may be insured key storage, which may entail secure storage of one or more keys, such as private keys, where the secure storage service may guarantee the return of the stored private key and will pay out some amount if the key cannot be returned. In embodiments, a digital asset warranty can be a warranty against key loss, which may be a warranty against key loss by a digital asset storage service.

In embodiments, a user device may include tools to create keys (public key and corresponding private key). In embodiments, a user device may include tools to store keys (public and/or private keys) on a secure element of the user device. A secure element, as used herein, may refer to a microprocessor chip which is operable to store data and/or run secure applications and/or software. The secure element, in embodiments, may be used to store private keys and protect the private keys from malware attacks. In embodiments, the secure element may be embedded in an NFC chip of the user device. The user device, as used herein, may correspond to a suitable electronic device, such as, desktop computers, mobile computers (e.g., laptops, ultrabooks), mobile phones, smart phones, tablets, personal display devices, large scale display devices (e.g., billboards, street signs, etc.), personal digital assistants ("PDAs"), gaming consoles and/or devices, smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few.

A digital asset storage service and/or a digital asset protection system may be associated with and/or accessed through one or more digital wallets. In embodiments, digital asset protection and/or storage services may only be available when using a particular digital asset wallet and/or when employing particular storage mechanisms or procedures. In embodiments, a digital wallet may provide an option to request and/or accept protection and/or an option to request and/or accept storage of one or more keys associated with the wallet. In embodiments, a wallet may prompt and/or require a user to store the private key of the wallet, e.g., using the secure digital asset storage service.

Figure 10A:
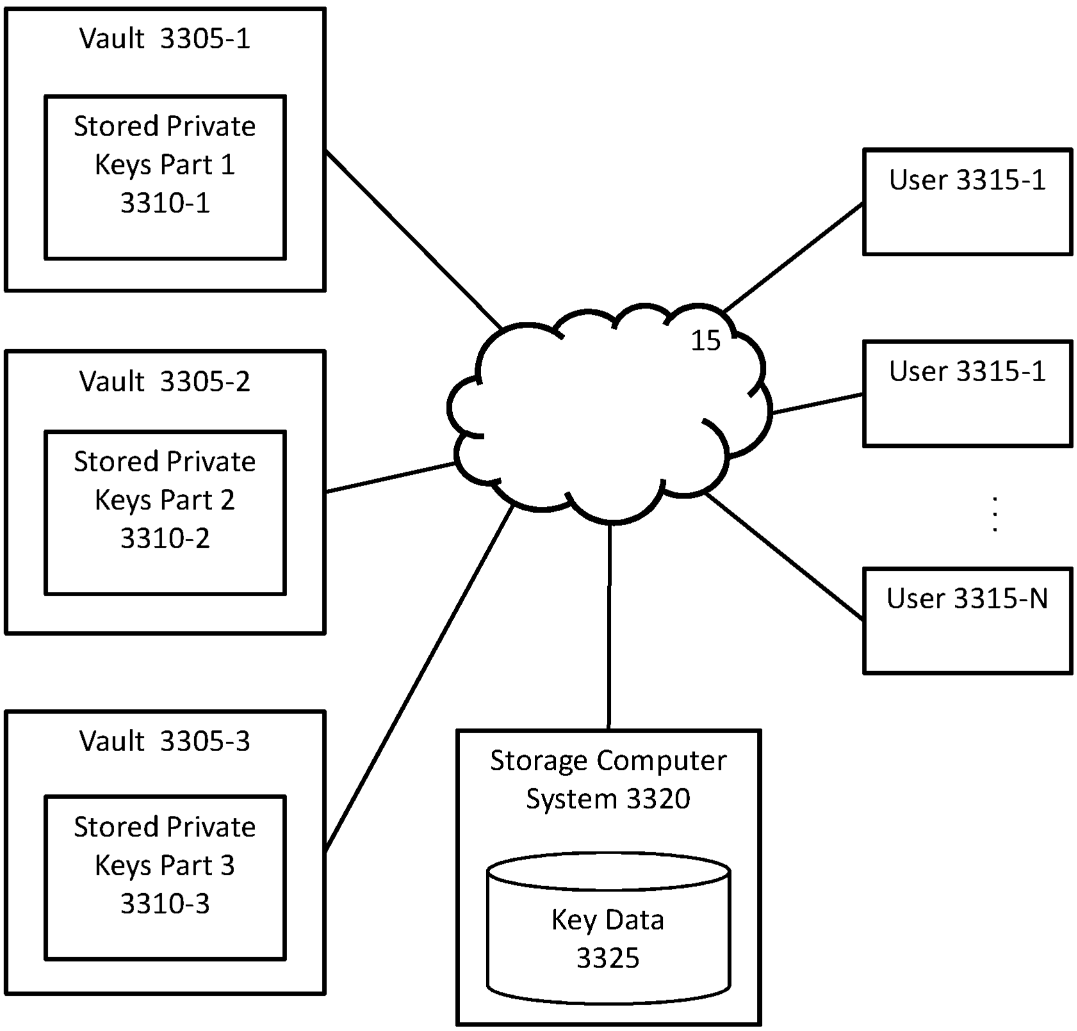
FIGS. 10A and 10B are schematic diagrams of vault arrangements for a digital asset network in accordance with exemplary embodiments of the present invention.

FIG. 10A illustrates an exemplary system for providing secure digital asset storage and/or protection. A storage computer system 3320 may store in computer-readable media or otherwise be connected to one or more databases containing data 3335 relating to one or more digital asset or key storage policies. In embodiments, data 3335 can also include information relating to a stored or insured digital wallet, such as public keys, public addresses, and/or key storage information, which may comprise identification codes or other indicators of where keys or key segments are stored. The storage computer system 3320 may store key data 3325 in internal or external computer-readable memory comprising one or more databases. Key data 3325 can include public key data, information identifying a key owner or wallet owner, information (e.g., an identifying code) identifying or correlating a wallet's keys or key segments, and/or information identifying location and/or retrieval information for stored keys or key segments, to name a few.

The exemplary system illustrated in FIG. 10A can include a plurality of secure storage locations, such as vaults 3305-1, 3305-2, and 3305-3. Private keys or key segments 3310-1, 3310-2, and 3310-3 may be stored in each vault in accordance with the secure storage systems and methods discussed herein, such as cold storage vaulting in different locations. Vaults may be connected to a network 15 at times and disconnected at other times. The network 15 may be any data network or a plurality of connected networks, internal, such as an intranet, or external, such as the Internet. A plurality of keys corresponding to a multi-key wallet may be stored in separate vaults. In embodiments, one or more keys may be divided into segments, which can be stored in separate vaults. Keys may be divided whether from single private key wallets or multi-key wallets.

One or more users 3315 may be, e.g., customers and/or claimants of a digital asset storage and/or protection system. Users 3315 may obtain key storage for one or more digital wallets containing digital assets in one or more denominations. Users 3315 may access or otherwise participate in a digital asset storage and/or protection system using one or more user device. In embodiments, the same digital wallet may be accessed from a plurality of user devices using the same key combinations (e.g., private and public keys).

Figure 10B:
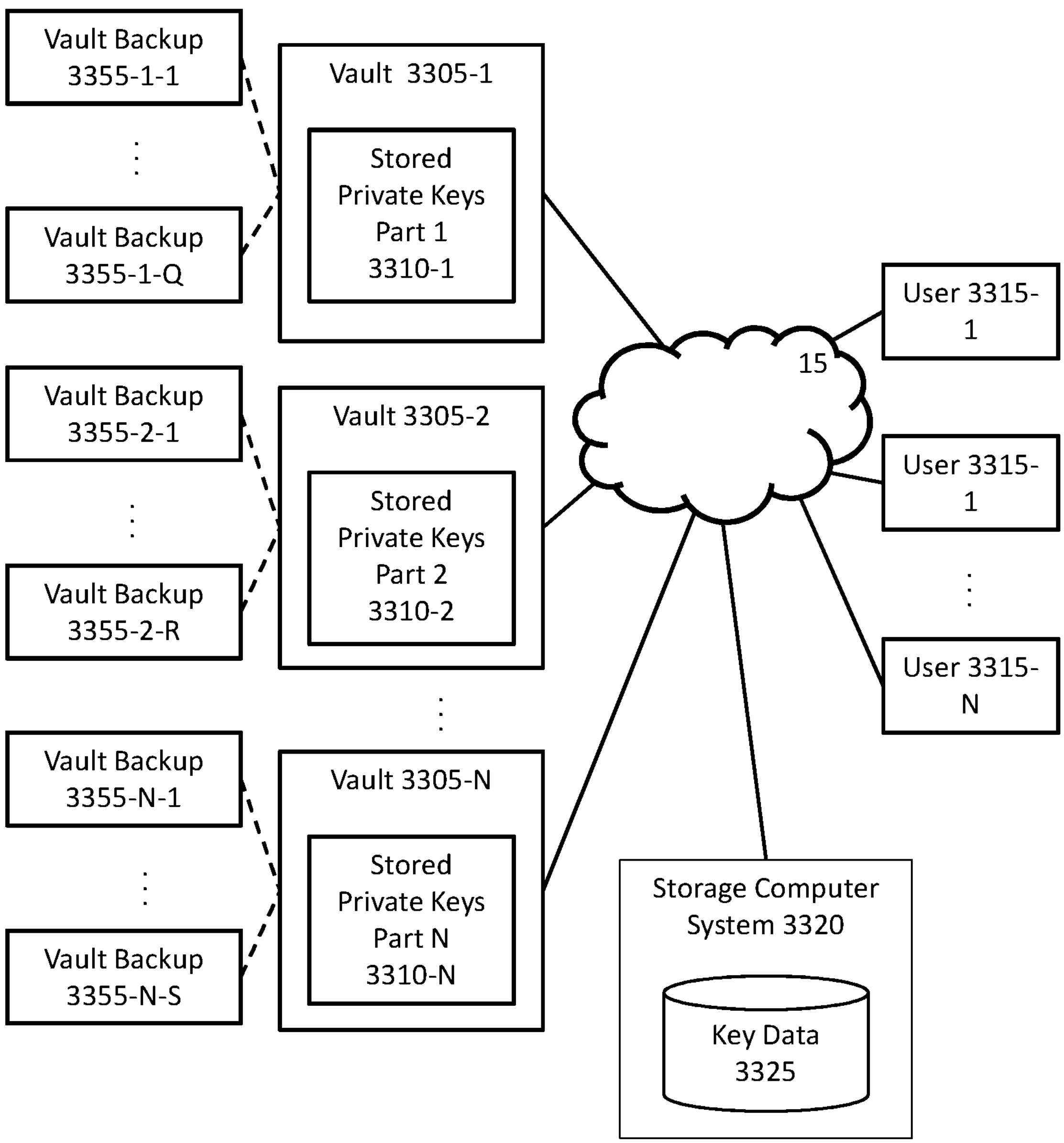

FIG. 10B shows another exemplary embodiment of a system for providing secure digital asset storage and/or protection. A plurality of vaults 3305-1 to 3305-N may be employed to store keys or key segments in segregated locations. In embodiments, vaults may be secure locations, such as safety deposit boxes, bank vaults, rooms with controlled access, to name a few. Vaults may be physical and/or electronic repositories for keys or key segments. In addition, each vault may have one or more backups 3355 (e.g., Q number of backups for vault 3305-1, R number of backups for vault 3305-2, and S number of backups for vault 3305-N). Vault backups may be other vaults or other secure storage facilities, units, or devices. Vault backups may utilize the same or different types of storage from each other and/or from the primary vault. For example, a primary vault may include printed paper copies of keys or key segments stored in a bank lockbox, while a backup may comprise an offline encrypted hard drive storing data corresponding to keys or key segments. Vault backups 3355 can be any of physical storage of printed or transcribed keys or key segments, remote cloud storage, hard drive, disk, CD, DVD, memory card, flash drive, tape drive, and/or tape library, to name a few.

Storage of Keys by a Digital Asset Storage Service

Figure 11A:
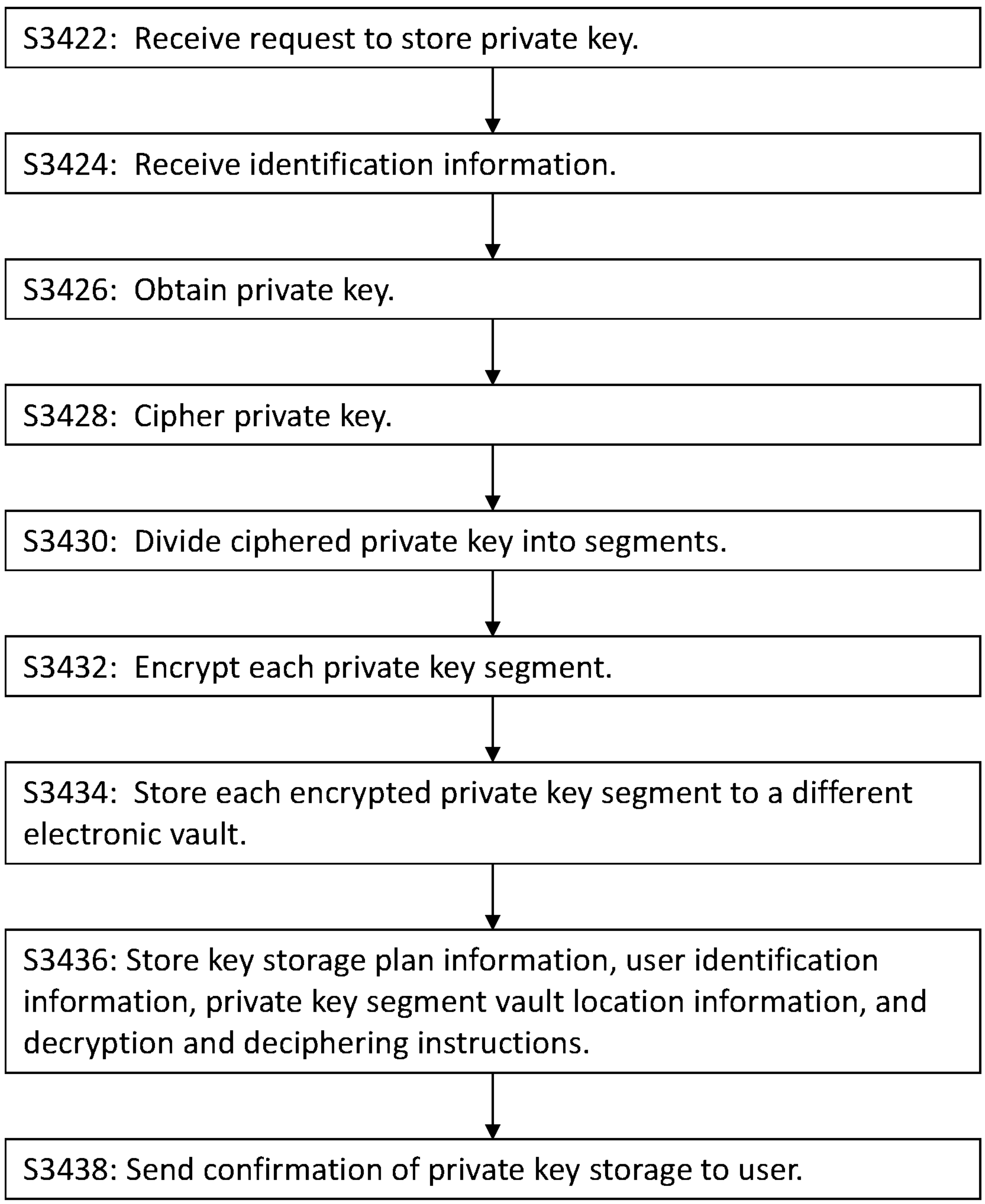
FIGS. 11A-11B are flow charts of processes for generating key storage and insurance in accordance with exemplary embodiments of the present invention.
Figure 11B:
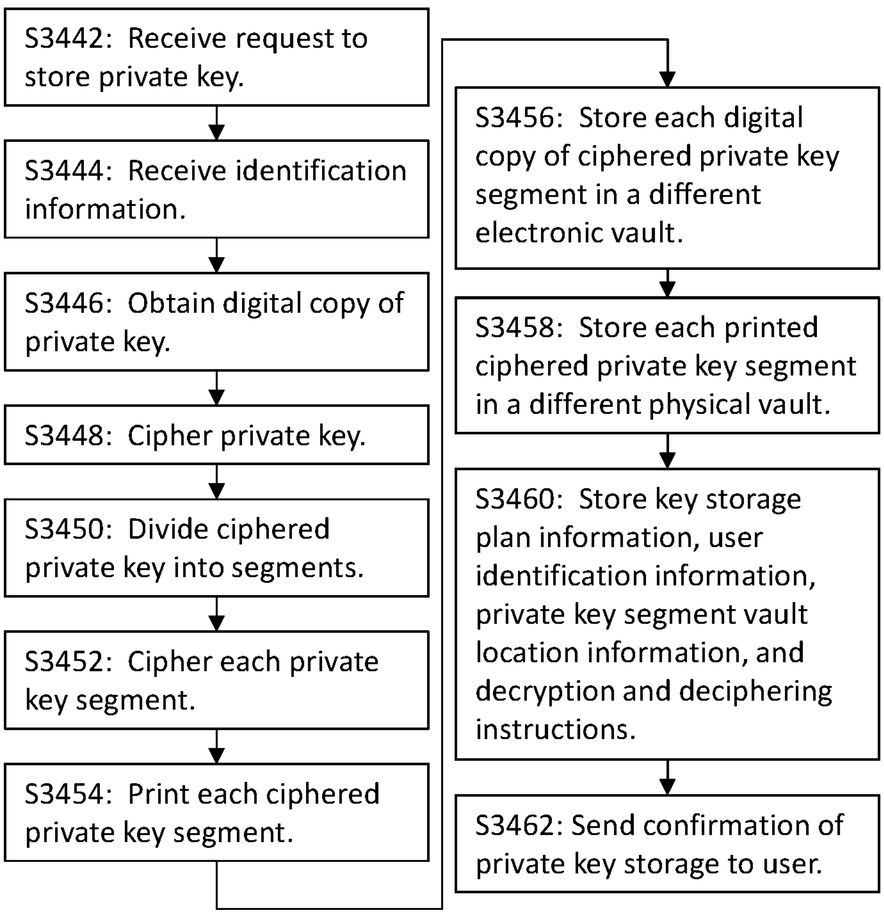

As discussed herein, a digital asset storage service may be provided to users of a digital asset network to provide secure storage of digital assets. In embodiments, the secure storage service may be used in conjunction with a digital asset protection plan, such as an insurance or warranty plan, although the storage service may also be used without insurance or warranties. FIGS. 11A-11B describe exemplary processes for storing private keys, which may be used solely as a key storage service or in conjunction with protection plans, such as insurance or warranty plans.

In embodiments, a user of a digital asset network may provide one or more keys or key segments to the key storage service for storage. Keys or key segments may be provided to the storage service via email or other electronic data transfer, any of which may be secure or otherwise encrypted. A user may use software to generate a wallet with one or more private keys and/or to divide the keys into segments. The software may include the ability to transmit, e.g., via a secure connection, the keys or key segments to the secure storage company. In embodiments, keys may be delivered to a key storage company in person, via mail, or via fax. Such keys may be stored in accordance with the secure and cold storage vault security mechanisms discussed herein, which may include dividing the keys into segments if not already divided.

Keys may also be generated at the secure storage company, e.g., at the secure storage site. Accordingly, a user may log into a website or otherwise connect to a portal for accessing wallet generation software. Such software may be running on one or more processors located at the secure storage company. The user may use the wallet generation software to create a wallet with one or more private keys. The user may also use such software to split one or more keys into key segments. Each key or key segment may then be printed, transcribed, or otherwise prepared for storage. In embodiments, the software may be programmed to transmit each key or key segment to a different printer, printing device, or electronic storage device, any of which may be located in different rooms, on different premises, in different geographies, and/or in separate vaults, to name a few. Thus, the key storage service may then store each key or key segment in separate locations, in accordance with the secure storage mechanisms discussed herein, such as the cold storage vault systems. Accordingly, the key storage company may never have access to an assembled key or to the required plurality of keys to a multi-key wallet.

Upon a user's request for retrieval of a stored key or keys, the secure key storage company may send to the user originals or copies, physically or electronically, of the keys or key segments. In embodiments, the key storage company may never reassemble keys or access a digital wallet itself. The secure key storage company may charge fees at setup and/or at retrieval, as well as recurring storage fees.

FIG. 11A describes an exemplary embodiment of a process for secure key storage and arranging for insurance or warranties against lost private keys, which process may be performed using a digital asset storage system, as discussed herein. The digital asset storage system may comprise and/or form a part of a digital asset protection system. FIG. 11A refers to the storage of private keys, but the process may apply to the storage of both private and public keys.

FIG. 11A is a flow chart of an exemplary process for securely storing private key information, which may be performed by a secure digital asset storage system. In a step S3422, a request to store a private key may be received at the secure digital asset storage system. In embodiments, such a request may comprise a request for insured private key storage. Such a request may originate from one or more other computers or electronic devices, such as a mobile phone, digital asset transaction kiosk, and/or personal computer, to name a few.

In a step S3424, a user may provide identification information, which may be received at the storage system Identification information may comprise any of a name, contact information (e.g., address, telephone number, e-mail address, to name a few), government ID information (e.g., an image of a driver's license, a driver's license ID number, a passport number, to name a few), biometric information (e.g., a voice sample, current photograph, eye scan, fingerprint, to name a few), username, password, and/or one or more security questions, to name a few. The identification information may be provided by and/or correspond to the requestor of private key storage and/or the private key owner. In embodiments, the digital asset insurance system may receive and/or store a user's identification information.

In a step S3426, the storage system may obtain a private key to be stored. The storage system may receive the key or fetch it, e.g., from a user electronic device, such as a mobile phone. In embodiments, the storage system may also obtain a public key to be stored.

In a step S3428, the storage system may cipher the private key, as described herein. In embodiments, the private key may not be ciphered before dividing it into segments. In other embodiments, the private key may be encrypted.

In a step S3430, the digital asset storage system may divide the ciphered private key into any number of segments. In the case of a multi-key wallet, the keys may not be divided into segments. However, keys to a multi-key wallet may be encrypted and/or ciphered.

In a step S3432, the storage system may encrypt each private key segment. In embodiments, encryption and/or ciphering may occur only before or only after dividing a key into segments. In embodiments, the key segments may not be encrypted after the segments are created. The key segments may be ciphered or not processed further.

In a step S3434, the storage system may transfer each encrypted private key segment to a different electronic vault for storage. In embodiments, the vaults may not be electronic, and the key segments may be printed or otherwise transcribed on a physical substrate and stored in the vaults. Any number of vaults may be used (e.g., one vault for each key segment, multiple vaults for redundant copies of each key segment, one or more vaults with two or more key segments stored together, to name a few). A code, such as a bar code or QR code, may be provided along with the key segments (e.g., printed with a physically transcribed copy of a key segment electronically saved with an electronic key segment, or appended to an electronic key segment, to name a few). The code may identify the key segments (e.g., which key segments are part of the same key) and/or the order of the key segments.

In a step S3436, the storage system may store, in one or more databases, key storage plan information (e.g., a subscription for key storage costing $1.99/month), user identification information, private key segment vault location information, and decryption and deciphering instructions. The databases may be computer-readable databases or physical (e.g., paper) databases that may be scanned and then read by one or more computers. In embodiments, the stored information may be sent to a user and/or a storage system administrative coordinator, which may be a computer that can handle retrieval of stored keys.

In a step S3438, the digital asset storage system may send confirmation of private key storage (e.g., over a data transfer network) to the user (e.g., requestor of private key storage or other person associated with the received identification information) and/or a third party. Confirmation of storage may be recorded by the storage system and/or another entity associated with the storage system.

FIG. 11B illustrates that physical back-ups of the secured private key may be employed by a secure digital asset storage system. In a step S3442, a request to store a private key may be received at the storage system.

In a step S3444, the storage system may receive user or digital wallet owner account identification information.

In a step S3446, the storage system may obtain (e.g., receive or fetch) a private key.

In a step S3448, the storage system may cipher the private key. In embodiments, no ciphering may occur before dividing the key into segments.

In a step S3450, the storage system may divide the private key (or ciphered private key) into segments.

In a step S3452, the storage system may cipher each private key segment.

In a step S3454, the storage system may print each ciphered private key segment. One or more copies of the key segments may be printed and/or otherwise transcribed onto any substrate and/or multiple substrates (e.g., paper, plastic, metal, to name a few). A code, such as a QR code or bar code, may be used to identify corresponding key segments and/or the order of the key segments. Such a code may be printed or otherwise provided with the key segments.

In a step S3456, the digital asset storage system may store each ciphered private key segment, as discussed herein. The key segments may be stored in electronic vaults (e.g., hard drives, tape drives, solid state memory, to name a few). Separate vaults may be used for each key segment, although multiple key segments corresponding to multiple different private keys may be stored in the same vault.

In a step S3458, the storage system may store each printed key segment in a physical vault, which may be separate vaults for each key segment.

In a step S3460, the storage system may store, in one or more databases, key storage plan information, user identification information, private key segment vault location information, deciphering instructions, and decryption instructions, where applicable.

In a step S3462, the storage system may send confirmation of private key storage to the user.

Recovering Stored Keys from a Digital Asset Key Storage Service

A user of a secure storage service or system may request access to a stored key, which may be a means of recovering a lost key.

Figure 12A:
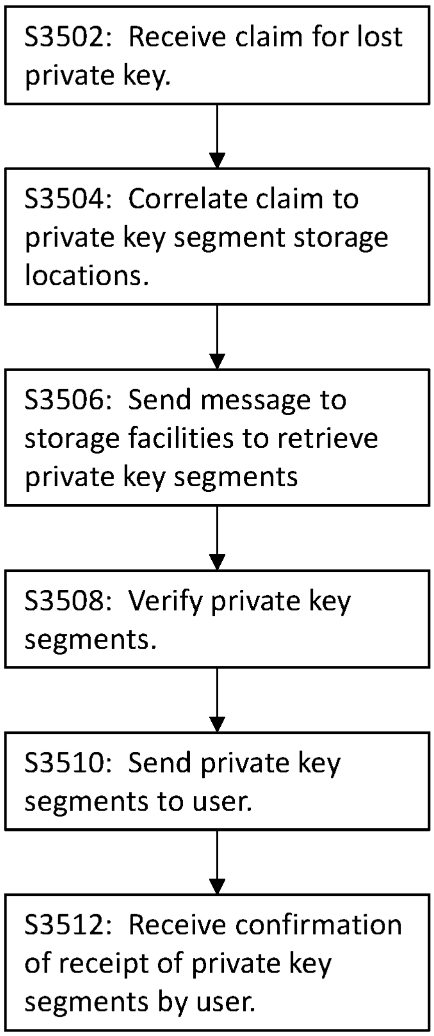
FIGS. 12A-12C are flow charts of processes for recovering key segments in accordance with exemplary embodiments of the present invention.

FIG. 12A is a flow chart describing an exemplary process for recovering a key, which may be performed by one or more computers. In embodiments, the process may entail recovering (e.g., retrieving from storage) a plurality of keys or key segments.

In a step S3502, a user may submit a claim for a lost private key, which may be received by a computer system of a secure storage service storing a copy of the user's private key. A claim may be a request for retrieval of one or more stored keys.

In a step S3504, the storage system, using the computer system, may correlate the received claim to one or more locations where private key segments are stored. For example, the computer system may access a database of policy information to determine where (e.g., in which vaults) a claimant's keys or key segments are stored.

In a step S3506, a message, which may constitute instructions, may be transmitted to one or more storage facilities to retrieve the private key segments. A computer system may automatically generate such a message based upon the information pertaining to stored keys or key segments. Such a key retrieval message can include a security code or other authorization to access a secure storage location. In embodiments, the computer system may employ security measures, such as a secure code or digital signature, to provide verification and/or authentication of a retrieval message.

In a step S3508, the private key segments may be verified. Keys or key segments may be retrieved from their respective storage locations. Quality control measures may verify that the correct key segments were retrieved and/or that the keys or key segments are readable, e.g., by a specially programmed scanning device, such as a QR scanner.

In a step S3510, the private key segments may be transmitted to a device and/or account corresponding to the user. One or more secure transmissions may be used. Two-factor authentication may be required of the recipient before a transmission is sent and/or opened by the recipient. In embodiments, the system may decrypt, reassemble, and/or decipher private keys and/or key segments before returning the keys and/or key segments to a user. In embodiments, a user may be provided with the option of having the system perform the decrypting, reassembling, and/or deciphering steps. In embodiments, software may be provided to a user to enable such steps to be performed by a user or under a user's control. In embodiments, the computer system may never decrypt keys or key segments that were encrypted by a user. Accordingly, in step S3510, the user may be provided with key segments and/or reassembled keys, which may be in various states of security (e.g., ciphered, segmented, and/or encrypted).

In a step S3512, the system may receive confirmation that the user received the private keys or key segments. A user device may automatically generate and/or transmit a confirmation upon receipt of the keys or key segments, upon reassembling thereof, upon opening a corresponding digital asset wallet, or upon instruction for a user, to name a few. Such confirmation may provide an indication that the secure storage service and/or protection service met its obligation, e.g., to the customer.

Figure 12B:
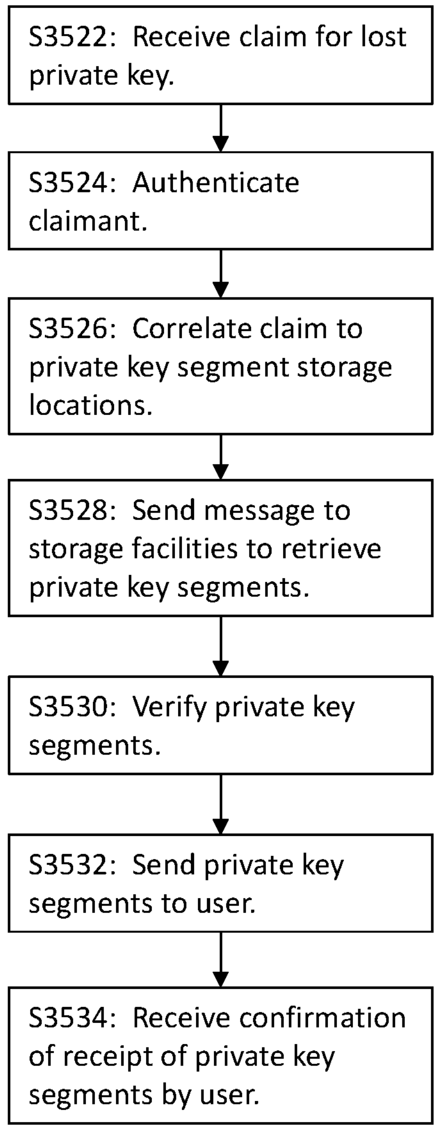

FIG. 12B illustrates another exemplary process for recovering a key. Such process may be performed by one or more computers. The process may be considered the same as the process of FIG. 12A, except with the addition of a user authentication step S3524.

Thus, in a step S3522, a user may submit a claim for a lost private key, which may be received by a secure storage service storing a copy of the user's private key.

In a step S3524, the secure storage system may authenticate the identity of the claimant. Authentication may involve any of receipt of any of a user's identification information, such as name, username, password, biometric information, or the like. In embodiments, three forms of identification information may be required. In embodiments, a claimant may receive a phone call, which may be auto-generated and auto-executed by the system, which may provide the claimant with a code to input at a user device. In embodiments, the user may be required to repeat a phrase, which may be a unique phrase. Voice analysis and/or recognition techniques may be employed. The user may be required to submit a current picture or video. The system may compare the received identification information to a database of authorized user identification information in order to authenticate the identity of the claimant.

In a step S3526, the system may correlate the received claim to one or more locations where private key segments may be stored.

In a step S3528, a message, which may constitute instructions, may be transmitted to one or more storage facilities to retrieve the private key segments.

In a step S3530, the private key segments may be verified.

In a step S3532, the private key segments may be transmitted to a device and/or account corresponding to the user. In embodiments, decryption, reassembly, and or deciphering of private keys and/or key segments may occur before or after returning the keys and/or key segments to a user and may be performed by the system or by a user, who may use software provided by the system.

In a step S3534, the system may receive confirmation that the user received the private key segments.

Figure 12C:
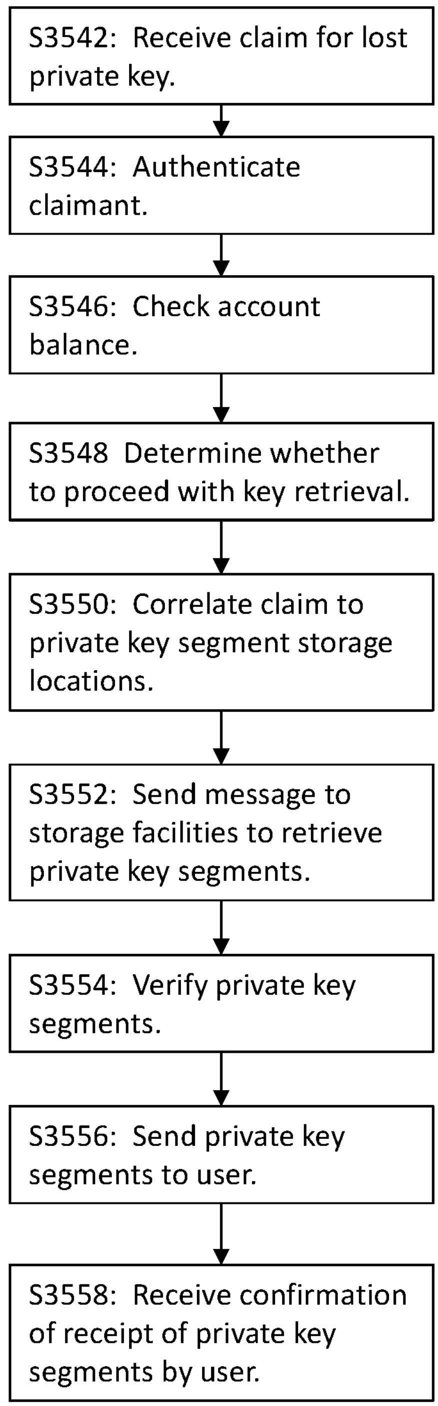

Another exemplary process for recovering a key is provided in FIG. 12C. Such process may be performed by one or more computers. The process may be considered the same as the process of FIG. 12B, except with the addition of steps to check the account balance of the account and a determination step of whether to proceed with the key retrieval.

Thus, in a step S3542, a user may submit a claim for a lost private key, which may be received by a secure storage service storing a copy of the user's private key.

In a step S3544, the secure storage system may authenticate the identity of the claimant, in manners described for step S3524 of FIG. 12B.

In a step S3546, the system may check the account balance of the account.

In a step S3548, the system may determine whether to proceed with the requested key retrieval. In embodiments, retrieval may be halted if an account balance is above a threshold or below a threshold.

In a step S3550, the system may correlate the received claim to one or more locations where private key segments may be stored.

In a step S3552, a message, which may constitute instructions, may be transmitted to one or more storage facilities to retrieve the private key segments.

In a step S3554, the private key segments may be verified.

In a step S3556, the private key segments may be transmitted to a device and/or account corresponding to the user of the account. In embodiments, decryption, reassembly, and or deciphering of private keys and/or key segments may occur before or after returning the keys and/or key segments to a user and may be performed by the system or by a user, who may use software provided by the system.

In a step S3558, the system may receive confirmation that the user received the private key segments.

In exemplary embodiments, a user of a secure storage service or system may be required to provide proof of control of an account before a lost key for that account may be recovered and provided to the user. Exemplary systems and methods for implementing such proof of control are described in further detail below.

In embodiments, a digital math-based asset may be one or more of the following: Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few.

Increasing The Total Supply Of Digital Asset Tokens

FIGS. 4A-1 AND 4A-2 is a schematic drawing of an exemplary system for increasing the total supply of digital asset tokens on an underlying blockchain in accordance with exemplary embodiments of the present invention. The system shown in FIGS. 4A-1 AND 4A-2 may include an administrator system 1801 which may communicate with a plurality of end users, each of which may access the network 15 using one or more corresponding user device 1805, . . . 1805X, a blockchain 1807, and one or more on-line keysets 1362, . . . 1362N.

In embodiments, network 15, may be a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 15, through wired, wireless, or other connections. In embodiments, network 15 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between administrator system 1801 and user devices 1805, . . . 1805X. In some embodiments, el administrator system 1801 and/or user devices 1805, . . . 1805X may communicate with one another via a web browser using HTTP. Various additional communication protocols may be used to facilitate communications between administrator system 1801 and/or user devices 1805, . . . 1805X, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

As illustrated in FIGS. 4A-1 AND 4A-2, the administrator system 1801 and/or user devices 1805, . . . 1805X may communicate with a blockchain network to access and/or add blocks to blockchain 1807. User devices 1805, . . . 1805X may for instance, may correspond to a suitable electronic device, such as, desktop computers, mobile computers (e.g., laptops, ultrabooks), mobile phones, smart phones, tablets, personal display devices, large scale display devices (e.g., billboards, street signs, etc.), personal digital assistants ("PDAs"), gaming consoles and/or devices, smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few.

The blockchain 1807 may include one more contract addresses, such as contract address for, e.g., a proxy smart contract 1310 (contract address 1), IMPL smart contract 1320 (contract address 2), PRINT LIMITER smart contract 1360 (contract address 3), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), as illustrated in FIGS. 4A-1 AND 4A-2. Each contract address may include one or more contract addresses. Additionally, in embodiments, one or more contract addresses shown in connection with FIGS. 4A-1 AND 4A-2 may be associated with one or more contract addresses. For example, in embodiments, contract address 1 may be the same contract address as contract address 2. The blockchain 1807 may also include public addresses, such as off-line public address 1 1817, off-line public address N 1817N, on-line public address 1 1825, on-line public address N 1825N, user 1 public address 1827, and User X public address 1827X, as illustrated in FIGS. 4A-1 AND 4A-2.

In embodiments, the blockchain 1807 may be a plurality of geographically distributed computer systems in a peer-to-peer network. Wireless communication may be provided using any of a variety of communication protocols and/or wireless communication networks, including e.g. GSM, GSM-R, UMTS, TD-LTE, LTE, LTE-Advanced Pro, LTE Advanced, Gigabit LTE, CDMA, iDEN, MVNO, MVNE, Satellite, TETRA, WiMAX, AMPS TDMA, Roaming SIM, DC-HSPA, HSPA, HSPA+, HSDPA, G, 2G, 3.5G, 4G, 4.5G, 5G, 5.5G, 6G, 6.5G, VoLTE, EDGE, GPRS, GNSS, EV-DO, 1×RTT, WCDMA, TDS-CDMA, CDMA2000, CSFB, FDMA, OFDMA, PDMA, AMPS, EV-DO, DECT, IS-95, NMT, UMTS, MPLS, MOCA, Broadband over Power Lines, NB-IoT, enhanced MTC (eMTC), LTE-WLAN, ISDN, Microwave, Long Range Wifi, Point to Point Wifi, EC-GSM-IoT, LTE-M, NB-IoT, Evolved Multicast Broadcast Multimedia Service (eMBMS) and LTE-Broadcast (LTE-B), to name a few.

The system described in connection with FIGS. 4A-1 AND 4A-2 may include one or more on-line keysets 1362, . . . 1362N. Each keyset includes a private key and a corresponding public key (or public address on the blockchain). For example, on-line keyset 1362 may be associated with on-line public address 1 1825. Similarly, by way of example, on-line keyset N 1362N may be associated with on-line public address N 1825N. In embodiments, each private key will typically be mathematically related to the corresponding public key, such as used with cryptocurrency Security Standard. In embodiments, the one or more on-line keysets 1362, . . . 1362N may be stored on non-volatile computer readable memory of one or more computer systems that are connected to the network, such as a first computer system.

The system described in connection with FIGS. 4A-1 AND 4A-2 may also include one or more off-line keyset 1803, . . . 1803N. Each keyset includes a private key and a corresponding public key (or public address on the blockchain). The offline keyset 1803 may be stored in on non-volatile computer readable memory of one or more computer systems that are physically separated from network 15, blockchain 1807, administrator system 1801, and the one or more computer systems that store the on-line keysets, such as a second computer system. In embodiments, the second computer system that is physically separated and/or electronically may be a hardware storage module (HSM 1900—as described more fully in connection with FIG. 13B). The physical and/or electronic separation may serve as an additional security measure(s), protecting the one or more off-line keyset 1803, . . . 1803N from unauthorized access. In embodiments, the one or more off-line keyset 1803, . . . 1803N may be associated with address on the blockchain 1807. In embodiments, off-line keyset 1 1803 may be associated with off-line public address 1 1817. Off-line keyset 1803N may be associated with off-line public address N 1817.

In embodiments, proxy smart contract 1310 may have a contract address (e.g., contract address 1) associated therewith on the blockchain 1807 proxy smart contract 1310. Proxy smart contract 1310, as seen in FIG. 4B, by way of illustration and as discussed in greater detail with respect to FIGS. 15A-15A-1, 15B-15C and 16A-16B, may include one or more modules of instructions 1310A-1 such as: (1) PROXY delegation instructions module 1829 (i.e. first delegation instructions module) and (2) PROXY authorization instructions module 1831 (i.e. first authorization instructions module), to name a few.

In embodiments, PROXY delegation instructions module 1829 (i.e. first delegation instructions module) may include one or more instructions to delegate received requests to other smart contracts on the blockchain, such as, for example, IMPL smart contract 1320 (contract address 2), PRINT LIMITER smart contract 1360 (contract address 3), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), to name a few. Additionally, in embodiments, PROXY delegation instructions module 1829 (i.e. first delegation instructions module) may include one or more instructions to delegate received requests to public addresses such as off-line public address 1 1817, off-line public address N 1817N, on-line public address 1 1825, on-line public address N 1825N, user 1 public address 1827, and/or User X public address 1827X, to name a few.

In embodiments, the first authorization instruction module 1831 may include instructions to authorize request received, the requests, in embodiments, being transaction requests from administrators, user public addresses, or other smart contracts, to name a few.

Figure 20A:
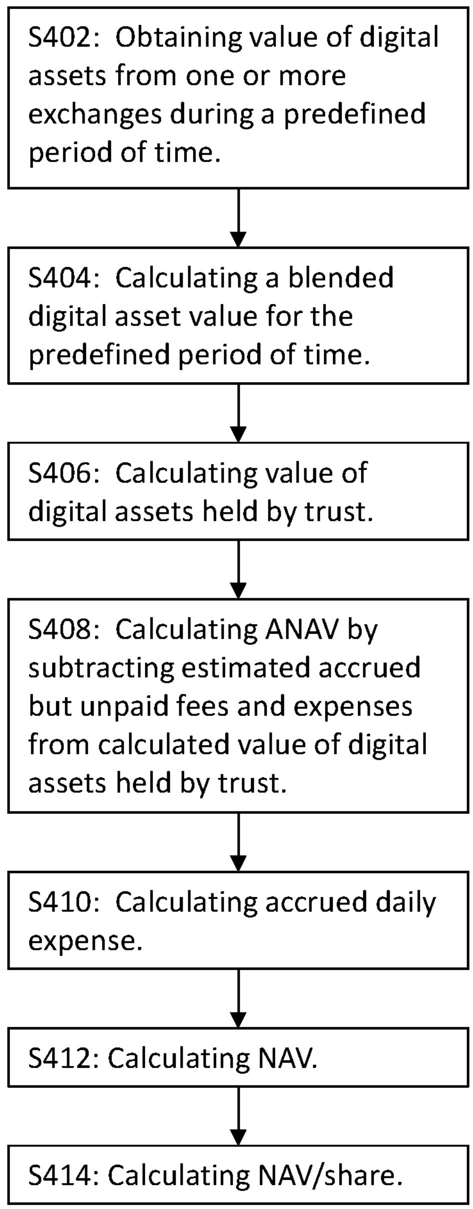
FIG. 20A is a flow chart of processes for calculating the NAV value of shares in a trust holding digital assets in accordance with embodiments of the present invention.
Figure 20B:
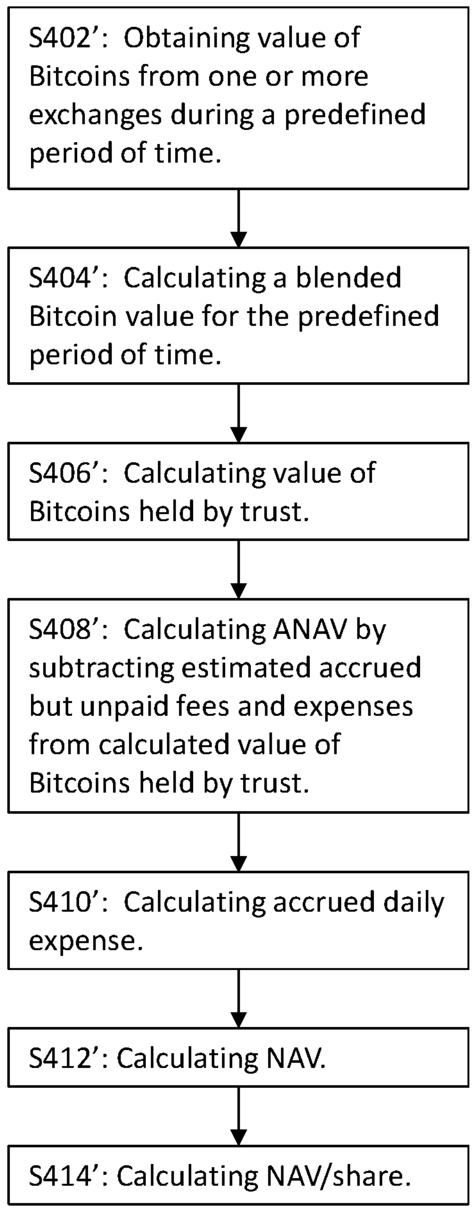
FIG. 20B is a flow chart of processes for calculating the NAV value of shares in a trust holding bitcoin in accordance with embodiments of the present invention.

In embodiments, PRINT LIMITER smart contract 1360 may have a contract address (e.g. contract address 3) associated therewith on the blockchain 1807. PRINT LIMITER smart contract 1360, as seen in FIG. 4C, by way of illustration and as discussed in greater detail with respect to FIGS. 20 and 21, may include one or more modules of instructions 1360A-1 such as: (1) PRINT LIMITER token creation instructions module 1833, (2), PRINT LIMITER first authorization instructions module 1839 (i.e. second authorization instructions module), (3) PRINT LIMITER second authorization instructions module 1841 (i.e. third authorization instructions module), (4) token transfer instructions module 1843, (5) token destruction instructions module 1845, and (6) token balance modification instructions module 1847.

In embodiments, PRINT LIMITER token creation instructions module 1833 may include one or more instructions that indicate conditions under which tokens of a digital asset token are created. In embodiments, the PRINT LIMITER token creation instructions module 1833 may include instructions that limit the conditions under which tokens may be created. For example, the PRINT LIMITER token creation instructions module 1833 may include instructions that limit the production of tokens to 1,000,000 tokens. In embodiments, the instructions may also include a temporal component. For example, the PRINT LIMITER token creation instructions module 1833 may include instructions that only allow 1,000 tokens to be created within a 24 hour period. Or, as another example, the PRINT LIMITER token creation instructions module 1833 may include instructions that only allow tokens to be created during business hours. In embodiments, the PRINT LIMITER may also include authorization instructions related to the first key pair.

In embodiments, custodian instructions module 1835 may include one or more instructions that limit the PRINT LIMITER smart contract 1360A authority. For example, if a request is received by the PRINT LIMITER smart contract 1360 to create digital asset tokens beyond a pre-approved token supply limit, the custodian instructions module 1835 may require authorization from a print limiter custodian (i.e. CUSTODIAN 2 smart contract 1350 (contract address 6)).

In embodiments, the second authorization instruction module 1839 and the PRINT LIMITER second authorization instructions module 1841 (i.e. third authorization instructions module) may each include instructions to authorize request received, the requests, in embodiments, being transaction requests from administrators, user public addresses, or other smart contracts, to name a few. Second authorization instruction module 1839 may include instructions for the first designated key pair (on-line keyset 1 1362, . . . 1362N), with respect to token creation of the digital asset token. In embodiments, the second authorization instructions with respect to token creation may be below a first threshold over a first period of time. PRINT LIMITER second authorization instructions module 1841 (i.e. third authorization instructions module) may include instructions for the second designated key pair (i.e. off-line keyset 1803, . . . 1803N) with respect to token creation of the digital asset token. In embodiments, PRINT LIMITER first authorization instructions module 1839 and PRINT LIMITER second authorization instructions module 1841 may be the same module.

In embodiments, the PRINT LIMITER Third Authorization Instructions Module 1835 may include instructions to modify the token supply. For example, the PRINT LIMITER Third Authorization Instructions Module 1835 may include instructions that, when called to execute, may create and/or burn tokens of the digital asset token. In embodiments, instructions that modify the token supply may cause the STORE Smart Contract 1330 to alter an electronic ledger that tracks the token supply.

In embodiments, the token transfer instructions module 1843, in embodiments, may include instructions to transfer digital asset tokens. In embodiments, the transfer may be from one public address to another public address. For example, a transfer of tokens may be from User 1 public address 1827 to User X public address 1827X. In embodiments, such transfer instructions may include rules by which certain transfer are allowed or blocked and may specify one or more key pair or contract addresses that may be authorized to perform one or more types of transfer operations. A more detailed description of the transfer of digital asset tokens is located in connection with the description of FIG. 13D, the same description applying herein.

In embodiments, the token destruction instructions module 1845 may include instructions on when, and with whose authority, security tokens associated with one or more specified addresses shall be destroyed or "burned", and thus removed from the security token supply. A more detailed description of token destruction is described in connection with FIG. 13E, the same description applying herein In embodiments, token balance modification instructions module 1847 may include instructions that may alter, edit, and/or update a transaction ledger in accordance with token creation, token transfer, and/or token destruction instructions (or modules), to name a few.

In embodiments, CUSTODIAN 2 smart contract may have a contract address (e.g. contract address 6) associated therewith on the blockchain 1807. CUSTODIAN 2 smart contract 1350, as seen in FIG. 4D, by way of illustration and as discussed in greater detail with respect to FIGS. 20 and 21, may include one or more modules of instructions 1350A-1 such as: (1) CUSTODIAN 2 first authorization instructions module 1849 (i.e. fourth authorization instructions module) and (2) CUSTODIAN 2 second authorization instructions module 1851 (i.e. fifth authorization instructions module). In embodiments, CUSTODIAN 2 first authorization instructions module 1849 and CUSTODIAN 2 second authorization instructions module 1851 may be the same module.

In embodiments, the CUSTODIAN 2 first authorization instructions module 1849 (i.e. fourth authorization instructions module) and the CUSTODIAN 2 second authorization instructions module 1851 (i.e. fifth authorization instructions module) may each include instructions to authorize request received, the requests, in embodiments, being transaction requests from administrators, user public addresses, or other smart contracts, to name a few CUSTODIAN 2 first authorization instructions module 1849 (i.e. fourth authorization instructions module) may include instructions for the off-line keyset 1803, . . . 1803N to authorize the issuance of instructions to the PRINT LIMITER smart contract 1360 with respect to token creation, above a first threshold during a first period of time. CUSTODIAN 2 second authorization instructions module 1851 (i.e. fifth authorization instructions module) may include instructions to raise a ceiling of token creation. A more detailed description of raising the ceiling of token creation is located below in the descriptions in connection with FIGS. 13A-1, 13A-2, 13B-1, and 13B-2 and 16A-1, 16A-2.

Figure 4E:
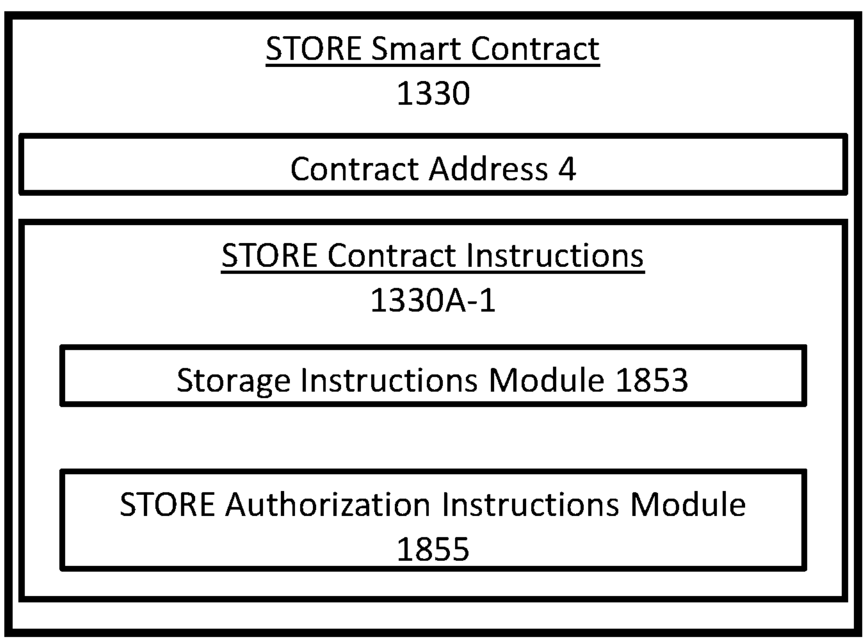
FIG. 4E is a schematic drawing of a store smart contract in accordance with exemplary embodiments of the present invention.

In embodiments, STORE smart contract 1330 may have a contract address (e.g. contract address 4) associated therewith on the blockchain 1807. STORE smart contract 1330, as seen in FIG. 4E, by way of illustration as discussed in greater detail with respect to FIGS. 20 and 21, may include one or more modules of instructions 1330A-1 such as: (1) storage instructions module 1853 and (2) STORE authorization instructions module 1855 (i.e. sixth authorization instructions module).

In embodiments, storage instructions module 1853, may include instructions to store any alterations, edits, or updates to a transaction ledger in accordance with token creation, token transfer, and/or token destruction. In embodiments, the storage instructions module 1853 may be called through a transaction request received from one or more smart contracts. For example, as shown in FIG. 13C, the IMPL smart contract 1320 may call the store smart contract 1330, authorizing the change of a transaction ledger to include an earlier transaction. In embodiments, the transaction ledger may be updated immediately after each token creation, transfer, and/or destruction. In embodiments, the storage instructions module 1853 may execute instructions to update a transaction ledger at certain times and/or dates. For example, the storage instructions module 1853 may only update a transaction ledger at the close of business. As another example, the storage instructions module 1853 may only update a transaction ledger at every second, minute, hour, or multiple hours, to name a few. A more detailed description of instructions related to the storage instructions module 1853 is located in connection with the descriptions of FIGS. 19-21, the same descriptions applying herein.

In embodiments, the STORE authorization instructions module 1855 may include instructions to authorize request received, the requests, in embodiments, being transaction requests from administrators, user public addresses, or other smart contracts, to name a few.

Figure 4F:
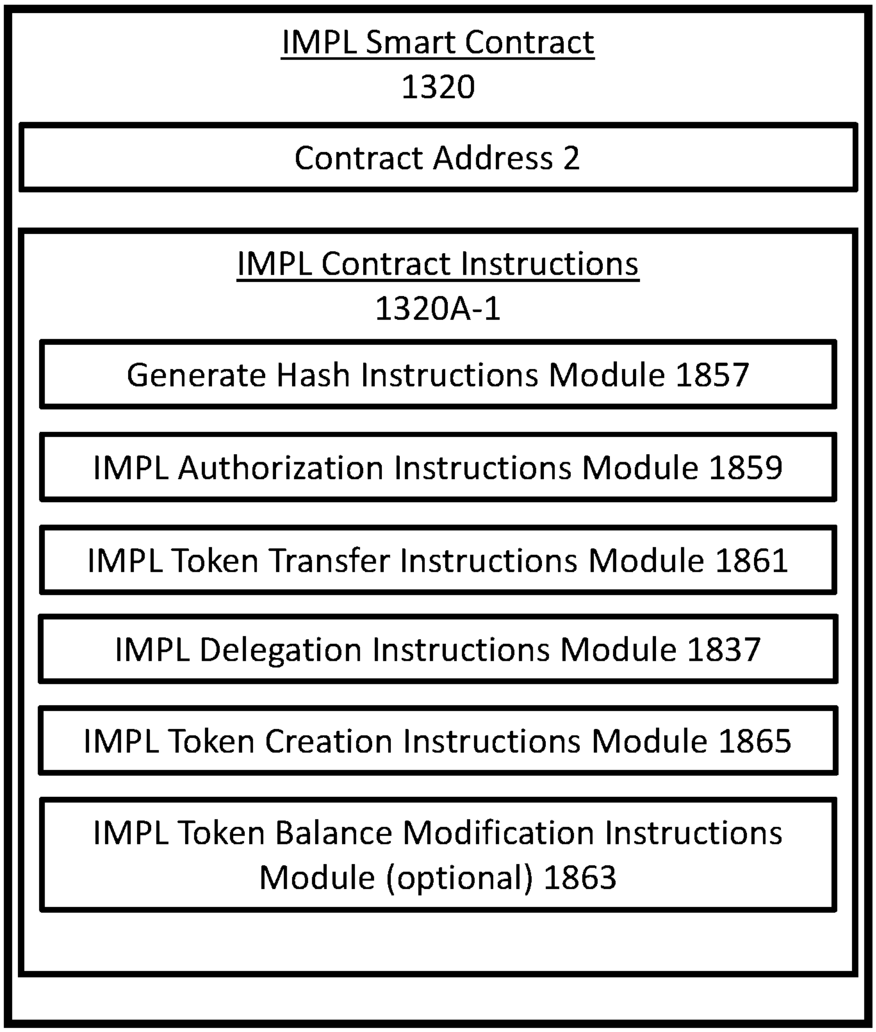
FIG. 4F is a schematic drawing of an impl smart contract in accordance with exemplary embodiments of the present invention.

In embodiments, IMPL smart contract 1320 may have a contract address (e.g. contract address 2) associated therewith on the blockchain 1807. The IMPL smart contract 1320, as seen in FIG. 4F, by way of illustration and discussed in greater detail with respect to FIGS. 19-21, may include one or more modules of instructions 1315A-1 such as: (1) Generate Hash Instructions Module 1857; (2) IMPL Authorization Instructions Module 1859; (3) IMPL Token Transfer Instructions Module 1861; (4) IMPL Token Balance Modification Instructions Module 1863; (5) IMPL delegation instructions module 1837 (i.e. second delegation instructions module); and (6) IMPL Token Creation Instructions Module 1865.

In embodiments, the generate hash instructions module 1857 may include instructions to generate a unique hash. A unique hash may be generated by the generate hash instructions module 1857 by applying a hash algorithm. Examples of hash algorithms include MD 5, SHA 1, SHA 256, RIPEMD, and Keccak-256, to name a few. Hash algorithms take an input of any length and create an output of fixed length, allowing the trade instructions to be detectable and usable by administrators and users on the underlying blockchain.

In embodiments, the IMPL authorization instructions module 1859 may include instructions to authorize request received, the requests, in embodiments, being transaction requests from administrators, user public addresses, or other smart contracts, to name a few. In embodiments, the requests may include requests to generate digital asset tokens from administrators, user public addresses, and/or other smart contracts, to name a few.

In embodiments, the IMPL token transfer instructions module 1861 may include instructions to transfer digital asset tokens. In embodiments, the transfer may be from one public address to another public address. For example, a transfer of tokens may be from User 1 public address 1827 to User X public address 1827X. In embodiments, such transfer instructions may include rules by which certain transfer are allowed or blocked and may specify one or more key pair or contract addresses that may be authorized to perform one or more types of transfer operations. In embodiments, the IMPL token transfer instructions module 1861 may be similar to the token transfer instructions module 1843, described in connection with FIG. 4C. In embodiments, a transfer of digital asset tokens using the blockchain 1807 may be accomplished using either the IMPL token transfer instructions module 1861 or the token transfer instructions module 1843. In embodiments, a transfer of digital asset tokens using the blockchain 1807 may be accomplished using both the IMPL token transfer instructions module 1861 and the token transfer instructions module 1843. In embodiments, the IMPL smart contract 1320 and the PRINT LIMITER smart contract 1360 may be the same smart contract. A more detailed description of the transfer of digital asset tokens is located in connection with the description of FIG. 13D, the same description applying herein.

In embodiments, IMPL token balance modification instructions module 1863 may include instructions that may alter, edit, and/or update a transaction ledger in accordance with token creation, token transfer, and/or token destruction instructions (or modules), to name a few. In embodiments, the IMPL token balance modification instructions module 1863 may be similar to the token balance modification module 1847 described in connection with FIG. 4C. In embodiments, a token balance modification may be accomplished using either the token balance modification module 1847 or the IMPL token balance modification module 1863. In embodiments, a token balance modification may be accomplished using both the token balance modification module 1847 and the IMPL token balance modification module 1863. A more detailed description of a token balance modification is located in connection with the description of FIGS. 19-21, the same descriptions applying herein.

In embodiments, IMPL delegation instructions module 1837 (i.e. second delegation instructions module) may include one or more instructions to delegate received requests to other smart contracts, such as, for example, contract address 1 (proxy smart contract) 1809, PRINT LIMITER smart contract 1360 (contract address 2), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), off-line public address 1 1817, off-line public address N 1817N, on-line public address 1 1825, on-line public address N 1825N, user 1 public address 1827, and/or User X public address 1827X. PRINT LIMITER delegation instructions module 1837 (i.e. second delegation instructions module) may include instructions for delegating to one or more designated store contract addresses data storage operations or other functions for the digital asset token as authorized by the first designated custodian contract address.

In embodiments, the IMPL token creation module 1865 may include one or more instructions to create digital asset tokens, and thus add to the token supply. Such instructions may specify one or more authorized key pairs or contract addresses that may be authorized to request creation of security tokens under specified conditions (such as one or more on-line keysets 1362, . . . 1362N). In embodiments, the token creation instructions module 1833 may include instructions related to increasing the token supply. In embodiments, the token creation instructions module 1865 may include instructions on how to create new digital asset tokens within pre-approved token supply limits and how to assign newly created or "minted" tokens to specific designated public addresses or contract addresses on the underlying blockchain. In embodiments, the IMPL token creation module 1865 may cause the IMPL Smart Contract 1320 to communicate with STORE Smart contract 1330, the IMPL Smart Contract 1320 sending a transaction request to the Store Smart Contract 1330, causing the Store Smart Contract 1330 to alter a ledger, or otherwise record an increase or decrease in the token supply of a digital asset token.

Figures 1, 15A:
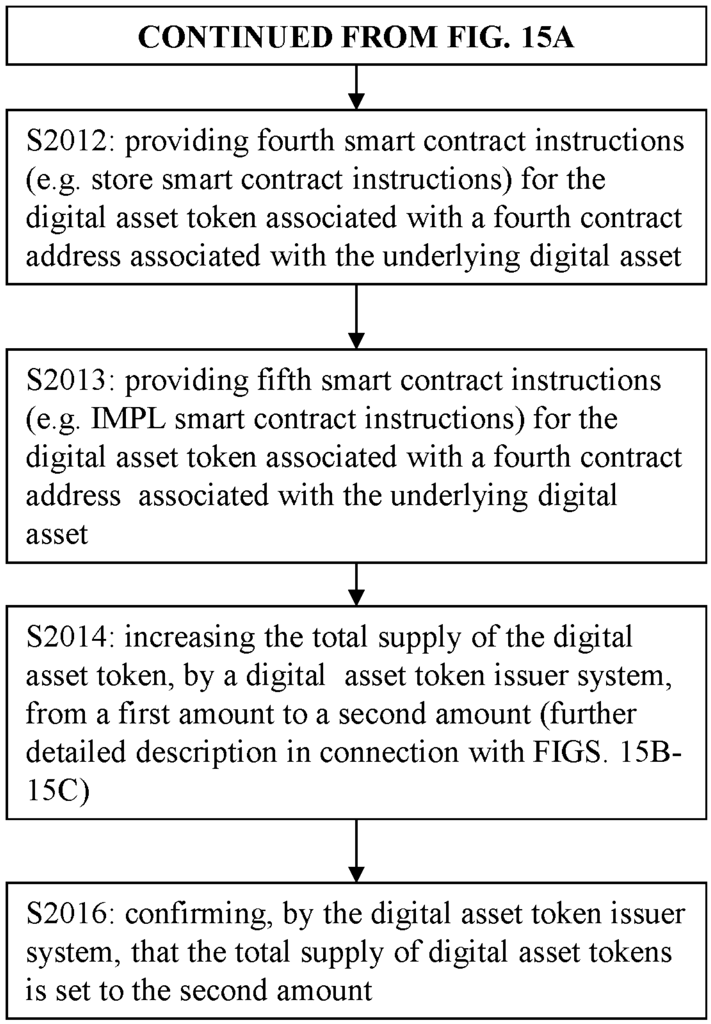
FIG. 15A is a flowchart of an exemplary process of increasing a supply of tokens of a digital asset token using off-line keys in accordance with exemplary embodiments of the present invention.

Referring to FIG. 15A, in step S2002, a first designated key pair (on-line keyset 1 1362) including a first public key of an underlying digital asset and a corresponding first designated private key is provided. In embodiments, the underlying digital asset is maintained on a distributed public transaction ledger maintained by a plurality of geographically distributed computer systems in a peer-to-peer network in the form of the blockchain 1807. In embodiments, the first designated private key is stored on a first computer system which is connected to the distributed public transaction ledger 15). In embodiments, the first designated key pair may be multiple on-line keys with multiple electronic signatures.

In step S2004, a second designated key pair including a second designated public key (off-line keyset 1803) of the underlying digital asset and a corresponding second designated private key is provided. In embodiments, the second designated private key is stored on a second computer system which is physically separated from the first computer system and is not operatively or physically connected to the distributed public transaction ledger or the internet (network 15). In embodiments, the second computer system may be the hardware storage module 1900. In embodiments, the second designated key pair may be multiple on-line keys with multiple electronic signatures.

In step S2006, first smart contract instructions for a digital asset token associated with a first contract address associated with the blockchain associated with the underlying digital asset are provided. In embodiments, the first contract address is contract address 1 (proxy smart contract) 1809 and first smart contract instructions of step S2006 are the proxy contract instructions 1310A-1, both described in connection with FIG. 4B. The first smart contract instructions may be saved in the blockchain 1807 and include first delegation instructions and first authorization instructions. The first delegation instructions may delegate one or more first functions associated with the digital asset token to one or more delegated contract addresses associated with the underlying digital asset, the delegated contract addresses, in embodiments, being different than the first contract address. In embodiments, the first delegation instructions may be located with first delegation instruction module 1829 described in connection with FIG. 4B. In embodiments, the first smart contract instructions, may also include first authorization instructions for the second designated key pair. In embodiments, the first authorization instructions may be located with first authorization instructions module 1830 described in connection with FIG. 4B.

In step S2008, second smart contract instructions for the digital asset token associated with a second contract address associated with the blockchain associated with the underlying digital asset may be provided. In embodiments, the second smart contract address is at contract address 3 (print limiter smart contact) 1813 and the second smart contract instructions are the print limiter contract instructions 1360A-1, both described in connection with FIG. 4C. In embodiments, the second contract address is different from the first contract address. In embodiments, the second smart contract instructions may be saved in the blockchain 1807 and, as described in connection with the print limiter contract instructions 1360A-1 of FIG. 4C (the descriptions of which applying herein), include: (1) token creation instructions; (2) custodian instructions; (3) second delegation instructions; (4) second authorization instructions; and (5) third authorization instructions. In embodiments, as described above in connection with print limiter contract instructions 1360A-1 of FIG. 4C (the description of which applying herein), the second smart contract instructions may also include: (6) token transfer instructions of token transfer instructions module 1843 to transfer tokens of the digital asset token from a first designated address to a second designated address.

In embodiments, as described above in connection with print limiter contract instructions 1360A-1 of FIG. 4C (the description of which applying herein), the second smart contract instructions may also include: (7) token destruction instructions of token destruction instructions module 1845 to destroy one or more tokens of the digital asset token. Token destruction instructions, in embodiments, may not be limited to print limiter contract instructions 1360A-1. In embodiments, additional smart contracts may also destroy tokens, such as IMPL smart contract 1320 (contract address 2), CUSTODIAN 1 smart contract 1819 (contract address 5), CUSTODIAN 2 smart contract 1350 (contract address 6), and/or CUSTODIAN 3 smart contract 1823 (contract address 7), to name a few.

In embodiments, as described above in connection with print limiter contract instructions 1360A-1 of FIG. 4C (the description of which applying herein), the second smart contract instructions may also include: (8) token balance modification instructions of token balance modification instructions module 1847 to modify a total number of tokens of the digital asset token assigned to a third designated address.

In step S2010, third smart contract instructions for the digital asset token associated with a third contract address associated with the blockchain associated with the underlying digital asset are provided. In embodiments, the third smart contract address is CUSTODIAN 2 smart contract 1350 (contract address 6) and the second smart contract instructions are the custodian 2 contract instructions 1350A-1, both described in connection with FIG. 4D. The third smart contract instructions may be saved in the blockchain 1807 and, as described in connection with the custodian 2 smart contract instructions 1350A-1 of FIG. 4D (the descriptions of which applying herein), include: (1) fourth authorization instructions and (2) fifth authorization instructions. The fourth authorization instructions of CUSTODIAN 2 first authorization instructions module 1849 (i.e. fourth authorization instructions module) may include instructions for the second designated key pair to authorize the issuance of instructions to the second smart contract instructions with respect to token creation. In embodiments, the authorization instructions with respect to token creation may be above the first threshold during the first time period.

In embodiments, a token creation request may exceed a ceiling (i.e. a request for 150 tokens when the ceiling is 100 tokens), CUSTODIAN 2 smart contract 1350 may authorize an increase in the ceiling. This authorization may be fifth authorization instructions of the CUSTODIAN 2 second authorization instructions module 1851 (i.e. fifth authorization instructions module), and may include instructions for the second designated key pair (off-line keyset 1803, . . . 1803N) to authorize the issuance of instructions to the first smart contract instructions to change the one or more designated contract address from the second contract address to a different designated contract address. In embodiments, a ceiling is raised by creating a second print limiter smart contract on the blockchain 1807 with a higher ceiling. Once the second print limiter smart contract is created, the request for token creation can be routed to the second print limiter smart contract.

A more detailed description of the process of raising the token creation ceiling is located in connection with FIGS. 13A-1, 13A-2, 13B-1, and 13B-2. FIGS. 13A-1, 13A-2, 13B-1, and 13B-2 are schematic drawings of an exemplary process for increasing the ceiling of a print limiter in accordance with exemplary embodiments of the present invention. The exemplary process starts with administrator system 1801 sending a first transaction request 1901 from on-line public address 1 1825 to PRINT LIMITER smart contract 1360 (contract address 3). In embodiments, the transaction request 1901 includes a request to raise the ceiling by amount 1. In embodiments, the first transaction request 1901 is signed by on-line private key 1. In embodiments, on-line private key 1 is mathematically related to on-line public address 1 1825.

In response to receiving the first transaction request, the print limiter 1813 executes the first transaction request 1903 and returns a unique lock identifier (Lockld1) to IMPL smart contract 1320 (contract address 2).

Figures 1, 13A:
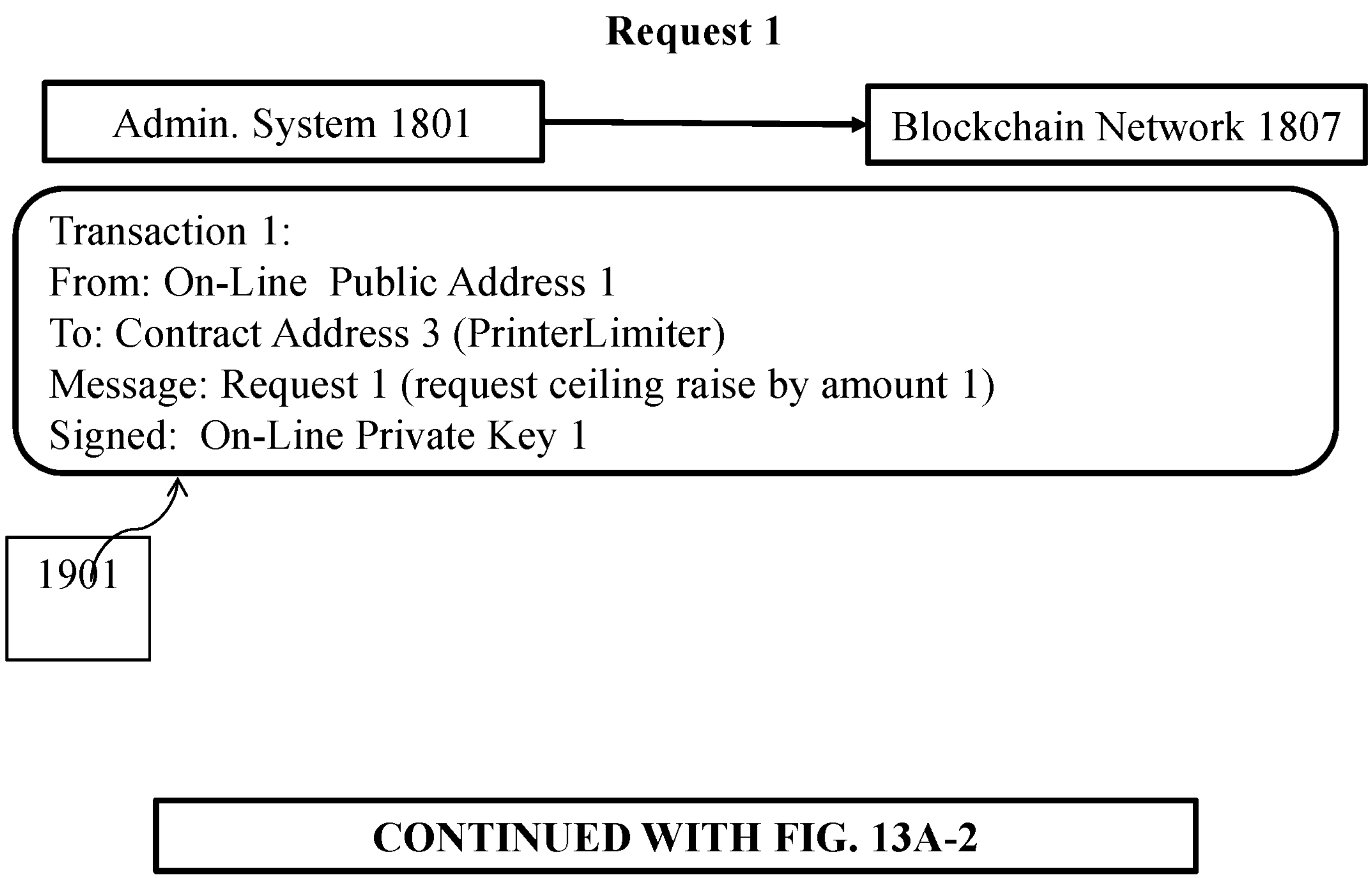
Figures 2, 13A:
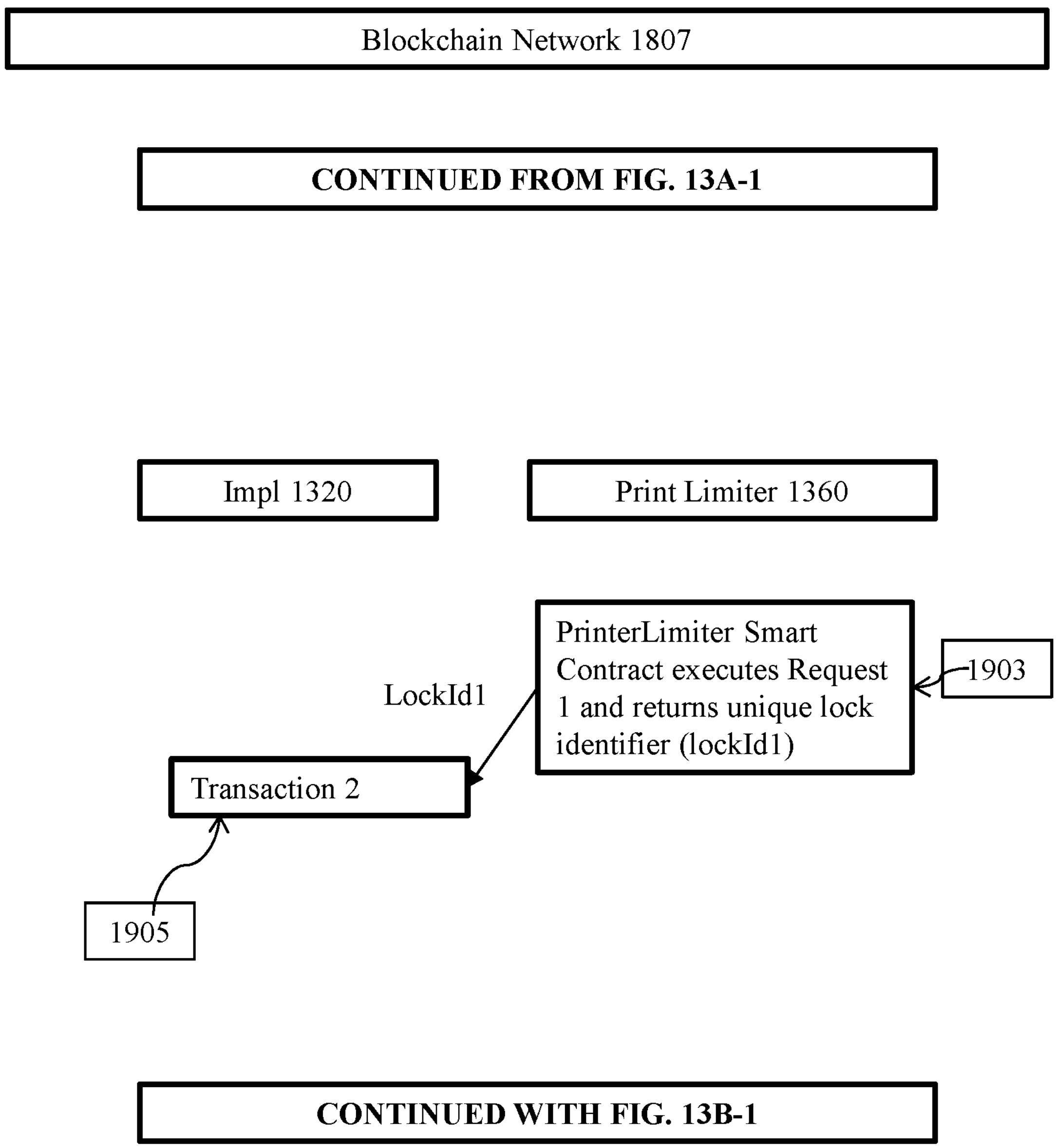
Figures 1, 13B:
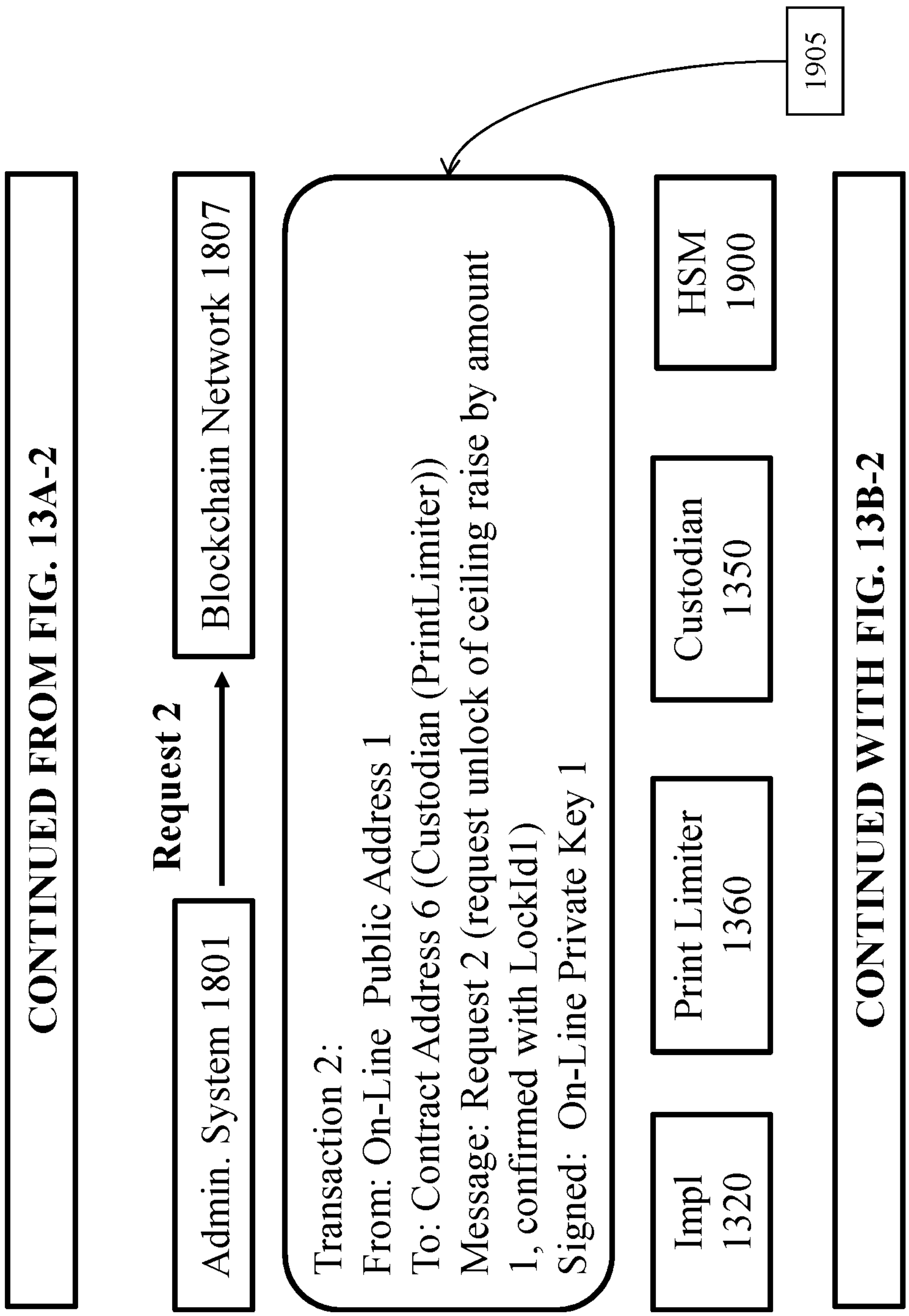
Figures 2, 13B:
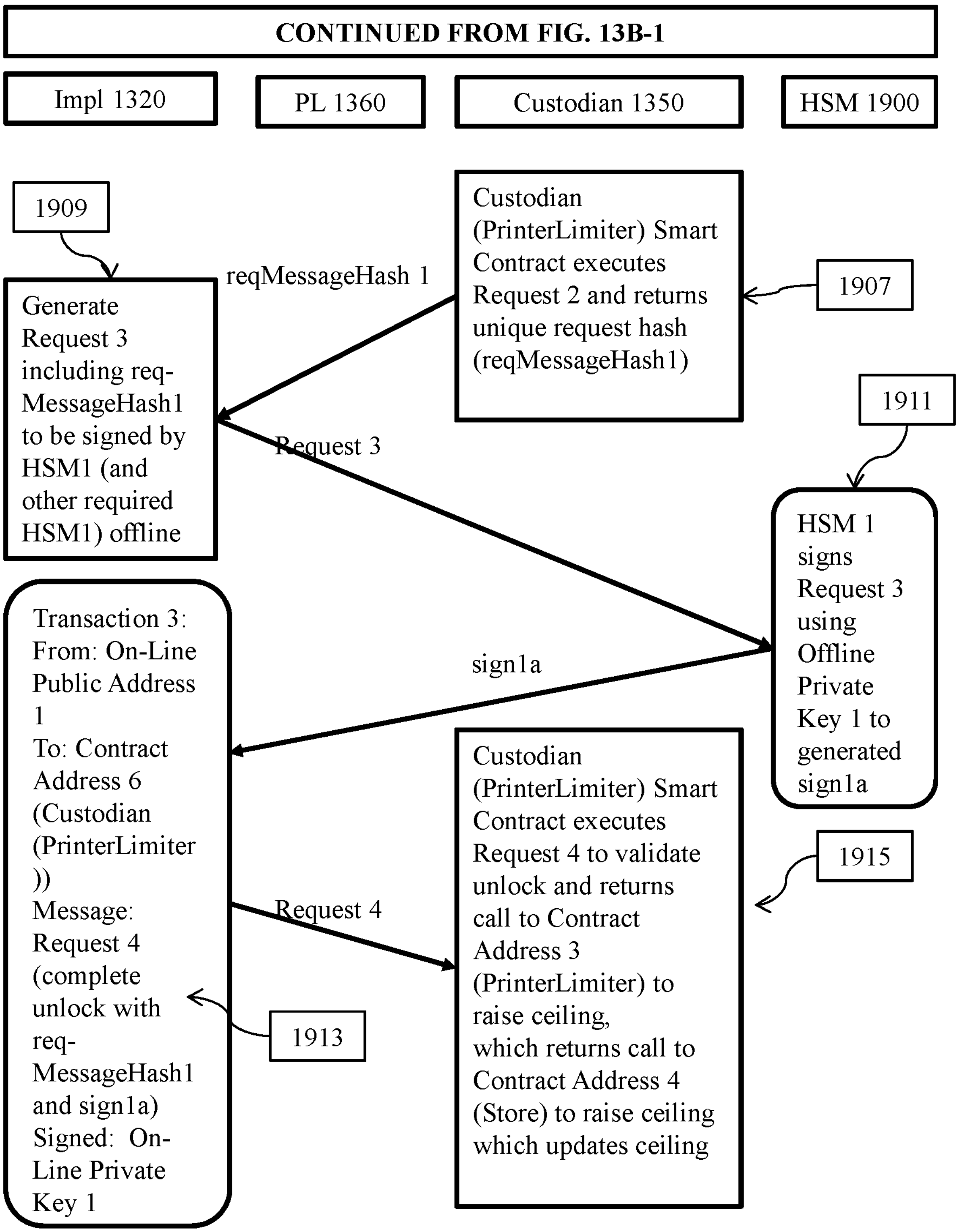
Figure 13C:
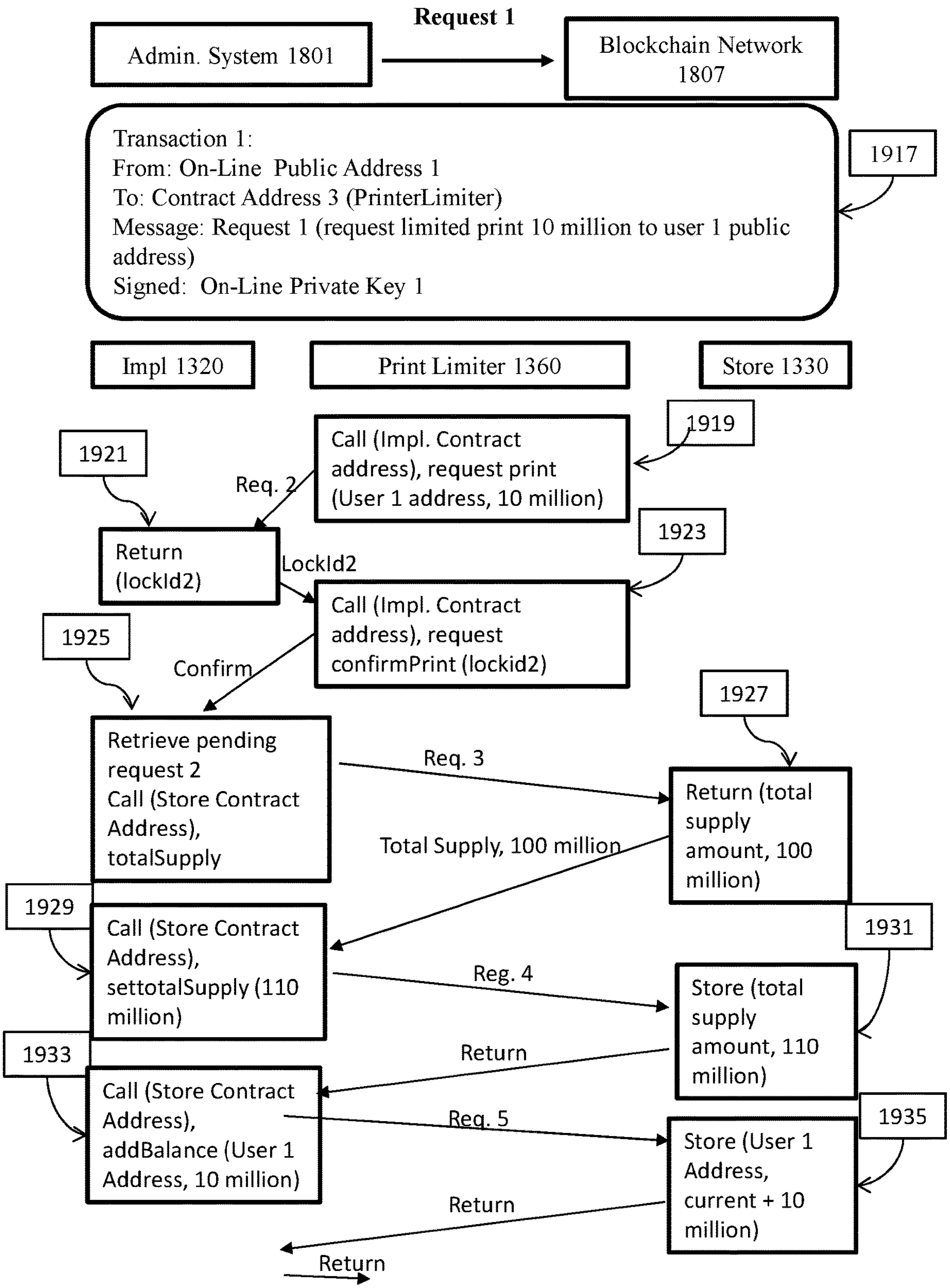
FIG. 13C is a schematic drawing of an exemplary process of limiting the print limiter with respect to a public address in accordance with exemplary embodiments of the present invention.

Next, referring to FIG. 13B, a second transaction request 1905 may be sent from the on-line public address 1825 to contract address 6 (custodian (print limiter)) 1821. In embodiments, the second transaction request 1905 includes a request to unlock ceiling raise by amount 1, the request being confirmed with the lockID received in step 1903. In embodiments, the second transaction request 1905 is signed by on-line private key 1.

In response to receiving the second transaction request, custodian 1821 executes the second transaction request 1907 and returns a unique hash (reqMessageHash1). The unique hash may be generated by applying a hash algorithm. Examples of hash algorithms include MD 5, SHA 1, SHA 256, RIPEMD, and Keccak-256 to name a few. Hash algorithms take an input of any length and create an output of fixed length, allowing the trade instructions to be detectable and usable by administrators and users on the underlying blockchain. However, applying a hash algorithm is not always necessary if trade instructions are published ahead of time.

In response to the returned unique hash, a third transaction request is generated 1909. The third transaction request may include a request that the reqMessageHash1 to be signed by HSM 1900 offline.

The third request then may be sent 1911 to HSM 1900 and signed using offline private keyset 1803. The signed request may be returned to administrator system 1801.

After returning the signed transaction request, the third transaction request is may be sent 1913 from the on-line public address 1825 to contract address 6 (custodian (print limiter)) 1821. The third transaction request may include a fourth request to complete the unlock with requestMessageHash1 with the HSM signature. In embodiments, the fourth request is signed by on-line private key 1.

After receiving the fourth request, custodian 1821 may execute the request to validate the unlock and return call to contract address 3 (print limiter) 1813 to raise the ceiling, which returns call to contract address 4 (store) 1815 to raise ceiling which updates ceiling.

The process of FIG. 15A may continue with step S2012 of FIG. 15A-1. In step S2012, fourth smart contract instructions for the digital asset token associated with a fourth contract address associated with the blockchain associated with the underlying digital asset are provided. In embodiments, the fourth contract address is STORE smart contract 1330 (contract address 4) and fourth smart contract instructions of step S2012 are the store contract instructions 1330A-1, both described in connection with FIG. 4E. The fourth smart contract instructions may include: (1) storage instructions and (2) sixth authorization instructions. In embodiments, storage instructions of storage instructions module 1853 may include instructions for transaction data related to the digital asset token to be stored. The transaction data may include (for all issued tokens of the digital asset token): (1) public address information associated with the underlying digital asset; and (2) corresponding token balance information associated with said public address information. In embodiments, sixth authorization instructions of authorization instructions module 1855 may include instructions for modifying the transaction data in response to request from the second contract address (print limiter 1813).

The process may continue with step S2013. At step S2013, fifth smart contract instructions for the digital asset token for the digital asset token associated with the blockchain associated with the underlying digital asset are provided. In embodiments, the fifth contract address is the IMPL smart contract 1320 (contract address 2) and the fifth smart contract instructions of step S2013 are the IMPL Contract instructions 1320A-1, both described in connection with FIG. 4F. In embodiments, the fifth smart contract instructions may be saved in the blockchain for the underlying digital assets and may include (1) token creation instructions to create tokens of the digital asset tokens under conditions set forth by the print limiter token creation instructions; and (2) second delegation instructions for delegating to another contract address, data storage operations. In embodiments, instructions from the PRINT LIMITER Token Creation Instructions Module 1833 may set conditions for the token creation instructions included with the fourth smart contract instructions (i.e. instructions included in the IMPL Token Creation Instructions Module 1865).

The process described in FIG. 15A-1 may continue with step S2014. At step S2014, a digital asset token issuer system increases the total supply of the digital asset token from a first amount to a second amount. Step S2014 is described in more detail in connection with FIGS. 15B-C. Increasing the total supply of the digital asset token may being with step S2018. At step S2018, a first transaction request may be generated by the digital asset token issuer system. The generated transaction request may include a first message including a first request to increase the total supply of the digital asset token to a second amount of digital asset tokens. The first transaction request being from the on-line public key address 1825 to the fifth contract address (IMPL 1320). In embodiments, the first transaction request may be signed by the first on-line private key.

In step S2020 the first transaction request is sent by the digital asset token issuer system, from the on-line public key address 1825 to the fifth contract address (IMPL 1320).

Next, in step S2021, the first transaction request is sent by the digital asset token issuer system via the underlying blockchain from the fifth contract address (IMPL 1320) to the second contract address (PRINT LIMITER 1360). In embodiments, the second contract address (PRINT LIMITER 1360) executes, via the blockchain 1807, the first transaction request to return a first unique lock identifier associated with the first transaction request. In embodiments, the first transaction request may include first transaction fee information for miners in the blockchain network to process the first transaction request.

Next, in step S2022, the first unique lock identifier may be obtained by the digital asset token issuer system, based on reference to the blockchain 1807.

In step S2024, a second transaction request may be generated by the digital asset token issuer system. The generated transaction request may include a second message including a second request to unlock the total supply of the digital asset token in accordance with the first request including the first unique lock identifier. The second transaction request being from the on-line public key address 1825 to the third contract address (custodian (print limiter) 1350). In embodiments, the second transaction request may be signed by the first on-line private key.

In step S2026 the second transaction request is sent by the digital asset token issuer system, from the on-line public key address 1825 to the third contract address (custodian (print limiter) 1350). In embodiments, the third contract address (custodian (print limiter) 1350) executes, via the blockchain 1807, the first transaction request to return a first unique lock identifier associated with the second transaction request to return a first unique request hash associated with the second transaction request. In embodiments, the first transaction request may include second transaction fee information for miners in the blockchain network to process the second transaction request.

Next, in step S2028, the first unique request hash is obtained, by the digital asset token issuer system, based on reference to the blockchain 1807.

Figure 15B:
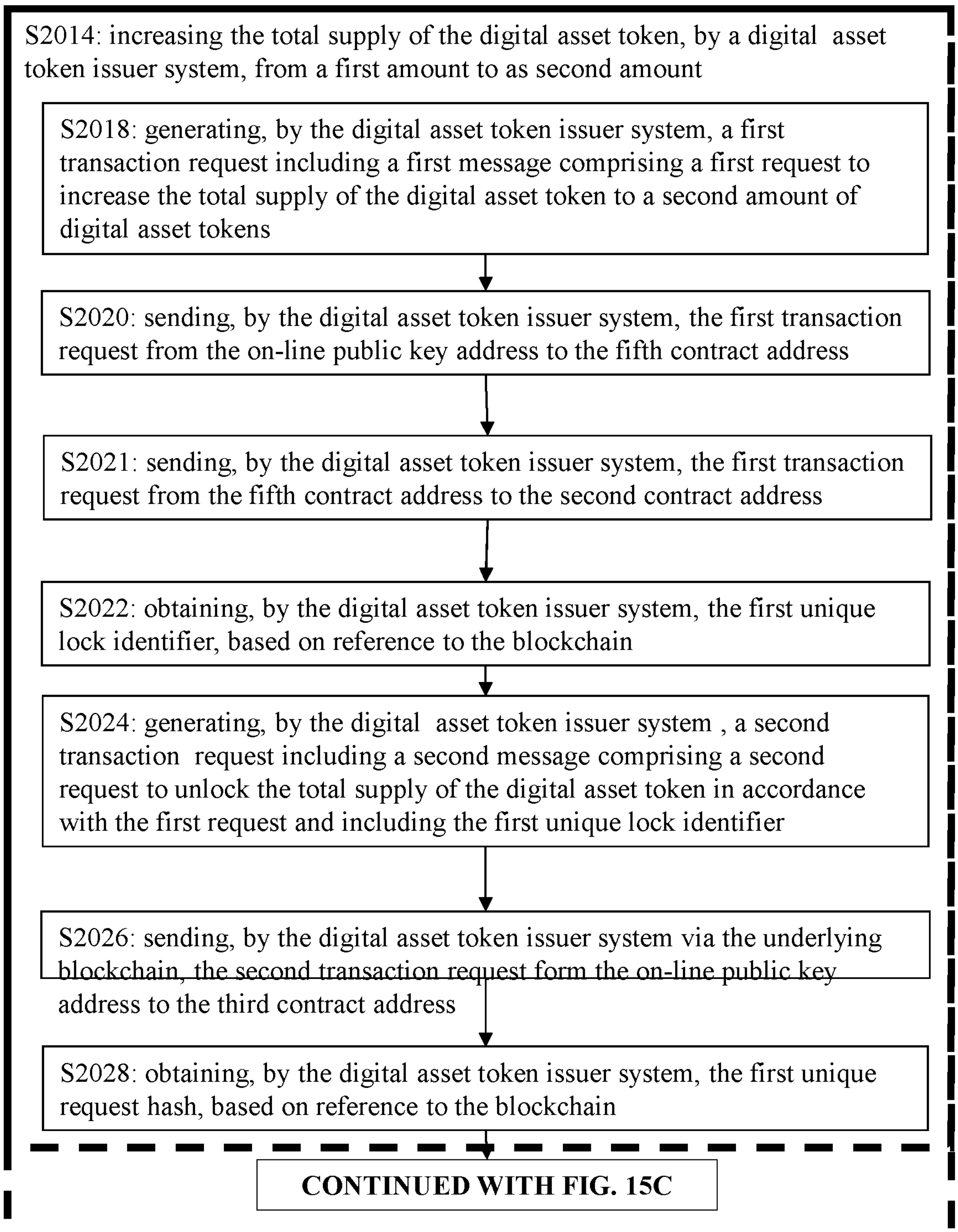
FIG. 15B is another flowchart of an exemplary process of increasing the total supply of tokens of a digital asset token in accordance with exemplary embodiments of the present invention.
Figure 15C:
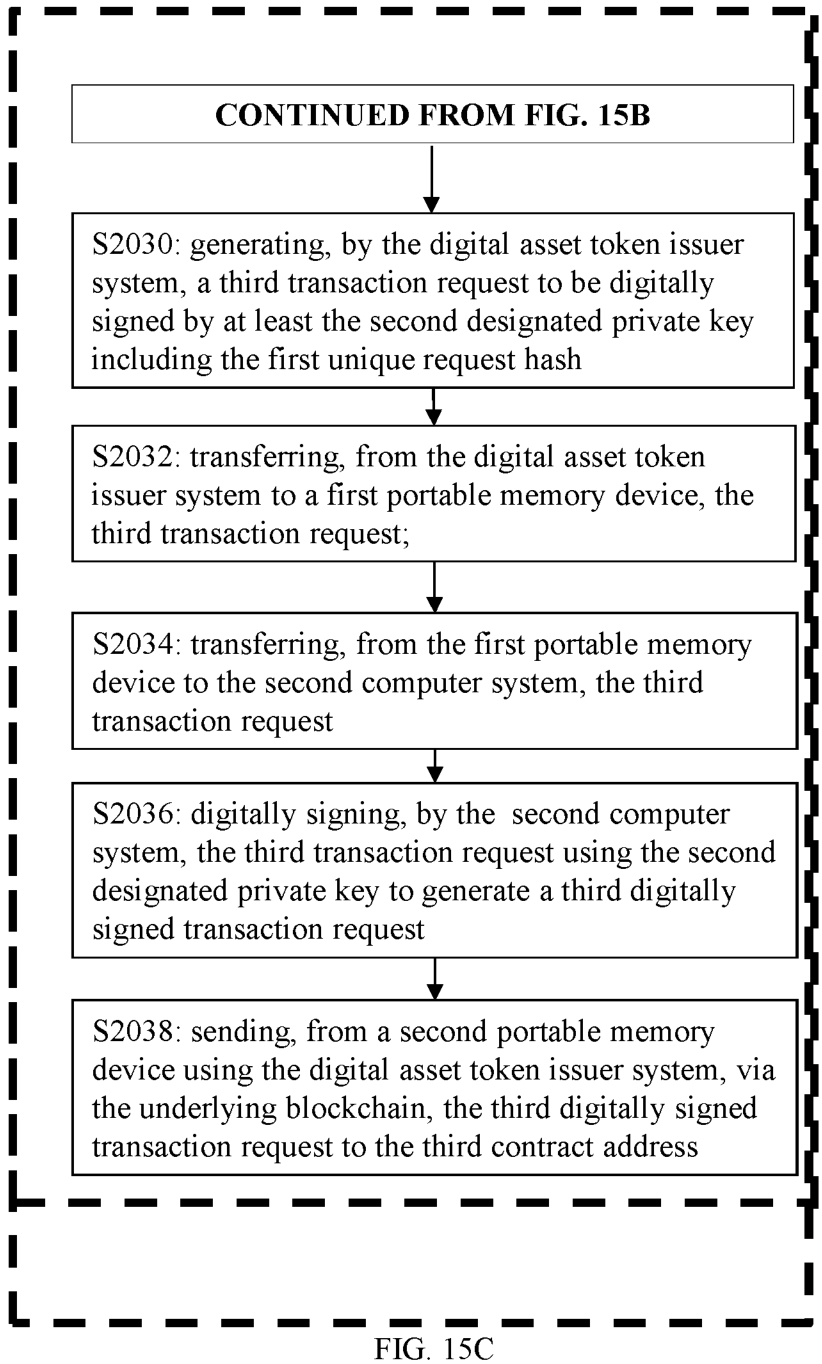
FIG. 15C is another flowchart of an exemplary process of increasing the total supply of tokens of a digital asset token in accordance with exemplary embodiments of the present invention.

The process described in FIG. 15B may continue with step S2030 of FIG. 15C. At step S2030, a third transaction request is generated by the digital asset token issuer system. The third transaction request may be digitally signed by at least the second designated private key (off-line keyset 1803) including the first unique request hash.

Next, at step S2032, the third transaction request is transferred from the digital asset token issuer system to a first portable memory device. A portable memory device may, in embodiments, be a flash drive, USB drives, external hard drives, and/or portable CD/DVD-ROM drives, to name a few.

At step 2034, the third transaction request is transferred from the first portable memory device to the second computer system. Next, at a step S2036, the third transaction request is digitally signed using the second designated private key (off-line keyset 1803) to generate a third digitally signed transaction request.

The process of FIGS. 15B and 15C may continue with step S2038. At step S2038, the third digitally signed transaction request is sent from a second portable memory device using the digital asset token issuer system to the third contract address (custodian (print limiter) 1350).

In embodiments, the first portable memory device is the second portable memory device. In embodiments, the first portable memory device is not the second portable memory device. In embodiments, the third digitally signed transaction request is returned to the STORE smart contract 1330. Once returned to the STORE smart contract 1330, the third digitally signed transaction request is returned to the print limiter 1813.

Referring back to FIG. 15A-1, the process may continue with step S2016. At step S2016, the digital asset token issuer system confirms that the total supply of digital asset tokens is set to the second amount. In embodiments, the third smart contract (custodian (print limiter) 1350) executes, via the blockchain network, the third digitally signed transaction request to validate the second request to unlock based on the third digitally signed transaction request and the first unique request hash and executes a first call to the second contract address (PRINT LIMITER 1360), to increase the total supply of the digital asset token to the second amount of digital asset tokens. In embodiments, the second contract address (PRINT LIMITER 1360) may return the first call to the fifth contract address (IMPL 1320). In embodiments, the fifth smart contract (IMPL 1320) executes, via the blockchain network, a second call to the fourth smart contract address (STORE 1330) to set the total supply of the digital asset tokens to the second amount of digital asset tokens. In embodiments, the fourth smart contract (STORE 1330) executes, via the blockchain, the second call to set the total supply of the digital asset tokens to the second amount of digital asset tokens.

In embodiments, the steps of FIGS. 15A and 15B may be rearranged and/or omitted.

Figures 2, 16A:
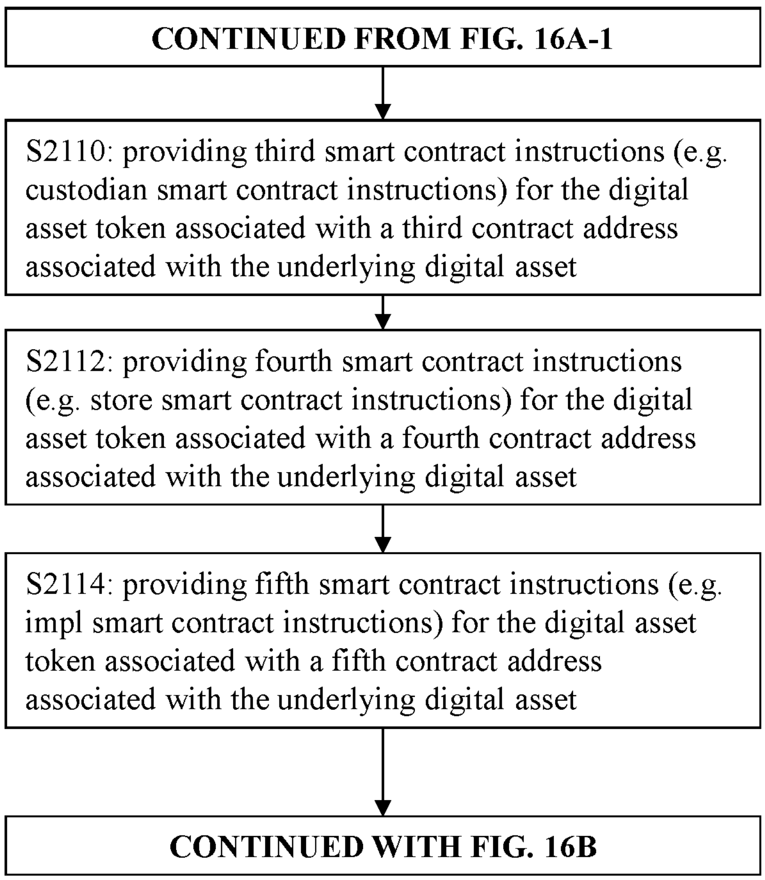

FIGS. 16A-1 and 16A-2 are flow charts of an exemplary process of increasing the total supply of digital asset tokens in accordance with exemplary embodiments of the present invention. The process of FIGS. 16A-1 and 16A-2 may begin with step S2102. In step S2102, a first designated key pair (on-line keyset 1 1362) including a first public key of an underlying digital asset and a corresponding first designated private key is provided. In embodiments, the underlying digital asset is maintained on a distributed public transaction ledger maintained by a plurality of geographically distributed computer systems in a peer-to-peer network in the form of the blockchain 1807. In embodiments, the first designated private key is stored on a first computer system which is connected to the distributed public transaction ledger through the internet (network 15). In embodiments, the first designated key pair may be multiple on-line keys with multiple electronic signatures.

In step S2104, a second designated key pair including a second designated public key (off-line keyset 1803) of the underlying digital asset and a corresponding second designated private key is provided. In embodiments, the second designated private key is stored on a second computer system which is physically separated from the first computer system and is not operatively or physically connected to the distributed public transaction ledger or the internet (network 15). In embodiments, the second computer system may be the hardware storage module 1900. In embodiments, the second designated key pair may be multiple on-line keys with multiple electronic signatures.

In step S2106, first smart contract instructions for a digital asset token associated with a first contract address associated with the blockchain associated with the underlying digital asset are provided. In embodiments, the first contract address is contract address 1 (proxy smart contract) 1809 and first smart contract instructions of step S2106 are the proxy contract instructions 1310A-1, both described in connection with FIG. 4B. The first smart contract instructions, may, be saved in the blockchain 1807 and include first delegation instructions and first authorization instructions. The first delegation instructions may delegate one or more first functions associated with the digital asset token to one or more delegated contract addresses associated with the underlying digital asset, the delegated contract addresses, in embodiments, being different than the first contract address. The first delegation instructions may be located with first delectation instructions module 1829 described in connection with FIG. 4B. The first smart contract instructions, may also include first authorization instructions for the second designated key pair. The first authorization instructions may be located with first authorization instructions module 1830 described in connection with FIG. 4B.

In step S2108, second contract instructions for the digital asset token associated with a second contract address associated with the blockchain associated with the underlying digital asset is provided. In embodiments, the second smart contract address is contract address 3 (print limiter smart contact) 1813 and the second smart contract instructions are the print limiter contract instructions 1360A-1, both described in connection with FIG. 4C. In embodiments, the second contract address is not the first contract address. The second smart contract instructions may be saved in the blockchain 1807 and, as described in connection with the print limiter contract instructions 1360A-1 of FIG. 4C (the descriptions of which applying herein), include: (1) token creation instructions; (2) custodian instructions; (3) second delegation instructions; (4) second authorization instructions; and (5) third authorization instructions. In embodiments, as described above in connection with print limiter contract instructions 1360A-1 of FIG. 4C (the description of which applying herein), the second smart contract instructions may also include: (6) token transfer instructions of token transfer instructions module 1843 to transfer tokens of the digital asset token from a first designated address to a second designated address.

In embodiments, as described above in connection with print limiter contract instructions 1360A-1 of FIG. 4C (the description of which applying herein), the second smart contract instructions may also include: (7) token destruction instructions of token destruction instructions module 1845 to destroy one or more tokens of the digital asset token. Token destruction instructions, in embodiments, may not be limited to print limiter contract instructions 1360A-1. In embodiments, additional smart contracts may also destroy tokens, such as IMPL smart contract 1320 (contract address 2), CUSTODIAN 1 smart contract 1819 (contract address 5), CUSTODIAN 2 smart contract 1350 (contract address 6), and/or CUSTODIAN 3 smart contract 1823 (contract address 7), to name a few.

In embodiments, as described above in connection with print limiter contract instructions 1360A-1 of FIG. 4C (the description of which applying herein), the second smart contract instructions may also include: (8) token balance modification instructions of token balance modification instructions module 1847 to modify a total number of tokens of the digital asset token assigned to a third designated address.

Referring to FIG. 16A-2, in step S2110, third smart contract instructions for the digital asset token associated with a third contract address associated with the blockchain associated with the underlying digital asset are provided. In embodiments, the third smart contract address is CUSTODIAN 2 smart contract 1350 (contract address 6) and the second smart contract instructions are the custodian 2 contract instructions 1350A-1, both described in connection with FIG. 4D. The third smart contract instructions may be saved in the blockchain 1807 and, as described in connection with the custodian 2 smart contract instructions 1350A-1 of FIG. 4D (the descriptions of which applying herein), include: (1) fourth authorization instructions and (2) fifth authorization instructions. The fourth authorization instructions of CUSTODIAN 2 first authorization instructions module 1849 (i.e. fourth authorization instructions module) may include instructions for the second designated key pair to authorize the issuance of instructions to the second smart contract instructions with respect to token creation. In embodiments, the authorization instructions with respect to token creation may be above the first threshold during the first time period.

In embodiments, a token creation request may exceed a ceiling (i.e. a request for 150 tokens when the ceiling is 100 tokens), CUSTODIAN 2 smart contract 1350 may authorize an increase in the ceiling. This authorization may be fifth authorization instructions of the CUSTODIAN 2 second authorization instructions module 1851 (i.e. fifth authorization instructions module), and may include instructions for the second designated key pair (off-line keyset 1803, . . . 1803N) to authorize the issuance of instructions to the first smart contract instructions to change the one or more designated contract address from the second contract address to a different designated contract address. In embodiments, a ceiling is raised by creating a second print limiter smart contract on the blockchain 1807 with a higher ceiling. Once the second print limiter smart contract is created, the request for token creation can be routed to the second print limiter smart contract.

A more detailed description of the process of raising the token creation ceiling is located above in connection with FIGS. 13A-1, 13A-2, 13B-1, and 13B-2, the description of which applying herein.

The process of FIGS. 16A-1 and 16A-2 may continue with step S2112. At step 2112, fourth smart contract instructions are provided for the digital asset token associated with a fourth contract address associated with the blockchain associated with the underlying digital asset. In embodiments, the fourth contract address is STORE smart contract 1330 (contract address 4) and fourth smart contract instructions of step S2112 are the store contract instructions 1330A-1, both described in connection with FIG. 4E. The fourth smart contract instructions may include: (1) storage instructions and (2) sixth authorization instructions. In embodiments, storage instructions of storage instructions module 1853 may include instructions for transaction data related to the digital asset token to be stored. The transaction data may include (for all issued tokens of the digital asset token): (1) public address information associated with the underlying digital asset; and (2) corresponding token balance information associated with said public address information. In embodiments, sixth authorization instructions of authorization instructions module 1855 may include instructions for modifying the transaction data in response to request from the second contract address (print limiter 1813).

At a step S2114, fifth smart contract instructions are provided for the digital asset token associated with a fifth contract address associated with the blockchain associated with the underlying digital asset. In embodiments, the fifth smart contract address is IMPL smart contract 1320 (contract address 2) and the fifth smart contract instructions are impl contract instructions 1315A-1.

Figure 16B:
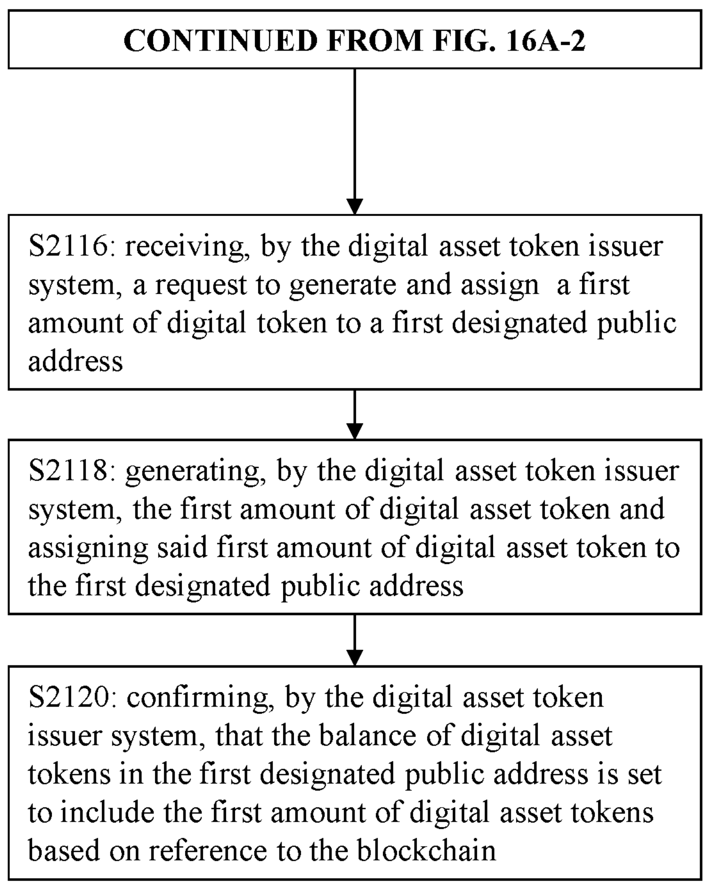
FIG. 16B is a flowchart of an exemplary process of increasing the total supply of tokens of a digital asset token in accordance with exemplary embodiments of the present invention.

The process of FIGS. 16A-1 and 16A-2 may continue with step S2116 of FIG. 16B. At step S2116, a request to generate and assign a first amount of digital token to a first designated public address is received by the digital asset token issuer system. In embodiments, the fist designated public address may be User 1 public address 1827, User 1 public address 1827 being associated with User 1 Device 1805. In embodiments, a validation request may be sent to the on-line key public address 1 1825. The validation request may determine whether the first amount of digital token is available to be generated and assigned. In embodiments, the digital asset token issuer system may determine whether the on-line key has the authority to process the request to generate and assign the first amount of digital token. This determination may be made based on a variety of factors, including whether the first amount of digital token is actually available and/or the ceiling of digital asset tokens for a specific time period, to name a few.

At step, 52118, the digital asset token issuer system generates the first amount of digital asset token and assigns the first amount of digital asset tokens to the first designated public address. In embodiments, step S2118 may include the digital asset token issuer system generating a first transaction request. The first transaction request, in embodiments, may be address from the online public key address (On-line public address 1 1825) to the fifth contract address (IMPL Smart Contract (Contract Address 2) 1320). The first transaction request may include a first message including a first request to generate the first amount of digital asset token and assign said first amount of digital asset token to the first designated public address. In embodiments, the first transaction request is digitally signed by the first on-line private key (on-line keyset 1362). After the transaction request is generated, the first transaction request may be sent from the online public key address (On-line public address 1 1825) to the fifth contract address (IMPL smart contract 1320 (contract address 2)). In embodiments, the first transaction request includes first transaction fee information for miners in the blockchain network to process the first transaction request.

After the first transaction request is received by the fifth contract address, in embodiments, the fifth smart contract (IMPL 1320) may execute, via the blockchain 1807, the first transaction request to validate the first request and the authority of the first on-line private key (on-line keyset 1 1362) to call the second smart contract (print limiter 1813) to execute the first transaction request. The second smart contract (print limiter 1360) may also send a first call request to the fifth contract address (IMPL smart contract 1320 (contract address 2)) to generate and assign to the first designated public address (user 1 public address 1827) the first amount of digital asset tokens.

In response to the return call, in embodiments, the fifth smart contract (IMPL smart contract 1320) may execute via the blockchain 1807 the first call request to generate a first unique lock identifier. The fifth smart contract (IMPL smart contract 1320) may return to the second smart contract address (print limiter 1813) the first unique lock identifier.

In embodiments, in response to the return of the first unique lock identifier, the second smart contract (print limiter 1360) may execute, via the blockchain 1807, a second call request to the fifth smart contract address (IMPL smart contract 1320 (contract address 2)) to confirm the first call request with the first lock identifier.

In response to the second call request, in embodiments, the fifth smart contract (IMPL smart contract 1320) executes, via the blockchain 1807, the pending first call request to execute a third call request to the fourth contract address (STORE smart contract 1330 (contract address 4)) to obtain the total supply of digital asset tokens in circulation.

In embodiments, the fifth smart contract (IMPL 1320) executes, via the blockchain network 1807, the call to execute the first call to execute a second call to the fourth smart contract (STORE smart contract 1330) to obtain the total supply of digital asset tokens in circulation. After executing the third call request, the fourth smart contract (STORE smart contract 1330) returns, to the fifth contract address (IMPL smart contract 1320 (contract address 2)), a second amount of digital asset tokens corresponding to the total supply of digital asset tokens in circulation.

In response to the return of the second amount, in embodiments, the fifth smart contract (IMPL smart contract 1320 (contract address 2)) executes via the blockchain 1807 a fourth call request to the fourth contract address (STORE smart contract 1330 (contract address 4)) to set a new total supply of digital asset tokens in circulation to a third amount. The third amount, in embodiments, may be the total of the first amount and the second amount.

In embodiments, in response to the fourth call request, the fourth smart contract (STORE smart contract 1330) executes via the blockchain 1807 the fourth call request and sets a new total supply of digital asset tokens in circulation at the third amount. Once the total supply is set to the third amount, the fourth smart contract (STORE smart contract 1330) returns to the fifth contract address (IMPL smart contract 1320 (contract address 2)).

The fifth smart contract executes, in embodiments, in response to the return, via the blockchain 1807, a fifth call request to the fourth contract address (STORE smart contract 1330 (contract address 4)) to add the first amount of digital asset tokens to the balance associated with the first designated public address.

In embodiments, in response to the fifth call request, the fourth smart contract (STORE smart contract 1330) executes, via the blockchain 1807, the fifth call request to set the balance of digital asset tokens in the first designated public address (user 1 public address 1827) at a fourth amount which includes the addition of the first amount to the previous balance.

In embodiments, the fourth smart contract (STORE smart contract 1330) returns to the fifth contract address (IMPL smart contract 1320 (contract address 2)). Once the fifth contract address receives the return, in embodiments, the fifth contract address returns to the second contract address (PRINT LIMITER smart contract 1360 (contract address 3)).

The process of FIGS. 16A-B may continue with step S2120. At step S2120, the digital asset token issuer system confirms the balance of digital asset tokens in the first designated public address (user 1 public address 1827) is set to include the first mount of digital asset tokens based on reference to the blockchain.

In embodiments, the steps of FIGS. 16A and 16B may be rearranged and/or omitted.

Figure 13D:
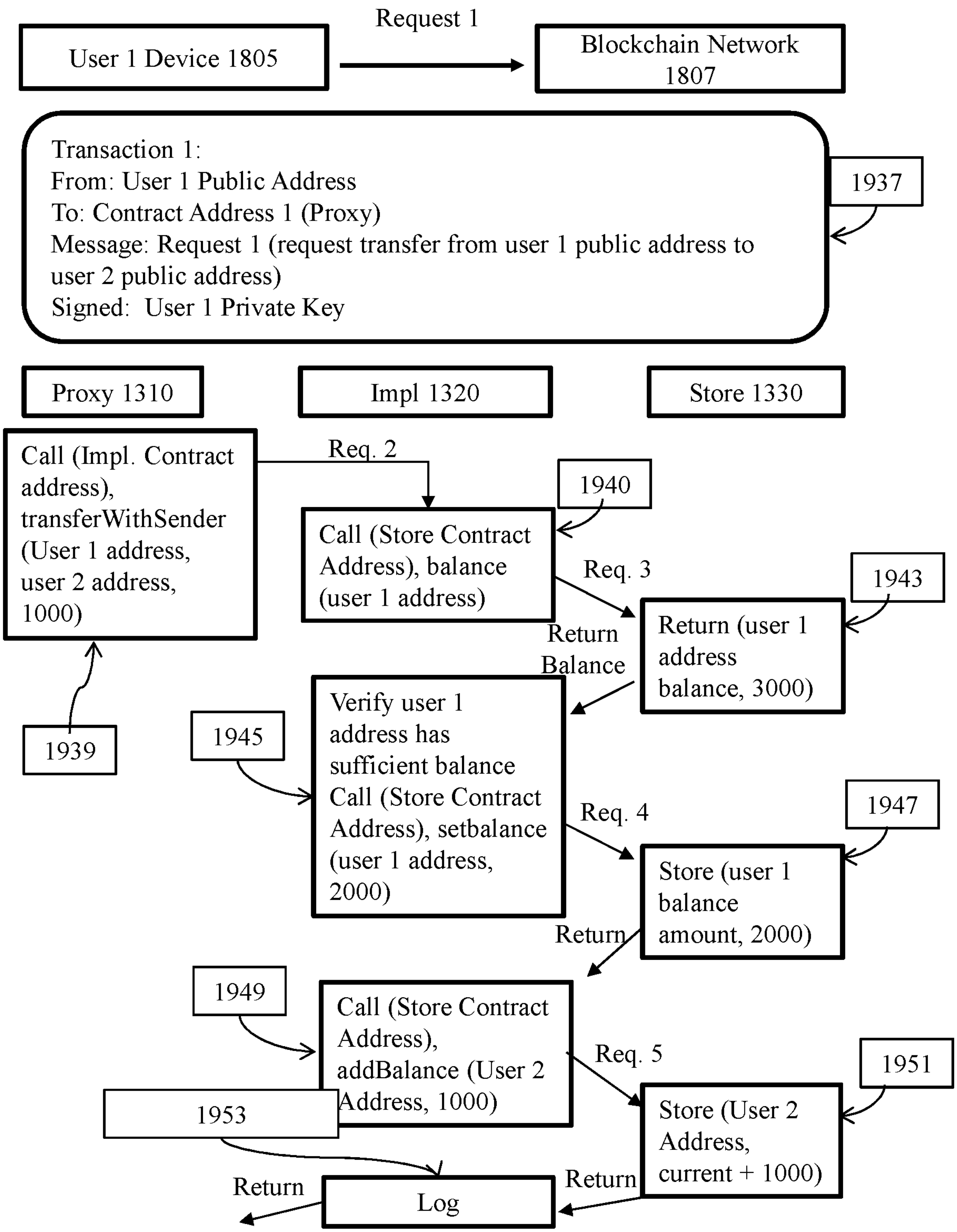
FIG. 13D is a schematic drawing of an exemplary process of a transfer request in accordance with exemplary embodiments of the present invention.

In embodiments, the process of FIGS. 16A-B may further include the process described in connection with FIG. 13D. The process starts with the blockchain 1807 receiving, from a first user device associated with the first designated public address via the blockchain, a second transaction request 1937. The first user device, may be user device 1 1805. The first designated public address may be user 1 public address 1827. The second transaction request may be addressed from the first designated public address to the first contract address (contract address 1 (proxy smart contract) 1809). In embodiments, the second transaction request may include a second message including a second request to transfer a fifth amount of digital assets from the first designated public address to a second designated public address. The second transaction request may be digitally signed by a first user private key. In embodiments, the first user private key may be mathematically related to first designated public address (user 1 public address 1827). In embodiments, the first user device 1805 has access to the first user private key prior to sending the second transaction request. In embodiments, the second transaction request includes second transaction fee information for miners in the blockchain network to process the second transaction request.

Once the second transaction request is sent, the first smart contract address (contract address 1 (proxy smart contract) 1809) executes, via the blockchain 1807, the second transaction request to execute 1939, via the blockchain 107 a sixth call request to the fifth contract address (IMPL smart contract 1320 (contract address 2)) to transfer a fifth amount of digital assets form the first designated public address (User 1 public address 1827) to the second designated public address (User X public address 1827X). As shown in FIG. 13D, the proxy smart contract 1310 calls the IMPL smart contract 1320 to perform a function—transferWithSender (user 1 address, user 2 address, 1000).

In response to the sixth call request, the fifth smart contract (IMPL smart contract 1320 (contract address 2)) executes, via the blockchain 1807, authorization instructions to verify the sixth call came from an authorized contract address, and, upon verification, executes a seventh call request 1941 to the fourth contract address (STORE smart contract 1330 (contract address 4)) to obtain a sixth amount of digital asset tokens which reflect a current balance of digital asset tokens associated with the first designated public address. As shown in FIG. 13D, the IMPL smart contract 1320 calls the STORE smart contract 1330 to determine the balance associated with the user 1 public address.

In response to receiving the seventh call request, the fourth smart contract address (STORE smart contract 1330 (contract address 4)) executes 1943, via the blockchain 1807, the seventh call request to return the sixth amount of digital asset tokens. As shown in FIG. 13D, the store smart contract returns the balance associated with the user 1 address, which, in the case of the example shown in connection with FIG. 13D, is 3000.

In response to the return of the sixth amount of digital asset, the fifth smart contract (IMPL smart contract 1320 (contract address 2)) executes 1945, via the blockchain 1807, a balance verification instruction to confirm that the fifth amount of digital asset tokens is less than or equal to the sixth amount of digital asset tokens. In the case where the fifth amount of digital asset tokens is less than or equal to the sixth amount of digital asset tokens, the fifth smart contract executes, via the blockchain network 1807, a seventh call request to the fourth contract address (STORE smart contract 1330 (contract address 4)) to set a new balance for the digital asset tokens in the first designated public address to a seventh amount which equals the sixth amount less the fifth amount. As shown in FIG. 13D, the IMPL smart contract 1320 verifies that user 1 has a sufficient balance. The user balance in this example is 3000. The transfer request is for 1000. Thus, user 1 has a sufficient balance to transfer. Once verified, the IMPL smart contract 1320 sets the user 1 balance at 2000 (the original user balance 3000 less the transfer request amount 1000).

In response to the seventh call, the fourth smart contract (STORE smart contract 1330) executes 1947, via the blockchain 1807, the seventh call to set and store the new balance for the first designated public address as the seventh amount and returns the new balance for the first designated public address as the seventh amount. As shown in FIG. 13D, the store smart contract sets the user 1 balance as the seventh amount (2000).

In response to the return of the new balance, the fifth smart contract (IMPL smart contract 1320) executes 1949, via the blockchain 1807, an eighth call to add the second amount of digital asset tokens to the balance associated with the second designated public address (User X public address 1827X) at a seventh amount which includes the addition of the second amount to a previous balance associated with the second designated public address. As shown in FIG. 13D, the IMPL smart contract 1320 calls the store smart contract to add the transfer amount (1000) to the balance associated with the second user address.

In response to receiving the either call, the store smart contract executes the eighth call and sets the balance associated with the second user to the balance before the transfer and the transfer amount 1951.

In embodiments, the STORE smart contract 1330 returns to the IMPL smart contract 1320. In response to the return, the IMPL smart contract 1320 may log the new balance associated with the second user 1953. In embodiments, the IMPL smart contract 1320 may then return to the proxy smart contract 1310.

In embodiments, once the transfer has been completed, the first user device (user 1 device 1805) may confirm that the balance of digital asset tokens in the first designated public address is the sixth amount of digital asset tokens based on reference to the blockchain 1807. Similarly, the second user device (user X device 1805X) may also confirm that the balance of digital asset tokens in the second designated public address is the seventh amount of digital asset tokens based on reference to the blockchain 1807.

In embodiments, the process of FIGS. 16A-B may further include the process described in connection with FIG. 13E. In embodiments, the process may begin with providing a third designated key pair. The third designated key pair, in embodiments, may include a third designated public key of the underlying digital asset and a corresponding third designated private key. The third designated private key may be stored on a third computer system which is connected to the distributed public transaction ledger through the internet (network 15). In embodiments, the third designated key pair may be the first designated key pair. In embodiments, the third designated key pair may be the second designated key pair. In embodiments, the third computer system may be the first computer system. In embodiments, the third computer system is not the first computer system. In embodiments, the administrator system 1801 includes the first computer system and the third computer system.

The blockchain 1807 may receive a second transaction request 1955 by the blockchain 1807 from the third computer system (i.e. user device 1). The second transaction request may include a second message including a second request to burn a fifth amount of digital asset tokens from a balance associated with the third designated public key address. The second transaction request may be sent from the third designated public key address to the fifth contract address (IMPL smart contract 1320 (contract address 2)). The second transaction request, in embodiments, is digitally signed by a third designated private key.

In response to receiving the second transaction request, the fifth smart contract (IMPL smart contract 1320) executes 1957, via the blockchain 1807, the second transaction request to execute, via the blockchain 1807, a sixth call request to the fourth contract address (STORE smart contract 1330 (contract address 4)) to obtain a sixth amount of digital asset tokens which reflect a current balance of digital asset tokens associated with the third designated public key address. As shown in FIG. 13E, the IMPL smart contract 1320 calls the store contract address 1815 to request a balance of digital asset tokens associated with the third designated public address (address 1).

In response to the sixth call request, the fourth smart contract (STORE smart contract 1330), executes 1959 via the blockchain 1807, the seventh call request to return the sixth amount of digital asset tokens. As shown in FIG. 13E, the STORE smart contract 1330 determines that the balance associated with the third designated public address is 3000. The STORE smart contract 1330 returns the amount (3000) to the IPL smart contract 1320.

In response to the return of the sixth amount of digital asset, the fifth smart contract (IMPL smart contract 1320) executes 1961, via the blockchain 1807, a balance verification instruction to confirm that the fifth amount of digital asset tokens is less than or equal to the sixth amount of digital asset tokens. In the case where the fifth amount of digital asset tokens is less than or equal to the sixth amount of digital asset tokens, the fifth smart contract (IMPL smart contract 1320) executes, via the blockchain 1807, a seventh call request to the fourth contract address (STORE smart contract 1330 (contract address 4)) to set a new balance for the digital asset tokens in the third designated public key address to a seventh amount which equals the sixth amount less the fifth amount. As shown in FIG. 13E, the IMPL smart contract 1320 verifies that the third designated public address (address 1) has as sufficient balance because 1000 is less than the current balance of 3000. The IMPL smart contract 1320 then executes a call to set the balance of associated with the third designated public address (address 1) to 2000 (3000 less 1000 equals 2000).

In response to the seventh call, the fourth smart contract (STORE smart contract 1330) executes 1963, via the blockchain 1807, the seventh call to set and store the new balance for the third designated public key address as the seventh amount and returns the new balance for the third designated public key address as the seventh amount. As shown in FIG. 13E, the STORE smart contract 1330 stores the new balance as 2000 and returns to the IMPL smart contract 1320.

In response to the return of the new balance, the fifth smart contract (IMPL smart contract 1320) executes 1965, via the blockchain 1807, an eighth call request to the fourth contract address (STORE smart contract 1330 (contract address 4)) to obtain a total supply of digital asset tokens in circulation. As shown in FIG. 13E, the IMPL smart contract 1320 calls the STORE smart contract 1330, requesting a total supply of digital asset tokens.

In response to the eighth call request, the fourth smart contract (STORE smart contract 1330) executes 1967, via the blockchain 1807 the eight call request and returns, to the fifth contract address (IMPL smart contract 1320 (contract address 2)), an eighth amount of digital asset tokens corresponding to the total supply of digital asset tokens in circulation. As shown in FIG. 13E, the STORE smart contract 1330 determines that the total supply of tokens is 10,000 and returns that value to the IMPL smart contract 1320.

In response to the return of the eighth amount, the fifth smart contract (IMPL smart contract 1320) executes 1969, via the blockchain, a ninth call request to the fourth contract address (STORE smart contract 1330 (contract address 4)) to set a new total supply of digital asset tokens in circulation to a ninth amount, which is the eighth amount less the fifth amount. As shown in FIG. 13E, the IMPL smart contract 1320 calls the STORE smart contract 1330 to set the total supply of the digital asset tokens to 9,000 (10,000 less 1,000).

In response to the ninth call request, the fourth smart contract (STORE smart contract 1330) executes 1971, via the blockchain 1807, the ninth call request and sets a new total supply of digital asset tokens in circulation at the ninth amount and returns to the fifth contract address (IMPL smart contract 1320 (contract address 2)). In embodiments, the token balance modification instructions module 1847 balances the deposits and withdrawals at a predetermined time (i.e. end of the day or close of business).

In response to receiving a return from the STORE smart contract 1330, the IMPL smart contract 1320 logs 1973 the new total supply of digital asset tokens in circulation.

FIG. 13C is a schematic drawing of an exemplary process of limiting the print limiter with respect to a public address in accordance with exemplary embodiments of the present invention. The process at FIG. 13C may begin with a first transaction request 1917 by an administrator system 1801 to blockchain 1807. The first transaction request may be from on-line key public address 1825 to PRINT LIMITER smart contract 1360 (contract address 3). In embodiments, the first transaction request may include a message requesting the limited print of 10 million digital asset tokens to user 1 public address 1827.

In response to receiving the first transaction request, the PRINT LIMITER smart contract 1360 executes 1919 a first call request, via the blockchain 1807, to the impl smart contract address 1811 to print 10 million digital asset tokens to user 1 public address 1827. In response to receiving the first call request, the impl returns a lockID 1921 to the print limiter smart contract address 1813.

In response to receiving the lockID, the print limiter smart contract executes 1923 a second call request, via the blockchain 1807, to the impl smart contract address 1811 to confirm the print of 10 million digital asset tokens using the lockID.

In response to receiving the second call, the IMPL smart contract 1320 retrieves the pending request to print 10 million digital asset tokens and executes 1925, via the blockchain 1807, a third call request to the store smart contract address 1815 to determine the total supply of digital asset tokens.

In response to receiving the third call, the STORE smart contract 1330 determines 1927 the total supply of digital asset tokens to be 100 million digital asset tokens. The total supply amount determined by the STORE smart contract 1330 is then returned by the STORE smart contract 1330 to the impl smart contract address 1811.

In response to receiving the return from the store smart contract address 1815, the impl smart contract address executes 1929, via the blockchain, a fourth call request to set the total supply of digital asset tokens to 110 million, the original total supply 100 million plus the requested print amount of 10 million. The fourth call request may be sent to the store smart contract address 1815.

In response to receiving the fourth call request, the STORE smart contract 1330 sets 1931 the total supply of digital asset tokens to 110 million digital asset tokens and returns to the impl smart contract address 1811.

In response to receiving the return from the store smart contract address 1815, the impl smart contract may execute 1933 a fifth call to add the newly printed 10 million digital asset tokens to user 1 public address 1827. The call may be sent to the store smart contract address 1815.

In response to receiving the fifth call to add the 10 million digital asset tokens to user 1 public address 1827, the STORE smart contract 1330 may store 1935 a new balance associated with the user 1 public address 1827, the new balance being the original balance plus the 10 million digital asset tokens. The STORE smart contract 1330 may then return to the impl smart contract address 1811. In response to receiving the return from the STORE smart contract 1330, the impl smart contract may return to the print limiter smart contract public address 1813.

Figure 13E:
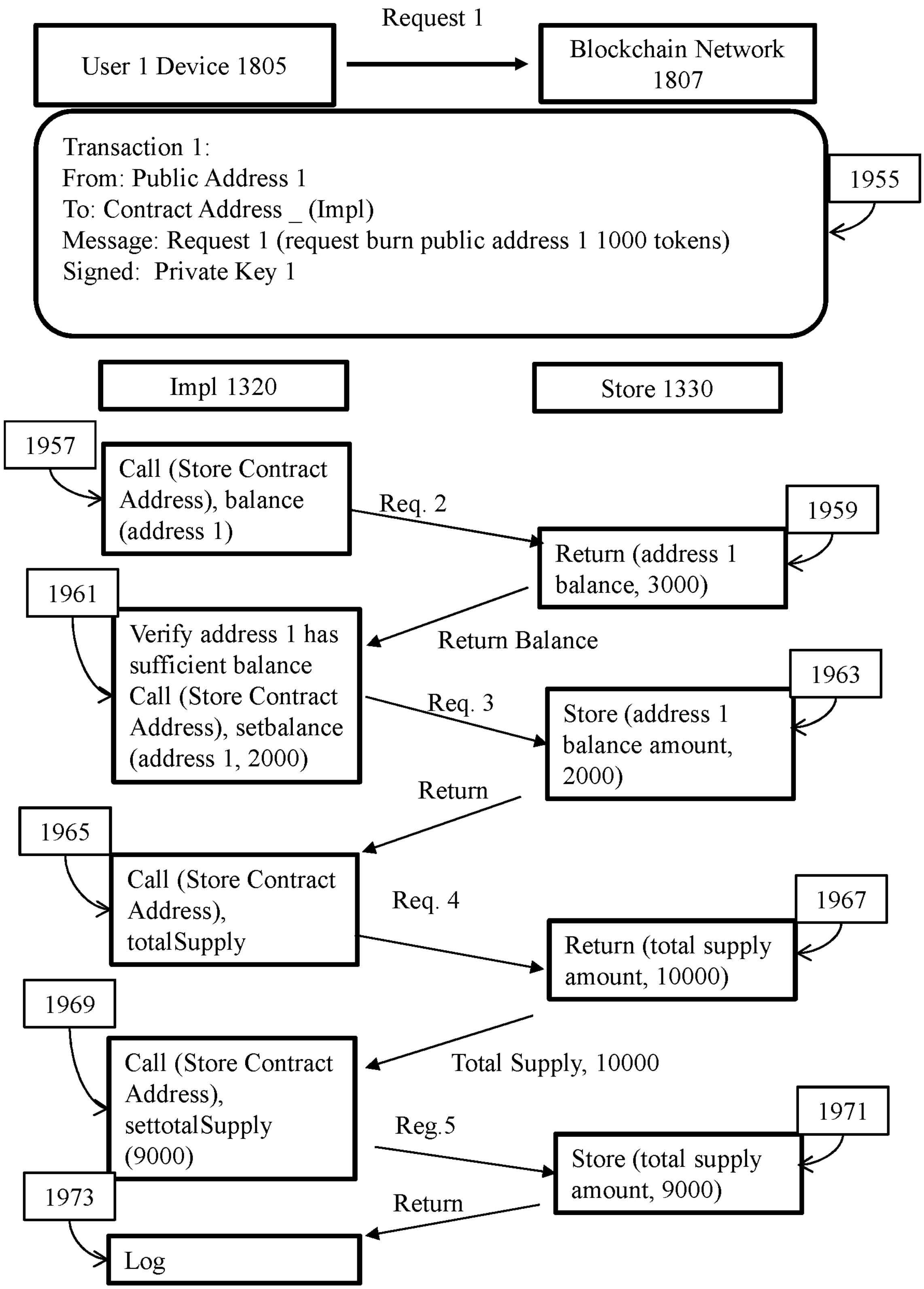
FIG. 13E is a schematic drawing of an exemplary process of a burn request in accordance with exemplary embodiments of the present invention.
Figure 17A:
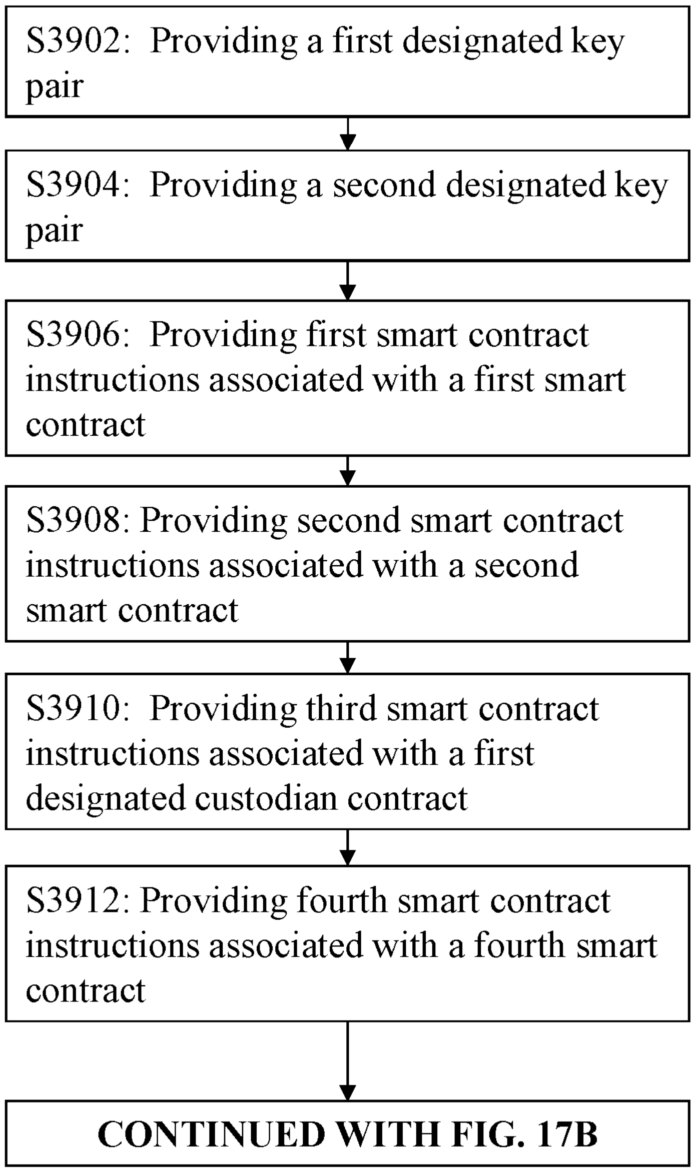
FIGS. 17A-17E are flow charts of processes for increasing a total supply of digital asset tokens in accordance with exemplary embodiments of the present invention.
Figure 17B:
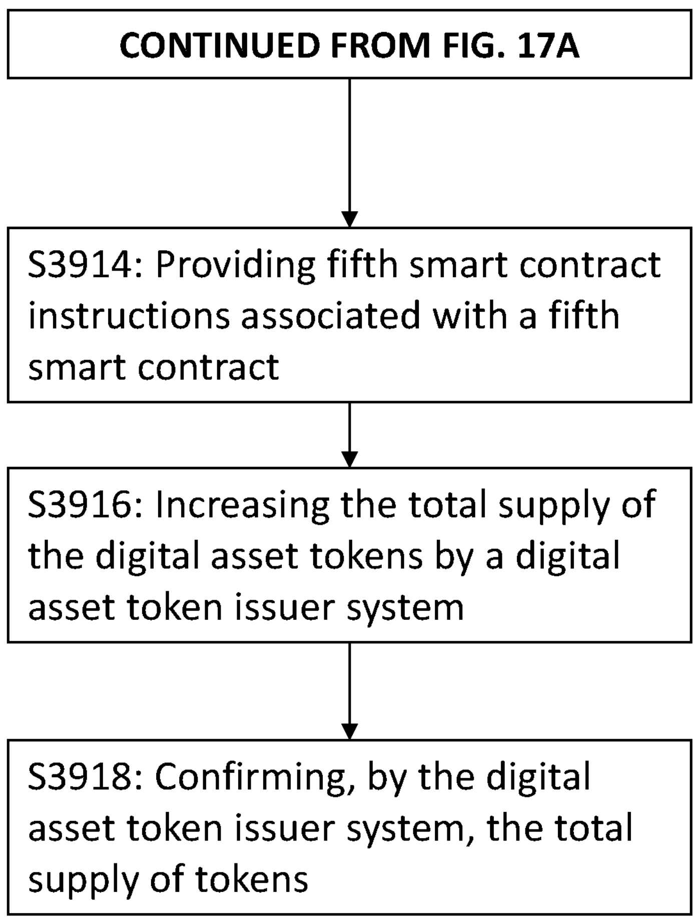
Figure 19A:
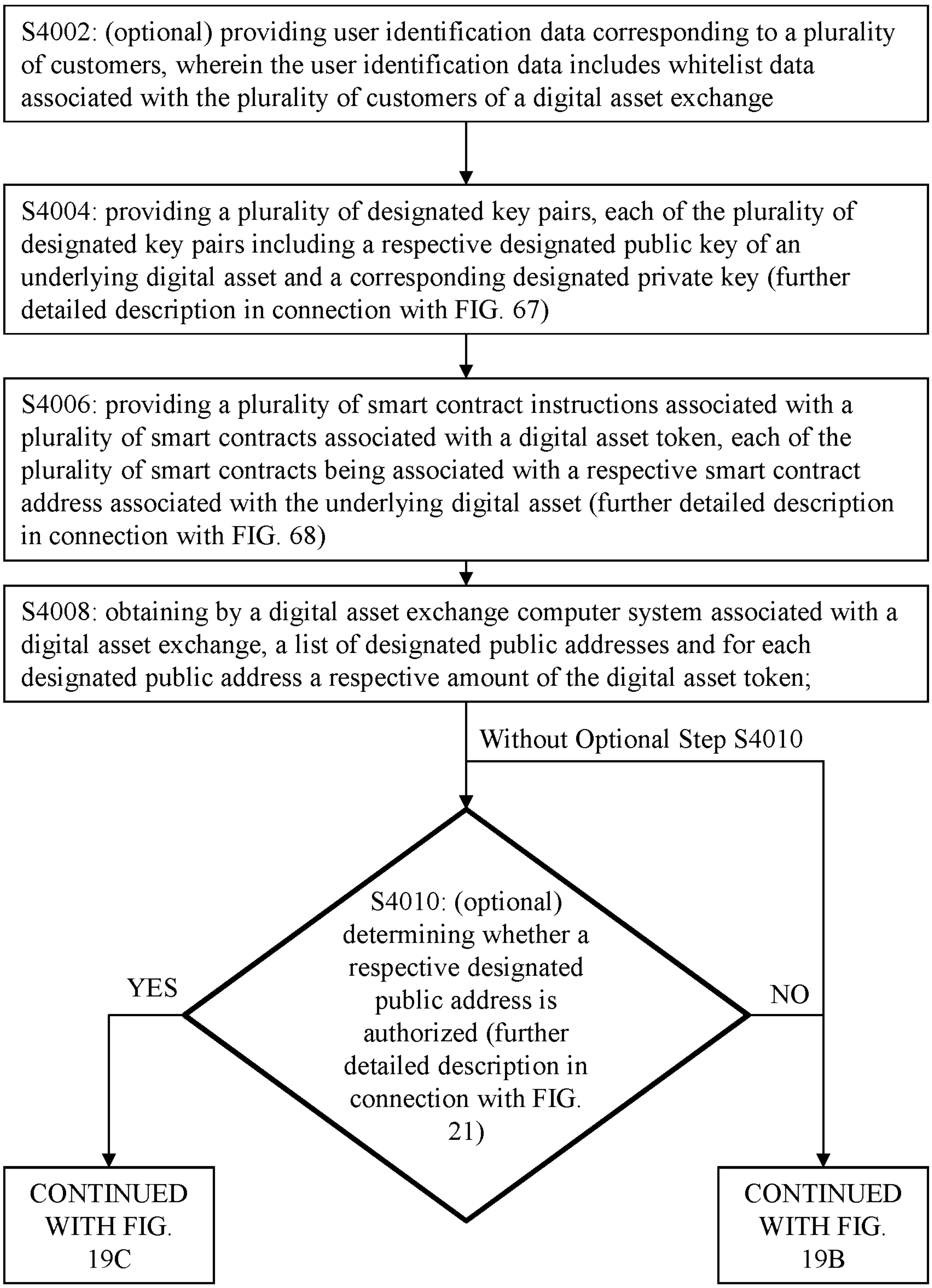
FIGS. 19A-19C are flow charts of processes for withdrawing digital asset tokens in accordance with exemplary embodiments of the present invention.

In embodiments, the steps of FIGS. 19A through 13E may be rearranged and/or omitted. In embodiments, any of the smart contracts may be provided at any of the contract addresses, for example, the fourth contract address may correspond to the IMPL smart contract while fifth contract address may correspond to the STORE smart contract. In embodiments, one or more smart contract may be combined with one of more other smart contract. FIGS. 17A-17B illustrates a process for increasing a total supply of digital asset tokens in accordance with exemplary embodiments of the present invention. The process of FIGS. 17A through 17B may begin at a step S3902. At step S3902, a first designated key pair (e.g. on-line keyset 1 1362) may be provided. In embodiments, the first designated key pair may include, at least, a first designated public key and a corresponding first designated private key. The first designated public key, in embodiments, may be used to provide a first designated public address, which may be associated with an underlying digital asset. The underlying digital asset (e.g. Neo, ether, to name a few) may be maintained on a distributed public transaction ledger maintained in the form of a blockchain. In embodiments, a first computer system may store the first designated private key, similarly to on-line keyset 1 1362. The first computer system may have access to, or be connected with, the distributed public transaction ledger through a network, such as the internet (e.g. network 15). In embodiments, the first designated private key may be mathematically related to the first designated public key. In embodiments, the first designated public address is the first designated public key. In embodiments, the first designated public address is derived from the first designated public key.

In embodiments, the first designated key pair may include a plurality of key pairs (e.g. on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g. a hash). In embodiments, the cryptographic hash function may be designed to be a one-way function (e.g. a function that is infeasible to invert). The cryptographic hash function, may include one or more of the following prosperities: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g. a brute force approach); and (4) unique, such that messages to not have the same hash value and/or small changes to a message alter the hash value such that the values do not correlate, to name a few.

The process of FIGS. 17A through 17B may continue at a step S3904. At step S3904, a second designated key pair (e.g. off-line keyset 1 1803) is provided. The second designated key pair, similar to the first designated key pair, may include a second designated public key and a corresponding second designated private key. The second designated public key may be mathematically related to the corresponding second designated private key. In embodiments, the second designated key pair may correspond to the same public address as the first designated key pair (e.g. the first designated public address associated with the underlying asset). In embodiments, the second designated key pair may correspond to a different public address than the first designated key pair. For example, the first designated key pair may correspond to the first designated public address and the second designated key pair may correspond to a second designated public address. In embodiments, where the second designated key pair corresponds to a second designated public address, the second designated public address may be the second designated public key.

In embodiments, the second designated key pair may be stored on a second computer system. The second computer system may be physically and/or operationally separated from the first computer system. Additionally, the second computer system may be physically and/or operationally separated (e.g. not connected to) from the distributed public transaction ledger and/or the internet (e.g. network 15). This separation, as described above in connection with FIGS. 4A-1 AND 4A-2, may be for security purposes, adding an additional layer of security by ensuring that unwanted access is not granted via network 15.

In embodiments, the second computer system may be a hardware storage module. The hardware storage module may be located in a vault (e.g. Vault 70-A1) Location A, Location B, Location C . . . Location N described above in connection with FIGS. 31A-31D. Additionally, a more detailed description of storage, and particularly cold storage, is located above under the "Cold Storage" heading.

In embodiments, the hardware storage module, may include one or more types of storage mediums such as any volatile or non-volatile memory, or any removable or non-removable memory implemented in any suitable manner to store the second designated key pair. For example, the second designated key pair may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the second designated key pair may include a plurality of key pairs (e.g. off-line keyset N 1803N). For example, the second designated key pair may further include a first additional designated public key and a corresponding first additional designated private key. In embodiments, each key pair of the aforementioned plurality of key pairs of the second designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the second designated public address may be derived by using and/or applying a cryptographic hash function of the second designated public key. In embodiments, the second designated public address is a result of the cryptographic hash function, or, in embodiments, at least a part of the result of the cryptographic hash function. The cryptographic hash function applied may be similar and/or the same cryptographic hash function applied to the first designated key pair. In embodiments, the cryptographic hash function applied to the second designated key pair may be different than the cryptographic hash function applied to the first key pair. A different cryptographic hash function may be used, in embodiments, as an additional security measure.

In embodiments, the process of FIG. 17A may continue with step S3906 where first smart contract instructions (e.g. PROXY Contract Instructions 1310A-1) associated with a first smart contract (e.g. PROXY Smart Contract 1310) are provided. The first smart contract may have a corresponding first contract address (e.g. Contract Address 1 of Proxy Smart Contract 1310) associated with the blockchain of the underlying digital asset. In embodiments, the first smart contract instructions may be saved as part of the blockchain of the underlying digital asset and/or include one or more of the following instructions: (1) first delegation instructions and/or (2) first authorization instructions, to name a few. The first delegation instructions may delegate one or more first functions associated with the digital asset token to one or more delegated contract addresses associated with the blockchain of the underlying digital asset. The one or more delegated contract addresses, in embodiments, may be different than the first contract address. For example, the one or more delegated contract addresses may include a second contract address, which may be different than the first contract address. The first delegation instructions may similar to the delegation instructions described above in connection with PROXY Delegation Instructions Module 1829.

The first authorization instructions, in embodiments, may be associated with the second designated key pair. In embodiments, first authorization instructions may be similar to the authorization instructions described above in connection with PROXY Authorization Instructions Module 1831.

In embodiments, the first smart contract may be PROXY smart contract 1310 described above in connection with FIGS. 4A and 4B, the description of which applying herein.

The process or FIG. 17A may continue with step S3908 where second smart contract instructions (e.g. PRINT LIMITER Contract Instructions 1360A-1) associated with a second smart contract (e.g. PRINT LIMITER Smart Contract 1360) is provided. The second smart contract may be associated with a second contract address (e.g. Contract Address 3 described above in connection with the PRINT LIMITER Smart Contract 1360) associated with the blockchain of the underlying digital asset. The second smart contract instructions may be saved as part of the blockchain for the underlying digital asset and/or include one or more of the following instructions: (1) print limiter token creation instructions, (2) second authorization instructions, and/or (3) third authorization instructions, to name a few.

The print limiter token creation instructions, in embodiments, may indicate one or more conditions under which digital asset tokens of the underlying digital asset are created. In embodiments, the print limiter token creation instructions may be similar to the PRINT LIMITER token creation instructions described above in connection with the PRINT LIMITER Token Creation Instructions Module 1833.

The second authorization instructions, in embodiments, may include instructions to create tokens of the digital asset token. In embodiments, the first designated key pair is designated to authorize the second authorization instructions. In embodiments, the second designated key pair is designated to authorize the second authorization instructions. The second authorization instructions, in embodiments, may include instructions limiting the creation of digital asset tokens. The limitation placed on token creation may prevent the creation of tokens above a first threshold. For example, the second authorization instructions may limit the creation of tokens to 100,000 tokens. In embodiments, the first threshold may be relative to a first period of time. For example, the second authorization instructions may limit the creation of tokens to 500,000 tokens per day. In embodiments, the second authorization instructions may be similar to the first authorization instructions described above in connection with PRINT LIMITER First Authorization Instructions Module 1839.

The third authorization instructions, in embodiments, may also include instructions with respect to token creation. In embodiments, the third authorization instructions may designate a first designated custodian address (e.g. a custodian address associated with CUSTODIAN 2 Smart Contract 1350) with respect to token creation of the digital asset token. In embodiments, the third authorization instructions may be similar to the second authorization instructions described above in connection with PRINT LIMITER Second Authorization Instructions Module 1841.

In embodiments, the second smart contract instructions may also include token balance modification instructions (e.g. instructions of the Token Balance Modification Instructions Module 1847). The token balance modification instructions may be related to modifying the total balance of tokens of the digital asset token assigned to a third delegated contract address. In embodiments, the third delegated contract address may be of the one or more delegated contracted addresses. In embodiments, the token balance modification instructions may be similar to the optional token balance modification instructions described above in connection with Token Balance Modification Instructions Module 1847.

In embodiments, the second smart contract may further include additional authorization instructions. The additional authorization instructions may be similar to the optional PRINT LIMITER THIRD Authorization instructions described above in connection with PRINT LIMITER Third authorization Instructions Module 1835.

In embodiments, the second smart contract may be PRINT LIMITER Smart Contract 1360 described above in connection with FIGS. 4A and 4C, the description of which applying herein.

In embodiments, the process of FIG. 17A may continue with step S3910 where third smart contract instructions (e.g. CUSTODIAN 2 Contract Instructions 1350A-1) associated with a first designated custodian contract (e.g. CUSTODIAN 2 Smart Contract 1350). In embodiments, the first designated custodian contract is associated with a third contract address (e.g. Contract Address 6 of CUSTODIAN 2 Smart Contract 1350) associated with the blockchain of the underlying digital asset. In embodiments, the third contract address is the first designated contract address designated by the third authorization instructions of the second smart contract. In embodiments, the third smart contract instructions are saved as part of the blockchain of the underlying digital asset and/or include one or more of the following instructions: (1) fourth authorization instructions (e.g. authorization instructions described in connection with CUSTODIAN 2 First Authorization Instructions Module 1849), and/or (2) sixth authorization instructions (e.g. authorization instructions described in connection with CUSTODIAN 2 Second Authorization Instructions Module 1851), to name a few.

The fourth authorization instructions, in embodiments, may authorize the issuance of instructions to the second smart contract. The issued instructions that are authorized by the fourth authorization instructions may regard token creation. In embodiments, the fourth authorization instructions designate the second designated key pair to authorize the fourth authorization instructions. In embodiments, the fourth authorization instructions designate the first key pair to authorize the fourth authorization instructions. In embodiments, the fourth authorization instructions include instructions to permit the creation of digital asset tokens above a first threshold defined by the second authorization instructions. In embodiments, the fourth authorization instructions may be similar to the authorization instructions described in connection with CUSTODIAN 2 First Authorization Instructions Module 1849.

The sixth authorization instructions, in embodiments, may designate a seventh contract address as one of the one or more delegated contract addresses. In embodiments, the seventh contract address is not the second contract address. In embodiments, the second designated key pair is designated to authorize the sixth authorization instructions. In embodiments, the first designated key pair is designated to authorize the sixth authorization instructions. In embodiments, the sixth authorization instructions may be similar to the authorization instructions described in connection with CUSTODIAN 2 Second Authorization Instructions Module 1851.

In embodiments, the third smart contract may be CUSTODIAN 2 Smart Contract 1350 described above in connection with FIGS. 4A and 4D, the description of which applying herein.

In embodiments, the process of FIG. 17A may continue with step S3912 where fourth smart contract instructions (e.g. IMPL Smart Contract Instructions 1320A-1) associated with a fourth smart contract (e.g. IMPL Smart Contract 1320). In embodiments, the fourth smart contract is associated with a fourth contract address (e.g. Contract Address 2 of IMPL Smart Contract 1320), to name a few. The fourth contract address, in embodiments, may be one of the one or more delegated contract address. Additionally, the fourth contract address, in embodiments, may be different from one or more of: the first contract address, the second contract address, and/or the third contract address. The fourth smart contract instructions may be saved as part of the blockchain and/or include one or more of the following instructions: (1) token creation instructions (e.g. instructions of IMPL Token Creation Instructions Module 1865), (2) second delegation instructions (e.g. instructions of IMPL Delegation Instructions Module 1837), (3) token transfer instructions (e.g. instructions of IMPL Token Transfer Instructions Module 1861), and/or (4) token destruction instructions.

The token creation instructions may, in embodiments, be instructions to create tokens of the digital asset tokens. In embodiments, the token creation instructions may create tokens in accordance with the conditions set forth by the print limiter token creation instructions of the second smart contract. The token creation instructions may be similar to instructions described in connection with the IMPL Token Creation Instructions Module 1865.

The second delegation instructions, in embodiments, may delegate data storage operations to at least a fifth contract address. In embodiments, the fifth contract address may be associated with Contract Address 4 of STORE Smart Contract 1330. For example, the second delegation instructions may cause STORE Smart Contract 1330 to execute storage instructions of Storage Instructions Module 1853. The second delegation instructions may be similar to instructions described in connection with IMPL Delegation Instructions Module 1861.

In embodiments, the token transfer instructions may be related to transferring issued tokens of the digital asset token. The transfer of tokens may be from a first designated contract address to a second designated contract address. For example, issued tokens may be transferred from a contract address associated with a digital asset token issuer system to a user public address associated with a user attempting to purchase tokens of the underlying digital asset. The token transfer instructions may be similar to instructions described in connection with IMPL Token Transfer Instructions Module 1859.

In embodiments, the token destruction instructions may be related to destroying and/or burning one or more issued tokens of the digital asset token. For example, if a user is attempting to exchange a token for, as an example, fiat, the token being exchanged may be burned once the token is exchanged for fiat.

In embodiments, the fourth smart contract may be IMPL Smart Contract 1320 described above in connection with FIGS. 4A and 4F, the description of which applying herein.

In embodiments, the process of FIG. 17A may continue with the process of FIG. 17B. The process of FIG. 17B may continue with step S3914 where fifth smart contract instructions (e.g. STORE Contract Instructions 1330A-1) associated with a fifth smart contract (e.g. STORE Smart Contract 1330) are provided. The fifth contract address, in embodiments, may be one of one or more designated store contract addresses. In embodiments, the fifth smart contract instructions may be saved as part of the blockchain of the underlying digital asset and/or include one or more of the following instructions: (1) data storage instructions (e.g. instructions of Storage Instructions Module 1853) and/or (2) fifth authorization instructions (e.g. instructions of STORE Authorization Instructions Module 1855), to name a few.

The data storage instructions, in embodiments, may include instructions to store transaction data related to the digital asset token. Transaction data, in embodiments, may include transaction information for one or more of the issued tokens of the digital asset token. The transaction information, may include at least one of: (1) respective public address information associated with the blockchain of the underlying digital asset, and/or (2) corresponding respective token balance information which may be associated with the aforementioned respective public address information. In embodiments, the transaction data may include transaction information for all of the issued tokens of the digital asset token. In embodiments, the data storage instructions may be similar to instructions described in connection with Storage Instructions Module 1853.

The fifth authorization instructions may include authorization instructions to modify the transaction data in response to a request. In embodiments, the request may be received from the fourth contract address. The fifth authorization instructions may be similar to instructions described above in connection with STORE Authorization Instructions 1855.

In embodiments, the fifth smart contract may be STORE Smart Contract 1330 described above in connection with FIGS. 4A and 4E, the description of which applying herein.

In embodiments, the process of FIG. 17B may continue with step S3916 where the total supply of digital asset tokens may be increased by a digital asset token issuer system. In embodiments, the total supply of digital asset tokens may be increased from a first amount to a second amount. A more detailed description of the process of step S3916 is located in the flow charts of FIGS. 17C-17E.

Figure 17C:
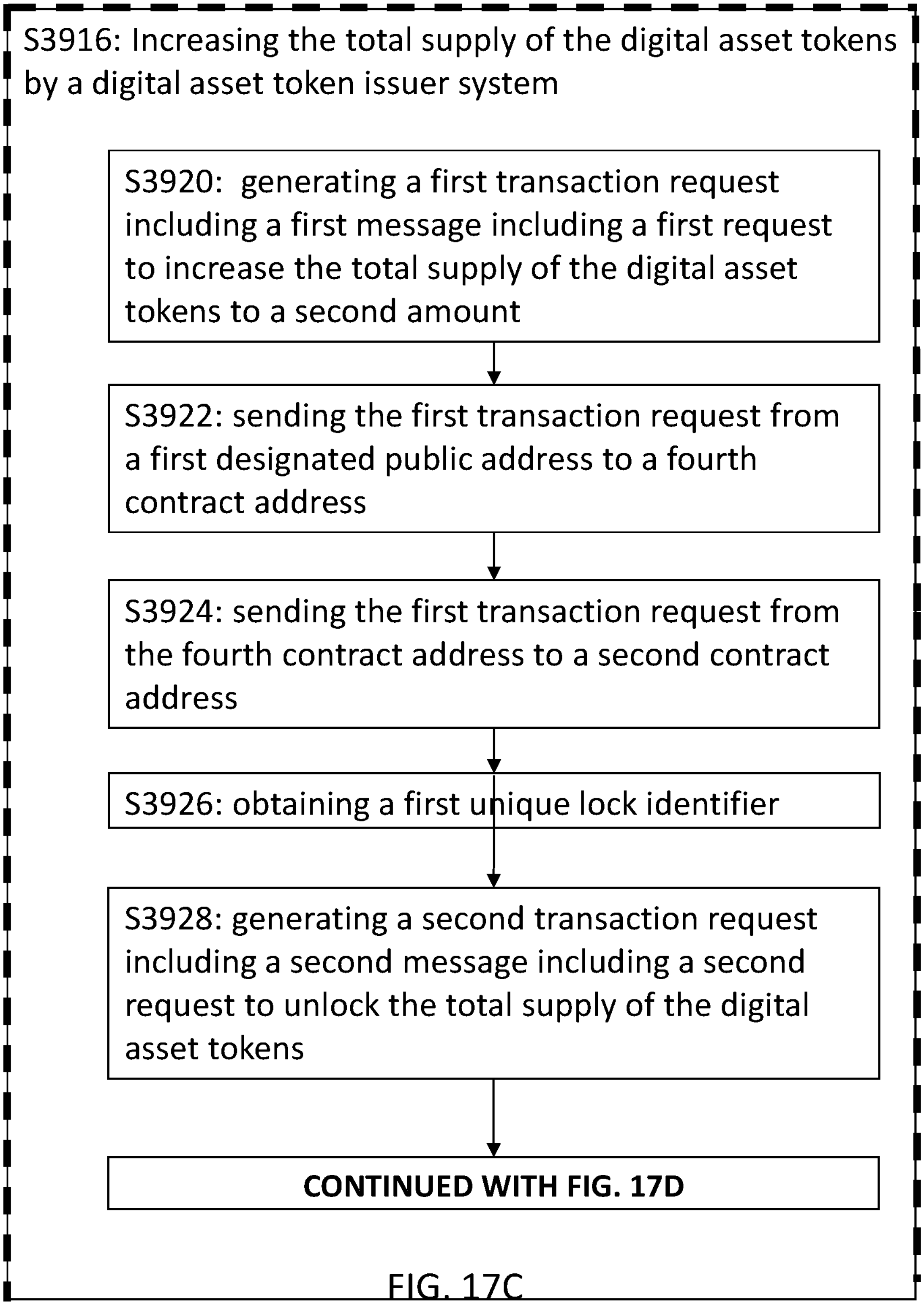

Referring to FIG. 17C, the process of increasing the total supply of digital asset tokens may begin with step S3920 where a first transaction request may be generated. The first transaction request may include a first message that may include a first request to increase the total supply of digital asset tokens to the second amount of digital asset tokens. In embodiments, the first transaction request may be sent from a contract address associated with the digital asset token issuer system to the fourth contract address. In embodiments, the first transaction request may be digitally signed by the first designated private key. In embodiments, the first transaction request may be signed by the second designated private key. In embodiments, the first transaction request may include first transaction fee information for minors associated with the plurality of geographically distributed computer systems in the peer-to-peer network. The first transaction fee information may be a predetermined amount of currency which may be related to the cost of processing the first transaction request.

In embodiments, the first request may be to decrease the total supply of digital asset tokens to a third amount. This example may follow the same process described in connection with FIGS. 17C-17E, with the third amount of digital asset tokens being less than the first amount of digital asset tokens.

The process may continue with a step S3922. In embodiments, at step S3922, the first transaction request may be sent by the digital asset token issuer system, from the first designated public address to the fourth contract address. In embodiments, the first transaction request may be sent via the blockchain of the underlying digital asset. In embodiments, the first transaction request may be sent via network 15.

The process may continue with step S3924 where the first transaction request may be sent from the fourth contract address to the second contract address via the blockchain for the underlying digital asset. In embodiments, once the first transaction request is received by the second contract address, the second smart contract may execute the first transaction request. The execution of the first transaction request may, in embodiments, be to return a first unique lock identifier associated with the first transaction request. In embodiments, the first transaction request is executed via the plurality of geographically distributed computer systems in the peer-to-peer network with reference to the blockchain for the underlying digital asset.

In embodiments, the process may continue with step S3926, where the digital asset token issuer system may obtain the first unique lock identifier. In embodiments, the first unique lock identifier may be obtained based on reference to the blockchain for the underlying digital asset.

In embodiments, the process may continue with step S3928 where a second transaction request may be generated by the digital asset token issuer system. In embodiments, the second transaction request may be generated in response to the first unique lock identifier being obtained. The second transaction request may, in embodiments, include a second message which may include a second request to unlock the total supply of the digital asset tokens. The second request may be in accordance with the first request. Moreover, in embodiments, the second request may include the first unique lock identifier. In embodiments, the second transaction request may be digitally signed by the first designated private key. In embodiments, the second transaction request may be digitally signed by the second designated private key. In embodiments, the second transaction request may include second transaction fee information for minors associated with the plurality of geographically distributed computer systems in the peer-to-peer network. The second transaction fee information may be a predetermined amount of currency which may be related to the cost of processing the second transaction request.

Figure 17D:
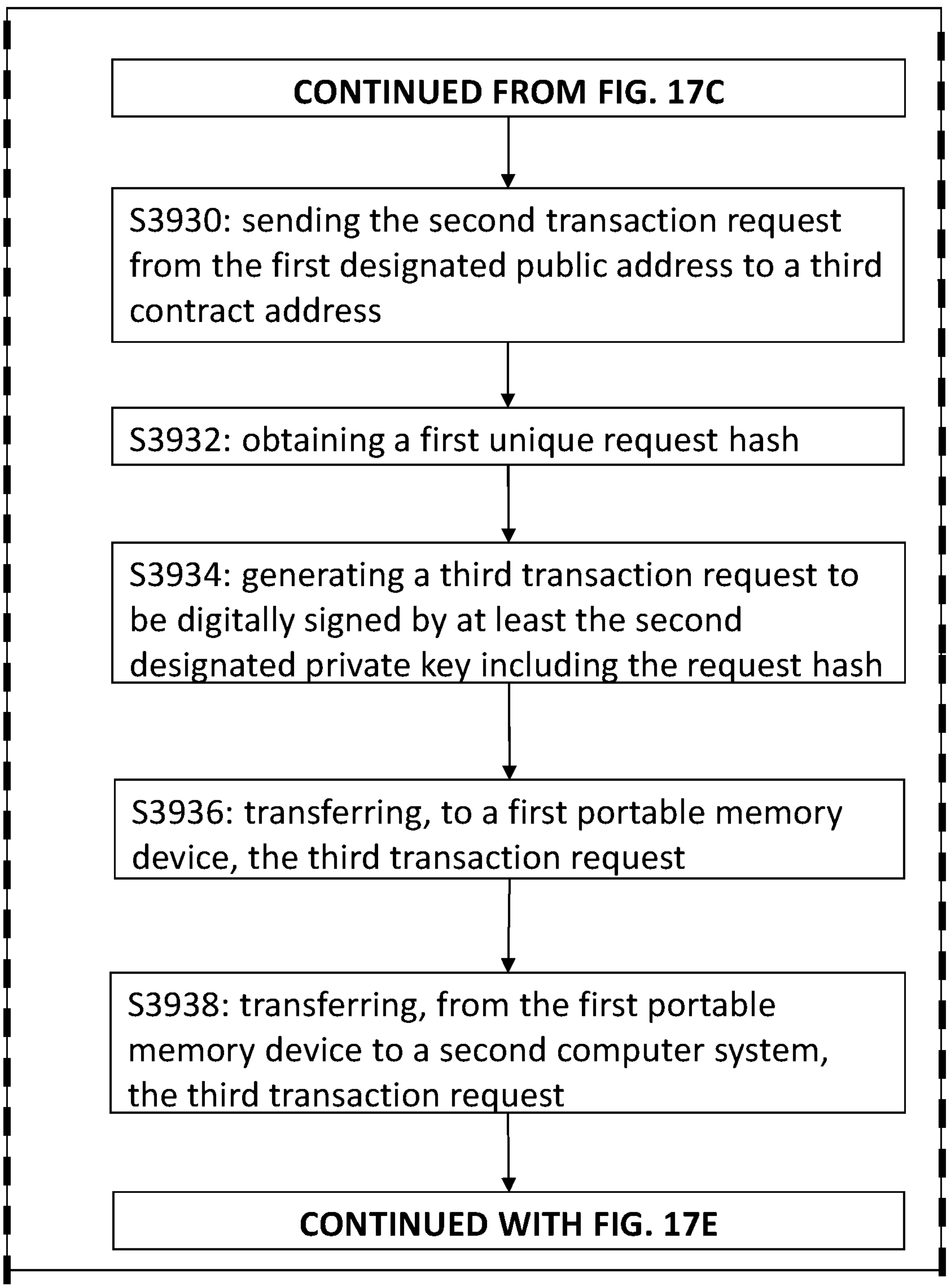

The process of FIG. 17C may continue with the process of FIG. 17D. Referring to FIG. 17D, the process may continue with step S3930 where the second transaction request may be sent from the first designated public address to the third contract address. In embodiments, the second transaction request is sent by the digital asset token issuer system via the blockchain for the underlying digital asset. In embodiments, in response to receiving the second transaction request, the third smart contract may execute the second transaction request. Executing the second transaction request, in embodiments, may include returning a first unique request hash associated with the second transaction request. In embodiments, the second transaction request is executed via the plurality of geographically distributed computer systems in the peer-to-peer network with reference to the blockchain associated with the underlying digital asset.

The process may continue with step S3932 where, in embodiments, the first unique request hash may be obtained by the digital asset token issuer system. In embodiments, the first unique request hash may be obtained based on reference to the blockchain for the underlying digital asset.

At a step S3934, in embodiments, a third transaction request may be generated. The third transaction request may, in embodiments, be generated to be digitally signed by at least the second designated private key. In embodiments, the third transaction request may include the first unique request hash. The third transaction request, in embodiments, may be generated in response to the digital asset token issuer system obtaining the first unique request hash.

In embodiments, at a step S3936, the third transaction request may be transferred to a first portable memory device. In embodiments, the third transaction request may be transferred to the first portable memory device by an administrator (e.g. an administrator of administrator system 1801). In embodiments, the third transaction request may be transferred from the digital asset token issuer system to the first portable memory device. In embodiments, the first portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S3938 where the third transaction request may be transferred from the first portable memory device to the second computer system. In embodiments, the third transaction request may be transferred to the second computer system by an administrator (e.g. an administrator of administrator system 1801).

Figure 17E:
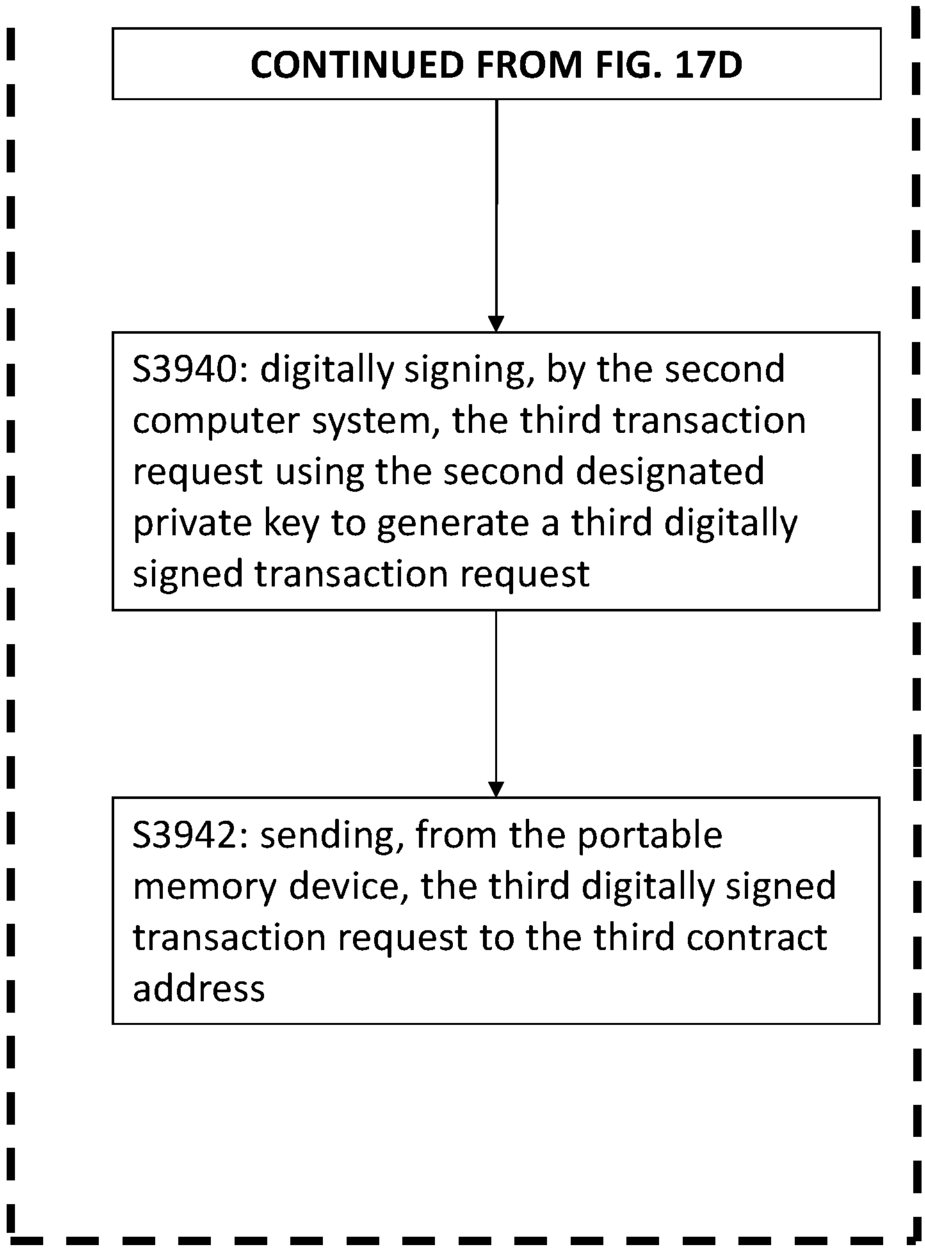

In embodiments, the process of FIG. 17D may continue with FIG. 17E. Referring to FIG. 17E, at a step S3940, the second computer system digitally may sign the third transaction request using the second designated private key. By digitally signing the third transaction request, the second computer system may generate a third digitally signed transaction request.

In embodiments, once the third digitally signed transaction request is generated, the third digitally signed transaction request may be transferred from the second computer system to a second portable memory device. The second portable memory device may, in embodiments, be the first portable memory device (e.g. the first and second portable memory device are the same portable memory device). In embodiments, the second portable memory device may be physically and operatively separate from the first portable memory device. In embodiments, the second portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S3942 where the third digitally signed transaction request may be sent from the portable memory device to the third contract address using the digital asset token issuer system, via the blockchain for the underlying digital asset. In embodiments, the portable memory device may be the second portable memory device. To send the third digitally signed transaction request, in embodiments, the third digitally signed transaction request may be first transferred from the second portable memory device to the digital asset token issuer system. Once transferred, in embodiments, the third digitally signed transaction request may be sent by the digital asset token issuer system to the third contract address.

In response to receiving the third digitally signed transaction request, in embodiments, the third smart contract may execute the third digitally signed transaction request. In embodiments, the execution of the third digitally signed transaction request may result in a request to validate the second request to unlock the total supply of digital asset tokens based on the third digitally signed transaction request and/or the first unique request hash. In embodiments, the execution may also result in a first call to the second contract address. The first call may be to increase the total supply of the digital asset tokens from the first amount to the second amount. In embodiments, the third smart contract may execute the third digitally signed transaction request via the plurality of geographically distributed computer systems in the peer-to-peer network with reference to the blockchain of the underlying digital asset.

The first call sent by the third smart contract to the second contract address of the second smart contract may, in embodiments, result in the second contract address returning the first call to the fourth contract address. The fourth contract address may, in response to receiving the returned first call, execute a second call to the fifth contract address. The second call, in embodiments, may be to set the total supply of the digital asset tokens to the second amount of digital asset tokens. In embodiments, the fourth smart contract may execute the second call via the plurality of geographically distributed computer systems in the peer-to-peer network with reference to the blockchain of the underlying digital asset.

The second call sent by the fourth smart contract to the fifth contract address of the fifth smart contract may, in embodiments, result in the fifth smart contract executing the second call to set the total supply of the digital asset tokens to the second amount of digital asset tokens. In embodiments, the fifth smart contract may execute the second call via the plurality of geographically distributed computer systems in the peer-to-peer network with reference to the blockchain of the underlying digital asset.

In embodiments, the steps of the process described in connection with FIGS. 17C-17E may be rearranged or omitted.

Referring back to FIG. 17B, the process may continue with step S3918, where the digital asset token issuer system may confirm the total supply of digital asset tokens. The total supply, in embodiments, may be confirmed by the digital asset token issuer system as set to the second amount of digital asset tokens based on reference to the blockchain of the underlying digital asset.

In embodiments, the digital asset token issuer system may determine that the total supply of digital asset tokens is not the second amount of digital asset tokens. For example, the digital asset token issuer system may determine that the total supply of digital asset tokens is set to a third amount, the third amount being different than the second amount of digital asset tokens. In these embodiments, the digital asset token issuer system may generate and/or send a warning message for an administrator (e.g. an administrator of administrator system 1801). In embodiments, the administrator system may be the token issuer system. In embodiments, the administrator system may not be the token issuer system. The warning message may include a notification stating that the amount of tokens is incorrect and/or needs to be fixed. Additionally, the warning message may include a transaction ledger (e.g. Network Digital Asset Transaction Ledger 3228). Moreover, the warning message may include the third amount of digital asset tokens. Furthermore, the warning message may include the intended amount of digital asset tokens (e.g. the second amount of digital asset tokens). In embodiments, if the digital asset token issuer system determines the total supply of tokens is incorrect, the digital asset token issuer system may repeat one or more of the steps of the processes described above in connection with FIGS. 17A-17E in order to set the amount of digital asset tokens from the third amount to the second amount.

In embodiments, the steps of the process described in connection with FIGS. 17A-17B may be rearranged or omitted.

In embodiments, a process for increasing a total supply of digital asset tokens including may begin with providing a first designated key pair. The first designated key pair, in embodiments, may include a first designated public key and a corresponding first designated private key. The first designated private key may also correspond to a first designated public address associated with an underlying digital asset. In embodiments, the underlying digital asset is maintained on a distributed public transaction ledger maintained in the form of a blockchain by a plurality of geographically distributed computer systems in a peer-to-peer network in the form of a blockchain network. In embodiments, the first designated private key is stored on a first computer system which is connected to the distributed public transaction ledger through the Internet (e.g. network 15).

In embodiments, the process may continue with providing a second designated key pair. In embodiments, the second designated key pair includes a second designated public key and a corresponding second designated private key. In embodiments, the second designated public key also corresponds to a second designated public address associated with the underlying digital asset. In embodiments, the second designated private key is stored on a second computer system which is physically separated from the first computer system and is not operatively and/or physically connected to the distributed public transaction ledger or the Internet.

In embodiments, the process may continue with providing first smart contract instructions associated with a first smart contract associated with a digital asset token associated with a first contract address associated with the blockchain associated with the underlying digital asset. In embodiments, the first smart contract instructions are saved as part of the blockchain for the underlying digital assets. In embodiments, the first smart contract instructions include first delegation instructions to delegate one or more first functions associated with the digital asset token to one or more delegated contract addresses associated with the blockchain associated with the underlying digital asset. The one or more delegated contract addresses, in embodiments, is different from the first contract address. In embodiments, a second contract address is designated as one of the one or more delegated contract addresses. In embodiments, the first smart contract instructions include first authorization instructions for the second designated key pair.

The process may continue, in embodiments, with providing second smart contract instructions associated with a second smart contract associated with the digital asset token associated with the second smart contract address associated with the blockchain associated with the underlying digital asset. In embodiments, the second smart contract instructions are saved as part of the blockchain for the underlying digital asset. In embodiments, the second smart contract instructions may include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token, to name a few.

In embodiments, the process may continue with providing third smart contract instructions associated with a first designated custodian smart contract associated with the digital asset token associated with a third contract address associated with the blockchain associated with the underlying digital asset. In embodiments, the third contract address is the first designated custodian contract address. In embodiments, the third smart contract instructions are saved as part of the blockchain associated with the underlying digital asset. In embodiments, the third smart contract instructions include fourth authorization instructions to authorize issuance of instructions to the second smart contract regarding token creation. In embodiments, the fourth authorization instructions designate the second designated key pair to authorize the fourth authorization instructions.

In embodiments, the process may continue with providing fourth smart contract instructions associated with a fourth smart contract associated with the digital asset token associated with a fourth contract address associated with the blockchain associated with the underlying digital asset. In embodiments, the fourth contract address is one of the one or more delegated contract addresses and not: (i) the first contract address, (ii) the second contract address, and/or (iii) the third contract address. In embodiments, the fourth smart contract instructions are saved as part of the blockchain associated with the underlying digital assets. In embodiments, the fourth smart contract instructions include: (1) token creation instructions to create tokens of the digital asset token in accordance with conditions set forth by the print limiter token creation instructions; and/or (2) second delegation instructions delegating data storage operations to at least a fifth contract address, to name a few.

In embodiments, the process may continue with providing fifth smart contract instructions associated with a fifth smart contract associated with the digital asset token associated with the fifth contract address associated with the blockchain associated with the underlying digital asset. In embodiments, the fifth smart contract address is one of the one or more designated store contract addresses. In embodiments, the fifth smart contract instructions are saved as part of the blockchain for the underlying digital assets. In embodiments, the fifth smart contract instructions include: (1) data storage instructions for transaction data related to the digital asset token, said transaction data includes for all issued tokens of the digital asset token: (A) respective public address information associated with the blockchain associated with the underlying digital asset; and (B) corresponding respective token balance information associated with said respective public address information; and/or (2) fifth authorization instructions to modify the transaction data in response to requests from the fourth contract address;

In embodiments, the process may continue with receiving, by a digital asset token issuer system, a request to generate and assign to the first designated public address a first amount of digital asset tokens;

In embodiments, the process may continue with generating, by the digital asset token issuer system, the first amount of digital asset tokens and assigning said first amount of digital asset tokens to the first designated public address increasing the total supply of the digital asset tokens. In embodiments, generating the first amount of digital asset tokens and assigning said first amount of digital asset tokens to the first designated public address may include a sub-process.

The sub-process may begin with the step of generating, by the digital asset token issuer system, and sending, using the digital asset token issuer system via the blockchain network, a first transaction request: (A) to the fourth contract address; and (B) including a first message including a first request to generate the first amount of digital asset tokens and assign said first amount of digital asset tokens to the first designated public address. In embodiments; the first transaction request is digitally signed by the first designated private key. In embodiments, the fourth smart contract executes, via the plurality of geographically distributed computer systems in the peer-to-peer network with reference to the blockchain, the first transaction request to: (i) validate the first request and the authority of the first designated private key to call the second smart contract to execute the first request; and (ii) send a first call to the fourth contract address to generate and assign to the first designated public address the first amount of digital asset tokens. In embodiments, the fourth smart contract executes, via the plurality of geographically distributed computer systems in the peer-to-peer network with reference to the blockchain, the first call to generate a first unique lock identifier, and return to the second smart contract address, the first unique lock identifier. In embodiments, in response to the return of the first unique lock identifier, the second smart contract executes, via the plurality of geographically distributed computer systems in the peer-to-peer network with reference to the blockchain, a call to the fourth smart contract address to confirm the first call with the first lock identifier. In embodiments, in response, the fourth smart contract executes, via the plurality of geographically distributed computer systems in the peer-to-peer network with reference to the blockchain, the first call to execute a second call to the fifth contract address to obtain the total supply of digital asset tokens in circulation. In embodiments, in response, the fifth smart contract executes, via the plurality of geographically distributed computer systems in the peer-to-peer network with reference to the blockchain, the second call and returns, to the fourth contract address, a second amount of digital asset tokens corresponding to the total supply of digital asset tokens in circulation. In embodiments, in response to the return of the second amount, the fourth smart contract, executes via the plurality of geographically distributed computer systems in the peer-to-peer network with reference to the blockchain, a third call request to the fifth contract address to set a new total supply of digital asset tokens in circulation to a third amount, which is the total of the first amount and the second amount. In embodiments, in response to the third call, the fifth smart contract, executes via the plurality of geographically distributed computer systems in the peer-to-peer network with reference to the blockchain, the third call and sets a new total supply of digital asset tokens in circulation at the third amount. In embodiments, the fourth smart contract executes, via the plurality of geographically distributed computer systems in the peer-to-peer network with reference to the blockchain, a fourth call to the fifth contract address to add the first amount of digital asset tokens to a respective balance associated with the first designated public address. In embodiments, in response, the fifth smart contract executes, via the plurality of geographically distributed computer systems in the peer-to-peer network with reference to the blockchain, the fourth call to set the balance of digital asset tokens in the first designated public address at a fourth amount which includes the addition of the first amount to the previous balance.

The process for increasing the total supply of digital asset tokens may continue with confirming, by the digital asset token issuer system, that the balance of digital asset tokens associated with the first designated public address is set to include the first amount of digital asset tokens based on reference to the blockchain.

In embodiments, the second computer system is a hardware storage module.

In embodiments, the second designated key set includes an additional designated key set including an additional designated public address and an additional designated private key.

In embodiments, the second authorization instructions for the first designated key set with respect to token creation of the digital asset token include instruction limiting token creation above a first threshold over a first period of time.

In embodiments, the fourth authorization instructions for the second designated key set to authorize the issuance of instructions to the second smart contract instructions with respect to token creation include instructions to allow for creation of digital asset tokens above the first threshold during the first period of time.

In embodiments, the third smart contract instructions further include: (2) sixth authorization instructions to designate a seventh contract address as one of the one or more delegated contract addresses. In embodiments, the seventh contract address is not the second contract address. In embodiments, the second designated key set is designated to authorize the sixth authorization instructions. In embodiments, the fourth smart contract instructions further include: (3) token transfer instructions related to transferring tokens of the digital asset token from a first designated contract address to a second designated contract address. In embodiments, the fourth smart contract instructions further include: (3) token destruction instructions related to destroying one or more digital asset token. In embodiments, the fourth smart contract instructions further include: (3) token balance modification instructions related to modifying a total number of tokens of the digital asset token assigned to a third designated public address. In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the process further includes receiving, prior to generating the first amount of digital asset tokens, a validating request. In embodiments, the process further includes determining the first designated key set has authority to process the request to generate the first amount of digital tokens.

In embodiments, the first transaction request includes first transaction fee information for miners in the plurality of geographically distributed computer systems in the peer-to-peer network to process the first transaction request.

In embodiments, the fifth contract returns the balance of digital asset tokens to the fourth smart contract address. In embodiments, the fifth contract returns the balance of digital asset tokens to the second smart contract address.

In embodiments, the process further for increasing the total supply of digital asset tokens continues with receiving, by the plurality of geographically distributed computer systems in the peer-to-peer network, from a first user device associated with the first designated public address, via the underlying blockchain, a second transaction request: (A) from the first designated public address; (B) to the first contract address; and (C) including a second message including a second request to transfer a fifth amount of digital assets from the first designated public address to a third designated public address. In embodiments, the first transaction request is digitally signed by the first designated private key, which is mathematically related to the first designated public address. In embodiments, the first user device had access to the first designated private key prior to sending the second transaction request. In embodiments, the first smart contract executes, via the plurality of geographically distributed computer systems in the peer-to-peer network, the second transaction request to execute, via the plurality of geographically distributed computer systems in the peer-to-peer network, a sixth call request to the fourth contract address to transfer a fifth amount of digital assets from the first designated public address to the third designated public address. In embodiments, in response to the sixth call request, the fourth smart contract, executes via the plurality of geographically distributed computer systems in the peer-to-peer network, sixth authorization instructions to verify the sixth call came from an authorized contract address, and upon verification, to execute a seventh call request to the fifth contract address to obtain a sixth amount of digital asset tokens which reflect a current balance of digital asset tokens associated with the first designated public address. In embodiments, in response to the seventh call request, the fifth smart contract, executes via the plurality of geographically distributed computer systems in the peer-to-peer network, the seventh call request to return the sixth amount of digital asset tokens In embodiments, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens, and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens in the first designated public address to a seventh amount which equals the sixth amount less the fifth amount. In embodiments, in response to the seventh call, the fifth smart contract executes, via the plurality of geographically distributed computer systems in the peer-to-peer network, the seventh call to set and store the new balance for the first designated public address as the seventh amount and returns a new balance for the first designated public address as the seventh amount. In embodiments, in response to the return of the new balance, the fourth smart contract executes, via the plurality of geographically distributed computer systems in the peer-to-peer network, an eighth call to add the second amount of digital asset tokens to the balance associated with the third designated public address. In embodiments, in response to the eighth call request, the fifth smart contract executes, via the blockchain network, the eighth call request to set the balance of digital asset tokens associated with the third designated public address at a seventh amount which includes the addition of the second amount to a previous balance associated with the third designated public address; and wherein the first user device confirms that the balance of digital asset tokens associated with the first designated public address is the sixth amount of digital asset tokens based on reference to the blockchain.

In embodiments, the second transaction request includes second transaction fee information for miners in the plurality of geographically distributed computer systems in the peer-to-peer network to process the second transaction request. In embodiments, the balance of digital asset tokens associated with the third designated public address is returned to the fourth contract address. In embodiments, the balance of digital asset tokens associated with the third public address is returned to the first smart contract address. In embodiments, a second user device confirms that the balance of the digital asset tokens associated with the third designated public address is the seventh amount of digital asset tokens based on reference to the blockchain.

In embodiments, the process of increasing the total supply of digital asset tokens further includes providing a third designated key set, including a third designated public address associated with the underlying digital asset and a corresponding third designated private key, and wherein the third designated private key is stored on a third computer system which is connected to the distributed public transaction ledger through the Internet.

In embodiments, the process continues with receiving, by the plurality of geographically distributed computer systems in the peer-to-peer network, from the third computer system, via the blockchain, a second transaction request: (A) from the third designated public key address; (B) to the fifth contract address; and (C) including a second message including a request to burn a fifth amount of digital asset tokens from a balance associated with the third designated public address. In embodiments, the second transaction request is digitally signed by the third designated private key. In embodiments, the fourth smart contract executes, via the plurality of geographically distributed computer systems in the peer-to-peer network, the second transaction request to execute, via the plurality of geographically distributed computer systems in the peer-to-peer network, a sixth call request to the fifth contract address to obtain a sixth amount of digital asset tokens which reflect a current balance of digital asset tokens associated with the third designated public address. In embodiments, in response to the sixth call request, the fifth smart contract, executes via the plurality of geographically distributed computer systems in the peer-to-peer network, the seventh call request to return the sixth amount of digital asset tokens; wherein, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens; and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens associated with the third designated public key address to a seventh amount which equals the sixth amount less the fifth amount. In embodiments, in response to the seventh call, the fifth smart contract executes, via the plurality of geographically distributed computer systems in the peer-to-peer network, the seventh call to set and store the new balance for the third designated public key address as the seventh amount and returns the new balance for the third designated public key address as the seventh amount. In embodiments, in response to the return of the new balance, the fourth smart contract executes, via the blockchain network, an eighth call request to the fifth contract address to obtain a total supply of digital asset tokens in circulation. In embodiments, in response to the eighth call request, the fifth smart contract executes, via the plurality of geographically distributed computer systems in the peer-to-peer network, the eighth call request and returns, to the fourth contract address, an eighth amount of digital asset tokens corresponding to the total supply of digital asset tokens in circulation. In embodiments, in response to the return of the eighth amount, the fourth smart contract, executes via the plurality of geographically distributed computer systems in the peer-to-peer network, a ninth call request to the fifth contract address to set a new total supply of digital asset tokens in circulation to a ninth amount, which is the eighth amount less the fifth amount. In embodiments, in response to the ninth call request, the fifth smart contract, executes via the blockchain network, the ninth call request and sets a new total supply of digital asset tokens in circulation at the ninth amount, and returns to the fourth contract address.

In embodiments, the third designated key set is the first designated key set. In embodiments, the third designated key set is not the second designated key set. In embodiments, the third designated key set is the second designated key set. In embodiments, the third designated key set is not the first designated key set. In embodiments, the third computer system is the first computer system. In embodiments, the third computer system is not the first computer system. In embodiments, the administrator computer system (e.g. Administrator 1801) includes the first computer system and the third computer system. In embodiments, the administrator computer system includes the first computer system and the second computer system.

In embodiments, the underlying digital asset is a stable value token. In embodiments, the underlying digital asset is Neo. In embodiments, the underlying digital asset is Ether. In embodiments, the underlying digital asset is Bitcoin.

In embodiments, the first designated private key is mathematically related to the first designated public key.

In embodiments, wherein the first designated public address includes the first designated public key.

In embodiments, the first designated public address includes a hash of the first designated public key.

In embodiments, the first designated public address includes a partial hash of the first designated public key.

In embodiments, the second designated private key is mathematically related to a second designated public key.

In embodiments, the second designated public address includes the second designated public key.

In embodiments, the second designated public address includes a hash of the second designated public key.

In embodiments, the second designated public address includes a partial hash of the second designated public key.

In embodiments, the second smart contract instructions include sixth authorization instructions related to modifying a token supply of the digital asset token.

Withdrawing funds, including in the context of digital assets, is associated with many security concerns. For example, security concerns may include: hacking, fraudulent transactions, to name a few. The aforementioned security concerns, in embodiments, are addressed (either completely or partially) in the context of withdrawing funds by customer and/or administrator created whitelists. A whitelist, in embodiments, may be a list which may include a list of addresses that a customer has pre-authorized to withdraw digital assets. For example, a whitelist associated with a first customer may include a first user public address associated with the first user and a second user public address associated with the first user's family member. As another example, a whitelist may only contain a user's public address which may limit all withdrawals to the user's public address. As another example, a whitelist may not be submitted by the user, and, instead, may be generated by an administrator (e.g. exchange computer system 3230, administrator system 6801, and/or SVCoin administrator 6809, to name a few). The generated whitelist, in embodiments, may be a default security measure implemented by the administrator, which may limit withdrawals to a public address associated with the customer's account. Alternatively, in embodiments, a whitelist may be a list which may include a list of public addresses that a user may not want digital asset tokens withdrawn to. For example, a whitelist may contain a user's old business partner's public address, limiting withdrawals to public addresses that are not the user's old business partner's public address.

Figure 19B:
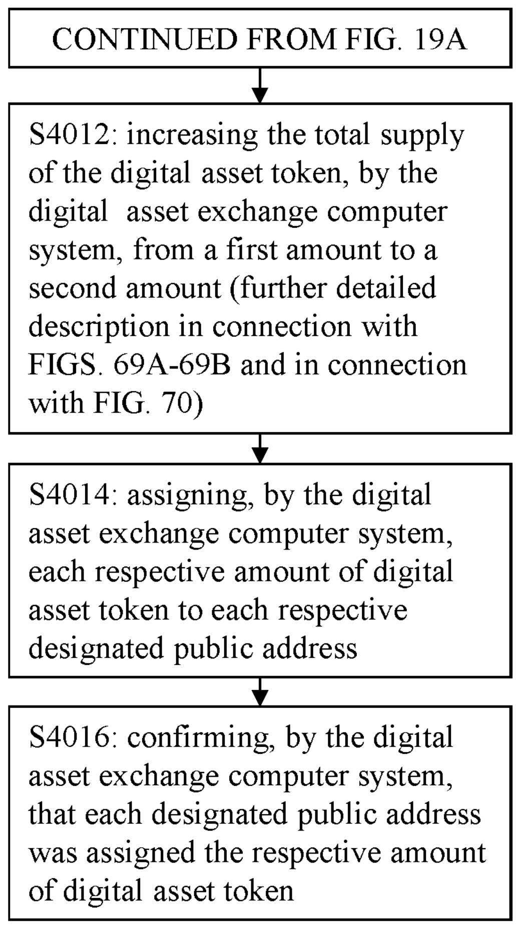
Figure 19C:
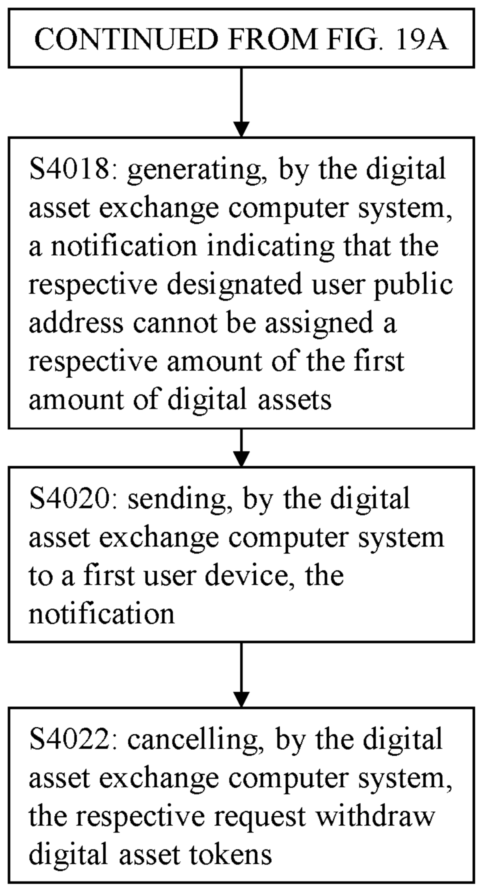

A whitelist may be implemented in the process described in connection with FIGS. 19A-19C. FIGS. 19A-19C are flow charts of processes for withdrawing digital asset tokens in accordance with exemplary embodiments of the present invention. The process of FIGS. 19A through 19C may begin at step S4002, shown in connection with FIG. 19A. Optionally, in embodiments, at step S4002, user identification data corresponding to a plurality of customers may be provided. In embodiments, the user identification data may include whitelist data associated with the plurality of customers (e.g. customers associated with one or more customer devices—e.g. customer's device 3232, customers of a digital asset exchange, to name a few). Whitelist data may, in embodiments, represent one or more whitelists which were: provided by one or more customers, generated by an administrator, and/or provided by a third party associated with the one or more customers, to name a few. For example, at step S4002, a first customer may transmit first whitelist data associated with the first customer. The first whitelist data may include a whitelist that authorizes withdrawals to a first user public address. The first user public address, in embodiments, may be associated with a first user public key which may be associated with the first customer.

In embodiments, a digital asset exchange computer system (e.g. exchange computer system 3230, administrator system 6801, and/or SVCoin administrator 6809, to name a few) may store a plurality of whitelists for a plurality of customers on memory operably connected to the digital asset exchange computer system. Additionally, in embodiments, the digital asset exchange computer system may store a plurality of whitelists for a plurality of customers on a whitelist database on memory operably connected to the digital asset exchange computer system.

Figure 21:
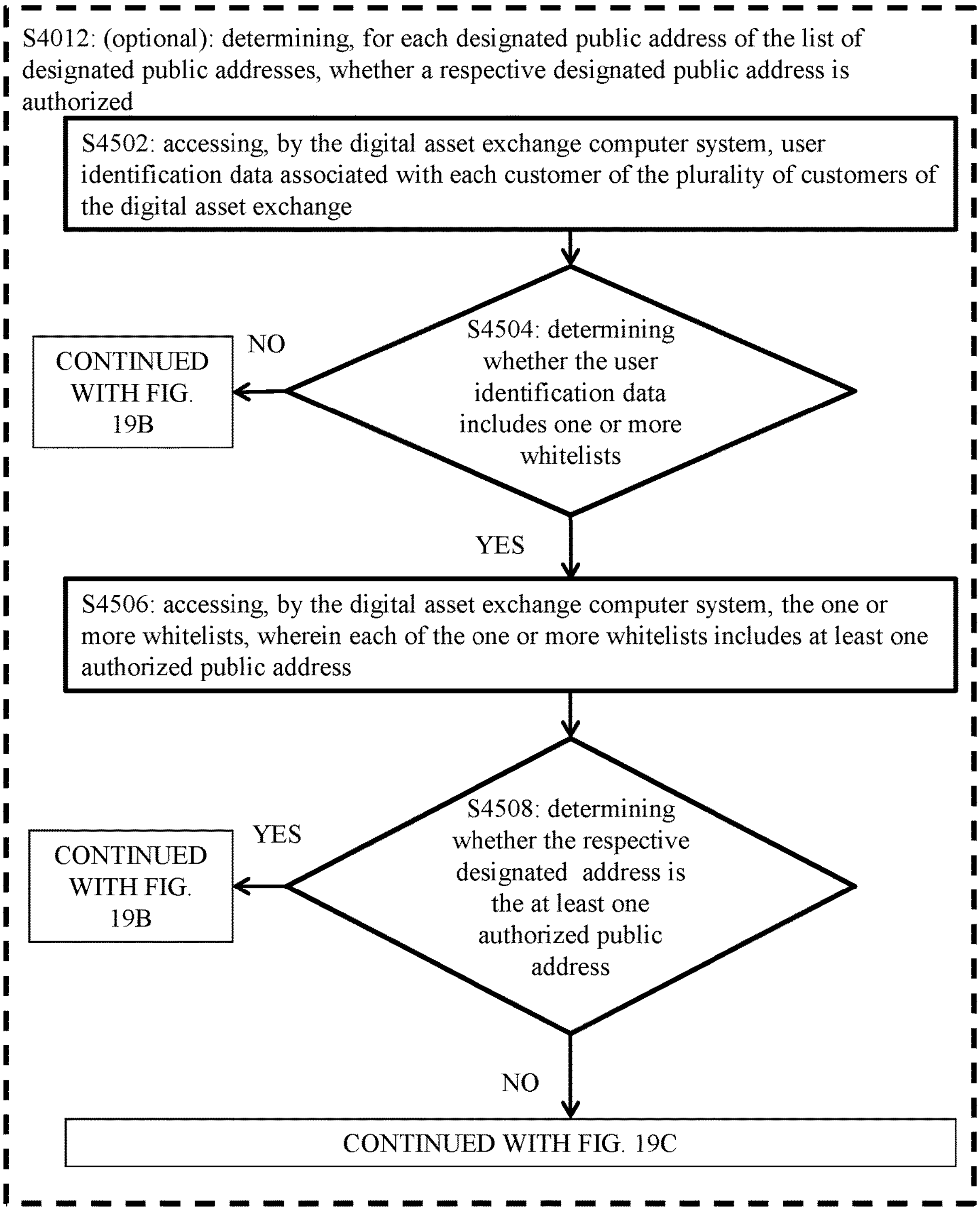
FIG. 21 is a flow chart of a process for verifying a designated public address in accordance with exemplary embodiments of the present invention.

In embodiments, a whitelist may be used by the digital asset exchange computer system to verify a public address associated with a withdrawal request in accordance with the process of FIG. 21, which is described below—the description of which applying herein The process may continue at step S4004. At step S4004, a plurality of designated key pairs is provided. The plurality of key pairs, in embodiments, may each include a respective designated public key of an underlying digital asset and a corresponding designated private key. In embodiments, each respective designated public key is mathematically related to a respective corresponding designated private key. The underlying digital asset, in embodiments, may be a digital math-based asset, such as bitcoins, Namecoins, Litecoins, PPCoins, Tonal bitcoins, bitcoin cash, zcash, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; and/or DEW, to name a few. In embodiments, the underlying digital asset may be a digital asset that is supported by its own digital asset network (like ether supported by the Ethereum Network). The digital asset token, in embodiments, may be a stable value token (such as Gemini Dollar), security tokens, and/or non-fungible token (such as Cryptokitties), to name a few.

Figure 67:
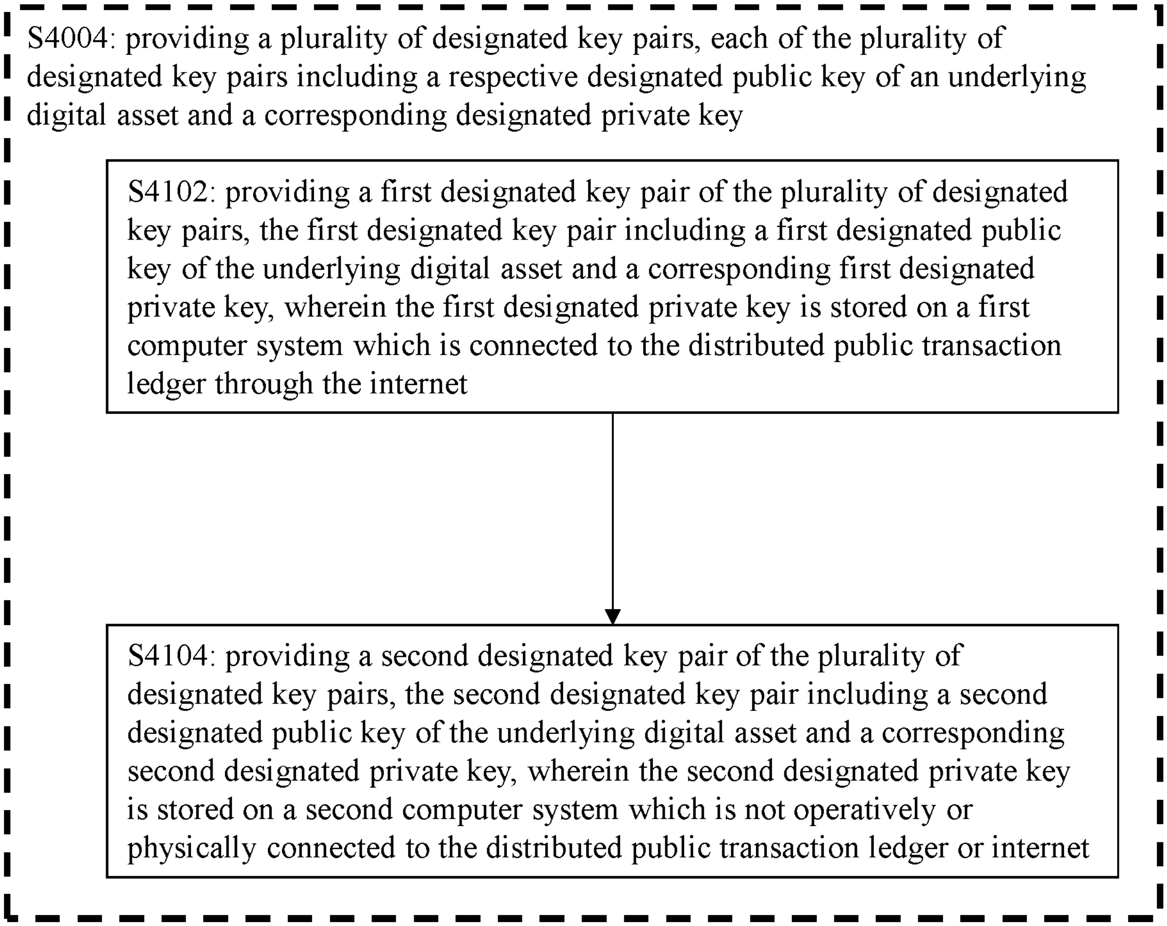
FIG. 67 is a flow chart of a process for providing a plurality of designated key pairs in accordance with exemplary embodiments of the present invention.

In embodiments, the plurality of designated key pairs may be provided with the process described in connection with FIG. 67. Referring to FIG. 67, a process of providing a plurality of designated key pairs may begin at step S4102. At step S4102, a first designated key pair (e.g. on-line keyset 1 1362) may be provided. In embodiments, the first designated key pair may include, a first designated public key and a corresponding first designated private key. The first designated public key may be mathematically related to the first designated private key. The first designated public key, in embodiments, may be associated with a first designated public address, which, in embodiments, may be associated with an underlying digital asset. The underlying digital asset (e.g. Neo, ether, to name a few) may be maintained on a distributed public transaction ledger maintained in the form of a blockchain. In embodiments, a first computer system may store the first designated private key, similarly with on-line keyset 1 1362. The first computer system may have access to, or be connected with, the distributed public transaction ledger through a network, such as the internet (e.g. network 15). In embodiments, the first designated private key may be mathematically related to the first designated public key. In embodiments, the first designated public address is the first designated public key. In embodiments, the first designated public address is derived from the first designated public key.

In embodiments, the first designated key pair may include a plurality of key pairs (e.g. on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. Continuing the example, an additional key pair of the plurality of key pairs may correspond to an additional designated public address associated with the underlying digital asset. In embodiments, each key pair of the aforementioned plurality of key pairs may correspond to the same designated public address. For example, the first and additional key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g. a hash). In embodiments, the cryptographic hash function may be designed to be a one-way function (e.g. a function that is infeasible to invert). The cryptographic hash function, may include one or more of the following properties: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g. a brute force approach); and (4) unique, such that messages to not have the same hash value and/or small changes to a message alter the hash value such that the values do not correlate, to name a few. In embodiments, and as used herein, algorithm, hash algorithm, hash function, and/or cryptographic hash function may refer to one or more of the following: (1) a mathematical algorithm; (2) a one-way hash function; (3) a cryptographic hash function; (4) a one-way function; (5) a trapdoor one-way function; (6) a Data Encryption Standard encryption algorithm; (7) a Blowfish encryption algorithm; (8) An Advanced Encryption Standard or Rijndael encryption algorithm; (9) a Twofish encryption algorithm; (10) an IDEA encryption algorithm; (11) an MD5 encryption algorithm; (12) an MD4 encryption algorithm; (13) a SHA 1 hashing algorithm; (14) an HMAC hashing algorithm; and/or (15) an RSA Security algorithm, to name a few.

The process of FIG. 67 may continue at step S4104. At step S4104, a second designated key pair (e.g. off-line keyset 1 1803) is provided. The second designated key pair, similar to the first designated key pair, may also include a second designated public key and a corresponding second designated private key. The second designated public key may be mathematically related to the corresponding second designated private key. In embodiments, the second designated key pair may correspond to the same public address as the first designated key pair (e.g. the first designated public address associated with the underlying asset). In embodiments, the second designated key pair may correspond to a different public address than the first designated key pair. For example, the first designated key pair may correspond to the first designated public address and the second designated key pair may correspond to a second designated public address. In embodiments, where the second designated key pair corresponds to a second designated public address, the second designated public address may be the second designated public key.

In embodiments, the second designated key pair may be stored on a second computer system. The second computer system may be physically and/or operationally separated from the first computer system. Additionally, the second computer system may be physically and/or operationally separated (e.g. not connected to) from the distributed public transaction ledger and/or the internet (e.g. network 15). This separation, as described above in connection with FIGS. 4A-1 AND 4A-2, may be for security purposes, adding an additional layer of security by ensuring that unwanted access is not granted via network 15.

In embodiments, the second computer system may be a hardware security module. The hardware security module may be located in a vault (e.g. Vault 70-A1) Location A, Location B, Location C . . . Location N described above in connection with FIGS. 31A-31D. Additionally, a more detailed description of storage, and particularly cold storage, is located above under the “Cold Storage” heading.

In embodiments, the hardware security module, may include one or more types of storage mediums such as any volatile or non-volatile memory, or any removable or non-removable memory implemented in any suitable manner to store the second designated key pair. For example, the second designated key pair may be stored using computer-readable instructions, data structures, and/or program systems. Various types of storage/memory may include, but are not limited to, hard drives, solid state drives, flash memory, permanent memory (e.g., ROM), electronically erasable programmable read-only memory (“EEPROM”), CD-ROM, digital versatile disk (“DVD”) or other optical storage medium, magnetic cassettes, magnetic tape, magnetic disk storage or other magnetic storage devices, RAID storage systems, or any other storage type, or any combination thereof, to name a few.

In embodiments, the second designated key pair may include a plurality of key pairs (e.g. off-line keyset N 1803N). For example, the second designated key pair may further include a first additional designated public key and a corresponding first additional designated private key. In embodiments, each key pair of the aforementioned plurality of key pairs of the second designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the second designated public address may be derived by using and/or applying a cryptographic hash function of the second designated public key. In embodiments, the second designated public address is a result of the cryptographic hash function, or, in embodiments, at least a part of the result of the cryptographic hash function. The cryptographic hash function applied may be similar and/or the same cryptographic hash function applied to the first designated key pair. In embodiments, the cryptographic hash function applied to the second designated key pair may be different than the cryptographic hash function applied to the first key pair. A different cryptographic hash function may be used, in embodiments, as an additional security measure.

Referring back to FIG. 19A, the process for withdrawing digital assets may continue at step S4006. At step S4006, a plurality of smart contract instructions is provided. Each of the plurality of smart contract instructions, in embodiments, may be associated with a respective smart contract address associated with the underlying digital asset. In embodiments, the plurality of smart contract instructions may be provided with the process described in connection with FIG. 68.

Figure 68:
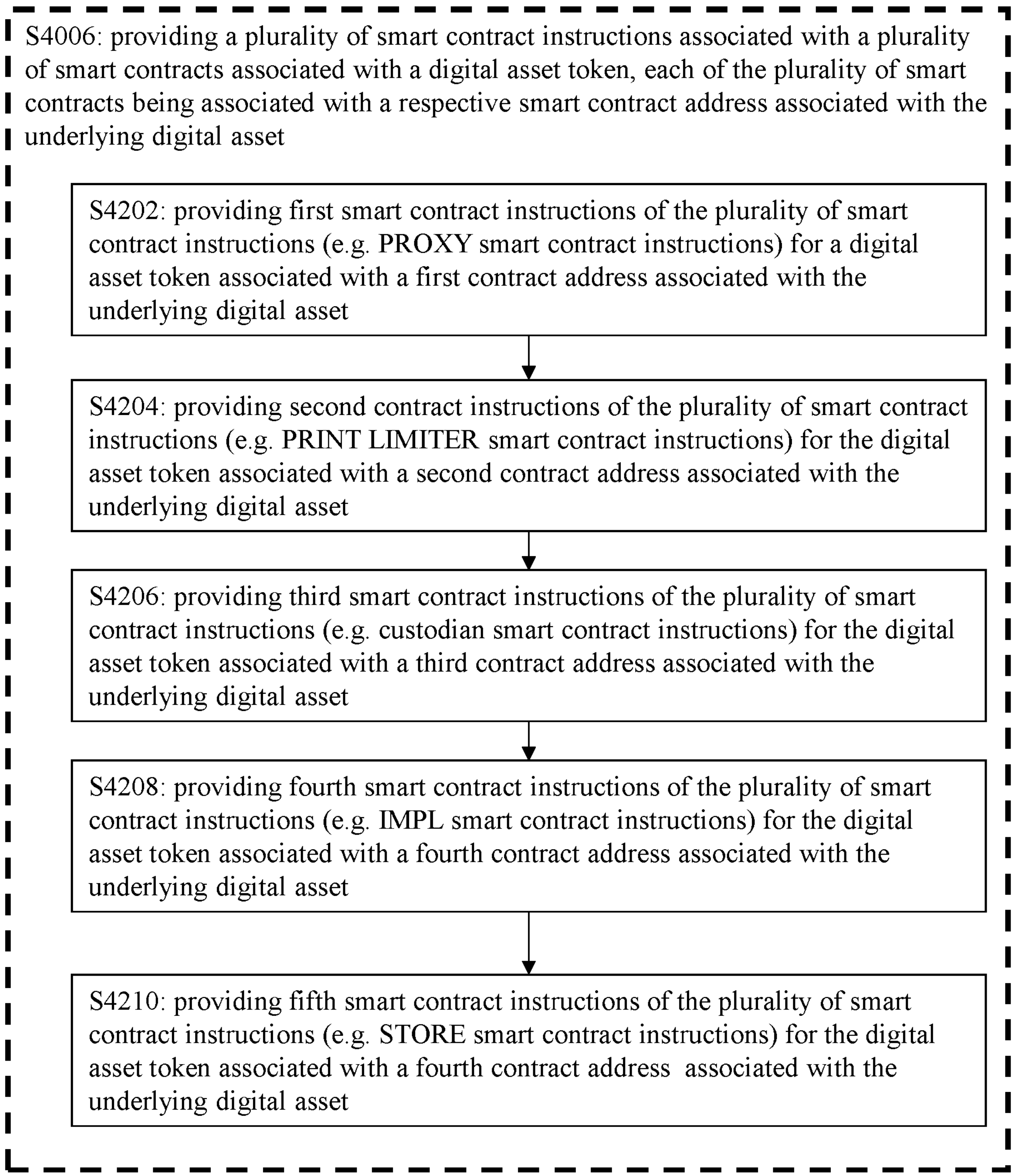
FIG. 68 is a flow chart of a process for providing a plurality of smart contract instructions in accordance with exemplary embodiments of the present invention.

Referring to FIG. 68, a process of providing a plurality of smart contract instructions may begin at step S4202. At step S4202, first smart contract instructions (e.g. PROXY Contract Instructions 1310A-1) associated with a first smart contract (e.g. PROXY Smart Contract 1310) are provided. The first smart contract may have a corresponding first contract address (e.g. Contract Address 1 of Proxy Smart Contract 1310) associated with the blockchain of the underlying digital asset. In embodiments, the first smart contract instructions may be saved as part of the blockchain of the underlying digital asset and/or include one or more of the following instructions: (1) first delegation instructions and/or (2) first authorization instructions, to name a few. The first delegation instructions may delegate one or more first functions associated with the digital asset token to one or more delegated contract addresses associated with the blockchain of the underlying digital asset. The one or more delegated contract addresses, in embodiments, may be different than the first contract address. For example, the one or more delegated contract addresses may include a second contract address, which may be different than the first contract address. The first delegation instructions may similar to the delegation instructions described above in connection with PROXY Delegation Instructions Module 1829.

The first authorization instructions, in embodiments, may be associated with the second designated key pair. In embodiments, first authorization instructions may be similar to the authorization instructions described above in connection with PROXY Authorization Instructions Module 1831.

In embodiments, the first smart contract may be PROXY smart contract 1310 described above in connection with FIGS. 4A and 4B, the description of which applying herein.

The process or FIG. 68 may continue with step S4204 where second smart contract instructions (e.g. PRINT LIMITER Contract Instructions 1360A-1) associated with a second smart contract (e.g. PRINT LIMITER Smart Contract 1360) is provided. The second smart contract may be associated with a second contract address (e.g. Contract Address 3 described above in connection with the PRINT LIMITER Smart Contract 1360) associated with the blockchain of the underlying digital asset. The second smart contract instructions may be saved as part of the blockchain for the underlying digital asset and/or include one or more of the following instructions: (1) print limiter token creation instructions, (2) second authorization instructions, and/or (3) third authorization instructions, to name a few.

The print limiter token creation instructions, in embodiments, may indicate one or more conditions under which digital asset tokens of the underlying digital asset are created. In embodiments, the print limiter token creation instructions may be similar to the PRINT LIMITER token creation instructions described above in connection with the PRINT LIMITER Token Creation Instructions Module 1833.

The second authorization instructions, in embodiments, may include instructions to create tokens of the digital asset token. In embodiments, the first designated key pair is designated to authorize the second authorization instructions. In embodiments, the second designated key pair is designated to authorize the second authorization instructions. The second authorization instructions, in embodiments, may include instructions limiting the creation of digital asset tokens. The limitation placed on token creation may prevent the creation of tokens above a first threshold. For example, the second authorization instructions may limit the creation of tokens to 100,000 tokens. In embodiments, the first threshold may be relative to a first period of time. For example, the second authorization instructions may limit the creation of tokens to 500,000 tokens per day. In embodiments, the second authorization instructions may be similar to the first authorization instructions described above in connection with PRINT LIMITER First Authorization Instructions Module 1839.

The third authorization instructions, in embodiments, may also include instructions with respect to token creation. In embodiments, the third authorization instructions may designate a first designated custodian address (e.g. a custodian address associated with CUSTODIAN 2 Smart Contract 1350) with respect to token creation of the digital asset token. In embodiments, the third authorization instructions may be similar to the second authorization instructions described above in connection with PRINT LIMITER Second Authorization Instructions Module 1841.

In embodiments, the second smart contract instructions may also include token balance modification instructions (e.g. instructions of the Token Balance Modification Instructions Module 1847). The token balance modification instructions may be related to modifying the total balance of tokens of the digital asset token assigned to a third delegated contract address. In embodiments, the third delegated contract address may be of the one or more delegated contracted addresses. In embodiments, the token balance modification instructions may be similar to the optional token balance modification instructions described above in connection with Token Balance Modification Instructions Module 1847.

In embodiments, the second smart contract may further include additional authorization instructions. The additional authorization instructions may be similar to the optional PRINT LIMITER THIRD Authorization instructions described above in connection with PRINT LIMITER Third Authorization Instructions Module 1835.

In embodiments, the second smart contract may be PRINT LIMITER Smart Contract 1360 described above in connection with FIGS. 4A and 4C, the description of which applying herein.

In embodiments, the process of FIG. 68 may continue with step S4206 where third smart contract instructions (e.g. CUSTODIAN 2 Contract Instructions 1350A-1) associated with a first designated custodian contract (e.g. CUSTODIAN 2 Smart Contract 1350). In embodiments, the first designated custodian contract is associated with a third contract address (e.g. Contract Address 6 of CUSTODIAN 2 Smart Contract 1350) associated with the blockchain of the underlying digital asset. In embodiments, the third contract address is the first designated contract address designated by the third authorization instructions of the second smart contract. In embodiments, the third smart contract instructions are saved as part of the blockchain of the underlying digital asset and/or include one or more of the following instructions: (1) fourth authorization instructions (e.g. authorization instructions described in connection with CUSTODIAN 2 First Authorization Instructions Module 1849), and/or (2) sixth authorization instructions (e.g. authorization instructions described in connection with CUSTODIAN 2 Second Authorization Instructions Module 1851), to name a few.

The fourth authorization instructions, in embodiments, may authorize the issuance of instructions to the second smart contract. The issued instructions that are authorized by the fourth authorization instructions may regard token creation. In embodiments, the fourth authorization instructions designate the second designated key pair to authorize the fourth authorization instructions. In embodiments, the fourth authorization instructions designate the first key pair to authorize the fourth authorization instructions. In embodiments, the fourth authorization instructions include instructions to permit the creation of digital asset tokens above a first threshold defined by the second authorization instructions. In embodiments, the fourth authorization instructions may be similar to the authorization instructions described in connection with CUSTODIAN 2 First Authorization Instructions Module 1849.

The sixth authorization instructions, in embodiments, may designate a seventh contract address as one of the one or more delegated contract addresses. In embodiments, the seventh contract address is not the second contract address. In embodiments, the second designated key pair is designated to authorize the sixth authorization instructions. In embodiments, the first designated key pair is designated to authorize the sixth authorization instructions. In embodiments, the sixth authorization instructions may be similar to the authorization instructions described in connection with CUSTODIAN 2 Second Authorization Instructions Module 1851.

In embodiments, the third smart contract may be CUSTODIAN 2 Smart Contract 1350 described above in connection with FIGS. 4A and 4D, the description of which applying herein.

In embodiments, the process of FIG. 68 may continue with step S4208 where fourth smart contract instructions (e.g. IMPL Smart Contract Instructions 1320A-1) associated with a fourth smart contract (e.g. IMPL Smart Contract 1320). In embodiments, the fourth smart contract is associated with a fourth contract address (e.g. Contract Address 2 of IMPL Smart Contract 1320), to name a few. The fourth contract address, in embodiments, may be one of the one or more delegated contract address. Additionally, the fourth contract address, in embodiments, may be different from one or more of: the first contract address, the second contract address, and/or the third contract address (and the below mentioned fifth contract address). The fourth smart contract instructions may be saved as part of the blockchain and/or include one or more of the following instructions: (1) token creation instructions (e.g. instructions of IMPL Token Creation Instructions Module 1865), (2) second delegation instructions (e.g. instructions of IMPL Delegation Instructions Module 1837), (3) token transfer instructions (e.g. instructions of IMPL Token Transfer Instructions Module 1861), and/or (4) token destruction instructions.

The token creation instructions may, in embodiments, be instructions to create tokens of the digital asset tokens. In embodiments, the token creation instructions may create tokens in accordance with the conditions set forth by the print limiter token creation instructions of the second smart contract. The token creation instructions may be similar to instructions described in connection with the IMPL Token Creation Instructions Module 1865.

The second delegation instructions, in embodiments, may delegate data storage operations to at least a fifth contract address. In embodiments, the fifth contract address may be associated with Contract Address 4 of STORE Smart Contract 1330. For example, the second delegation instructions may cause STORE Smart Contract 1330 to execute storage instructions of Storage Instructions Module 1853. The second delegation instructions may be similar to instructions described in connection with IMPL Delegation Instructions Module 1861.

In embodiments, the token transfer instructions may be related to transferring issued tokens of the digital asset token. The transfer of tokens may be from a first designated contract address to a second designated contract address. For example, issued tokens may be transferred from a contract address associated with a digital asset token issuer system to a user public address associated with a user attempting to purchase tokens of the underlying digital asset. The token transfer instructions may be similar to instructions described in connection with IMPL Token Transfer Instructions Module 1859.

In embodiments, the token destruction instructions may be related to destroying and/or burning one or more issued tokens of the digital asset token. For example, if a user is attempting to exchange a token for, as an example, fiat, the token being exchanged may be burned once the token is exchanged for fiat.

In embodiments, the fourth smart contract may be IMPL Smart Contract 1320 described above in connection with FIGS. 4A and 4F, the description of which applying herein.

In embodiments, the process of FIG. 68 may continue with step S4210 where fifth smart contract instructions (e.g. STORE Contract Instructions 1330A-1) associated with a fifth smart contract (e.g. STORE Smart Contract 1330) are provided. The fifth contract address, in embodiments, may be one of one or more designated store contract addresses. In embodiments, the fifth smart contract instructions may be saved as part of the blockchain of the underlying digital asset and/or include one or more of the following instructions: (1) data storage instructions (e.g. instructions of Storage Instructions Module 1853) and/or (2) fifth authorization instructions (e.g. instructions of STORE Authorization Instructions Module 1855), to name a few.

The data storage instructions, in embodiments, may include instructions to store transaction data related to the digital asset token. Transaction data, in embodiments, may include transaction information for one or more of the issued tokens of the digital asset token. The transaction information may include at least one of: (1) respective public address information associated with the blockchain of the underlying digital asset, and/or (2) corresponding respective token balance information which may be associated with the aforementioned respective public address information, to name a few. In embodiments, the transaction data may include transaction information for all of the issued tokens of the digital asset token. In embodiments, the data storage instructions may be similar to instructions described in connection with Storage Instructions Module 1853.

The fifth authorization instructions may include authorization instructions to modify the transaction data in response to a request. In embodiments, the request may be received from the fourth contract address. The fifth authorization instructions may be similar to instructions described above in connection with STORE Authorization Instructions 1855.

In embodiments, the fifth smart contract may be STORE Smart Contract 1330 described above in connection with FIGS. 4A and 4E, the description of which applying herein.

Referring back to FIG. 19A, the process of withdrawing digital assets may continue with step S4008. At step S4008, a list of designated public addresses is obtained by the digital asset exchange computer system associated with a digital asset exchange. In embodiments, the list of designated public addresses may include one or more designated public addresses. Each of the one or more designated public addresses, in embodiments, may also include a respective amount of digital assets. The respective amount of digital assets may refer to an amount of digital assets that the respective designated public address is requesting to withdraw. A simplified, exemplary list of designated public addresses is shown below as Table 1.

TABLE 1

| Designated Public Address | Digital Asset Type | Digital Asset Amount | Timestamp |
|---|---|---|---|
| 123456 | Gemini Dollar | 45 | T1 |
| 543456 | Gemini Dollar | 65 | T1 |
| 654692 | Gemini Dollar | 24 | T2 |
| 687128 | Gemini Dollar | 17 | T2 |
| 357981 | Gemini Dollar | 8 | T1 |
| 354651 | Gemini Dollar | 104 | T3 |

In embodiments, the list of designated public addresses may include one or more of the following: a designated public address, a digital asset type, a digital asset amount, and/or a timestamp, to name a few. The digital asset type may refer to the type of digital asset the customer is seeking to withdraw. While only one type of digital asset is shown in Table 1 (Gemini Dollar), one or more types of digital assets may be included in a list of designated public addresses. The timestamp, in embodiments, may refer to the time at which: (1) the customer sent the request for withdrawal; (2) the customer's request was received; (3) the customer would like to receive their withdrawal; and/or (4) a combination thereof, to name a few.

In embodiments, the process of obtaining a list of designated public addresses may be accomplished in one or more manners. For example, the digital asset exchange computer system may receive a plurality of requests to withdraw an amount of digital asset tokens. In embodiments, each request may include a designated public address, a digital asset type, a digital asset amount, and/or a timestamp, to name a few. Once the plurality of requests is received, the digital asset exchange computer system may generate and store the list of designated public addresses.

As another example, to obtain the list of designated public addresses, the digital asset exchange computer system may first receive a request to distribute a payment amount to one or more designated public addresses in exchange for an asset. The asset, having a corresponding value, as described herein, may not be the digital asset token and/or may be one or more of the following: stocks, bonds, equities, fixed-income securities, fiat, commodities, and/or marketable securities, to name a few. For example, the request to withdraw may be in the form of a request to pay stockholders a dividend based on the amount of stocks the stockholder owns. The request to distribute a payment amount may be received from a digital asset issuer (e.g. the digital asset token issuer system described above in connection with FIGS. 15A-15C, the description of which applying herein). In embodiments, the request to distribute a payment amount may include one or more of: payment information, one or more designated public addresses, a digital asset type associated with a respective designated public address, a digital asset amount associated with a respective designated public address, and/or a timestamp associated with a respective designated public address, to name a few.

In embodiments, continuing the example, the digital asset exchange computer system may access a digital asset security token database for the purposes of determining each respective designated public address of the one or more designated public addresses and/or a respective digital asset security token amount associated with each respective designated public address. In embodiments, the digital asset security token may be a digital asset that represents the asset. For example, if a user associated with a designated public address owns 50 stocks of Corporation A, the user may also own a corresponding 50 Security Tokens representing the ownership of 50 stocks.

Continuing the example, the digital asset exchange computer system may determine the amount of the digital asset that corresponds to the amount of digital asset security tokens. In embodiments, to determine the amount of digital asset, the digital asset exchange computer system may determine the values of the digital asset and the digital asset security token. After determining the values of the digital asset and the digital asset security token, the digital asset exchange computer system may determine a difference between the two values. The difference between the two values, along with the two values, may be used to determine a respective amount of digital assets that each designated public address is requesting. The respective amount, in embodiments, may be assigned to the respective designated public address, creating the list of designated public addresses. The list of designated public addresses may be stored by the digital asset exchange computer system on memory operably connected to the digital asset exchange computer system.

Continuing the process of withdrawing digital assets, optionally, in embodiments, at step S4010, the digital asset exchange computer system may verify the list of designated public addresses. The verification process, in embodiments, may be based on one or more whitelists associated with one or more of the designated public addresses. The digital asset exchange computer system, in embodiments, may verify that each designated public address is verified. In embodiments, the digital asset exchange computer system may verify only the designated public addresses that have one or more whitelists associated therewith.

In embodiments, the one or more designated public addresses may be verified by the process described in connection with FIG. 21. Referring to FIG. 21, the process of verification may begin at step S4502. At step S4502, the digital asset exchange computer system accesses the user identification data associated with each customer of the plurality of customers of the digital asset exchange. In embodiments, at step S4504, the digital asset exchange computer system may determine, for each customer, whether the user identification data includes a whitelist associated with the customer's respective account. If there are no whitelists associated with a customer, the process may continue with FIG. 19B (described below).

If one or more whitelists associated with one or more customers, the process may continue with Step S4506. At step S4506, the digital asset exchange computer system may access the one or more whitelists. The one or more whitelists may include one or more authorized public addresses, as described above. The one or more whitelists may be accessed and/or obtained to determine, at step S4508, whether each respective one or more authorized public addresses is the respective designated public address associated with the customer seeking to withdraw digital assets. In embodiments, the digital asset exchange computer system may make the aforementioned determination by comparing the one or more authorized public addresses to the designated public addresses. If the designated public addresses, in embodiments, match at least one of the one or more authorized public addresses, the designated public address may be verified as an authorized public address. In embodiments, if the designated public addresses are authorized, and therefore verified, the process for withdrawing digital assets may continue with FIG. 19B (continued and described below). If, in embodiments, the designated public addresses are not authorized (or at least one designated public address is not authorized), the process for withdrawing digital assets may continue with FIG. 19C (continued and described below).

Referring to FIG. 19B, the process for withdrawing digital assets may continue with step S4012. At step S4012, the digital asset exchange computer system may increase the total supply of the digital asset token from a first amount to a second amount. The first amount, in embodiments, may refer to the total supply of the digital asset token prior to obtaining the list of designated public addresses. The second amount, in embodiments, may refer to an increased amount of the total supply of the digital asset token. In embodiments, the difference between the second amount and the first amount is equal to or greater than the total amount of digital asset token requested by the designated public addresses of the list of designated public addresses. For example, the first amount of digital asset token may be 100 Bitcoin. Continuing the example, the designated public addresses may have requested 50 Bitcoin. Thus, in this example, the second amount, to account for the amount requested by the designated public addresses, may be at least 150 Bitcoins, making the difference (e.g. a third amount of digital asset tokens), to be at least 50 Bitcoin (e.g. the amount requested). A more detailed description of the process of step S4012 is located in the flowcharts of FIGS. 69A-69B and/or FIG. 70.

In embodiments, increasing the supply of digital asset tokens may begin with the digital asset exchange computer system determining whether the first designated private key has the authority to increase the total supply by the amount requested by the designated public addresses. As mentioned above, the plurality of smart contract instructions may limit the total amount of digital assets that the first designated key pair has the authority to generate. For example, the first designated key pair may only have the authority to generate 25 Bitcoin. Thus, continuing the example, if the third amount is 50 Bitcoin, the first designated key pair would not have the authority to generate the third amount. If the first designated key pair does not have the authority to generate the third amount, the process for withdrawing digital assets, in embodiments, may continue with FIGS. 69A-69B. As another example, if the first designated key pair has the authority to generate 100 Bitcoin, in embodiments, the first designated key pair would have the authority to generate 50 Bitcoin (e.g. the third amount). If the first designated key pair does have the authority to generate the third amount, the process for withdrawing digital assets, in embodiments, may continue with FIG. 70.

Figure 69A:
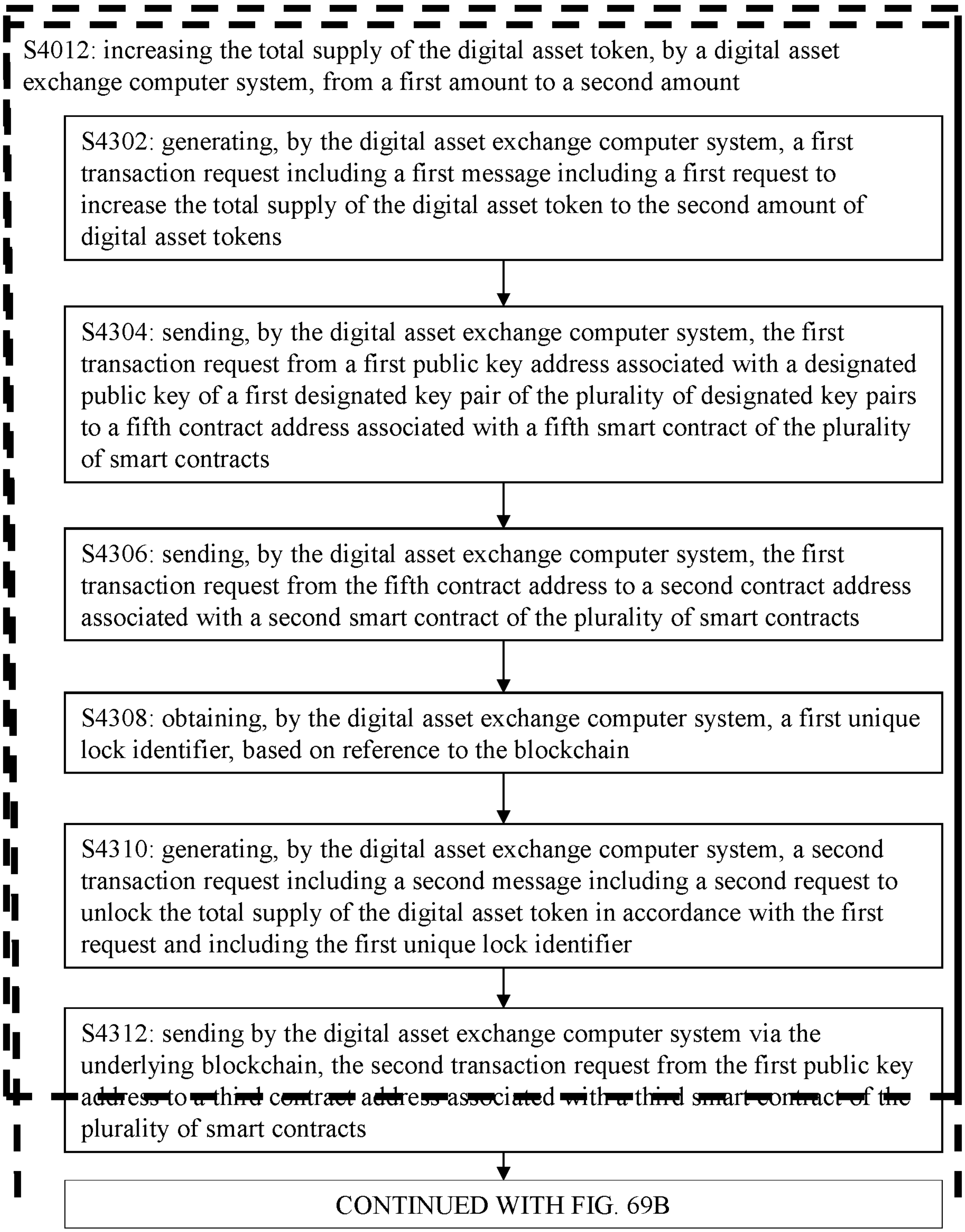
FIGS. 69A-69B are flow charts of processes for increasing a total supply of digital asset tokens in accordance with exemplary embodiments of the present invention.

Referring to FIG. 69A, the process of increasing the total supply of digital asset tokens may begin with step S4302 where a first transaction request may be generated by the digital asset exchange computer system. The first transaction request may include a first message that may include a first request to increase the total supply of digital asset tokens to the second amount of digital asset tokens. In embodiments, the first transaction request may be sent from a contract address associated with the digital asset token issuer system to the fourth contract address. In embodiments, the first transaction request may be digitally signed by the first designated private key and/or second designated private key. In embodiments, the first transaction request may include first transaction fee information for minors associated with the plurality of geographically distributed computer systems in the peer-to-peer network. The first transaction fee information may be a predetermined amount of currency which may be related to the cost of processing the first transaction request.

In embodiments, the first request may be to decrease the total supply of digital asset tokens to a third amount. This example may follow the same process described in connection with FIGS. 69A-69B and/or FIG. 70, with the third amount of digital asset tokens being less than the first amount of digital asset tokens.

The process of increasing the total supply of the digital asset token may continue with step S4304. In embodiments, at step S4304, the first transaction request may be sent by the digital asset token issuer system from the first designated public address to the fifth contract address. In embodiments, the first transaction request may be sent via the blockchain of the underlying digital asset. In embodiments, the first transaction request may be sent via network 15.

The process for increasing the total supply of the digital asset token may continue with step S4306 where the first transaction request may be sent from the fifth contract address to the second contract address via the blockchain for the underlying digital asset. The first transaction request, in embodiments, may be sent to the second contract address by the fifth contract address in response to the fifth contract address receiving the first transaction request. In embodiments, the first transaction request may be sent by the fifth contract address in response to the fifth contract address determining that the first transaction request requires additional authority. The aforementioned determination, in embodiments, may be made based on the plurality of smart contract instructions.

In embodiments, once the first transaction request is received by the second contract address, the second smart contract may execute the first transaction request. The execution of the first transaction request may, in embodiments, cause the second contract address to return a first unique lock identifier associated with the first transaction request to the digital asset exchange computer system (e.g. via a public address associated with the digital asset exchange). In embodiments, the first transaction request is executed via the plurality of geographically distributed computer systems in the peer-to-peer network with reference to the blockchain for the underlying digital asset.

In embodiments, the process may continue with step S4308, where the digital asset exchange computer system may obtain the first unique lock identifier. The first lock identifier, as mentioned above, may be obtained from the second smart contract address via a public address associated with the digital asset exchange (e.g. the public address associated with the first designated public key). In embodiments, the first unique lock identifier may be obtained based on reference to the blockchain for the underlying digital asset.

In embodiments, the process for increasing the total supply of the digital asset may continue with step S4310 where a second transaction request may be generated by the digital asset exchange computer system. In embodiments, the second transaction request may be generated in response to the first unique lock identifier being obtained. In embodiments, the second transaction request may be generated at the same time and/or substantially the same time that the first transaction request is generated. The second transaction request may, in embodiments, include a second message which may include a second request to unlock the total supply of the digital asset tokens. The second request may be in accordance with the first request. In embodiments, the second request, may also include the first unique lock identifier. In embodiments, the second transaction request may be digitally signed by the first designated private key and/or the second designated private key. In embodiments, the second transaction request may include second transaction fee information for minors associated with the plurality of geographically distributed computer systems in the peer-to-peer network. The second transaction fee information may be a predetermined amount of currency which may be related to the cost of processing the second transaction request.

The process may continue with step S4312 where the second transaction request may be sent from the first designated public address (the public address associated with the first designated public key) to the third contract address by the digital asset exchange computer system via the blockchain for the underlying digital asset. In embodiments, in response to receiving the second transaction request, the third smart contract may execute the second transaction request. Executing the second transaction request, in embodiments, may include returning a first unique request hash associated with the second transaction request to the first designated public address. The first unique request hash, in embodiments, may be an algorithm as described above, the description of which applying herein. In embodiments, the second transaction request may be executed via the plurality of geographically distributed computer systems in the peer-to-peer network with reference to the blockchain associated with the underlying digital asset.

Figure 69B:
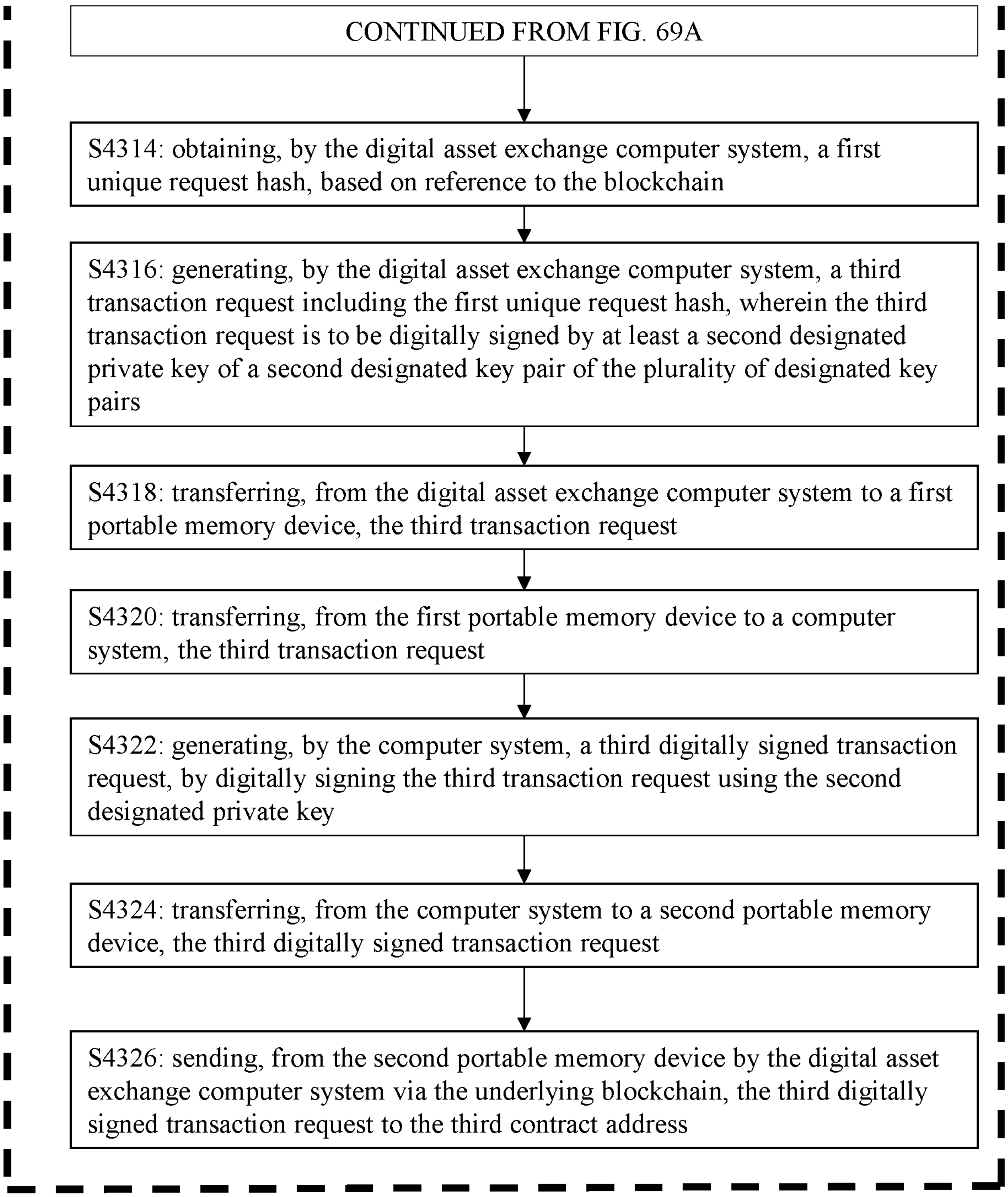

The process for increasing the total supply of the digital asset token may continue with FIG. 69B. Referring to FIG. 69B, the process may continue with step S4314 where, in embodiments, the first unique request hash may be obtained by the digital asset exchange computer system. The first unique request hash, as mentioned above, may be obtained from the third smart contract address via a public address associated with the digital asset exchange (e.g. the public address associated with the first designated public key—the first designated public address). In embodiments, the first unique request hash may be obtained based on reference to the blockchain for the underlying digital asset.

Continuing the process, at step S4316, in embodiments, a third transaction request may be generated by the digital asset exchange computer system. The third transaction request may, in embodiments, be generated to be digitally signed by the first designated private key and/or the second designated private key. In embodiments, the third transaction request may include the first unique request hash. In embodiments, the third transaction request may be generated at the same time and/or substantially the same time that the first transaction request and/or second transaction request is generated. The third transaction request, in embodiments, may be generated in response to the digital asset token issuer system obtaining the first unique request hash.

In embodiments, at step S4318, the third transaction request may be transferred to a first portable memory device. In embodiments, the third transaction request may be transferred to the first portable memory device by an administrator (e.g. an administrator of administrator system 1801, administrator of the digital asset exchange computer system, to name a few). In embodiments, the third transaction request may be transferred from the digital asset exchange computer system to the first portable memory device. In embodiments, the first portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S4320 where the third transaction request may be transferred from the first portable memory device to a first computer system. The first computer system, as mentioned above, may be a hardware security module. In embodiments, the third transaction request may be transferred to the second computer system by an administrator (e.g. an administrator of administrator system 1801, administrator of the digital asset exchange computer system, to name a few).

At step S4322, in embodiments, the computer system may generate a third digitally signed transaction request by digitally signing the third transaction request. The digital signature used by the computer system, in embodiments, may be one or more of: the first designated private key and/or the second designated private key. In embodiments, the digital signature may be a private key of the plurality of designated key pairs provided in step S4004.

In embodiments, once the third digitally signed transaction request is generated, at step S4324, the third digitally signed transaction request may be transferred from the computer system to a second portable memory device. The second portable memory device may, in embodiments, be the first portable memory device (e.g. the first and second portable memory device are the same portable memory device). In embodiments, the second portable memory device may be physically and operatively separate from the first portable memory device. In embodiments, the second portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process for increasing the total supply of the digital asset may continue with step S4326 where the third digitally signed transaction request may be sent from the second portable memory device to the third contract address using the digital asset exchange computer issuer system, via the blockchain for the underlying digital asset. To send the third digitally signed transaction request, in embodiments, the third digitally signed transaction request may be first transferred from the second portable memory device to the digital asset exchange computer system. Once transferred, in embodiments, the third digitally signed transaction request may be sent by the digital asset exchange computer system, from the first designated public address (associated with the first designated key pair) to the third contract address.

In response to receiving the third digitally signed transaction request, in embodiments, the third smart contract may execute the third digitally signed transaction request. In embodiments, the execution of the third digitally signed transaction request may result in a request to validate the second request to unlock the total supply of digital asset tokens based on the third digitally signed transaction request and/or the first unique request hash. In embodiments, the execution may also result in a first call being sent to the second contract address. The first call may be to increase the total supply of the digital asset tokens from the first amount to the second amount. In embodiments, the third smart contract may execute the third digitally signed transaction request via the plurality of geographically distributed computer systems in the peer-to-peer network with reference to the blockchain of the underlying digital asset.

The first call sent by the third smart contract to the second contract address of the second smart contract may, in embodiments, result in the second contract address returning the first call to the fourth contract address. The fourth contract address may, in response to receiving the returned first call, execute a second call to the fifth contract address. The second call, in embodiments, may be to set the total supply of the digital asset tokens to the second amount of digital asset tokens. In embodiments, the fourth smart contract may execute the second call via the plurality of geographically distributed computer systems in the peer-to-peer network with reference to the blockchain of the underlying digital asset.

The second call sent by the fourth smart contract to the fifth contract address of the fifth smart contract may, in embodiments, result in the fifth smart contract executing the second call to set the total supply of the digital asset tokens to the second amount of digital asset tokens. In embodiments, the fifth smart contract may execute the second call via the plurality of geographically distributed computer systems in the peer-to-peer network with reference to the blockchain of the underlying digital asset.

In embodiments, the fifth contract address may also return the total balance of the digital asset token to the second contract address and/or the fourth contract address.

In embodiments, the steps of the process described in connection with FIGS. 69A-69B may be rearranged or omitted.

As another example, a process for increasing the total supply of the digital asset may be performed by the steps of FIG. 70. Referring to FIG. 70, in embodiments, the first designated key pair may have the authority to increase the total amount of the digital asset token to the second amount. In such embodiments, the digital asset exchange may, at step S4402, generate a first transaction request including a first request. The first request may include a request to increase the total supply of the digital asset token to the second amount of digital asset tokens. In embodiments, the first transaction request may be digitally signed by the first designated private key and/or the second designated private key.

The first request may, at step S4404, be sent by the digital asset exchange computer system to the fifth contract address associated with the fifth smart contract. The first request may be sent from a public address associated with the digital asset exchange (e.g. the first designated public address).

Once received, at step S4406, the fifth contract address may execute the first transaction request via the plurality of geographically distributed computer systems in the peer-to-peer network with reference to the blockchain. In embodiments, the execution of the first transaction request may cause the fifth smart contract to: (1) validate the authority of the first designated key pair of the plurality of designated key pairs; and/or (2) send a first call to the fourth smart contract address to generate the third amount of the digital asset. In embodiments, in response to receiving the first call, the fourth smart contract may execute, via the plurality of geographically distributed computer systems in the peer-to-peer network with reference to the blockchain, the first call to generate the first unique lock identifier. In embodiments, once generated, the fourth contract address may send a return including the first unique lock identifier to the second smart contract address.

In embodiments, the second smart contract may execute a second call to the fourth contract address in response to the return of the first unique lock identifier. In embodiments, the second call may be executed via the plurality of geographically distributed computer systems in the peer-to-peer network with reference to the blockchain. The second call, in embodiments, may be to confirm the first call with the first lock identifier. In embodiments, in response to receiving the second call, the fourth smart contract may execute, via the plurality of geographically distributed computer systems in the peer-to-peer network with reference to the blockchain, the first call to execute a third call to the fifth contract address to obtain the total supply of digital asset tokens in circulation.

In embodiments, the fifth contract address, in response, via the plurality of geographically distributed computer systems in the peer-to-peer network with reference to the blockchain, may execute the third call and return, to the fourth contract address, the second amount of digital asset tokens corresponding to the total supply of digital asset tokens in circulation. In embodiments, for example, the total supply of digital asset tokens may be the first amount of the digital asset token.

In response to the return, in embodiments, the fourth smart contract may execute, via the plurality of geographically distributed computer systems in the peer-to-peer network with reference to the blockchain, a fourth call request to the fifth contract address to set a new total supply of digital asset tokens in circulation to the second amount. In embodiments, in response to the fourth call, the fifth smart contract may execute, via the plurality of geographically distributed computer systems in the peer-to-peer network with reference to the blockchain, the fourth call and set the new total supply of digital asset tokens in circulation to the second amount.

In embodiments, the steps of the process described in connection with FIG. 70 may be rearranged or omitted.

Referring back to FIG. 19B, after increasing the total supply of the digital asset token to the second amount, the digital asset exchange computer system at step S4014 may assign each respective amount of the digital asset token to each respective designated public address of the list of designated public addresses. In embodiments, the digital asset exchange computer system may accomplish step S4014 by obtaining and/or accessing the list of designated public addresses. For example, referencing the above Table 1, Table 2 below shows the respective amount of the digital asset to be assigned.

TABLE 2

| Designated Public Address | Digital Asset Type | Digital Asset Amount |
|---|---|---|
| 123456 | Gemini Dollar | 45 |
| 543456 | Gemini Dollar | 65 |
| 654692 | Gemini Dollar | 24 |
| 687128 | Gemini Dollar | 17 |
| 357981 | Gemini Dollar | 8 |
| 354651 | Gemini Dollar | 104 |

Once the respective amounts of the digital asset have been assigned, the digital asset exchange computer system, at step S4016, may confirm that each designated public address was assigned the respective amount of the digital asset token. For example, referring to Table 2 above, the digital asset exchange computer system may confirm the following: designated public address 123456 received 45 Gemini Dollars; designated public address 543456 received 65 Gemini Dollars; designated public address 654692 received 24 Gemini Dollars; designated public address 687128 received 17 Gemini Dollars; designated public address 357981 received 8 Gemini Dollars; and/or designated public address 354651 received 104 Gemini Dollars. In embodiments, the digital asset exchange computer system may make the confirmation based on one or more of the following: each respective digital asset security token amount, each respective payment amount, each respective designated public address, and/or the list of designated public addresses, to name a few.

Each respective amount, in embodiments, may be confirmed by the digital asset exchange computer system by sending a call to each designated public address. The call, in embodiments, may be sent from a public address associated with the digital asset exchange. Each designated public address, in embodiments, may return the amount assigned and/or the total amount of digital assets assigned to the respective designated public address. The return may be used by the digital asset exchange computer system to confirm that each respective amount was received. In embodiments, the returns may be stored by the digital asset exchange computer system.

In embodiments, the digital asset token issuer system may determine that each respective amount is not confirmed as received and/or is unable to confirm that each amount is received. For example, the digital asset token issuer system may determine that the designated public address 123456 received 13 Gemini Dollars, instead of 45. In these embodiments, the digital asset exchange computer system may generate and/or send a warning message for an administrator (e.g. an administrator of administrator system 1801) and/or the respective designated public address. In embodiments, the administrator system may be the digital asset exchange. In embodiments, the administrator system may not be the digital asset exchange. The warning message may include a notification stating that the amount of tokens that were assigned is incorrect and/or needs to be fixed. Additionally, the warning message may include a transaction ledger (e.g. Network Digital Asset Transaction Ledger 3228). Furthermore, the warning message may include the intended amount of digital asset tokens (e.g. 45 Gemini Dollars). In embodiments, if the digital asset exchange computer system determines that each respective amount is not confirmed as received and/or is unable to confirm that each amount is received, the digital asset token issuer system may repeat one or more of the steps of the processes described above in connection with FIGS. 69A-69B, and/or FIG. 70 in order to fix the amount of the digital asset token to the correct amount.

In embodiments, as mentioned above, the digital asset exchange computer system may determine that one or more designated public addresses of the list of designated public addresses is not authorized to withdraw digital assets. If one or more designated public addresses are not authorized, the digital asset exchange computer system, in embodiments, may perform the steps of the process illustrated in FIG. 19C. Referring to FIG. 19C, the digital asset exchange computer system, at step S4018, may generate a notification. The notification, in embodiments, may indicate that the respective designated public address cannot be assigned the respective amount of the digital asset. In embodiments, the notification may also include an option to override the security measure to prevent the withdrawal of digital assets to an unverified account. The option to override, in embodiments, may require user identification information, which may include personally identifiable information.

At step S4020, the digital asset exchange computer system may send the notification to a user device associated with the request to withdraw. Additionally, in embodiments, the notification may also be sent to: a third party computer system and/or an administrator associated with the digital asset exchange. The notification, in embodiments, may also be stored by the digital asset exchange computer system.

The digital asset exchange computer system, at step S4022, may cancel the respective request to withdraw the respective amount of digital asset token. Alternatively, if the option to override is utilized, the process may continue with FIG. 19B.

In embodiments, the steps of the process described in connection with FIGS. 19A-19C may be rearranged or omitted.

Secondary Market Activities

Figure 14:
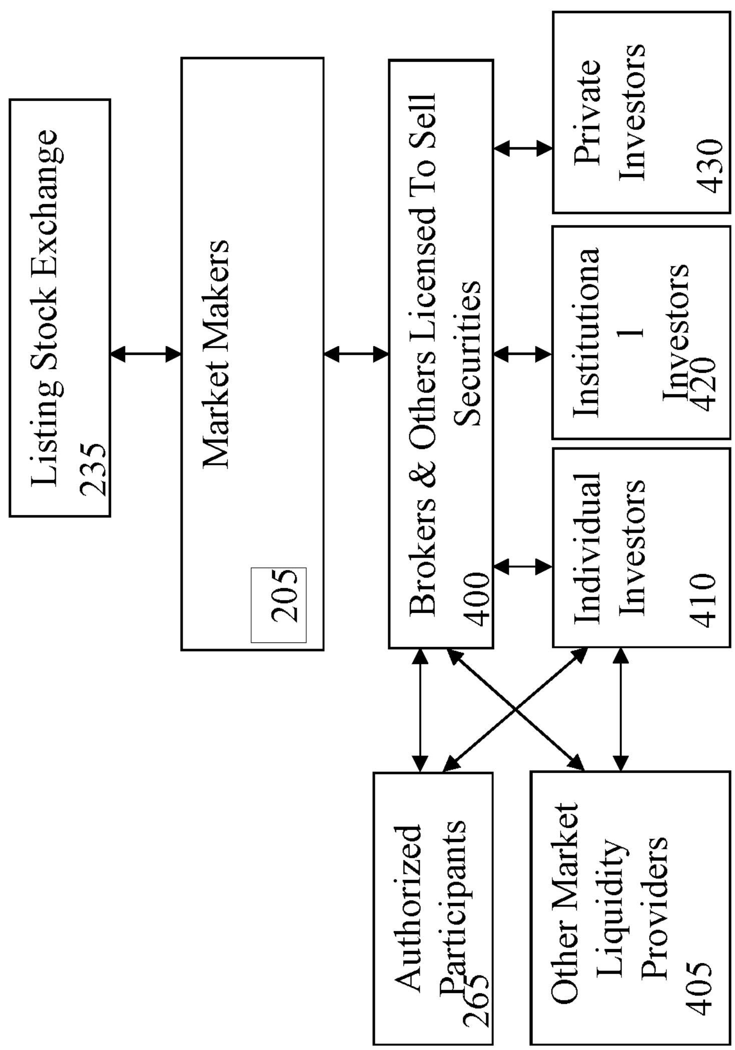
FIG. 14 is a schematic diagram of an exemplary secondary market for shares in the trust in accordance with exemplary embodiments of the present invention.

FIG. 14 is a schematic diagram of an exemplary secondary market for shares in the trust in accordance with exemplary embodiments of the present invention. In embodiments, the secondary market can include one or more listing stock exchanges 235 (e.g., NYSE, NASDAQ, AMEX, LSE, to name a few), one or more market makers 205, one or more brokers and/or other licensed to sell securities 400, authorized participants 265, other market liquidity providers 405, individual investors 410, institutional investors 420 and private investors 430, to name a few.

As described earlier, in the primary market APs 265 may obtain and/or redeem shares in the trust through the creation and redemption redeem processes. APs 265 may then sell shares in a secondary market. APs 265 may also buy shares in the secondary market. In an exemplary secondary market for shares in the trust for a digital math-based asset ETP, e.g., a Bitcoin ETP, a listing stock exchange 235 may be the primary listing venue for individual ETP shares. In embodiments, the listing stock exchange 235 may be required to file listing rules with the SEC if no applicable listing rules already exist. The listing exchange 235 may enter into a listing agreement with the sponsor 230. In embodiments, the listing exchange 235 may appoint the lead market maker and/or other market makers 205. The market makers 205 may facilitate the secondary market trading of shares in the trust underlying the ETP. Market makers 205 may facilitate creations and/or redemptions of creation units through one or more APs. In embodiments, such creations and/or redemptions may be related to market demand, e.g., to satisfy market demand.

Still referring to FIG. 14, individual investors 410, institutional investors 420, and/or private investors 430 may buy and/or sell one or more shares in the trust. In embodiments, these investors may buy and/or sell shares through brokers 400 or others licensed to sell securities. Brokers 400 and/or others licensed to sell securities may receive cash and/or other assets from investors in order to buy one or more shares in the trust. Brokers 400 and/or others licensed to sell securities may receive one or more shares from investors to sell for cash and/or other assets.

Other market liquidity providers 405 may also participate in the secondary market. In embodiments, other market liquidity providers 405 may buy and/or sell one or more shares on a list stock exchange 235. In embodiments, other market liquidity providers 405 may buy and/or sell one or more creation units through one or more APs 265. Other market liquidity providers 405 may include, by way of example, arbitragers, prop traders, "upstairs", private investors, dark pools, to name a few.

In embodiments, the assets can include additional assets besides digital math-based assets, such as, other commodities, currencies, futures, derivatives, and/or securities, to name a few.

In embodiments, a system for determining and/or providing a blended digital math-based asset price can comprise one or more processors and one or more computer-readable media operatively connected to the one or more processors and having stored thereon instructions for carrying out the steps of: (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

Deposit Distribution Waterfalls Among Wallets.

The creation process involves the deposit of digital assets into the trust's accounts. During a creation, assets or other funds may be deposited into one or more trust accounts. In embodiments, a trust may limit the number of assets or amount of funds stored in each of its wallets, e.g., for security reasons to reduce exposure if any one wallet is compromised. In multi-wallet structures, various asset distributions among the wallets are possible, and various distribution methods or waterfalls may be employed.

In embodiments, wallets may be filled in a pre-determined order. In embodiments, wallets may be filled according to one or more desired capacities or account balances, e.g., deposit 10,000 bitcoin in each wallet before proceeding to deposit in the next wallet.

Figure 18A:
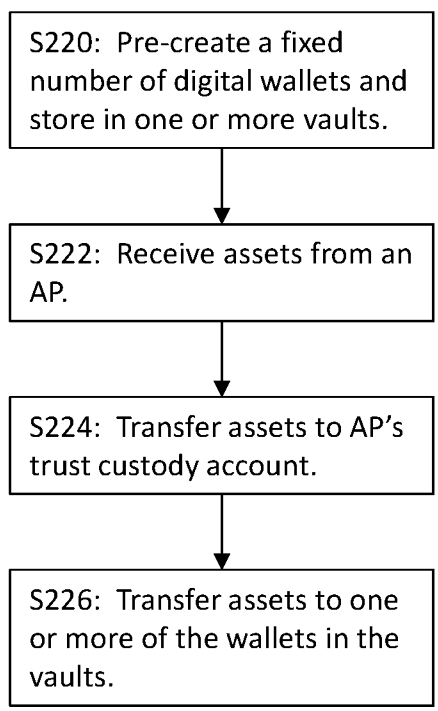
FIGS. 18A-18D are flow charts of various exemplary processes for assigning digital math-based assets, such as bitcoin, obtained during a creation and distributing them among digital wallets in accordance with embodiments of the present invention.
Figure 18B:
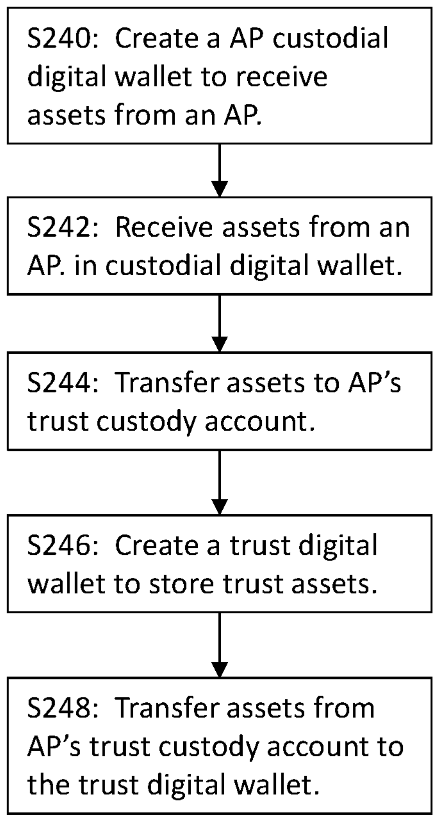

FIGS. 18A and 18B are flow charts of various exemplary processes for assigning digital assets (e.g., bitcoin) obtained at creation and distributing them among digital wallets in accordance with embodiments of the present invention.

For example, with reference to FIG. 18A, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S220, a fixed number of digital wallets to be stored in one or more vaults can be created in advance of anticipated use. In creating the digital wallets, as described herein e.g., in relation to FIG. 5A, the private key for each wallet may be parsed into two or more segments and/or encoded and stored in paper form. In embodiments, the key segments may be further encrypted before storing in paper form. The corresponding public key may be kept readily available for the administrator and/or custodian to access.

In step S222, an AP using an AP computer system can send to the trustee, custodian and/or administrator using a trust computer system, which in turn receives, assets (e.g., digital math assets such as bitcoin) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., bitcoin) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In embodiments, in step S224, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In step S226, the digital assets in the digital wallets associated with the AP trust custody account may be transferred using the trust computer system in whole or part into one or more of the previously created digital wallets whose private key segments are stored in vaults. In embodiments, the digital assets may be distributed by the trust computer system to trust wallets, such as discussed in the context of FIG. 18B herein, or according to another distribution algorithm.

With reference to FIG. 18B, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S240, an AP custodial digital wallet can be created using the trust computer system to receive assets from an AP digital wallet on an AP computer system.

In step S242, an AP using an AP computer system can send to the trustee, custodian and/or administrator using a trust computer system (which in turn receives) assets (e.g., digital math assets such as bitcoin) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., bitcoin) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In step S244, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In embodiments, the creation distribution methodology/algorithm can depend at least in part upon one or more of the following criteria or parameters:

- setting a maximum amount of digital assets stored in each wallet (e.g., limiting to 10,000 bitcoin in each wallet);
- setting a minimum amount of digital assets stored in each wallet (e.g., at least 100 bitcoin in each wallet);
- setting a maximum ratio of maximum amount to minimum amount of digital assets stored in each wallet (e.g., a 10-to-1 ratio);
- setting a random amount of digital assets to be stored in each wallet, wherein the random amount is greater than a minimum amount and less than a maximum amount;
- limiting the number of uses of each wallet (e.g., never using the same wallet more than once);
- resetting the maximum amount and the minimum amount of digital assets stored in each wallet based at least in part on increased or decreased volume of digital assets held by the trust;
- setting a maximum amount of digital assets transferred to each wallet in any given transaction (e.g., limiting to 10,000 bitcoin in each wallet);
- setting a minimum amount of digital assets transferred to each wallet in any given transaction (e.g., at least 100 bitcoin in each wallet);
- setting a maximum ratio of maximum amount to minimum amount of digital assets transferred to each wallet in any given transaction (e.g., a 10-to-1 ratio);
- setting a random amount of digital assets to be transferred to each wallet in any given transaction, wherein the random amount is greater than a minimum amount and less than a maximum amount;
- limiting the number of transfers to a given wallet (e.g., never using the same wallet more than once, never make more than two transfers to the same wallet during a year period, to name a few);
- resetting the maximum amount and the minimum amount of digital assets transferred to and/or from each wallet based at least in part on increased or decreased volumes of digital assets held by the trust; and/or performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day).

Figure 18C:
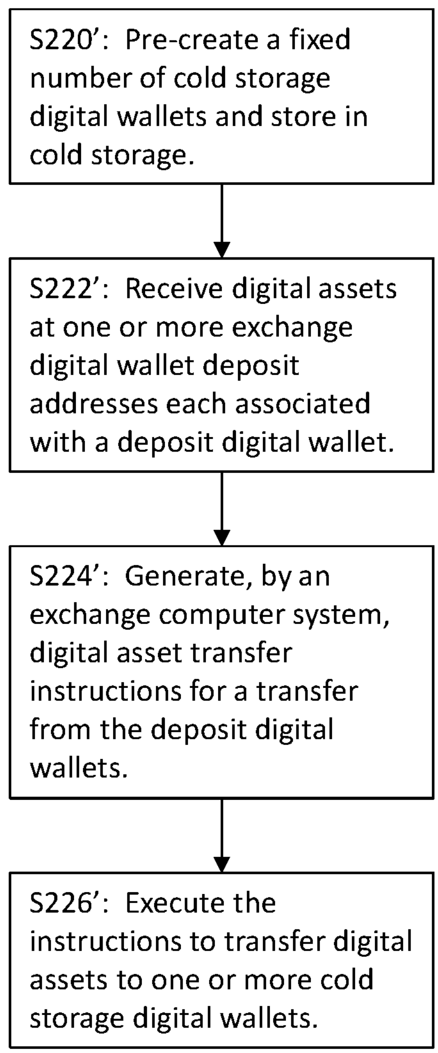

With reference to FIG. 18C, an exemplary deposit distribution waterfall is illustrated. In embodiments, these steps may be performed using an exchange computer system.

In step S220', a fixed number of digital wallets to be stored in one or more vaults can be created in advance of anticipated use. In generating the digital wallets, as described herein e.g., in relation to FIG. 5A, the private key for each wallet may be parsed into two or more segments and/or encoded and stored in paper form. In embodiments, the key segments may be further encrypted before storing in paper form. In embodiments, the private keys, which can include multiple private keys for multi-signature wallets, may be stored electronically, e.g., on non-transitory computer-readable memory. The corresponding public key may be kept readily available for an exchange employee and/or private key custodian to access. In embodiments, cold storage wallet private keys may be stored remotely, e.g., in a bank vault, bank safety deposit box, and/or precious metal vault. In embodiments, cold storage wallet private keys may be stored in a locked room and/or in a safe, which may be located at the premises of exchange employees.

In step S222', an exchange user using computer system or user device can send to a deposit address associated with a deposit digital wallet maintained by the exchange, which in turn receives, assets (e.g., digital math assets such as bitcoin) to be deposited with the exchange. For example, the exchange computer system can send electronically to the user device a public key or deposit address associated with an exchange deposit wallet to receive the digital assets. The user can then enter the public key or address into a user digital wallet on the user device to send the digital assets (e.g., bitcoin) to the exchange deposit wallet using a private key associated with the user digital wallet and the address associated with the exchange deposit wallet. The exchange computer system can then acknowledge (e.g., electronically) receipt of the transferred digital assets in the deposit wallet. In embodiments, one or more private keys associated with deposit digital wallets may be stored in cold storage.

In embodiments, in step S224', the exchange computer system may generate digital asset instructions (e.g., machine-readable instructions comprising at least a destination digital wallet address) for a transfer from the deposit digital wallet to one or more cold storage wallets.

In step S226', the digital assets in the deposit digital wallets may be transferred using the exchange computer system in whole or part into one or more of the previously created cold storage digital wallets whose private key segments are stored in cold storage. In embodiments, the digital assets may be distributed by the exchange computer system to exchange digital wallets, such as discussed in the context of FIG. 18D herein, or according to another distribution algorithm.

Figure 18D:
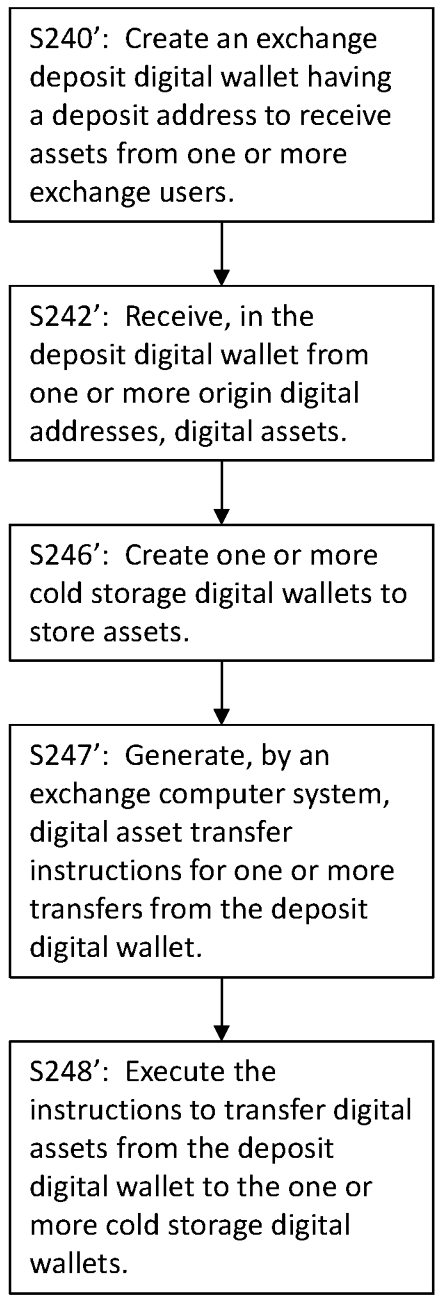

With reference to FIG. 18D, an exemplary deposit distribution waterfall is illustrated. In embodiments, these steps may be performed using an exchange computer system.

In step S240', an exchange deposit digital wallet can be created using the exchange computer system to receive assets from one or more user digital wallets.

In step S242', digital assets may be received in the deposit digital wallet from one or more origin digital addresses (e.g., corresponding to exchange user digital wallets).

In step S246', one or more cold storage digital wallets may be created to store digital assets. In embodiments, such cold storage digital wallets may already exist and be stored according to the secure storage systems and methods described herein.

In a step S247', the exchange computer system may generate digital asset transfer instructions for transfers from the deposit digital wallet. The transfer instructions may be generated based at least in part upon a distribution algorithm. In embodiments, the deposit distribution methodology/algorithm can depend at least in part upon one or more of the following criteria or parameters:

setting a maximum amount of digital assets stored in each wallet (e.g., limiting to 10,000 bitcoin in each wallet);

setting a minimum amount of digital assets stored in each wallet (e.g., at least 100 bitcoin in each wallet);

setting a maximum ratio of maximum amount to minimum amount of digital assets stored in each wallet (e.g., a 10-to-1 ratio);

setting a random amount of digital assets to be stored in each wallet, wherein the random amount is greater than a minimum amount and less than a maximum amount;

limiting the number of uses of each wallet (e.g., never using the same wallet more than once);

resetting the maximum amount and the minimum amount of digital assets stored in each wallet based at least in part on increased or decreased volume of digital assets held by the exchange;

setting a maximum amount of digital assets transferred to each wallet in any given transaction (e.g., limiting to 10,000 bitcoin in each wallet);

setting a minimum amount of digital assets transferred to each wallet in any given transaction (e.g., at least 100 bitcoin in each wallet);

setting a maximum ratio of maximum amount to minimum amount of digital assets transferred to each wallet in any given transaction (e.g., a 10-to-1 ratio);

setting a random amount of digital assets to be transferred to each wallet in any given transaction, wherein the random amount is greater than a minimum amount and less than a maximum amount;

limiting the number of transfers to a given wallet (e.g., never using the same wallet more than once, never make more than two transfers to the same wallet during a year period, to name a few);

resetting the maximum amount and the minimum amount of digital assets transferred to and/or from each wallet based at least in part on increased or decreased volumes of digital assets held by the exchange; and/or performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day).

In a step S248', the digital asset transfer instructions may be executed using the exchange computer system to transfer digital assets from the deposit digital wallet to the one or more cold storage digital wallets.

In embodiments, a system for determining and/or providing a blended digital math-based asset price can comprise one or more processors and one or more computer-readable media operatively connected to the one or more processors and having stored thereon instructions for carrying out the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

Redemption Distribution Waterfalls Among Wallets

In embodiments, a redemption distribution waterfall may be implemented using one or more computers based at least in part on one or more parameters. Retrieval distributions may be dictating the order in which digital wallets (and/or their associated private and/or public keys) are retrieved from storage (e.g., from varying levels of cold storage, such as an on-premises safe, nearby safety deposit box, and/or geographically remote bank or secure storage facility). Retrieval distributions may also dictate quantities of digital assets to transfer from each wallet. In embodiments, redemption distribution algorithms may control such retrievals, e.g., by generating retrieval instructions, indicating one or more wallets to retrieve, and/or indicating one or more amounts to transfer from each identified wallet. In embodiments, such parameters may include at least one or more of the following:

- the order in which the wallet was created (e.g., first wallet created is first wallet used, last wallet created is last wallet used, to name a few);
- the order in which the wallet was filled (e.g., first wallet filed is first wallet used, last wallet created is last walled used, to name a few);
- a random order in which the wallet was created;
- a random order in which the wallet was filled;
- a random selection of the wallet;
- the vault in which the wallet is stored;
- the custodian of a vault storing the pair segments associated with a wallet;
- the amount of digital assets needed for a redemption compared to available in the wallet;
- the relative amount of digital assets held in the wallet (e.g., use the largest wallets first, use the smallest wallets first, to name a few); and/or
- the risk that a wallet has been compromised, to name a few.

Proof Of Control

It has been a widespread problem with custodial accounts for digital assets that the digital assets purportedly being held are in fact not present. Such digital custodial accounts present a series of technical issues associated with not only securely holding digital assets in a custodial nature, but also proving control over such digital assets, while minimizing security risks and depleting digital assets. Previous attempts to prove control have required that a transaction involving the custodial account be exercised, which when a transaction fee is charged reduces the overall assets within the custodial account. The transaction fee poses a problem in this case because the fees are conventionally paid from the digital wallets held in the administrative account, so that providing many proofs of control over time may ultimately lead to depletion of the digital assets held in the digital wallets.

Exemplary embodiments of the present invention address the technical challenge by providing proof of control from a custodial digital asset account, with payment of the transaction fee associated with the proof of control event from a separate operating account. Embodiments of proof of control systems can be applied to a wide variety of implementations associated with digital asset wallets, such as custodial wallets for exchange traded products, hedges funds, trusts, and other fiduciaries, or non-custodial wallets. The proof of control itself may be in the form of a message sent along with a zero net transfer of digital assets from the administrative account. The message may relate to a recent event, such as an event that occurred within a very recent time period (e.g., the previous 10 minutes, previous hour, previous 12 hours, previous 24 hours, previous day, previous week, previous month, to name a few). As noted above the message may be or include the additional information that is included in the logs displayed in FIG. 2. For example, the message may be a recent newspaper headline, blog post title, price at a given date and time from an exchange, like the Gemini Auction price on a given date, to name a few. Since the transaction fee is paid from the digital asset operating account, the digital assets held in the digital wallets of the custodial account are not depleted.

Figure 53:
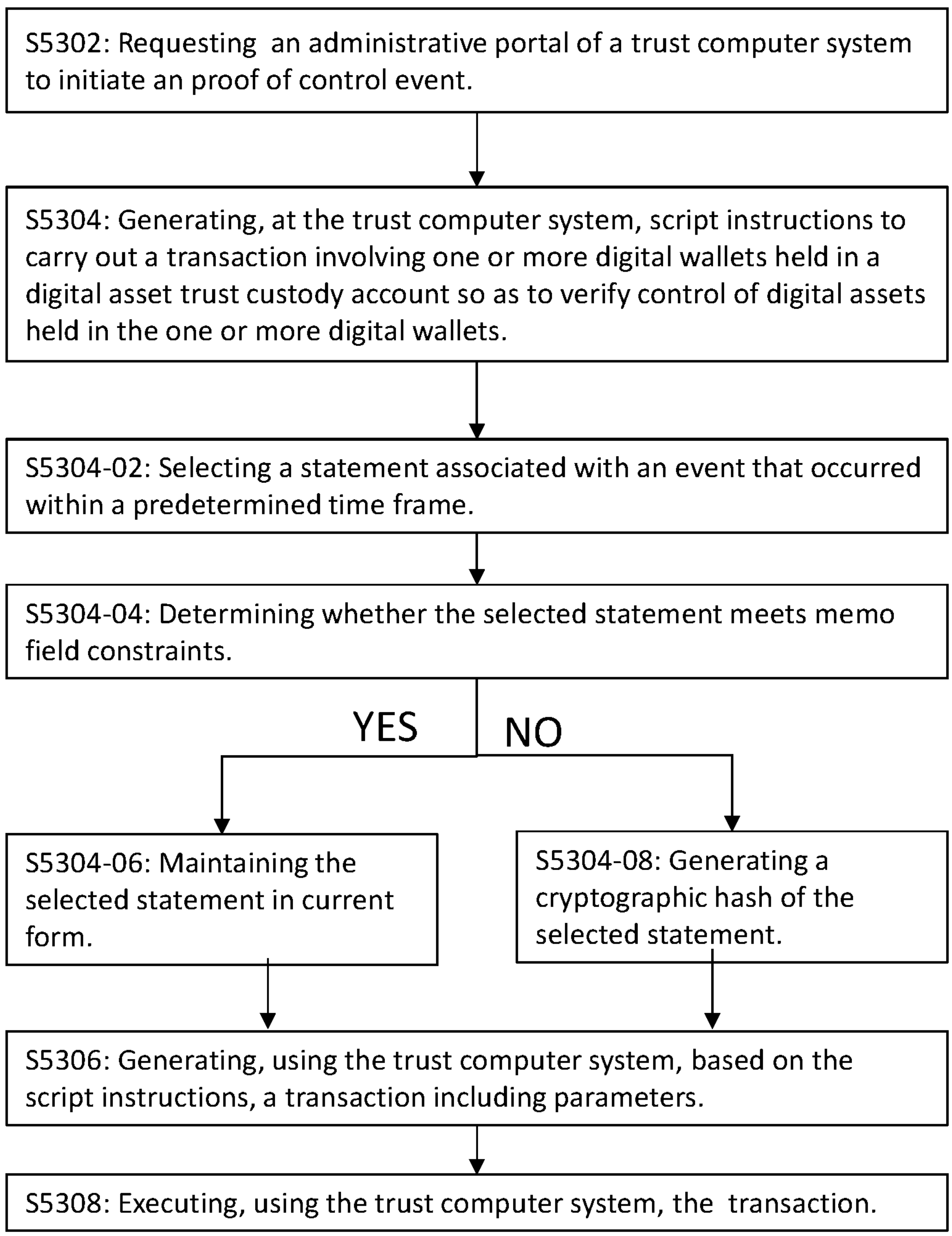
FIG. 53 is an exemplary flow chart for a method of providing proof of control from a custodial digital asset account.

Referring to FIG. 53, the process for performing proof of control includes the following steps.

In step S5302, an administrative portal of a trust computer system is requested to initiate a proof of control event. The trust computer system may be operatively connected to a decentralized digital asset network that uses a decentralized electronic ledger in the form of a blockchain maintained by a plurality of physically remote computer systems to track at least one of asset ownership or transactions in a digital math based asset system. Examples of a blockchain include Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, *Pura*, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin. The request to initiate may come from, for example, an auditor and may include a statement of a recent event to use in the proof of control exercise.

In Step S5304, the trust computer system generates script instructions to carry out a transaction involving one or more digital wallets held in a digital asset trust custody account so as to verify control of digital assets held in the one or more digital wallets. Step S5304, may be performed though the following sub steps. In sub step S5304-02, a statement is selected which is associated with an event that occurred within a predetermined time frame. For example, the message may relate to a recent event, such as an event that occurred within a very recent time period (e.g., the previous 10 minutes, previous hour, previous 12 hours, previous 24 hours, previous day, previous week, previous month, to name a few). For example, the message may be a recent newspaper headline, blog post title, price at a given date and time from an exchange, like the Gemini Auction price on a given date, to name a few. When a statement is provided as part of Step S5302, then the provided statement would be used.

Depending upon the length of the statement, various alternative processes may be employed. By way of example, for a short enough statement (e.g., less than 80 characters), the statement may be maintained in its original form. For example, "GeminiAuction02/08/18=8190.73". For a larger statement, like a "Express News Report on Feb. 8, 2018: Bitcoin price SURGE: Why is BTC bouncing back today?Cryptocurrency market rising, available at https://www.express.co.uk/finance/city/916246/bitcoin-price-news-why-BTC-bouncing-back-rising-today-cryptocurrency", a secure shortened version of the statement can be generated. For example, a cryptographic has of the statement can be applied.

In embodiments, where the length of the statement is not predetermined, the trust computer system can perform the following additional sub steps as part of the Step S5304 process, including: Sub step S5304-04, the trust computer system may determine whether the statement fits within memo field length constraints of the script associated with the digital asset type. For example, Bitcoin uses "OP_RETURN outputs" as its mechanism for a memo field, which is limited to 80 bytes, and Ethereum uses Log Events on a pay-per-use basis. In sub step S5304-06, if the determining sub step S5304-04 indicates that the statement fits within the memo field length constraints, the trust computer system may maintain the statement in its original form. In sub step S5304-08, if the determining sub step S5304-04 indicates that the statement does not fit within the memo field length constraints, the trust system may generate a cryptographic hash of the statement to be used as a statement.

Next, in Step S5306, the trust computers system may generate, based on the script instructions, a transaction with the following parameters: (i) a first input of a first amount of digital assets to a digital asset account associated with the trust custody account as accessed through the decentralized digital asset network using a trust custody account digital asset account identifier; (ii) a first output of a second amount of digital assets from the digital asset account associated with the trust custody account as accessed through the decentralized digital asset network using the trust custody account digital asset account identifier, the first amount of digital assets being equal to the second amount of digital assets; (iii) a second input of a third amount of digital assets to a digital asset account associated with an operating account as accessed through the decentralized digital asset network using an operating account digital asset account identifier; (iv) a second output of a fourth amount of digital assets from the digital asset account associated with the operating account as accessed through the decentralized digital asset network using the operating account digital asset account identifier, the fourth amount of digital assets being reduced relative to the third amount by a transaction fee amount; (v) a third output that comprises the statement in a memo field; and (vi) applying a digital signature to the transaction using a private key associated with the trust custody account. At step S5308, the trust system will perform the transaction.

FIG. 53 illustrates an exemplary flow chart illustrating the sub steps that may be performed in order to complete the transaction in step S5308. At sub step S5308-02 the trust computed system removes the first amount of digital assets from the digital asset account associated with the trust custody account as accessed through the decentralized digital asset network using a trust custody account digital asset account identifier. At sub step S5308-04, the trust computer system adds the second amount of digital assets to the digital asset account associated with the trust custody account as accessed through the decentralized digital asset network using the trust custody account digital asset account identifier, the first amount of digital assets being equal to the second amount of digital assets. At sub step S5308-06, the trust computer system removes the third amount of digital assets from the digital asset account associated with the operating account as accessed through the decentralized digital asset network using an operating account digital asset account identifier. Next, at sub step S5308-08 the trust computer system adds the fourth amount of digital assets to the digital asset account associated with the operating account as accessed through the decentralized digital asset network using the operating account digital asset account identifier, the fourth amount of digital assets being reduced relative to the third amount by a transaction fee amount. At sub step S5308-10, the trust computer system generates a third output that comprises the statement in a memo field.

In embodiments, insurance may be provided for digital assets. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 Bitcoin stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

In embodiments, a blended digital asset price can be calculated by one or more computers based on an averaged price. In embodiments, a blended digital asset price can be the price for digital assets determined each valuation day at a set time, such as, e.g., 3:00 p.m. Eastern Time. In embodiments, a blended digital math-based asset price may be obtained from a blended digital math-based asset index, which may be accessed via an API. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage. An example of such an order placing API is available with the Gemini Exchange, as discussed at https://docs.gemini.com/rest-api/#new-order. In embodiments, the system may calculate a blended digital asset price, by obtaining transaction data from one or more exchanges selected from a list of exchanges approved by, e.g., the sponsor, to determine either the average of the high and low prices on each exchange or the weighted (based on volume of shares traded) average of the transaction prices for the prior fixed time period (e.g., 12 or 24 hours) of trading activity on such one or more exchanges. In embodiments, the system may then average the price for each exchange, using weighting based on each exchange's volume during the period. Other methodologies can be used by the system to calculated the blended digital asset prices. For example, three exchanges, four exchanges, five exchanges, ten exchanges, or any number of exchanges as may be appropriate in view of the market for the math-based assets may be selected to determine the blended digital asset price. In embodiments, a time period of other than 12 or 24 hours may also be used depending upon the volume and volatility of the math-based asset price. For example, in a low volume period the time period may be increased to, e.g., 36 hours, while in a high volatility period the time period may be decreased to, e.g., 4 hours. In embodiments, a blended digital math-based asset price may be calculated by computing a volume weighted exponential moving average of actual transactions (e.g., considering price and volume of each executed transaction) from one or more digital asset exchange. In embodiments, the moving average may be taken over a period such as 2 hours. In embodiments, other periods may be used, such as 24 hours, 1 hour, 30 minutes, and/or 15 minutes, to name a few.

The Blended Digital Asset Price

A blended digital asset price, such as a blended digital math-based asset price, can be calculated, using one or more computers, each evaluation day. Systems and methods for calculating a blended digital asset price are described in U.S. application Ser. No. 14/313,873, filed Jun. 24, 2014, the contents of which are incorporated herein by reference.

The calculation can occur as of and at or as soon as reasonably practicable after 3:00 p.m. Eastern time each evaluation day (time could also be noon, 1 p.m., 2 p.m.—simply needs to be sufficient time before NAV striking to complete the calculations).

The blended digital asset price can be the functional equivalent of a rules-based index and therefore has rules to populate the universe of data inputs and rules on calculation using such inputs. As discussed herein, the blended digital asset price can be used to create an index, to be electronically published. The index can, in turn, also serve as a price benchmark or can be used to create derivative products. Accordingly, in embodiments, a blended digital math-based asset index may be a benchmark for a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product, to name a few.

In embodiments, a blended digital asset price may be obtained from a digital asset index. For example, one or more computers may access (e.g., via an API) one or more blended digital math-based asset values from a computer or database of underlying digital asset index values. In embodiments, digital asset index values may be interpolated to determine a value at a requested point in time, e.g., 4 p.m. E.T.

Eligible Data Inputs for a Blended Digital Asset Price

In embodiments, data for the blended digital asset price can be drawn from the largest exchanges that publicly publish transaction data and principally utilize acceptable currencies, e.g., currencies other than the Chinese Yuan. In this example, the Yuan denominated exchanges may not be included because of manipulation of that currency and unreliability thereof. In embodiments, additional currency denominations may be added or excluded at one or more future dates, which may be dates following the initial formation of the trust.

The sponsor can approve each eligible exchange (which, in embodiments, can be no fewer than three to five exchanges at any given time).

Selection of Data Inputs for a Blended Digital Asset Price

The rules for the blended digital asset price can provide for the use in calculation of the data from the three largest exchanges (by volume) on the sponsor approved list.

In embodiments, this determination of the three exchanges for use can be done on a weekly basis, (e.g., on each Monday) based at least in part on the volume on each such exchange during the prior week. In embodiments, this determination could be done on a different periodic basis (e.g., on a daily basis or a monthly basis) or on a when needed basis (e.g., whenever some circumstances occur requiring a change of determination).

In embodiments, so long as exchange selection is not on a daily basis, to the extent an exchange that has been selected for inclusion experiences a halt in trading for more than 24 consecutive hours (e.g., a lack of any recorded transactions during the prior 24 hours, regardless of the reason), that exchange can be replaced by the next largest exchange (by volume) on the sponsor approved list. In embodiments, this determination can be made automatically by one or more computers as part of an algorithm.

In embodiments, in the instance of a replacement, the restoration of daily volume on the halted exchange to a level more than the daily volume on the exchange that substituted for it could trigger a reversal of the substitution, if such restoration occurred prior to the next scheduled reconstitution of the included exchanges.

In embodiments, an exchange may be removed where there is a significant drop in trading on that exchange (e.g., 90% drop in trading volume) during a relevant time period (e.g., prior 24 hours, prior week, prior month, to name a few).

Figure 22:
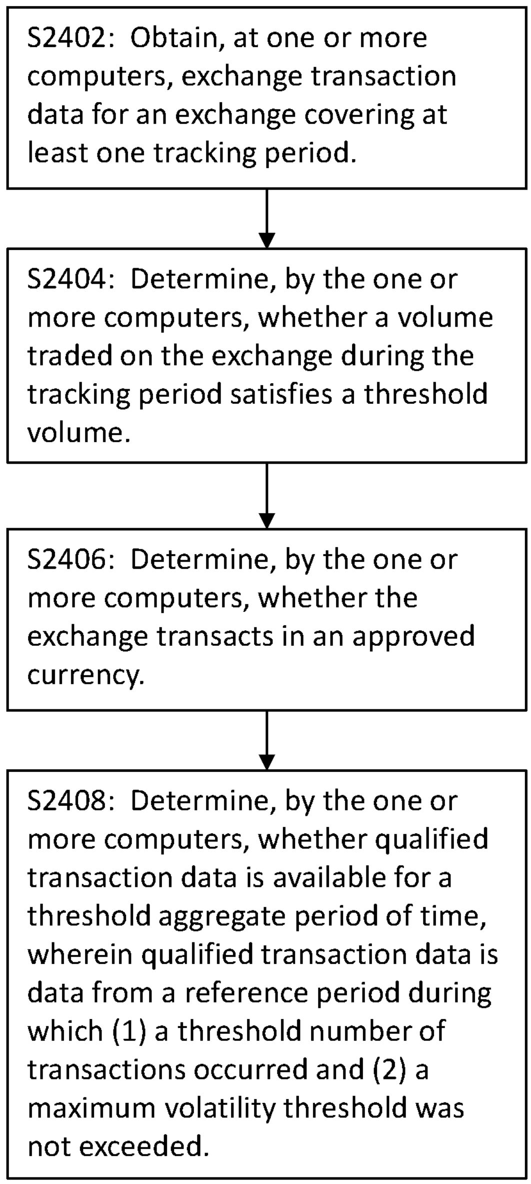
FIG. 22 is a flow chart of a process for determining qualified exchanges in accordance with exemplary embodiments of the present invention.

FIG. 22 illustrates an exemplary process for determining qualified or approved exchanges in accordance with the present invention. In embodiments, this process may be used to determine qualified money transmit businesses instead of exchanges and/or a combination thereof. The process may be programmed with computer code, which may be run on one or more processors. The process can utilize pre-defined criteria, rules, parameters, and/or thresholds to determine qualified exchanges. Such criteria can include transaction volume criteria, denomination types, geographic location, exchange data availability, exchange accessibility information (e.g., considerations of political or regulatory restrictions), regulatory compliance data, exchange customer data, and/or exchange owner data, to name a few. Thresholds can be expressed as absolute values and/or percentages.

In a step S2402, one or more computers may obtain exchange transaction data for an exchange, where the data covers at least one tracking period. The exchange data may be received via electronic transmission (e.g., over the Internet) and/or electronically accessed (e.g., using one or more APIs). The tracking period may be any period of time over which the exchange will be assessed for approval for use in the calculation of a blended digital asset price, such as 15 minutes, 1 hour, 12 hours, 24 hours, and/or 1 week, to name a few.

In a step S2404, the one or more computers may determine whether a volume traded on the exchange during the tracking period satisfies a threshold volume. In embodiments, a threshold volume may be 500 units of digital assets. In embodiments, a threshold volume may be expressed as a percent (e.g., a percent of the digital assets in circulation). The threshold may be modified periodically to help increase or decrease the number of qualified exchanges.

In a step S2406, the one or more computers may determine whether the exchange transacts in an approved currency. The computers may either test for an approved currency (e.g., by comparing to a database of approved currencies) or for an unapproved currency (e.g., by comparing to a database of unapproved currencies). In embodiments, only one currency may be approved, and the test for that currency may be hard-coded in exchange approval software. Currencies may be approved or unapproved based on considerations of reliability and/or stability, to name a few.

In a step S2408, the one or more computers may determine whether qualified transaction data is available for the exchange for a threshold aggregate period of time. Qualified transaction data may be data from a reference period during which a threshold number of transactions occurred (e.g., at least 3 transactions) and/or a maximum volatility threshold was not exceeded (e.g., the high and low price during the reference period did not fluctuate by more than 50% compared to the respective average high and low prices during that reference period of the other top (e.g., top 4) potential qualified exchanges by volume). In embodiments, transaction data may be evaluated from a plurality of reference periods to determine whether the data satisfies qualification criteria. In embodiments, transaction data to be qualified must satisfy qualification criteria for at least a specified period of time, which may be sub-divided into reference periods. For example, qualified transaction data may be determined for reference periods of 15 minutes, and to be a qualified exchange, the exchange must have qualified transaction data for an aggregate of at least 10 hours (40 reference periods) over a 24-hour tracking period. In embodiments, if an exchange satisfies each of the criteria examined in this exemplary process, it may be considered a qualified exchange for the tracking period over which it was examined. The determination of qualified exchanges may be performed at the end of each tracking period or on a rolling basis (e.g., re-evaluated at the end of each reference period).

Description of Electronic Data Pulled from Inputs

For each exchange on the approved list, the prior 24 hours of data setting forth each trade on the exchange by execution price and quantity transacted can be obtained, e.g., received and/or retrieved. Such transaction data may be obtained. In embodiments, one or more digital asset prices, such as, e.g., auction price, closing price, traded value, bid price, ask price, and/or spot price, to name a few, may be obtained. In embodiments, only the highest and lowest exchange prices and their respective transaction volumes may be obtained. In embodiments, all exchange price and transaction data may be obtained. In embodiments, a shorter period of time than 24 hours may be used, e.g., 12 hours, 3 hours, to name a few, or a longer period of time such as 48 hours may be used, to ensure a sufficient volume of transaction data is considered.

Application of Electronic Data

For each of the exchanges included in the calculation for any given evaluation day, an average price for such date can be used. In embodiments, using each average exchange price for such date, a blended and weighted average price for all exchanges can be extracted and used as the blended digital asset price.

In embodiments, the auction price and/or the blended price may be used as a benchmark for various financial products. As used herein, the term financial products includes, but is not limited to exchange traded notes, futures products (such as options), derivative products (such a puts and calls), other indices (such as volatility indices), swaps, currencies, fixed income products, bonds, securities and equities to name a few.

In embodiments, a blended digital asset price may be calculated by first calculating each selected exchange's daily average and then blending (e.g., averaging) the averages into a blended digital asset price. The daily average may be a time-weighted (e.g., exponential) moving mean and/or volume weighted mean. In other embodiments, a blended digital asset price may be calculated using the data from the selected exchanges (e.g., the top 3 qualified exchanges) without first determining single exchange averages.

Single Exchange Average

In embodiments, a single exchange averages may be used instead of a blended digital asset price. In other embodiments, single exchange averages may be combined into a blended digital asset price.

In embodiments, the single exchange average may be calculated by one or more computers using the unweighted mean average of the high and low trading prices for such day (the average price of each trade during the day—which could be subject to manipulation through outlier price trades).

In embodiments, the single exchange average may be calculated by one or more computers using the weighted mean average of the high and low trading prices for such day (e.g., the trading price for each share traded that day, rather than for each executed trade regardless of share size).

In embodiments, the single exchange average may be calculated by one or more computers using the median average of the high and low trading prices for such day.

In embodiments, the single exchange average may be calculated by one or more computers using the weighted median average of the high and low trading prices for such day.

In embodiments, the single exchange average may be calculated by one or more computers using any of a median, weighted median, average, and/or weighted average (by volume, time, or otherwise), any of which may be taken of high and low trading prices for a time period (e.g., 1 day, 1 hour, 15 minutes, to name a few), of the second highest and second lowest trading prices for a time period, and/or of all trades during a time period. For example, all transaction price data for a time period may be weighted by the volume transacted at the prices and/or by time (e.g., linearly or exponentially) in order to give greater weight to the more recent price data. Coefficients or other factors may be used to adjust the weighting so as to dampen or exacerbate any price fluctuations. For example, in embodiments, a coefficient for exponential weighting may be 0.69. In other embodiments, such a coefficient may be approximately 0.5, approximately 0.6, approximately 0.7, approximately 0.8, approximately 0.9, to name a few. Accordingly, in embodiments, a coefficient of exponential weighting can fall with a range 0.5-0.9, within a range 0.6-0.8, or within a range 0.7-0.8, to name a few.

In embodiments, as discussed above, digital asset price may be determined via auction conducted either periodically or aperiodically.

Blended Digital Asset Price

In embodiments, the blended digital asset price can be calculated by the average of the single exchange averages. In embodiments, the average may be weighted by volume. An average may weight different exchanges differently in order to account for differences in ease of access of funds from an exchange and/or ease of transacting on the exchange. As described herein, a blended digital asset price may be calculated as part of providing a generated digital asset index.

In embodiments, a collar may be placed on a single exchange auction price as a benchmark. The collar may be based on a benchmark such as the spot price at a particular time, plus or minus a defined range, such as a percentage of the benchmark price. In embodiments, the collar could be set using percentages such as 1%, 2%, 3%, 5%, 10% of the benchmark price, to name a few. By way of illustration, the collar may be based on a 5% variation from a benchmark of 1 BTC=USD$10,000, such that the collar is between USD$9,500 and USD$10,500. The spot price may be based on the last transaction immediately prior to the auction. A spot price may be based on an average of the most recent bid/ask price for the digital asset. In embodiments, a collar may be set based on a blended digital asset price. For example, a single exchange digital asset price could be determined based on a volume weighted average and/or time weighted average of recent digital asset pricing. In embodiments, a blended digital asset price may be based on a pricing from digital assets taken from a plurality of exchanges. In embodiments, the collar price may be based on a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed.

For example, a collar may be placed on the auction price, by using fixed percentage (e.g., 1 percent, 5 percent, 10 percent) of a benchmark against the continuous book price at given time period or set of time period. In embodiments, the benchmark could be a midpoint of the spot price of the continuous book price at the given time period, (e.g., auction price), In embodiments, the benchmark could be a weighted average (such as a time weighted average, volume weighted average, or time and volume weighted average) of the continuous book during a pre-set window (e.g., 10 minutes for before auction, 1 hour before the auction, 12 hours before the auction, 24 hours before the auction, to name a few).

In embodiments, the collar may be a blended digital asset price as discussed elsewhere herein.

In embodiments, if the final auction price falls outside the collar, the auction may fail.

Figure 23A:
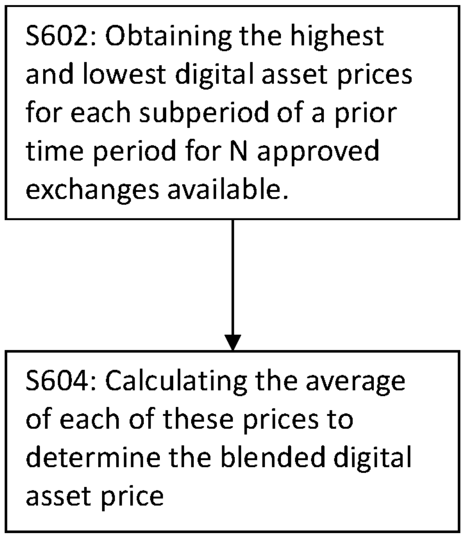
FIGS. 23A-23H are flow charts showing methods for calculating a blended digital asset price in accordance with exemplary embodiments of the present invention.

In embodiments, the blended digital asset price may be calculated as illustrated in FIG. 23A. In step S602, one or more computers may obtain the highest and lowest digital asset prices for each sub-period of a prior time period for N approved exchanges available. In embodiments, N may be the 3 largest approved exchanges. In step S604, each of these values may be averaged, using one or more computers, to determine a blended digital asset price for the prior sub-period. In embodiments, the blended digital asset price may be calculated for a 12-hour period or for a 24-hour period. In embodiments, the blended digital asset price may be calculated using a mean average transaction price weighted by volume.

Figure 23B:
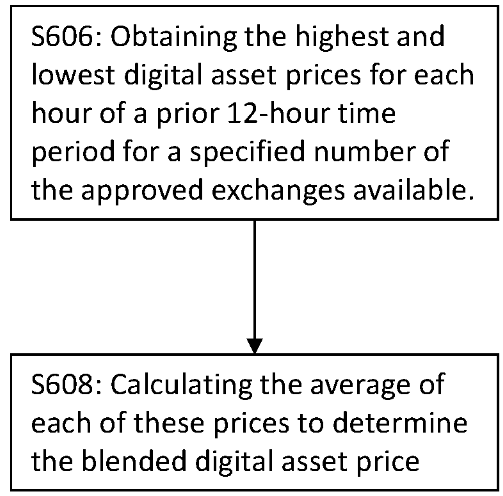

FIG. 23B illustrates a process for calculating the blended digital asset price using a 12-hour sub-period. In a step S606, one or more computers may obtain the highest and lowest digital asset prices for each hour of a prior 12-hour time period for a specified number N of the approved exchanges available. In a step S608, each of the values may be averaged, using one or more computers, to determine a blended digital asset price for the 12-hour period.

Figure 23C:
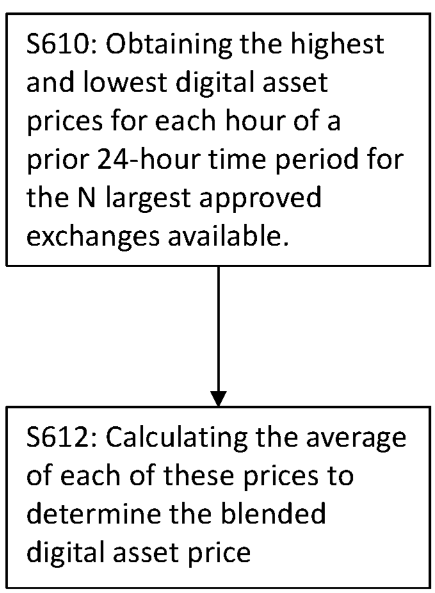

FIG. 23C illustrates a process for calculating the blended digital asset price using a 24-hour sub-period. In a step S610, one or more computers may obtain the highest and lowest digital asset prices for each hour of a prior 24-hour time period for a specified number N of the approved exchanges available. In a step S612, each of the values may be averaged, using one or more computers, to determine a blended digital asset price for the 24-hour period.

Figure 23D:
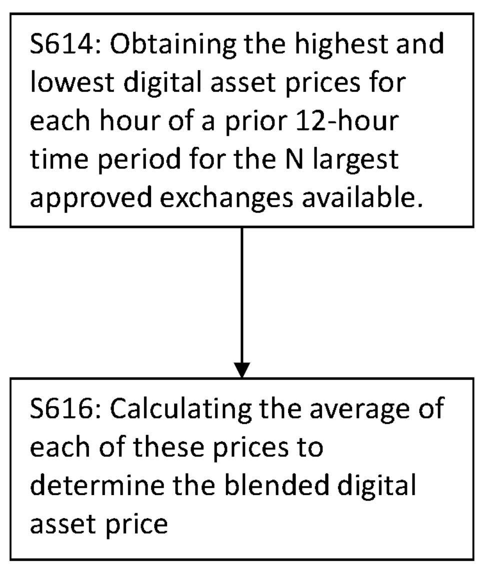

FIG. 23D illustrates a process for calculating the blended digital asset price using a 12-hour sub-period. In a step S614, one or more computers may obtain the highest and lowest digital asset prices for each hour of a prior 12-hour time period for the three largest of the approved exchanges available. In a step S616, each of the values may be averaged, using one or more computers, to determine a blended digital asset price for the 12-hour period.

Figure 23E:
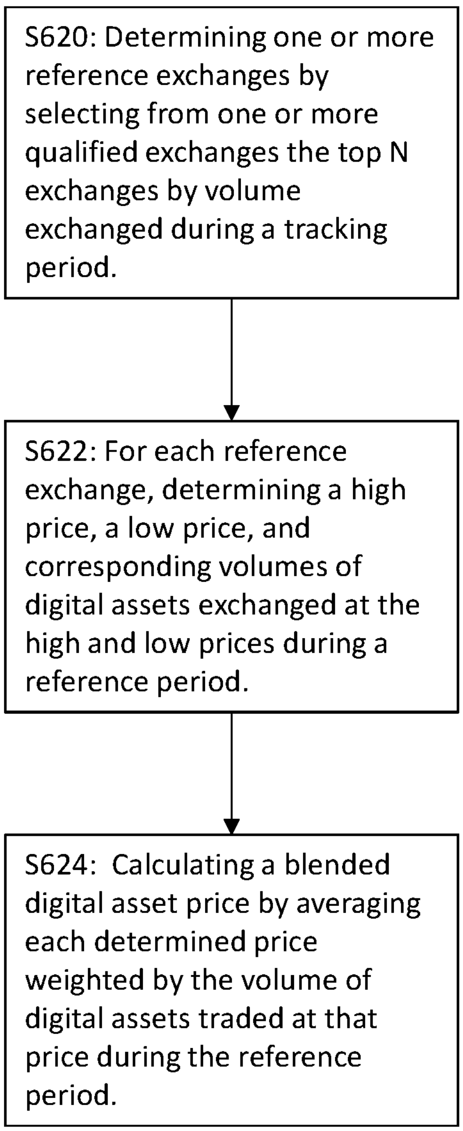

FIG. 23E illustrates another process for calculating a blended digital asset price. In a step S620, one or more computers may determine one or more reference exchanges. The reference exchanges may be the top N (e.g., 3) qualified exchanges by volume exchanged during a tracking period. A tracking period may be any period of time, such as 15 minutes, 30 minutes, 1 hour, 6 hours, or 12 hours, to name a few. Reference exchanges may be selected from a list of approved or qualified exchanges (e.g., approved by the sponsor). An exemplary process for approving exchanges to determine qualified exchanges is described herein with respect to FIG. 22. Reference exchanges may be determined each tracking period or may be determined over longer periods. For example, the reference exchanges may be determined at a fixed time each day. In a step S622, for each reference exchange, the one or more computers can determine highest and lowest exchange prices, as well as the corresponding volumes of digital assets exchanged at those high and low prices during a reference period. In embodiments, the reference period may be a different amount of time than the tracking period during which the reference exchanges are determined. In a step S624, one or more computers may calculate a blended digital asset price by averaging the high and low prices from each reference exchange, weighted by the respective volume of digital assets traded at each high and low price during the reference period.

Figure 23F:
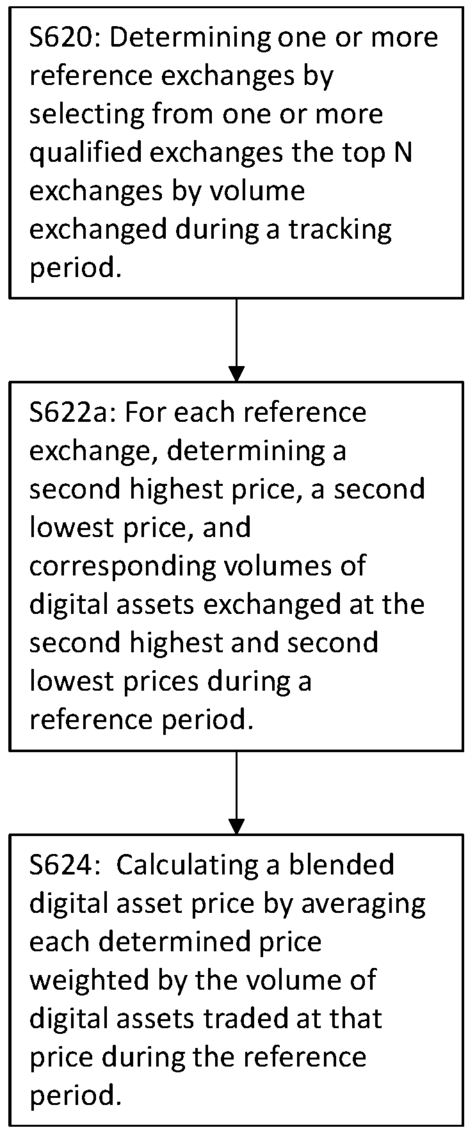

FIG. 23F illustrates another exemplary process for calculating a blended digital asset price. In a step S620, one or more reference exchanges may be determined, as described with respect to FIG. 23E. In a step S622*a*, for each reference exchange, the one or more computers can determine second highest and second lowest exchange prices, as well as the corresponding volumes of digital assets exchanged at those second highest and second lowest prices during a reference period. In a step S624, one or more computers may determine a weighted average of the determined second highest and second lowest prices from each reference exchange, where the weighted average is weighted by volume exchanged at each price, as discussed with respect to FIG. 23E.

Figure 23G:
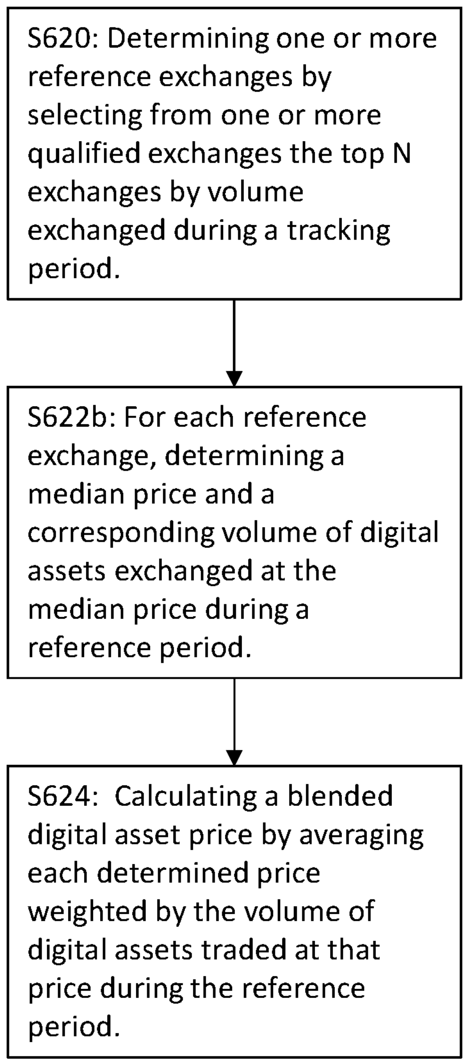

FIG. 23G illustrates another exemplary process for calculating a blended digital asset price. In a step S620, one or more reference exchanges may be determined, as described with respect to FIG. 23E. In a step S622*b*, for each reference exchange, the one or more computers can determine a median price and corresponding volumes of digital assets exchanged at that price during a reference period. In a step S624, one or more computers may determine a volume weighted average of the determined median prices from each reference exchange, as discussed with respect to FIG. 23E.

Figure 23H:
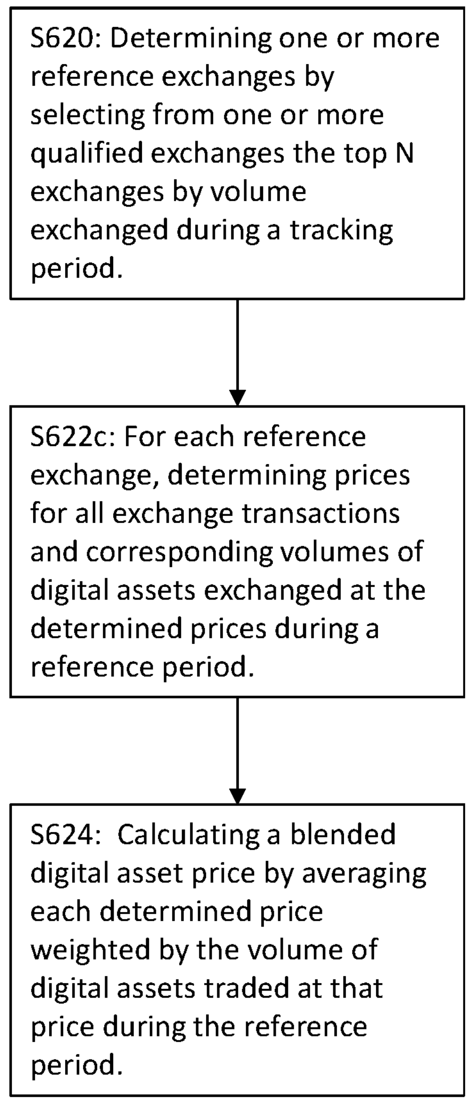

FIG. 23H illustrates another exemplary process for calculating a blended digital asset price. In a step S620, one or more reference exchanges may be determined, as described with respect to FIG. 23E. In a step S622*c*, for each reference exchange, the one or more computers can determine prices for all exchange transactions and corresponding volumes of digital assets exchanged at those prices during a reference period. In a step S624, one or more computers may determine a volume weighted average of the determined exchange prices from the one or more reference exchanges, as discussed with respect to FIG. 23E. In embodiments, the digital asset prices from each reference period may be weighted by time, e.g., so as to preference more recent reference periods. Such weighting may be exponential weighting, such as an exponentially time-weighted moving average. Other moving averages may be employed, with or without weighting, such as a simple moving average, a cumulative moving average, a weighted moving average, and/or a volume weighted moving average, to name a few. Transaction data may be weighted by both volume and time, for example, by applying a volume weighted average as well as an exponential time-weighted moving average. Accordingly, an exponential volume-weighted moving average may be employed, applying an exponential weighting to transaction volumes over shifting period of time (e.g., a trailing 2-hour window).

Figure 24:
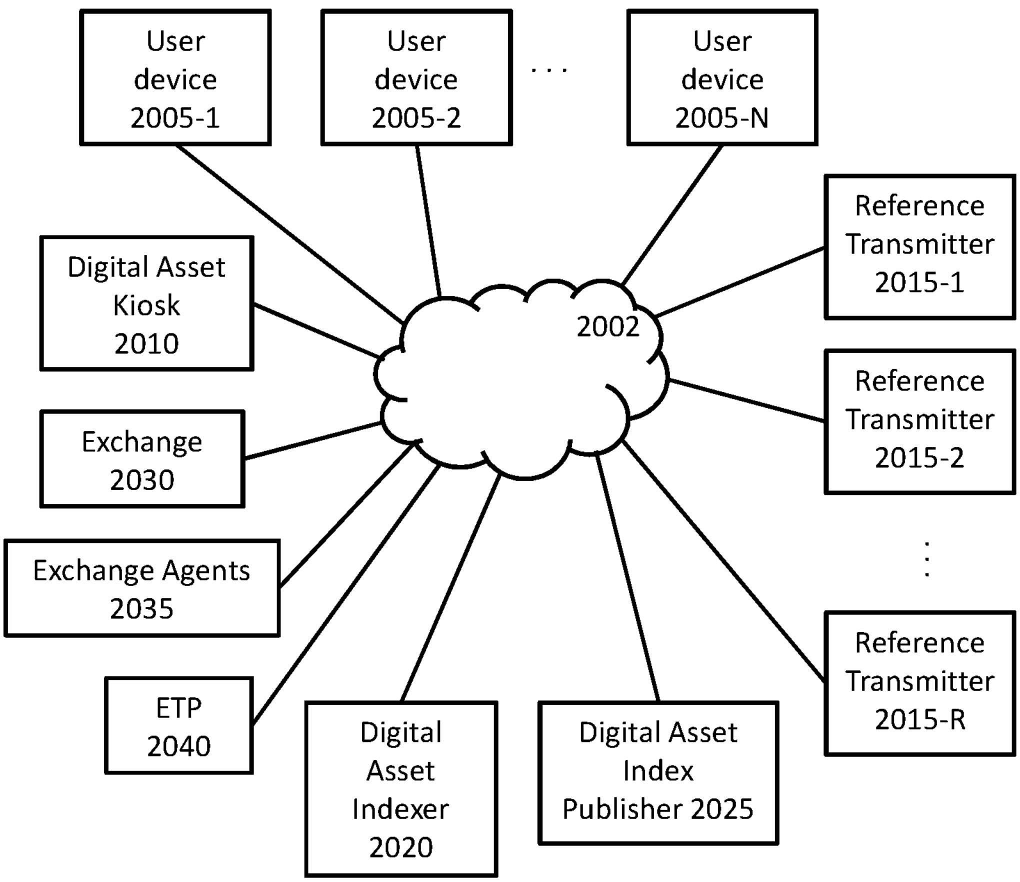
FIG. 24 is a schematic diagram of participants in a system for providing a digital asset index and a digital asset exchange in accordance with exemplary embodiments of the present invention.

FIG. 24 illustrates an exemplary system for providing a digital asset index in accordance with the present invention. A digital asset index system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025 (e.g., Winkdex, Bloomberg, Google, Yahoo, to name a few), one or more exchanges 2030, one or more exchange agents 2035, and/or an exchange traded product computer system 2040, to name a few. Any of the components involved in a digital asset index system may be connected directly (e.g., through wired or wireless connections) or indirectly, such as through a data network 2002. Any of the components of a digital asset index system can comprise or include a computer system comprising one or more computers. Accordingly, any of the components may have at least one or more processors, computer-readable memory, and communications portals for communicating with other components of the system and/or outside entities.

Still referring to FIG. 24, a user device 2005 may be a mobile phone, smart phone, PDA, computer, tablet computer, and/or other electronic device that can receive communications. A user device 2005 may run software, such as a digital wallet, for accessing a digital asset index or may access a digital asset index through a general Internet browser. A digital asset kiosk 2010 may also access a published digital asset index, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An application programming interface ("API") may be used to provide access to a digital asset index from one or more third-party devices or computer systems. An embeddable widget may be provided to enable display on a third-party website of digital asset index data and/or index visualizations (e.g., graphs, charts, and/or accompanying visualization options, such as time range).

Still referring to FIG. 24, data from one or more reference transmitters 2015 may be used to generate an index, as discussed herein. Transmitters may be money service businesses or money transmit businesses in the United States. Transmitters 2015 may be part of a digital asset exchange 2030. Exchanges 2030 outside the United States may function like transmitters, e.g., performing all or part of the roles ascribed herein to transmitters 2015, but without the same money transmit licenses as required in the United States.

Figure 25A:
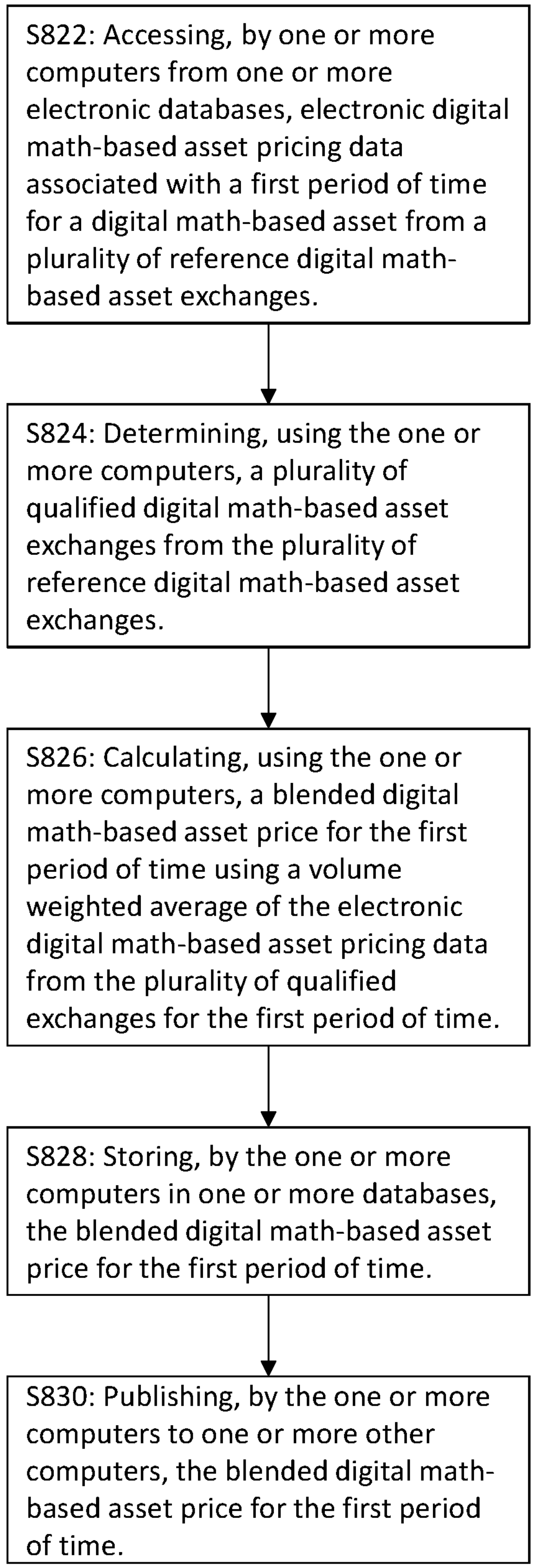
FIGS. 25A and 25B are flow charts of a method for creating an index of digital asset prices in accordance with exemplary embodiments of the present invention.

FIG. 25A is another flow chart of an exemplary process for providing a blended digital math-based asset price in accordance with the present invention.

In a step S822, one or more computers may access from one or more electronic databases stored on computer-readable memory, electronic digital math-based asset pricing data associated with a first period of time for a digital math-based asset from a plurality of reference digital math-based asset exchanges (e.g., four exchanges). In embodiments, the electronic pricing data can include transaction prices and/or bid and ask prices, to name a few. In embodiments, the one or more computers may access transaction data, including transaction volume data.

In a step S824, the one or more computers may determine a plurality of qualified digital math-based asset exchanges (e.g., three exchanges) from the plurality of reference digital math-based asset exchanges. In embodiments, the plurality of qualified exchanges may be determined by evaluating, by the one or more computers, electronic exchange selection criteria, which may comprise one or more electronic exchange selection rules.

In a step S826, a blended digital math-based asset price for the first period of time may be calculated, using the one or more computers, using a volume weighted average of the electronic digital math-based asset pricing data from the plurality of qualified exchanges for the first period of time.

In a step S828, the one or more computers may store in one or more databases the blended digital math-based asset price for the first period of time. In embodiments, the databases may be remotely located, e.g., in a cloud computing architecture. In embodiments, the databases may store one or more other blended digital math-based asset prices corresponding to one or more other periods of time.

In a step S830, the one or more computers may publish to one or more other computers the blended digital math-based asset price for the first period of time. As described herein, publishing can comprise transmitting the price to one or more computer, transmitting the price to one or more user electronic device (e.g., a mobile phone), providing the price to an electronic display (e.g., a scrolling display), and/or providing the price to a website, to name a few. In embodiments, the price may be published from the database of blended digital math-based asset prices. In other embodiments, the price may be published by the calculating computer directly, e.g., from working memory.

Figure 25B:
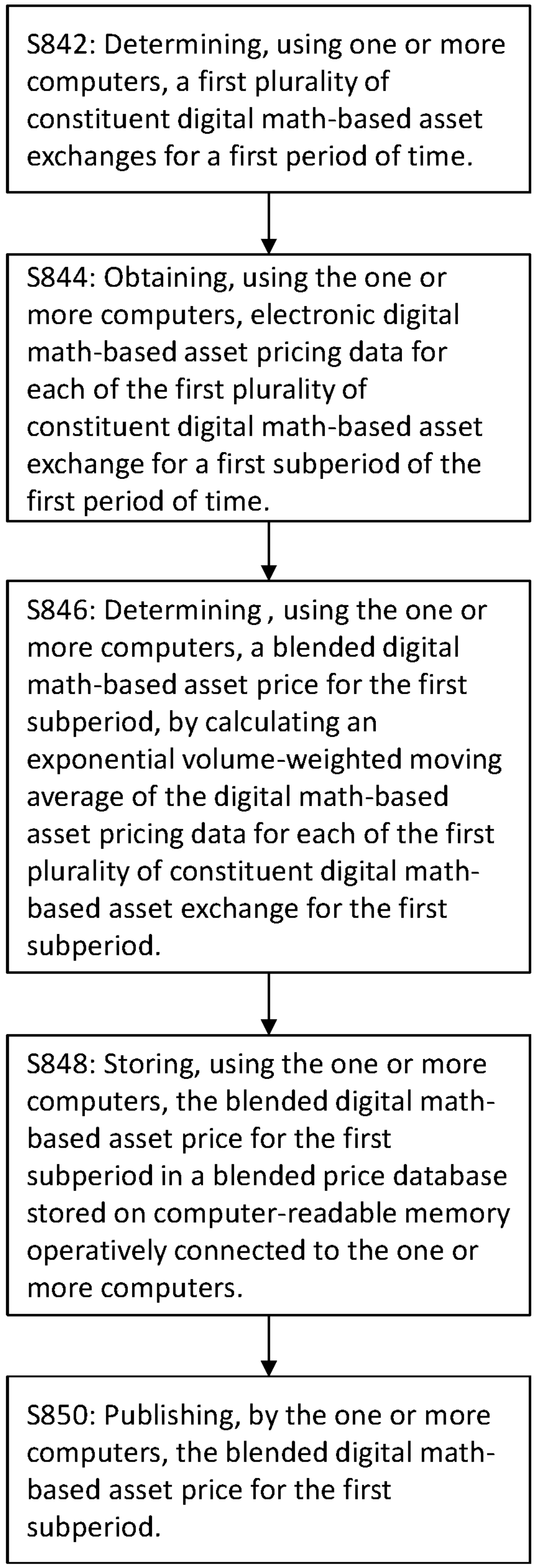

FIG. 25B is a flow chart of another exemplary process for electronically generating an index of digital asset prices.

In a step S842, a first plurality of constituent digital math-based asset exchanges may be determined, using the one or more computers, for a first period of time (e.g., a 24-hour period). In embodiments, electronic digital math-based asset pricing data and associated volume data may be obtained, at the one or more computers, for a first tracking period for each of a plurality of reference digital math-based asset exchanges. In embodiments, the total volume of transactions made on the respective exchange during the tracking period may be calculated, by the one or more computers, for each of the plurality of reference digital math-based asset exchanges. In embodiments, a first plurality of constituent digital math-based asset exchanges may be determined, by the one or more computers, by ranking the plurality of reference digital math-based asset exchanges by total volume for the tracking period and selecting a second plurality of the reference digital math-based asset exchanges (e.g., three) according to the largest total volumes, wherein the second plurality is less than the first plurality.

In embodiments, the process for determining the first plurality of constituent digital math-based asset exchanges can further comprise determining, by the one or more computers, for each of the plurality of reference digital math-based asset exchanges whether the total volume of transactions made on the respective exchange during the tracking period satisfies a threshold volume; determining, by the one or more computers, whether the digital math-based asset exchange transacts in an approved currency; and determining, by the one or more computers, for each of the plurality of reference digital math-based asset exchanges whether qualified transaction data is available from the respective digital math-based asset exchange for a threshold aggregate period of time, wherein qualified transaction data is data from a calculation period during which (1) a threshold number of transactions occurred and (2) a maximum volatility threshold was not exceeded, and wherein a calculation period is a subperiod of the tracking period.

In a step S844, electronic digital math-based asset pricing data may be obtained, using the one or more computers, for each of the first plurality of constituent digital math-based asset exchange for a first subperiod of the first period of time (e.g., a 2-hour period within the first period of time). In embodiments, electronic digital math-based asset pricing data (e.g., transaction prices, bid and ask prices, transaction volume data, to name a few) may be obtained, using the one or more computers, for each of the first plurality of constituent digital math-based asset exchange for a second subperiod of the first period of time.

In a step S846, a blended digital math-based asset price may be determined, using the one or more computers, for the first subperiod, by calculating an exponential volume-weighted moving average of the digital math-based asset pricing data for each of the first plurality of constituent digital math-based asset exchange for the first subperiod. In embodiments, a blended digital math-based asset price may be determined, using the one or more computers, for the second subperiod, by calculating an exponential volume-weighted moving average of the digital math-based asset pricing data for each of the first plurality of constituent digital math-based asset exchange for the second subperiod. In embodiments, the exponential moving average utilizes a coefficient between 0.6 and 0.8.

In a step S848, the blended digital math-based asset price may be stored, using the one or more computers, for the first subperiod in a blended price database stored on computer-readable memory operatively connected to the one or more computers. In embodiments, the blended digital math-based asset price may be stored, using the one or more computers, for the second subperiod in the blended price database. In embodiments, the blended price database may comprise at least blended digital math-based asset prices at a specified interval, e.g., prices every 15 seconds, every minute, and/or once per day, such as at a specified time each day, to name a few. Accordingly, prices at the intervals may be interpolated from the blended digital asset prices closest in time.

In a step S850, blended digital math-based asset price for the first subperiod may be published, by the one or more computers. In embodiments, blended digital math-based asset prices may be published, by the one or more computers, for a plurality of consecutive subperiods during the first period of time. In embodiments, the blended digital math-based asset price for the first subperiod or for the plurality of consecutive subperiods may be published from the blended price database. In embodiments, the blended digital math-based asset price may be published to one or more user devices. In embodiments, the blended digital math-based asset price may be electronically published through a dedicated website and/or through one or more electronic access points. The blended digital asset price can be published, using one or more computers, on the trust's website and distributed to APs. The blended digital asset price may form the basis of a digital asset index, as discussed herein. In embodiments, no intraday blended digital asset price may be required to be published throughout the day.

Still referring to step S850, a graphical representation of blended digital math-based asset prices may be generated, by the one or more computers. The graphical representation may include the blended digital math-based asset prices for the plurality of consecutive subperiods during the second period of time. The graphical representation may be provided from the one or more computers to the one or more second computers. In embodiments, the graphical representation includes a graphical representation of the digital math-based asset pricing data for each of the first plurality of constituent digital math-based asset exchanges for the plurality of consecutive subperiods during the second period of time. In embodiments, the graphical representation further includes a second graphical representation of volume data for each of the first plurality of constituent digital math-based asset exchanges for the plurality of consecutive subperiods during the second period of time.

In still other embodiments, an API for accessing the blended digital math-based asset price may be provided, by the one or more computers to one or more third computers. An electronic API request to access a blended digital math-based asset price for a subperiod may be received, by the one or more computers from the one or more third computers, and the blended digital math-based asset price for the first subperiod may be provided by the one or more computers to the one or more third computers.

In embodiments, generating a blended digital asset price and/or a blended digital asset price index can comprise accessing transaction data from a plurality of exchanges, as described herein. Such processes can include data normalization, which can convert data to a consistent and/or uniform format. For example, digital asset price data from one exchange may be provided in units of bitcoin, while price data from another exchange may be provided in units of milli-bitcoin, and data from another exchange may be provided in satoshis. Upon accessing the data from the different exchanges, the data may be converted to a common format, such as milli-bitcoin. In embodiments, time data may also be converted to a common format, e.g., 24-hour time, and/or a common time zone, e.g., GMT.

In an exemplary embodiment, a blended digital asset price may be calculated by blending the trading prices in U.S. dollars for the top three (by volume) qualified exchanges during the previous two-hour period using a volume-weighted exponential moving average. Constituent exchanges of the index can be selected according to rules, such as requiring that the exchanges have electronic trading platforms on which users may buy or sell digital assets with other users in exchange for U.S. dollars. The value of the index (including a daily spot price) can be determined using exchange transaction data on a moving average basis over a trailing two-hour period. The computer code used to generate the index may weight exchange transactions by volume on a proportional basis. In order to reflect the latest in pricing information, the most recent transactions may be weighted exponentially greater than earlier transactions in the two-hour period.

Digital Asset Transaction Kiosk

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

Figure 37:
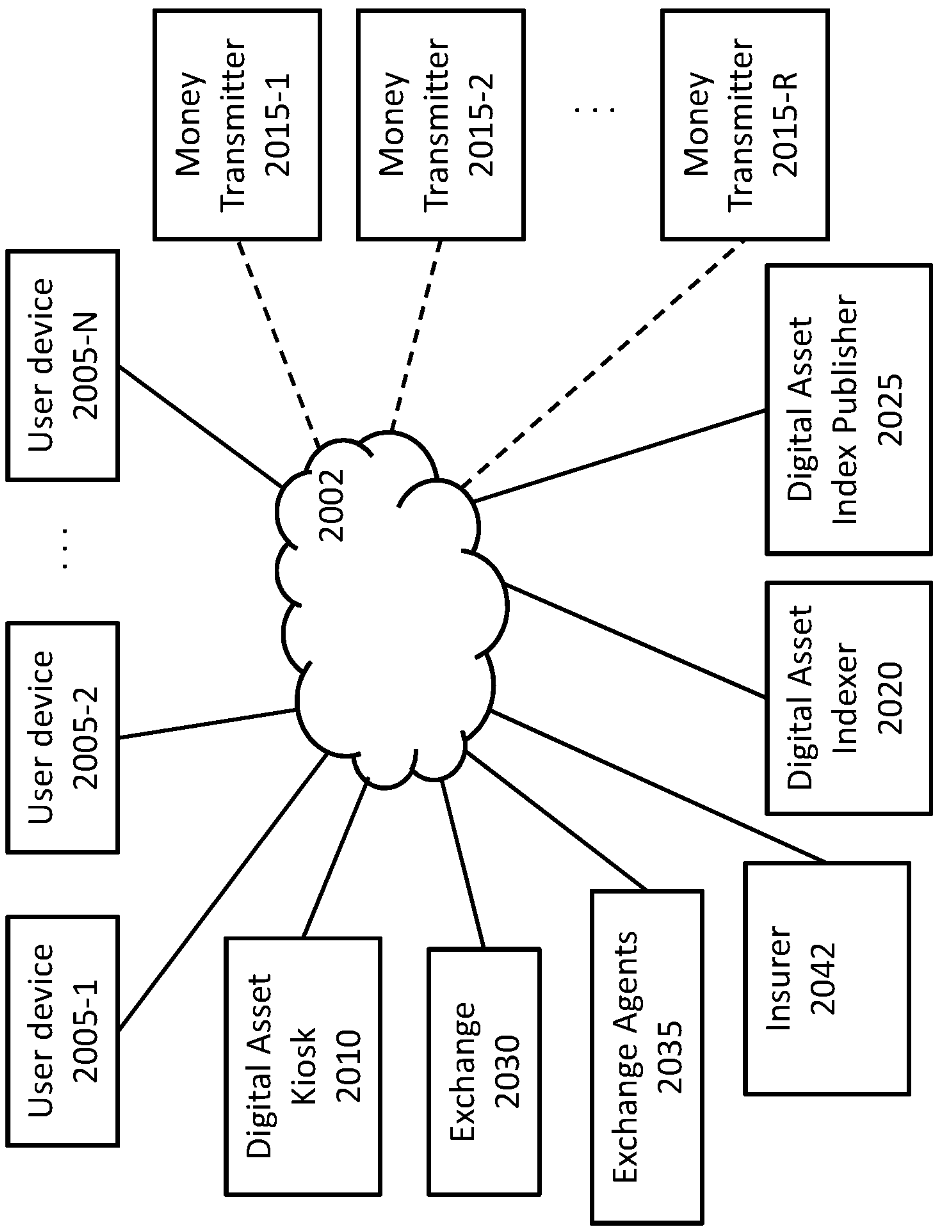
FIG. 37 is a schematic diagram of participants in a system including a digital asset kiosk and a digital asset exchange in accordance with exemplary embodiments of the present invention.

FIG. 37 illustrates an exemplary system including a digital asset kiosk for accessing a digital asset exchange in accordance with embodiments of the present invention. A digital asset kiosk system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025, one or more exchanges 2030, one or more exchange agents 2035, and/or one or more insurers 2042, to name a few. Any of the components involved in a digital asset kiosk system may be connected directly (e.g., through wired or wireless connections) or indirectly, such as through a data network 2002. Any of the components of a digital asset kiosk system can comprise or include a computer system comprising one or more computers. Accordingly, any of the components may have at least one or more processors, computer-readable memory, and communications portals for communicating with other components of the system and/or outside entities.

Still referring to FIG. 37, a user device 2005 may be a mobile phone, smart phone, PDA, computer, tablet computer, and/or other electronic device that can receive communications. A user device 2005 may run software, such as a digital wallet, for accessing a digital asset exchange or may access a digital asset exchange through a general Internet browser. A digital asset kiosk 2010 may also access a digital asset exchange, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An API may be used to provide access to a digital asset exchange from one or more third-party devices or computer systems. An embeddable widget may be provided to enable display on a third-party website of digital asset exchange data and/or exchange data visualizations (e.g., graphs, charts, and/or accompanying visualization options, such as time range).

One or more insurers 2042 may provide insurance for fiat accounts, such as fiat exchange accounts. In embodiments, fiat exchange accounts may be held at an exchange partner bank. Such accounts may be insured by the Federal Deposit Insurance Corporation (FDIC). In embodiments, insurers 2042 may be private insurance companies. Insurers 2042 may also provide digital asset insurance, which may cover private key loss and/or theft and/or digital asset losses or thefts.

Still referring to FIG. 37, data from one or more money transmitters 2015 may be used to authorize users for access to an exchange, such as by performing anti-money laundering compliance processes, as described herein. Transmitters may be money service businesses or money transmit businesses in the United States. Money transmitters 2015 may be part of a digital asset exchange 2030. In embodiments, exchanges 2030 that are located outside the United States may function like transmitters, e.g., performing all or part of the roles ascribed herein to transmitters 2015, but without the same money transmit licenses as required in the United States.

Figure 38A:
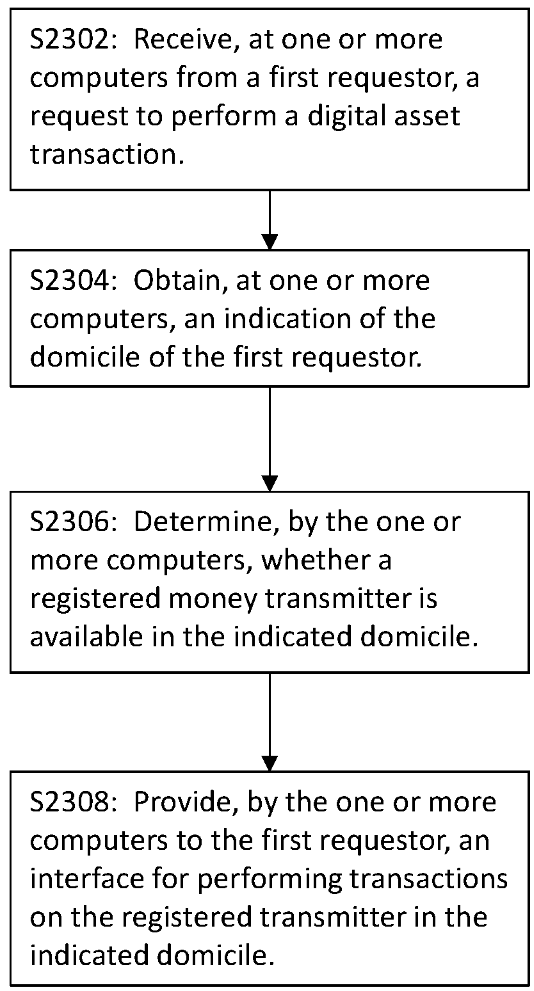
FIGS. 38A-B are flow charts of processes for determining a money transmit business to process transactions in accordance with exemplary embodiments of the present invention.
Figure 38B:
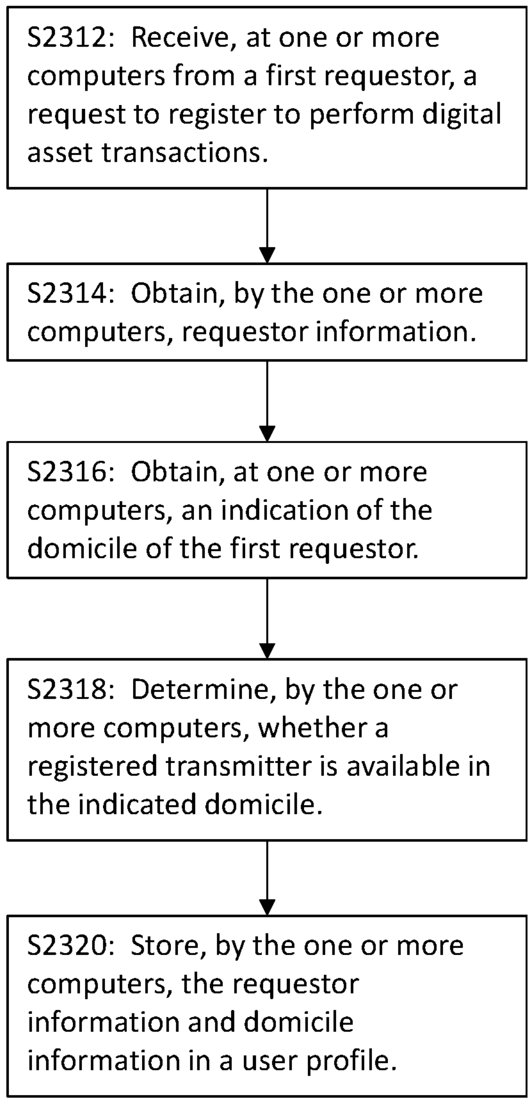

FIGS. 38A-B provide exemplary processes for determining the appropriate money transmit business for performing transactions, such as at a digital asset kiosk, even where the kiosk is located in a state other than the user's domicile. In embodiments, such processes may be performed for any potential user of an exchange seeking to create an exchange account, regardless of the user device used to access the exchange computer system. In embodiments, the processes described by FIGS. 38A-B may underlie any transactions performed at a digital asset kiosk. The processes may be performed when a user registers to use a digital asset kiosk or network of kiosks. Referring to FIG. 38A, in a step S2302, one or more computers may receive a request to perform a digital asset transaction. Digital asset transactions can include sending digital assets, transferring digital assets to accounts of different denominations (e.g., accounts denominated in different digital assets or in fiat currencies), transferring fiat currencies to digital asset accounts, depositing a fiat currency into a digital asset account, and/or withdrawing a fiat currency from a digital asset account, to name a few. In a step S2304, the one or more computers may obtain an indication of the domicile of the first requestor. In embodiments, the domicile may be a state in the United States. An indication of the domicile may be provided by scanning a government-issued ID, such as a driver's license, which may be used to search a database. Election registration may also be used to determine domicile. For corporations, the state in which they are registered may be their domicile. In embodiments, there may be a waiting period (e.g., one week) before the domicile is confirmed. Transactions may not be permitted until the domicile is confirmed and registration is completed. In a step S2306, the one or more computers may determine whether a state-registered money transmitter is available in the indicated state of domicile. A state-registered transmitter may be a money transmitter business. In embodiments, a domicile may not be a state, such as in the case of United States territories, and an appropriately registered transmitter may be required to proceed. In a step 2308, the one or more computers may provide to the requestor an interface for performing transactions using a transmitter registered in the indicated domicile. Any transaction performed by the requestor may be processed or otherwise handled by that transmitter.

FIG. 38B illustrates another exemplary process for determining the appropriate money transmit business for performing transactions involving digital assets. In a step S2312, one or more computers may receive a request from a requestor to register with a system and/or network for performing digital asset transactions. The requestor may be a natural person or a business. In a step S2314, the one or more computers may obtain requestor information, such as first and last name, address, contact information (e.g., telephone number, email address, to name a few), social security number, bank account information, digital asset wallet information, security information, requestor photograph, biometric information (e.g., handprint, fingerprint, retinal scan, facial analysis) and/or password information, to name a few. In a step S2316, the one or more computers may obtain an indication of the domicile of the requestor, as described with respect to step S2304 of FIG. 21A. In a step S2318, the one or more computers may determine whether a registered (e.g., state-registered) money transmitter is available in the indicated domicile. In a step S2320, the one or more computers may store the requestor information and the requestor domicile information in a user profile, which may use the password information and/or biometric information to provide secure access to a digital asset transaction system or network. A digital asset transaction card may be used (e.g., in conjunction with password or other security information) to provide access to a digital asset transaction system or network, such as through a digital asset kiosk.

Features of a Digital Asset Kiosk

Figure 39:
FIG. 39 is a schematic diagram of a digital asset kiosk in accordance with exemplary embodiments of the present invention.

FIG. 39 illustrates an exemplary digital asset kiosk in accordance with embodiments of the present invention. A digital asset kiosk 2005 may have one or more display device 2110, CPU 2112, computer-readable memory 2114, input device 2116, card reader 2118, wireless reader 2120, biometric reader 2122, scanner/imager 2124, cash deposit device 2126, cash storage 2128, cash dispenser 2130, check deposit device 2132, check storage 2134, counter 2136, communications portal 2138, and/or printer 2140. A digital asset kiosk 2005 may run one or more software applications, which may include one or more user authentication module 2142, reader module 2144, check recognition module 2146, cash recognition module 2148, counting module 2150, digital asset wallet module 2152, digital asset transfer module 2154, digital asset request module 2156, exchange module 2158, accounts module 2160, deposit module 2162, withdrawal module 2164, fund transfer module 2166, payment module 2168, insurance module 2170, preferences module 2172, user profile module 2174, and/or transaction history module 2176.

Still referring to FIG. 39, an input device 2116 may be a scanner, keyboard, touchscreen, mouse, microphone, and/or camera, to name a few. A card reader 2118 may be a device that can read magnetically encoded data on cards (e.g., magnetic strips on cards), RFID chips, and/or other cards with data storage, to name a few. A wireless reader 2120 may read data from one or more devices (e.g., smart phones) using wireless communication signals, such as Bluetooth or Wi-Fi. A biometric reader 2122 may be any of a palm scanner, fingerprint reader, retina scanner, facial recognizer, and/or voice recognizer, to name a few. In embodiments, a biometric reader 2122 may include a scanner (e.g., laser scanner), microphone, and/or camera. A scanner/imager 2124 may be used to scan identification cards (e.g., driver's licenses), documents (e.g., electric bills), money, checks, and/or other financial instruments (e.g., negotiable instruments).

Still referring to FIG. 39, a cash deposit device 2126 may receive paper money. In embodiments, coin may also be received by a digital asset kiosk 2005. A cash deposit device 2126 may comprise and/or operatively communicate with a scanner/imager 2124, which may be used to perform recognition of received cash. A cash deposit device 2126 need not be used to perform deposit transactions. Cash storage 2128 may store one or more monetary bills and/or coins. In embodiments, cash storage 2128 may store cash of different denominations. Cash storage 2128 may comprise a storage vault for secure storage of cash. A cash dispenser 2130 may dispense one or more monetary bills. In embodiments, it may dispense coins. A check deposit device 2132 may receive checks (e.g., personal checks, bearer checks, certified checks, cashier's checks, travelers' checks, money orders and/or other negotiable instruments. In embodiments, a digital asset kiosk may receive other financial instruments or certificates thereof, such as stock certificates and/or bond certificates, to name a few.

FIG. 39 further illustrates a check deposit device 2132, which may comprise and/or operatively communicate with a scanner/imager 2124 and/or magnetic ink character recognition ("MICR") reader, which may be used to perform recognition of checks and/or other deposited financial instruments or certificates thereof. Those skilled in the art will appreciate that a check deposit device 2132 may be a check receipt device and need not be used in conjunction with deposit transactions. A check storage device 2134 may store one or more checks and/or other financial instruments or certificates thereof. A check storage device 2134 may comprise a vault for secure storage. A counter 2136 may determine an aggregate value of cash (e.g., monetary bills and/or coins), which can entail reading the value one or more bills and/or coins (e.g., upon receipt via cash deposit device 2126 and/or upon retrieval or other accessing of the contents of cash storage 2128). A communications portal 2138 may provide communications with one or more systems (e.g., a digital asset insurance system), devices (e.g., user electronic devices), and/or networks (e.g., a digital asset network, an ACH network), to name a few. A communications portal 2138 may comprise wired and/or wireless communications components, such as cable ports, cable, and/or wireless antennas, to name a few. A printer 2140 may print on one or more media of one or more sizes. A printer 2140 may print receipts (e.g., transaction receipts), transaction history reports, and/or account balance reports, to name a few.

Still referring to FIG. 39, software comprising one or more modules may run on the one or more CPUs 2112. A user authentication module 2142 can authenticate a user, which may entail identifying a user, confirming the identity of a user, and/or validating a user's authorization to use a digital asset kiosk and/or perform one or more transactions. A user authentication module 2142 may interact at least with an input device 2116, card reader 2118, wireless reader 2120, and/or biometric reader 2122, in order to confirm a user's identity. A card reader 2118 may read a user access card, and an input device 2116 may receive a user's passcode. Biometric readers 2122 may provide biometric confirmation of a user's identity. A reader module 2144 may interact with one or more card readers 2118, wireless readers 2120, and/or scanners/imagers 2124 to read card (e.g., with magnetic strips), QR codes, bar codes, RFID chips, and/or text, to name a few. A check recognition module 2146 may recognize one or more fields (e.g., drawer, drawee, account number, date, amount, to name a few) of a check or other financial instrument or certificate thereof. In embodiments, a check recognition module 2146 may comprise optical character recognition ("OCR") technology to read written fields (e.g., typewritten and/or handwritten). A check recognition module may interact with a scanner/imager 2124 and/or a MICR reader. A cash recognition module 2148 may interact with a scanner/imager 2124, a cash deposit device 2126, cash storage 2128, and/or a cash dispenser 2130 to determine denominations and/or values of cash, which may be paper bills and/or coins. A counting module 2150 may interact with a counter 2136 and/or other components of a digital asset kiosk to count and provide an aggregate value of cash (e.g., determine an amount of cash deposited or determine an amount of cash to retrieve for withdrawal) and/or checks (e.g., determine an aggregate value of checks deposited).

A digital asset wallet module 2152 may handle the creation of one or more digital asset wallets and/or the accessing of one or more existing digital asset wallets of one or more denomination. For example, a digital asset wallet module 2152 may handle wallets associated with a single digital asset, such as Bitcoin wallets, or handle wallets associated with a plurality of digital assets, such as Litecoin wallets, and/or Namecoin wallets, in addition to Bitcoin wallets, to name a few. In embodiments, a digital asset kiosk may provide a unified wallet or an umbrella wallet, which may hold assets of different denominations. Such a wallet may use one or more exchange rates to show (e.g., in a single denomination) an aggregate value of assets contained in the wallet. Such exchange rates may be associated with a specific exchange, or a blended exchange rate as discussed herein. The wallet may comprise sub-wallets to hold separately each differently denominated asset. In embodiments, the digital asset wallet module 2152 may also be linked to a fiat currency digital wallet module, which transacts in a fiat currency, such as dollars, euro, yen, to name a few.

The wallet may show a breakdown of the value or number of assets of each denomination that is stored in the wallet. A digital asset wallet module 2152 may otherwise show account balances for one or more digital asset wallets. A digital asset transfer module 2154 may process one or more types of transactions involving the sending of digital assets. Digital assets may be sent to one or more other accounts and/or digital wallets, which may be associated with the user, other people, and/or other institutions. A digital asset request module 2156 may handle the requesting of digital asset transfers. For example, a digital asset request module 2156 may provide an interface by which a user can designate an amount of digital assets to request as well as another user, account, or digital wallet address from which to request the digital assets.

An exchange module 2158 may process exchange and/or conversion transactions involving digital assets. Exchange transactions may involve the conversion of digital assets of one denomination to digital assets of a different denomination, digital assets to fiat currencies, and/or fiat currencies to digital assets. In embodiments, exchange and/or conversion transactions may entail the use of a money transmit business, which may be selected by an exchange module 2158 based on the domicile of a user (e.g., a user performing an exchange transaction, a user sending funds that require an exchange transaction, a user paying a bill that requires an exchange transaction, to name a few). Accordingly, an exchange module 2158 may be used in conjunction with one or more other modules to process any transactions requiring an exchange transaction. In embodiments, an exchange module 2158 may allow a user to select an exchange (e.g., from a list of exchanges) to be used for the transaction. Such an option may enable a user to choose select exchanges located in different geographic regions, such as other countries. An exchange module 2158 may display and/or otherwise communicate one or more exchange rates corresponding to one or more exchanges and/or money service businesses.

Still referring to FIG. 39, an accounts module 2160 may access one or more fiat currency accounts for use in transactions at a digital asset kiosk 2005. For example, an accounts module 2160 may access a fiat currency account denominated in USD to convert USD from the account to bitcoin. An accounts module 2160 may be used to create one or more fiat currency accounts. In embodiments, an accounts module 2160 may be used to store mixed denominations, which may include one or more fiat currencies and/or one or more digital assets of different denominations. An accounts module 2160 may access and/or create an umbrella account and/or a partitioned account to store different denominations. An accounts module 2160 may also provide balances for one or more accounts.

A deposit module 2160 may handle the physical deposit of money of one or more fiat currency and/or one or more checks or other financial instruments into a digital asset kiosk 2005. In embodiments, tokens and/or other physical embodiments of digital assets may be deposited, subject to applicable government regulations. A deposit module 2160 may control, interface with, and/or receive data from any of a cash deposit device 2126, check deposit device 2132, and/or counter 2136, to name a few. In embodiments, a deposit module 2162 may handle the deposit of funds of any denomination (e.g., funds from money and/or financial instruments inserted into a digital asset kiosk 2005) into one or more accounts of any denomination.

A withdrawal module 2164 may process withdrawals of money in any denomination using a digital asset kiosk 2005. Withdrawals may be made from any fiat currency account, investment account, and/or digital asset account. In embodiments, physical embodiments of one or more digital assets may be withdrawn, in conformance with applicable laws.

A fund transfer module 2166 can handle transactions involving the transfer of funds between accounts and/or between people and/or entities. Transfers of funds between accounts can entail moving digital assets from one account to another, which may be denominated differently, moving fiat currency from one account to another, which may be denominated differently, moving digital assets to an account denominated in a fiat currency, and/or moving funds from a fiat currency account to a digital asset account, to name a few. Transfers between differently denominated accounts, including transfers between digital asset and fiat currency accounts, may entail one or more exchange transactions. A fund transfer module 2166 may access (e.g., through one or more API) price and/or exchange data from one or more exchanges and/or may show one or more exchange rates associated with one or more exchanges. A fund transfer module 2166 may provide an interface for selecting options related to a fund transfer transaction and/or may implement commands to carry out a fund transfer transaction. Fund transfers can be between accounts with a common owner. Fund transfers can also be from one person or entity to another person or entity.

A payment module 2168 may handle payments using a digital asset kiosk 2005. A payment module 2168 may enable the paying of one or more bills (e.g., electric bill, gas bill, Internet bill, credit card bill, to name a few). A payment module 2168 may process automatic bill pay using digital assets, which may be converted to a fiat currency prior to payment.

An insurance module 2170 may handle the insuring of one or more digital asset accounts and/or transactions. An insurance module 2170 may communicate with one or more insurers to provide insurance options with users, such as basic insurance plans, premium plans, and/or custom coverage plans. Insurance options may comprise different coverage amounts, different premiums, and/or different asset storage policies, to name a few.

A preferences module 2172 may provide an interface for receiving user preferences and/or may implement those preferences. Preferences can include the language that is used, a default account to use for fund transfers, and/or a default exchange, to name a few. One or more preferences may be stored as part of a user profile such that the preferences may be loaded when a user logs into a digital asset kiosk 2005.

A user profile module 2174 can store user data (e.g., name, contact information, address, telephone number, email address, social security number, government ID information, biometric information, photograph, username, password, security questions, and/or membership data associated with a digital asset kiosk network, to name a few). A user profile module 2174 may store information associated with one or more fiat currency accounts and/or digital asset accounts (e.g., digital asset wallets), so that a user may access and/or use those accounts via a digital asset kiosk 2005.

A transaction history module 2176 may track and/or display account activity for one or more accounts. A transaction history module 2176 may show destinations, recipients, amounts, and/or dates of fund transfers and/or payments and/or may show withdrawals, deposits, exchange transactions, and/or insurance transactions.

Figure 40A:
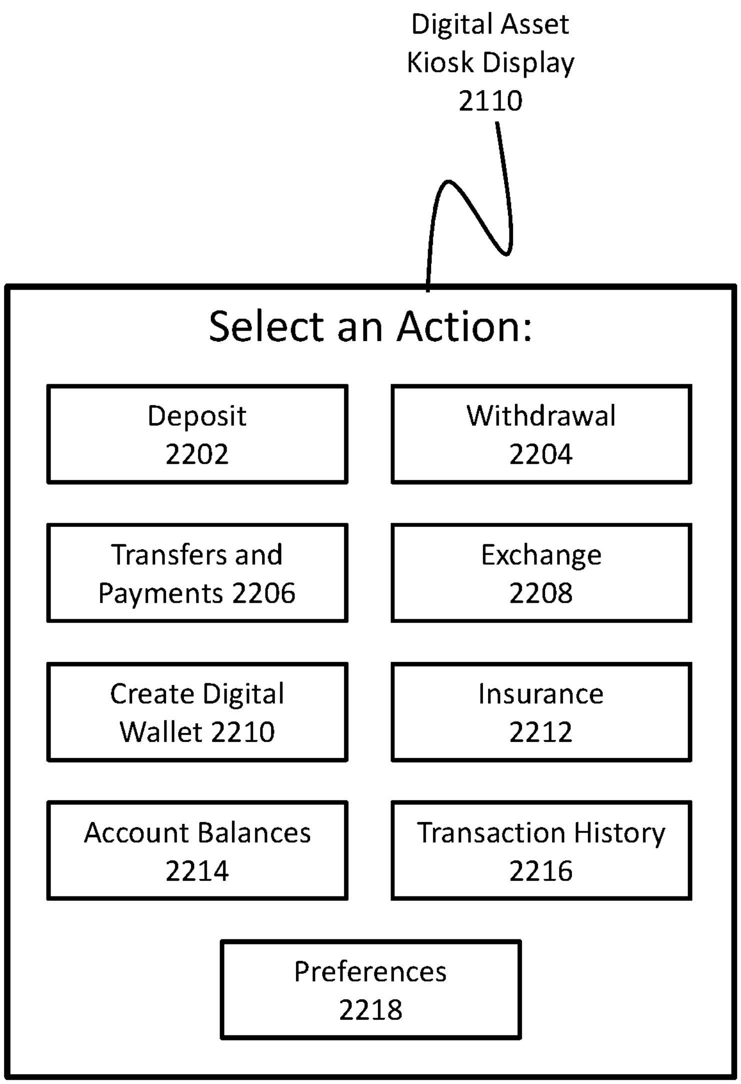
FIGS. 40A-Q are schematic diagrams of a digital asset kiosk display showing exemplary interfaces for various transactions and functions involving digital assets in accordance with exemplary embodiments of the present invention.
Figure 40B:
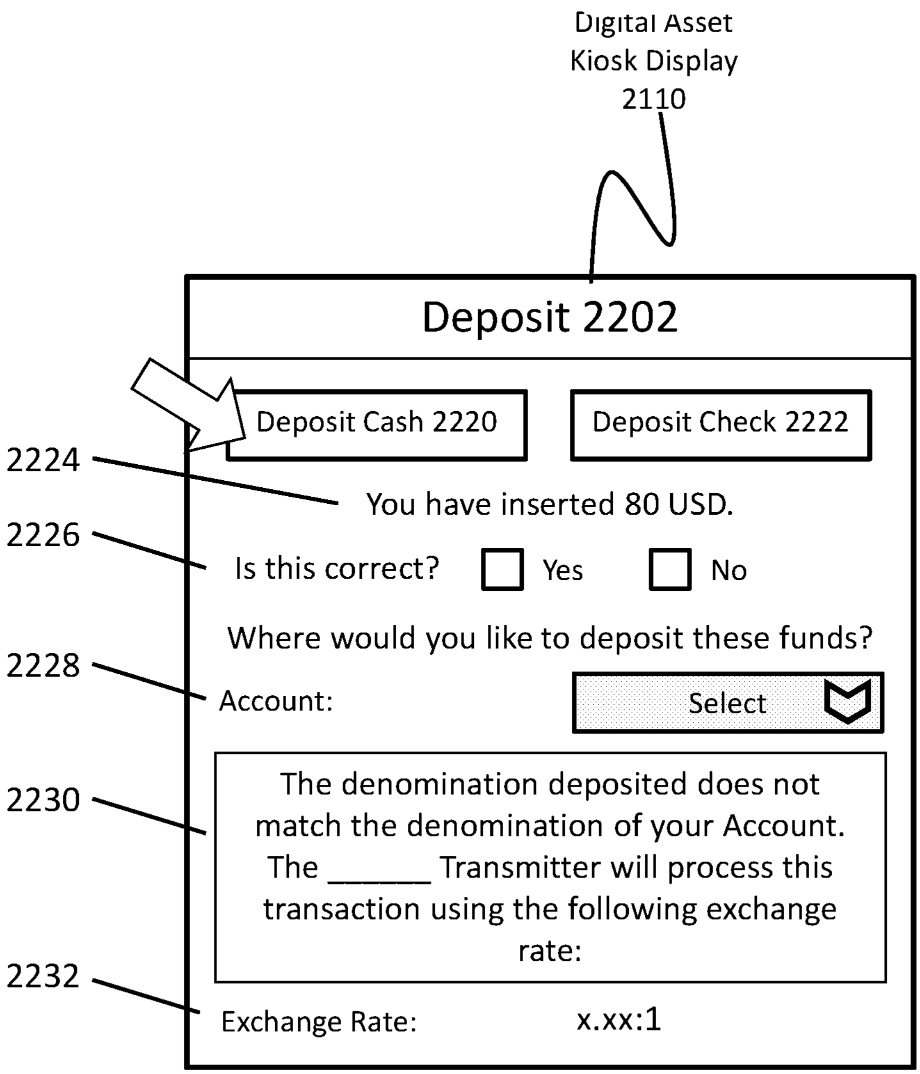
Figure 40C:
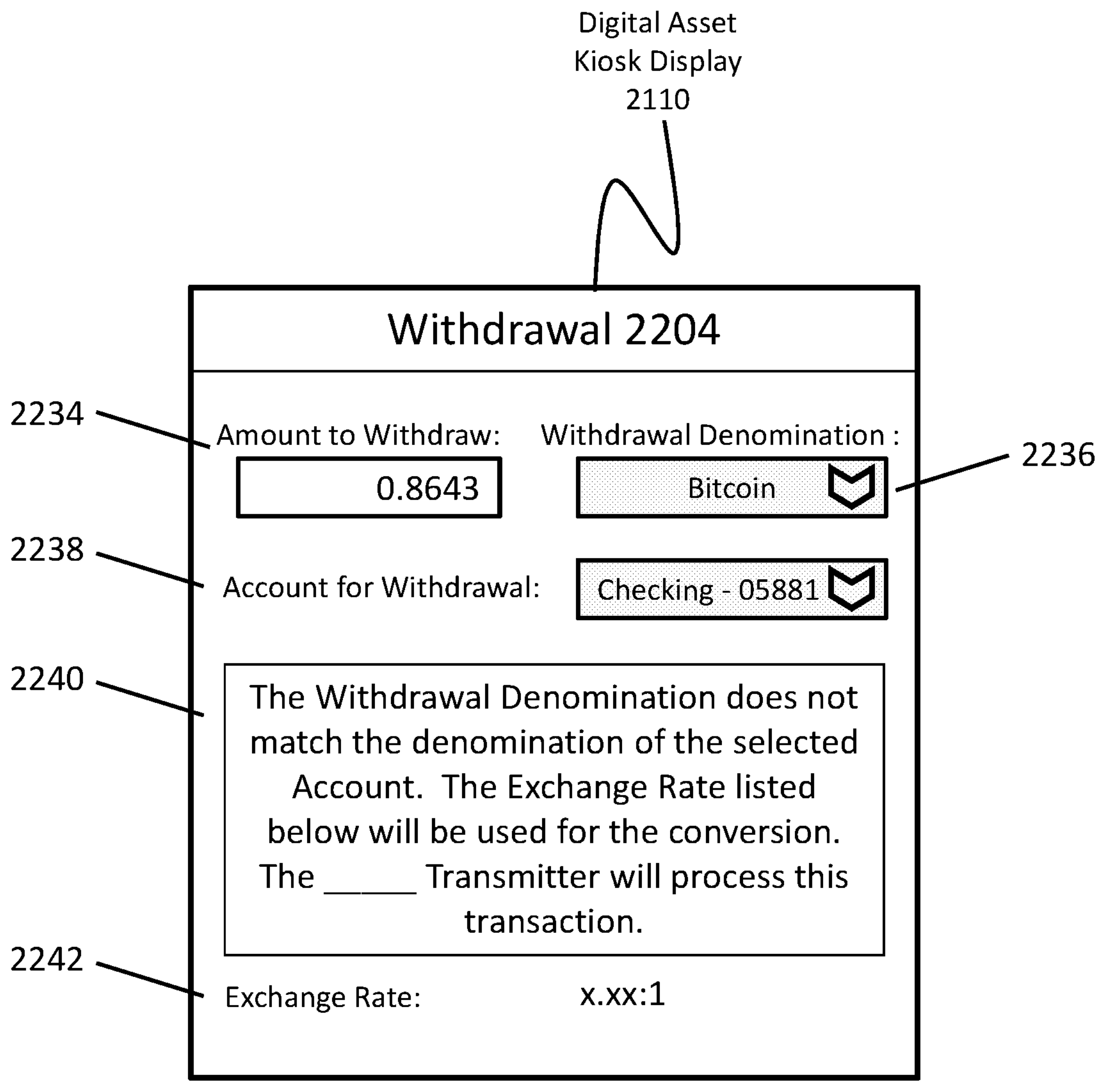
Figure 40D:
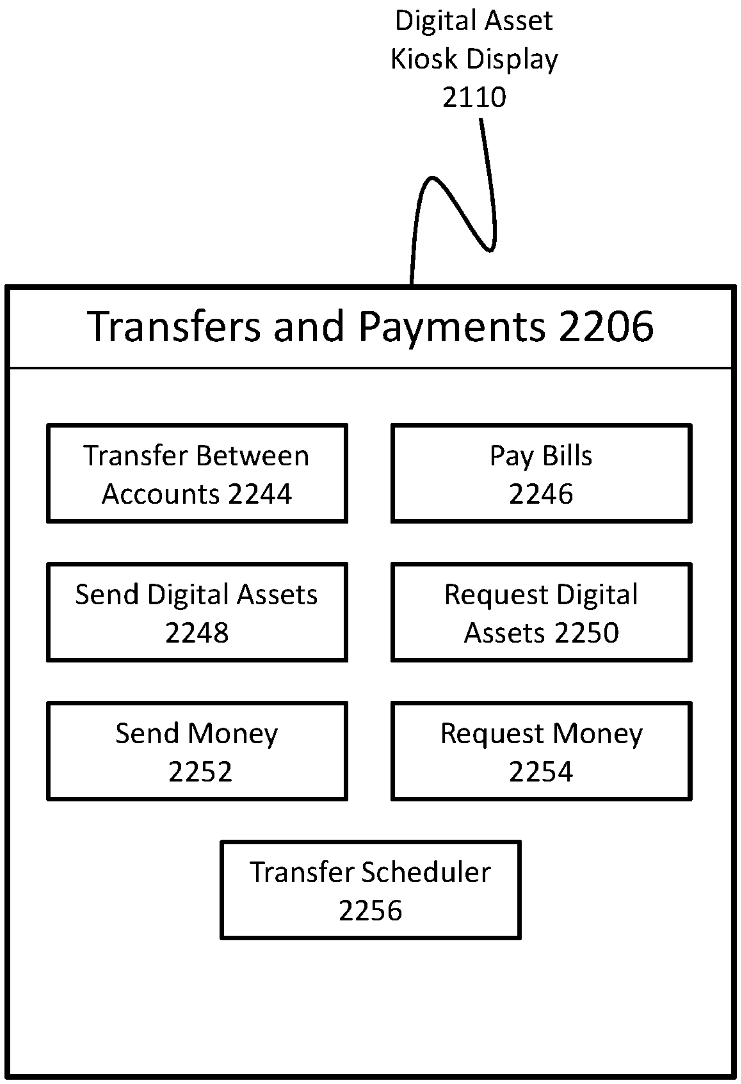
Figure 40E:
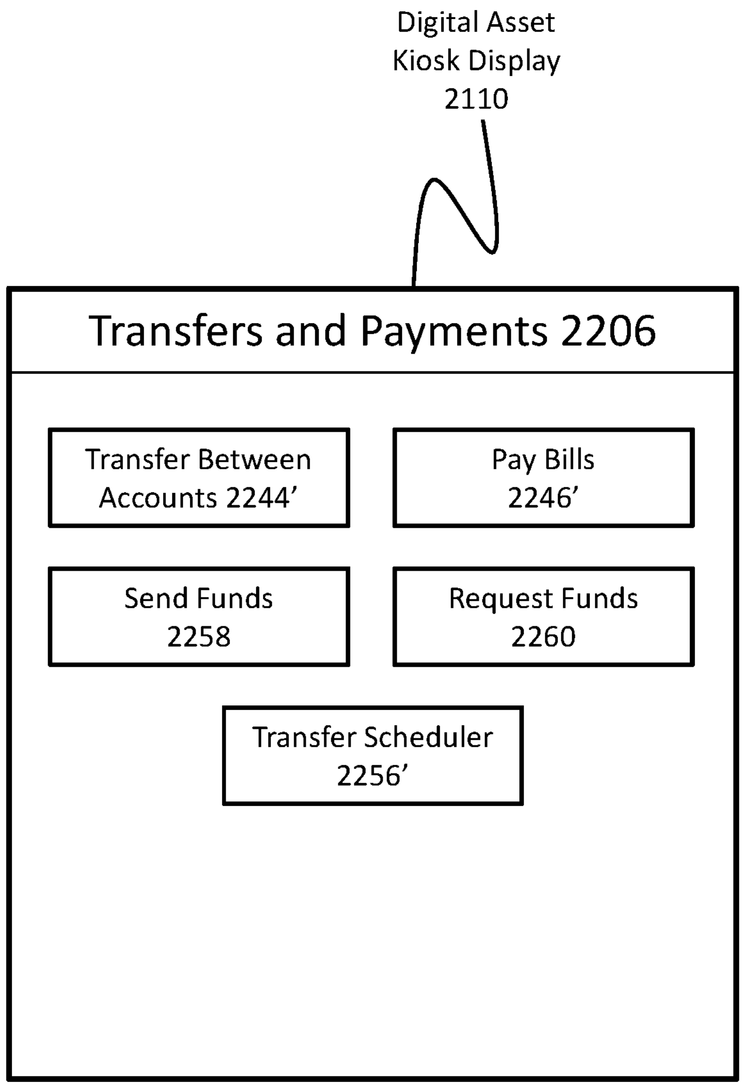
Figure 40F:
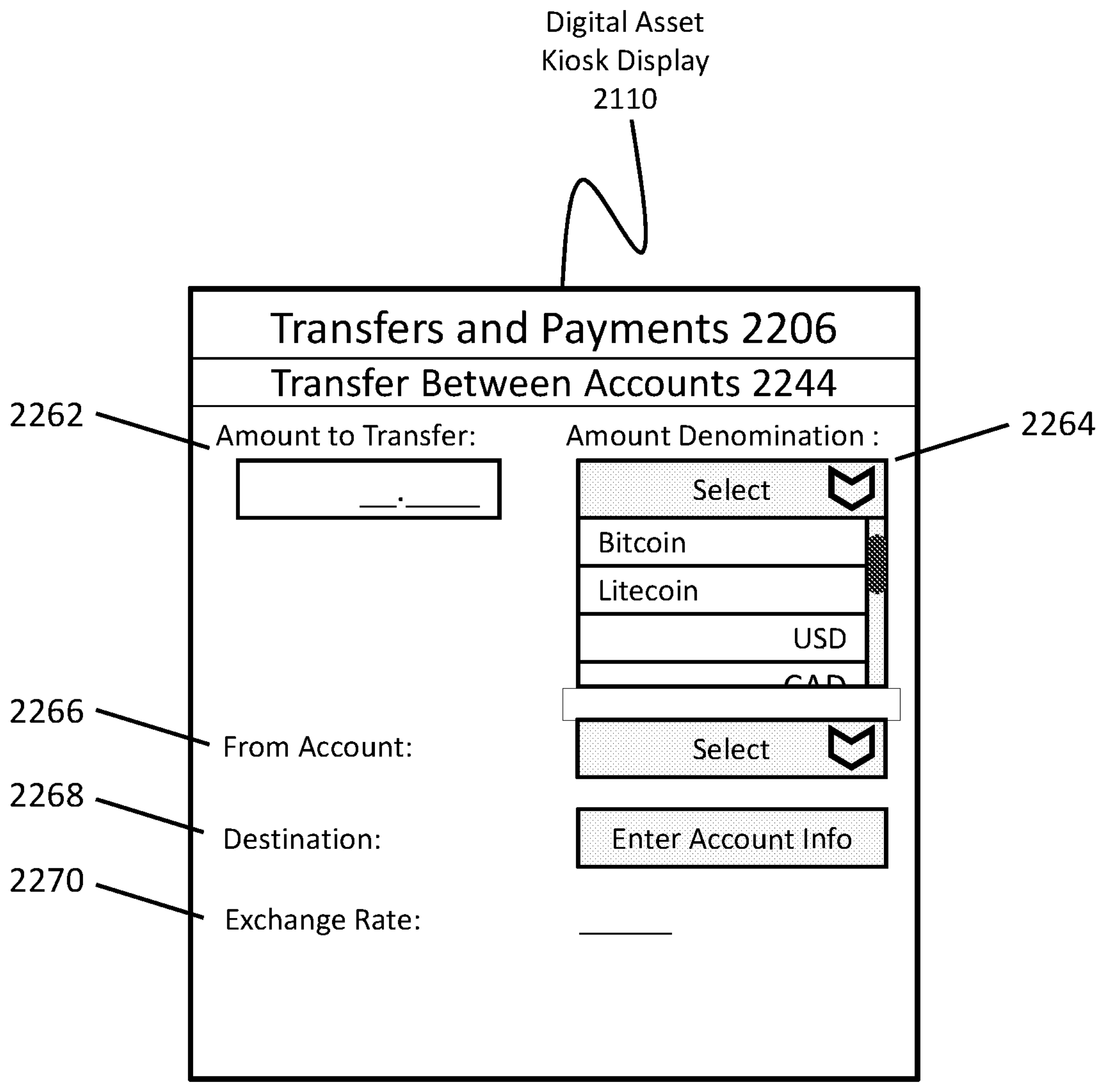
Figure 40G:
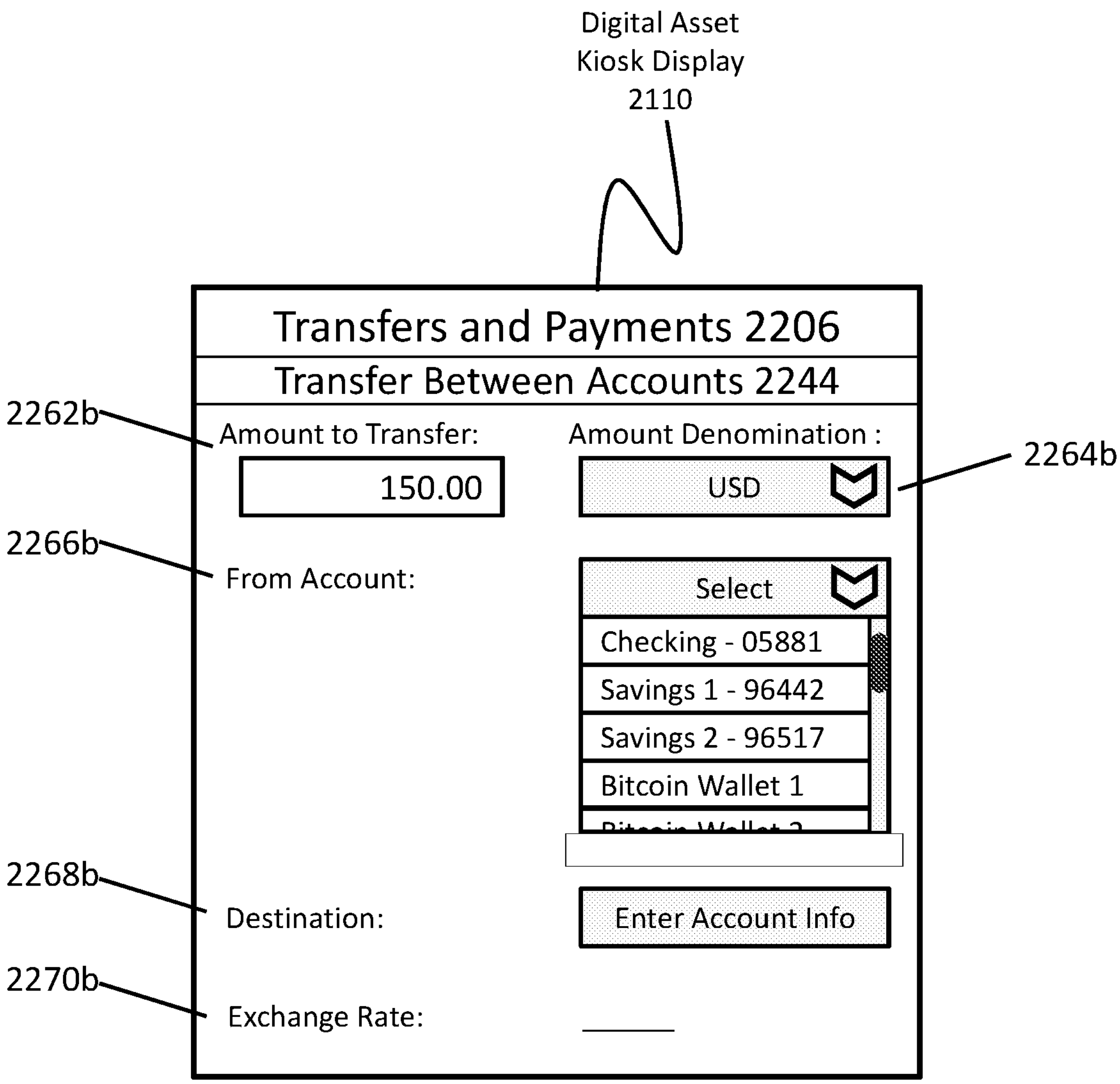
Figure 40H:
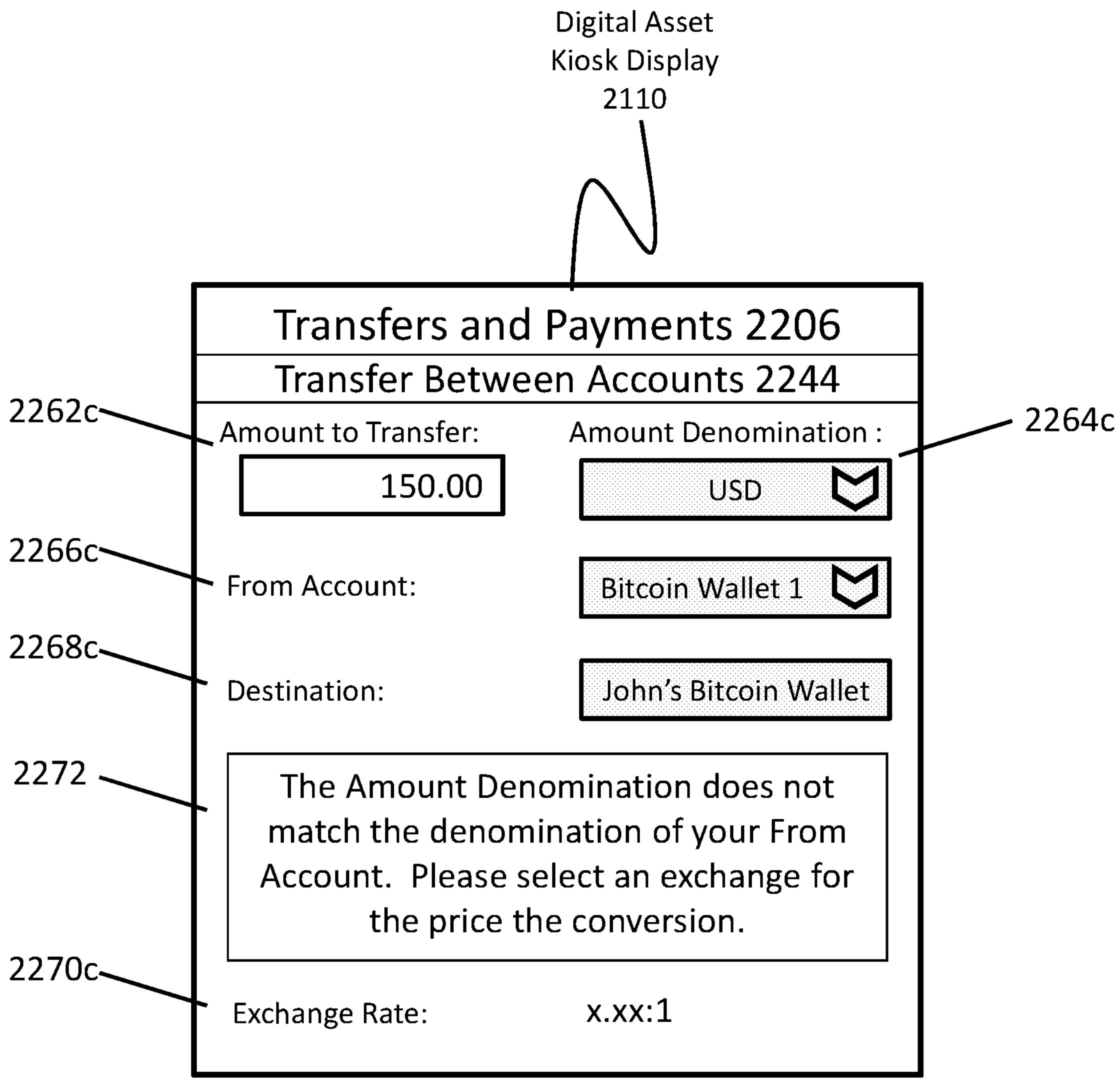
Figure 40I:
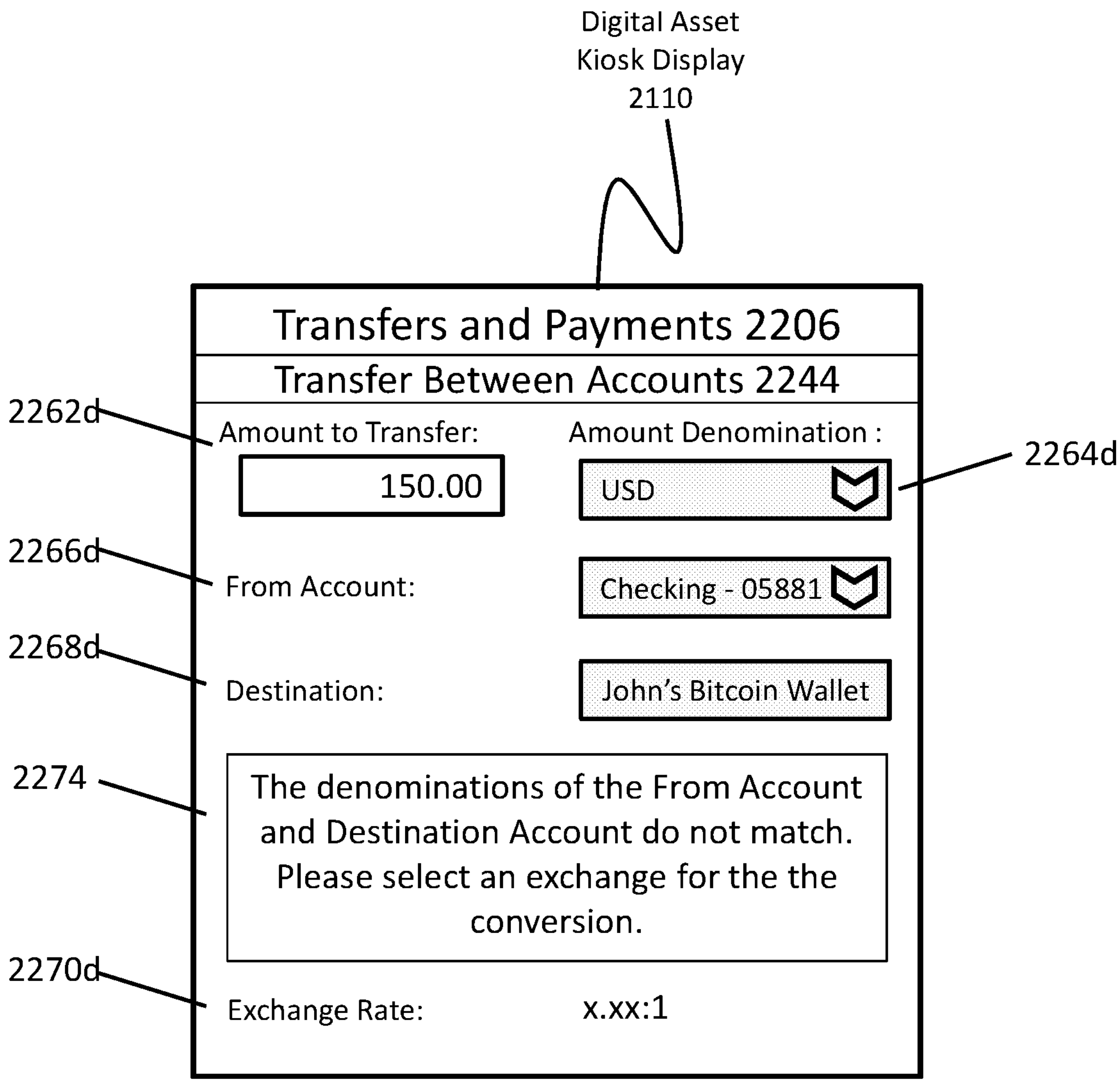
Figure 40J:
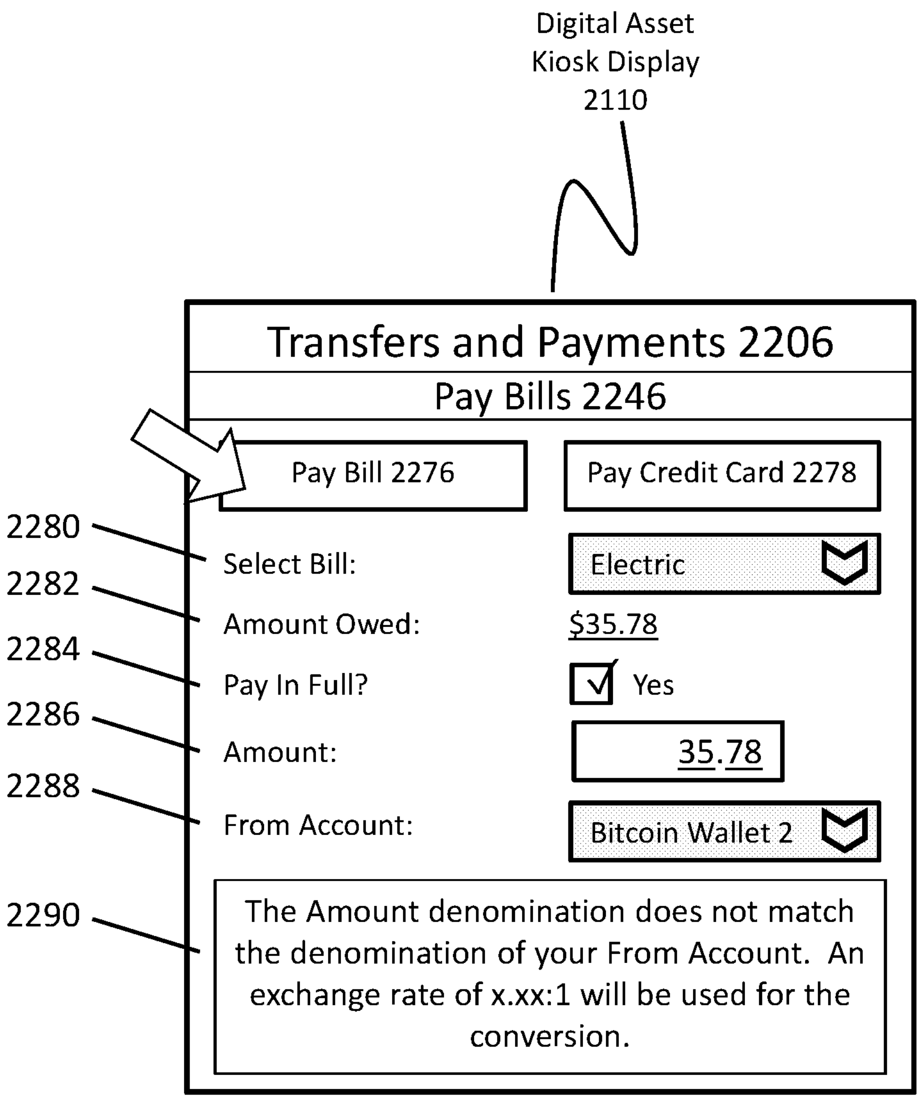
Figure 40K:
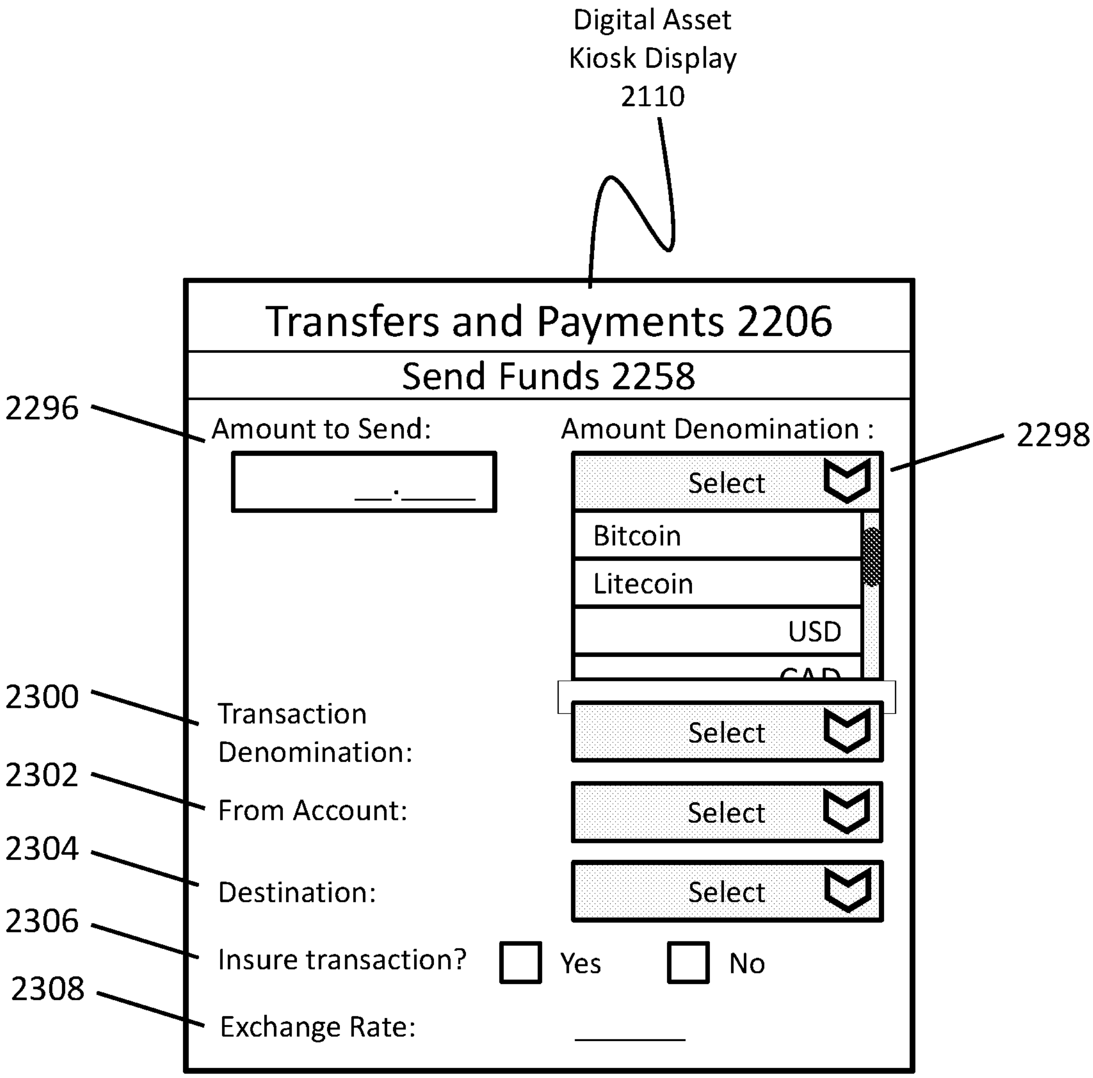
Figure 40L:
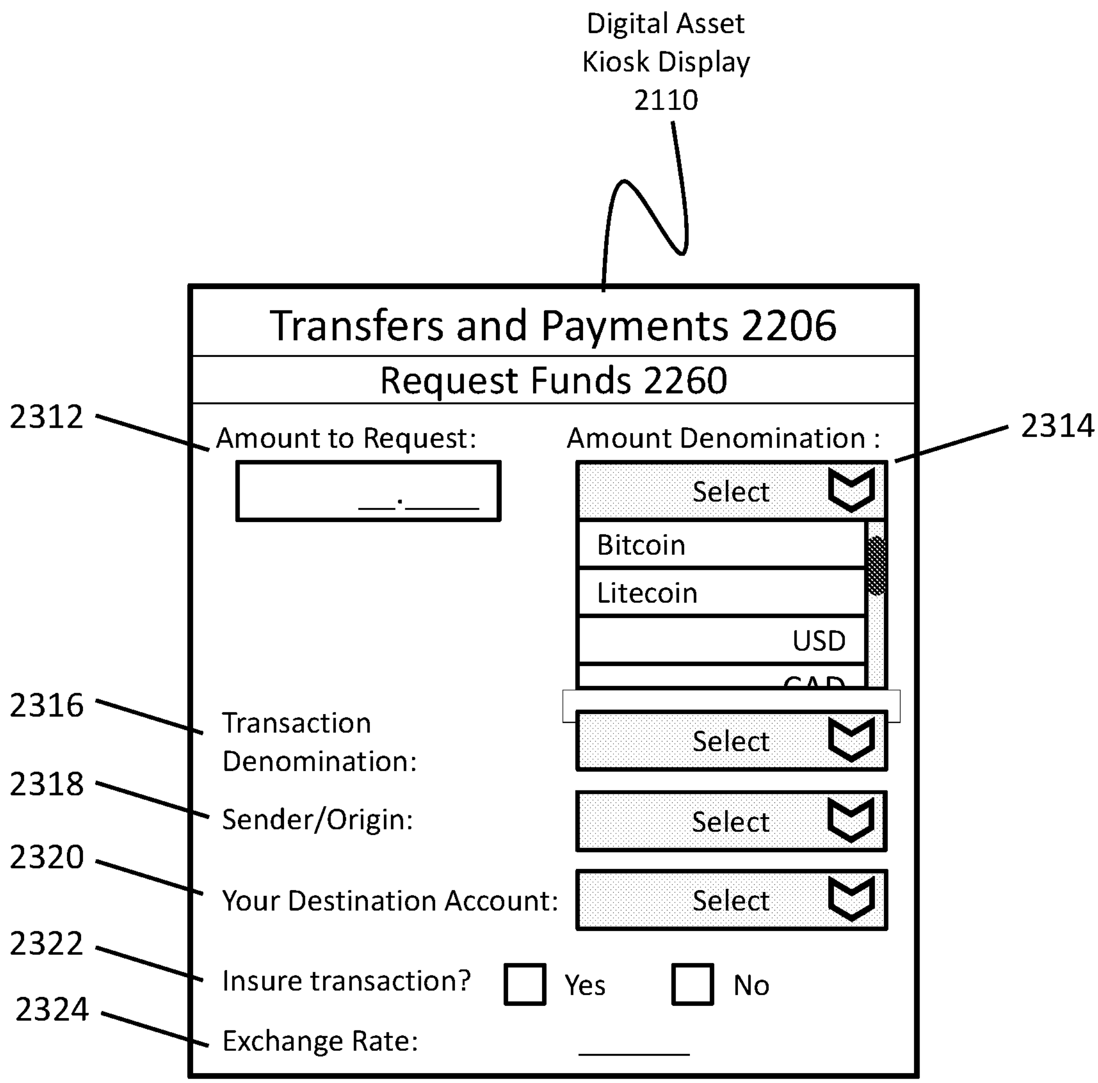
Figure 40M:
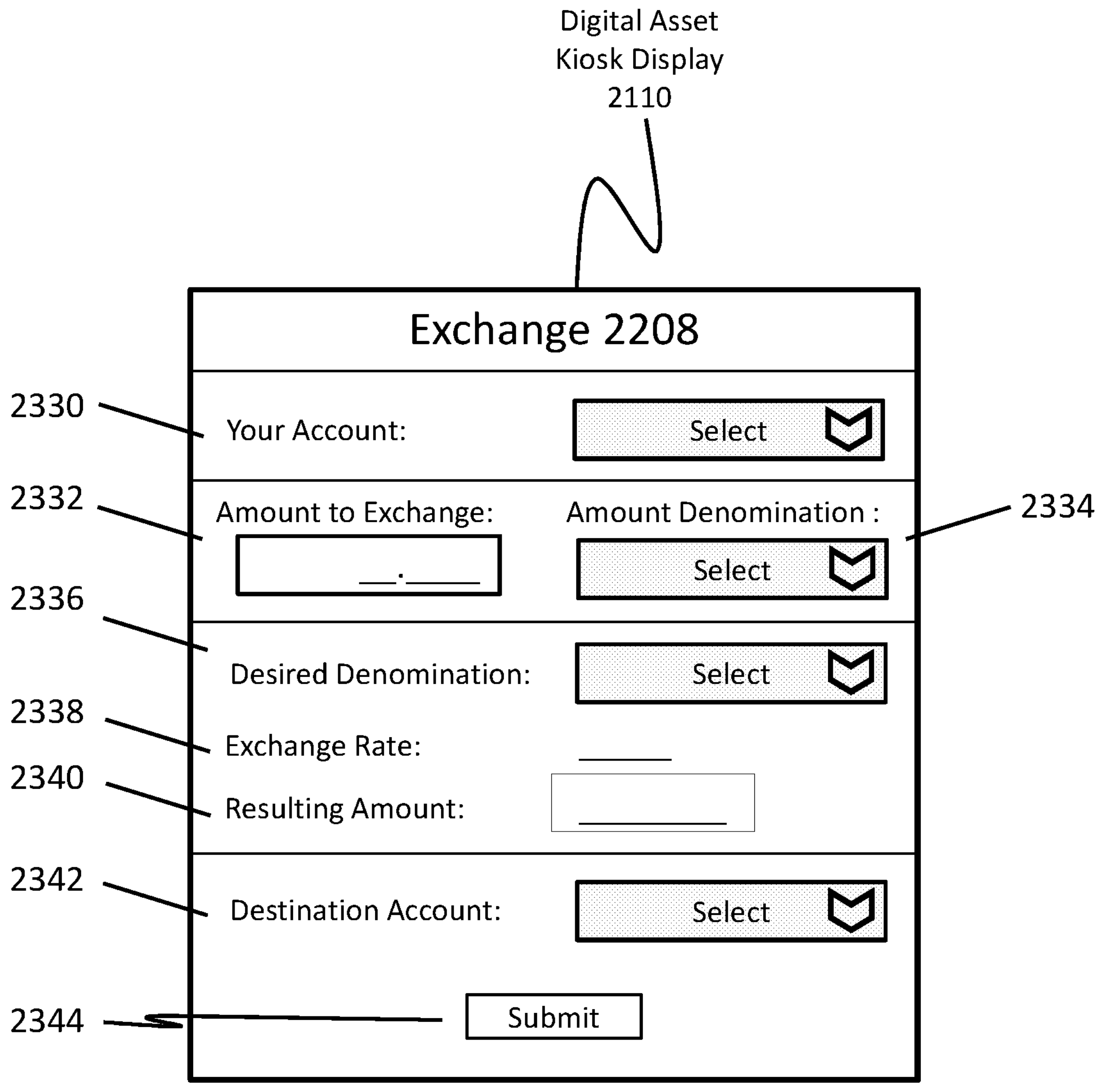
Figure 40N:
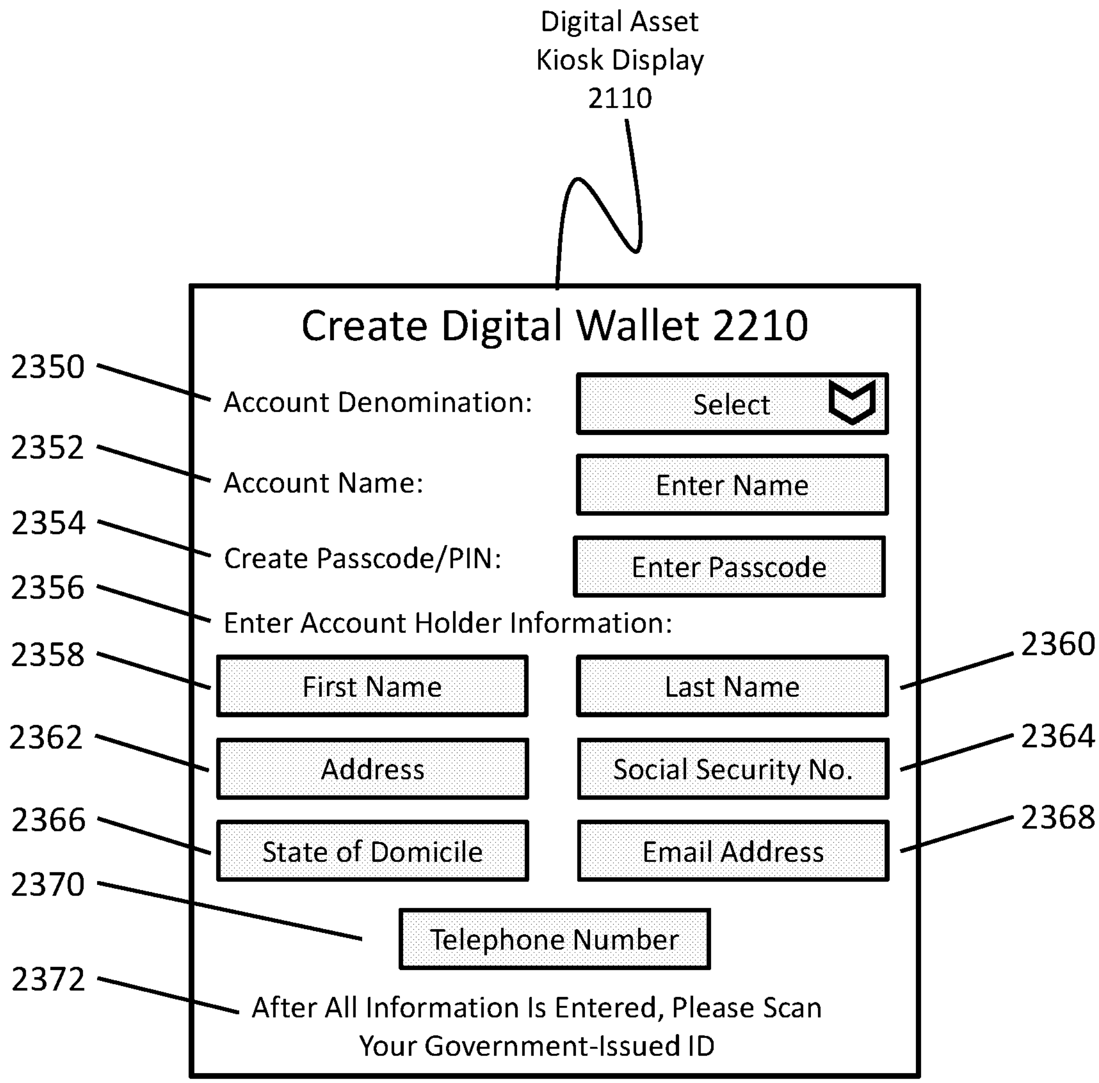
Figure 40O:
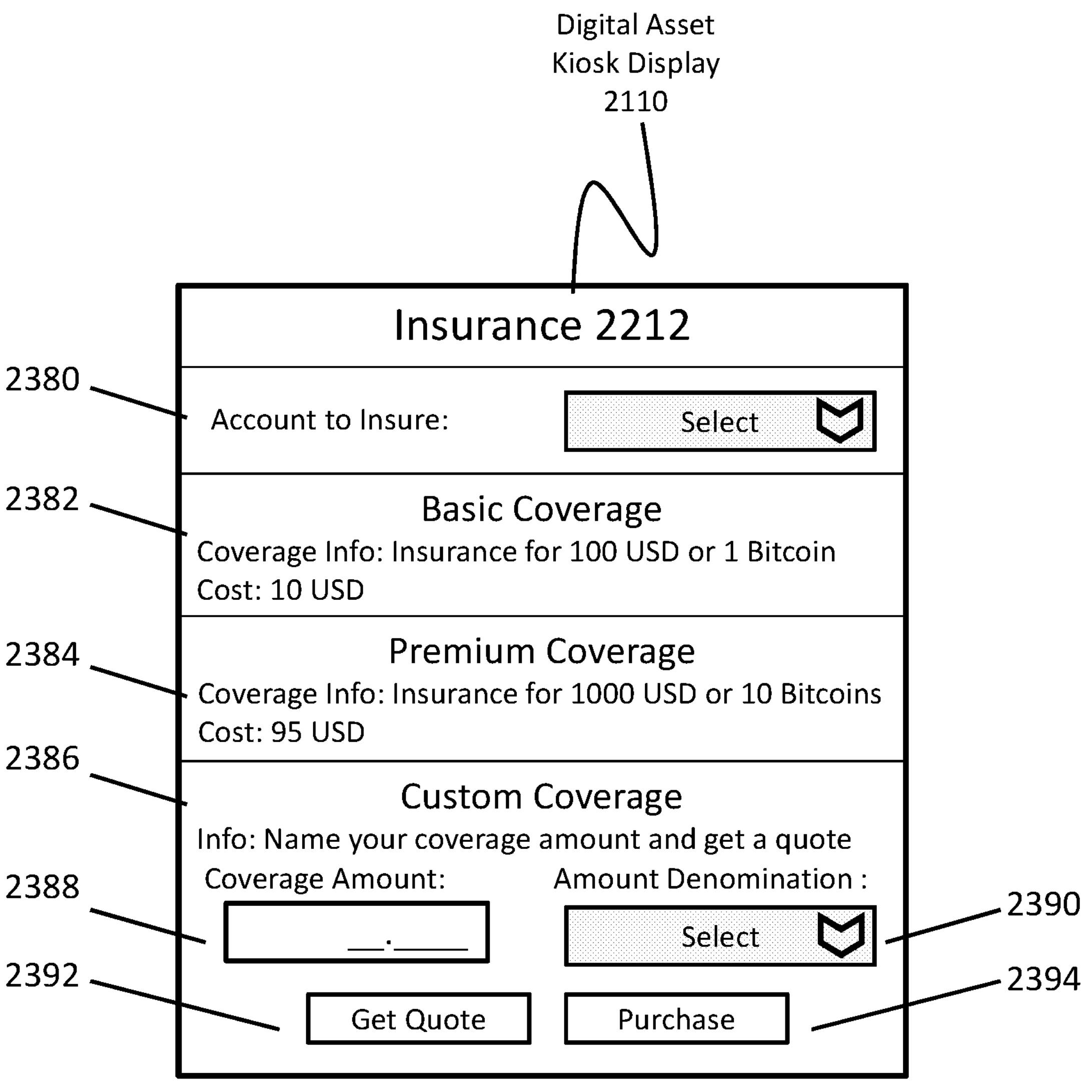
Figure 40P:
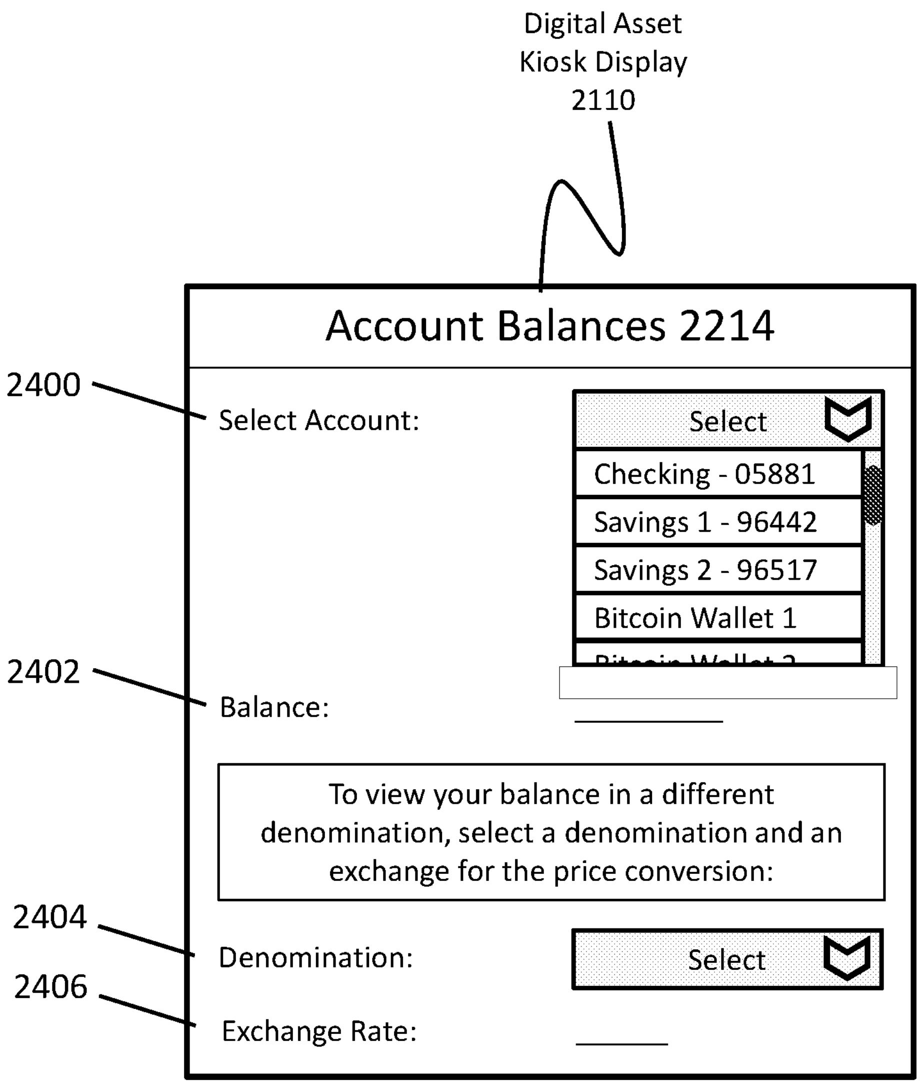
Figure 40Q:
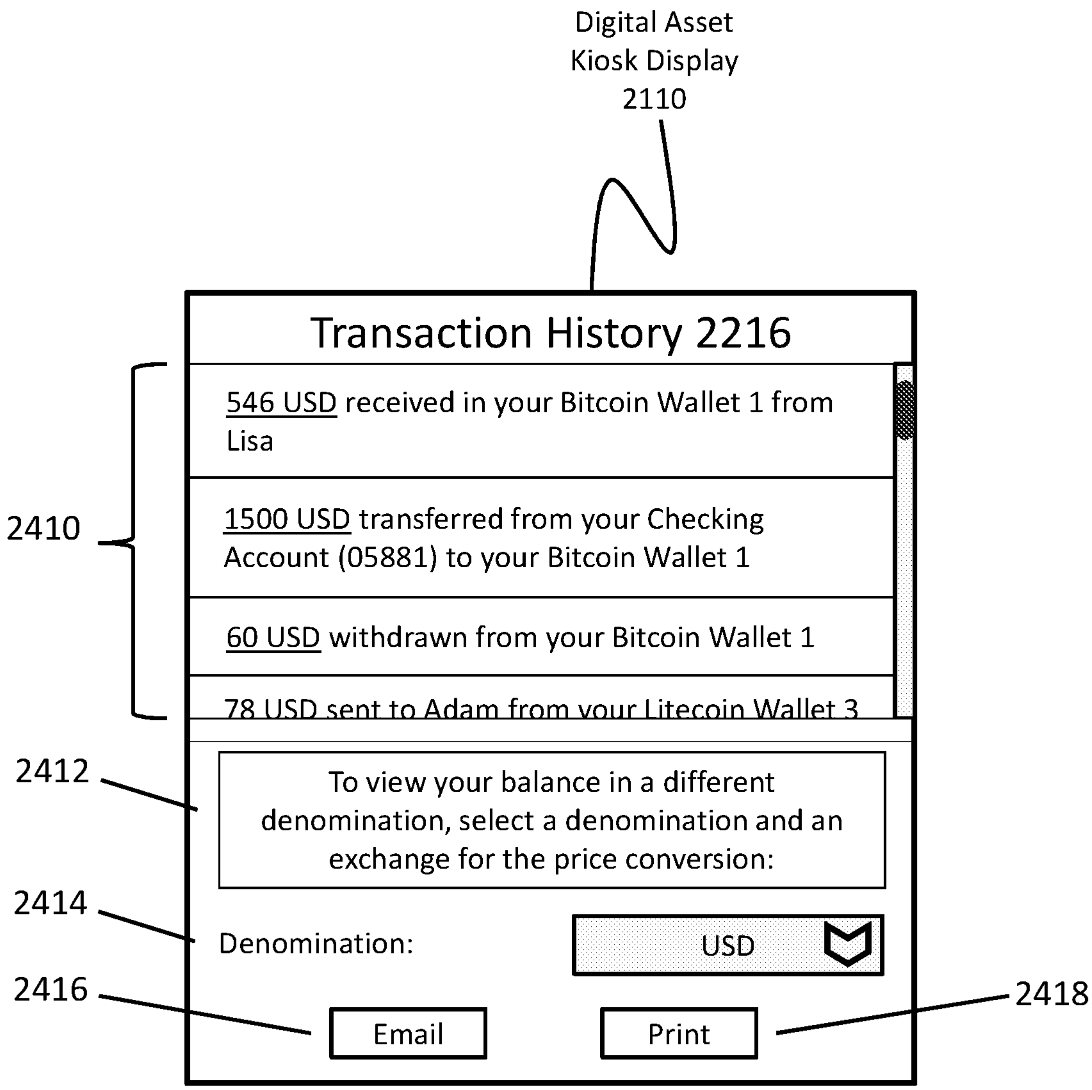

FIGS. 40A-Q illustrate exemplary screen shots of a digital asset kiosk performing transactions in accordance with embodiments of the present invention. In embodiments, certain transactions illustrated in FIGS. 40A-Q (e.g., transactions that do not involve deposits or withdrawals or fiat currency) may be performed from a digital wallet or other digital asset client (e.g., a website or downloadable software on a computer, tablet computer, and/or mobile device, to name a few).

FIG. 40A illustrates an exemplary digital asset kiosk menu, which identifies actions that may be performed using an exemplary kiosk.

FIG. 40B illustrates an exemplary deposit 2202 being performed using an exemplary kiosk.

FIG. 40C illustrates an exemplary withdrawal 2204 being performed using an exemplary kiosk.

FIG. 40D illustrates an exemplary digital asset kiosk transfers and payments 2206 menu, which identifies fund transfer and payment transactions that may be performed using an exemplary kiosk.

FIG. 40E illustrates another exemplary digital asset kiosk transfers and payments 2206 menu.

FIGS. 40F-H illustrates an exemplary transfer between accounts 2244 being performed using an exemplary kiosk.

FIG. 401 illustrates another exemplary transfer between accounts 2244 being performed using an exemplary kiosk.

FIG. 40J illustrates an exemplary bill payment 2246 being performed using an exemplary kiosk.

FIG. 40K illustrates an exemplary transaction to send funds 2258 being performed using an exemplary kiosk. The user can be prompted or otherwise provided with an interface to enter or select a transaction amount 2296, which is the amount to send. A denomination option 2298 may allow the user to select the denomination for the transaction amount 2296. For example, a user may specify 1 unit of a digital asset (e.g., 1.00 bitcoin), 100.00 USD, 50.00 CAD, and/or any amount of any supported currency that complies with any transaction rules or limits in effect. The software may provide a transaction denomination option 2300, which may allow a user to select the denomination of assets in which to transmit the funds. An origin account option 2302 may allow a user to select the account from which fund will be sent. In embodiments, an account may be a digital wallet. A destination option 2304 may allow a user to select a destination for the funds, which may be another user, an account (e.g., an account number or other identifier), and/or a digital wallet (e.g., a public address corresponding to a digital wallet). Where the amount denomination 2298 does not match the transaction denomination 2300, the software may access one or more digital asset exchanges to obtain and/or display an exchange rate 2308 and/or to compute the value in the desired transaction denomination and/or display that value. Accordingly, in embodiments, the software may show the exchange rate 2308 (e.g., 104.00 USD to 1 unit of a digital asset) and/or may compute the exchange value or approximate value before the transaction is processed. For example, upon a user's input of 2 units of a digital asset, the software may display "208.00 USD" or vice versa. Where the transaction denomination 2300 does not match the denomination of assets in the origin account 2302, the software may obtain an exchange rate and compute the corresponding amount of assets to send from the origin account 2302. This exchange information may be displayed or otherwise provided to the user. The software may also provide an interface or prompt the user for selection of transaction insurance options 2306. The user may select a yes option to ensure the transaction or a no option to decline insurance. If insurance is selected, a user may enter a coverage amount. By default, the coverage amount may be the transaction amount 2296. The software may provide pre-determined coverage amount options and may indicate the cost of each. If the user enters a different coverage amount, the software may then determine the cost of insurance (e.g., recurring premiums or an up-front cost) or may provide the user with a get quote option, which can calculate, fetch, and/or otherwise obtain and display the associated cost of the selected coverage amount. In embodiments, limits may be placed on the coverage amount.

FIG. 40L illustrates an exemplary request of funds 2260 being performed using an exemplary kiosk.

FIG. 40M illustrates an exemplary exchange transaction 2208 being performed using an exemplary kiosk in accordance with embodiments of the present invention.

FIG. 40N illustrates an exemplary creation of a digital wallet 2210 being performed using an exemplary kiosk.

FIG. 40O illustrates an exemplary action to obtain account insurance 2212 being performed using an exemplary kiosk. In embodiments, insurance may involve secure storage of one or more keys to access an account.

FIG. 40P illustrates an exemplary action to check account balances 2214 being performed using an exemplary kiosk. Account balances may be emailed and/or printed by the kiosk. In embodiments, alerts may notify a user (e.g., by phone, email, text message) when there is account activity for one or more accounts, when balances reach a certain level, and/or when transactions of a certain size are performed.

FIG. 40Q illustrates an exemplary action to check a transaction history 2216 being performed using an exemplary kiosk. A digital asset kiosk may be used to view a transaction history of one or more accounts, which may include any fiat currency accounts and digital asset accounts that have been used in digital asset transactions. The transaction history may be printed by the kiosk and/or emailed or otherwise communicated to a user.

In embodiments, an external application (e.g., mobile application, desktop downloadable software, or a website, to name a few) may integrate with a digital asset kiosk. A user may initiate a kiosk transaction using the external application. For example, a user may send, using the external application, transaction instructions to sell digital assets. When the sending of digital assets to from the user to the buyer is confirmed (e.g., by a digital asset network or by an exchange), an electronic notification may be provided to the user to notify the user that the transfer was confirmed and/or that fiat currency is available for withdrawal. In embodiments, the fiat currency received from a buyer, which may be the exchange itself, may be stored in an exchange fiat currency account associated with the user. As described herein, the exchange fiat currency account may be a pooled account for a plurality of exchange users. In embodiments, the pooled account may provide insurance, such as FDIC insurance or insurance from another governmental body. The user may then log in at a digital asset kiosk and select an option to withdraw fiat currency. The kiosk may then provide the currency to the user. This integration of an external application to an exchange and kiosk system can eliminate the need for a user to log into a kiosk, initiate a transaction, and wait for the transaction to occur and clear before funds are available for withdrawal.

Figure 41:
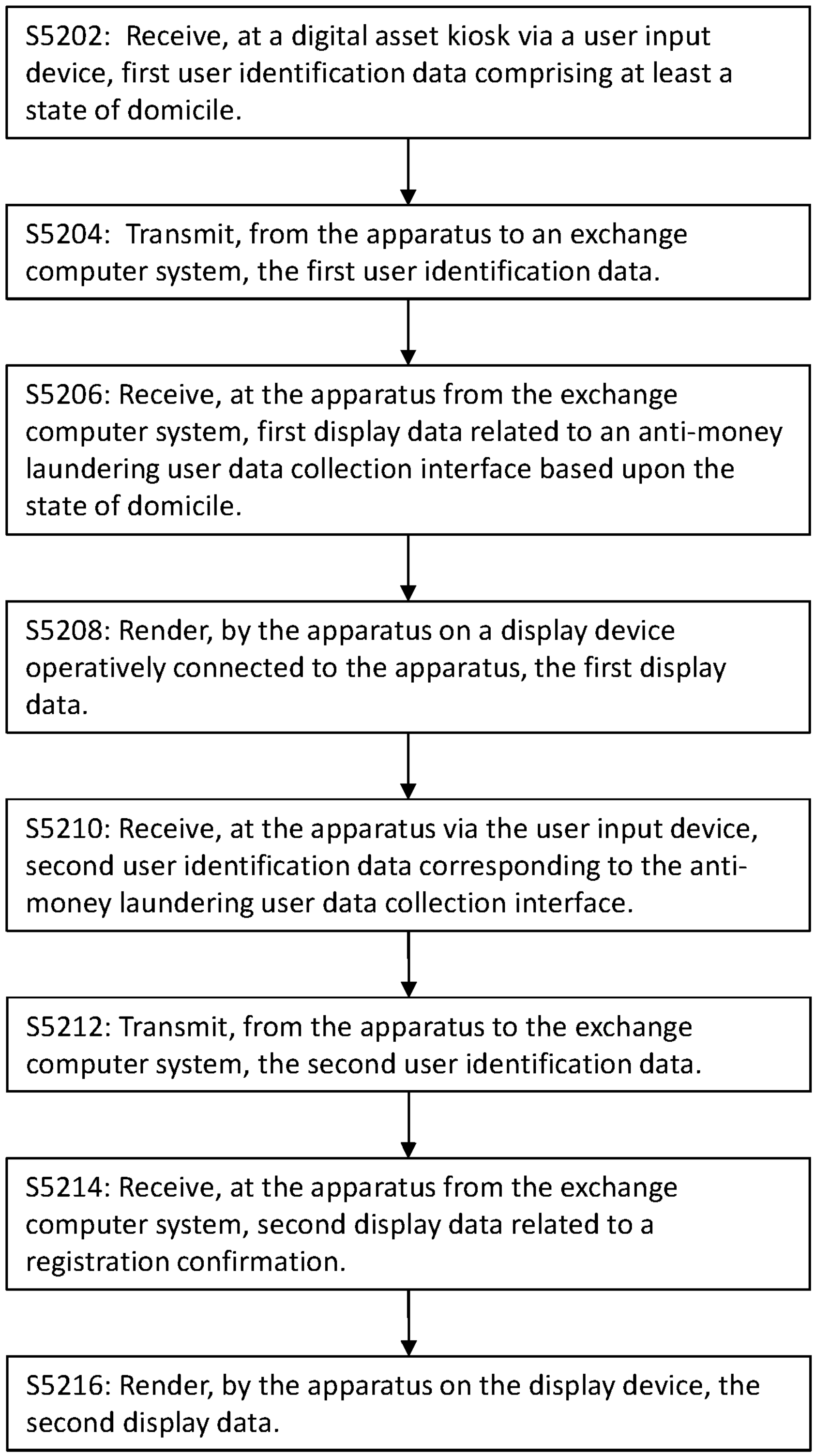
FIG. 41 is a flow chart of an exemplary process for performing an exchange transaction from an electronic kiosk in accordance with exemplary embodiments of the present invention.

FIG. 41 is a flow chart of an exemplary process for performing an exchange transaction from an electronic kiosk.

In a step S5202, a digital asset kiosk may receive via a user input device first user identification data comprising at least a state of domicile.

In a step S5204, the digital asset kiosk may transmit to an exchange computer system, the first user identification data.

In a step S5206, the digital asset kiosk may receive from the exchange computer system, first display data related to an anti-money laundering user data collection interface based upon the state of domicile.

In a step S5208, the digital asset kiosk may render on a display device operatively connected to the apparatus, the first display data.

In a step S5210, the digital asset kiosk may receive via the user input device, second user identification data corresponding to the anti-money laundering user data collection interface.

In a step S5212, the digital asset kiosk may transmit to the exchange computer system, the second user identification data.

In a step S5214, the digital asset kiosk may receive from the exchange computer system, second display data related to a registration confirmation.

In a step S5216, the digital asset kiosk may render on the display device, the second display data.

Accordingly, in embodiments, an apparatus, which may be an electronic kiosk, may be programmed to perform the following steps: receiving, at the apparatus via a user input device, first user identification data comprising at least a state of domicile; transmitting, from the apparatus to an exchange computer system, the first user identification data; receiving, at the apparatus from the exchange computer system, first display data related to an anti-money laundering user data collection interface based upon the state of domicile; rendering, by the apparatus on a display device operatively connected to the apparatus, the first display data; receiving, at the apparatus via the user input device, second user identification data corresponding to the anti-money laundering user data collection interface; transmitting, from the apparatus to the exchange computer system, the second user identification data; receiving, at the apparatus from the exchange computer system, second display data related to a registration confirmation; and rendering, by the apparatus on the display device, the second display data.

In embodiments, such an apparatus may be an electronic kiosk. In embodiments, such an apparatus may be a user device, such as a smart phone, tablet computer, and/or computer.

In embodiments, the apparatus may be further programmed to perform the steps of receiving, at the apparatus from the exchange computer system, third display data related to exchange transaction options; rendering, by the apparatus on the display device, the third display data; receiving, at the apparatus via a user input device, a selection of an exchange transaction option related to a fiat withdrawal and a corresponding transaction request comprising at least a fiat withdrawal amount; and transmitting, from the apparatus to the exchange computer system, the transaction request.

In embodiments, an apparatus programmed to perform the following steps: receiving, at the apparatus via an input device, user account credentials; transmitting, from the apparatus to the exchange computer system, the user account credentials; receiving, at the apparatus from the exchange computer system, first display data corresponding to a plurality of exchange transaction options for an authenticated user; rendering, by the apparatus, the first display data on a display device operatively connected to the apparatus; receiving, at the apparatus via the input device, user selections corresponding to a first exchange transaction option that is an exchange transaction order; receiving, at the apparatus via the input device, exchange transaction order parameters; transmitting, from the apparatus to the exchange computer system, the exchange transaction order parameters; receiving, at the apparatus from the exchange computer system, second display data corresponding to order placement confirmation; and rendering, by the apparatus, the second display data on the display device.

Digital Asset Notification System

Figure 42A:
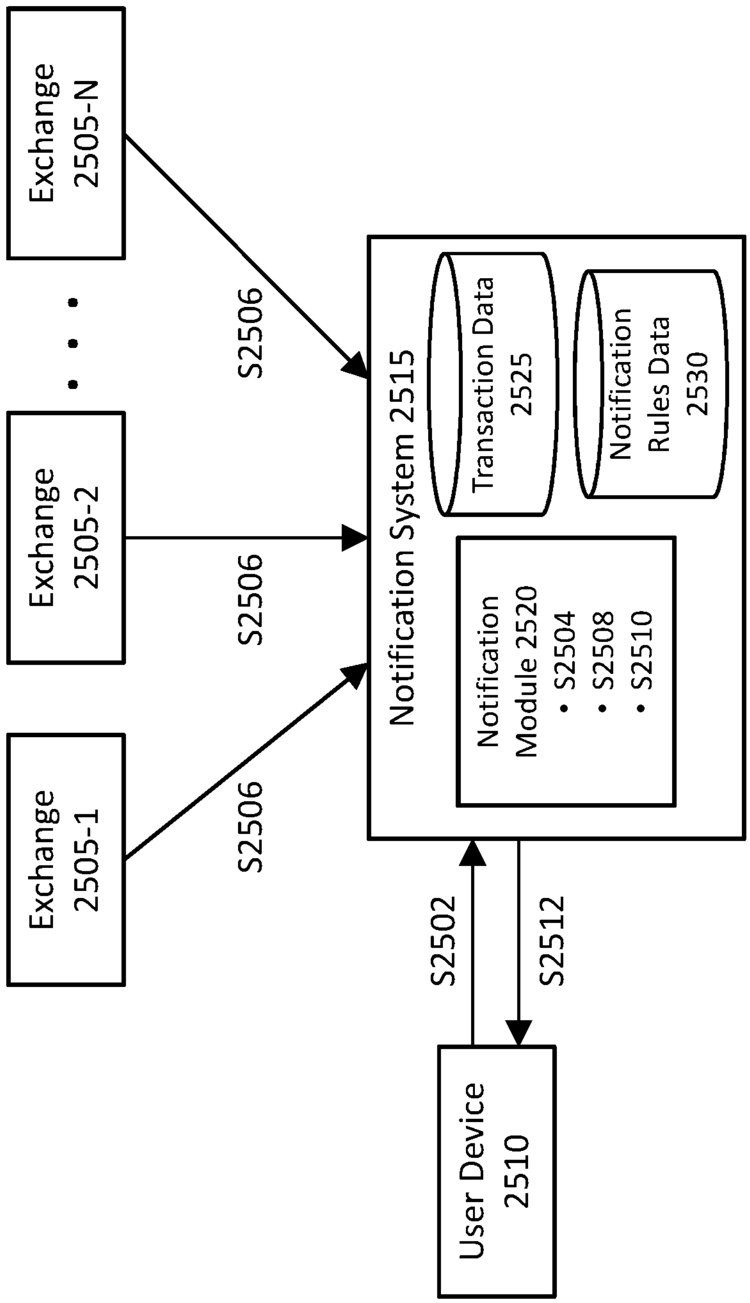
FIGS. 42A-B are a schematic diagram and corresponding flow chart showing participants in and processes for digital asset notifications in accordance with exemplary embodiments of the present invention.
Figure 42B:
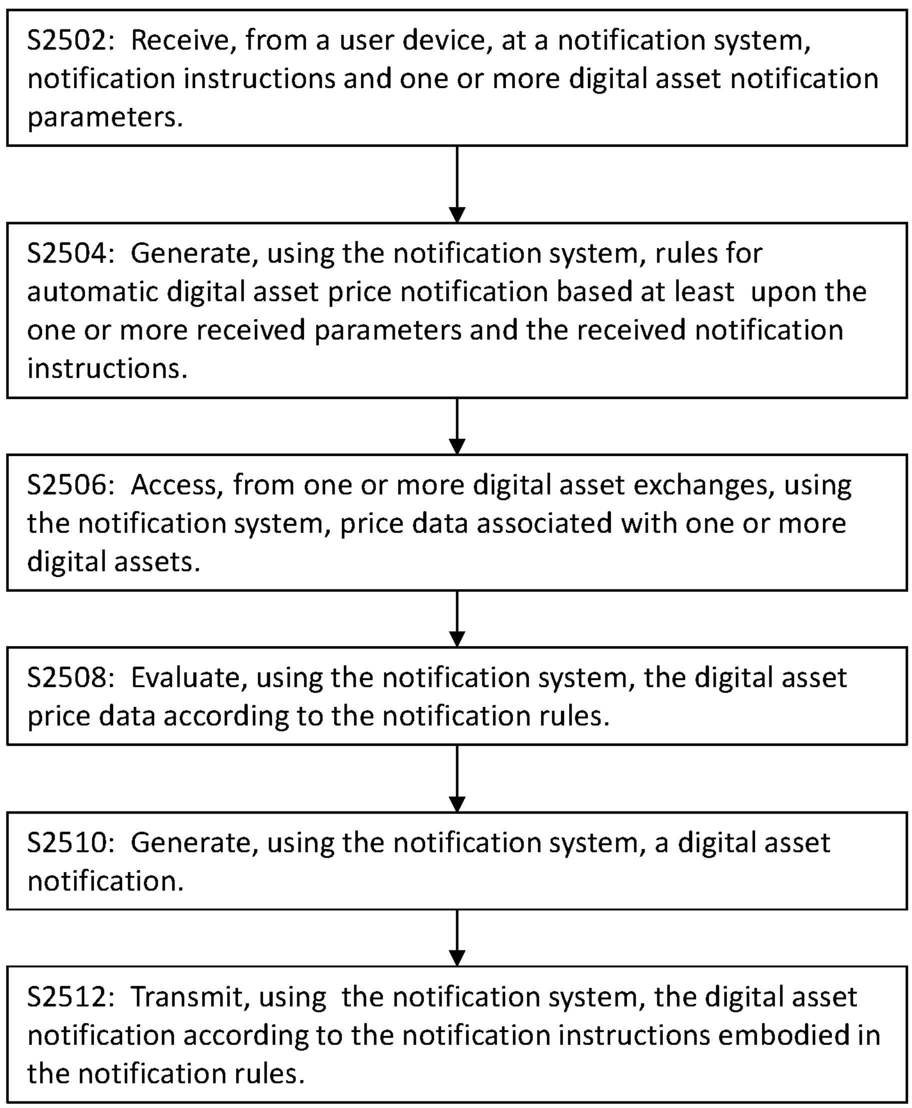

FIGS. 42A-B are a schematic diagram and corresponding flow chart showing an exemplary system and an exemplary process for providing digital asset notifications. Notifications may be provided as a feature of a digital wallet application and/or as a stand-alone service.

As shown in FIG. 42A, a user may subscribe for one or more notifications from a user device 2510, which may be a phone, smart phone, PDA, computer, tablet computer, to name a few. Notifications may also be received by a user device 2510. A notification system 2515 may receive digital asset price data from one or more digital asset exchange 2505 (e.g., 2505-1, 2505-2, . . . 2505-N). FIG. 25A illustrates the flow of steps and participants involved in performing the steps in an exemplary process for providing digital asset notifications, as described in greater detail herein with respect to FIG. 25B.

Referring again to FIG. 42A, a notification system 2515 can include a notification module 2520, price data 2525, and notification rules data 2530. A notification system 2515 can comprise one or more computers or computer systems having at least one or more processors, computer-readable memory comprising one or more databases, one or more communications portals for communicating with one or more other computers or computer systems, and/or one or more input devices. A notification module 2520 may be software that can process received notification instructions, generate notification rules, access digital asset price data, perform calculations and determinations using the price data and the notification rules, generate notifications, and/or transmit notifications, to name a few, as discussed herein with respect to FIG. 25B. In embodiments, the processes attributed to a notification module 2520 may be performed by one or more other software modules. In embodiments, one or more steps in a digital asset notification process may be decentralized, e.g., performed by a user device. Price data 2525 can include prices for one or more digital assets from one or more digital asset exchanges 2505. Price data 2525 can span any time period (e.g., the past 10 minutes, the past 24-hours, the past week, the past 3 months, all historical data, to name a few). Notification rules data 2530 may include user account data associated with notification settings, notification requests from users, generated notification rules, notifications, and notification history data, to name a few. Notification requests may comprise one or more notification instructions, and/or one or more digital asset notification parameters. Notification instructions may specify the frequency of notifications (e.g., real-time, once a day, once a week, to name a few), the notification alert types (e.g., SMS, email, mobile application push notifications, to name a few), and/or notification recipient information (e.g., email address, telephone number, mobile device ID, digital wallet ID, to name a few). Notification parameters may vary by notification type. For example, notification parameters may identify digital assets, digital asset exchanges, price thresholds (including price difference thresholds), time thresholds, rate thresholds (e.g., rate of increase, rate of decrease), exchange availability thresholds (e.g., whether a particular exchange is open for trading), to name a few, as required to set notifications as discussed herein.

FIG. 42B shows steps for providing digital asset notifications in accordance with exemplary embodiments of the present invention. In a step S2502, a notification system 2515 may receive from a user device 2510 notification instructions and one or more digital asset notification parameters. The received notification instructions and notification parameters may be stored by the notification system 2515. In embodiments, a user device 2510 may request notifications or otherwise activate or edit notifications by toggling notification settings through a software application (e.g., a mobile application or computer software) and/or through a website, to name a few. A user may also transmit a request for notifications, as through email, which request may indicate notification instructions and/or parameters or may trigger default or pre-programmed notification instructions and/or parameters.

In a step S2504, the notification system 2515 may generate one or more rules for automatic digital asset price notification based at least upon the one or more received parameters and the received notification instructions. For example, a notification rule may be a logical rule comprising a condition and an action. When the condition is satisfied, the action may be performed. Conditions may relate to the type of notification (e.g., price of a particular digital asset drops below a threshold, price exceeds a threshold, exchange is unavailable), and actions may relate to the type of notification (e.g., send an SMS to a particular mobile telephone number). The generated notification rules may be stored by the notification system 2515 and/or incorporated into price monitoring and comparison operations performed by a notification module 2520.

In a step S2506, the notification system 2515 may access, from one or more digital asset exchanges 2505, price data associated with one or more digital assets. A notification module 2520 may perform the step of accessing digital price data, e.g., by interfacing through one or more exchanges 2505 through one or more exchange APIs or by otherwise receiving or fetching the price data, as from a price feed. Price data may be normalized or otherwise formatted to be compatible with the notification system 2515.

In a step S2508, the notification system 2515 may evaluate the digital asset price data according to the notification rules. A notification module 2520 may perform step S2508. In embodiments, evaluation of digital asset price data may comprise comparing the price data to a price threshold to determine whether the threshold was reached and/or crossed.

In a step S2510, the notification system 2515 may generate one or more digital asset notifications. Notification generation may be performed by the notification module 2520. Digital asset notifications may be emails, SMS messages, push notifications, or other notifications, messages, or alerts, and they may indicate that notification criteria have been satisfied (e.g., price thresholds exceeded). Digital asset notifications may be price notifications, indicating the price of one or more digital assets.

In a step S2512, the notification system 2515 may transmit to one or more user devices 2510 the digital asset notification according to the notification instructions embodied in the notification rules. For example, notifications may be transmitted both to a cell phone, to an email account, and to a digital wallet client running on a computer. In embodiments, the user device 2510 that requests notifications (e.g., by setting notification settings) in a step S2502 may be a different user device from the user device that receives notifications in a step S2512. In embodiments, the users associated with the user devices that request notifications and receive notifications may be different users.

Figure 43A:
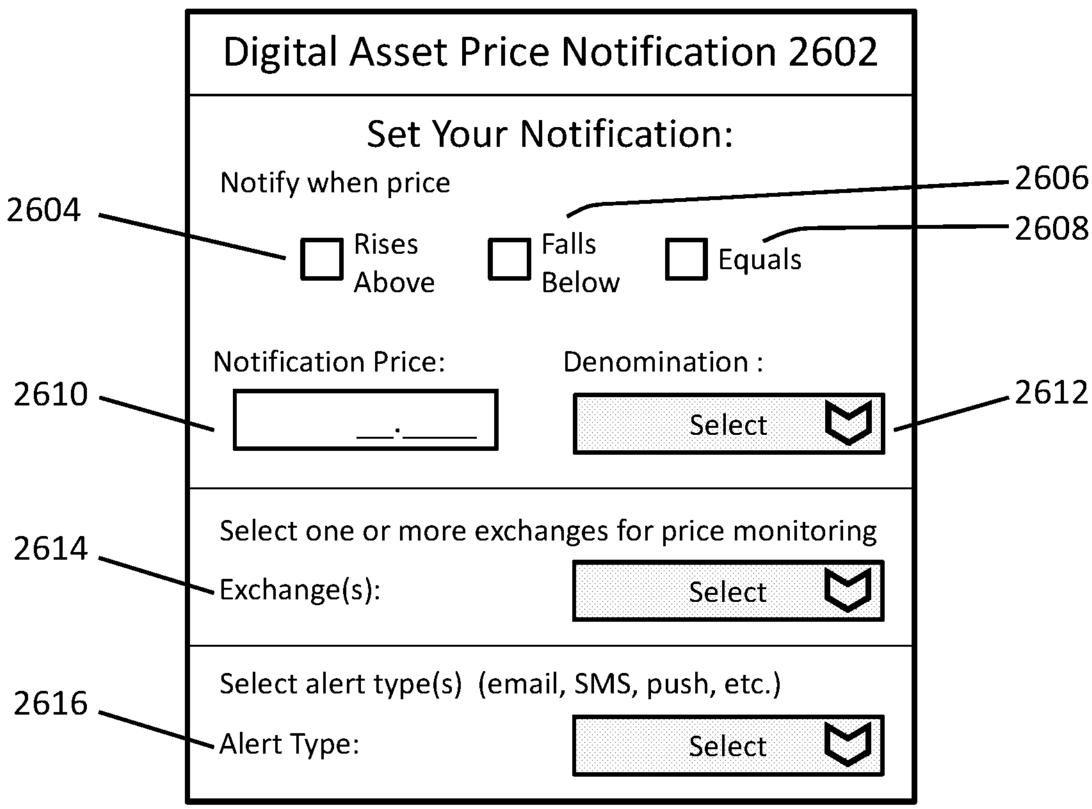
FIGS. 43A-B are exemplary screen shots associated with setting digital asset notification in accordance with exemplary embodiments of the present invention.
Figure 43B:
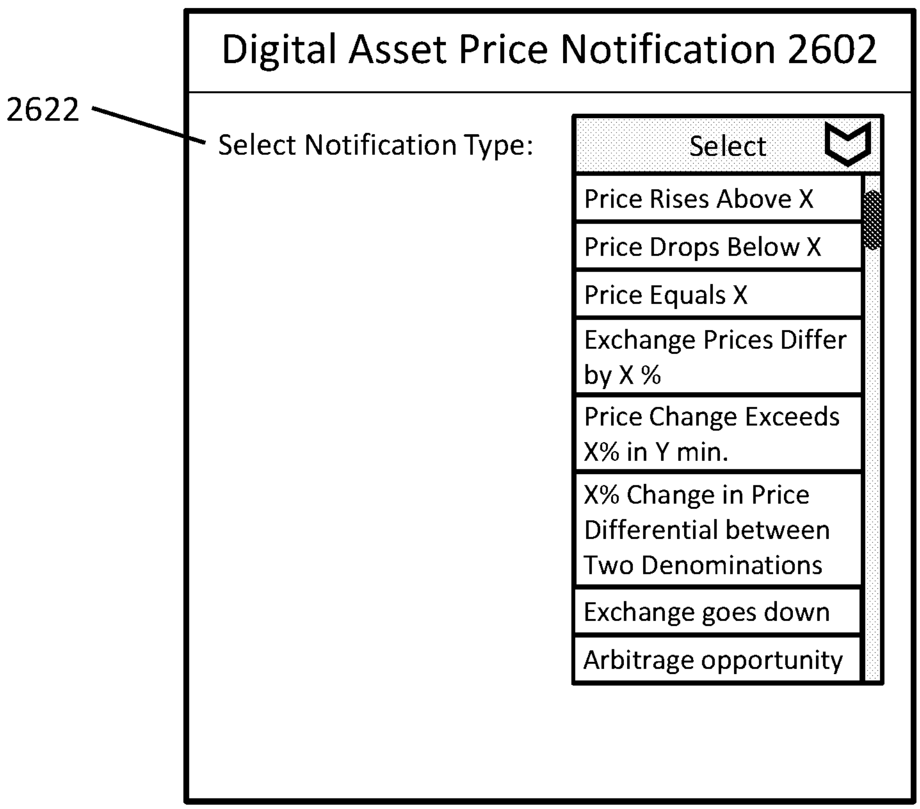

FIGS. 43A-B are exemplary screen shots for setting digital asset notifications in exemplary embodiments of the present invention. FIG. 26A shows a digital asset price notification setup menu 2602. A user can select from various options related to a price threshold, including a rise above option 2604, a fall below option 2602, or an equal's option 2608. A user can set a notification price 2610 and the corresponding denomination 2612, which comprise the price threshold. In embodiments, a user can set a notification price 2610 for a particular digital asset, but express the price in a different denomination (e.g., set a notification for when the price of one bitcoin rises above 500 USD). A user may select one or more exchanges 2614 from which to monitor digital asset prices. A user may also select an alert type 2616, which can be used to set notification instructions. Alert types can include email, SMS, push notifications, to name a few.

FIG. 43B shows an exemplary interface for selecting a notification type 2622 in accordance with embodiments of the present invention. Notification types can indicate when a digital asset price rises above a threshold value, when a digital asset price drops below a threshold value, when a digital asset price equals a threshold value, when digital asset prices from two or more exchanges differ by a threshold amount (e.g., a percentage price difference), when a rate of digital asset price change meets or exceeds a threshold (e.g., the bitcoin price in USD changes 5% in 2 minutes, the Litecoin price rises by 10 Litecoin in 1 hour, to name a few), when the price differential between two denominations meets or exceeds a threshold (e.g., the ratio of bitcoin price to USD changes by 2%), when an exchange is unavailable (e.g., a particular exchange is not processing trades, an exchange from a list of exchanges to monitor is not available for trading, an exchange having an typical average daily volume exceeding some threshold is unavailable for trading), when volume of one or more exchanges satisfies (e.g., exceeds, reaches, or falls below) a threshold volume, when a difference in price between two exchanges satisfies a threshold (e.g., when prices from two predefined exchanges exceed a specified amount, or when the price differential of some threshold amount or percentage exists between any two of a plurality of exchanges being monitored), when a difference in transaction volume between two exchanges satisfies a threshold, and/or when an arbitrage opportunity exists (e.g., the conversion from USD to EUR to bitcoin yields more bitcoin than the conversion from USD to bitcoin directly), to name a few. In embodiments, a notification type may comprise a digital wallet activity monitor, which may alert a user when any transactions or other activity is performed using a specified digital wallet. Such monitoring may entail monitoring a public ledger or transaction log, such as the Bitcoin blockchain. A user may input a wallet address or public key in order to request monitoring of the wallet. A user may input or select rules for wallet monitoring notifications, such as to receive notifications for any transactions involving the wallet, when assets are sent from the wallet, when assets exceeding a threshold amount are sent from the wallet, and/or when assets are sent to an address not on an approved list, to name a few. The notification system may generate and perform electronic monitoring instructions corresponding to the rules received from the user. A notification system may operate a digital asset network node in order to monitor an electronic transaction ledger. After a notification type 2622 is selected, a user may be required to input or otherwise set corresponding parameters, such as digital asset denominations to monitor, price thresholds, rates of price change, time periods for monitoring, and/or exchanges to monitor, to name a few.

Figure 44A:
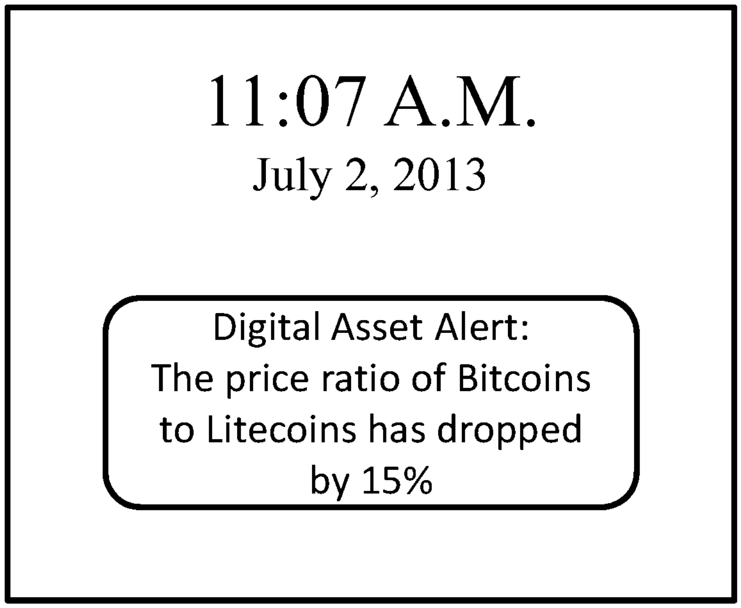
FIGS. 44A-C are exemplary screen shots of digital asset notifications in accordance with exemplary embodiments of the present invention.
Figure 44B:
Figure 44C:
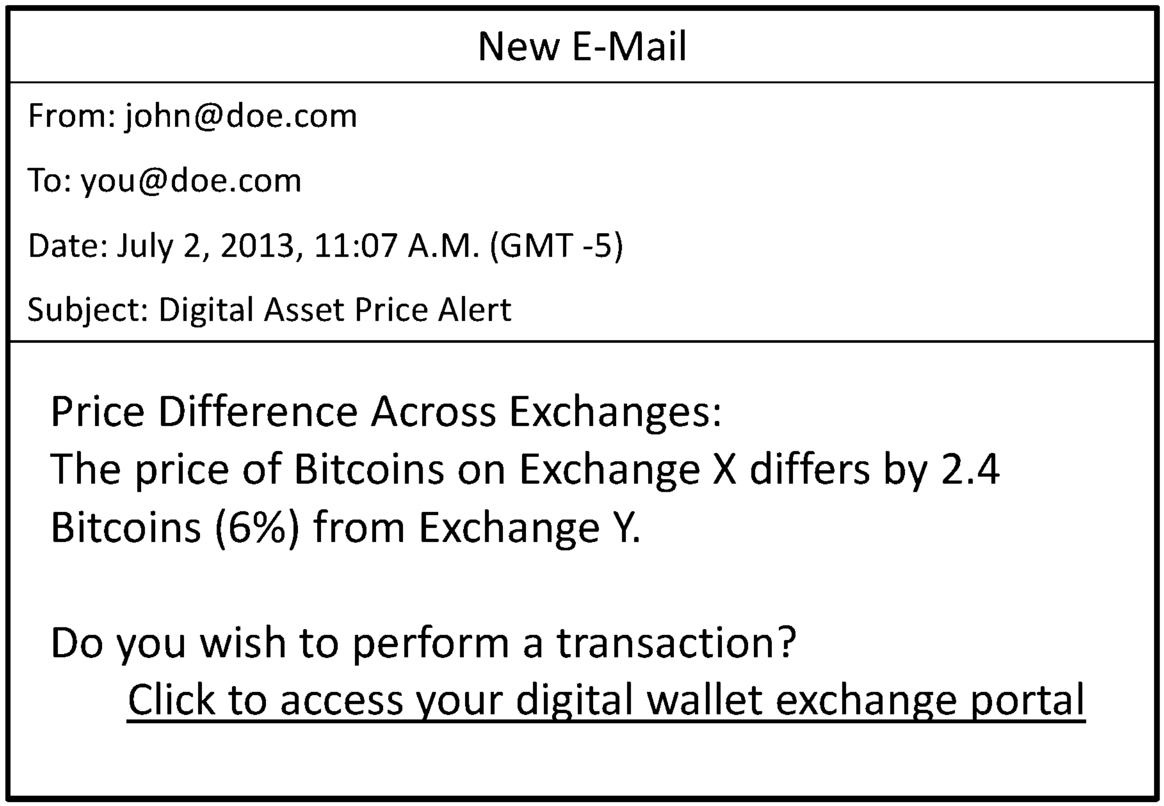

FIGS. 44A-C are exemplary automated digital asset transactions in accordance with exemplary embodiments of the present invention. FIG. 44A illustrates an exemplary push notification, which may be received and/or displayed on a smart phone. The exemplary notification indicates that the price ratio of bitcoin to Litecoin has dropped by 15%. FIG. 44B illustrates an exemplary SMS notification. It indicates that the price of bitcoin is dropping at a rate of 22% per hour. FIG. 44C is an exemplary email notification. It indicates that there is a digital asset price difference across exchanges (e.g., Exchange X and Exchange Y) and shows an absolute value of the price difference (e.g., 2.4 bitcoin) as well as a percentage difference (e.g., 6%). The email notification also provides a user with a link (e.g., a hyperlink to a website or to a software application) to access an exchange function of a digital wallet in order to perform one or more exchange transactions. Notifications can also include an option (e.g., a button, link, and/or other navigational tool or interface) to manage alerts, which can include setting notification types, alert types, and/or settings therefor. In other embodiments, alerts may be provided within applications, such as within a digital wallet client.

Digital Asset Automated Transaction System

Figure 45A:
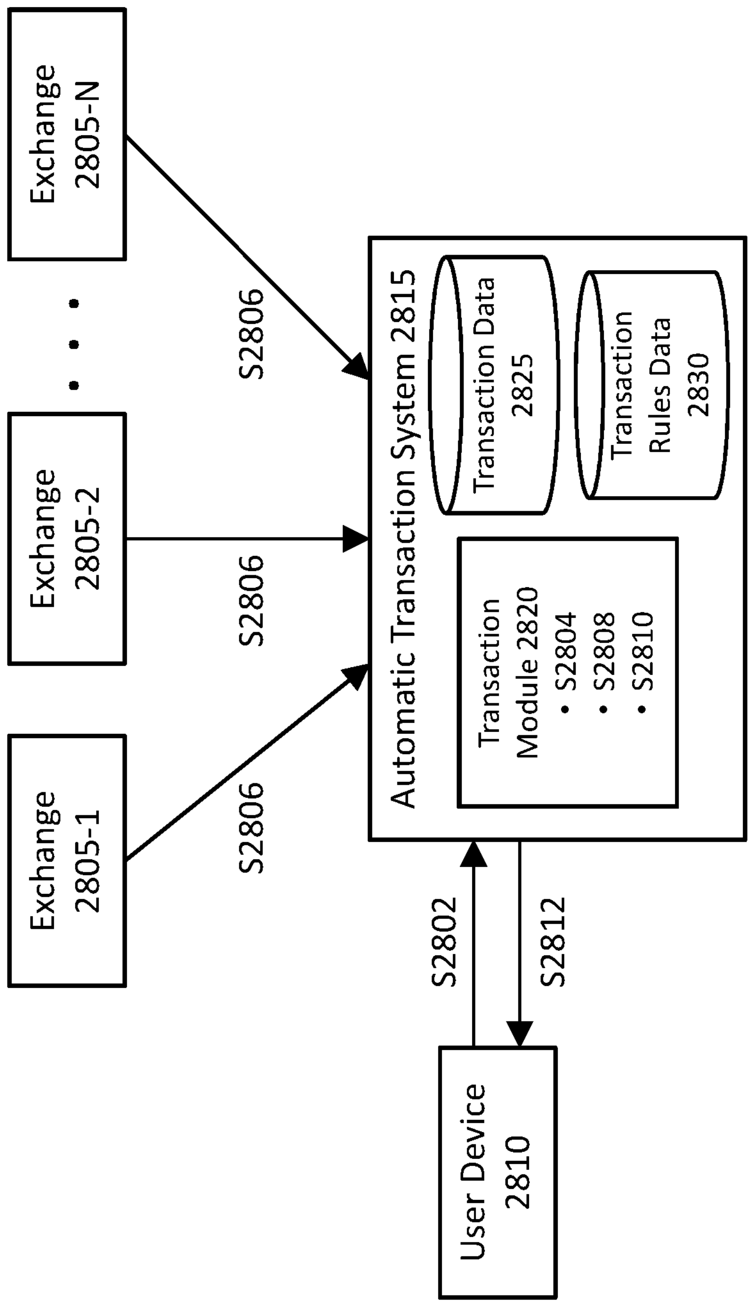
FIGS. 45A-B are a schematic diagram and corresponding flow chart showing participants in and processes for automated digital asset transactions in accordance with exemplary embodiments of the present invention.
Figure 45B:
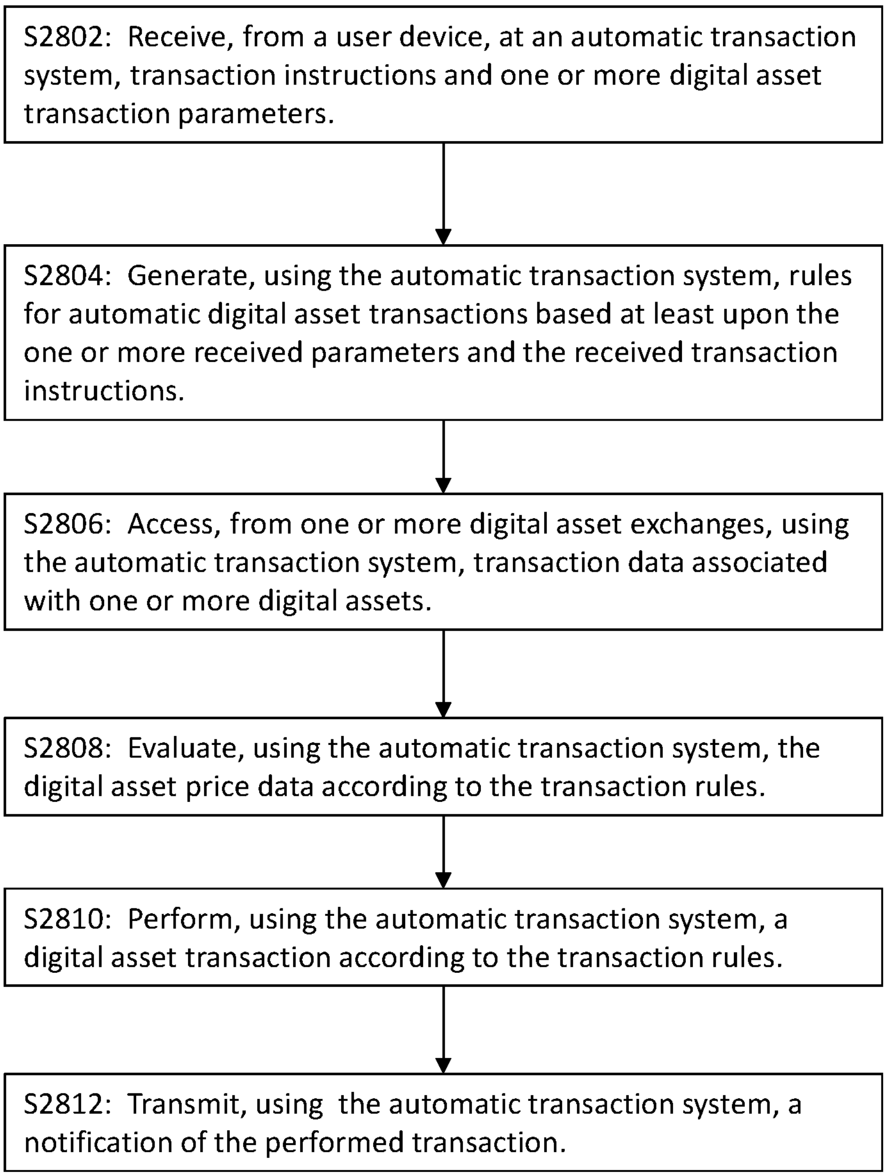

FIGS. 45A-B are a schematic diagram and corresponding flow chart showing an exemplary system and an exemplary process for performing automated digital asset transactions. Automated transactions may be provided as a feature of a digital wallet application and/or as a stand-alone service. A stand-alone service may require a link to a digital wallet, bank account, credit card, and/or a deposit of funds with the stand-alone service.

FIG. 45A is a schematic diagram of an exemplary automatic digital asset transaction system and the entities involved in such a system. A user can arrange, from a user device 2810, for automated digital asset transactions. A user device 2810 can include a phone, smart phone, PDA, computer, and/or tablet computer, to name a few. A user may use a plurality of user devices 2810 in connection with the automatic digital asset transaction system of embodiments of the present invention.

An automatic digital asset transaction system 2815 can receive data, such as digital asset transaction data and/or digital asset price data, from one or more exchange 2805 (e.g., 2805-1, 2805-2, . . . , 2805-N), which may be digital asset exchanges. In embodiments, data may be received from one or more exchange agents.

Still referring to FIG. 45A, an automatic digital asset transaction system 2815 can comprise one or more computers or computer systems having at least one or more processors, computer-readable memory comprising one or more databases, one or more communications portals for communicating with one or more other computers or computer systems, and/or one or more input devices. An automatic digital asset transaction system 2815 can include a transaction module 2820, price data 2825, and/or transaction rules data 2830, to name a few. Price data 2585 can include prices for one or more digital assets from one or more digital asset exchanges 2805, which may also comprise exchange rate data. Price data 2825 can span any time period. In embodiments, one or more databases may store the data described herein. In embodiments, one or more software modules may perform the functions attributed herein to a transaction module 2820.

A transaction module 2820 may be software that can receive transaction instructions and transaction parameters, generate transaction rules, access data from one or more exchanges 2805, evaluate digital asset price data according to transaction rules, perform automated transactions (e.g., when pre-defined conditions are met), request authority (e.g., from a user) to proceed with an automatically generated transaction, and/or provide notifications of completed transactions, to name a few. In embodiments, one or more steps in a digital asset notification process may be decentralized, e.g., performed by a user device.

FIG. 45B shows steps for performing automated digital asset transactions in accordance with exemplary embodiments of the present invention. In a step S2802, an automatic transaction system 2815 may receive, from a user device 2810, transaction instructions and one or more transaction parameters. In embodiments, transaction parameters may include a digital asset strike price, e.g., to sell a specified amount of digital assets when the price equals, rises above, or falls below a predefined threshold, wherein the amount of digital assets to transact may be specified in a different denomination, such as USD. Transaction parameters thus may indicate digital asset denominations, digital asset amounts (expressed in any denomination, including fiat currency denominations), digital asset exchanges, time periods, rates of change, and/or absolute amounts of change, to name a few. Transaction instructions may indicate actions regarding digital assets, such as whether to buy, sell, hold, and/or convert to a different denomination of digital asset or fiat currency, to name a few.

In a step S2804, the automatic transaction system 2815 may generate one or more rules for automatic digital asset transactions based at least upon the one or more received transaction parameters and the received transaction instructions. The generated rules may be logical rules comprising one or more conditions and one or more actions to perform when the conditions are met or not met. Such logical rules may be implemented by computer code running on one or more computers associated with the automatic transaction system 2815. The generation of transaction rules may be performed by a transaction module 2820.

In a step S2806, the automatic transaction system 2815 may access, from one or more digital asset exchanges 2805, transaction data, which may include price data, associated with one or more digital assets. The automatic transaction system 2815 may store transaction data 2825 in one or more databases. The transaction data may be fetched or otherwise received, e.g., using APIs or data feeds from one or more exchanges 2805 or exchange agents. Transaction data may be normalized or otherwise formatted to be compatible with an automatic transaction system 2815, which formatting may be performed by a transaction module 2820.

In a step S2808, the automatic transaction system 2815 may evaluate the digital asset transaction data according to the generated transaction rules. In embodiments, evaluation of the digital asset transaction data may involve testing the transaction data against one or more logical conditions embodied in the transaction rules. For example, the transaction data may be evaluated to determine whether the digital asset price has reached or crossed a threshold value or whether a rate of change in the price has met or crossed a threshold value. A transaction module 2820 may perform the evaluation of the transaction data.

In a step S2810, the automatic transaction system 2815 may perform one or more digital asset transactions according to the transaction rules. Transactions may be performed, initiated, and/or verified by a transaction module 2820. The digital asset transactions may only be performed when one or more conditions are satisfied. In embodiments, an alert of a potential transaction and/or a request for authorization may be sent to a user before automatically performing a transaction. Receipt of a user's authorization by the automatic transaction system 2815 may be required before the system will perform a transaction. Authorization may be provided through telephone (e.g., dialing a number and entering certain digits), SMS (e.g., replying to a text message, sending a code, and/or sending another message authorizing a transaction), email (e.g., replying to an email and/or sending a certain message in the body and/or subject line), website (e.g., clicking an "Authorize" button), and/or within a software application, such as a digital wallet, to name a few. In embodiments, a request for authorization may be sent, and the transaction may be performed automatically if no response is received within a predetermined amount of time, settings for which may be set in advance by a user and/or set by default.

In a step S2812, the automatic transaction system 2815 may transmit one or more notifications of the performed transaction to one or more user devices 2810. Notifications may be generated by a transaction module 2820. In embodiments, notifications of incomplete, pending, and/or failed transactions may be transmitted. In embodiments, the automatic transaction system 2815 may provide a portal or other mechanism for a user to monitor and/or receive updates regarding transaction statuses. The automatic transaction system 2815 may provide a log of all transactions and/or automatic transactions performed by the system and/or by a user. In embodiments, the automatic transaction system 2815 may provide a log of all transaction opportunities, including declined transactions (e.g., not authorized by a user).

Digital Asset Automated Arbitrage System

Figure 46A:
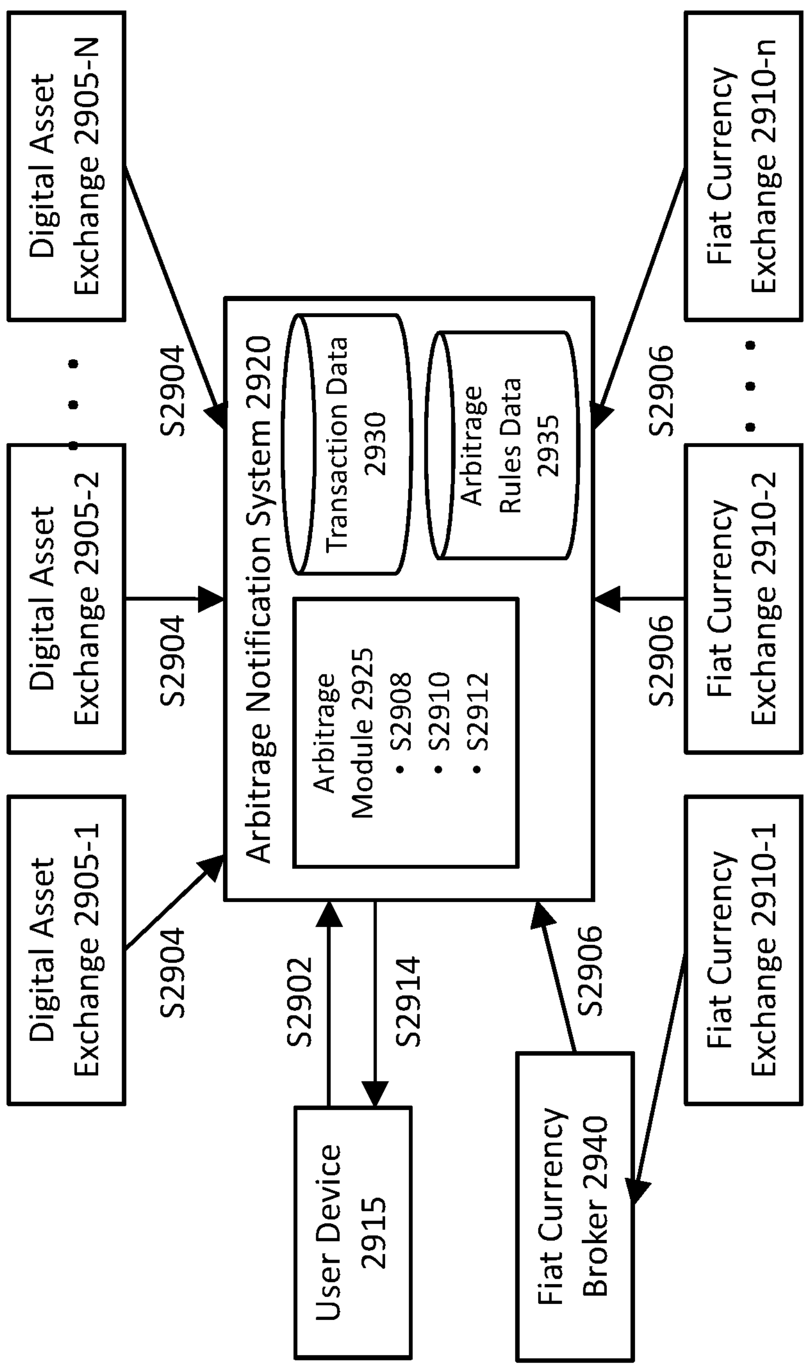
FIGS. 46A-B are a schematic diagram and corresponding flow chart showing participants in and processes for providing digital asset arbitrage opportunity notifications in accordance with exemplary embodiments of the present invention.
Figure 46B:
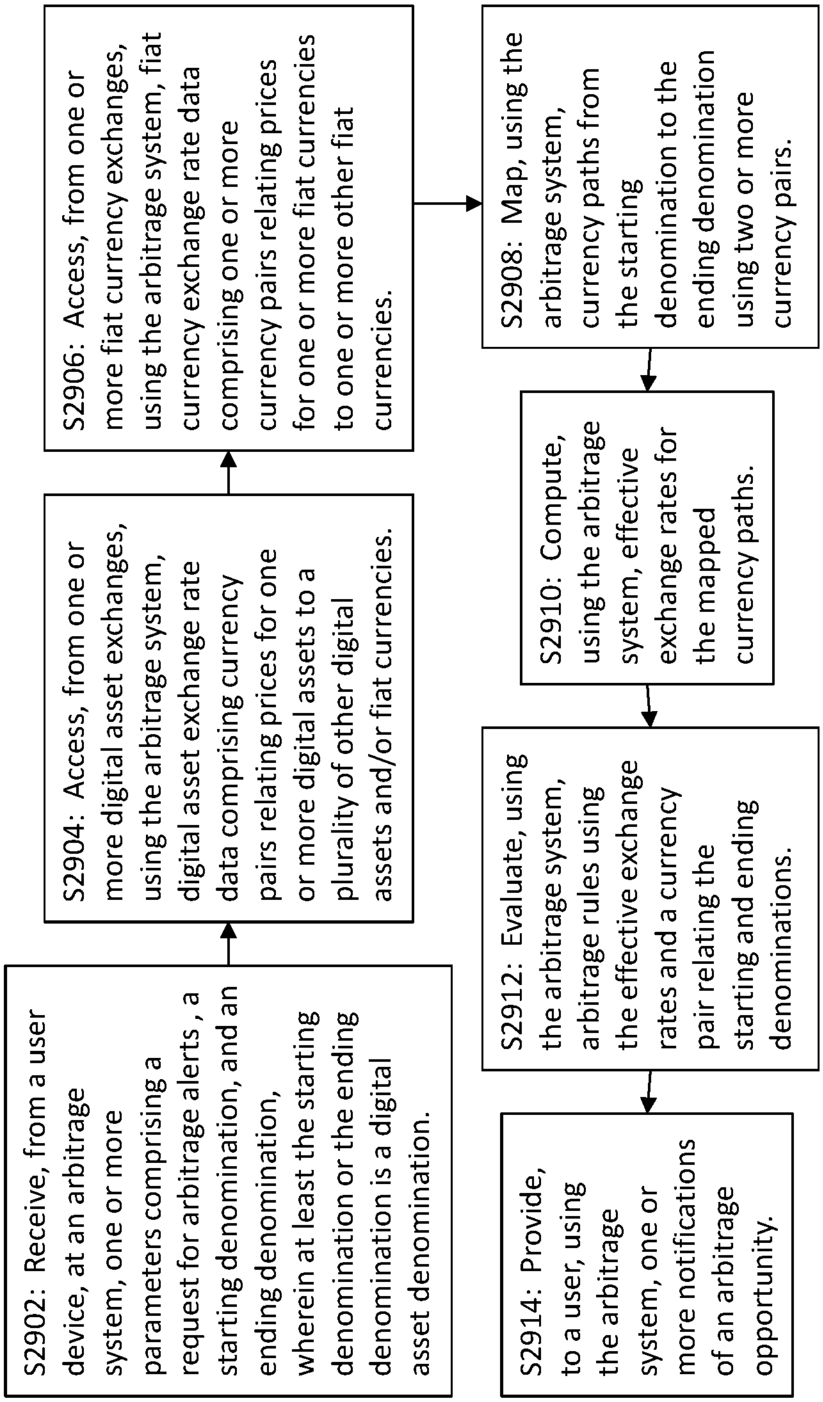

FIGS. 46A-B are a schematic diagram and corresponding flow chart showing an exemplary system and an exemplary process for providing notifications of digital asset arbitrage opportunities. Arbitrage opportunities can arise due to exchange rate differences between different currency pairs. Embodiments of the present invention provide an automated system to map exchange rate transactions involving a plurality of exchanges and at least one digital asset and to compare the corresponding effective exchange rate to an exchange rate for a single currency pair. If the mapped plurality of exchange transactions has a different exchange rate from the rate for the single currency pair, an arbitrage notification system may provide notifications of the corresponding arbitrage opportunity. A transaction may be mapped from a digital asset to a fiat currency with any number of intermediate fiat currency and/or digital asset exchange transactions, from a fiat currency to a digital asset with any number of intermediate fiat currency and/or digital asset exchange transactions, and/or from a fiat currency to a fiat currency with at least one intermediate digital asset exchange and any number of other intermediate exchanges. Accordingly, one or more foreign exchange transactions may be performed, as described herein.

FIG. 46A is a schematic diagram of an exemplary arbitrage notification system and the entities involved in such a system. A user can arrange, from a user device 2915, for arbitrage notifications. A user device 2915 can include a phone, smart phone, PDA, computer, and/or tablet computer, to name a few. A user may use a plurality of user devices 2915 in connection with the arbitrage notification system of embodiments of the present invention.

An arbitrage notification system 2920 can receive data, such as digital asset transaction data, from one or more digital asset exchange 2905 (e.g., 2905-1, 2905-2, . . . , 2905-N). In embodiments, data may be received from one or more digital asset exchange agents. An arbitrage notification system 2920 can also receive data, such as fiat currency price data, from one or more fiat currency exchanges 2910 (e.g., 2910-1, 2910-2, . . . 2910-*n*). In embodiments, fiat currency price data may be received from one or more fiat currency brokers 2940. In embodiments, receiving data may entail fetching data, such as by using an API to access data from one or more exchange.

Still referring to FIGS. 29-1, 29-2, AND 29-3A, an arbitrage notification system 2920 can comprise one or more computers or computer systems having at least one or more processors, computer-readable memory comprising one or more databases, one or more communications portals for communicating with one or more other computers or computer systems, and/or one or more input devices. An arbitrage notification system 2920 can include an arbitrage module 2925, price data 2930, and/or arbitrage rules data 2935, to name a few. Transaction data 2930 can include prices for one or more digital assets, which may come from one or more digital asset exchanges 2905, as well as prices for one or more fiat currencies, which may come from one or more fiat currency exchanges 2910. Transaction data 2930 can also include volume transacted. Transaction data may comprise exchange rate data, such as currency pairs, which relate the exchange rate between two differently denominated currencies or assets. Transaction data 2930 can span any time period. In embodiments, one or more databases may store the data described herein. In embodiments, one or more software modules may perform the functions attributed herein to an arbitrage module 2925.

An arbitrage module 2925 may be software that receives and/or processes requests for arbitrage alerts, generates arbitrage notification rules, stores arbitrage notification rules, executes operations to access data from digital asset and fiat currency exchanges, maps exchange transactions, computes effective exchange rates for mapped transactions, evaluates effective exchange rates and direct exchange rates in accordance with arbitrage notification rules, and/or provides notifications of arbitrage opportunities, to name a few. In embodiments, one or more steps in an arbitrage notification process may be decentralized, e.g., performed by a user device.

FIG. 46B is a flow chart showing steps in an exemplary process for providing arbitrage alerts in exemplary embodiments of the present invention. In a step S2902, an arbitrage notification system 2920 may receive, from a user device 2915, one or more parameters comprising a request for arbitrage alerts, a starting denomination, and/or an ending denomination, where the starting and/or ending denomination is a digital asset denomination. In embodiments, both the starting and ending denominations may be fiat currency denominations. Parameters may identify digital assets, fiat currencies, threshold amounts (e.g., specifying notifications for arbitrage opportunities with 2% returns or higher), alert types, notification frequencies, and/or notification recipients, to name a few. The arbitrage notification system 2920 may generate and/or store arbitrage notification rules based upon the received parameters. Arbitrage notification rules may comprise notification criteria. Arbitrage notification rules may be logical rules comprising conditions (e.g., to test for the presence of arbitrage opportunities satisfying the received parameters) and/or corresponding notification actions. In embodiments, of the present invention, arbitrage opportunities may relate to a futures market and/or futures prices including at least one digital asset.

In a step S2904, the arbitrage notification system 2920 may access, from one or more digital asset exchanges 2905, digital asset exchange rate data, which may comprise currency pairs relating prices for one or more digital assets to a plurality of other digital assets and/or fiat currencies. In embodiments, other digital asset data may be accessed. For example, a USD/BTC currency pair would provide a ratio of U.S. dollars to bitcoin, which would comprise an exchange rate. Such a currency pair may be used to compute transactions from USD to bitcoin and from bitcoin to USD (using the reciprocal of the exchange rate). Accessing digital asset exchange rate data may entail using one or more APIs for one or more digital asset exchanges 2905 to fetch the price data and/or receiving a data stream of price data. In embodiments, digital asset exchange rate data may be obtained from one or more broker or exchange agent.

In a step S2906, the arbitrage notification system 2920 may access, from one or more fiat currency exchanges 2910, fiat currency exchange rate data, which may comprise one or more currency pairs relating prices for one or more fiat currencies to one or more other fiat currencies. An example of a fiat currency pair is EUR/USD, which relates Euros to U.S. dollars. Fiat currency exchange rate data may be accessed using one or more APIs for one or more fiat currency exchanges and/or by reading a data feed from one or more exchanges, to name a few. In embodiments, a fiat currency exchange 2910 may be an exchange in the foreign exchange market. In embodiments, exchange rate data may be obtained from one or more exchange agent or broker, such as a fiat currency broker 2940.

In a step S2908, the arbitrage notification system 2920 may map currency paths from a starting denomination to an ending denomination using at least two currency pairs or at least three denominations, since two currency pairs may share a common base. In embodiments, the arbitrage notification system 2920 may calculate arbitrage opportunities from the starting denomination to the ending denomination and/or from the ending denomination to the starting denomination. For the path from the starting to the ending denomination, the first currency pair in the currency path should include the starting denomination, while the last pair in the currency path should include the ending denomination. A currency path can include any number of intermediate currency pairs, which may or may not be cross currency pairs. For example, a currency path from USD to BTC may involve 1/(EUR/USD)*(EUR/JPY)*(JPY/BTC), where EUR/JPY is an intermediate cross currency pair. In embodiments, no starting or ending denominations may be received in a step S2902, and the arbitrage notification system 2920 may determine one or more currency paths relating a variety of denominations to detect the presence of any arbitrage opportunity among denominations supported by the arbitrage notification system 2920. In embodiments, only a starting or an ending denomination may be received, in which case the arbitrage notification system 2920 may determine a plurality of currency paths that start and/or end with the received denomination.

In a step S2910, the arbitrage notification system 2920 may compute effective exchange rates for the mapped currency paths. An effective exchange rate may relate the prices of two endpoints of a currency path. The effective exchange rate may be computed by multiplying the exchange rate for each currency pair in the currency path.

In a step S2912, the arbitrage notification system 2920 may evaluate (e.g., by processing on a computer system) arbitrage notification rules to determine the presence of an arbitrage opportunity meeting notification criteria and to determine actions to perform (e.g., notifications to transmit) based thereupon. In embodiments, evaluating arbitrage notification rules may entail, in part, comparing the computed effective exchange rates for one or more currency paths to a direct exchange rate associated with a currency pair relating the starting and ending denominations. Where the effective exchange rate differs from the direct exchange rate, as related by the direct starting/ending currency pair, an arbitrage opportunity may exist. An arbitrage opportunity can exist where the effective exchange rate is either greater than or less than the direct exchange rate.

The arbitrage notification system 2920 can formulate one or more transactions to take advantage of the arbitrage opportunity. The transactions required and the order in which they should be performed will depend, at least in part, on whether the effective exchange rate is greater than or less than the direct exchange rate. In embodiments, transactions may be structured to convert from one denomination to a different denomination. In other embodiments, circular transactions may be structured to perform a plurality of currency conversions and end with the original currency, ideally of a greater amount than transacted at the start (e.g., performing transactions according to a currency path from a starting to an ending denomination, followed by a direct transaction from the ending denomination to the starting denomination). Notifications may be provided to alert one or more users of the existence and/or details of such formulated transactions.

Accordingly, in a step S2914, the arbitrage notification system 2920 may provide to one or more user devices 2915 one or more notifications of one or more arbitrage opportunities. Notifications may indicate the existence of an arbitrage opportunity. Notifications may indicate a projected return on a series of transactions (e.g., 5% increase in bitcoin holdings, 23 BTC increase, 800 USD increase, to name a few). Notifications may also indicate a currency path and/or a plurality of formulated transactions. Notifications can be provided to a plurality of devices associated with a user and via a plurality of media (e.g., SMS, email, automated telephone call, push notification, to name a few).

Figure 47A:
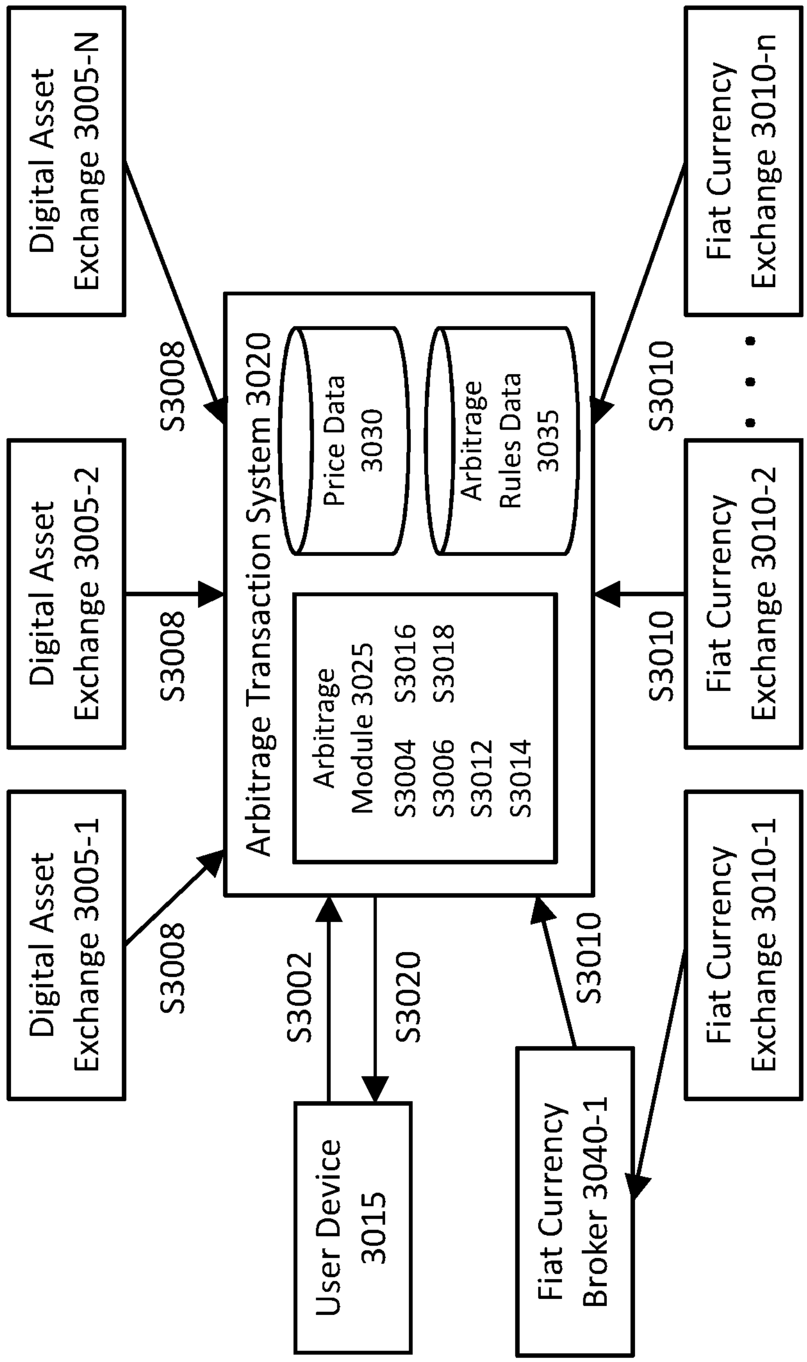
FIGS. 47A-B are a schematic diagram and corresponding flow chart showing participants in and processes for performing automated digital asset arbitrage transactions in accordance with exemplary embodiments of the present invention.
Figure 47B:
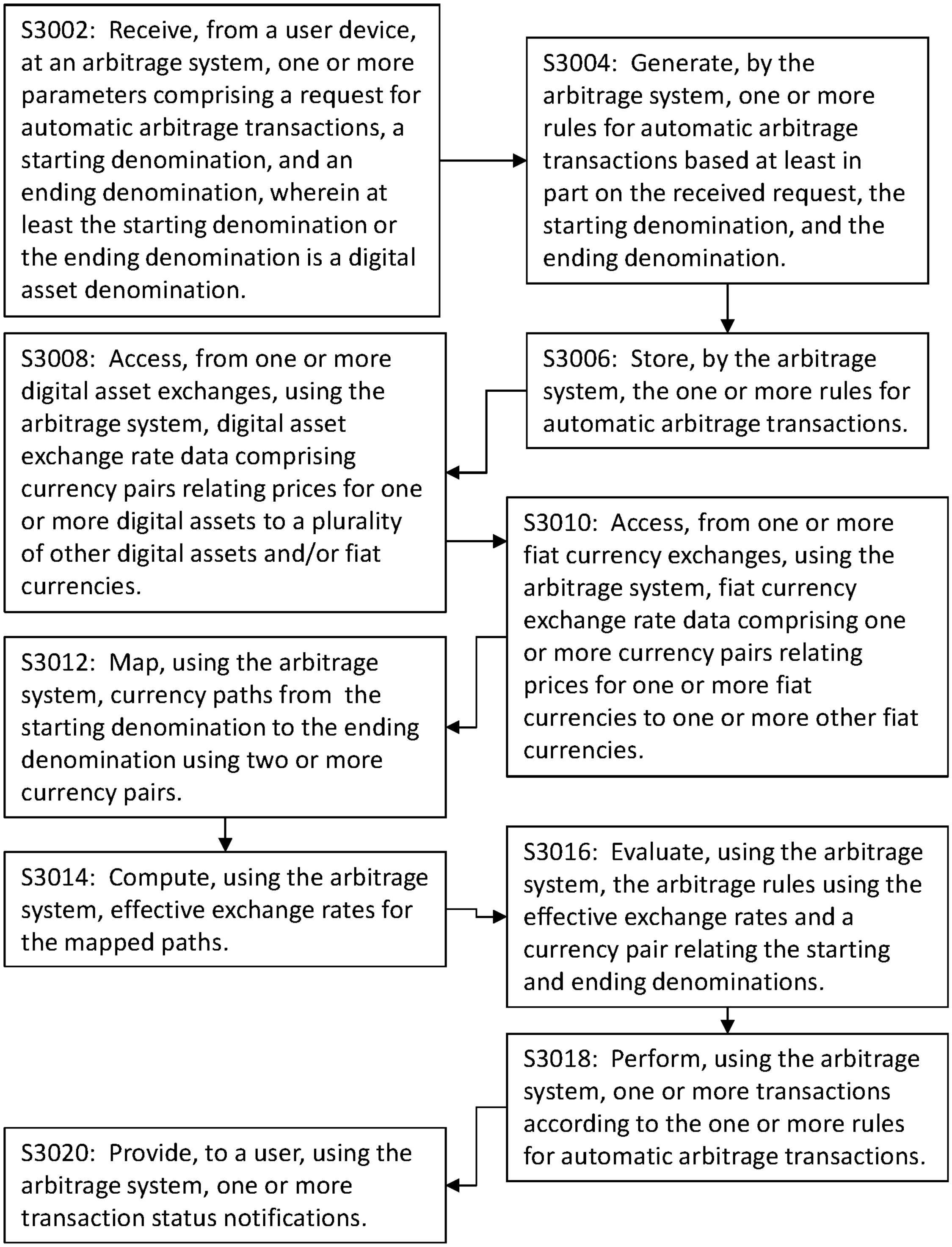

FIGS. 47A-B are a schematic diagram and corresponding flow chart showing an exemplary system and an exemplary process for performing digital foreign exchange systems opportunities in accordance with embodiments of the present invention. The exemplary system and processes described with respect to FIGS. 47A-B are similar to the exemplary arbitrage notification system discussed with respect to FIGS. 46A-B, with the added capability to execute formulated transactions to take advantage of determined arbitrage opportunities. Transactions may be performed to exchange digital assets to fiat currencies, digital assets to other digital assets, fiat currencies to digital assets, and/or fiat currencies to other fiat currencies involving intermediate digital asset exchange transactions. In embodiments, circular transactions may be performed to convert a starting digital asset to one or more intermediate denominations and then back to the starting digital asset. Circular transactions may also be performed to convert a starting fiat currency to one or more intermediate denominations involving at least one digital asset and then back to the starting fiat currency.

FIG. 47A is a schematic diagram of an exemplary arbitrage transaction system and the entities involved in such a system. A user can arrange, from a user device 3015, for automated arbitrage transactions. A user device 3015 can include a phone, smart phone, PDA, computer, and/or tablet computer, to name a few. A user may use a plurality of user devices 3015 in connection with the arbitrage transaction system of embodiments of the present invention (e.g., to set transaction settings, to confirm or authorize transactions, and/or to receive transaction status notifications).

An arbitrage transaction system 3020 can receive data, such as digital asset price data, from one or more digital asset exchange 3005 (e.g., 3005-1, 3005-2, . . . , 3005-N). In embodiments, data may be received from one or more digital asset exchange agents or brokers. An arbitrage transaction system 3020 can also receive data, such as fiat currency price data, from one or more fiat currency exchanges 3010 (e.g., 3010-1, 3010-2, . . . 3010-*n*). In embodiments, fiat currency price data may be received from one or more fiat currency brokers 3040. In embodiments, receiving data may entail fetching data, such as by using an API to access data from one or more exchange.

Still referring to FIG. 47A, an arbitrage transaction system 3020 can comprise one or more computers or computer systems having at least one or more processors, computer-readable memory comprising one or more databases, one or more communications portals for communicating with one or more other computers or computer systems, and/or one or more input devices. An arbitrage transaction system 3020 can include an arbitrage module 3025, price data 3030, and/or arbitrage rules data 3035, to name a few. Price data 3030 can include prices for one or more digital assets, which may come from one or more digital asset exchanges 3005, as well as prices for one or more fiat currencies, which may come from one or more fiat currency exchanges 3010. Price data 3030 may comprise exchange rate data, such as currency pairs, which relate the exchange rate between two differently denominated currencies or assets. Price data 3030 can span any time period. Price data 3030 may be converted into any form necessary for processing or normalizing against other price data (e.g., price data may be stored in 15-second increments). In embodiments, one or more databases may store the data described herein. In embodiments, one or more software modules may perform the functions attributed herein to an arbitrage module 3025.

An arbitrage module 3025 may be software that receives and/or processes requests for automated arbitrage transactions, generates arbitrage transaction rules, stores arbitrage transaction rules, executes operations to access data from digital asset and fiat currency exchanges, maps exchange transactions, computes effective exchange rates for mapped transactions, evaluates effective exchange rates and direct exchange rates according to arbitrage transaction rules, requests and/or processes transaction confirmation, performs transactions, and/or provides notifications of arbitrage transaction statuses, to name a few. In embodiments, one or more steps in an arbitrage notification process may be decentralized, e.g., performed by a user device.

FIG. 47B is a flow chart showing steps in an exemplary process for providing arbitrage alerts in exemplary embodiments of the present invention. In a step S3002, an arbitrage transaction system 3020 may receive, from a user device 3015, one or more parameters comprising a request for automated arbitrage transactions, a starting denomination, and an ending denomination. In embodiments, the starting denomination or the ending denomination may be a digital asset denomination, or the starting and ending denomination may be a fiat currency denomination and at least one intermediate digital transaction will be performed. In embodiments, the system may not receive a starting or an ending denomination or may not receive either. In such cases, the system may identify all possible transactions using whatever denomination is received or using any denominations supported by the arbitrage transaction system 3020. The parameters may be transaction criteria to determine when to perform transactions and/or parameters to govern how to perform transactions. Parameters may identify digital assets, fiat currencies, threshold amounts (e.g., specifying notifications for arbitrage opportunities with 2% returns or higher), amount of assets or currencies approved for automatic trading, transaction authorization settings, digital wallet information, transaction status alert types, notification frequencies, and/or notification recipients, to name a few.

In a step S3004, the arbitrage transaction system 3020 may generate one or more rules for automatic arbitrage transactions based at least in part on the received request for automatic arbitrage transactions and the starting and ending denominations, as may be determined by the system if not specified by a user.

In a step S3006, the arbitrage transaction system 3020 may store one or more rules for automatic arbitrage transactions. The rules may be stored in a database (e.g., for retrieval and use by arbitrage opportunity evaluation software or devices programmed to perform such operations) or integrated directly into a program for testing and evaluating exchange rate data, to name a few.

In a step S3008, the arbitrage transaction system 3020 may access, from one or more digital asset exchanges 3005, digital asset exchange rate data, which may comprise currency pairs relating prices for one or more digital assets to a plurality of other digital assets and/or fiat currencies. Accessing digital asset exchange rate data may entail using one or more APIs for one or more digital asset exchanges 3005 to fetch the price data and/or receiving a data stream of price data. In embodiments, digital asset exchange rate data may be obtained from one or more broker or exchange agent.

In a step S3010, the arbitrage transaction system 3020 may access, from one or more fiat currency exchanges 3010, fiat currency exchange rate data, which may comprise one or more currency pairs relating prices for one or more fiat currencies to one or more other fiat currencies. Fiat currency exchange rate data may be accessed using one or more APIs for one or more fiat currency exchanges and/or by reading a data feed from one or more exchanges, to name a few. In embodiments, a fiat currency exchange 3010 may be an exchange in the foreign exchange market. In embodiments, exchange rate data may be obtained from one or more exchange agent or broker, such as a fiat currency broker 3040.

In a step S3012, the arbitrage transaction system 3020 may map currency paths from a starting denomination to an ending denomination using at least two currency pairs or at least three denominations, since two currency pairs may share a common base. The mapping of currency paths is described herein with respect to step S2908.

In a step S3014, the arbitrage transaction system 3020 may compute effective exchange rates for the mapped currency paths. An effective exchange rate may relate the prices of two endpoints of a currency path. The effective exchange rate may be computed by multiplying the exchange rate for each currency pair in the currency path.

In a step S3016, the arbitrage transaction system 3020 may evaluate (e.g., by processing on a computer system) arbitrage transaction rules to determine the presence of an arbitrage opportunity meeting transaction criteria and to determine actions to perform (e.g., seeking authorization to perform a transaction and/or performing a transaction, to name a few) based thereupon. In embodiments, evaluating arbitrage transaction rules may entail, in part, comparing the computed effective exchange rates for one or more currency paths to a direct exchange rate associated with a currency pair relating the starting and ending denominations. Where the effective exchange rate differs from the direct exchange rate, as related by the direct starting/ending currency pair, an arbitrage opportunity may exist, and transactions may be formulated accordingly. Transactions may be structured to convert from one denomination to a different denomination (e.g., following one or more mapped currency paths). In other embodiments, circular transactions may be structured to perform a plurality of currency conversions and end with the original currency, ideally of a greater amount than transacted at the start (e.g., performing transactions according to a currency path from a starting to an ending denomination, followed by a direct transaction from the ending denomination to the starting denomination).

In embodiments, requests for authorization to proceed with a transaction may be sent to a user. In embodiments, if a response is not received from a user within a set period of time, the transaction may proceed.

In a step S3018, the arbitrage transaction system 3020 may perform one or more transactions according to the one or more rules for automatic arbitrage transactions. In embodiments, the performed transactions may follow the mapped currency paths.

In a step S3020, the arbitrage transaction system 3020 may provide one or more transaction status notifications. Transaction status notifications may indicate that one or more transactions were executed automatically, and/or the details of the transactions. Transaction status notifications may also indicate failed and/or pending transactions.

Digital Asset Foreign Exchange System

As previously described with respect to FIGS. 46A-B and 47A-B, foreign exchange transactions may be performed using one or more digital asset exchanges. In embodiments, a digital asset exchange may comprise a foreign exchange module configured to handle foreign exchange transactions. In embodiments, a separate foreign exchange system may interact with one or more digital asset exchanges to perform foreign exchange transactions.

Figure 48A:
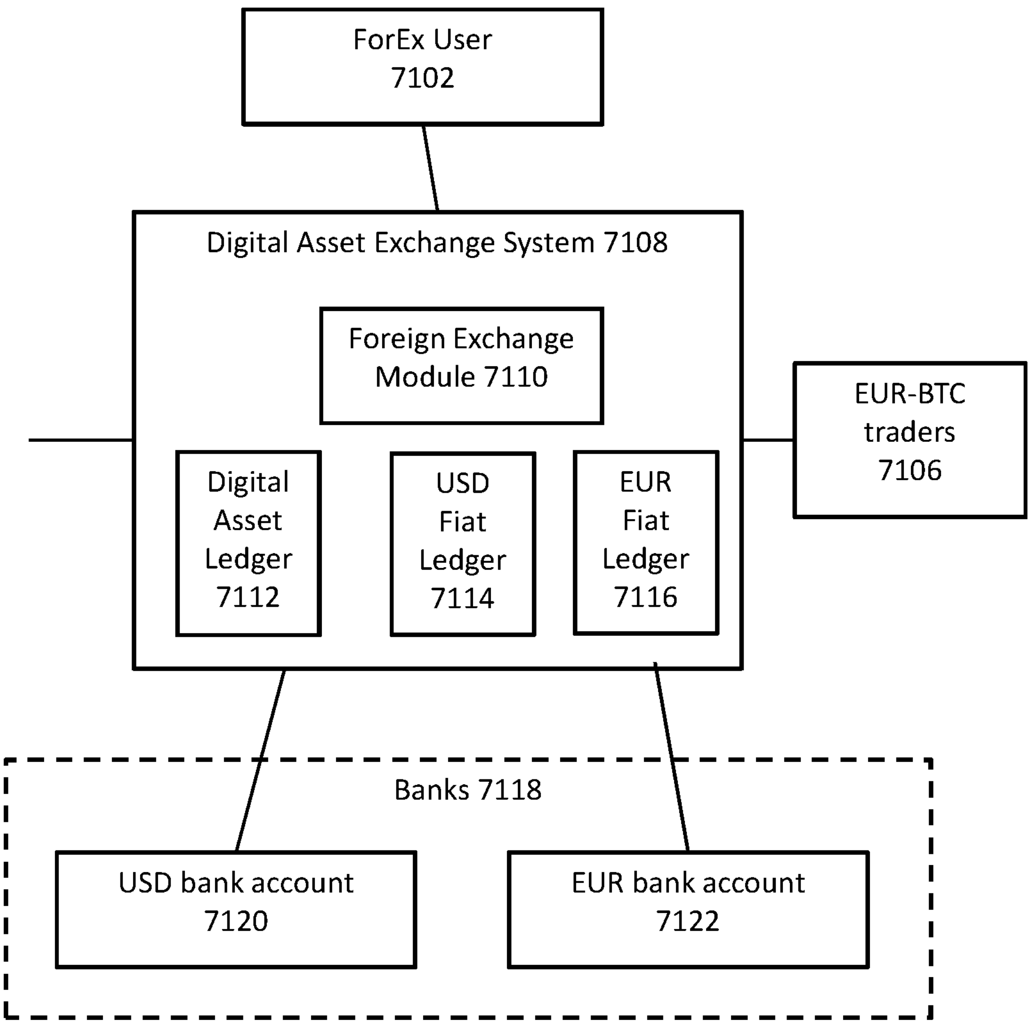
FIGS. 48A-C are schematic diagrams of foreign exchange systems in accordance with exemplary embodiments of the present invention.
Figure 48B:
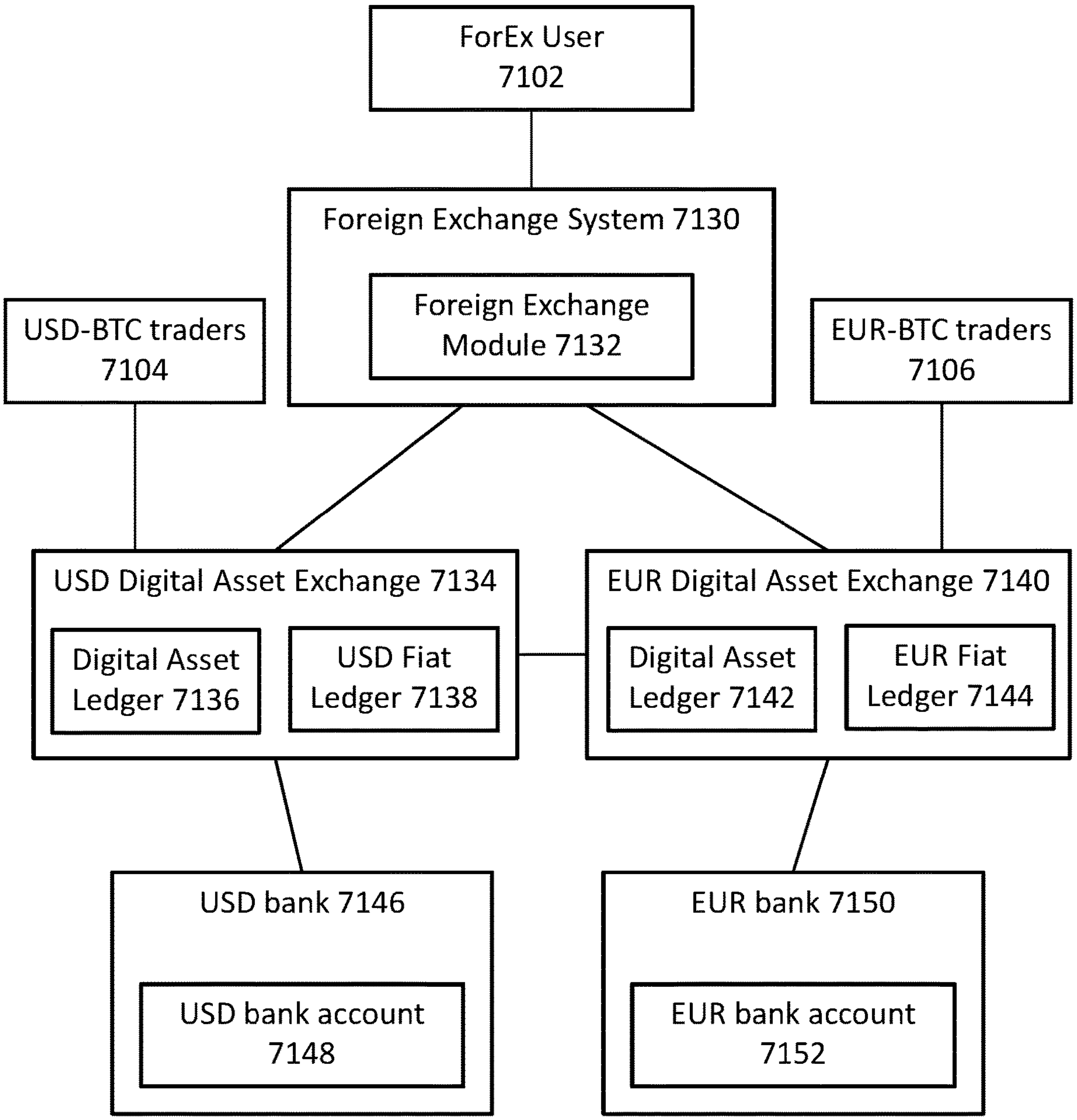
Figure 48C:
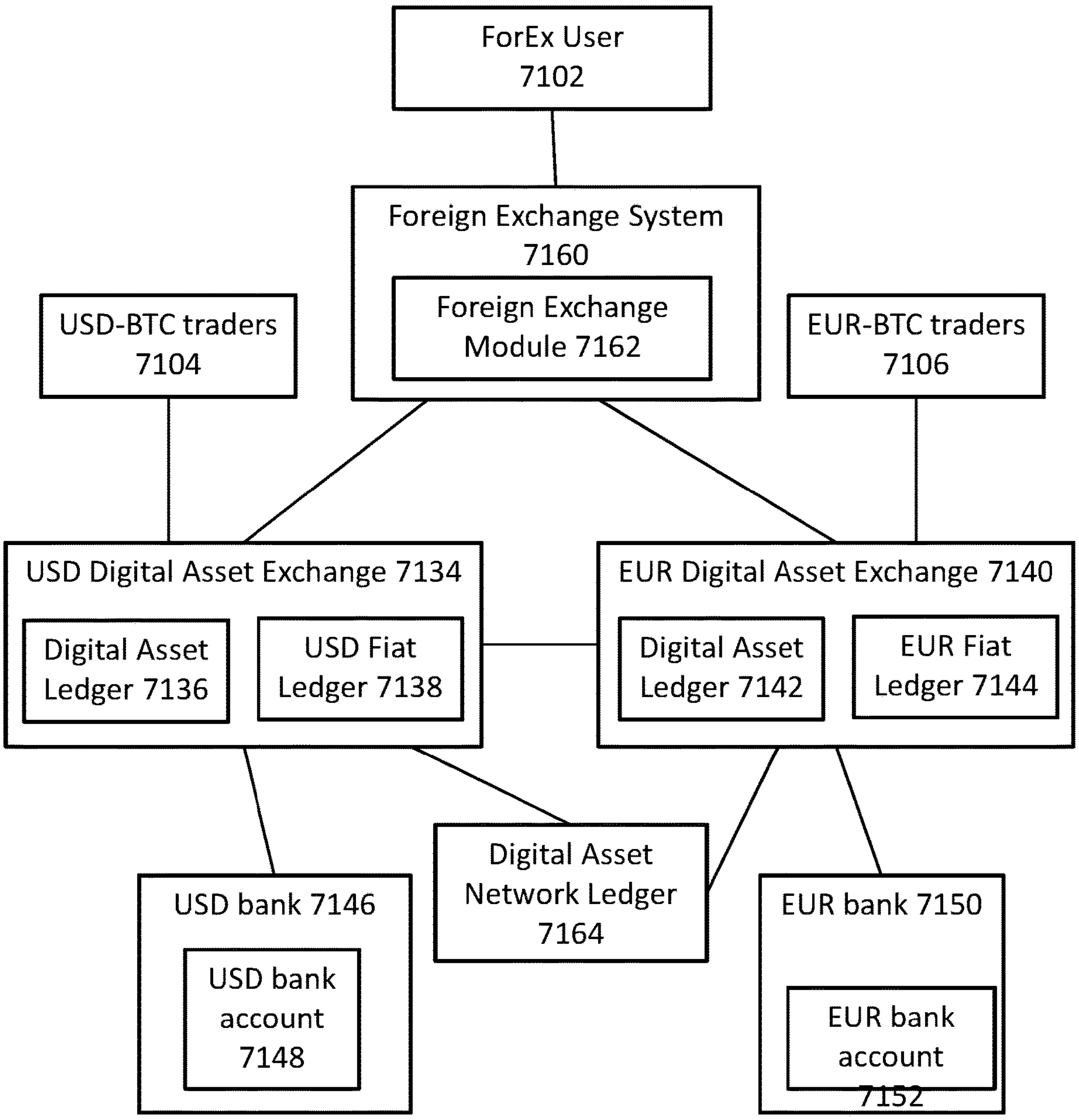

FIGS. 48A-C are schematic diagrams of foreign exchange systems in accordance with exemplary embodiments of the present invention.

FIG. 48A shows exemplary participants in an embodiment of a digital asset-based foreign exchange system. A digital asset exchange computer system 7108 can include a foreign exchange module 7110, which may be stored in non-transitory computer-readable memory operatively connected to the computer system and which may be configured to run on one or more processors of the computer system. The foreign exchange module 7110 can process foreign exchange transactions. The digital asset exchange computer system 7108 can include a digital asset electronic ledger 7112, a first fiat currency electronic ledger 7114, and a second fiat currency electronic ledger 7116. In embodiments, the exchange computer system 7108 may be operatively connected to one or more banks 7118 comprising at least a first fiat currency bank account 7120, denominated in the first fiat currency, and a second fiat currency bank account 7122, denominated in the second fiat currency. In embodiments, account 7120 may be associated with a first bank, and account 7122 may be associated with a second bank. In embodiments, they may be associated with the same bank. In embodiments, the foreign exchange system may handle a plurality of fiat currencies. The system may be connected to a bank account for each fiat currency and may have a fiat currency ledger for each currency. In embodiments, the foreign exchange system may handle a plurality of digital asset types, and the system may have a respective digital asset ledger for each digital asset type.

FIG. 48B shows exemplary participants in another embodiment of a foreign exchange system. A foreign exchange system 7130 may be independent of one or more digital asset exchanges and/or fiat currency exchanges but may be operatively connected to them. For example, it may be operatively connected to a first digital asset exchange 7134 configured to exchange a first digital asset with a first fiat currency. The system may also be operatively connected to a second digital assert exchange 7140 configured to exchange the first digital asset with a second fiat currency. In embodiments, a single digital asset exchange may be configured to perform exchange transactions between a digital asset and multiple fiat currencies. Each digital asset exchange may be operatively connected to a bank with one or more bank accounts denominated in the respective fiat currency. In embodiments, the foreign exchange system 7130 may be affiliated with a particular digital asset exchange.

FIG. 48C shows another embodiment of a foreign exchange system. The system is similar to that described in FIG. 48B, but it includes a digital asset network ledger 7164. Exchange transactions at the one or more exchanges may be broadcast to a network ledger, such as the Bitcoin blockchain. The digital asset exchanges may transfer digital assets among each other using the network ledger 7164.

FIGS. 49A-1, 49A-2, and 49B are flow charts of exemplary processes for performing foreign exchange transactions.

Figures 1, 49A:
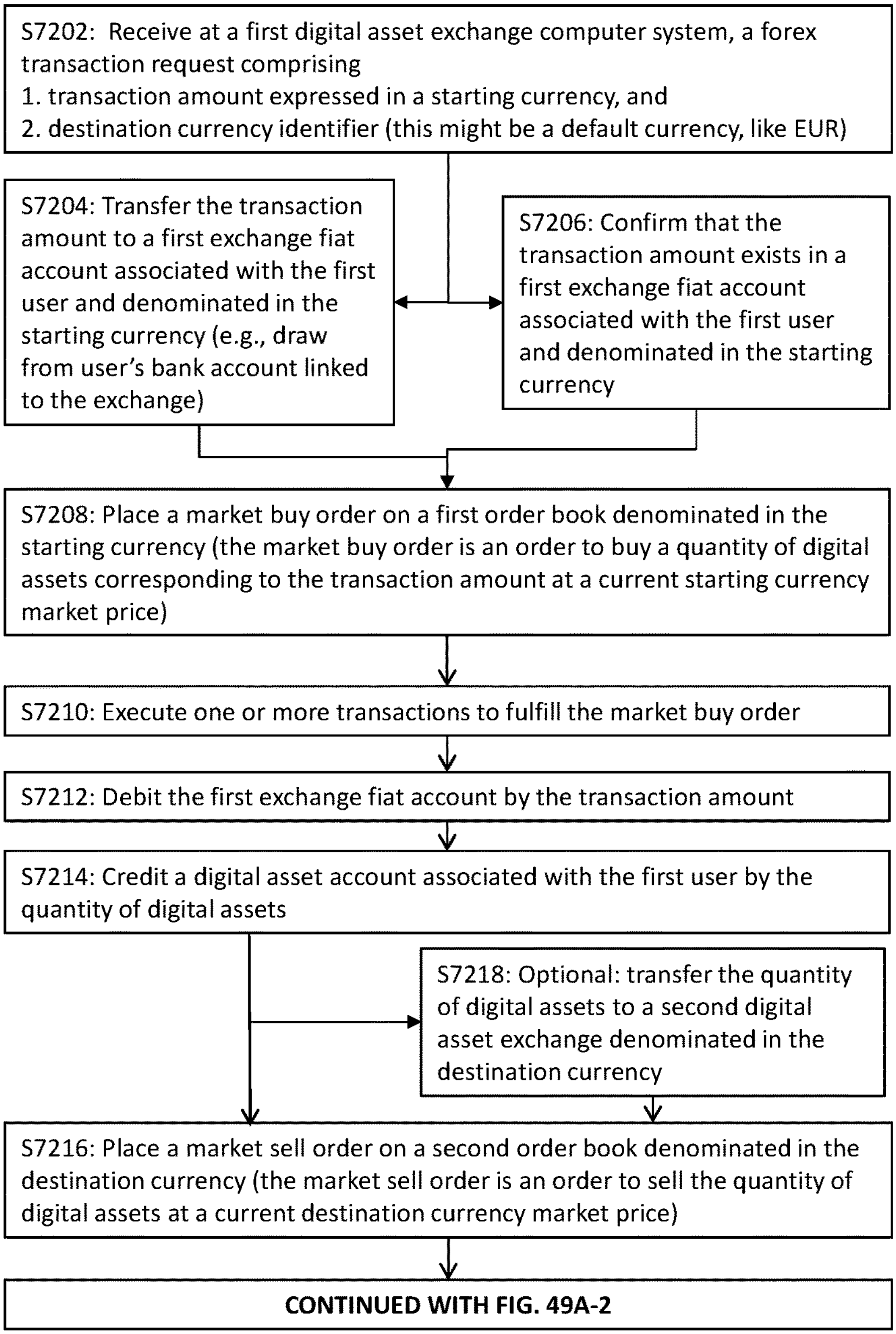
Figures 2, 49A:
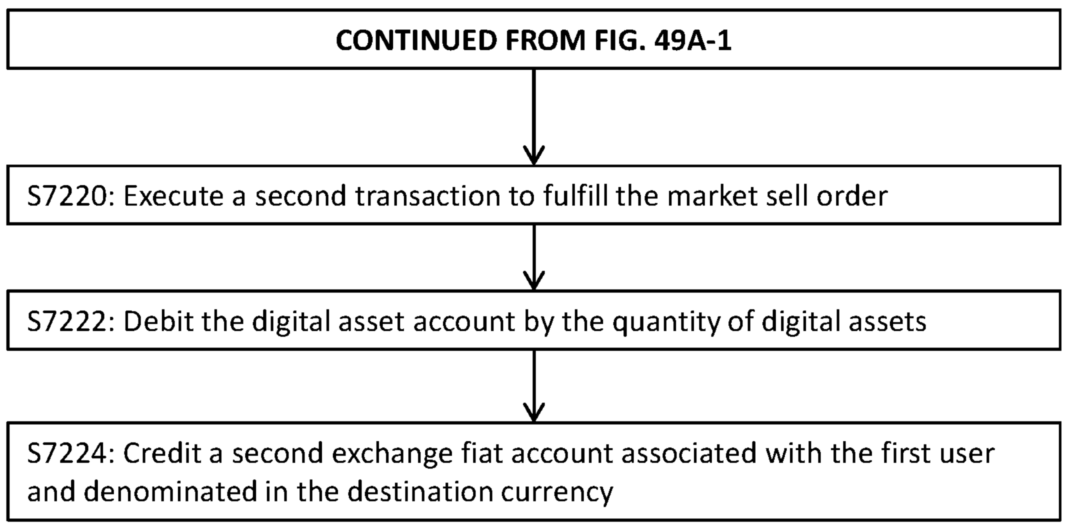

Referring to FIGS. 49A-1 and 49A-2, at a step S7202, a first digital asset exchange computer system may receive a foreign exchange transaction request. The request may comprise a transaction amount expressed in a starting currency, and a destination currency identifier, which may be a default currency identifier, such as EUR.

In a step S7204, the computer system may transfer or have transferred the transaction amount to a first exchange fiat account associated with the first user and denominated in the starting currency (e.g., draw from user's bank account linked to the exchange but unaffiliated with the exchange and deposit in the first exchange fiat account, which may be affiliated with the exchange). As an alternative, in a step S7206, the computer system may confirm that the transaction amount exists in the first exchange fiat account associated with the first user and denominated in the starting currency.

In a step S7208, the computer system may place a market buy order on a first order book denominated in the starting currency. The market buy order may be an order to buy a quantity of digital assets corresponding to the transaction amount at a current starting currency market price.

In a step S7210, the computer system may execute one or more transactions to fulfill the market buy order. In embodiments, the first digital asset exchange may execute these transactions, e.g., upon receiving a transaction request from the computer system.

In a step S7212, the computer system may debit (e.g., using a fiat currency electronic ledger) the first exchange fiat account by the transaction amount.

In a step S7214, the computer system may credit (e.g., using a digital asset electronic ledger) a digital asset account associated with the first user by the quantity of digital assets. Optionally, where the first exchange handles transactions in the starting currency and a second exchange handles transaction in the destination currency, in a step S7218, the computer system may transfer the quantity of digital assets to a second digital asset exchange denominated in the destination currency.

In a step S7216, the computer system may place a market sell order on a second order book denominated in the destination currency. The market sell order may be an order to sell the quantity of digital assets at a current destination currency market price.

In a step S7220, the computer system may execute one or more second transactions to fulfill the market sell order. In embodiments, the second digital asset exchange may execute these transactions, e.g., upon receiving a transaction request from the computer system.

In a step S7222, the computer system may debit the digital asset account by the quantity of digital assets.

In a step S7224, the computer system may credit a second exchange fiat account associated with the first user and denominated in the destination currency.

Figure 49B:
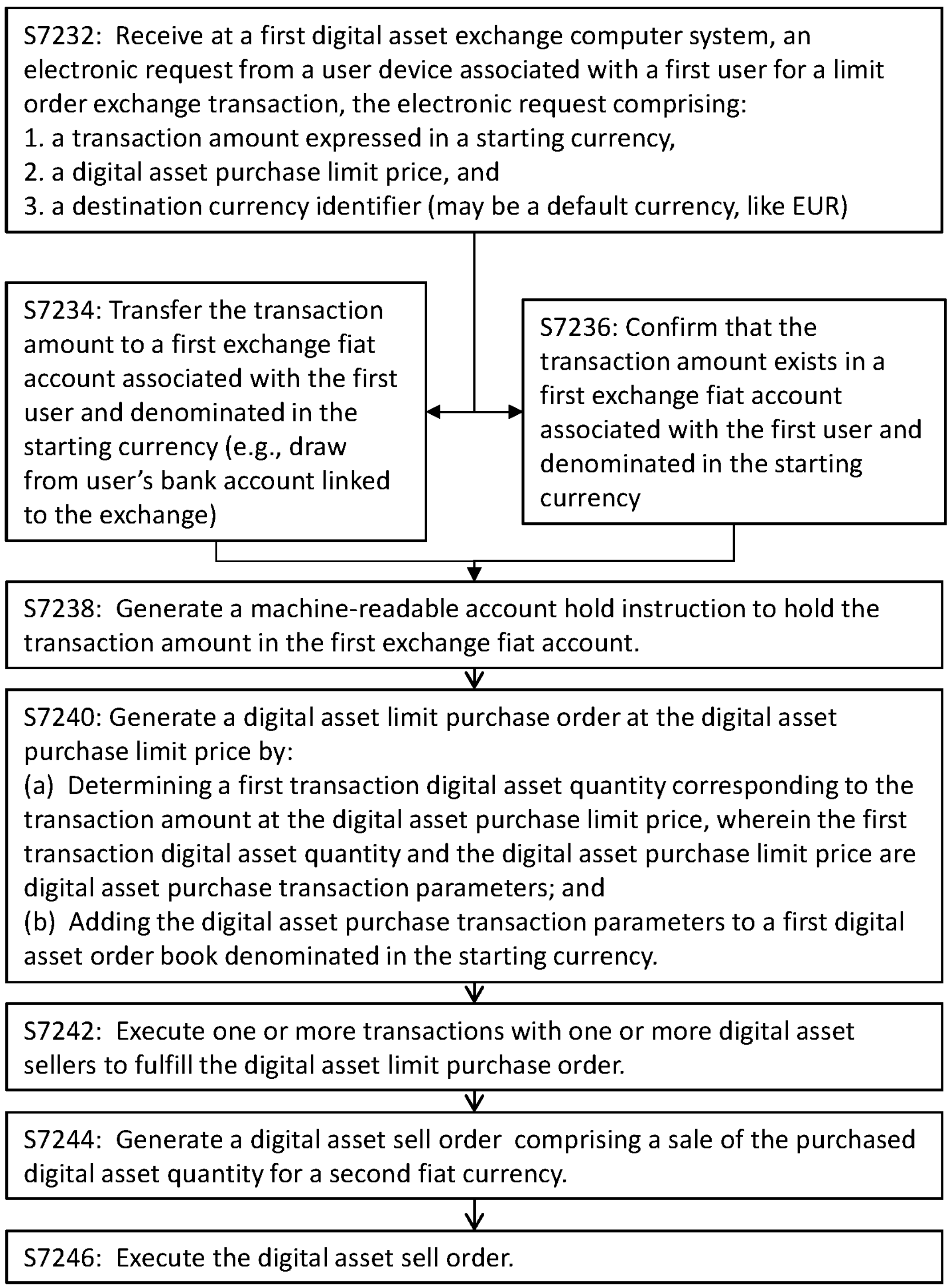

FIG. 49B shows another exemplary process for performing a foreign exchange transaction.

In a step S7232, a first digital asset exchange computer system may receive an electronic request from a user device associated with a first user for a limit order exchange transaction. The electronic request may comprise a transaction amount expressed in a starting currency, a digital asset purchase limit price, and a destination currency.

In a step S7234, the first digital asset exchange computer system may transfer the transaction amount to a first exchange fiat account associated with the first user and denominated in the starting currency. Alternatively, in a step S7236, the first digital asset exchange computer system may confirm that the transaction amount exists in a first exchange fiat account associated with the first user and denominated in the starting currency.

In a step S7238, the first digital asset exchange computer system may generate a machine-readable account hold instruction to hold the transaction amount in the first exchange fiat account.

In a step S7240, the first digital asset exchange computer system may generate a digital asset limit purchase order at the digital asset purchase limit price by determining a first transaction digital asset quantity corresponding to the transaction amount at the digital asset purchase limit price, wherein the first transaction digital asset quantity and the digital asset purchase limit price are digital asset purchase transaction parameters; and adding the digital asset purchase transaction parameters to a first digital asset order book denominated in the starting currency.

In a step S7242, the first digital asset exchange computer system may execute one or more transactions with one or more digital asset sellers to fulfill the digital asset limit purchase order.

In a step S7244, the first digital asset exchange computer system may generate a digital asset sell order comprising a sale of the purchased digital asset quantity for a second fiat currency.

In a step S7246, the first digital asset exchange computer system may execute the digital asset sell order.

In embodiments, a foreign exchange system may perform this process by interacting with one or more digital asset exchanges.

Examples of Financial Products Associated with a Digital Asset Exchange

In embodiments, insurance may be provided for digital assets, e.g., held by a digital asset exchange. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 Bitcoin stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

In embodiments, a digital asset exchange may provide and/or support transactions (e.g., formation, buying, and/or selling) of derivate products. Such exchange traded derivatives can include options such as calls and/or puts. A digital asset exchange may also support digital asset lending, delayed settlements, derivative swaps, futures, and/or forwards, to name a few.

Additional Embodiments

In embodiments, a computer-implemented method may comprise the steps of (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

In embodiments, the computer-implemented method may further comprise the step of, after the determining step (i) above, transmitting, from the trust computer system to the one or more authorized participant user devices, the share price information. In embodiments, the determining step (i) above may further comprise the steps of determining, by the trust computer system, a fifth quantity of digital math-based assets held by the trust that are attributable to shareholders; determining, by the trust computer system, a sixth quantity of digital math-based assets by subtracting from the fifth quantity a seventh quantity of digital math-based assets associated with trust expenses; and dividing the sixth quantity by an eighth quantity of outstanding shares.

In embodiments, the verifying step (vii) above may further comprise the steps of accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In embodiments, the computer-implemented method may further comprise the step of transferring, using the trust computer system, the fourth quantity of digital math-based assets into one or more digital asset accounts associated with a trust custody account.

In embodiments, the computer-implemented method may further comprise the step of transmitting, from the trust computer system to the one or more authorized participant user devices, an electronic receipt acknowledgement indicating the receipt of the fourth quantity of digital math-based assets.

In embodiments, the computer-implemented method may further comprise the step of transmitting or causing to be transmitted, to the one or more authorized participant user devices, an electronic share issuance indication of the issuing of the third quantity of shares.

In embodiments, the share price information may be a quantity of digital math-based assets per share and/or per a basket of shares corresponding to a number of shares associated with one creation unit of shares. In embodiments, the basket of shares may comprise one or more quantities of shares selected from the group consisting of: 5,000 shares, 10,000 shares, 15,000 shares, 25,000 shares, 50,000 shares, and 100,000 shares.

In embodiments, the electronic transfer indication may further comprise an identification of one or more origin digital asset accounts.

In embodiments, the trust computer system may be operated by a trustee of the trust and/or an administrator of the trust on behalf of the trust.

In embodiments, a computer-implemented method may comprise the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

In embodiments, the computer-implemented method may further comprise the step of transmitting, from the trust computer system to the one or more authorized participant user devices, the share price information.

In embodiments, the computer-implemented method may further comprise the steps of obtaining, using the trust computer system, a net asset value per share; determining, using the trust computer system, a digital math-based asset value of the third quantity of shares based upon the net asset value per share; determining, using the trust computer system, transaction fees associated with the electronic request; and determining, using the trust computer system, the fourth quantity of digital math-based assets by subtracting the transaction fees from the digital math-based asset value of the third quantity of shares.

In embodiments, the computer-implemented method may further comprise the step of determining, by the trust computer system, a settlement period associated with the electronic request.

In embodiments, the computer-implemented method may further comprise the step of retrieving or causing to be retrieved, using the trust computer system, one or more private keys associated with the one or more origin digital asset accounts; and accessing the one or more origin digital asset accounts using at least the one or more private keys.

In embodiments, the computer-implemented method may further comprise the steps of issuing, using the trust computer system, retrieval instructions for retrieving a plurality of encrypted private keys corresponding to the one or more origin digital asset accounts; receiving, at the trust computer system, the plurality of encrypted private keys; and obtaining, using the trust computer system, one or more private keys by decrypting the plurality of private keys.

In embodiments, the computer-implemented method may further comprise the steps of issuing, using the trust computer system, retrieval instructions for retrieving a plurality of private key segments corresponding to the one or more origin digital asset accounts; receiving, at the trust computer system, the plurality of private key segments; and obtaining, using the trust computer system, one or more private keys by assembling the plurality of private keys.

In embodiments, the computer-implemented method may further comprise the steps of issuing, using the trust computer system, retrieval instructions for retrieving a plurality of encrypted private key segments corresponding to the one or more origin digital asset accounts; receiving, at the trust computer system, the plurality of encrypted private key segments; and obtaining, using the trust computer system, one or more private keys by decrypting the plurality of private key segments and assembling the segments into one or more private keys.

In embodiments, the computer-implemented method may further comprise the steps of issuing, using the trust computer system, retrieval instructions for retrieving a plurality of encrypted private key segments corresponding to the one or more origin digital asset accounts; receiving, at the trust computer system, the plurality of encrypted private key segments; obtaining, using the trust computer system, one or more first private keys by decrypting the plurality of private key segments and assembling the segments into one or more first private keys; and obtaining, using the trust computer system, at least one second private key corresponding to the one or more origin digital asset accounts. In embodiments, the one or more first private keys and the at least one second private key may be keys for one or more multi-signature digital asset accounts.

In embodiments, the computer-implemented method may further comprise the steps of accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In embodiments, the transaction fees may be denominated in a unit of the digital math-based asset. In embodiments, the share price information may comprise a net asset value per share, an adjusted net asset value per share, and/or a net asset value per a basket of shares corresponding to a number of shares associated with one creation unit of shares.

In embodiments, the basket of shares may comprise one or more quantities of shares selected from the group consisting of: 5,000 shares, 10,000 shares, 15,000 shares, 25,000 shares, 50,000 shares, and 100,000 shares.

In embodiments, the electronic request may comprise a redemption order.

In embodiments, the trust computer system may be operated by a trustee of the trust and/or an administrator of the trust on behalf of the trust.

In embodiments, the one or more origin digital asset accounts may correspond to a trust custody account.

In embodiments, the one or more destination digital asset accounts may correspond to an authorized participant custody account.

In embodiments, a computer-implemented method may comprise the steps of (i) generating, using a computer system comprising one or more computers, one or more digital asset accounts capable of holding one or more digital math-based assets; (ii) obtaining, using the computer system, one or more private keys corresponding to the one or more digital asset accounts; (iii) dividing, using the computer system, each of the one or more private keys into a plurality of private key segments; (iv) encrypting, using the computer system, each of the plurality of private key segments; (v) associating, using the computer system, each of the plurality of private key segments with a respective reference identifier; (vi) creating, using the computer system, one or more cards for each of the encrypted plurality of private key segments wherein each of the one or more cards has fixed thereon one of the encrypted plurality of private key segments along with the respective associated reference identifier; and (vii) tracking, using the computer system, storage of each of the one or more cards in one or more vaults.

In embodiments, the computer-implemented method may further comprise the steps of generating, using the computer system, electronic transfer instructions for an electronic transfer of the quantity of digital math-based assets to the one or more digital asset accounts; and broadcasting, using the computer system, the electronic transfer instructions to a decentralized electronic ledger maintained by a plurality of physically remote computer systems.

In embodiments, the computer system includes at least one isolated computer that is not directly connected to an external data network.

In embodiments, the encryption step (iv) above, may further comprise implementing, using the computer system, a symmetric-key and/or asymmetric-key encryption algorithm.

In embodiments, the one or more cards may be plastic, a paper product, index cards, sheets of paper, metal, and/or laminated.

In embodiments, each of the encrypted plurality of private key segments along with the respective associated reference identifier may be fixed on the one or more cards via printing, etching. In embodiments, each of the encrypted plurality of private key segments may be fixed on the one or more cards via a magnetic encoding and/or scannable code. In embodiments, the scannable code may be a bar code and/or a QR code.

In embodiments, the one or more vaults may be geographically remote from each other. In embodiments, the one or more vaults may include a bank vault and/or a precious metal vault. In embodiments, the one or more vaults may comprise a main set of vaults and one or more sets of backup vaults. In embodiments, the main set of vaults may be located in a geographically proximate area and at least one of the one or more sets of backup vaults are located in a geographically remote area. In embodiments, the geographically proximate area may be a metropolitan area of a first city.

In embodiments, each of the plurality of private key segments corresponding to a first private key may be stored in separate vaults.

In embodiments, the computer-implemented method may further comprise the steps of receiving, at the computer system, a quantity of digital math-based assets; and storing, using the computer system, the quantity of digital math-based assets in the one or more digital asset accounts.

In embodiments, a computer-implemented method may comprise the steps of (i) generating, using a computer system comprising one or more computers, one or more digital asset accounts capable of holding one or more digital math-based assets; (ii) obtaining, using the computer system, a first plurality of private keys corresponding to each of the one or more digital asset accounts; (iii) dividing, using the computer system, a first private key of the first plurality of private keys into a second plurality of first private key segments; (iv) encrypting, using the computer system, each of the second plurality of first private key segments; (v) associating, using the computer system, each of the second plurality of first private key segments and a second private key with a respective reference identifier; (vi) creating, using the computer system, one or more cards for each of the encrypted second plurality of first private key segments wherein each of the one or more cards has fixed thereon one of the encrypted second plurality of first private key segments along with the respective associated reference identifier; and (vii) tracking, using the computer system, storage of each of the one or more cards in one or more vaults and storage of the second private key.

In embodiments, the computer-implemented method may further comprise the step of encrypting, using the computer system, the second private key.

In embodiments, the computer-implemented method may further comprise the step of electronically storing the second private key on a computer-readable substrate.

In embodiments, the computer-implemented method may further comprise the steps of generating, using a computer system comprising one or more computers, one or more digital asset accounts capable of holding one or more digital math-based assets; obtaining, using the computer system, one or more private keys corresponding to the one or more digital asset accounts; encrypting, using the computer system, each of the one or more private keys; dividing, using the computer system, each of the one or more encrypted private keys into a plurality of private key segments; associating, using the computer system, each of the plurality of private key segments with a respective reference identifier; creating, using the computer system, one or more cards for each of the plurality of private key segments wherein each of the one or more cards has fixed thereon one of the plurality of private key segments along with the respective associated reference identifier; and tracking, using the computer system, storage of each of the one or more cards in one or more vaults.

In embodiments, the one or more digital asset accounts may comprise multi-signature digital asset accounts.

In embodiments, a computer-implemented method may comprise the steps of (i) determining, using a computer system comprising one or more computers, one or more digital asset account identifiers corresponding to one or more digital asset accounts capable of holding one or more digital math-based assets; (ii) accessing, using the computer system, key storage information associated with each of the one or more digital asset account identifiers; (iii) determining, using the computer system, based upon the key storage information, storage locations corresponding to each of a plurality of private key segments corresponding to each of the one or more digital asset accounts; (iv) issuing or causing to be issued, retrieval instructions for retrieving each of the plurality of private key segments; (v) receiving, at the computer system, each of the plurality of private key segments; (vi) decrypting, using the computer system, each of the plurality of private key segments; (vii) assembling, using the computer system, each of the plurality of private key segments into one or more private keys.

In embodiments, the computer-implemented method may further comprise the step of accessing, using the computer system, the one or more digital asset accounts associated with the one or more private keys.

In embodiments, the computer-implemented method may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

In embodiments, the key storage information may comprise a reference identifier associated with one or more stored private key segments.

In embodiments, a system may comprise (i) one or more networked computers comprising one or more processors and computer-readable memory; (ii) one or more isolated computers comprising one or more processors and computer-readable memory and configured to generate digital asset accounts and generate transaction instructions for digital math-based asset transactions; (iii) a writing device configured to write digital asset account keys; and (iv) a reading device configured to read digital asset account keys.

In embodiments, the system may further comprise an accounting computer comprising one or more processors and computer-readable memory and configured to track digital math-based asset transactions involving one or more specified digital asset accounts.

In embodiments, the one or more isolated computers, the writing device, and the reading device may be located within a Faraday cage.

In embodiments, the isolated computer may not be physically connected to an external data network.

In embodiments, the writing device may be a printer and/or an engraver.

In embodiments, the reading device may be a disk drive, an electronic card reader. a QR reader, and/or a scanner. In embodiments, the scanner may be a bar code scanner.

In embodiments, the writing and/or device may be operationally connected to the one or more isolated computers.

In embodiments, a secure system for storing digital math-based assets may comprise (a) an electronic isolation chamber; (b) one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier; (c) the one or more writing devices located within the electronic isolation chamber and configured to perform the electronic writing instructions, including collating the plurality of cards into the plurality of sets; and (d) one or more reading devices located within the electronic isolation chamber and configured to read the plurality of private key segments along with the respective associated reference identifier from the one or more cards.

In embodiments, a computer-implemented method may comprise the steps of (i) receiving, at a computer system comprising one or more computers, an electronic request to transfer first respective quantities of digital math-based assets from each of a first plurality of digital asset accounts; (ii) accessing, using the computer system, each of the first plurality of digital asset accounts; (iii) generating, using the computer system, transaction instructions comprising one or more transfers of the first respective quantities from each of the first plurality of digital asset accounts; and (iv) broadcasting, using the computer system, the transaction instructions to a decentralized electronic ledger maintained by a plurality of physically remote computer systems.

In embodiments, the first respective quantities of digital math-based assets comprise different quantities for different digital asset accounts.

In embodiments, a computer-implemented method for dynamically providing a graphical user interface for an electronic order book may comprise receiving, by an exchange computer system comprising one or more computers from non-transitory computer-readable memory operatively connected to the one or more computers, from a user device, a request to access the electronic order book associated with a digital asset traded on an electronic exchange, and accessing, by the exchange computer system, electronic order book information comprising digital asset order information for a plurality of digital asset orders, the digital asset order information comprising respective order prices denominated in a fiat currency and respective order quantities for each of the plurality of pending digital asset orders, wherein the plurality of pending digital asset orders includes pending digital asset purchase orders and pending digital asset sell orders. The method may further comprise calculating, by the exchange computer system, information for a first graphical user interface by determining, by the exchange computer system, at each respective order a price first cumulative quantity of digital assets subject to the pending digital asset purchase orders; and determining, by the exchange computer system, at each respective order price a second cumulative quantity of digital assets subject to the pending digital asset sell orders. The method may also comprise generating, by the exchange computer system, first machine-readable instructions to render the first graphical user interface including a first electronic order book graphical representation, the first electronic order book graphical representation comprising: (i) a first axis depicting price denominated in the fiat currency; (ii) a second axis depicting digital asset quantity; (iii) a first set of graphical indicators on a first side of the first axis showing at each price visible along the first axis the first cumulative quantity of digital assets subject to the pending digital asset purchase orders; and (iv) a second set of graphical indicators on a second side of the first axis showing at each price visible along the first axis the second cumulative quantity of digital assets subject to the pending digital asset sell orders. The method may comprise transmitting, by the exchange computer system to the first user electronic device, the first machine-readable instructions so as to cause an application (e.g., downloadable dedicated application, such as a mobile application, or a web browser application) at the first user electronic device to render the first graphical user interface on a display associated with the first user electronic device.

In embodiments, the method may further comprise receiving, at the exchange computer system from the first user electronic device, first digital asset order information corresponding to a first prospective digital asset purchase order, the first digital asset order information comprising a first order quantity of the digital asset and a first order price parameter related to a first order price of the digital asset, the first order price denominated in the fiat currency. The method may comprise storing, by the exchange computer system in the non-transitory computer-readable memory, the first digital asset order information as a prospective digital asset purchase order. The method may comprise calculating, by the exchange computer system, information for a second graphical user interface (e.g., a new interface or an updated version of the prior graphical user interface) by determining, by the exchange computer system, at each respective order price a second order quantity of digital assets subject to the first prospective digital asset purchase order and determining, by the exchange computer system, at each respective order price a third cumulative quantity of digital assets subject to the digital asset sell orders that would remain after fulfilling the first prospective digital asset purchase order. The method may comprise generating, by the exchange computer system, second machine-readable instructions to render the second electronic graphical user interface including a second electronic order book graphical representation comprising a graphical representation of the first prospective digital asset purchase order superimposed on a modified first electronic order book graphical representation, the second electronic order book graphical representation comprising (i) the first axis depicting price denominated in the fiat currency; (ii) the second axis depicting digital asset quantity; (iii) the first set of graphical indicators on the first side of the first axis; (iv) the second set of graphical indicators on the second side of the first axis; (v) a third set of graphical indicators on the first side of the first axis showing at each price visible along the first axis the respective second order quantity of digital assets subject to the first prospective digital asset purchase order; and (vi) a fourth set of graphical indicators on the second side of the first axis showing at each price visible along the first axis the respective third cumulative quantity of digital assets subject to the digital asset sell orders that would remain after fulfilling the first prospective digital asset purchase order. The method may comprise transmitting, by the exchange computer system to the first user electronic device, the second machine-readable instructions so as to cause the application at the first user electronic device to render the second graphical user interface on the display.

In embodiments, the machine-readable instructions may be rendered in a webpage by a web browser. In embodiments, the machine-readable instructions may be rendered by a downloadable application, such as a mobile application running on the user electronic device.

In embodiments, the first axis may be a horizontal axis.

In embodiments, the second axis may have a logarithmic scale. In embodiments, at least one of the first axis or the second axis of the first electronic order book graphical representation have a different scale than the corresponding first axis and the corresponding second axis of the second electronic order book graphical representation.

In embodiments, the first order price parameter may comprise a market order indicator and the first order price is a market price. In embodiments, the third set of graphical indicators may not be displayed.

In embodiments, the first order price parameter may comprise a limit order indicator and the first order price may be a limit price specified by the user. In embodiments, the first prospective digital asset purchase order may be characterized as out of the money and the third respective cumulative quantity of digital assets at each price may be zero.

In embodiments, the step of calculating information for a second electronic order book graphical representation may further comprise determining, by the exchange computer system, at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. In the second electronic order book graphical representation, the first set of graphical indicators may show at each price visible along the first axis the fourth cumulative quantity of digital assets.

In embodiments, the method may comprise receiving, at the exchange computer system from the first user electronic device, first digital asset order information corresponding to a first prospective digital asset sell order, the first digital asset order information comprising a first order quantity of the digital asset and a first order price parameter related to a first order price of the digital asset, the first order price denominated in the fiat currency. The method may comprise storing, by the exchange computer system in the non-transitory computer-readable memory, the first digital asset order information as a prospective digital asset sell order. The method may comprise calculating, by the exchange computer system, information for a second graphical user interface (e.g., a new graphical user interface or an updated version of the prior graphical user interface) by determining, by the exchange computer system, at each respective order price a second order quantity of digital assets subject to the first prospective digital asset sell order; and determining, by the exchange computer system, at each respective order price a third cumulative quantity of digital assets subject to the digital asset purchase orders that would remain after fulfilling the first prospective digital asset sell order. The method may comprise generating, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising (i) the first axis depicting price denominated in the fiat currency; (ii) the second axis depicting digital asset quantity; (iii) the first set of graphical indicators on the first side of the first axis; (iv) the second set of graphical indicators on the second side of the first axis; (v) a third set of graphical indicators on the first side of the first axis showing at each price visible along the first axis the respective third cumulative quantity of digital assets subject to the digital asset purchase orders that would remain after fulfilling the first prospective digital asset sell order; and (vi) a fourth set of graphical indicators on the second side of the first axis showing at each price visible along the first axis the respective second order quantity of digital assets subject to the first prospective digital asset sell order. The method may comprise transmitting, by the exchange computer system to the first user electronic device, the second machine-readable instructions so as to cause the application at the first user electronic device to render the second graphical user interface on the display.

In embodiments, the step of calculating information for a second electronic order book graphical representation may further comprise determining, by the exchange computer system, at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. In the step of generating machine-readable instructions for the second electronic order book graphical representation, the first set of graphical indicators may show at each price visible along the first axis the fourth cumulative quantity of digital assets.

In embodiments, the present invention generally relates to systems, methods, and program products providing particular applications of an electronic digital asset exchange facilitating the purchase and sale of digital math-based assets, including digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, Bridge-Coin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, *Pura*, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few. For purposes of discussion, without limiting the scope of the invention, embodiments involving bitcoin may be discussed to illustrate embodiments of the present invention. The disclosure can encompass other forms of digital assets, digital math-based assets, peer-to-peer electronic cash system, digital currency, synthetic currency, or digital crypto-currency. The disclosure may also encompass assets or utilities, in the forms of "tokens," that may reside on top of a blockchain. For example, a token may in the form of a digital asset that exists on another digital asset's platform. A more specific example is Ethereum's ERC20 token, implemented by the ERC20 protocol that defines a set of rules which need to be met in order for the token to be accepted on the Ethereum platform.

In embodiments, systems and methods of the present invention may take into account blockchain forks, such as a "hardfork." A fork or hardfork may be a radical change to the blockchain protocol that makes previously invalid blocks/transactions valid (or vice-versa), and as such requires all nodes or users to upgrade to the latest version of the protocol software. Put differently, a hard fork is a permanent divergence from the previous version of the blockchain, and nodes running previous versions will no longer be accepted by the newest version. This essentially creates a fork in the blockchain, one path which follows the new, upgraded blockchain, and one path which continues along the old path. Generally, after a short period of time, those on the old chain will realize that their version of the blockchain is outdated or irrelevant and quickly upgrade to the latest version. In regards to bitcoin, examples of forks include Bitcoin Cash and Bitcoin Gold.

In embodiments, the present invention may be used in connection with products or services, which can include digital asset price calculators, digital asset indices, digital asset account monitoring systems, correlation of news events to digital asset prices, exchanges for converting from, to, or between digital assets, such as digital math-based assets, automated notification, transaction, and/or arbitrage systems involving digital assets, including digital math-based assets, kiosk systems for transacting or interacting with digital math-based assets, digital asset insurance systems, digital asset secure storage systems, and/or other financial products based on the same.

A digital asset exchange computer system may provide a technological platform to convert between digital assets and fiat currencies and/or between digital assets and other digital assets. Exchanges known in the art have suffered from security breaches, money-laundering risk, and an inability to authenticate customer's using their real-world identities, and inefficiencies. The systems, methods, and program products of the present invention provide technological solutions to these problems.

In embodiments, the present invention may be used in connection with other products or services related to digital assets and digital asset exchanges, which can include automated notification, transaction, and/or arbitrage systems involving digital assets, including digital math-based assets, and/or kiosk systems for transacting or interacting with digital math-based assets.

In embodiments, the present invention generally relates to systems, methods, and program products providing an electronic digital asset exchange facilitating the purchase and sale of digital math-based assets, including digital math-based assets. The electronic digital asset exchange provides a technological solution to user identity verification, anti-money laundering verification, and secure storage of digital math-based assets and fiat currency associated with customer accounts.

Figures 2, 33:
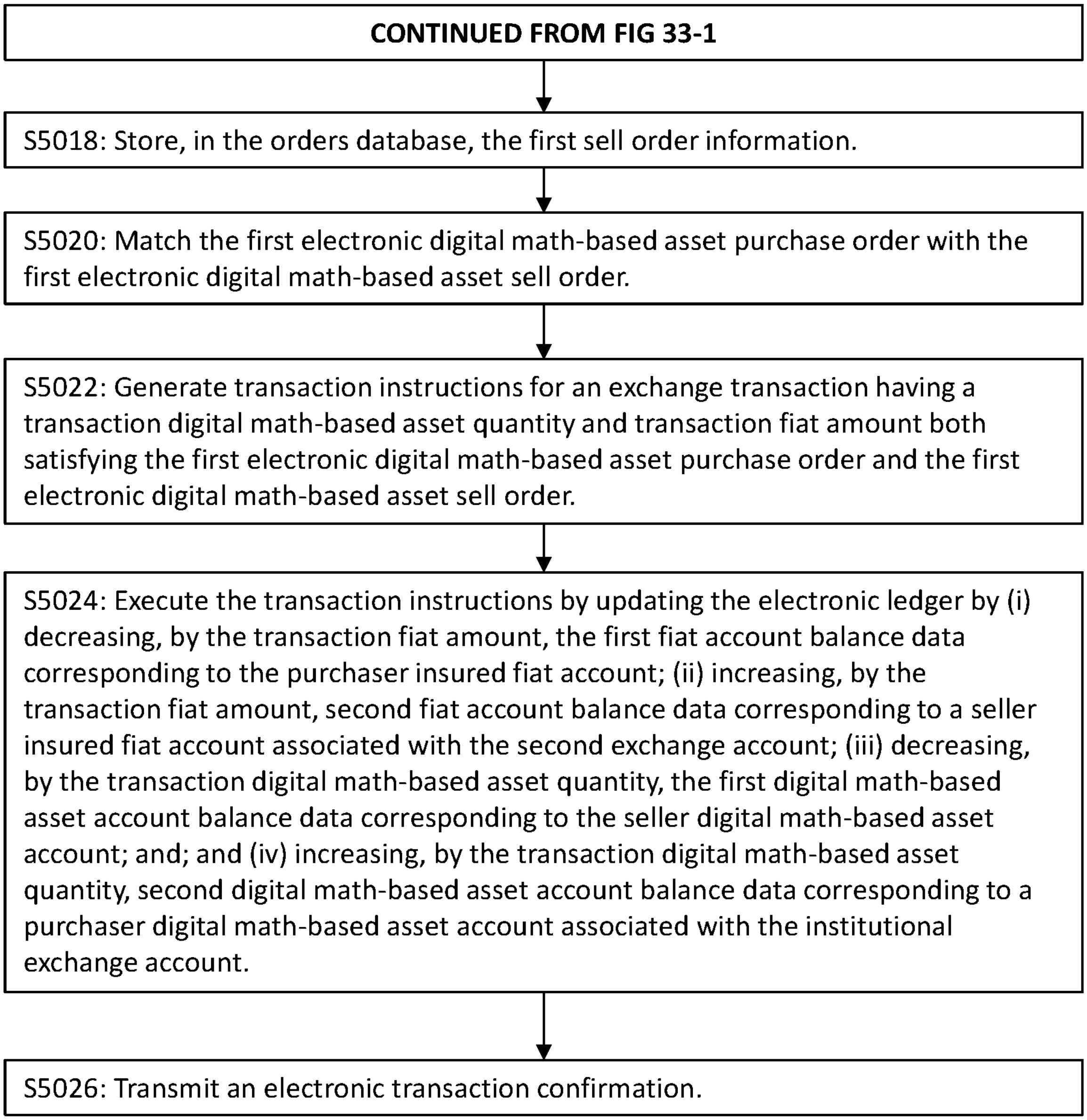

As shown in FIGS. 33-1 and 33-2, in embodiments, a method may comprise the steps of (S5002) providing, by a digital math-based asset computer system comprising one or more computers, one or more exchange account databases stored on non-transitory computer-readable memory and comprising for a plurality of exchange accounts fiat account information for an associated insured fiat account associated with an exchange; digital math-based asset account information for an associated digital math-based asset account associated with the exchange; and user authentication data (e.g., a username and password, multi-factor authentication data, to name a few); and further comprising for a subset of exchange accounts institutional account information associating each of one or more exchange institutional accounts with one or more institutional user access accounts each having respective user authentication data; (S5004) providing, by the digital math-based asset computer system, an orders database stored on the non-transitory computer-readable memory comprising at least digital math-based asset purchase order information comprising purchase order digital math-based asset quantities and corresponding purchase order fiat amounts; and digital math-based asset sell order information comprising sell order digital math-based asset quantities and corresponding sell order fiat amounts; (S5006) providing, by the digital math-based asset computer system, an electronic ledger comprising, for each of the plurality of exchange accounts, fiat account balance data and digital math-based asset account balance data; (S5008) receiving, at the digital math-based asset computer system from a first user electronic device associated with a first user access account associated with an institutional exchange account, a first electronic digital math-based asset purchase order comprising first purchase order information comprising a purchase order digital math-based asset quantity and a corresponding purchase order fiat amount; (S5010) verifying, by the digital math-based asset computer system, that first fiat account balance data indicating a first fiat account balance of a purchaser insured fiat account associated with the institutional exchange account at least equals the purchase order fiat amount; (S5012) storing, by the digital math-based asset computer system in the orders database, the first purchase order information; (S5014) receiving, at the digital math-based asset computer system, from a second user electronic device associated with a second exchange account, a first electronic digital math-based asset sell order comprising first sell order information comprising a sell order digital math-based asset quantity and a corresponding sell order fiat amount; (S5016) verifying, by the digital math-based asset computer system, that first digital math-based asset account balance data indicating a first digital math-based asset account balance of a seller digital math-based asset account associated with the second exchange account at least equals the sell order quantity; (S5018) storing, by the digital math-based asset computer system in the orders database, the first sell order information; (S5020) matching, by the digital math-based asset computer system, the first electronic digital math-based asset purchase order with the first electronic digital math-based asset sell order; (S5022) generating, by the digital math-based asset computer system, machine-readable transaction instructions for an exchange transaction having a transaction digital math-based asset quantity satisfying the first electronic digital math-based asset purchase order and the first electronic digital math-based asset sell order; and a transaction fiat amount satisfying the first electronic digital math-based asset purchase order and the first electronic digital math-based asset sell order; and (S5024) executing, by the digital math-based asset computer system, the machine-readable transaction instructions by updating the electronic ledger by decreasing, by the transaction fiat amount, the first fiat account balance data corresponding to the purchaser insured fiat account; increasing, by the transaction fiat amount, second fiat account balance data corresponding to a seller insured fiat account associated with the second exchange account; decreasing, by the transaction digital math-based asset quantity, the first digital math-based asset account balance data corresponding to the seller digital math-based asset account; and increasing, by the transaction digital math-based asset quantity, second digital math-based asset account balance data corresponding to a purchaser digital math-based asset account associated with the institutional exchange account. In embodiments, at step S5024 an electronic transaction confirmation may be transmitted.

In embodiments, an insured omnibus fiat account may comprise a plurality of the associated insured fiat accounts. In embodiments, at least one insured fiat account may be insured by the Federal Deposit Insurance Corporation. In embodiments, a digital wallet may hold digital math-based assets corresponding to a plurality of the digital math-based asset accounts.

In embodiments, the method may further comprise the step of transmitting, from the digital math-based asset computer system, an electronic transaction confirmation. In embodiments, an electronic transaction confirmation may be transmitted to the first user electronic device. In further embodiments, an electronic transaction confirmation may be transmitted to the second user electronic device. In still further embodiments, an electronic transaction confirmation may be transmitted to the second user electronic device to a computer system associated with an institution associated with the exchange institutional account.

In embodiments, the security systems and methods described herein may be used, e.g., as security protocols, associated with various financial products, such as a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product.

In embodiments, an apparatus may be programmed to perform the following steps: receiving, at the apparatus via a user input device, first user identification data comprising at least a state of domicile; transmitting, from the apparatus to an exchange computer system, the first user identification data; receiving, at the apparatus from the exchange computer system, first display data related to an anti-money laundering user data collection interface based upon the state of domicile; rendering, by the apparatus on a display device operatively connected to the apparatus, the first display data; receiving, at the apparatus via the user input device, second user identification data corresponding to the anti-money laundering user data collection interface; transmitting, from the apparatus to the exchange computer system, the second user identification data; receiving, at the apparatus from the exchange computer system, second display data related to a registration confirmation; and rendering, by the apparatus on the display device, the second display data.

In embodiments, such an apparatus may be an electronic kiosk. In embodiments, such an apparatus may be a user device, such as a smart phone, tablet computer, and/or computer.

In embodiments, the apparatus may be further programmed to perform the steps of receiving, at the apparatus from the exchange computer system, third display data related to exchange transaction options; rendering, by the apparatus on the display device, the third display data; receiving, at the apparatus via a user input device, a selection of an exchange transaction option related to a fiat withdrawal and a corresponding transaction request comprising at least a fiat withdrawal amount; and transmitting, from the apparatus to the exchange computer system, the transaction request.

In embodiments, an apparatus programmed to perform the following steps: receiving, at the apparatus via an input device, user account credentials; transmitting, from the apparatus to the exchange computer system, the user account credentials; receiving, at the apparatus from the exchange computer system, first display data corresponding to a plurality of exchange transaction options for an authenticated user; rendering, by the apparatus, the first display data on a display device operatively connected to the apparatus; receiving, at the apparatus via the input device, user selections corresponding to a first exchange transaction option that is an exchange transaction order; receiving, at the apparatus via the input device, exchange transaction order parameters; transmitting, from the apparatus to the exchange computer system, the exchange transaction order parameters; receiving, at the apparatus from the exchange computer system, second display data corresponding to order placement confirmation; and rendering, by the apparatus, the second display data on the display device.

A technical challenge of many digital asset exchanges is how to allow authorized users to exchange large blocks of digital assets without causing unwelcome price movements due to the pending transaction. For example, if a large order (e.g., bid or ask) for a large number of digital asset units (e.g., 10 BTC, which at a USD$10,000 per BTC price could be USD$100,000, or 100BTC, to name a few) is identified on a public order book, the public posting of such an offer may cause the price of the digital asset to spike or drop disproportionate to the spot price that might otherwise be available in the market if it was not on the public order book.

In embodiments, the digital asset exchange computer system may include block trading options, which can overcome these technical problems. By way of illustration, a separate block trading order book can be set up for a specific digital asset class or pair (e.g., BTC-USD) in which only certain designated users may participate. For example, the separate block trading order book may only be available for customers who have a sufficient quantity of digital assets to meet minimum block requirement such as those discussed below, such as institutional customers, such that they can buy or sell in large volume transactions, as a block taker, and a plurality of qualified market makers who are qualified to act as a counter party, maker(s), responding to a proposed request or indication of interest with a response. In embodiments, a separate block trading order book for each taker request may be maintained separately from other order books, such as a continuous trading order book, an auction trading order book, or other block trading order books, to name a few.

FIGS. 57-1, 57-2, and 57-3 illustrate exemplary database structures in accordance with exemplary embodiments. A method for conducting a block trade order of a digital asset (e.g., BTC) on a digital asset exchange computer system is disclosed. In general, order books are maintained based on pairs, such as a digital asset to fiat pairing (e.g., BTC-USD) or digital asset to digital asset pairing (e.g., BTC-ETH). In embodiments, order books associated with each pairing may be maintained separately, as illustrated in FIGS. 57-1, 57-2, and 57-3. In embodiments, order books for a given pairing may include a continuous trading order book (see 5702*a*, 5702*b*, 5702*c*, for example), auction order books (see 5704*a*, 5704*b*, 5704*c*, for example) and/or block trading order books (see 5706*a*, 5706*b*, 5706*c* for example), to name a few. In embodiments, each auction will be maintained in a separate auction order book. As discussed elsewhere herein, in embodiments, a continuous trading order book may be used to fill an auction order, but does not necessarily have to be used. In embodiments, each block trading order request by a taker will be maintained in its own block trading order book. In embodiments, each block trading order book is also segregated and maintained separately from the continuous trading order book and/or the auction order books as is indicated in FIGS. 57-1, 57-2, and 57-3. In such embodiments, block trading orders may not be filled by crossing orders with continuous trading order books and/or auction order books. In embodiments, block trading orders may not be filled by crossing orders between block trading order books generated based on different block order requests. In embodiments, block trading order books may be suspended during a defined period (e.g., 25 minutes) based on the timing of an auction in the same pairing.

By way of illustration, a block trading order book for a pairing including a digital asset may be set up in which blocks of a designated digital asset size and/or fiat value may be traded. In embodiments, a minimum block size may be established for participation in a block order book. By way of example, for bitcoin, a minimum block size may include amounts such as 5 BTC, 10 BTC, 15 BTC, 20 BTC, 50 BTC, 100 BTC, to name a few. In embodiments, the minimum block size may be specified based on notional value associated with a respective fiat. For example, in a digital asset to fiat block order trading book, such as bitcoin to USD (BTC-USD), when the notional value of BTC to USD is set at 1 BTC=USD$10,000, a block size of USD$100,000 may be set or 10 BTC. By further example, if the notional value of BTC to USD is set at 1 BTC=USD$20,000, a block size of USD$100,000 may be set at 5 BTC. In embodiments, the block size may be pegged exactly to a notional fiat value, e.g., $100,000. In embodiments, the block size may be pegged to the nearest significant digit of a digital asset value. For example, in the above example, if the notional value of BTC to USD is set at 1 BTC=USD$11,535, the block size may be set at 10 BTC, instead of 8.66926 BTC. In embodiments, under the same example, the block size could be set at 8.7 BTC, choosing the first decimal place as the relevant significant digit. In embodiments, the block sizes could be modified to reflect changing market conditions. In embodiments, block sizes may also be designated in different amounts and/or different digital assets (e.g., ether, litecoin, bitcoin cash, to name a few) consistent with exemplary embodiments. In embodiments, block trading order books may be set up using digital asset to fiat pairings (e.g., BTC-USD) and/or digital asset to digital asset pairings (e.g., BTC-ETH).

In embodiments, block sizes may be set up in multiples of minimum block sizes. For example, if the minimum block size is set at 10 BTC, then blocks sizes could be set up as 10 BTC, 20 BTC, 30 BTC, etc. to name a few. In embodiments, block sizes may be set up in values that are at fixed intervals, but not necessarily at multiples of minimum block sizes. For example, if the minimum block size is set at 10 BTC, then block sizes could be set up at 5 BTC intervals, starting with the minimum block size, e.g., 10 BTC, 15 BTC, 20 BTC, 25 BTC, 30 BTC, etc., to name a few. In embodiments, block sizes may be set up in values that are not in fixed intervals, such as, by way of example, any block sizes that are above a minimum block size, e.g., any order of over 10 BTC, such as 10.2BTC or 11 BTC, or 28 BTC to name a few. Other examples of block sizes may be implemented consistent with exemplary embodiments.

Figures 1, 58:
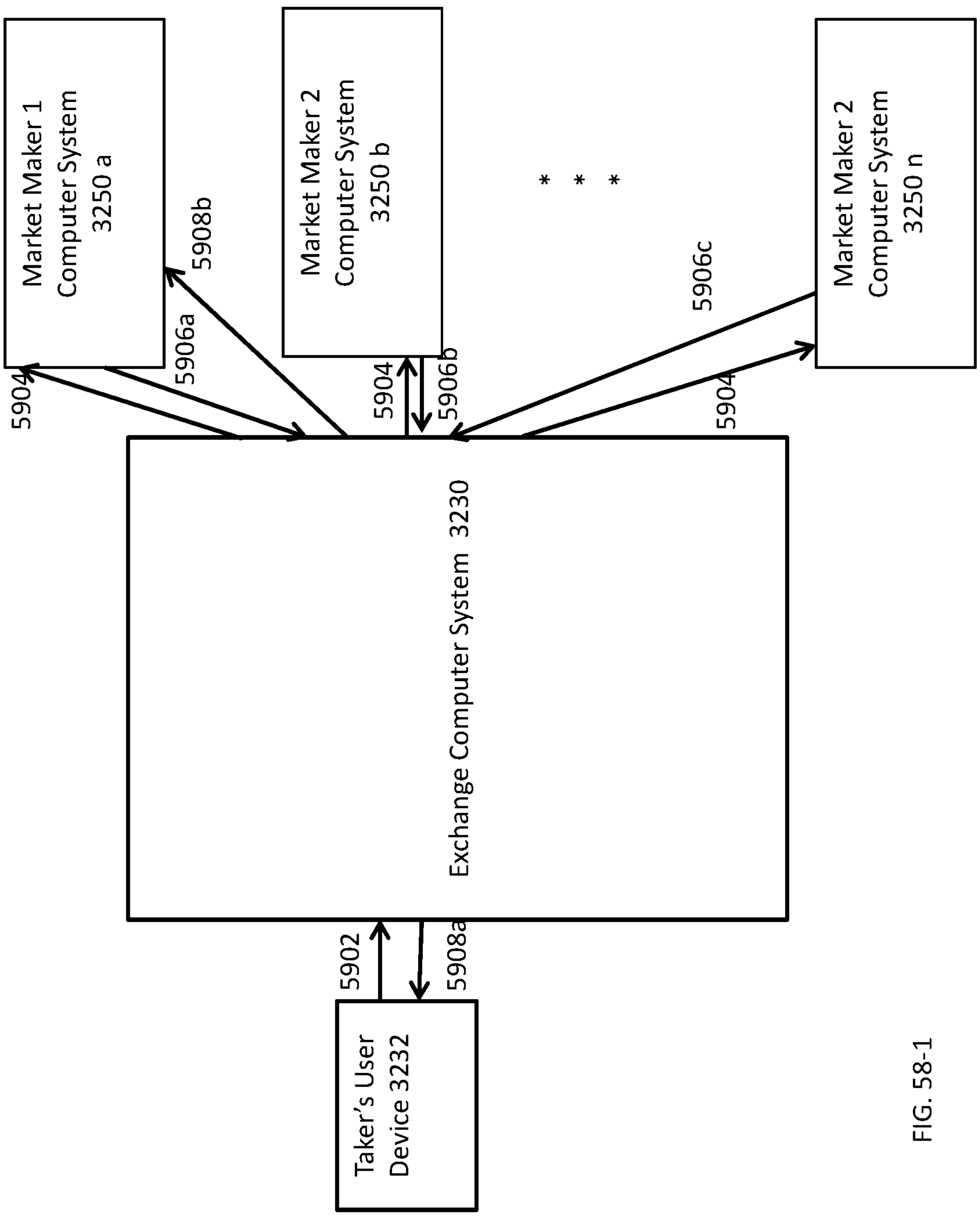
Figures 2, 58:
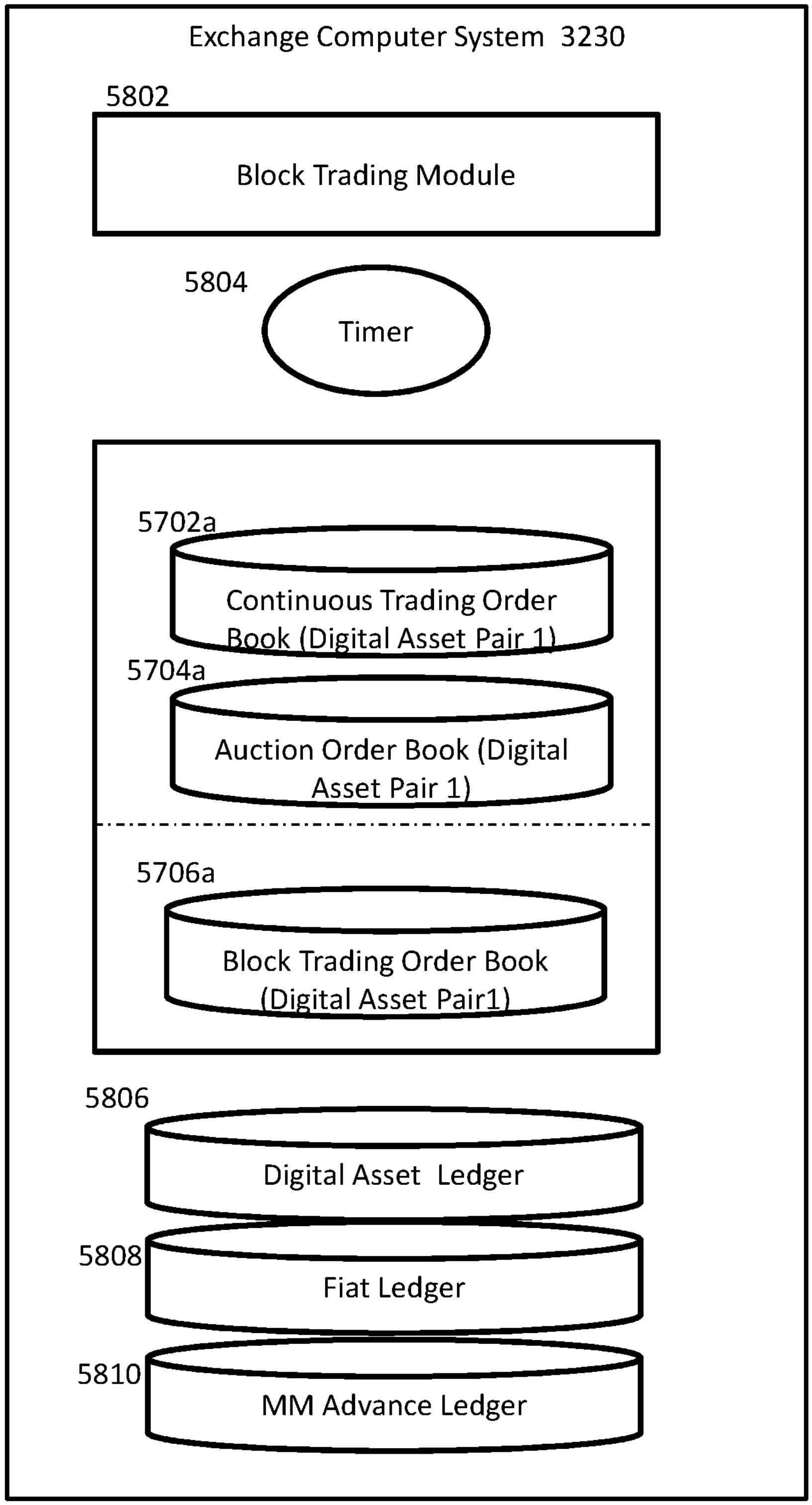

With reference to FIGS. 58-1 and 58-2, in embodiments, a block trading system may include a taker's user device 3232 which is in communication with the digital asset exchange computer system 3230. The digital asset exchange computer system 3230 preferably includes a block trading module 5802 including computer executable code for performing block trades as described herein. In embodiments, the digital asset exchange computer system 3230 may also include at least one timer 5804, which can be used to calculate one or more time-out periods associated with at least block trading periods. In embodiments, the digital asset exchange computer system 3230 may include one or more databases stored on non-volatile computer readable memory. In exemplary embodiments, such databases may include for a first digital asset pairing, at least a continuous trading order book 5702*a*, auction order book 5704*a* and block trading order book 5706*a*, to name a few. The first digital asset pair may be a pairing of a digital asset with a fiat (e.g., BTC-USD) or a digital asset with another digital asset (e.g., BTC-ETH), to name a few. In embodiments, a continuous trading order book 5702*a* for the first digital asset pair is generally maintained on an on-going basis, except for periods which are designated as black-out periods. In embodiments, for each auction period for the first digital asset pair, an auction order book 5704*a* may also be provided. In embodiments, a separate and segregated block trading order book 5706*a* is maintained. In embodiments, a new segregated block trading order book may be provided for each digital asset pair each time a block order related to the digital asset pair is placed such that each block trading order book relates to a single block order. Thus, for a first block trade order request by a taker, a first block trading order book 5706*a* is maintained, and for a second block trade order request by the same or another taker, a second block trading order book 5706*a*' is maintained, to name a few.

In embodiments, the digital asset exchange computer system 3230 also includes or at least is operationally connected to a digital asset ledger 5806 for each digital asset, a fiat asset ledger 5808 for each fiat. In embodiments, a digital asset ledger 5806 will maintain a list of the beneficial ownership of all the digital assets held by the digital asset exchange. In embodiments, each separate digital asset (e.g., BTC, ETH, etc.) may be maintained in a separate digital asset ledger 5806, or in an aggregated digital asset ledger. In embodiments, a fiat asset ledger 5808 will maintain a list of the beneficial ownership of all the fiat held by the digital asset exchange. In embodiments, each separate fiat (e.g., USD, euro, yet, etc.) may be maintained in a separate fiat ledger 5806, or in an aggregated fiat ledger. In embodiments, where the digital asset exchange allows market makers to obtain operational advances, a market maker advance ledger 5810 may be maintained. In embodiments, the market maker advance ledger 5810 will maintain a list of market makers, advance limits, amounts advanced and/or available advance amounts.

In embodiments, the digital asset exchange computer system 3230 may communicate with a plurality of n market maker computer systems including at least Market Maker 1 Computer System 3250 a, Market Maker 2 Computer System 3250 b and Market Maker n Computer System 3250 n. In embodiments, the digital asset exchange computer system 3230 may communicate with one or more market maker computer systems 3250 using an advanced programming interface (API), such as the kind used in an automated trading system. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage. An example of such an order placing API is available with the Gemini Exchange, as discussed at docs.gemini.com/rest-api/#new-order.

Figure 56:
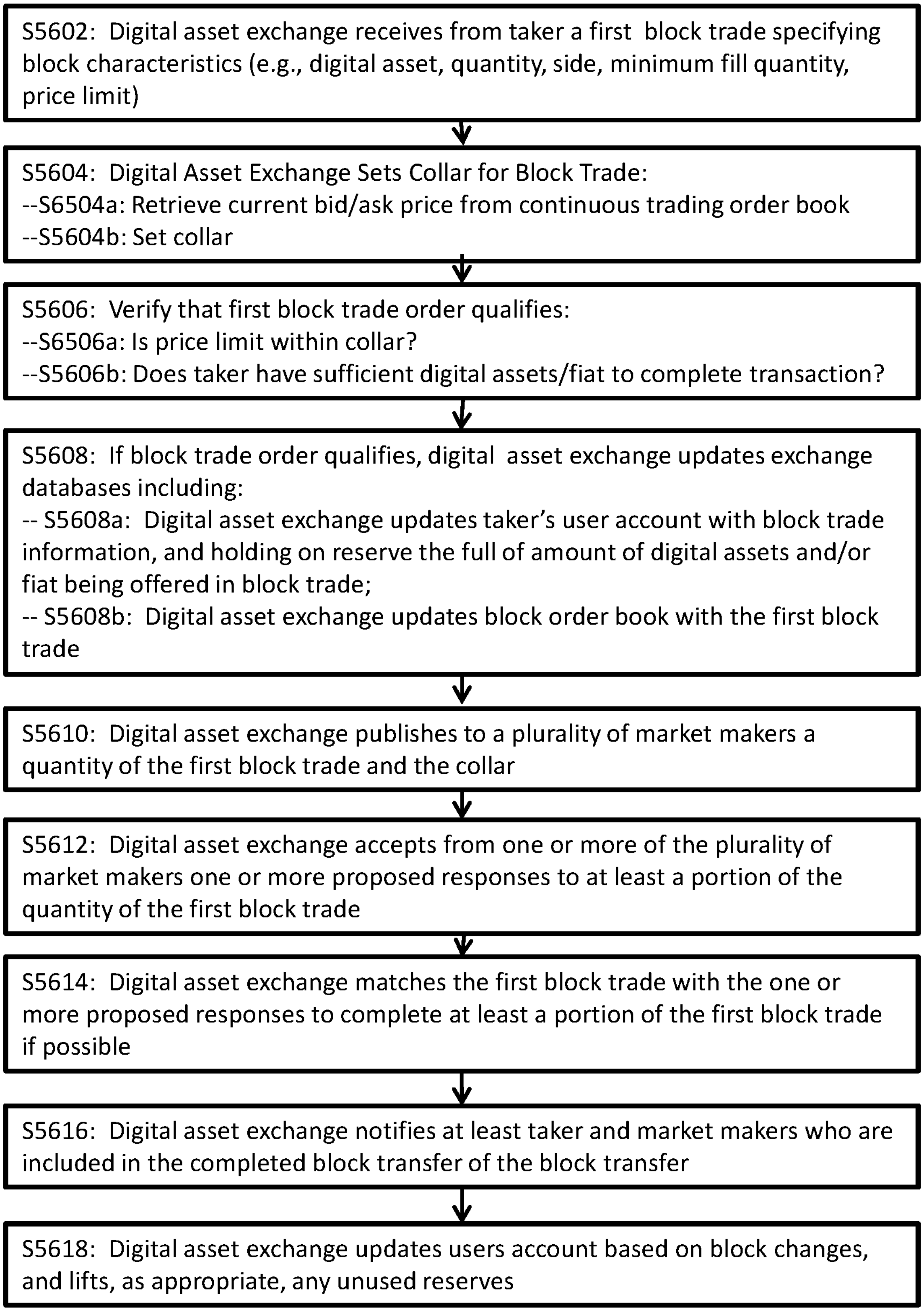
FIGS. 56 and 56A are exemplary flow charts for a block trade process in accordance with exemplary embodiments of the present invention.

Referring to FIG. 56, an exemplary flow chart for a block trading process in accordance with exemplary embodiments of the present system is illustrated.

Figure 59:
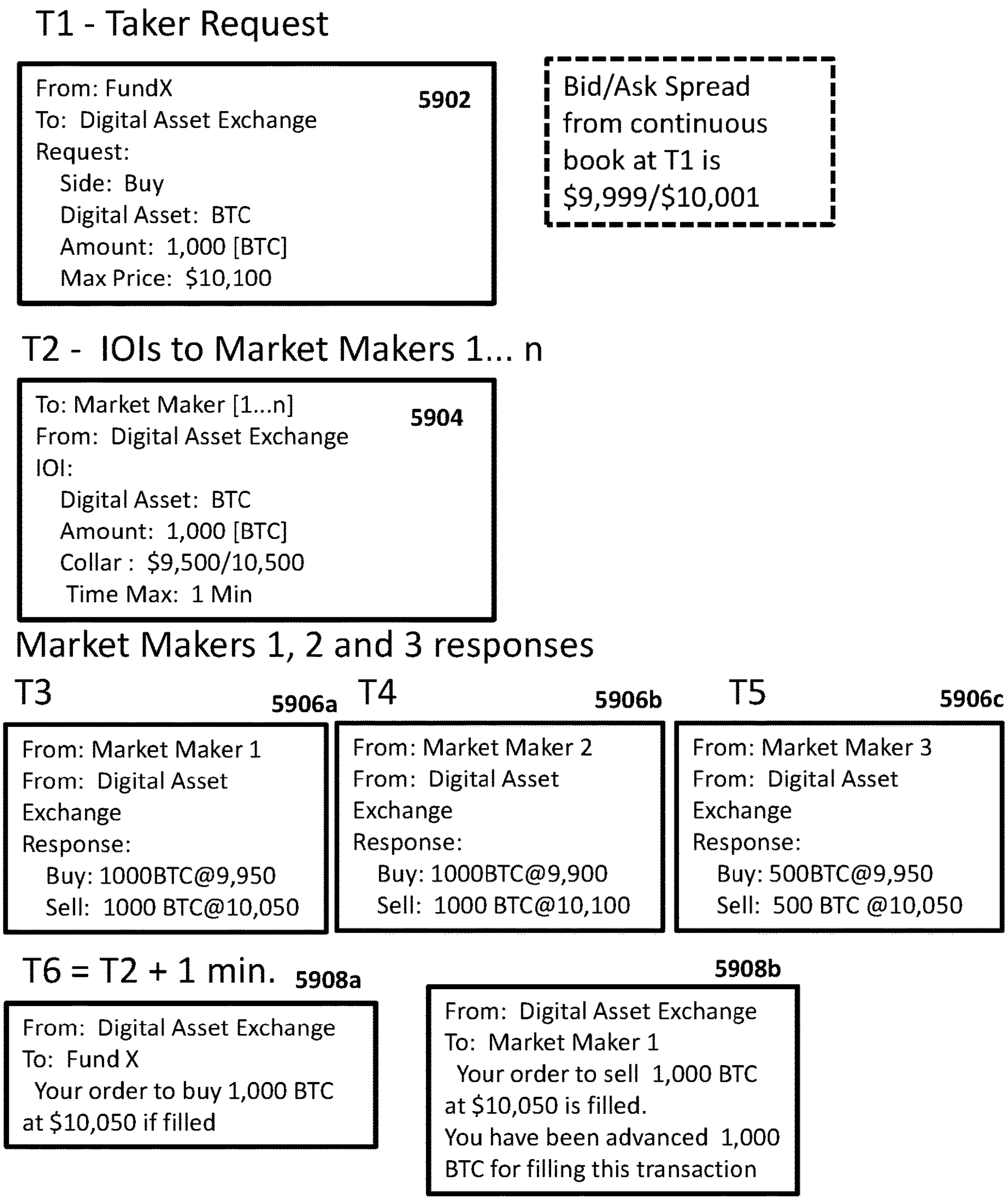
Figures 1, 59A:
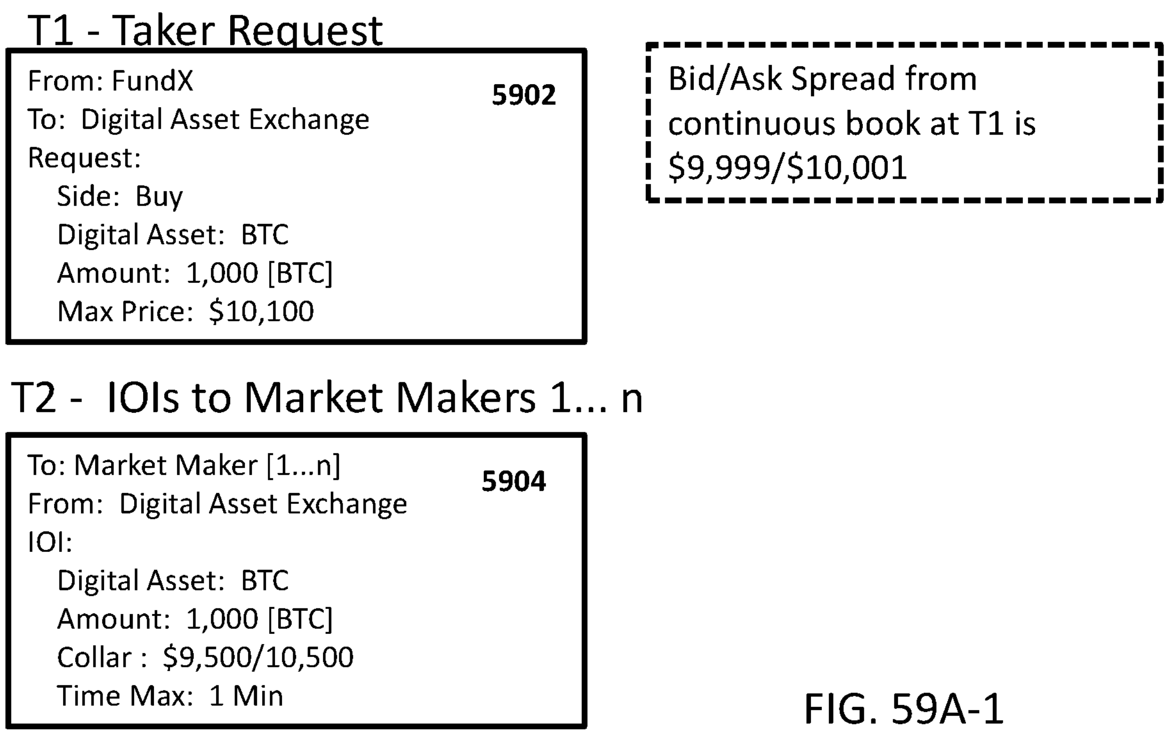
Figures 2, 59A:
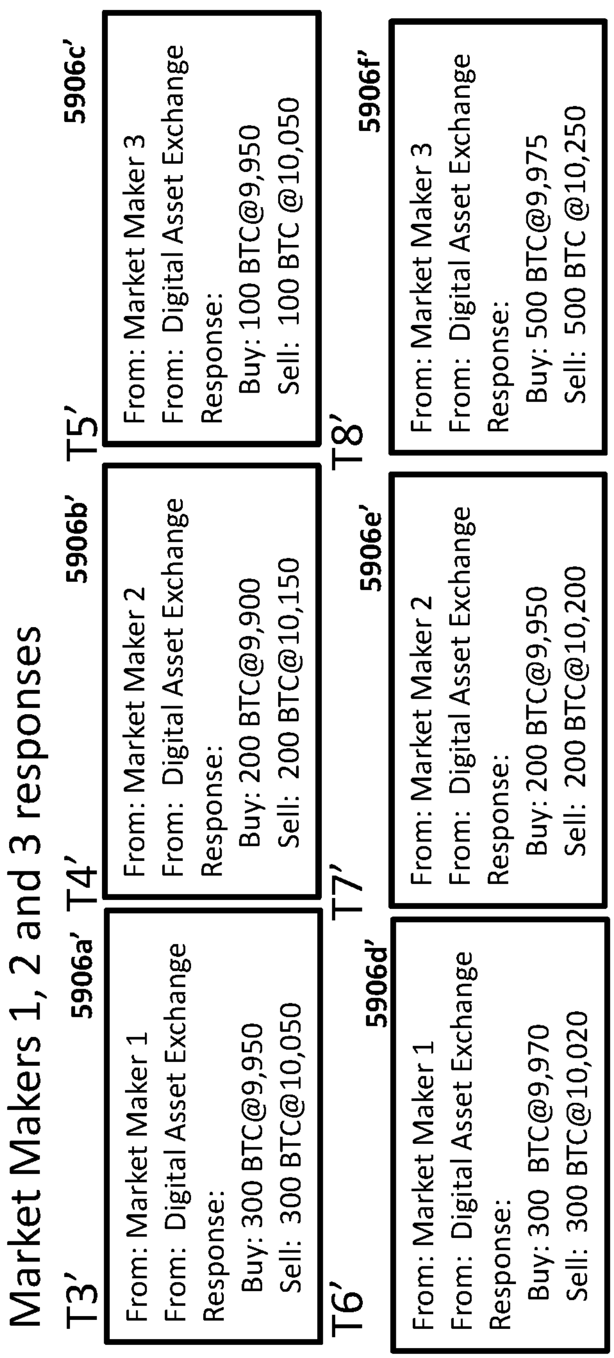
Figures 3, 59A:
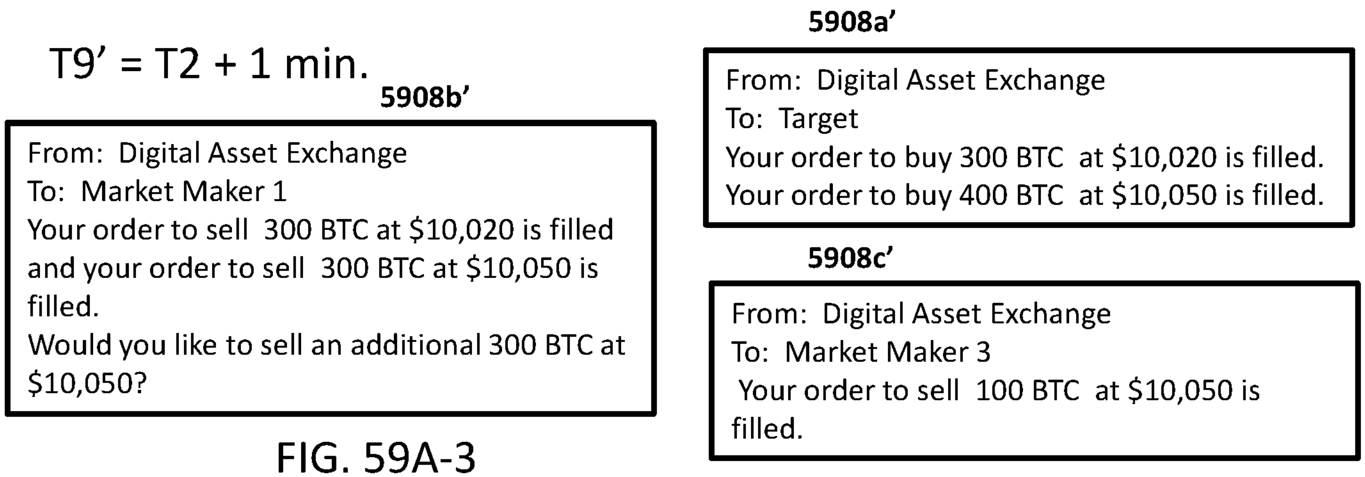

In step S5602, digital asset exchange computer system 3230 receives from a taker user device 3232 associated with a taker (customer), a first block trade order associated with a first pair of a first digital asset and either a first fiat or a second digital asset. The first block trade order specifies block characteristics (e.g. digital asset type, quantity of the digital asset, side of the transaction, minimum fill quantity/price limit). An exemplary block order 5902 is illustrated in FIG. 59. In embodiments, the first block trade order may be submitted in the form of a request via a dashboard display, email, an order placing API or other electronic submission, to name a few.

In step S5604, digital asset exchange computer system 3230 may set a collar for the block trade, including a collar minimum and a collar maximum. First, the digital asset exchange computer system 3230 may access, from at least a first database stored on a computer readable medium operatively connected to the digital asset computer system, pricing data associated with the first digital asset pair at a predefined time associated with a time of the first block trade order. In embodiments, pricing data can include a spot price. In embodiments, pricing data may be based on the last transaction immediately prior to the block trade. In embodiments, pricing data may be based on an average of the most recent bid/ask price for the digital asset. In embodiments, the pricing data may be set based on a blended digital asset price as discussed elsewhere herein. For example, a single exchange digital asset price could be determined based on a volume weighted average and/or time weighted average of recent digital asset pricing. In embodiments, a blended digital asset price may be based on pricing from digital assets taken from a plurality of exchanges (such as qualified exchanges). In embodiments, pricing data may be a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed. The digital asset exchange computer system 3230 may calculate a collar minimum for the first block trade order based on the pricing data less an amount equal to a first percentage of the pricing data, and a collar maximum for the first block trade order based on the pricing data plus an amount equal to the first percentage of the pricing data. Thus, a collar may be based on a spot price at the time for the first block trade order, plus or minus a defined range, such as a percentage of the spot price or other pricing data. In embodiments, the collar could be set using percentages such as 1%, 2%, 3%, 5%, 10% of the spot price or other pricing data, to name a few. By way of illustration, if a 5% collar is used with a spot price of 1 BTC=USD$10, 000, the collar would be set at between USD$9,500 and USD$10,500.

Accordingly, in embodiments, in sub step S5604*a*, the digital asset exchange computer system 3230 may retrieve a current pricing information (e.g., bid/ask price) from continuous trading order book 5702*a* associated with a first digital asset pairing and establish a spot price for the first digital asset pairing. As noted above, in embodiments, the spot price may be the average of the current bid/ask price or may be the price used in the last transaction in the continuous trading book, to name a few. In embodiments, the spot price may be a blended digital asset price, in which one or more different order books from one or more digital asset exchanges or index databases may be required to be access to obtain such price. In embodiments, the blended digital asset price may be obtained by being calculated and/or by accessing a blended digital asset price database (not shown). In sub step S5604*b*, the digital asset exchange computer system may establish the collar, for example, based on adding/subtracting a fixed percentage of the spot price to the spot price as discussed above, for example.

At step S5606, the digital asset exchange computer system 3230 may verify that the first block trade order qualifies as a legitimate transaction. In embodiments, at sub step S5606*a*, the digital asset exchange computer system 3230 may determine whether the price in the block trade order is within the limits of the collar determined in step S5604*b* (e.g., at or above the collar minimum and at or below the collar maximum). At step S606*b*, the digital asset exchange computer system 3230 may determine whether the taker has sufficient digital assets and/or fiat to complete the transaction based on information provided in the digital asset ledger 5806 and/or fiat ledger 5808. In embodiments, takers are always required to maintain full-reserve for block trading.

In embodiments, in step S5606, the digital asset exchange computer system 3230 may verify the block characteristics of the first block trade order to confirm that the block characteristics are valid block characteristics. In the case where the side of the transaction is buy, the digital asset exchange computer system 3230 may verify the taker has sufficient amounts of the first fiat or second digital asset as appropriate, to cover the first block trade order if filled in full. In the case where the side of the transaction is sell, the digital asset exchange computer system 3230 may verify the taker has sufficient amounts of the first digital asset to cover the first block trade order if filled in full.

Assuming that the first block trade order qualifies, in step S5608, the digital asset exchange computer system 3230 updates exchange databases, including e.g., a block trading order book 5706*a*, 5706*b*, 5706*c* associated with the digital asset of the order, a digital asset ledger 5806, and/or a fiat ledger 5808 of the taker, as appropriate. In embodiments, the updating process may include sub step S5608*a* in which the digital asset exchange computer system 3230 updates taker's user account in the digital asset ledger 5806 and/or the fiat ledger 5808 as appropriate with block trade order information, and places holds on reserve the full of amount of digital assets and/or fiat being offered in the block trade. As noted above, in embodiments, block trading may require a full reserve on the taker side. In embodiments, the updating process may include sub step S5608*b* in which the digital asset exchange computer system 3230 updates the block trading order book 5706*a*, 5706*b*, 5706*c* with the first block trade.

Thus, in embodiments, upon successful verification of the first block trade order in step S5608, the digital asset exchange computer system 3230 may update a user account associated with the taker to set aside sufficient reserves in the first digital asset, the first fiat and/or the second digital asset sufficient to cover the first block trade order if filled in full. Thereafter, the digital asset exchange computer system 3230 may store on one or more computer readable mediums, a first block order trading book including the first block trade.

In step S5610, the digital asset exchange computer system 3230 publishes to a plurality of n market maker computer systems 3250*a*, 3250*b*, . . . 3250 n, a quantity and digital asset of the first block trade. An example of a publication of such an indication of interest (IOI) 5904 is shown in FIG. 59. It is noted that the market makers are not informed the side of the transaction in which the taker is participating, i.e., as to whether the block trade order is an offer to buy or an offer to sell. Similarly, the market makers are not informed of other information regarding the block trade, such as identification information regarding the taker.

In embodiments, in step S5610, the digital asset exchange computer system 3230 may generate a first indication of interest associated with the first block trade including: (i) the first digital asset as digital asset type; (ii) the digital asset quantity of the first digital asset; (iii) the collar minimum; and (iv) the collar maximum. Thereafter, the digital asset exchange computer system 3230 may publish the first indication of interest to a first plurality of market maker computer systems 3250*a*, 3250*b* . . . 3250*n*, wherein each market maker computer system is associated with a respective market maker.

In step S5612, the digital asset exchange computer system 3230 receives from one or more of the plurality of market maker computer systems 3250*a*, 3250*b* . . . 3250*n* associated with respective market makers, one or more responses relating to at least a portion of the quantity of the first block trade. If no responses are received within a pre-set time period, the block trade order will fail. In FIG. 59, representative response 5906*a* from Market Maker 1, representative response 5906*b* from Market Maker 2 and representative response 5906*c* from Market Maker 3 are illustrated. In embodiments, market maker responses must include both proposed buy and sell prices that are within the collar to be considered and placed in the block trading order book.

In embodiments, a limited time window (e.g., 1 minute, 5 minute, 10 minute to name a few) may be set in which the digital asset exchange computer system 3230 may accept responses to the indication of interest. In such embodiments, the timer 5804 may be set at the time step S5610 is executed to determine a time-out period. At the end of the limited time window (e.g., when the time-out period expires), the digital asset exchange computer system 3230 will stop accepting responses from market maker computer systems and close the block trading window.

In embodiments, market makers may not be required to maintain full-reserve and may be granted operational advances. Operational advance limits are preferably fixed, and generally made on a customer-by-customer basis and can be adjusted from time to time. In embodiments, other operational advance limits may be set. As discussed above, in embodiments, an operational advance ledger 5810 may be maintained by the digital asset exchange computer system 3230 to track, for each market maker, available operational advances.

In embodiments, the digital asset exchange computer system 3230 may verify the validity of each response by each market maker received during the available time period, and only validated responses may be considered. In embodiments, a response which offers a bid that is outside the collar may be rejected. In embodiments, a response which offers an amount outside of the authorized amount for the respective market maker may also be rejected. In embodiments, a response which is not for a least an acceptable minimum amount may also be rejected. In embodiments, a response for an amount of digital assets greater than the indication of interest may also be rejected, and/or applied as if it were for the amount of digital assets included in the indication of interest. In embodiments, other validation criteria may also be applied.

Thus, during a first time period after step S5610, the digital asset exchange computer system 3230 may receive from one or more market maker computer systems of the first plurality of market maker computer systems 3250*a*, 3250*b* . . . 3250*n*, one or more first responses to the first indication of interest. In embodiments, for each response received, the digital asset exchange computer system 3230 further verifies that the respective response is a valid response, coming within the parameters of the first indication of interest. In embodiments, upon verification of the respective response, the digital asset exchange computer system 3230 may update the first block trading order book to including the respective response.

In embodiments, each market maker may be limited to a single response to each indication of interest. In embodiments, each market maker may be authorized to submit more than one response for each indication of interest.

In step S5614, after the block trading window is closed, the digital asset exchange computer system 3230 crosses the first block trade order with the one or more validated responses to complete at least a portion of the first block trade, if possible. In embodiments, only complete block trades may be filled. In embodiments, partial block trades may be filled. In embodiments, matching is accomplished via a set of predetermined matching rules. In embodiments, price is given preference over all other parameters in the market maker responses such that where the block trade order is a "sell" side transaction by the taker, matching will give preference to those responses including a maximum "buy" price. Conversely, in embodiments, where the block trade order is a "buy" side transaction by the taker, matching will give preference to those responses including a minimum "sell" price. Generally, in embodiments, where two or more market makers propose the same matching price, preference may be given to the response received by the digital asset exchange computer system 3230 first. In embodiments, each matching trade will be applied in the designated priority order (e.g., price-time priority) until the order is filled, or the matching responses are exhausted.

In embodiments, upon closing of the block trading window, the digital asset exchange computer system 3230 may identify one or more matching market maker responses associated with respective market makers, by crossing the first block trade order with each of the respective responses in the first order book, to identify based on price-time priority, each of the matching responses to the first block trade order until the earliest of: (i) the first block trade order being filled by matching responses; (ii) no more matching responses are present while less than all of the first block trade order is filled; or (iii) there are no matching responses before the block trading window closes in which case the block trade fails.

In step S5616, the digital asset exchange computer system 3230 notifies at least the taker computer system 3232 and market maker computer systems 3250*a*, 3250*b* . . . 3250*n* associated with market maker(s) who are included in the completed block transfer of the block transfer. In embodiments, neither the taker nor the market makers are informed of the identity of any other party (or parties) to the completed block trade. In embodiments, once the digital asset exchange computer system completes the matching in step S5614, no further action is required by either party to the transaction.

Figure 56A:
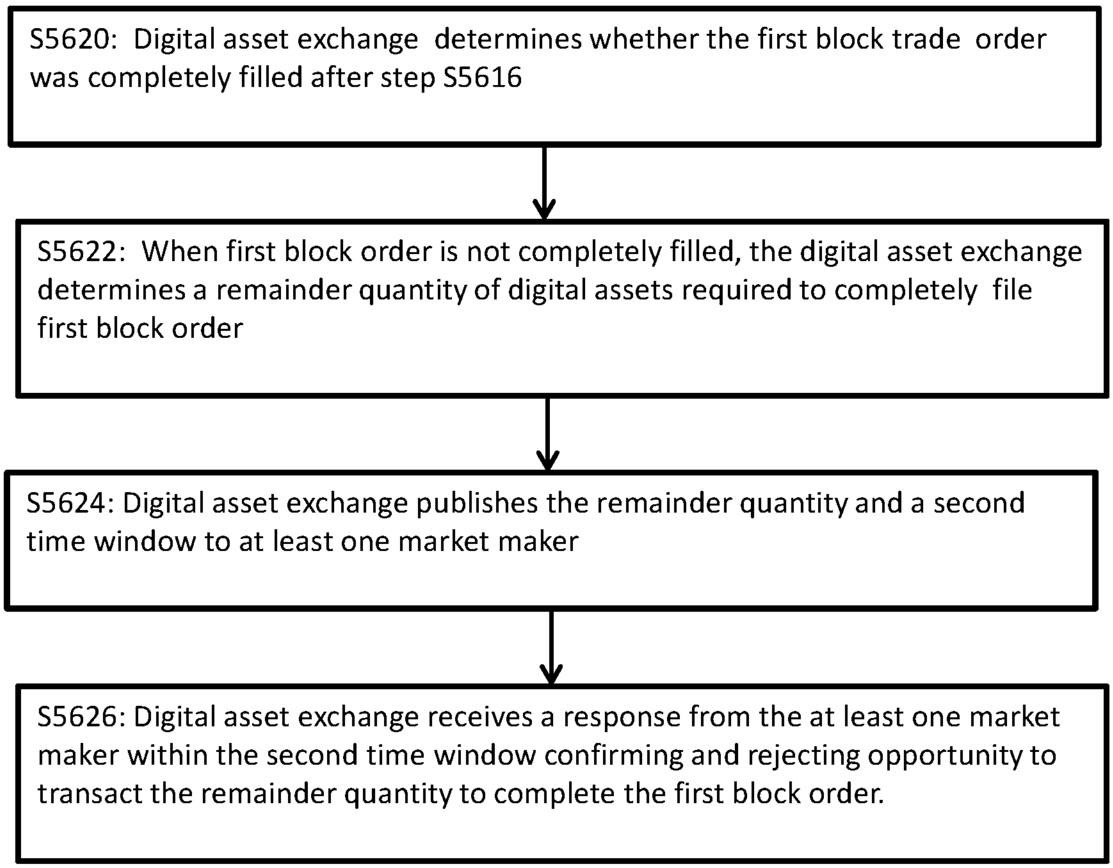
Figures 1, 57:
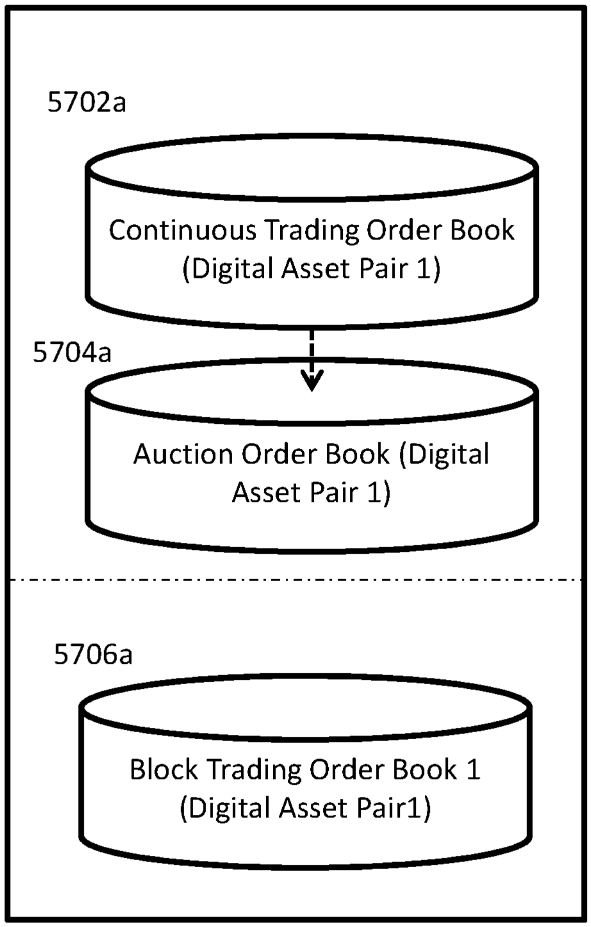
Figures 2, 57:
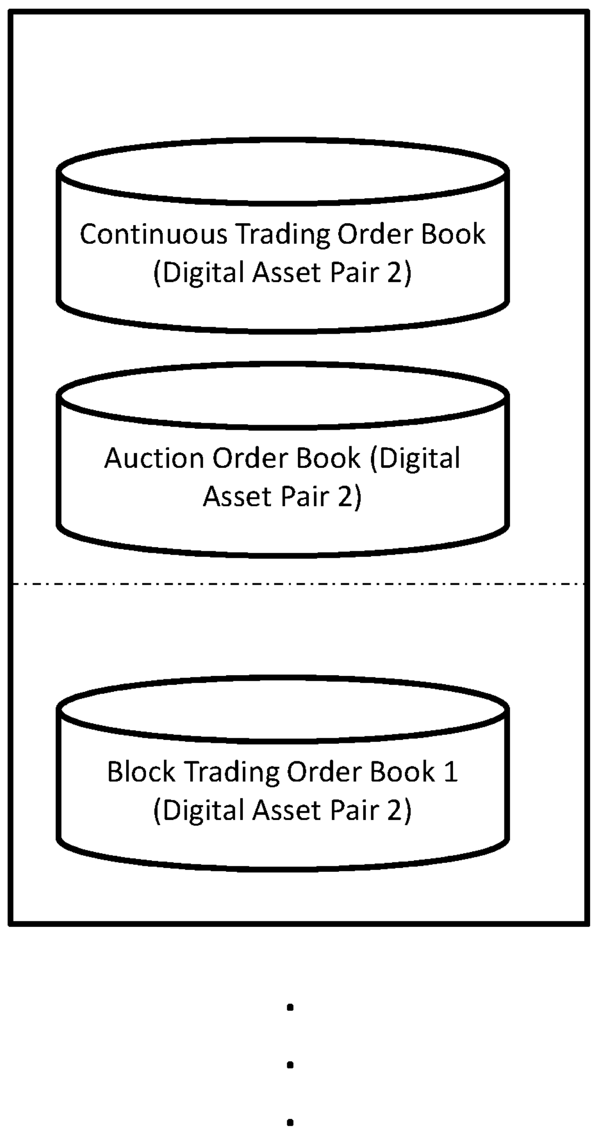
Figures 3, 57:
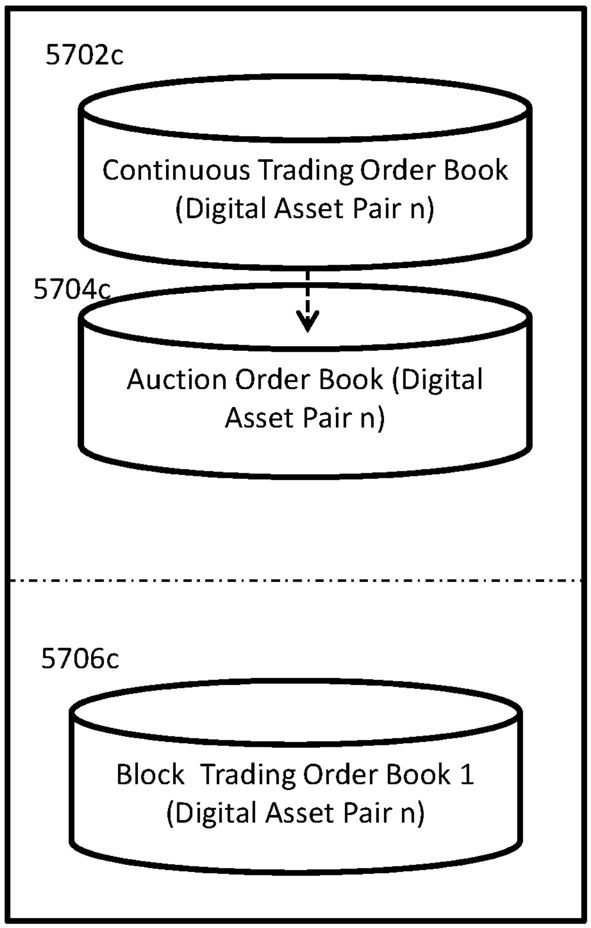

In embodiments, if a block trade order does not result in the order being completely filled as may be determined at step S5620 of FIG. 56A, an optional second indication of interest may be sent to one or more market makers to fill the remaining block trade order, at the worst successful price. Specifically, where it is determined that the first block trade order has not been completely filled at step S5620, the digital asset exchange computer system 3230 may determine a remainder quantity of the digital asset, which is the quantity of digital assets necessary to completely fulfill the first block trade offer at step S5622. In embodiments, the digital asset exchange computer system 3230 will then publish this remainder quantity to at least one market maker and offer the market maker the opportunity to purchase/sell the remainder quantity such that the first block trade offer can be completely fulfilled at step S5624. In embodiments, such a second indication of interest may be sent in price-time priority to the market makers included in the partially filed block order with a second time window to accept or reject the offer. The at least one market maker must transmit the response to accept or reject the offer in the second time window as is indicated in step S5626. By way of example, if the first time window is set at 1 minute for the block order book, the second time window could be set at 5 seconds for the optional second indication of interest. In embodiments, this optional second indication of interest may be sent to each market maker included in the partially filled block trade order, in second time window increments (e.g., every 5 seconds) until the order is completely filled or each of the market makers are exhausted. In embodiments, market makers whose responses were not included in the block order book may receive the optional second indication of interest, if the order is not filled by the market makers included in the order book. In embodiments, the second indication of interest may only be completely filled. In embodiments, the second indication of interest may be partially filled. It is noted that the steps of FIG. 56A are optional since the first block order may remain only partially filled.

In step S5618, the digital asset exchange computer system updates user accounts (including takers and successful market makers in the block trade order book) based on block changes, and lifts, as appropriate, any unused reserves. This update may include any transactions made with respect to the steps of FIG. 56A as well. In embodiments, completed block trade information may be published as part of a public distribution feed. In embodiments, such publication may be time delayed, e.g., for 10 minutes.

EXAMPLES

The following example illustrates embodiments of the present invention. It is not intended to be limiting. It will be appreciated by those of skill in the art that embodiments may be applied to other use cases not specifically called out herein without departing from the present invention.

Example 1

FIG. 59 illustrates an exemplary process flow of messages sent in a block trade order in an exemplary embodiment of present invention.

At time T1 (the initiation of the process), a taker (Fund X) places an order message 5902 to the digital asset exchange computer system 3230 for a block trade order on the buy side of 1,000 BTC at a maximum price of $10,100. At the time T1, the bid/ask spread from the continuous book is $9,999/$10,001.

In response to receipt of the order message 5902, the digital asset exchange computer system 3230 determines the collar to be $9,500 to $10,500 per BTC based on the bid/ask spread at T1, and verifies the request including that taker (FundX) has sufficient funds to perform the transaction. A fund hold is placed on taker's (FundX's) fiat account until the block trade order process is completed based on the amount of the maximum price of $10,100 (e.g., $10,100×1000 units=$1,010,000, in Example 1).

Thereafter, once the block trade order has been verified, and sufficient fiat to cover taker FundX's maximum price has been reserved, the digital asset exchange computer system 3230 publishes message 5904 (the indication of interest message) to each of the n qualified Market Makers Market Maker 1, Market Maker 2 . . . Market Maker n as also shown in FIG. 59. In embodiments, such publication may be made via an automated programming interface (API) connection, such as used by electronic trading programs. As illustrated, the market makers are only shown the quantity and digital asset (e.g., 1,000 BTC in Example 1) to be traded and the collar (e.g., $9,500/10,500 in Example 1) and are not informed of side or price information (e.g., taker is buying and the maximum price set). A time maximum (e.g., 1 minute in Example 1) may be shown as illustrated in message 5904. Market makers are not required to maintain full-reserve, and may be granted operational advances. Operational advance limits are preferably fixed, and generally made on a customer-by-customer basis, and can be adjusted from time to time. In Example 1, the collar is set at plus or minus 5% of the spot price at time T1 as determined by the bid/ask spread of the continuous order book for the digital asset (e.g., BTC). Thus, all trades must execute within this collar.

Market makers may be required to meet a minimum bid requirement (e.g., $50,000 notional in Example 1). In embodiments, market makers can submit multiple price levels on each side.

Once the block order is initiated and published, market makers have a fixed time period (e.g., 1 minute in Example 1) to respond. A timer 5804 may be used to track the time-out period for this block trade order book for request 5902. FIG. 59 illustrates exemplary responses 5906*a*, 55906*b*, 5906*c* provided by Market Maker 1, Market Maker 2 and Market Maker 3 at times T3, T4 and T5 respectively. All of these responses must be received during the time out period (i.e., by time T6=T2 plus 1 minute in Example 1) in order to be considered in the block trade order book for request 5902.

Once these responses are received and the time limit to respond has expired at time T6, the responses 5906*a*, 5906*b* and 5906*c* are crossed with the request 5902 and the block trade order is completed automatically based on the winning matches with no further input from either taker or makers. In Example 1, trades are filled based on price-time priority only and partial fills are permitted. In other words, the best price wins, and if there is a tie, the earliest of the tied prices wins. In embodiments, trades may be filled on other priorities too. The minimum fill size is always at least one block size minimum (e.g., 10 BTC in Example 1) and market makers must quote at least the minimum block size. In Example 1, the trade is completed between Market Maker 1 and taker since Market Maker 1 submitted the best price at the earliest time T3 and that request fills the order.

At time T6, the digital asset exchange computer system 3230 notifies taker that the block trade order is completed in full, via exemplary message 5908*a*. Separately, the digital asset exchange computer system 3230 notifies Market Maker 1, as the winner, via exemplary message 5908*b*, that the order has been filled and the amount and price of the transaction and the amount of digital assets that have been advanced. In embodiments, the market makers that made bids which were not accepted, may optionally be notified that their respective bids failed (not shown). In embodiments, only successful market makers will be notified. In Example 1, the continuous book is not crossed for block trades. Trade information for the block trade order in response to request 5902 may be published on a delayed basis, such as a fixed period (e.g., 10 minutes in Example 1) after the block trade order is completed (time T6 in Example 1).

Example 2

FIGS. 59A-1, 59A-2, and 59A-3 illustrate another exemplary process flow of messages sent in a block trade order in accordance with exemplary embodiments of present invention.

As in FIG. 59, at the initiation of the process (time T1 in Example 2), the taker (Fund X in Example 2) places an order message 5902 to the digital asset exchange computer system 3230 for a block trade order on the buy side of 1,000 BTC at a maximum price of $10,100. As in FIG. 59, at the time T1, the bid/ask spread from the continuous order book for the digital asset (BTC in Example 2) is $9,999/$10,001.

In response to receiving the order message 5902, the digital asset exchange computer system 3230 determines the collar to be $9,500 to $10,500 per BTC based on the bid/ask spread at T1, and verifies the request as noted above. A fund hold is placed on taker FundX's fiat account until the block trade order process is completed based on the amount of the maximum price of $10,100 (e.g., $10,000×1000 units=$1,010,000, in Example 2).

Thereafter, once the block order has been verified, and sufficient fiat to cover taker's (FundX's) maximum price has been reserved, the digital asset exchange computer system 3230 publishes message 5904 including the indication of interest message to each of the n qualified market makers, Market Maker 1, Market Maker 2 . . . Market Maker n, as also shown in FIG. 59. In embodiments, as discussed with Example 1, such publication may be made via an API connection, such as used by electronic trading programs. As illustrated in FIGS. 59A-1, 59A-2, and 59A-3, the market makers are only shown the quantity and digital asset (e.g., 1,000 BTC in Example 2) to be traded and the collar prices (e.g., $9,500/10,500 per BTC unit in Example 2) and are not informed of side or price information (e.g., taker seeks to buy and taker's maximum price). A time maximum (e.g., 1 minute in Example 2) may be shown as illustrated in message 5904. In Example 2, the collar is also plus or minus 5% of the spot price at time T1 as determined by the bid/ask spread of the continuous order book for the digital asset pair. All trades must execute within this collar.

As with Example 1, market makers may be required to meet a minimum bid requirement (e.g., $50,000 notional in Example 2). In embodiments, market makers are submitting multiple price levels on each side.

Once the block order is initiated and published to the market makers, they have a fixed time period (e.g., 1 minute in Example 2) in which to respond. Timer 5804 may be set to track this time-out period. In Example 2, as illustrated in FIGS. 59A-1, 59A-2, and 59A-3, exemplary responses 5906*a*' and 5906*d*' are provided by Market Maker 1 at times T3' and T6', respectively. Market Maker 2 sends exemplary responses 5906*b*' and 5906*e*' at times T4' and T7', respectively. Market Maker 3 sends exemplary responses 5906*c*' and 5906*e*' are sent at times T5' and T8', respectively. Only responses received by the end of the time-out period (Time T9' which is T2 plus 1 minute, in Example 2) will be considered in the block trade order book for request 5902.

Once these responses are received and the time limit has expired at time T9', the responses 5906*a*', 55906*b*', 5906*c*', 5906*d*', 5906*e*', 5906*f* are crossed with the request 5902 and the block trade order is completed automatically as noted above. The trade in Example 2 is partially filled by Market Maker 1 and Market Maker 3, as the matches that meet the price-time priority within the parameters of the block trade order book for request 5902. In particular, Market Maker 1 sells 300 BTC to taker at a price of $10,020, 300 BTC to taker at a price of $10,050 while Market Maker 3 sells 100 BTC to taker at a price of $10,050.

At time T9, the digital asset exchange computer system 3230 notifies taker that the block trade order is partially filled and the prices at which partial fulfilment took place in the exemplary message 5908*a*'. The digital asset exchange computer system 3230 also notifies Market Maker 3 of that that one of their offers has been accepted and the terms of the accepted offer via exemplary message 5908*c*'. Separately, the digital asset exchange computer system 3230 notifies Market Maker 1, as another partial winner, via exemplary message 5908*b*', that their offers have been accepted and filled and the amount and prices of these transactions.

Since taker's order is only partially fulfilled, the digital asset exchange computer system 3230 may offer one or more successful market makers the opportunity to fulfill the remainder of taker's order. In embodiments, the successful market makers may be offered the opportunity to fulfill the remainder of taker's order. In embodiments, the market maker offering the best price, Market Maker 1 in Example 2, is offered the opportunity to fulfill the remainder of the order at the best price in message 5908*b*'. In embodiments, market makers must respond to the opportunity to fulfill the remainder of the order within a second time limit (e.g. 5 seconds, 10 second or 15 seconds to name a few). In embodiments, Market Maker 3, may be offered an opportunity to fulfill the remainder of the taker's order in message 5908*c*', if Market Maker 1 does not accept this opportunity within the time limit. In other embodiments, Market Maker 1 and Market Maker 3 may each be offered the opportunity to fulfill a portion of the remainder of the order in the messages 5908*b*' and 5908*c*'. In embodiments, all of the market makers may be offered the opportunity to fulfill the remainder of the order with the market maker first to respond with the best price being awarded the remainder of the order. In embodiments, the remainder may run as a new order book, with either the same time limits, or shorter time limits. In any event, as in FIG. 59, trade information to the extent completed, whether it be for the entire order or a portion thereof, may be published on a delayed basis, such as, after a fixed period (e.g., 10 minutes in Example 2) after time T9, when the block trade order is completed.

Non-Custodial Trading Using Scripted Accounts

Customers of a digital asset exchange may, in embodiments, trade digital assets on a digital asset exchange using bi-directional channels and one or more scripted accounts via an application programing interface (API). Trading via an API using bi-directional channels and one or more scripted accounts enables a customer to trade digital assets on a digital asset exchange while minimizing the risk of losing digital assets due to a data incident or data breach. As used herein, a scripted account is one or more scripted accounts which include at least one scripting limitation. The at least one scripting limitation, in embodiments, may specify instances that require multiple signatures to authorize a transaction. In embodiments, the at least one scripting limitation may specify instances that do not require multiple signatures to authorize a transaction. In embodiments, the scripted account may be a pay-to-script-hash (P2SH) account. In embodiments, alternative to and/or in combination with the one or more scripted accounts, customers of a digital asset exchange may trade digital assets on a digital asset exchange using bi-directional channels and one or more smart contracts.

Trading digital assets on a digital asset exchange may require a customer to pre-fund a scripted account. Using one or more scripted accounts, in embodiments, adds an extra layer of security to the digital assets being traded by the customer. For example, the scripted account may include instructions that authorize transactions signed by a private key associated with the customer, preventing the digital asset exchange from unilaterally accessing the funds associated with the customer. As another example, the scripted accounts may prevent the authorization of transactions before a predetermined amount of time has elapsed. Continuing the example, during this predetermined amount of time, the customer may send orders and transaction requests signed by the customer private key to the digital asset exchange. In embodiments, the orders and transaction requests may be recorded and/or stored off the blockchain by the digital asset exchange until the predetermined amount of time has elapsed. Once the predetermined amount of time has elapsed, in embodiments, the digital asset exchange may have the authority to settle the transactions, executing the digitally signed transaction requests. The transactions, when executed, in embodiments, may result in both the digital asset exchange receiving the digital assets which were requested to be transferred out of the scripted account address and the customer receiving any remaining digital assets in the scripted account.

In embodiments, one or more channels may be set up between two or more digital asset exchanges, so that each channel may transfer digital assets using one-way or bi-directional channels. In embodiments, channels may be created using scripted accounts (such as used with Bitcoin), and/or smart contracts (such as used with Ether), to name a few. In embodiments, one or more channels between two exchanges having a common customer may be used. For example, the common customer may request that digital assets be transferred from exchange 1 to exchange 2, and a channel between the two exchanges can be used for an instant transfer. This embodiment overcomes technical challenges created by on-chain transfer which not only take transaction time, but also incur transactions fees.

Figure 76:
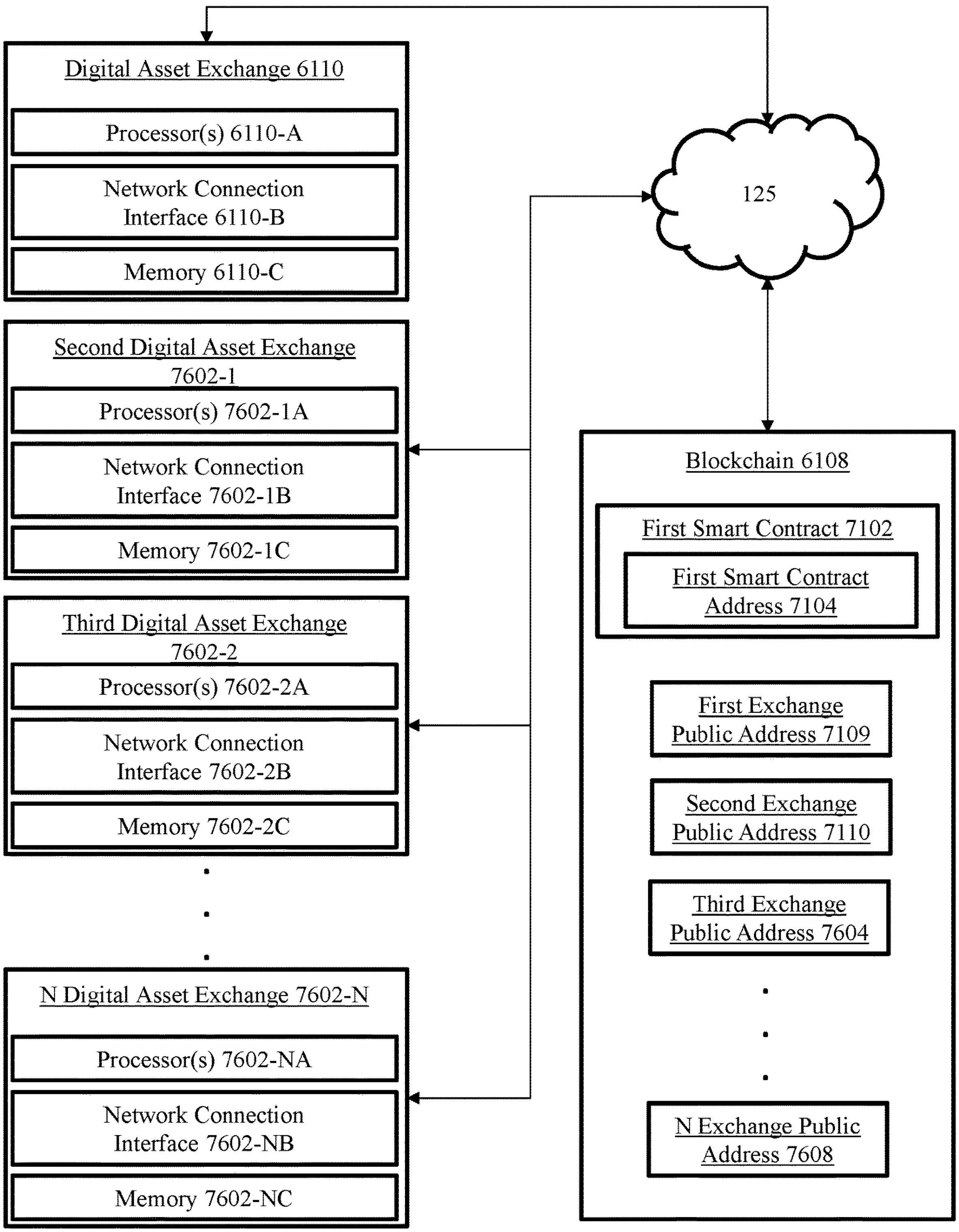
FIG. 76 is an exemplary block diagram illustrating a multiple digital asset exchanges communicating with one another via a blockchain in accordance with exemplary embodiments of the present invention.

Referring to FIG. 76, multiple digital asset exchanges (e.g., Digital Asset Exchange 6110, Second Digital Asset Exchange 7602-1, Third Digital Asset Exchange 7602-2 . . . N Digital Asset Exchange 7602-N, to name a few) may each have public addresses (e.g. first exchange public address 7109, second exchange public address 7110, third exchange public address 7604 . . . N exchange public address 7608, respectively, to name a few) on the blockchain 6108. While FIG. 76 illustrates N Digital Asset Exchanges, in embodiments, there may be only two Digital Asset Exchanges, three Digital Asset Exchanges, or more to name a few. Continuing the example, the first customer may be a customer of Digital Asset Exchange 6110 (e.g. the first digital asset exchange) and the Second Digital Asset Exchange 7602-1. From a customer perspective, in embodiments, to trade a first amount of a first digital asset from the digital asset exchange 6110 to the second digital asset exchange 7602-1, the customer may only have to submit an order to the first digital asset exchange 6110, resulting in the execution of the order by both digital asset exchanges. From a digital asset exchange perspective, digital asset exchanges, in embodiments, may receive a plurality of orders from a plurality of customers. Many of the plurality of orders placed by customers may be inter-exchange orders. To accommodate the number of customers placing inter-exchange orders, the digital asset exchange 6110 and the second digital asset exchange 7602-1 may use a bi-directional channel, or more than one bi-directional channels, and one or more of: one or more scripted accounts, and/or one or more smart contracts, to name a few to transfer assets between the exchanges.

In embodiments, trading may be performed using bi-directional channels which may enable both digital asset exchanges to fill inter-exchange orders while minimizing the risk of losing digital assets due to a data incident or data breach.

In embodiments, trading digital assets on a digital asset exchange may require one or both of the digital asset exchanges to pre-fund a channel, such as a scripted account and/or smart contract. In embodiments, both digital asset exchanges may be required pre-fund the channel with a predetermined amount of digital asset. The predetermined amount of digital asset, in embodiments, may refer to a particular number of digital asset (e.g. 10 Bitcoin) and/or a value of the digital asset (e.g. $100,000 worth of Bitcoin). For example, a first digital asset exchange and a second digital asset exchange may be required to pre-fund the channel with, e.g., 50 Bitcoins.

In embodiments, using one or more channels may add an extra layer of security to the exchange of digital assets by the digital asset exchanges. For example, the scripted account and/or smart contract may include instructions that authorize transactions signed by a private key associated with the first digital asset exchange (e.g. digital asset exchange 6110), preventing the second digital asset exchange (e.g. second digital asset exchange 7602-1) from unilaterally accessing the funds associated with the first digital asset exchange. As another example, the channels may prevent the authorization of transactions before a predetermined amount of time has elapsed. Continuing the example, during this predetermined amount of time, the first digital asset exchange may send interim orders and transaction requests signed by a private key associated with the first digital asset exchange to the second digital asset exchange to alter the balance of digital assets to be associated with the first digital asset exchanges and the second digital asset exchange. In embodiments, the orders and transaction requests may be recorded and/or stored off the blockchain by the second digital asset exchange (and/or the first digital asset exchange) until the predetermined amount of time has elapsed. Once the predetermined amount of time has elapsed, in embodiments, the second digital asset exchange may have the authority to settle the transactions, executing the digitally signed transaction requests. The transactions, when executed, in embodiments, may result in both the second digital asset exchange receiving the digital assets which were requested to be transferred out of the scripted account address and the first digital asset exchange receiving any remaining digital assets in the scripted account. In embodiments, the execution of the transaction may be implemented on the blockchain.

In embodiments, the orders between the digital asset exchanges may represent one or more orders from customers seeking to make an inter-exchange transaction.

Referring to the process illustrated in connection with FIGS. 63A-63D, in embodiments, the process of trading on a digital asset exchange 6110 using bi-directional channels and scripted accounts via an application programing interface (API) 6107 may begin at step S6302. At step S6302*a* first user device 6104 associated with a customer (e.g. first customer 6202) may connect with a digital asset exchange computer system 6102 associated with the digital asset exchange 6110 via API 6107 associated with the digital asset exchange computer system 6102. The connection, in embodiments, may allow the first user device 6104 to communicate with the digital asset exchange computer system 6104 over network 125 using API 6107 of the digital asset exchange computer system 6104, as shown in connection with FIG. 61A. To connect with the digital asset exchange computer system, a user device associated with the customer (e.g. first customer 6202) may send a request from the first user device 6104 to the digital asset exchange computer system 6102 via network 125. In embodiments, in response to receiving the request, the digital asset exchange computer system 6102 may process and accept the request and set up the connection. In embodiments, a completed connection may be signaled and/or confirmed by the digital asset exchange computer system 6102 by generating and transmitting a confirmation message to the first user device 6104.

In embodiments, once the connection between the digital asset exchange computer system 6102 and the first user device 6104 is established, at step S6304, a first mathematical puzzle and corresponding first mathematical solution may be generated. In embodiments, the digital asset exchange computer system 6102 may generate the first mathematical puzzle and first mathematical solution. In embodiments, the timing of the generation of the puzzle may vary. For example, puzzles may be pre-generated in advance of the communication channel being first created, and/or may be generated on the fly at some point after the first API connection used to establish the channel. In embodiments, as described above, the bi-directional channel may be between a first digital asset exchange computer system 6102 and a second digital asset exchange computer system associated with the second digital asset exchange 7602-1. In embodiments, a first mathematical puzzle and corresponding first mathematical solution may be generated by the first digital asset exchange computer system 6102. In embodiments, the second digital asset exchange computer system may generate a second mathematical puzzle and corresponding second mathematical solution.

To generate the first mathematical puzzle and solution and the second mathematical puzzle and solution, the digital asset exchange computer system 6102 may, in embodiments, provide an algorithm used to generate the puzzle and solution. In embodiments, and as used herein, algorithm and/or hash algorithm, may refer to one or more of the following: (1) a mathematical algorithm; (2) a one-way hash function; (3) a cryptographic hash function; (4) a one-way function; (5) a trapdoor one-way function; (6) a Data Encryption Standard encryption algorithm; (7) a Blowfish encryption algorithm; (8) An Advanced Encryption Standard or Rijndael encryption algorithm; (9) a Twofish encryption algorithm; (10) an IDEA encryption algorithm; (11) an MD5 encryption algorithm; (12) an MD4 encryption algorithm; (13) a SHA 1 hashing algorithm; (14) an HMAC hashing algorithm; and/or (15) an RSA Security algorithm, to name a few. The algorithm, in embodiments, may be applied to a puzzle seed that is obtained by the digital asset exchange computer system 6102. In embodiments, the puzzle seed may be a randomly generated series of numbers, letters, and/or characters. Alternatively, in embodiments, the puzzle seed may be a semi-randomly generated series of numbers and/or letters based on at least one of the following: (1) the first user public address (e.g. the public address associated with the first customer 6202); (2) a first exchange public key (e.g. the first exchange public key 6122-1 associated with the digital asset exchange computer system 6102); (3) a second exchange public key (e.g. the second exchange public key 6122-2 associated with the digital asset exchange computer system 6102); and/or (4) a third exchange public key (e.g. the third exchange public key 6122-3 associated with the digital asset exchange computer system 6102), to name a few. In embodiments, the first user public address may be a public address on blockchain 6108 and associated with the first customer 6202. The first user public address may be associated with the first user public key 6120. In embodiments, the first user public key 6120 may correspond to a first user private key—which combined may be a first user key pair.

In embodiments, one or more processor(s) 6102-A of the digital asset exchange computer system 6102 may apply an algorithm to a puzzle seed to generate a first mathematical puzzle. Continuing the example, the algorithm may be applied to the first mathematical puzzle. The result of the second application of the algorithm may be the corresponding first mathematical solution. In embodiments, the algorithm may be applied a plurality of times, resulting in a plurality of mathematical puzzles and corresponding solutions. Thus, in embodiments, the first mathematical puzzle may be a plurality of mathematical puzzles. Similarly, the corresponding first mathematical solution may be a plurality of mathematical solutions. The below table is an example of an overly simplified algorithm applied to a puzzle seed, resulting in a plurality of mathematical puzzles and corresponding solutions, merely for exemplary purposes. For the purposes of the example in the below table, (1) the puzzle seed is 123456; and (2) the algorithm applied is X*4+5, where X represents the puzzle seed. Thus, the first puzzle may be (123456)*4+5, or in other words, 493829.

TABLE 1-A

| | Puzzle | Solution |
|---|---|---|
| First Puzzle/Solution: | 493829 | 1975321 |
| Second Puzzle/Solution: | 1975321 | 7901289 |
| Third Puzzle/Solution: | 7901289 | 31605161 |
| Fourth Puzzle/Solution: | 31605161 | 126420649 |
| Fifth Puzzle/Solution: | 126420649 | 505682601 |

As another example, below is a second table illustrating an exemplary generation of puzzle sequences for a sequence of length 5.

TABLE 1-B

| | Value |
|---|---|
| Puzzle Seed: | fd8c373d34931f7c2edad4d82c09c3e120ee0b2a094164f6124f0d4d768d5748 |
| Puzzle #5 | 7452fa77c71f7a2696e5e81177c80a8fb5c71bdf1dcee2d4b2c94b2aba7ccfb2 |
| Puzzle #4 | 448cd914d4baaa94940d9ef6d0674a94d743fd3bb3ece91f2295c7f1eac5fa0a |
| Puzzle #3 | 0e136f49bf847edc0ccf35a90a2dbd87b551439a2cea1b8ff817f950c0e8061e |
| Puzzle #2 | 5af2db926af985f25e2ddbcdb24db5f58a44476ea840bbbd4a51c0d978b4852c |
| Puzzle #1 | 689af04fa477accc9fe21482e3cf1c44842b29b5cbb8e7f022797ce7f1301c3b |

Table 1-B, in embodiments, may be an example of an asymmetric puzzle. An asymmetrical puzzle sequence, for example, may refer to a puzzle sequence including N puzzles, where the Nth puzzle is generated first, based off the seed. Continuing the example, the second puzzle in the puzzle sequence, the N−1 puzzle, may be generated second based of the Nth puzzle. This may continue until the first puzzle is generated. The diagram shown in connection with FIG. 77 illustrates an exemplary order in which an exemplary asymmetric puzzle sequence may be generated.

Referring to FIG. 77, the seed is hashed to create the Nth puzzle, which is hashed to create the N−1 Puzzle which continues until the Second Puzzle is hashed to create the First Puzzle. Hashed, as used herein, may refer to the application of a hash algorithm.

In practice, the algorithm and seeds used to generate a puzzle and solution will be more complex, each layer potentially using a different algorithm to increase complexity and avoid reverse engineering of puzzle solutions. In embodiments, by building a nested puzzle/solution basis, where the current solution to the current puzzle is the next puzzle, the process can be more efficient.

As shown in Table 1-A, in embodiments, the first mathematical solution may correspond to the second mathematical puzzle. Similarly, the second mathematical solution may correspond to the third mathematical puzzle. Moreover, the third mathematical solution may correspond to the fourth mathematical puzzle. Furthermore, the fourth mathematical solution may correspond to the fifth mathematical puzzle. In embodiments, the digital asset exchange computer system 6102 may continue applying the algorithm, generating dozens, hundreds, thousands, millions, and/or billions of puzzle/solution combinations. In embodiments, each puzzle/solution combination may be unrelated. In embodiments, the first user device 6104 may generate the first mathematical puzzle and corresponding solution. In embodiments, alternative to or in connection with puzzles and solutions, the present invention may utilize one or more additional protocols such as the eltoo protocol.

The corresponding first solution to the first mathematical puzzle may be used to protect the first customer 6202 in the event of a security incident or breach (described more fully below in connection with FIG. 63F, the description of which applying herein). If there is a security incident or breach, the digital asset exchange computer system 6102 may transmit the solution to the corresponding solution to the first user device 6104 to allow the first customer 6202 to retrieve any and/or all digital assets at risk before the first-time designation has transpired. Because the solution may enable a customer to drain a scripted account prematurely and/or retrieve assets that were previously transferred or sold via a transaction during the first-time designation, in embodiments the digital asset computer exchange system 6102 may only transmit the mathematical puzzle to the first user device 6104, storing the corresponding solution for later use if needed.

Figure 61A:
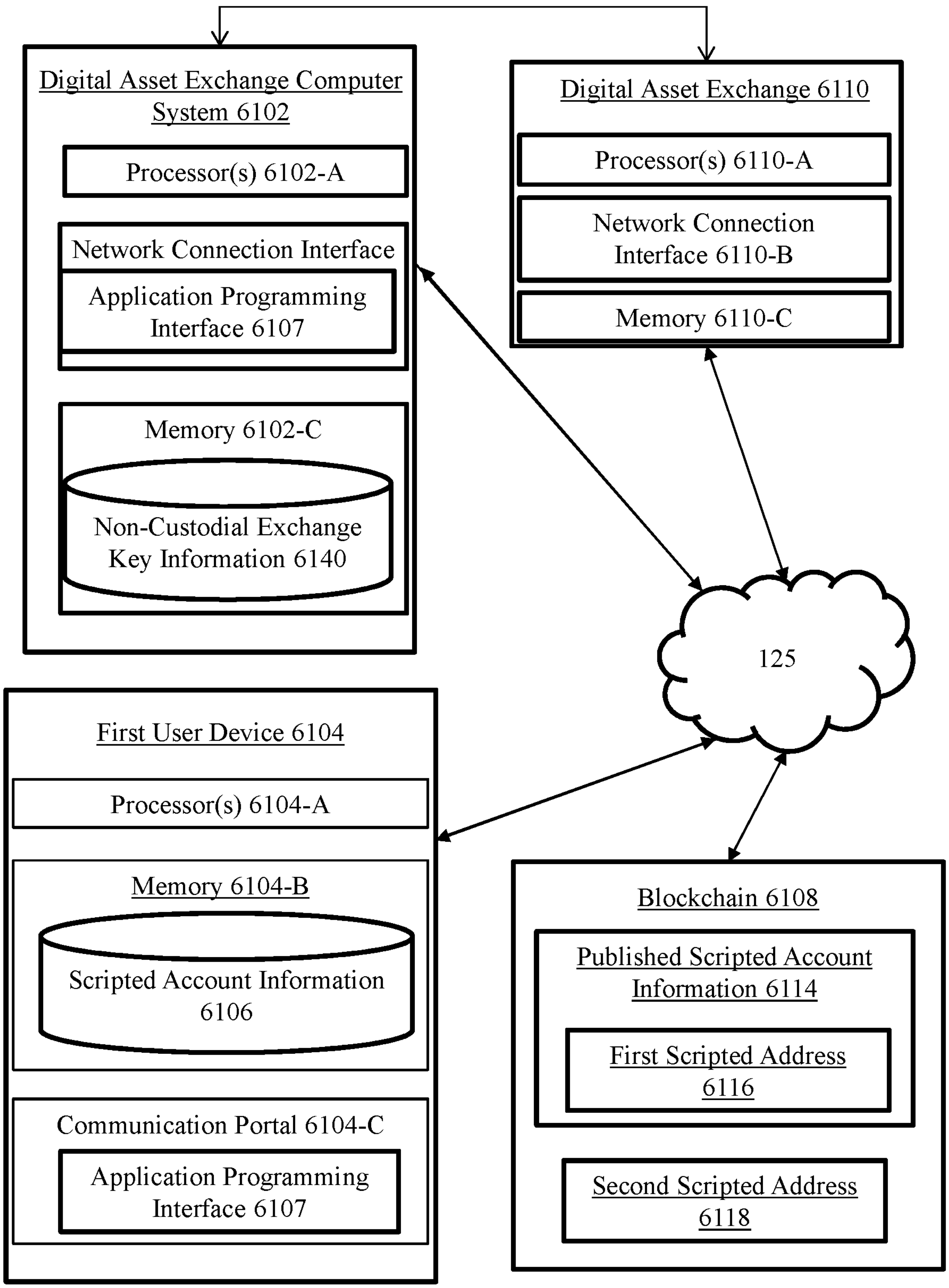
FIG. 61A is an exemplary block diagram illustrating a digital asset exchange computer system communicating with a first user device via an application programming interface (API) in accordance with exemplary embodiments of the present invention.
Figure 61B:
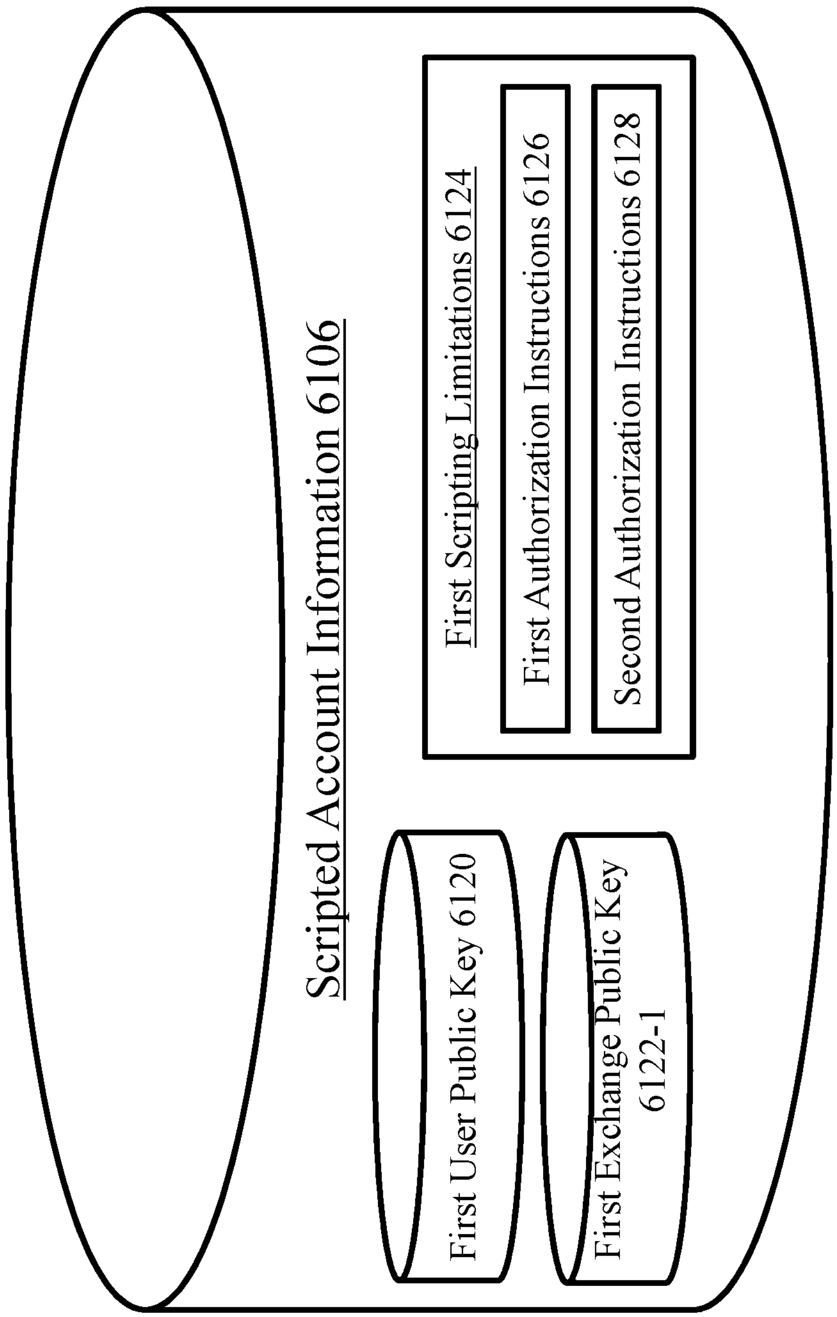
FIGS. 61B-61C are exemplary block diagrams illustrating scripted account information in accordance with exemplary embodiments of the present invention.
Figure 61C:
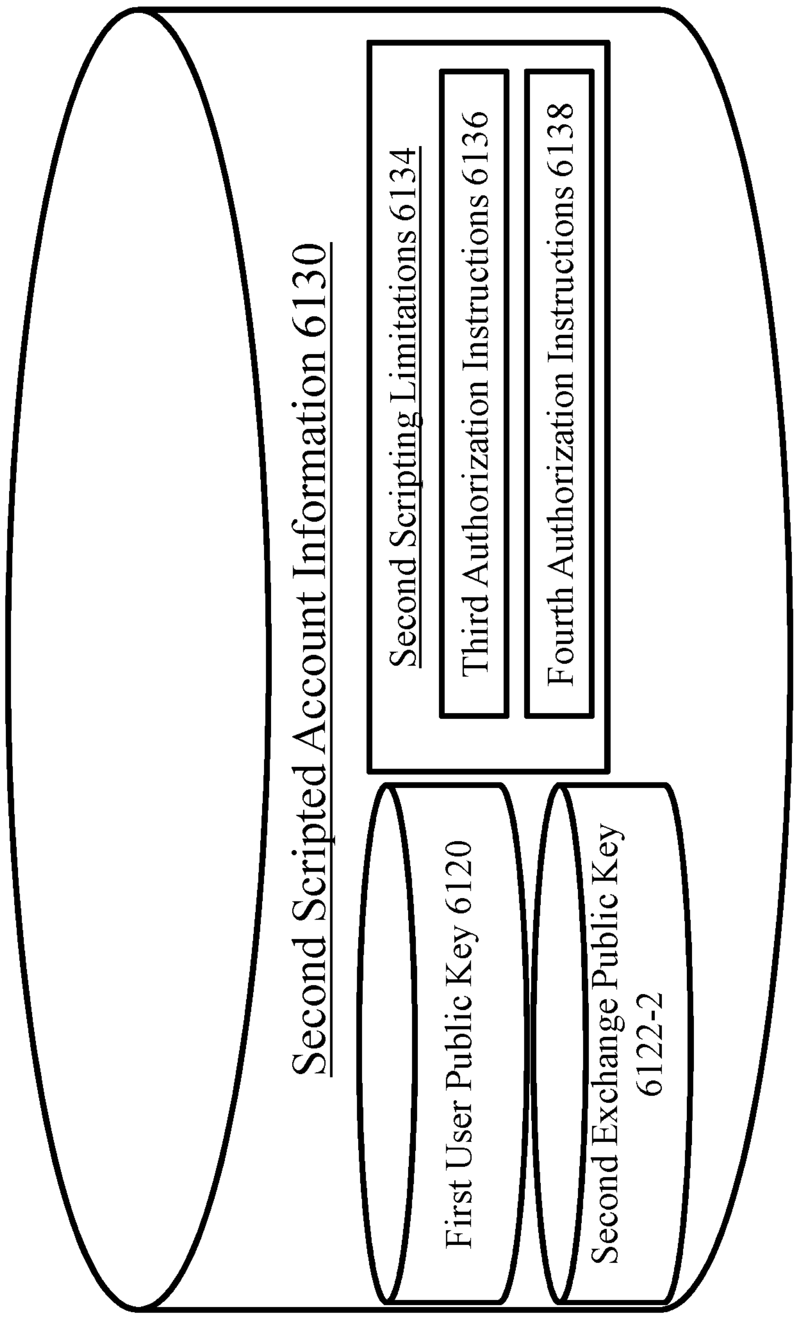
Figure 61D:
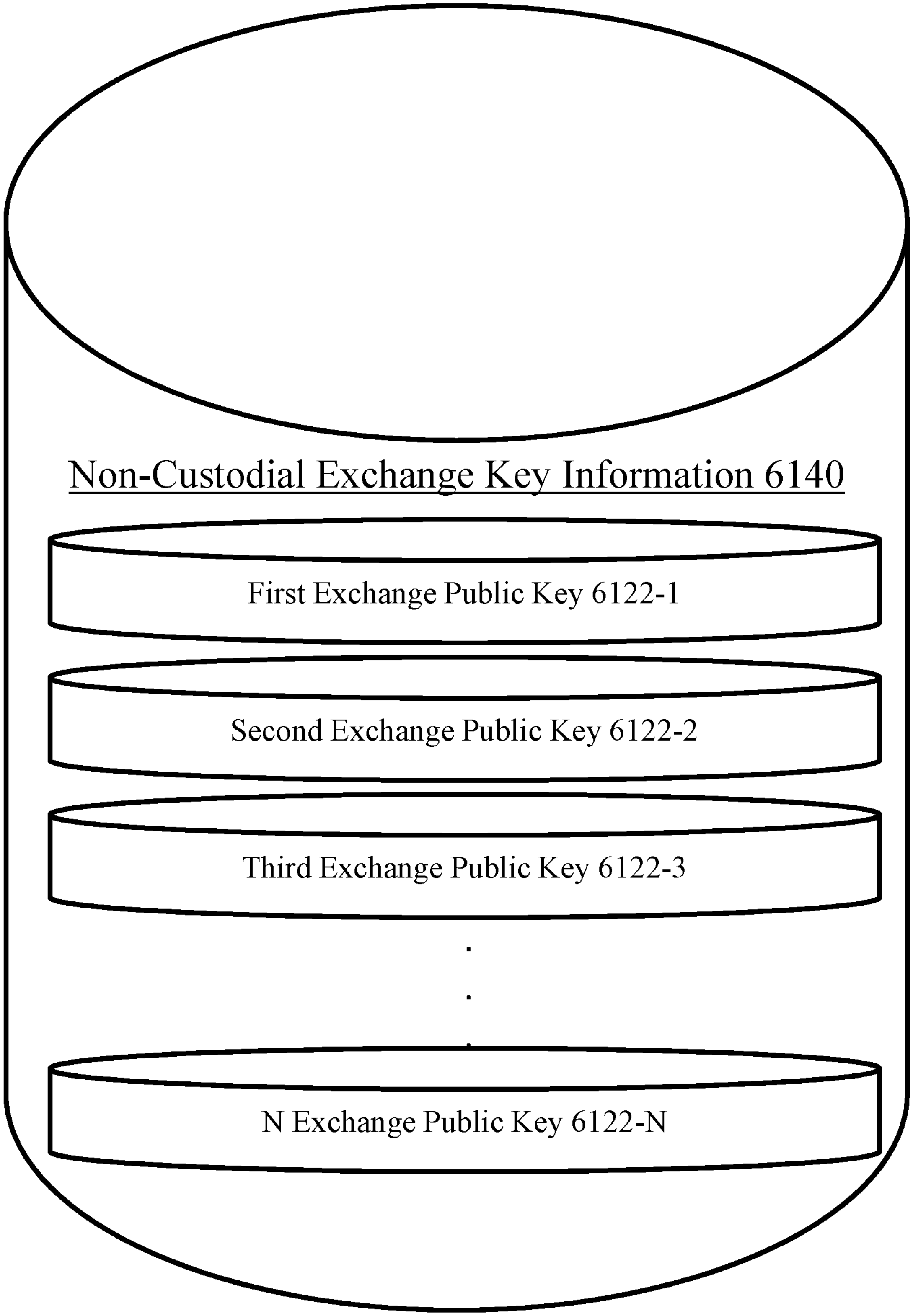
FIG. 61D is an exemplary block diagram illustrating non-custodial exchange key information in accordance with exemplary embodiments of the present invention.

At step S6306, in embodiments, the digital asset exchange computer system 6102 may provide non-custodial exchange key information 6140. Referring to FIGS. 61A and 61D, the non-custodial exchange key information 6140 may be stored on memory 6102-C of the digital asset exchange computer system 6102. The non-custodial exchange key information 6140 may be the information required by the first user device 6104 to trade on the digital asset exchange. The non-custodial exchange key information 6140, as shown in FIG. 61D, may include a plurality of exchange public keys. For example, the non-custodial information may include a first exchange public key 6122-1, a second exchange public key 6122-2, a third exchange public key 6122-3 . . . and an N exchange public key 6122-N. Each exchange public key, in embodiments, may be used for a different purpose. For example, the first exchange public key 6122-1 may be used for the creation of a first scripted address associated with a first scripted account. As another example, the second exchange public key 6122-2 may be used to generate orders and/or transaction requests (e.g. trades on the digital asset exchange). As yet another example, the third exchange public key 6122-3 may be used to generate a settlement transaction (e.g. the final transaction that sums up and finalizes all of the orders and/or transactions between the first customer 6202 and the digital asset exchange 6110).

In embodiments, as described above, the bi-directional channel may be between a first digital asset exchange computer system 6102 and a second digital asset exchange computer system associated with the second digital asset exchange 7602-1. In embodiments, non-custodial key information 6140 may be provided by both the digital asset exchange computer system 6102 and the second digital asset exchange computer system.

In embodiments, each exchange public key may be associated with the digital asset exchange 6110 and correspond to a respective private key. For example, the first exchange public key 6122-1 may correspond to a first exchange private key—which, together may be a first key pair. As another example, the third exchange public key 6122-3 may correspond to a third exchange private key—which, as with above, together may be a third key pair. In embodiments, each exchange public key may be mathematically related to its respective exchange private key. Each exchange public key, in embodiments, may correspond to a respective public address associated with a digital asset. For example, the second exchange public key 6122-2 may correspond to a second exchange public address associated with the digital asset. As yet another example, the N exchange public key 6122-N may correspond to an N exchange public address associated with the digital asset. The digital asset, in embodiments, may be maintained on a distributed public transaction ledger maintained in the form of a blockchain (e.g. blockchain 6108) by a plurality of geographically distributed computer systems in a peer-to-peer network in the form of a blockchain network. In embodiments, the first exchange public key 6122-1, the second exchange public key 6122-2, the third exchange public key 6122-3 . . . and the N exchange public key 6122-N may all be the same public key, and thus same corresponding private key. In embodiments, the first key set may be the same or different than the second key set and/or third key set, to name a few. Similarly, the second key set may be the same or different than the third key set. In embodiments, each key set may also be unique.

The non-custodial exchange key information 6140, in embodiments, may also include first scripting limitations 6124; second scripting limitations 6134; and/or authorized public key information, to name a few. The first scripting limitations 6124 may be scripting limitations associated with a first scripted account which may include authorization instructions (e.g. first authorization instructions 6126 and second authorization instructions 6128). The authorization instructions may define scenarios where transaction requests received by the first scripted account are authorized. For example, the authorization instructions may authorize transactions only if either: (1) the transaction request is signed by two private keys, one being associated with the first customer 6202 and the second being associated with the digital asset exchange 6110; or (2) the transaction request is signed by a private key associated with the customer and is received after a predetermined amount of time has transpired. Continuing the above example, the first scripting limitations may include first authorization instructions that require transactions to be received from a public address associated with the customer (e.g. the first user public address and the first customer 6202 respectively) that are digitally signed by both a private key associated with the public address and a private key associated with an exchange public address.

Figure 62A:
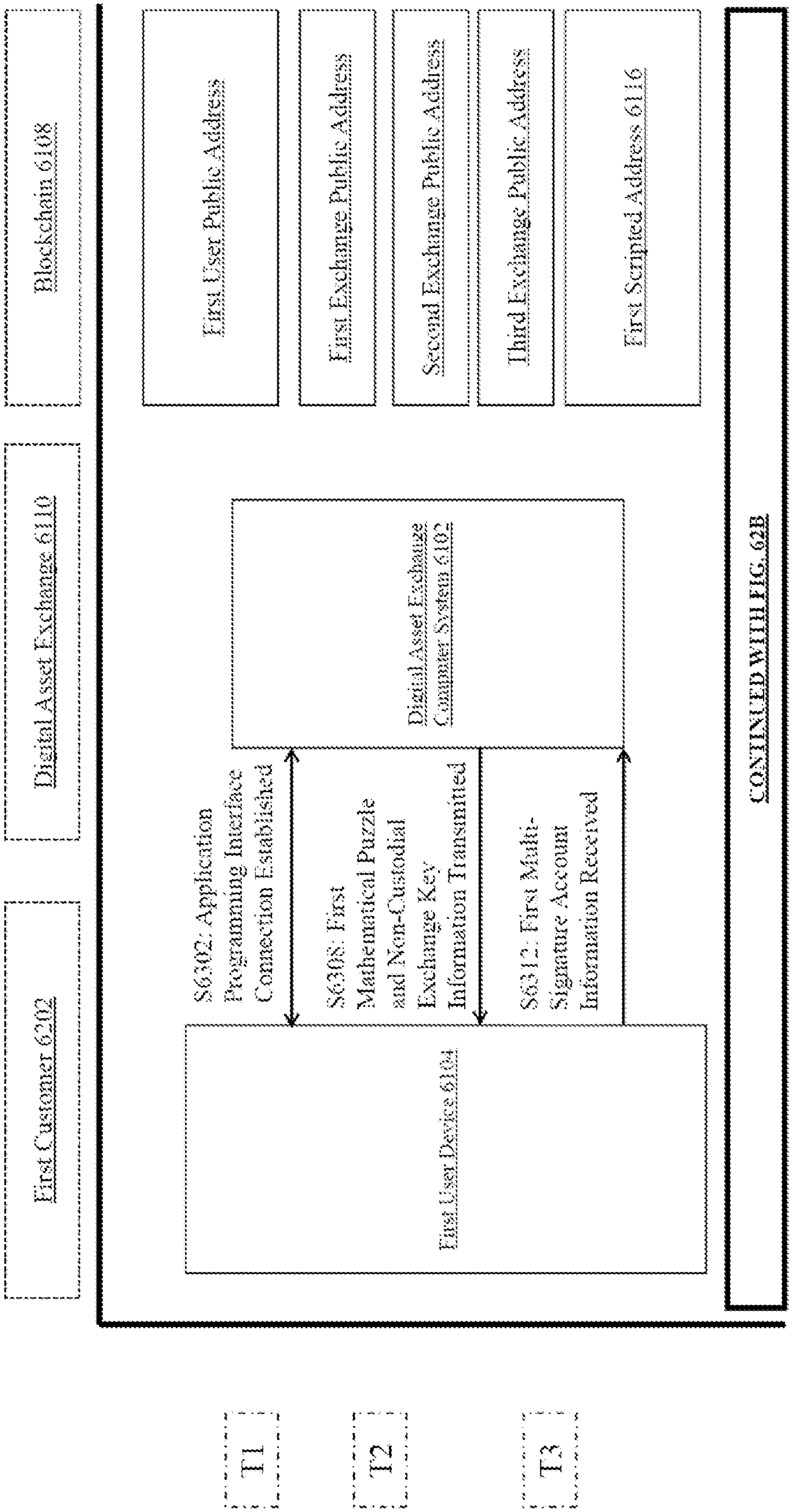
FIGS. 62A-62E are conceptual flow diagrams illustrating a customer trading on a digital asset exchange via an API between a digital asset exchange computer system and a first user device in accordance with exemplary embodiments of the present invention.
Figure 62B:
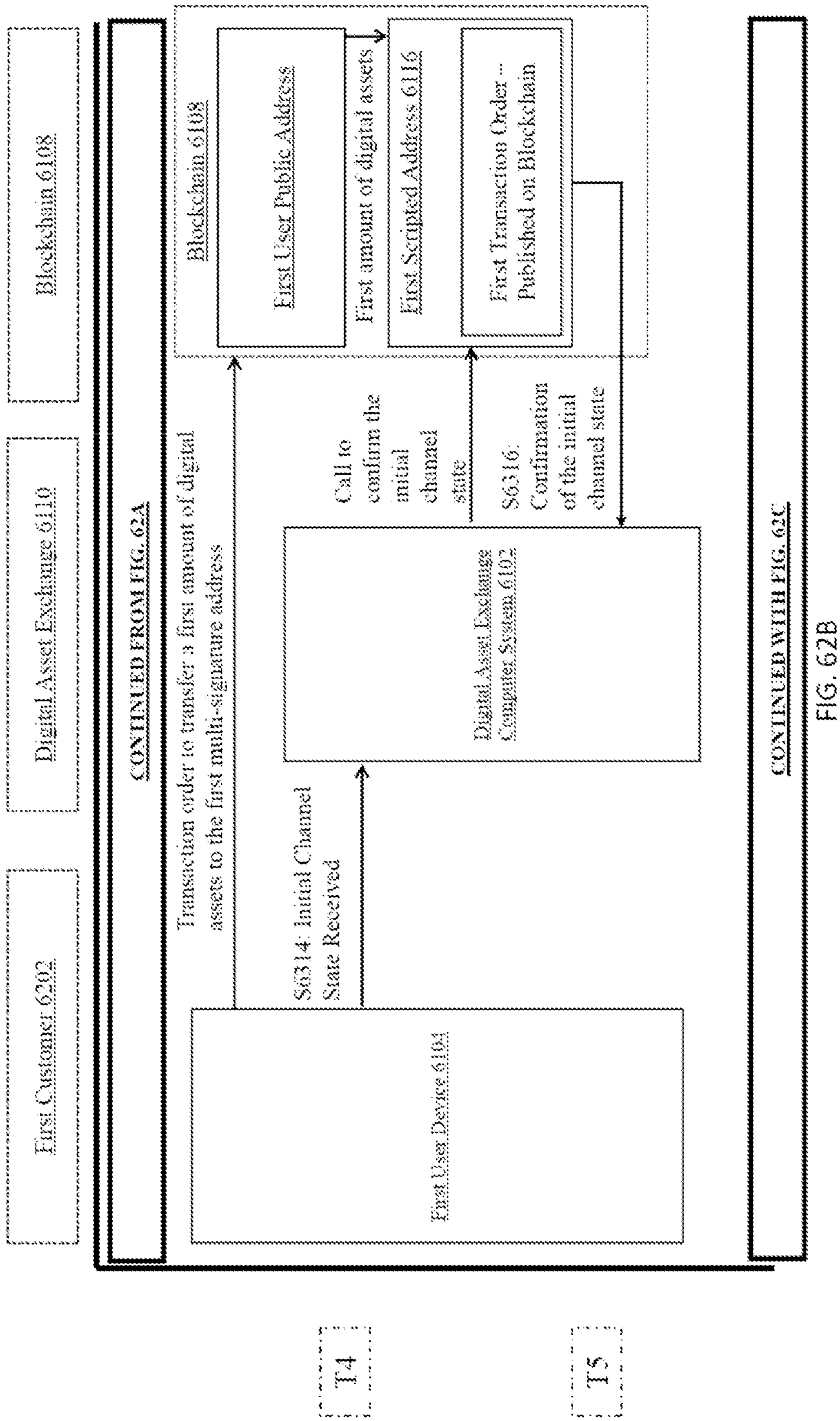
Figure 62C:
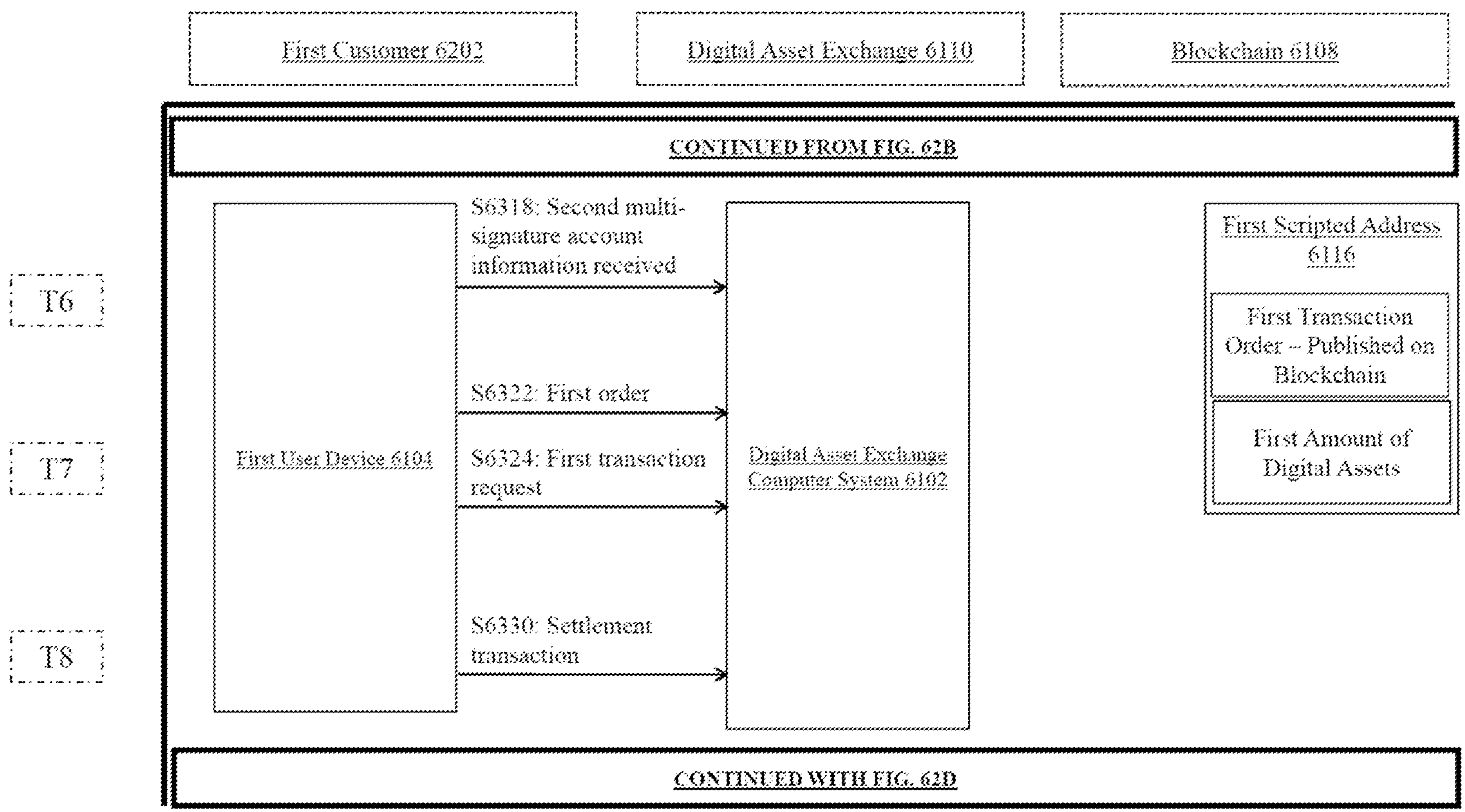
Figure 62D:
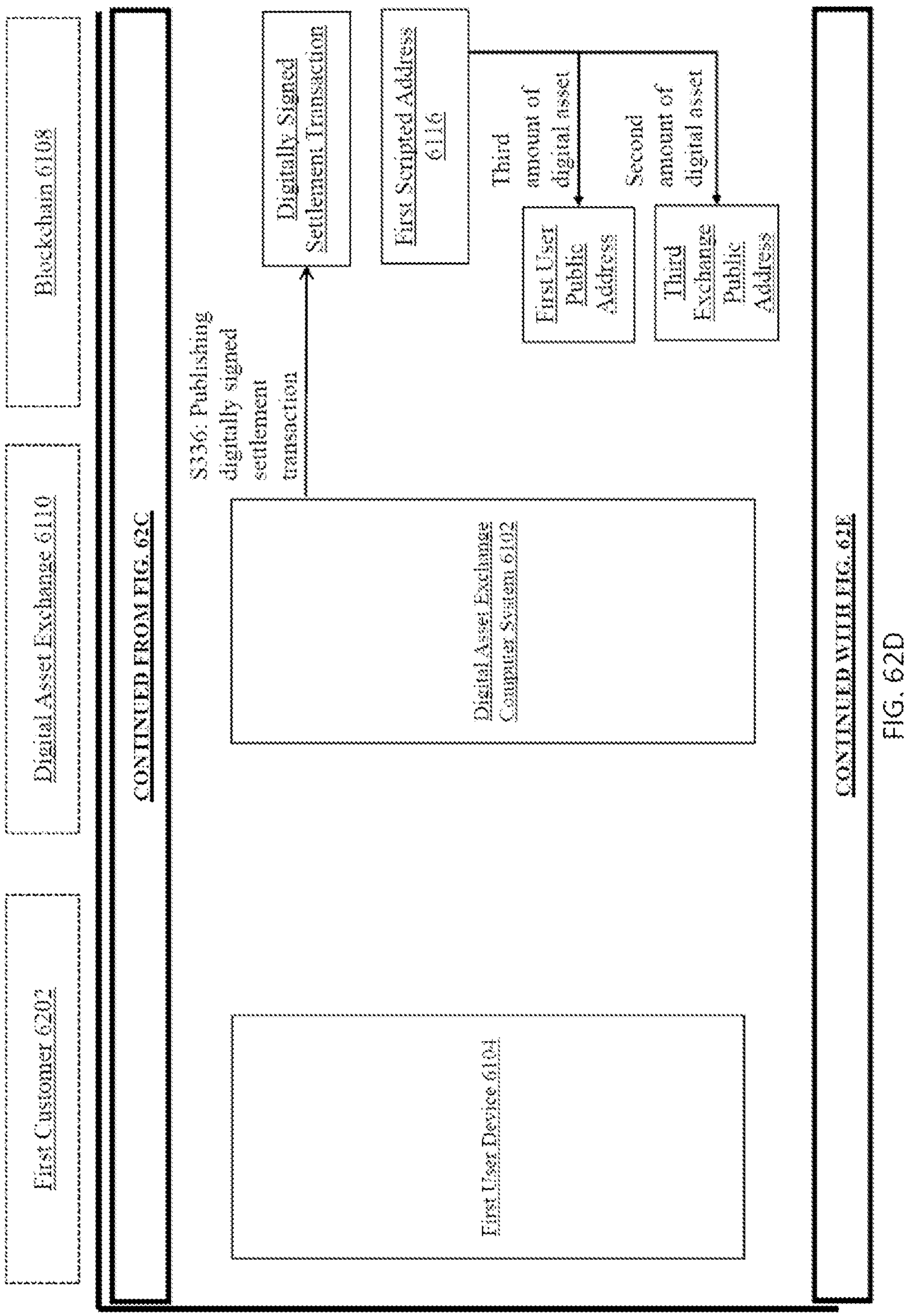

Continuing the above example, the first scripting limitations may also include second authorization instructions that require transactions digitally signed by a private key associated with the public address associated with the customer. The first-time designation, in embodiments, may refer to a specific time, e.g., 6:00 PM EST. For example, referring to FIGS. 62A-62E, the first customer 6202 may begin its trading session at time T1 (e.g., the beginning of the day), the time at which the first user device 6104 and the digital asset exchange computer system 6102 have established a connection. Time T1 (as shown in FIG. 62A), for the purposes of this example, T1 may refer to 9 AM. The first-time designation, in embodiments, may be represented by time T9 (as shown in FIG. 62D), which for the purposes of this example may refer 5 PM. Thus, in this example, the first-time designation transpires at 5 PM.

The second scripting limitations 6134 may be scripting limitations associated with a second scripted account which may also include authorization instructions (e.g. third authorization instructions 6136 and fourth authorization instructions 6138). Similarly, the authorization instructions may define scenarios where transaction requests received by the second scripted account are authorized. For example, the authorization instructions may authorize transactions only if either: (1) the transaction request is signed by a private key associated with the digital asset exchange and is received after the predetermined amount of time has transpired (the third authorization instructions 6136); or (2) the transaction request is signed by a private key associated with the customer and includes the first mathematical solution (the fourth authorization instructions 6138). In embodiments, a scripted account may include one or more scripting limitations.

The authorized public key information, in embodiments, may identify one or more public keys that the first customer 6202 has identified as an authorized public key for the purposes of trading on the digital asset exchange 6110. For example, the authorized public key information may indicate that the first user public key 6120 is an authorized public key associated with the first customer 6202. The authorized public key information, in embodiments, may be stored and later accessed by the digital asset exchange computer system 6102 for the purposes of verifying one or more of the following: (1) the first customer 6202; (2) messages received on behalf of the first customer 6202; (3) orders placed by the first customer 6202; (4) transaction requests received from the first customer 6202; and/or (5) scripted account information received from the first customer 6202, to name a few. In embodiments, the authorized public key information may be a whitelist (described more fully below).

The first mathematical puzzle and/or non-custodial trading information may be provided, in step S6308, to the customer. In embodiments, the digital asset exchange computer system 6102 may transmit the first mathematical puzzle and/or non-custodial trading information to the first user device 6104 via network 125. In embodiments, the digital asset exchange computer system 6102 may provide the first mathematical puzzle and/or non-custodial trading information to the first customer 6202 via an intermediary. For example, the digital asset exchange computer system may publish the non-custodial trading information on a website. The website, in embodiments, may be password protected such that the first customer 6202 may be the only person capable of accessing the non-custodial trading information. In embodiments, the website may be publicly available.

In embodiments, the first user device 6104 or the digital asset exchange computer system 6102 may generate first scripted account information 6106. In embodiments, the first scripted account information 6106 may be information associated with the first scripted account (e.g. scripting limitations) which may enable both the customer 6202 and the digital asset exchange 6110 to understand and abide by the limitations associated with the first scripted account and corresponding address. For example, referring to FIG. 61B, the first scripted account information 6106 may include: (1) the first user public key 6120; (2) the first exchange public key 6122-1; (3) first scripting limitations 6124; (4) first scripted address 6116; and/or (5) a first-time designation, to name a few. In embodiments, the first scripted address 6116 may be generated by applying a hash algorithm to one or more of the following: (1) the first scripting limitations 6124; (2) the first scripted account information 6106; (3) the first user public key 6120; (4) the first exchange public key 6122-1; (5) the second exchange public key 6122-2; (6) the third exchange public key 6122-3; (7) the first mathematical puzzle; and/or (8) a combination thereof, to name a few. In embodiments, the first scripted address 6116 may also be generated by combining the first user public key 6120 and one or more of the following: (1) the first exchange public key 6122-1; (2) the second exchange public key 6122-2; and/or (3) the third exchange public key 6122-3, to name a few. In embodiments, the first scripted address 6116 may also be generated by applying a hash algorithm to one or more of the following: (1) the first user public key 6120; (2) the first exchange public key 6122-1; (3) the second exchange public key 6122-2; (4) the third exchange public key 6122-3; and/or (5) the first mathematical puzzle, to name a few. Once generated, in embodiments, the first scripted account information 6106 may be stored on memory 6104-B of the first user device 6104. Furthermore, referring to FIG. 63A at step S6310, in embodiments, the first scripted account information 6106 may be transmitted by the first user device 6104 via API 6107 over network 125 to the digital asset exchange computer system 6102

In embodiments, as described above, the bi-directional channel may be between a first digital asset exchange computer system 6102 and a second digital asset exchange computer system associated with the second digital asset exchange 7602-1. The first scripted account information 6106 may be generated and/or transmitted by one or more of the first digital asset exchange computer system 6102 and the second digital asset exchange computer system.

In embodiments, at step S6312, the digital asset exchange computer system 6102 may verify that the first scripted account information 6106 complies with exchange format requirements. In embodiments, the exchange format requirements may include requirements associated with (1) the first user public key 6120, (2) the public key associated with the digital asset exchange 6110; (3) the authorization instructions associated with the first scripting limitations 6124; (4) the authorization instructions associated with the second scripting limitations 6134; and/or (5) the public address associated with the scripted account (e.g. the first scripted address 6116 and/or the second scripted address 6118), to name a few. In embodiments, as described above, the bi-directional channel may be between a first digital asset exchange computer system 6102 and a second digital asset exchange computer system associated with the second digital asset exchange 7602-1. The second digital asset exchange computer system, in embodiments, may verify the first scripted account information 6106.

The digital asset exchange computer system 6102, in embodiments, may verify the first user public key 6120 is a first authorized public key associated with the first customer 6202 by accessing authorized public key information received from the first customer 6202. In embodiments, the digital asset exchange computer system 6102 may have a list of authorized public keys and the customers said authorized public keys are associated with. This list may be populated by authorized public key information received by one or more customers. The aforementioned list, in embodiments, may be stored on memory 6102-C and accessed by the digital asset exchange computer system 6102. For example, to verify the first user public key 6120, the digital asset exchange computer system 6102 may access the list of authorized public keys and associated customers for the purposes of comparing the first user public key 6120. The digital asset exchange computer system 6102, in embodiments, may verify the first user public key 6120 by comparing the first user public key 6120 to a list of authorized public keys associated with the first customer 6202. In embodiments, if the first user public key 6120 is not verified, the process may continue with FIG. 63E, which is described in more detail below, the description of which applying herein.

In embodiments, the digital asset exchange computer system 6102 may further verify the first user public key 6120 by comparing the first user public key 6120 to a whitelist associated with the first customer 6202. A more detailed description of this process is located below in connection with the description of FIG. 66, the description of which applying herein.

The digital asset exchange computer system 6102, in embodiments, may verify the first exchange public key 6122-1 is a second authorized public key by comparing the first exchange public key 6122-1 to a list of exchange public keys that are authorized by the digital asset exchange 6110. In embodiments, the digital asset exchange computer system 6102 may be verifying to confirm that the first customer 6202 has the correct exchange public key to trade on the digital asset exchange 6110. In embodiments, if the first exchange public key 6122-1 is not verified, the process may continue with FIG. 63E, which is described in more detail below, the description of which applying herein.

The digital asset exchange computer system 6102, in embodiments, may verify the first scripting limitations 6124 include authorized instructions by comparing the first authorization instructions 6126 and the second authorization instructions 6128 to a list of authorized instructions stored on memory 6102-C. In embodiments, the authorized instructions may be code templates with blanks for specific information (e.g. the first user public key 6120, the first exchange public key 6122-1, and/or the first-time designation, to name a few). The code template(s), in embodiments, may be provided to the first customer 6202 from the digital asset exchange computer system 6102 with the non-custodial exchange key information 6140 and/or prior to the first user device 6104 generating the first scripted account information 6106. If the first user public key 6120 and the first exchange public key 6122-1 are verified, in embodiments, the digital asset exchange computer system 6102 may compare the remaining code in the first scripting limitations 6124 to the authorized code template. In embodiments, if the first scripting limitations 6124 is not verified, the process may continue with FIG. 63E, which is described in more detail below, the description of which applying herein.

The digital asset exchange computer system 6102, in embodiments, may verify the first scripted address 6116. In embodiments, as noted above, the first scripted address 6116 may be generated by applying a hash algorithm to the first scripting limitations 6124. The hash algorithm, in embodiments, may be provided to the first customer 6202 from the digital asset exchange computer system 6102 with the non-custodial exchange key information 6140 and/or prior to the first user device 6104 generating the first scripted account information 6106. Alternatively, the hash algorithm and/or the hashing parameters associated with the hash algorithm, in embodiments, may be provided by the first customer 6202 to the digital asset exchange computer system 6102 with the first scripted account information 6106. In embodiments, the digital asset exchange computer system 6102 may verify the first scripted address 6116 by applying the hash algorithm to the received first scripting limitations 6124. The result of the application of the hash algorithm may be compared by the digital asset exchange computer system 6102 to the received first scripted address 6116, resulting in a determination of whether the first scripted address 6116 is verified. As another example, referring to FIG. 62B, the digital asset exchange computer system 6102 may send a call to the first scripted address 6116, to confirm whether the first scripted address 6116 is correct. In embodiments, if the first scripting limitations 6124 are not verified, the process may continue with FIG. 63E, which is described in more detail below, the description of which applying herein.

Once the first scripted account is generated and the first scripted account information 6114 is verified, the first customer 6202 may fund the first scripted address 6116 (e.g. with a funding transaction). In embodiments, referring to FIG. 62B, the first user device 6104 may transmit a digitally signed transaction request to the blockchain 6108 via network 125. The transaction request, in embodiments, may be a request to transfer a first amount of the digital assets from the first user public address to the first scripted address 6116. In embodiments, the transaction request may be digitally signed by the first user private key associated with the first user public key 6120. As a result, the transaction request may be executed and published via the blockchain network to the blockchain 6108, resulting in the first amount of digital asset being transferred to the first scripted address 6116.

In embodiments, as described above, the bi-directional channel may be between a first digital asset exchange computer system 6102 and a second digital asset exchange computer system associated with the second digital asset exchange 7602-1. The second digital asset exchange computer system, in embodiments, may transmit a digitally signed transaction request to the blockchain 6108 via network 125. In embodiments, the transaction request may be digitally signed by a private key associated with the second digital asset exchange.

Figure 63A:
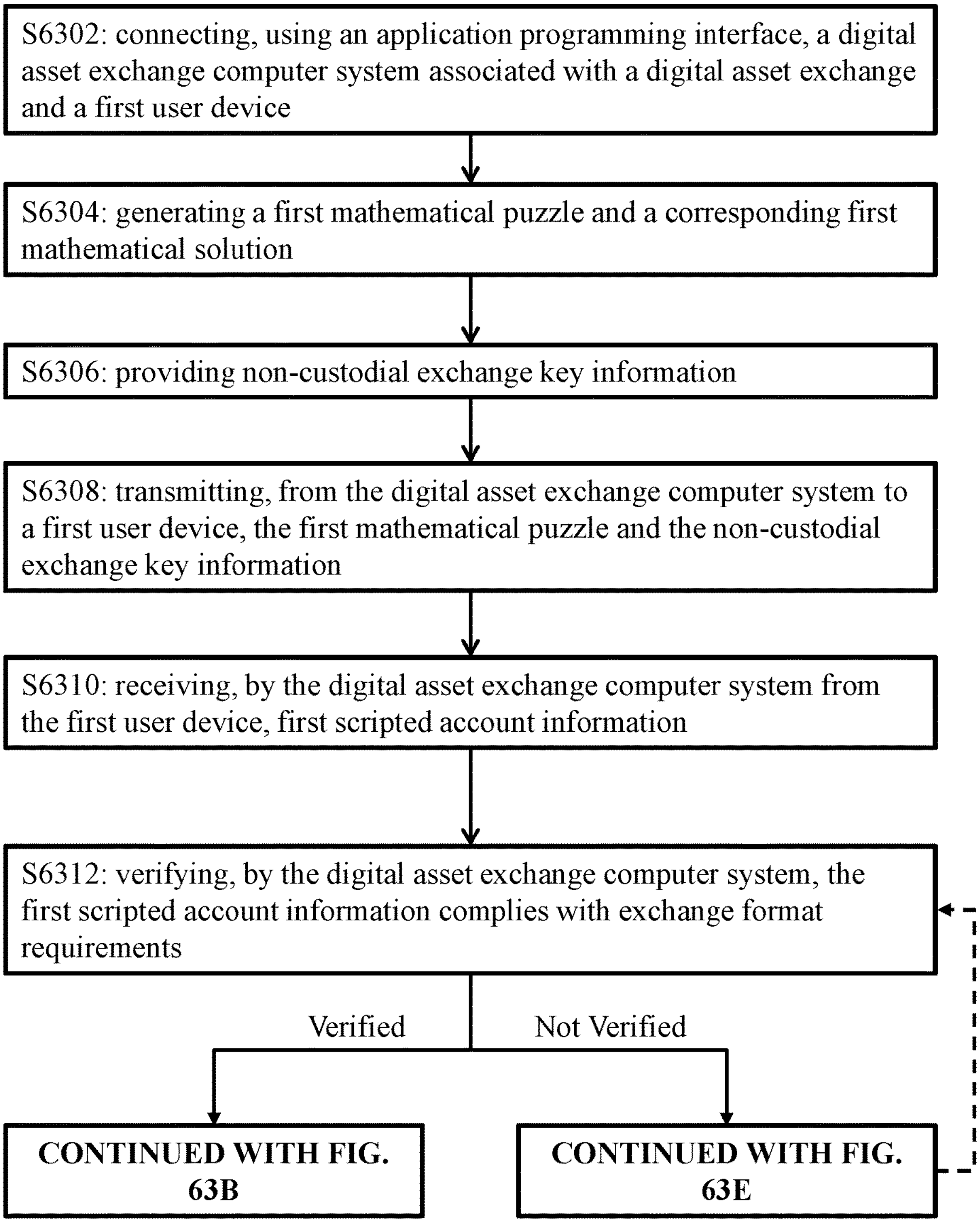
FIGS. 63A-63D are exemplary flowcharts of a process for trading on a digital asset exchange via an API between a digital asset exchange computer system and a first user device in accordance with exemplary embodiments of the present invention.
Figure 63B:
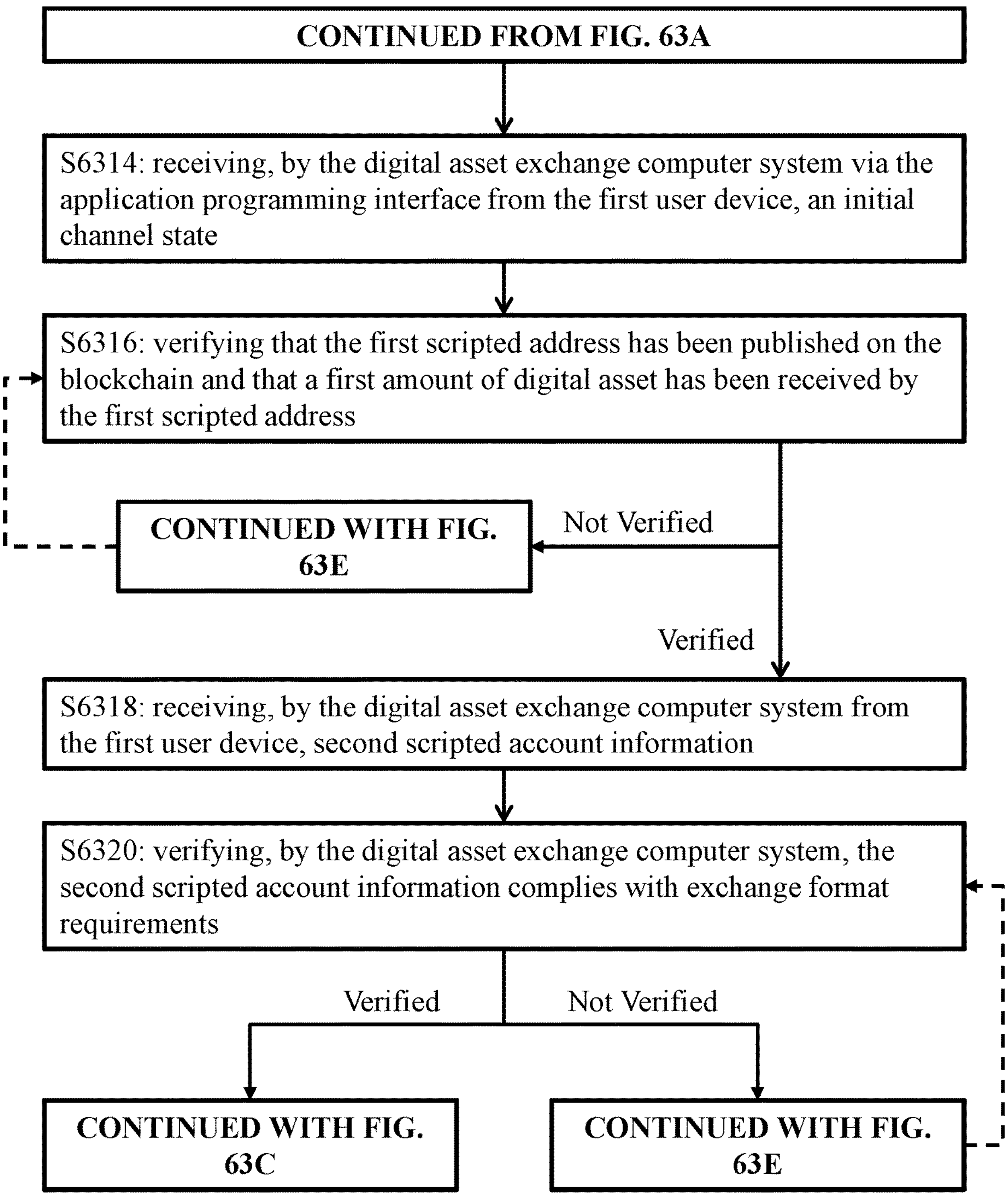
Figure 63C:
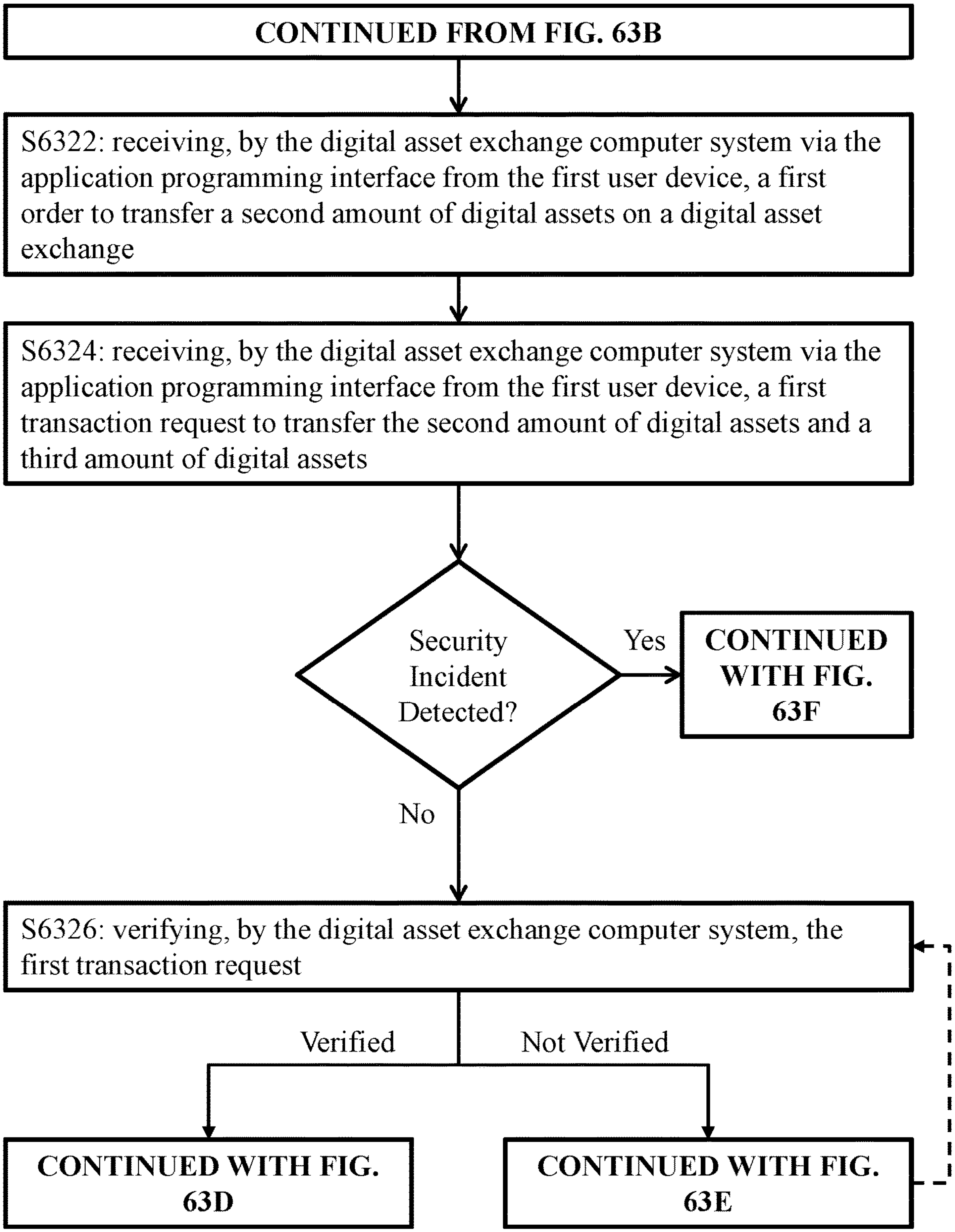
Figure 64:
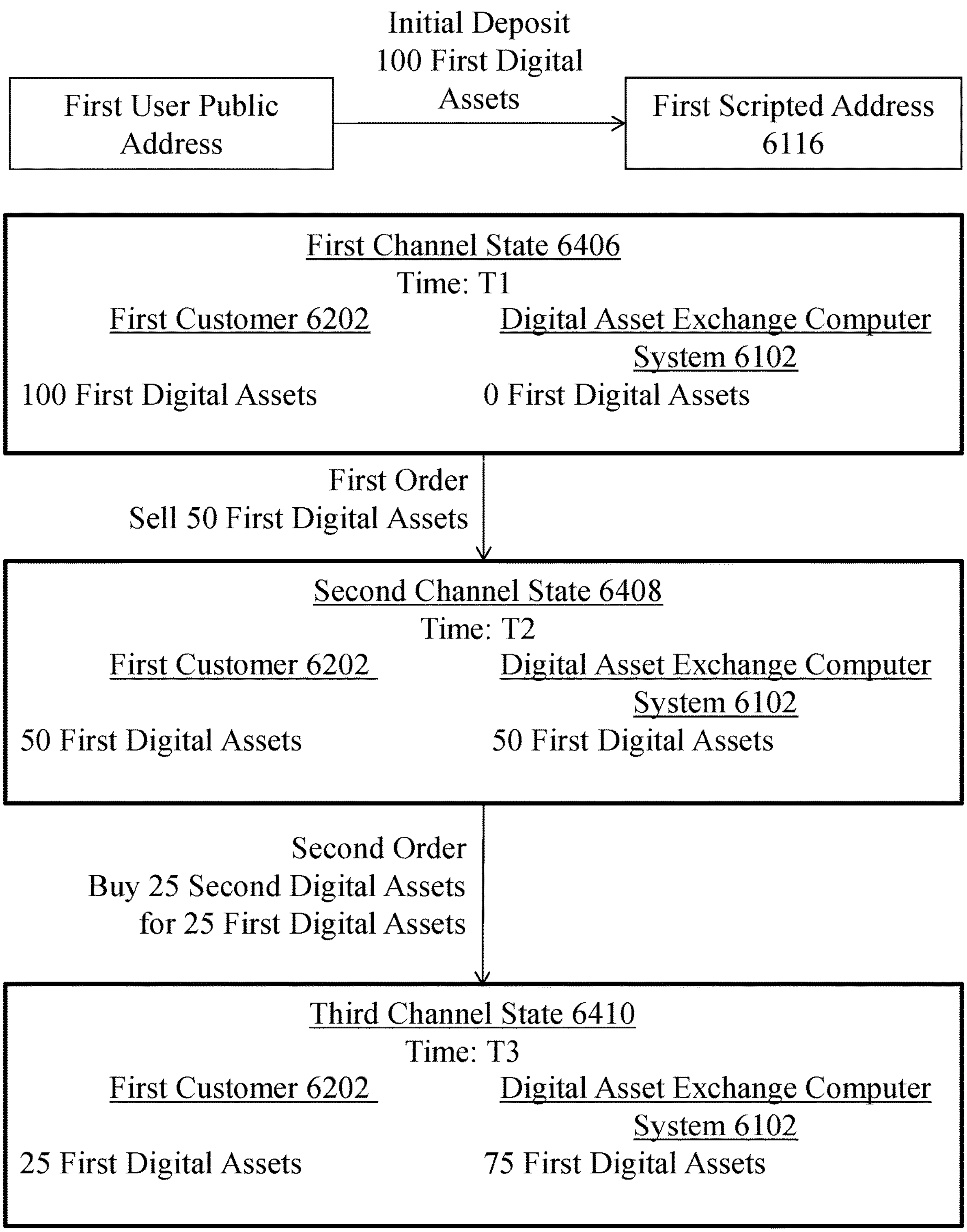
FIG. 64 is a conceptual flow diagram of channel states during a process for trading on a digital asset exchange via a channel between a digital asset exchange computer system and a first user device in accordance with exemplary embodiments of the present invention.

Referring to FIG. 63B, after the first scripted address 6116 is funded, the digital asset exchange computer system 6102 may receive an initial channel state from the first user device 6104 via the API 6107. In embodiments, the digital asset exchange computer system 6102 may receive an initial channel state from the second digital asset exchange computer system. Referring to FIG. 64, the initial channel state, in embodiments, may be the first channel state 6406. In embodiments, the first channel state 6406 may indicate that the first customer 6202 owns the first amount of digital asset (e.g. as shown in FIG. 64, 100 digital assets) in the custody of the first scripted address 6116. The first channel state 6406 may also indicate that the digital asset exchange computer system 6102 (or, in embodiments, the digital asset exchange 6110, or both) owns 0 digital asset. In embodiments, the first channel state 6406 may have a time stamp indicating one or more of the following: (1) the time at which the first amount of digital asset was deposited into the first scripted address; (2) the time at which the first channel state 6406 was sent; (3) the time at which the first channel state 6406 was received; (4) the first-time designation; and/or (5) the time left until the first-time designation has transpired, to name a few. Once received, the digital asset exchange computer system 6102 may store the initial channel state (first channel state 6406) in a database stored in memory 6102-C. In embodiments, the first customer 6202 may fund the first scripted address 6116 prior to, during, and/or after sending the first scripted account information 6106. In embodiments, the first customer 6202 may transmit the initial channel state with the first scripted account information 6106.

Referring to FIG. 63B at step S6316, after receiving the initial channel state, the digital asset exchange computer system 6102 may confirm that the first scripted address 6116 has been published and that the first amount of digital asset was received by the first scripted address 6116. Referring to FIG. 62B, the digital asset exchange computer system 6102 may confirm the publishing and funding of the first scripted address 6116 by generating and sending a call to the first scripted address 6116 via network 125. The first scripted address 6116 may respond by generating and sending a return to the digital asset exchange computer system 6102 via network 125. The return, in embodiments, may confirm the existence and published nature of the first scripted address 6116. The return, in embodiments, may also confirm that the first scripted address 6116 was funded by the first customer 6202 with the first amount of digital asset. In embodiments, if the publishing and/or funding of the first scripted address 6116 is not verified, the process may continue with FIG. 63E, which is described in more detail below, the description of which applying herein.

In embodiments, the return may also include a timestamp that indicates one or more of the following: (1) the time at which the first amount of digital asset was deposited into the first scripted address; (2) the time at which the call was sent; (3) the time at which the return was sent; (4) the time at which the return was received by the digital asset exchange computer system 6102; (5) the first-time designation; and/or (6) the time left until the first-time designation has transpired, to name a few. The return timestamp may be used to update the channel state. For example, the initial channel state, if it included a time stamp, may have a first timestamp the time at which the initial channel state was received. For exemplary purposes, the first timestamp may indicate a time of 9:30 AM. Continuing the example, the return may include a second timestamp indicating when the return was sent. For exemplary purposes, the second timestamp may indicate a time of 9:32 AM. The digital asset exchange computer system 6102 may take the second timestamp and generate an updated channel state, which indicates similar information as the initial channel state, with the exception that the timestamp included in the initial channel state is changed to the second timestamp.

In embodiments, the digital asset exchange computer system 6102 may verify the publication and/or funding of the first scripted address 6116 by: (1) checking the first scripted address 6116 one or more times; (2) monitoring the first scripted address 6116 continuously; and/or (3) monitoring the first scripted address 6116 at regular intervals, to name a few.

In embodiments, in the event that the digital asset exchange computer system 6102 confirms that the first scripted address 6116 has been published and that the first amount of digital asset was received by the first scripted address 6116, the digital asset exchange computer system 6102 may generate and send a confirmation message to the first user device 6104. The confirmation message, in embodiments, may indicate that the first customer 6202 may begin trading with the first amount of digital asset on the digital asset exchange 6110. In the event the digital asset exchange computer system 6102 cannot confirm the first scripted address 6116 has been published and the first amount was received by the first scripted address 6116, the digital asset system may continue to monitor the block chain until it may be confirmed and/or after some period of time close the channel and terminate the transaction with the first user.

The first customer 6202 and/or digital asset exchange 6110 (and/or second digital asset exchange . . . N digital asset exchange), in embodiments, may employ a third party to monitor the first scripted address 6116 for any activity (e.g. a published transaction). To enable a third party to monitor the first scripted address, the first user device 6104 and/or the digital asset exchange computer system 6102 may generate and transmit monitoring information to a third-party computer system associated with the third party via network 125. The monitoring information, in embodiments, may include one or more of the following: (1) the first scripted address 6116; (2) the second scripted address 6118 (described more fully below); (3) the first exchange public address (associated with the first exchange public key 6122-1); (4) the second exchange public address (associated with the second exchange public key 6122-2); (5) the third exchange public address (associated with the third exchange public key 6122-3); (6) the first user public address (associated with the first user public key 6120); and/or (7) the first-time designation, to name a few.

In embodiments, the third-party computer system may monitor the blockchain for a published transaction on the first scripted address 6116 and/or the second scripted address 6118. This monitoring may be continuous, in substantially real time, and/or or at predetermined intervals, to name a few. For example, the third-party computer system may only check the first scripted address 6116 for a published transaction 30 minutes before the first-time designation transpires. If the third-party computer system detects a published transaction associated with the first scripted address 6116 and/or the second scripted address 6118, the third-party computer system may generate and send a notification to the first customer 6202 and/or digital asset exchange 6110. The notification, in embodiments, may indicate one or more of the following: (1) the published transaction; (2) the associated scripted account; (3) the public address that sent the published transaction; (4) the public address(es) that are a beneficiary of the published transaction; and/or (5) the time the transaction was published, to name a few. In embodiments, the third-party computer system may be similar to the first user device 6104 and/or the digital asset exchange computer system 6102, the descriptions of which applying herein.

Referring to FIG. 63B, second scripted account information 6130 may be generated by the first user device 6104 and/or the digital asset exchange computer system 6102. In embodiments, the second scripted account information 6130 may be information associated with a second scripted account for use by the blockchain. For example, referring to FIG. 61C, the second scripted account information 6130 may include: (1) the first user public key 6120; (2) the first exchange public key 6122-1; (3) the second exchange public key 6122-2; (4) second scripting limitations 6134; (5) second scripted address 6118; and/or (6) the first-time designation, to name a few. The second scripted address 6118 may be generated in a similar manner as the first scripted address 6116, the description of which applying herein. For example, the second scripted address 6118 may be generated by applying a hash algorithm to the second scripting limitations 6134. In embodiments, as described above, the bi-directional channel may be between a first digital asset exchange computer system 6102 and a second digital asset exchange computer system associated with the second digital asset exchange 7602-1. The second scripted account information 6106, in embodiments may be generated and/or transmitted by one or more of the first digital asset exchange computer system 6102 and the second digital asset exchange computer system. At step S6318, in embodiments, the second scripted account information 6130 may be transmitted by the first user device 6104 (and/or the second digital asset exchange computer system) via API 6107 over network 125 to the digital asset exchange computer system 6102.

After receiving the second scripted account information 6130, at step S6320, the digital asset exchange computer system 6102 may verify that the second scripted account information 6130 complies with the exchange format requirements. The digital asset exchange computer system 6102, in embodiments, may verify the first user public key 6120 is the first authorized public key, in a similar manner as described above in connection with step S6312, the description of which applying herein. The digital asset exchange computer system 6102, in embodiments, may verify the first exchange public key 6122-1 is the second authorized public key. The digital asset exchange computer system 6102, in embodiments, may verify the second exchange public key 6122-2 is a third authorized public key in a similar manner as described above in connection with step S6312, the description of which applying herein. In embodiments, as described above, the bi-directional channel may be between a first digital asset exchange computer system 6102 and a second digital asset exchange computer system associated with the second digital asset exchange 7602-1. The second digital asset exchange computer system, in embodiments, may verify the second scripted account information 6106.

The digital asset exchange computer system 6102, in embodiments, may verify the second scripting limitations 6134 include authorized instructions by comparing the third authorization instructions 6136 and the fourth authorization instructions 6138 to a list of authorized instructions stored on memory 6102-C. In embodiments, the authorized instructions, as stated above, may be code templates with blanks for specific information (e.g. the first user public key 6120, the second exchange public key 6122-2, and/or the first-time designation, to name a few). The code template(s), in embodiments, may be provided to the first customer 6202 from the digital asset exchange computer system 6102 with the non-custodial exchange key information 6140 and/or prior to the first user device 6104 generating the first scripted account information 6106. The digital asset exchange computer system 6102 may compare the code in the second scripting limitations 6134 to the authorized code template.

The digital asset exchange computer system 6102, in embodiments, may also verify the second scripted address 6118. The digital asset exchange computer system 6102, in embodiments, may verify the second scripted address 6118. In embodiments, the second scripted address 6118 may be generated by applying a hash algorithm to the second scripting limitations 6134. Similar to the description above, the hash algorithm, in embodiments, may be provided to the first customer 6202 from the digital asset exchange computer system 6102 with the non-custodial exchange key information 6140 and/or prior to the first user device 6104 generating the first scripted account information 6106. Alternatively, the hash algorithm, in embodiments, may be provided by the first customer 6202 to the digital asset exchange computer system 6102 with the first scripted account information 6106 and/or the second scripted account information 6130. In embodiments, the digital asset exchange computer system 6102 may verify the second scripted address 6118 by applying the hash algorithm to the received second scripting limitations 6134. The result of the application of the hash algorithm may be compared by the digital asset exchange computer system 6102 to the received second scripted address 6118, resulting in a determination of whether the second scripted address 6118 is verified.

In embodiments, if the second scripted account information 6130, or any information therein, is not verified, the process may continue with FIG. 63E, which is described in more detail below, the description of which applying herein.

In embodiments, the first customer 6202 may have the means to trade on the digital asset exchange 6110 (e.g. a first verified and funded scripted account and a second verified scripted account). Referring to FIG. 63C, the first customer 6202 may initiate a first trade by transmitting a first order and first transaction request. At step S6322, the digital asset exchange computer system 6102 may receive, from the first user device 6104 via the API 6107, a first order to transfer a second amount of digital asset on the digital asset exchange 6110. Transfer, in embodiments, may refer to: sell, trade, and/or buy, to name a few. The second amount of digital asset, in embodiments may refer to an amount that is less than the first amount. For example, if the first amount of digital asset is 100 digital assets, then the second amount may be 1-99 digital assets. When received, the first order may be stored by the digital asset exchange computer system 6102 on memory 6102-C.

In embodiments, the first order may also include one or more of the following: (1) the first scripting limitations 6124; (2) the first scripted account information 6106; (3) the first exchange public key 6122-1; (4) the second exchange public key 6122-2; (5) the third exchange public key 6122-3; (6) the first user public key 6120; (7) the first scripted address 6116; (8) the second scripted address; (9) the first user public address associated with the first user public key 6120; (10) the second scripted account information 6130 and/or (11) the first-time designation, to name a few. The above information may be verified by the digital asset exchange computer system 6102 in a similar manner as described above in connection with steps S6312, S6316, and S6320, the descriptions of which applying herein. In embodiments, the first order may be digitally signed by the first user private key associated with the first user public key 6120.

The first customer 6202, as noted above, may also transmit a first transaction request that reflects the first order. At step S6324, the digital asset exchange computer system 6102 may receive, from the first user device 6104 via the API 6107, a first transaction request. The first transaction request, may, in embodiments, account for all of the first amount of digital asset. In embodiments, to account for the first amount of digital asset in the first scripted account 6116, the first transaction request may include at least two transfer requests. The first transaction request, in embodiments, may also include one or more of the following: (1) an updated channel state; (2) a timestamp; (3) the first scripting limitations 6124; (4) the first scripted account information 6106; (5) the first exchange public key 6122-1; (6) the second exchange public key 6122-2; (7) the third exchange public key 6122-3; (8) the first user public key 6120; (9) the first mathematical solution to the first puzzle; (10) the second scripted account information 6130; and/or (11) the first-time designation, to name a few. The first transfer request of the at least two transfer requests, in embodiments, may be a transfer of the second amount of digital asset from the first scripted address 6116 to the second scripted address 6118. The second transfer request, in embodiments, may be a transfer of a third amount of digital asset to the first scripted address. The third amount may be the first amount of digital asset less the second amount of digital asset. For example, if the first amount is 100 and the second amount is 50, the third amount would equal 100-50-50 digital asset. In embodiments, the first transaction request may be digitally signed by one or more of the following: the first user private key associated with the first user public key 6120; and/or a private key associated with the first scripted address 6116, to name a few.

An updated channel state, referring to FIG. 64, may be the second channel state 6408. In embodiments, the second channel state 6408 may indicate that the first customer 6202 owns the third amount of digital asset (e.g. as shown in FIG. 64, 50 digital assets) in the custody of the first scripted address 6116. The first channel state 6406 may also indicate that the digital asset exchange computer system 6102 (or, in embodiments, the digital asset exchange 6110, or both) owns the second amount digital asset (e.g. as shown in FIG. 64, 50 digital assets). The second channel state 6408 may reflect the first order that was received by the digital asset exchange computer system 6102. In embodiments, the second channel state 6408 may have a time stamp indicating one or more of the following: (1) the time at which the first order was received; (2) the time at which the first channel state 6406 was sent; (3) the time at which the second channel state 6408 was received; (4) the first-time designation; and/or (5) the time left until the first-time designation has transpired, to name a few. Once received, the digital asset exchange computer system 6102 may store the updated channel state (second channel state 6408) in memory 6102-C, updating the current channel state. In embodiments, the first customer 6202 may transmit the updated channel state with the first order.

In embodiments, the first transaction request may include fees for trading on the digital asset exchange 6110. A trading fee, in embodiments, may be a percentage of the transaction (e.g. a percentage of the second amount), a percentage of the first amount of digital asset, and/or a flat fee per transaction, to name a few. The first transaction request, in embodiments, may include three transfer requests. The first transfer request of the three transfer requests, in embodiments, may be a transfer of the second amount of digital asset from the first scripted address 6116 to the second scripted address 6118. The second transfer request, in embodiments, may be a transfer of a third amount of digital asset to the first scripted address. The third transfer request, in embodiments, may be a transfer of a fourth amount of digital asset to a public address associated with the exchange (e.g. the first exchange public address (associated with the first exchange public key 6122-1), the second exchange public address (associated with the second exchange public key 6122-2), and/or the third exchange public address (associated with the third exchange public key 6122-3), to name a few). The fourth amount, in embodiments, may be the trading fee. For exemplary purposes, the trading fee may be 1 digital asset. Continuing the example, if the fourth amount is 1 digital asset, the second amount of digital asset is 50, and the first amount of digital asset is 100, the third amount of digital asset may be 49 (e.g. the first amount (100)−the second amount (50)−the fourth amount (1)=the third amount (49)).

In embodiments, if the first-time designation has not transpired, the digital asset exchange computer system 6102 may not send and publish the first transaction request on the blockchain 6108. In embodiments, if the first-time designation has not transpired, but a security incident has been detected or an issue arises regarding the communication between the digital asset exchange computer system 6102 and the first user device 6104, the digital asset exchange computer system 6102 may digitally sign the first transaction request and send and publish the first transaction request on the blockchain 6108 resulting in the transfers requests of the first transaction request to be executed on the blockchain 6108. However, in embodiments, if the first-time designation has transpired, the digital asset exchange computer system 6102 may digitally sign the first transaction request and send and publish the first transaction request on the blockchain 6108 resulting in the transfers requests of the first transaction request to be executed on the blockchain 6108.

In embodiments, as described above, the bi-directional channel may be between a first digital asset exchange computer system 6102 and a second digital asset exchange computer system associated with the second digital asset exchange 7602-1. The second digital asset exchange computer system, in embodiments, may generate and transmit one or more of the following: the first order, the first transaction request, and/or an updated channel state, to name a few. The transaction request may be digitally signed by a private key associated with the second digital asset exchange. In embodiments, as described above, the first order may be a batch of customer orders. The batch of customer orders, in embodiments, may reflect one or more customer's inter-exchange orders and each include one or more of the following: (a) the customer's account information associated with the first digital asset exchange; (b) the customer's account information associated with the second digital asset exchange; (c) the transaction request digitally signed by the customer (e.g. the transaction request associated with the inter-exchange order); and/or (d) one or more public addresses associated with the customer, to name a few.

Referring to FIG. 63C, after receiving the first order and first transaction request, at step S6326, the digital asset exchange computer system 6102 may verify the first transaction request. In embodiments, to verify the first transaction request, the digital asset exchange computer system 6102 may verify one or more of the following: (1) the third amount of digital asset is correct; (2) the first transaction request is signed by a private key associated with the first customer 6202; (3) the first-time designation has not transpired; and/or (4) the fourth amount of digital asset is correct, to name a few. In embodiments, where the order is a batch of customer orders and/or an inter-exchange order, the digital asset exchange computer system 6102 may verify, for each order of the batch of orders, one or more of the following: (a) the customer's account information associated with the first digital asset exchange; (b) the customer's account information associated with the second digital asset exchange; (c) the transaction request digitally signed by the customer (e.g. the transaction request associated with the inter-exchange order); and/or (d) one or more public addresses associated with the customer, to name a few.

In embodiments, the first order may also be verified by the digital asset exchange computer system 6102. In embodiments, if the first transaction request, the first order, or any information therein, is not verified, the process may continue with FIG. 63E, which is described in more detail below, the description of which applying herein.

In embodiments, the second scripted account information 6130 may be generated as a result of the first user device 6104 generating the first order and the first transaction request.

Figure 63D:
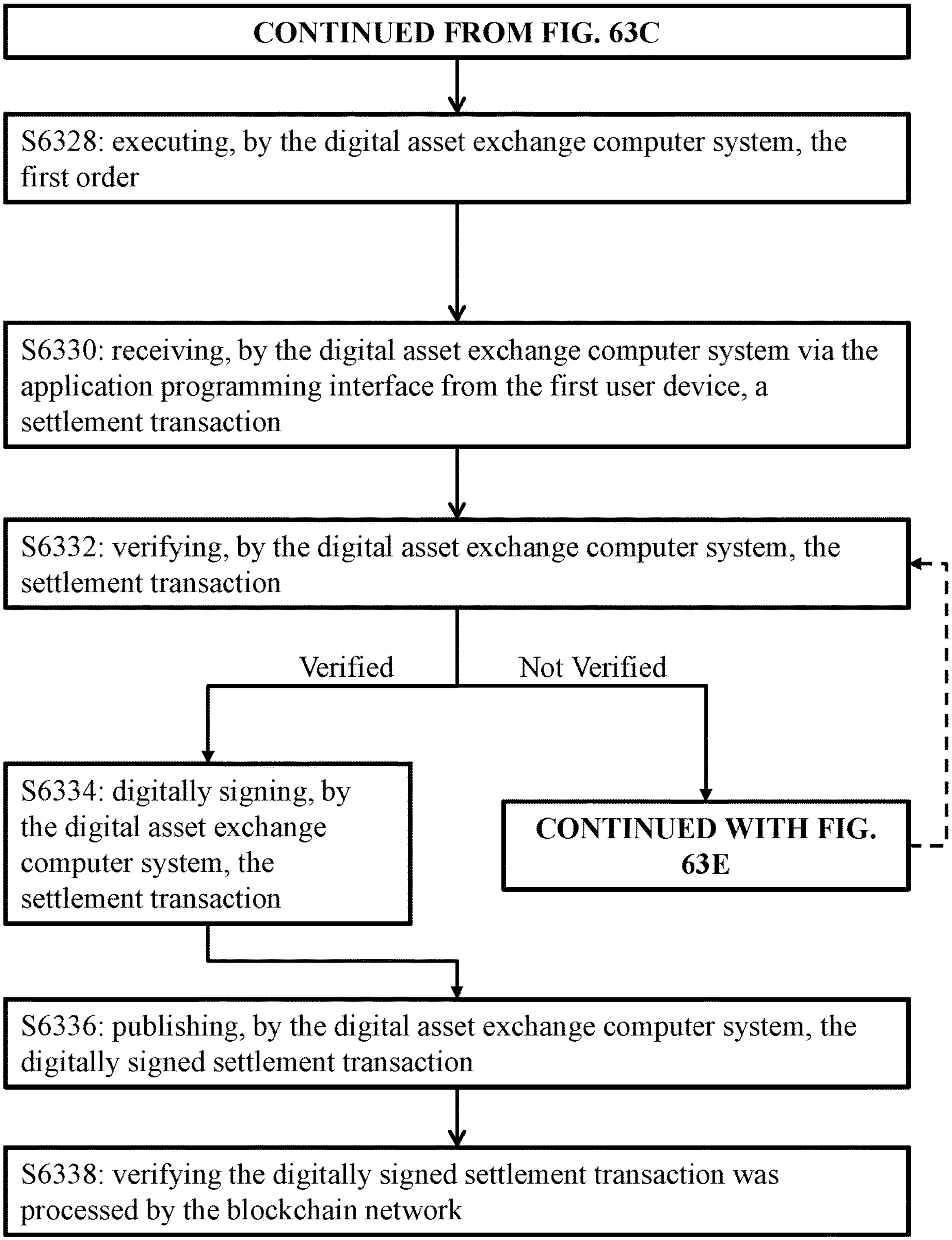
Figure 63E:
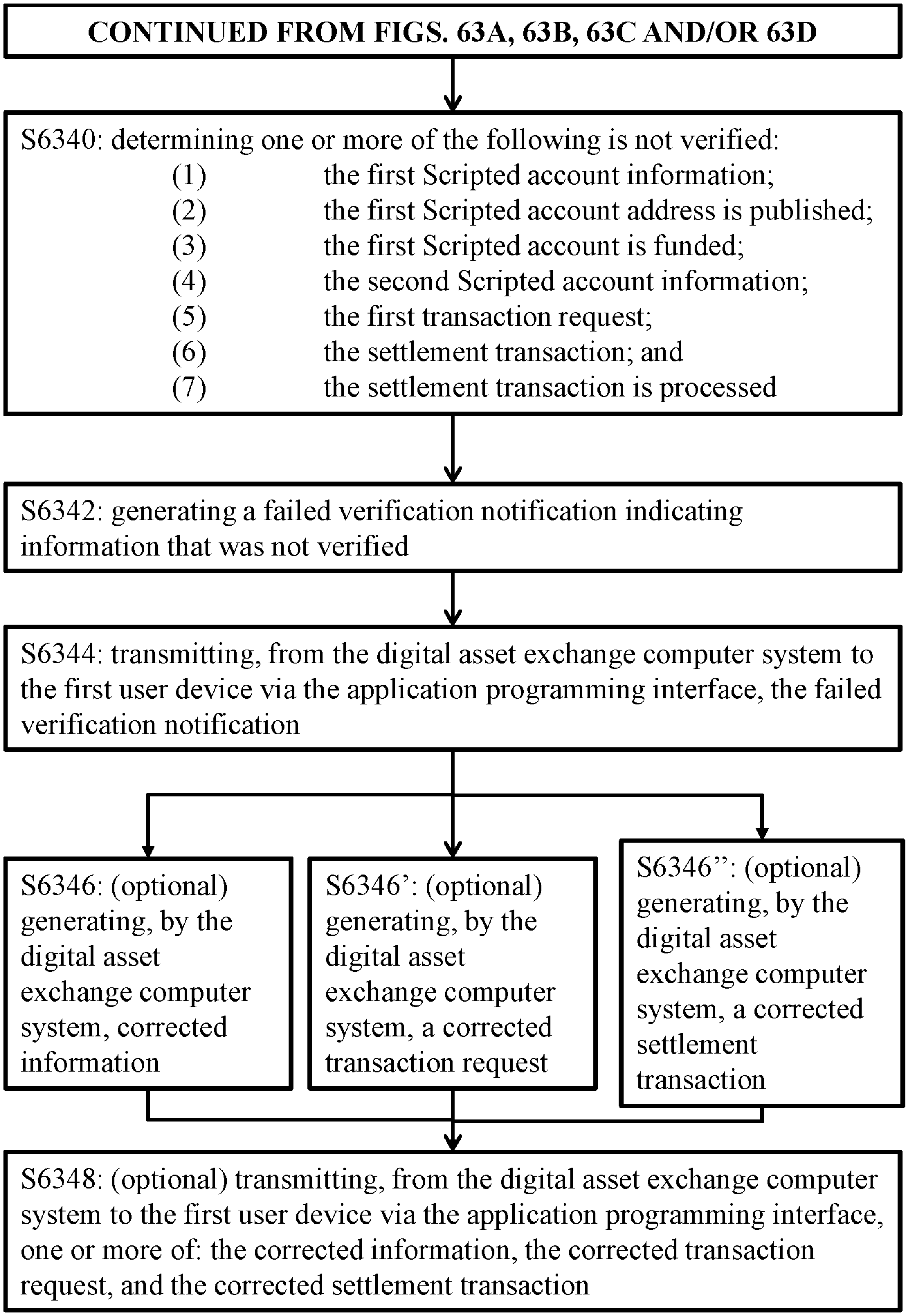
FIG. 63E is an exemplary flowchart of a process including unverified information received during the process described in connection with FIGS. 63A-63D in accordance with exemplary embodiments of the present invention.
Figure 63F:
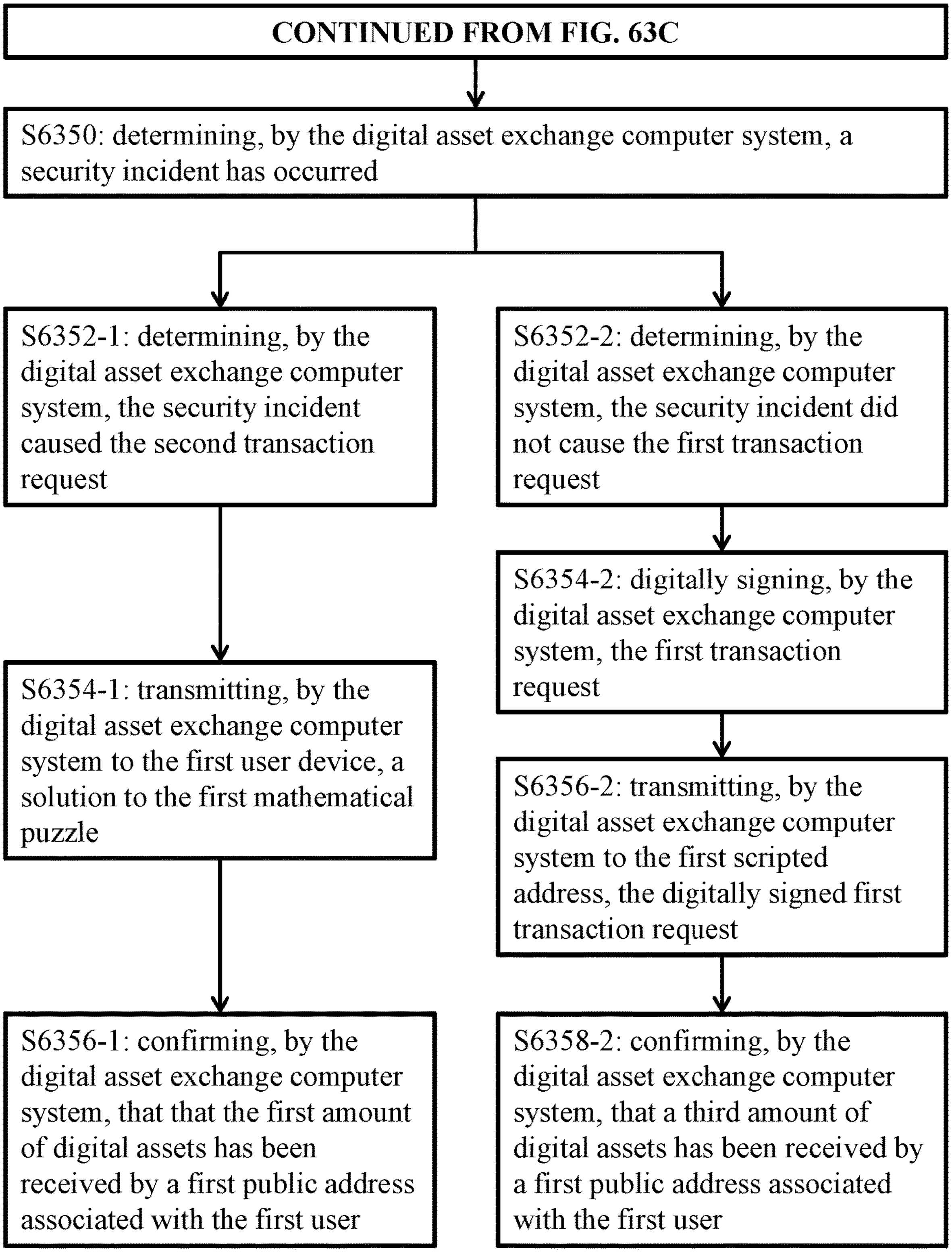
FIG. 63F is an exemplary flowchart of a process including a data breach or data incident during the process described in connection with FIGS. 63A-63D in accordance with exemplary embodiments of the present invention.

Referring to FIG. 63D, once the first transaction request is verified, the digital asset exchange computer system 6102, at step S6328, may execute the first order. In embodiments, the first order may be executed by the digital asset exchange computer system 6102 via an order ledger associated with the digital asset exchange 6110. In embodiments, even though the first transaction request is not executed, the second amount or portion(s) of the second amount of digital asset may be promised to another customer and/or to the digital asset exchange 6110. When the channel is closed, and the trading is completed (e.g. when a settlement transaction is published or when the first puzzle solution is used), in embodiments, the second amount or portion(s) of the second amount of digital asset may be transferred to another customer and/or to the digital asset exchange 6110.

During the first-time designation, the first customer 6202 may transmit one or more additional orders and/or transaction requests. The process(es) for the aforementioned additional orders and/or additional transfer requests are described in more detail below, the description of which applying herein. In embodiments, as described above, the bi-directional channel may be between a first digital asset exchange computer system 6102 and a second digital asset exchange computer system associated with the second digital asset exchange 7602-1. During the first-time designation, the second digital asset exchange and/or the first digital asset exchange may transmit one or more additional orders and/or transaction requests, the process of which may be similar to the description herein, above, and below, the descriptions of which applying herein.

As the first-time designation is expiring, in embodiments, a settlement transaction may be generated. At step S6330, the digital asset exchange computer system 6102 may receive, from the first user device 6104 via the API 6107. The settlement transaction, in embodiments, may be generated by: the first user device 6104, and/or the digital asset exchange computer system 6102, to name a few. In embodiments, the first user device 6104 may generate a settlement transaction. The settlement transaction, in embodiments, may include transfers accounting for all of the digital asset that was initially funded into the first scripted address 6116 (e.g. the first amount of digital asset). The settlement transaction, in embodiments, may include two transfers. The first transfer may be a transfer of a first settlement amount from the first scripted address 6118 to a public address associated with the digital asset exchange 6110 (e.g. the first exchange public address (associated with the first exchange public key 6122-1), the second exchange public address (associated with the second exchange public key 6122-2), and/or the third exchange public address (associated with the third exchange public key 6122-3), to name a few). The first settlement amount may account for the amount of digital asset now owned by the digital asset exchange 6110. In embodiments, without fees and with only the first order/transaction request, the digital asset exchange 6110 owns the second amount of digital asset. The second transfer may be a transfer of a second settlement amount from the first scripted address 6118 to the first user public address. The second settlement amount may account for the amount of digital asset now owned by the first customer 6202. In embodiments, without fees and with only the first order/transaction request, the first customer 6202 owns the third amount of digital asset. After generating the settlement transaction, in embodiments, the settlement transaction may be digitally signed by the first user private key and transmitted to the digital asset exchange computer system 6102 via API 6107. In embodiments, the settlement transaction may include one or more of the following: (1) a timestamp; (2) the first exchange public key 6122-1; (3) the second exchange public key 6122-2; (4) the third exchange public key 6122-3; (5) the first user public key 6120; (6) the first mathematical solution to the first puzzle; (7) the first scripted account information 6106; (8) the second scripted account information 6130 and/or (9) the first-time designation, to name a few.

In embodiments, as described above, the bi-directional channel may be between a first digital asset exchange computer system 6102 and a second digital asset exchange computer system associated with the second digital asset exchange 7602-1. The settlement transaction, in embodiments, may be generated, transmitted, received, and/or verified by one or more of the first digital asset exchange computer system 6102 and/or the second digital asset exchange computer system.

In embodiments, as noted above, fees may be associated with trading or executing a settlement transaction. If fees are associated with the trading and/or settlement transaction, the amounts submitted with the settlement transaction may reflect those fees.

In embodiments, the digital asset exchange computer system 6102 may generate and transmit an unsigned settlement transaction. The unsigned settlement transaction may be similar to the settlement transaction described above, the description of which applying herein. Once generated, the digital asset exchange computer system 6102 may transmit the unsigned settlement transaction to the first user device 6104 via the API 6107. After receiving the unsigned settlement transaction, the first user device 6104 may verify that the amounts and recipient addresses are correct. If verified, the first user device 6104 may digitally sign the unsigned settlement transaction with the first user private key. Once signed, the first user device 6104 may transmit the signed settlement transaction to the digital asset exchange computer system 6102 via the API 6107. If the unsigned settlement transaction, or any information therein, is not verified, the first user device 6104 may amend the settlement transaction and digitally sign the amended settlement transaction. Once signed, the first user device 6104 may transmit the amended, signed settlement transaction to the digital asset exchange computer system 6102 via the API 6107.

After receiving the digitally signed settlement transaction, at step S6332, the digital asset exchange computer system 6102 may verify the digitally signed settlement transaction. In embodiments, to verify digitally signed settlement transaction, the digital asset exchange computer system 6102 may verify one or more of the following: (1) the first settlement amount of digital asset is correct; (2) the second settlement amount of digital asset is correct; (3) the settlement transaction is signed by a private key associated with the first customer 6202; and/or (4) the first-time designation and how much time is left, to name a few. In embodiments, if the digitally signed settlement transaction, or any information therein, is not verified, the process may continue with FIG. 63E, which is described in more detail below, the description of which applying herein.

To verify the first settlement amount and the second settlement amount, the digital asset exchange computer system 6102 may compare the aforementioned settlement amounts to the most recent channel state. Additionally, in embodiments, the digital asset exchange computer system 6102 may compare the aforementioned settlement amounts to one or more of the channel states, including one or more of the intermediary channel states. The table below is an exemplary table of information the digital asset exchange computer system 6102 may store and use as information to verify and/or generate the settlement transaction.

TABLE 2

| Transactions/Orders | | Channel State | |
|---|---|---|---|
| Funding Transaction | Deposit 100 Digital Asset | Customer: 100 Digital Assets | Exchange: 0 Digital Assets |
| First Order | Sell 50 Digital Asset | Customer: 50 Digital Assets | Exchange: 50 Digital Assets |
| Second Order | Sell 25 Digital Asset | Customer: 25 Digital Assets | Exchange: 75 Digital Assets |
| Third Order | Sell 10 Digital Asset | Customer: 15 Digital Assets | Exchange: 85 Digital Assets |
| Final | | Customer: Owns 15 Digital Asset Exchange: Owns 85 Digital Asset | |

Once verified, at step S6334, the digital asset exchange computer system 6102 may digitally sign the settlement transaction using one or more of the following: (1) the first exchange private key; (2) the second exchange private key; and/or (3) the third exchange private key. In embodiments, as described above, the bi-directional channel may be between a first digital asset exchange computer system 6102 and a second digital asset exchange computer system associated with the second digital asset exchange 7602-1. Once the settlement transaction is verified, in embodiments, the first digital asset exchange computer system 6102 and/or the second digital asset exchange computer system may digitally sign the settlement transaction.

In embodiments, as defined by the scripting limitations and once the first-time designation has transpired, the digital asset exchange computer system 6102 may have the authority to settle the transactions, executing the digitally signed settlement transaction. To execute the digitally signed settlement transaction, the digital asset exchange computer system 6102 may publish the digitally signed settlement transaction on blockchain 6108. Referring to FIG. 62D, the digital asset exchange computer system may transmit the digitally signed settlement transaction to the blockchain 6108, which, in embodiments, may result in the publishing of the digitally signed settlement transaction on the blockchain 6108. In embodiments, as described above, the bi-directional channel may be between a first digital asset exchange computer system 6102 and a second digital asset exchange computer system associated with the second digital asset exchange 7602-1. Once the settlement transaction is verified and fully executed, in embodiments, the first digital asset exchange computer system 6102 and/or the second digital asset exchange computer system may publish (e.g. transmit) the settlement transaction on the blockchain 6108.

When the digitally signed settlement transaction is transmitted to the blockchain 6108, the first scripted address 6116 may execute the digitally signed settlement transaction. In embodiments, the execution of the digitally signed settlement transaction, may result in: the second amount of digital asset being sent to the third exchange public address and/or the third amount of digital asset being sent to the first user public address. While the amounts and destination public addresses are shown in FIG. 62D, the amounts and public addresses are determined by the verified, digitally signed settlement transaction.

Figure 62E:
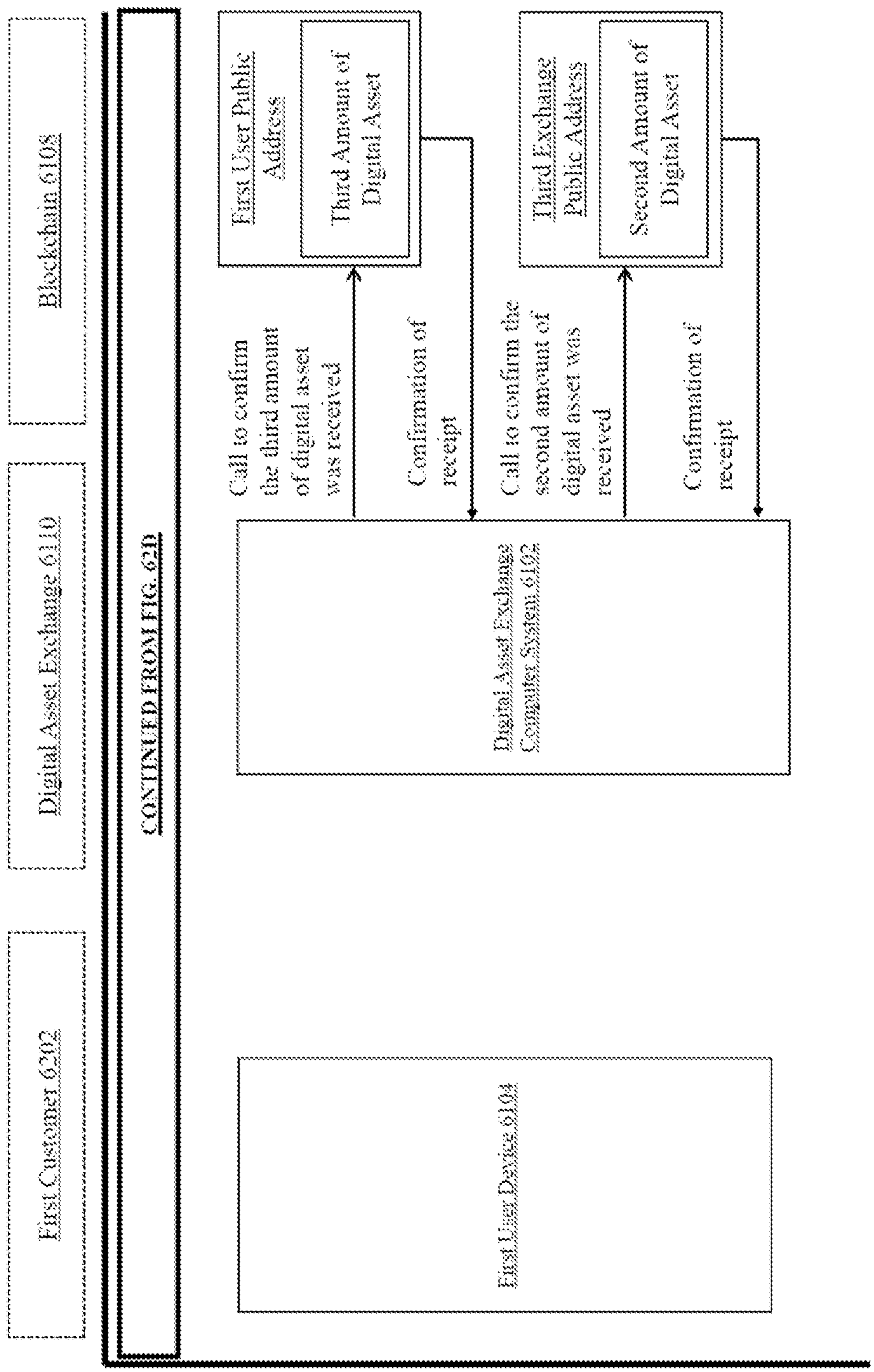

Referring back to FIG. 63D, at step S6338, the digital asset exchange computer system 6102 may verify the signed settlement transaction was processed by the blockchain 6108 network. In embodiments, the first user device 6104 may verify the signed settlement transaction was processed by the blockchain 6108 network. Referring to FIG. 62E, in embodiments, the digital asset exchange computer system 6102 may verify the signed settlement transaction was processed by sending a first call to the first user public address and a second call to the third exchange public address. The first call, in embodiments, may be to confirm that the third amount of digital asset was received by the first user public address. In response, in embodiments, the first user public address may send a return to the digital asset exchange computer system 6102 confirming the third amount of digital asset was received. The second call, in embodiments, may be to confirm that the second amount of digital asset was received by the third exchange public address. In response, in embodiments, the third exchange public address may send a return to the digital asset exchange computer system 6102 confirming the second amount of digital asset was received. In embodiments, the returns may be sent to one or more public exchange addresses associated with the digital asset exchange computer system 6102 (e.g. the first exchange public address, the second exchange public address, and/or the third exchange public address, to name a few). In embodiments, if the processing of the digitally signed settlement transaction, or any information therein, is not verified, the process may continue with FIG. 63E, which is described in more detail below, the description of which applying herein.

In embodiments, as mentioned above, the first customer 6202 may make one or more additional trades on the digital asset exchange 6110. In embodiments, prior to generating and transmitting additional orders and/or transaction requests, third scripted account information may be generated by the first user device 6104 and/or the digital asset exchange computer system 6102. In embodiments, third scripted account information may be generated only when the first user device 6104 transmits an order to purchase an amount of digital assets. In embodiments, third scripted account information may be generated when the first user device 6104 transmits any additional order.

The third scripted account information may include one or more of the following: (1) the first user public key 6120; (2) the first exchange public key 6122-1; (3) the second exchange public key 6122-2; (4) third scripting limitations; (5) third scripted address; (6) a second mathematical puzzle; and/or (7) the first-time designation, to name a few.

The second mathematical puzzle and a corresponding second mathematical solution may be generated by the digital asset exchange computer system 6102 and/or the first user device 6104 in a similar manner as described above. In embodiments, each new scripted account that is created has a corresponding mathematical puzzle and solution. In embodiments, each new scripted account may use the first mathematical puzzle and corresponding solution.

In embodiments, the third scripting limitations may be scripting limitations associated with a third scripted account which may also include authorization instructions (e.g. fifth authorization instructions and sixth authorization instructions). Similar to the above authorization instructions, the fifth authorization instructions and the sixth authorization instructions may define scenarios where transaction requests received by the third scripted address are authorized. For example, the authorization instructions may authorize transactions only if either: (1) the transaction request is signed by a private key associated with the digital asset exchange and is received after the predetermined amount of time has transpired (the fifth authorization instructions); or (2) the transaction request is signed by a private key associated with the customer and includes the second mathematical solution (the sixth authorization instructions). In embodiments, the third scripted account information may be transmitted by the first user device 6104 via API 6107 over network 125 to the digital asset exchange computer system 6102.

After receiving the third scripted account information, the digital asset exchange computer system 6102 may verify that the third scripted account information complies with the exchange format requirements. The digital asset exchange computer system 6102, in embodiments, may verify the first user public key 6120 is the first authorized public key, in a similar manner as described above in connection with step S6312, the description of which applying herein. The digital asset exchange computer system 6102, in embodiments, may verify the first exchange public key 6122-1 is the second authorized public key. The digital asset exchange computer system 6102, in embodiments, may verify the second exchange public key 6122-2 is a third authorized public key in a similar manner as described above in connection with step S6312, the description of which applying herein.

The digital asset exchange computer system 6102, in embodiments, may verify the third scripting limitations include authorized instructions by comparing the fifth authorization instructions and the sixth authorization instructions to a list of authorized instructions stored on memory 6102-C. In embodiments, the authorized instructions, as stated above, may be code templates with blanks for specific information (e.g. the first user public key 6120, the second exchange public key 6122-2, and/or the first-time designation, to name a few). The code template(s), in embodiments, may be provided to the first customer 6202 from the digital asset exchange computer system 6102 with the non-custodial exchange key information 6140 and/or prior to the first user device 6104 generating the first scripted account information 6106. The digital asset exchange computer system 6102 may compare the code in the third scripting limitations to the authorized code template.

The digital asset exchange computer system 6102, in embodiments, may also verify a third scripted address associated with the third scripted account and/or the third scripted account information. The digital asset exchange computer system 6102, in embodiments, may verify the third scripted address. In embodiments, the third scripted address may be generated by applying a hash algorithm to the third scripting limitations. Similar to the description above, the hash algorithm, in embodiments, may be provided to the first customer 6202 from the digital asset exchange computer system 6102 with the non-custodial exchange key information 6140 and/or prior to the first user device 6104 generating the first scripted account information 6106. Alternatively, the hash algorithm, in embodiments, may be provided by the first customer 6202 to the digital asset exchange computer system 6102 with the first scripted account information 6106, the second scripted account information 6130, and/or the third scripted account information. In embodiments, the digital asset exchange computer system 6102 may verify the third scripted address by applying the hash algorithm to the received third scripting limitations. The result of the application of the hash algorithm may be compared by the digital asset exchange computer system 6102 to the received third scripted address, resulting in a determination of whether the third scripted address is verified. In embodiments, if the third scripted account information, or any information therein, is not verified, the process may continue with FIG. 63E, which is described in more detail below, the description of which applying herein.

In embodiments, the first customer 6202 may initiate a second trade by transmitting a second order and second transaction request before the first-time designation has transpired. The second order, in embodiments, the second order may be to sell a sixth amount of digital asset. In embodiments, the second order may be to buy a sixth amount of digital asset. The sixth amount of digital asset, in embodiments may refer to an amount that is less than the third amount. In embodiments, the sixth amount may refer to an amount that is less than the second amount. When received, the second order may be stored by the digital asset exchange computer system 6102 on memory 6102-C.

In embodiments, the second order may also include one or more of the following: (1) the first exchange public key 6122-1; (2) the second exchange public key 6122-2; (3) the second scripting limitations 6134; (4) the second scripted account information 6130; (5) the third exchange public key 6122-3; (6) the first user public key 6120; (7) the first scripted address 6116; (8) the second scripted address; (9) the first user public address associated with the first user public key 6120; (10) the second scripted account information 6130 and/or ( ) the first-time designation, to name a few. The above information may be verified by the digital asset exchange computer system 6102 in a similar manner as described above in connection with steps S6312, S6316, and S6320, the descriptions of which applying herein. In embodiments, the second order may be digitally signed by the first user private key associated with the first user public key 6120.

The first customer 6202, as noted above, may also transmit a second transaction request that reflects the second order via the API 6107. The second transaction request in embodiments, may account for all of the first amount of digital asset. In embodiments, to account for the first amount of digital asset in the first scripted account 6116, the second transaction request may include at least three transfer requests. The second transaction request, in embodiments, may also include one or more of the following: (1) an updated channel state; (2) a timestamp; (3) the second scripting limitations 6134; (4) the second scripted account information 6130; (5) the first exchange public key 6122-1; (6) the second exchange public key 6122-2; (7) the third exchange public key 6122-3; (8) the first user public key 6120; (9) the second mathematical solution to the second puzzle; (10) the third scripted account information; (11) the third scripting limitations; and/or (12) the first-time designation, to name a few. In embodiments, if the second order is to sell the sixth amount of digital asset, the first transfer request of the at least three transfer requests, in embodiments, may be a transfer of the sixth amount of digital asset from the first scripted address 6116 to one or more of the following: the second scripted address 6118 and/or the third scripted address, to name a few. In embodiments, if the second order is to buy the sixth amount of digital asset, the first transfer request of the at least three transfer requests, in embodiments, may be a transfer of the sixth amount of digital asset from the second scripted address 6118 to one or more of the following: the first scripted address 6116 and/or the third scripted address, to name a few.

The second transfer request, in embodiments, may be a transfer of a seventh amount of digital asset to the second scripted address 6118. The seventh amount of digital asset, in embodiments, may be the amount of digital assets that is not transferred by the second order that is still in the second scripted address 6118. For example, if the second order is to sell the sixth amount of digital asset, the seventh amount of digital asset may be the second amount of digital asset. As another example, if the second order is to buy the sixth amount of digital asset, the seventh amount of digital asset may be the second amount of digital asset less the sixth amount of digital asset. The third transfer request, in embodiments, may be a transfer of an eighth amount of digital asset to the first scripted address 6116. The eighth amount of digital asset, in embodiments, may be the amount of digital assets that is not transferred by the second order that is still in the first scripted address 6116. For example, if the second order is to sell the sixth amount of digital asset, the eighth amount of digital asset may be the third amount of digital asset less the sixth amount of digital asset. As another example, if the second order is to buy the sixth amount of digital asset, the eighth amount of digital asset may be the third amount of digital asset.

In embodiments, the second transaction request may be digitally signed by one or more of the following: the first user private key associated with the first user public key 6120; a private key associated with the first scripted address 6116; a private key associated with the second scripted address 6118; and/or a private key associated with the third scripted address, to name a few.

An updated channel state, referring to FIG. 64, may be the third channel state 6410. In embodiments, the third channel state 6410 may indicate that the first customer 6202 owns the eighth amount of digital asset (e.g. as shown in FIG. 64, 25 digital assets) in the custody of the first scripted address 6116. The first channel state 6406 may also indicate that the digital asset exchange computer system 6102 (or, in embodiments, the digital asset exchange 6110, or both) owns the sixth amount of digital asset and the seventh amount digital asset (e.g. as shown in FIG. 64, 75 digital assets). The third channel state 6410 may reflect a second first order that was received by the digital asset exchange computer system 6102. As shown in FIG. 64, the second order may be for the first customer 6202 to buy 25 second digital assets in exchange for 25 first digital assets. While the second order is to buy a different type of digital asset, from the perspective of the first scripted address 6116 and the digital asset exchange 6110, in embodiments, the first customer 6202 is selling the first digital asset in exchange for the second digital asset. In embodiments, the third channel state 6410 may have a time stamp indicating one or more of the following: (1) the time at which the second order was received; (2) the time at which the first channel state 6406 was sent; (3) the time at which the second channel state 6408 was received; (4) the time at which the third channel state 6410 was received; (5) the first-time designation; and/or (6) the time left until the first-time designation has transpired, to name a few. Once received, the digital asset exchange computer system 6102 may store the updated channel state (third channel state 6410) in memory 6102-C, updating the current channel state. In embodiments, the first customer 6202 may transmit the updated channel state with the second order.

In embodiments, the second transaction request may include fees for trading on the digital asset exchange 6110. The fees, as described herein, may be similar to the transaction fees described above, the description of which applying herein.

In embodiments, if the first-time designation has not transpired, the digital asset exchange computer system 6102 may not send and publish the second transaction request on the blockchain 6108. In embodiments, if the first-time designation has not transpired, but a security incident has been detected or an issue arises regarding the communication between the digital asset exchange computer system 6102 and the first user device 6104, the digital asset exchange computer system 6102 may digitally sign the second transaction request and send and publish the second transaction request on the blockchain 6108 resulting in the transfers requests of the second transaction request to be executed on the blockchain 6108. However, in embodiments, if the first-time designation has transpired, the digital asset exchange computer system 6102 may digitally sign the second transaction request and send and publish the first transaction request on the blockchain 6108 resulting in the transfers requests of the second transaction request to be executed on the blockchain 6108.

After receiving the second order and second transaction request, may verify the second transaction request. In embodiments, to verify the second transaction request, the digital asset exchange computer system 6102 may verify one or more of the following: (1) the sixth amount of digital asset is correct; (2) the seventh amount of digital asset is correct; (3) the eighth amount of digital asset is correct; (4) the second transaction request is signed by a private key associated with the first customer 6202; and/or (5) the first-time designation has not transpired, to name a few. In embodiments, the second order may also be verified by the digital asset exchange computer system 6102. In embodiments, if the second transaction request, the second order, or any information therein, is not verified, the process may continue with FIG. 63E, which is described in more detail below, the description of which applying herein. In embodiments, the third scripted account information may be generated as a result of the first user device 6104 generating the second order and the second transaction request.

Once the second transaction request is verified, the digital asset exchange computer system 6102 may execute the second order. The execution of the second order may be similar to the execution of the first order described above, the description of which applying herein.

The first customer 6202, in embodiments, may continue to place additional orders and transaction requests during the first-time designation. For example, the first customer 6202 may transmit a third order and transaction request, a fourth order and transaction request . . . an Nth order and transaction request. Each order and/or request, in embodiments, may be digitally signed, received, verified, executed, and include similar information as mentioned above with respect to the first order/transaction request and/or the second order/transaction request, the description of which applying herein.

In embodiments, the above mentioned generated and digitally signed settlement transaction may account for the one or more transactions that occur during the first-time designation. For example, if the second order is to buy 10 digital assets, the settlement transaction may result in 60 digital assets being transferred to the first user public address and 40 digital assets being transferred to a public address associated with the digital asset exchange 6110.

As mentioned above, in embodiments, referring to FIG. 63D, at step S6340, the digital asset exchange computer system 6102 and/or the first user device 6104 may determine that one or more of the following are not verified: (1) the first scripted account information 6124; (2) the publishing of the first scripted address 6116; (3) the funding of the first scripted address 6116; (4) the second scripted account information 6130; (5) the second scripted address 6118; (6) the first order; (7) the first transaction request; (8) the second order . . . the Nth order; (9) the second transaction request . . . the Nth transaction request; (10) the settlement transaction; and/or (11) the processing of the settlement transaction, to name a few.

In embodiments, as a result of determining that the above information was not verified, at step S6342, a failed verification notification may be generated. The failed verification notification, in embodiments, may be generated by the digital asset exchange computer system 6102 and/or the first user device 6104. The failed verification notification may indicate one or more of the following: (1) the information that was not verified; (2) whether the first customer may continue trading; and/or (3) options to cure the verification issue, to name a few. In embodiments, the failed verification may be fatal to the first customer 6202 continuing to trade on the digital asset exchange via the API 6107 and using the first scripted address 6116. For example, received authorization instructions may include a bug that causes the digital asset exchange computer system 6102 to determine that the safest action would be to close the channel and cancel the first customer's 6202 trading session. If the digital asset exchange computer system 6102 determines to cancel the trading session and close the channel, the failed verification notification may also include a puzzle solution that corresponds to the verification issue. For example, if the verification issue is with a second transaction request, and the issue is fatal to trading, the digital asset exchange computer system 6102 may include the first puzzle solution to allow the first customer 6202 to withdraw the first customer's 6202 digital assets. In embodiments, the digital asset exchange computer system 6102 may determine how to solve the verification issue. For example, the first customer 6202 may have forgotten to put in an amount of digital asset in the order and the failed verification notification may indicate as such. As another example, the first customer 6202 may have input an amount that is unavailable. Unavailable, for example, may be if the first amount of digital asset is 100 and the first order is to sell 50,000 digital assets.

Once generated, at step S6344, the digital asset exchange computer system 6102 may transmit the failed verification notification to the first user device 6104 via the API 6107. In embodiments, the failed verification notification may include executable machine-readable instructions that cause the failed verification notification to be displayed on a display screen of the first user device 6104 upon receipt of the failed verification notification.

In embodiments, the digital asset exchange computer system may generate corrected information, transaction request, order, and/or settlement agreement, to name a few (steps S6346, S6346', and S6346"). For example, if the first scripted account information 6106 failed the verification process, the digital asset exchange computer system 6102 may generate corrected first scripted account information. As another example, if the first transaction request failed the verification process, the digital asset exchange computer system 6102 may generate a corrected first transaction request. As another example, if the first order failed the verification process, the digital asset exchange computer system 6102 may generate a corrected first order. As yet another example, if the settlement transaction request failed the verification process, the digital asset exchange computer system 6102 may generate a corrected settlement transaction request.

Once the corrected information, transaction request, order, and/or settlement agreement is generated, at step S6348, the digital asset exchange computer system 6102 may transmit the corrected information, transaction request, order, and/or settlement agreement to the first user device 6104 via the API 6107. In embodiments, the corrected information, transaction request, order, and/or settlement agreement may be transmitted with an option for the first customer 6202 to cancel the trading session and close the channel. If the first customer 6202, selects the cancel/close option, the first user device 6104 may send a message to the digital asset exchange computer system 6102, indicating the first customer's 6202 intention to cancel/close. In embodiments, in response to receiving the message, the digital asset exchange computer system 6102 may cancel the trading session, close the channel, and generate a transaction request and/or message containing the first puzzle solution. The generated transaction request and/or message may also include an updated channel state, indicating how many digital assets the first customer 6202 owns in the first scripted address 6116. Once generated, the transaction request and/or message may be transmitted to the first user device 6104, enabling the first customer 6202 to withdraw the digital assets owned by the first customer 6202.

Once the corrected information, transaction request, order, and/or settlement agreement is transmitted to the first user device 6104, the process may continue with the verifying step that the information, transaction request, order, and/or settlement agreement previously failed.

In embodiments, the first customer 6202 may transfer all of the digital assets that were initially deposited into the first scripted address 6116 (e.g. the first amount of digital asset). For example, the first amount of digital asset may be 100 bitcoin and the first customer 6202 may transmit a first, second, third, and fourth order/transaction request. Continuing the example, the first order may be to sell 50 bitcoin, the second order may be to sell 25 bitcoin, the third order may be to buy 10 ether with 10 bitcoin, and the fourth order may be to sell 15 bitcoin. The channel state, after each of the aforementioned orders and/or transactions are verified, in this example, may indicate that the first customer 6202 owns 0 digital asset and the digital asset exchange 6110 owns 100 digital assets.

In embodiments, the first customer 6202 may transfer an additional amount of digital asset to the first scripted account 6116. In embodiments, the first customer 6202 may only transfer additional assets to the first scripted account 6116 during the first-time designation. The transfer of an additional amount of digital asset to the first scripted account 6116 may be similar to the transfer of the first amount of digital asset to the first scripted address 6116 described above in connection with FIGS. 62B and 63B, the description of which applying herein.

In embodiments, the first customer 6202 may deposit multiple types of digital assets into the first scripted account 6116. For example, the first amount may be 100 digital assets. Of the first amount, 50 may be bitcoin, 25 may be ether, 10 may be Litecoin, and 15 may be Gemini dollar.

In embodiments, the cooperation between the digital asset exchange 6110 and the first customer 6202 may breakdown. For example, the first user device 6104 may stop responding to messages from the digital asset exchange computer system 6102. As another example, the first customer 6202 and the digital asset exchange 6110 may not agree on the amounts of digital asset in the settlement transaction. A breakdown in cooperation may result in the digital asset exchange computer system 6102 forcing a settlement by broadcasting the second scripted account and the digitally signed transaction requests. In embodiments, broadcasting the second scripted account and the digitally signed transaction may result in the execution of the digitally signed transactions.

The steps of the processes associated with FIGS. 62A-E and FIGS. 63A-E may be rearranged or omitted.

FIG. 61A is an exemplary block diagram illustrating a digital asset exchange computer system 6102 communicating with a first user device 6104 via an API 6107 in accordance with exemplary embodiments of the present invention. The system shown in connection with FIG. 61A provides a technical solution to the technical problem of securing digital assets in the context of digital asset exchange trading. The system illustrated in FIG. 61A may, in embodiments, include a digital asset exchange computer system 6102 operatively connected to a digital asset exchange 6110. In embodiments, the digital asset exchange computer system 6102 may communicate with the digital asset exchange 6110 via network 125. The digital asset exchange 6110, as described herein, may be similar to the digital asset exchange described in connection with the Centralized Digital Asset Exchange disclosure above, the description of which applying herein.

The digital asset exchange computer system 6102, in embodiments, may be configured to communicate with one or more user devices via one or more channels for the purposes of trading one or more digital assets on the digital asset exchange 6110. This process is illustrated in FIGS. 62A-62E and FIGS. 63A-63E.

In embodiments, a method for non-custodial trading includes: (a) connecting, using an application programming interface associated with an exchange computer system associated with a digital asset exchange and a first user device associated with a first customer of the digital asset exchange; (b) generating, by the exchange computer system, a first mathematical puzzle and a corresponding first mathematical solution associated with the first mathematical puzzle; (c) providing, by the exchange computer system, non-custodial exchange key information comprising: (i) a first exchange public key associated with the digital asset exchange, wherein the first exchange public key corresponds to a first exchange private key; wherein a first key pair comprises the first exchange public key and the first exchange private key, and wherein the first key pair corresponds to a first exchange public address associated with a digital asset; (ii) a second exchange public key associated with the digital asset exchange, wherein the second exchange public key corresponds to a second exchange private key; wherein a second key pair comprises the second exchange public key and the second exchange private key, and wherein the second key pair corresponds to a second exchange public address; and (iii) a third exchange public key associated with the digital asset exchange, wherein the third exchange public key corresponds to a third exchange private key; wherein a third key pair comprises the third exchange public key and the third exchange private key, and wherein the third key pair corresponds to a third exchange public address; wherein the digital asset is maintained on a distributed public transaction ledger maintained in the form of a blockchain by a plurality of geographically distributed computer systems in a peer-to-peer network in the form of a blockchain network; (d) transmitting, from the exchange computer system to the first user device via the application programming interface, the first mathematical puzzle and the non-custodial exchange key information; (e) receiving, via the application programming interface from the first user device by the exchange computer system, first scripted account information for the digital asset associated with the blockchain, wherein the first scripted account information corresponds to a first scripted account and a corresponding first scripted address for use by the blockchain, wherein the first scripted account information comprises a customer public key, the first exchange public key and first scripting limitations, wherein the customer public key is associated with a customer private key, wherein a fourth key pair comprises the customer public key and the customer private key, wherein the fourth key pair corresponds to a first user public address associated with the digital asset, wherein the first scripting limitations include first authorization instructions which authorize transactions received from the first user public address and signed by both the customer private key and the exchange private key, wherein the first scripting limitations include second authorization instructions which authorize transactions after a first-time designation has transpired, which are signed by the customer private key, (f) verifying, by the exchange computer system, the first scripted account information complies with exchange format requirements, including verifying: (1) the customer public key is a first authorized public key associated with the first customer; (2) the first exchange public key is a second authorized public key; (3) the first authorization instructions and the second authorization instructions are each authorized instructions; (g) receiving, via the application programming interface from the first user device by the exchange computer system, an initial channel state indicating that a first amount of digital asset has been transferred via the blockchain to the first scripted address; (h) confirming, by the exchange computer system, that the first scripted address has been published on the blockchain, and that the first amount of digital asset has been received by the first scripted address; (i) receiving, by the exchange computer system from the first user device via the application programming interface, second scripted account information for the digital asset associated with the blockchain, wherein the second scripted account information corresponds to a second scripted address for use by the blockchain, wherein the second scripted account information comprises the customer public key, the second exchange public key and second scripting limitations, wherein the second scripting limitations include third authorization instructions which authorize transactions after the first-time designation has transpired, which are signed by the exchange private key, wherein the second scripting limitations include fourth authorization instructions which authorize transactions, signed by the customer private key, and include the first mathematical solution; (j) verifying, by the exchange computer system, that the second scripting limitations comply with exchange format requirements, including verifying: (1) the customer public key is the first authorized public key associated with the first customer; (2) the first exchange public key is the second authorized public key; (3) the third authorization instructions and the fourth authorization instructions are each authorized instructions; (k) receiving, by the exchange computer system from the first user device via the application programming interface, a first order to sell a second amount of digital asset on the digital asset exchange on behalf of the first customer, wherein the second amount of digital asset is less than the first amount of digital asset; (1) receiving, by the exchange computer system from the first user device via the application programming interface, a first transaction request digitally signed by the customer private key and associated with a first transaction wherein the first transaction comprises: (i) a first transfer of the second amount of digital asset from the first scripted address to the second scripted address; and (ii) a second transfer of a third amount of digital asset from the first scripted address to the first scripted address, wherein the third amount of digital asset is the first amount of digital asset less the second amount of digital asset; (m) verifying, by the exchange computer system, the first transaction request, including verifying: (i) the first amount plus the second amount equals the third amount; and (ii) the first transaction request is digitally signed by a private key that corresponds with the first customer public key; (n) executing, by the exchange computer system, the first order; (o) receiving, by the exchange computer system from the first user device via the application programming interface, a settlement transaction digitally signed by the customer private key and associated with a settlement transaction wherein the settlement transaction comprises: (i) a third transfer of a first settlement amount of digital asset from the first scripted address to the third exchange public address, wherein the first settlement amount is a fourth amount of digital asset, and wherein the fourth amount is either less than the second amount of digital asset or equal to the second amount of digital asset; and (ii) a fourth transfer of a second settlement amount of digital asset from the first scripted address to the first user public address, wherein the second settlement amount is a fifth amount of digital asset, and wherein the fifth amount is less than or equal to the second amount of digital asset subtracted from the first amount of digital asset; (p) verifying, by the exchange computer system, the settlement transaction, including verifying: (i) the first settlement amount is the fourth amount of digital asset; and (ii) the second settlement amount is the fifth amount of digital asset; (q) digitally signing, by the exchange computer system with the first exchange private key, the settlement transaction to generate a digitally signed settlement transaction; (r) publishing, by the exchange computer system to the blockchain, the digitally signed settlement transaction; and (s) verifying, by the exchange computer system, the digitally signed settlement transaction was processed by the blockchain network.

In embodiments, the initial channel state further comprises a timestamp indicating when the first amount of digital asset was transferred to the first scripted address.

In embodiments, the first transaction request further comprises a timestamp indicating when the first order was received.

In embodiments, the method further comprises, between step (n) and step (o), the following steps: (t) receiving by the exchange computer system from the first user device via the application programming interface, a second order to transfer a sixth amount of digital asset on the digital asset exchange, wherein the sixth amount of digital asset is either less than the third amount of digital asset or equal to the third amount of digital asset; (u) receiving, by the exchange computer system from the first user device via the application programming interface, a second transaction request digitally signed by the customer private key and associated with a second transaction wherein the second transaction comprises: (i) a fifth transfer of the sixth amount of digital asset and the second amount of digital asset from the first scripted address to the second scripted address, wherein the sixth amount of digital asset is less than the third amount of digital asset; (ii) a sixth transfer of a seventh amount of digital asset from the first scripted address to the first scripted address, wherein the seventh amount of digital asset is the third amount of digital asset less the sixth amount of digital asset, (v) verifying, by the exchange computer system, the second transaction request, including verifying: (i) the sixth amount is less than the third amount of digital asset; (ii) the seventh amount of digital asset is the third amount less the sixth amount; and (ii) the first transaction request is digitally signed by a private key that corresponds with the first customer public key; and (w) executing, by the exchange computer system, the second order, wherein the first settlement amount is the sixth amount of digital asset, wherein the second settlement amount is the seventh amount of digital asset, and wherein the exchange computer system verifies: (iii) the first settlement amount is equal to the sixth amount of digital asset; and (iv) the second settlement amount is the seventh amount of digital asset. In embodiments, the initial channel state further comprises a first timestamp indicating when the first amount of digital asset was transferred to the first scripted address, the first transaction request further comprises a second timestamp indicating when the first order was received, and the second transaction request further comprises a third timestamp indicating when the second order was received.

In embodiments, the method further comprises, between step (n) and step (o), the following steps: (t) receiving, via the application programming interface from the first user device by the exchange computer system, third scripted account information for the digital asset associated with the blockchain, wherein the third scripted account information corresponds to a third scripted account and a corresponding third scripted account address for use by the blockchain, wherein the third scripted account information comprises the customer public key, the first exchange public key and third scripting limitations, wherein the third scripting limitations include fifth authorization instructions which authorize transactions after the first-time designation has transpired, which are signed by the exchange private key, wherein the third scripting limitations include sixth authorization instructions which authorize transactions, signed by the customer private key, and include a second mathematical solution; (u) generating, by the exchange computer system, a second mathematical puzzle and the second mathematical solution associated with the second mathematical puzzle; (v) verifying, by the exchange computer system, the third scripted account information complies with exchange format requirements, including verifying: (1) the customer public key is the first authorized public key associated with the first customer; (2) the first exchange public key is the second authorized public key; (3) the fifth authorization instructions and the sixth authorization instructions are each authorized instructions; (v) receiving by the exchange computer system from the first user device via the application programming interface, a second order to receive a fourth amount of digital asset on the digital asset exchange; (w) receiving, by the exchange computer system from the first user device via the application programming interface, a second transaction request digitally signed by the customer private key and associated with a second transaction wherein the second transaction comprises: (i) a fifth transfer of the sixth amount of digital asset from the second scripted address to the third scripted address, wherein the sixth amount of digital asset is either less than the second amount of digital asset or equal to the second amount of digital asset; (ii) a sixth transfer of a seventh amount of digital asset from the first scripted address to the first scripted address, wherein the seventh amount of digital asset is the first amount of digital asset less the second amount of digital asset; and (iii) a seventh transfer of an eighth amount of digital asset from the second scripted address to the second scripted address, wherein the eighth amount of digital asset is the second amount of digital asset less the sixth amount of digital asset, (x) verifying, by the exchange computer system, the second transaction request, including verifying: (i) the sixth amount of digital asset is either less than the second amount of digital asset or equal to the second amount of digital asset (ii) the seventh amount of digital asset is the third amount of digital asset; and (ii) the second transaction request is digitally signed by a private key that corresponds with the first customer public key; and (y) executing, by the exchange computer system, the second order, wherein the settlement transaction further comprises: (iii) an eighth transfer of a third settlement amount of digital asset from the third scripted address to the first user public address, wherein the third settlement amount is the sixth amount of digital asset, wherein the first settlement amount is eighth amount, wherein the second settlement amount is the seventh amount, and wherein the exchange computer system verifies: (iii) the first settlement amount is equal to the eighth amount of digital asset; (iv) the second settlement amount is the seventh amount of digital asset; and (v) the third settlement amount is the sixth amount of digital asset. In embodiments, the initial channel state further comprises a first timestamp indicating when the first amount of digital asset was transferred to the first scripted address, the first transaction request further comprises a second timestamp indicating when the first order was received, and the second transaction request further comprises a third timestamp indicating when the second order was received.

In embodiments, the method further comprises, between step (n) and step (o), the following steps: (t) receiving, via the application programming interface from the first user device by the exchange computer system, third scripted account information for the digital asset associated with the blockchain, wherein the third scripted account information corresponds to a third scripted account and a corresponding third scripted address for use by the blockchain, wherein the third scripted account information comprises the customer public key, the first exchange public key and third scripting limitations, wherein the third scripting limitations include fifth authorization instructions which authorize transactions after the first-time designation has transpired, which are signed by the exchange private key, wherein the third scripting limitations include sixth authorization instructions which authorize transactions, signed by the customer private key, and include a second mathematical solution; (u) generating, by the exchange computer system, a second mathematical puzzle and the second mathematical solution associated with the second mathematical puzzle; (v) verifying, by the exchange computer system, the third scripted account information complies with exchange format requirements, including verifying: (1) the customer public key is the first authorized public key associated with the first customer; (2) the first exchange public key is the second authorized public key; (3) the fifth authorization instructions and the sixth authorization instructions are each authorized instructions; (w) receiving by the exchange computer system from the first user device via the application programming interface, a second order to transfer a sixth amount of digital asset on the digital asset exchange, wherein the sixth amount of digital asset is either less than the third amount of digital asset or equal to the third amount of digital asset; (x) receiving, by the exchange computer system from the first user device via the application programming interface, a second transaction request digitally signed by the customer private key and associated with a second transaction wherein the second transaction comprises: (i) a fifth transfer of the sixth amount of digital asset from the first scripted address to the third scripted address; (ii) a sixth transfer of a seventh amount of digital asset from the first scripted address to the first scripted address, wherein the seventh amount of digital asset is the third amount of digital asset less the sixth amount of digital asset, (y) verifying, by the exchange computer system, the second transaction request, including verifying: (i) the sixth amount of digital asset is either less than the third amount of digital asset or equal to the third amount of digital asset; (ii) the seventh amount of digital asset is the third amount of digital asset less the sixth amount of digital asset; and (ii) the second transaction request is digitally signed by a private key that corresponds with the first customer public key; and (z) executing, by the exchange computer system, the second order, wherein the settlement transaction further comprises: (iii) a seventh transfer of a third settlement amount of digital asset from the third scripted address to the third exchange public address, wherein the third settlement amount is the sixth amount of digital asset, wherein the first settlement amount is eighth amount, wherein the second settlement amount is the seventh amount, and wherein the exchange computer system verifies: (iii) the first settlement amount is equal to the sixth amount of digital asset; and (iv) the second settlement amount is the seventh amount of digital asset. In embodiments, the sixth amount of digital asset is either less than the second amount of digital asset. In embodiments, the second transaction further comprises: (C) a fifth transfer of the second amount of digital asset from the first scripted address to the second scripted address. In embodiments, the initial channel state further comprises a first timestamp indicating when the first amount of digital asset was transferred to the first scripted address, the first transaction request further comprises a second timestamp indicating when the first order was received, and the second transaction request further comprises a third timestamp indicating when the second order was received.

In embodiments, the first mathematical puzzle and the corresponding first mathematical solution are a first set of mathematical puzzles comprising a plurality of mathematical puzzles and corresponding first set of mathematical solutions comprising a plurality of mathematical solutions.

In embodiments, the first mathematical solution is a second mathematical puzzle associated with a second mathematical solution.

In embodiments, generating the first mathematical puzzle and the corresponding first mathematical solution associated with the first mathematical puzzle comprises: (i) providing, by the exchange computer system, an algorithm to generate the first mathematical puzzle and the corresponding first mathematical solution; (ii) obtaining, by the exchange computer system, an exchange puzzle seed, wherein the exchange puzzle seed is based in part on at least one of: (A) the first user public address; (B) the first exchange public key; (C) the second exchange public key; and (D) the third exchange public key; (iii) generating, by the exchange computer system, a first exchange puzzle value based at least in part on the exchange puzzle seed; (iv) generating, by the exchange computer system, a second exchange puzzle value, such that the application of the algorithm to the first exchange puzzle value results in the second exchange puzzle value; and (v) generating, by the exchange computer system, a third exchange puzzle value, such that the application of the algorithm to the second exchange puzzle value results in the third exchange puzzle value, wherein the second exchange puzzle value is the first mathematical puzzle, and wherein the third exchange puzzle value is the first mathematical solution.

In embodiments, the settlement transaction is received by the exchange computer system by receiving the settlement transaction digitally signed by the customer private key from the first user device via the application programming interface.

In embodiments, receiving the settlement transaction digitally signed by the customer private key further comprises: (i) generating, by the exchange computer system, an unsigned settlement transaction; (ii) sending, by the digital asset exchange computer system to the first user device via the application programming interface, the unsigned settlement transaction; and (iii) receiving, by the digital asset exchange computer system from the first user device via the application programming interface, the settlement transaction digitally signed by the customer private key.

In embodiments, the first user device is a mobile electronic device operating a mobile application.

In embodiments, the method further comprises the steps of: (t) prior to receiving the settlement transaction, transmitting, from the exchange computer system to a third-party computer system, monitoring information comprising: (i) the first scripted address; (ii) the second scripted address; (iii) the exchange public address; and (iv) the first user public address wherein the third-party computer system monitors the first scripted address and the second scripted address to detect a published transaction that is associated with either the first scripted address or the second scripted address, wherein the third-party computer system monitors both the first scripted address and the second-scripted address for the published transaction during the first-time designation, and wherein, in the event the third-party computer system detects the published transaction, the third-party computer system generates and sends a first notification to the first user device. In embodiments, the event the third-party computer system detects the published transaction, the third-party computer system generates and sends a second notification to the exchange computer system. In embodiments, the third-party computer system monitors the first scripted address and the second scripted address in substantially real-time during the first-time designation.

In embodiments, the non-custodial exchange key information further comprises: (iv) the first scripting limitations.

In embodiments, the non-custodial exchange key information further comprises: (iv) the second scripting limitations.

In embodiments, the non-custodial exchange key information further comprises: (iv) the first scripting limitations; and (v) the second scripting limitations.

In embodiments, the second key pair is the third key pair.

In embodiments, the first key pair is the third key pair.

In embodiments, the first key pair is the second key pair.

In embodiments, the digital asset includes at least one of the following: (i) bitcoin; (ii) ether; (iii) litecoin; (iv) bitcoin cash; (v) zcash; and (vi) digital asset tokens. In embodiments, the digital asset tokens include Gemini dollar.

In embodiments, the non-custodial exchange key information is provided by the exchange computer system by transmitting the non-custodial exchange key information to the first user device via the application programming interface.

In embodiments, the non-custodial exchange key information is provided by the exchange computer system by publishing the non-custodial exchange key information on a website associated with the digital asset exchange.

In embodiments, step (d) occurs before step (c).

In embodiments, the initial channel state is received with the first scripted account information.

In embodiments, the second scripted account information is received with the first order and the first transaction request.

In embodiments, the first scripted address receives the first amount of digital asset from the first user public address.

In embodiments, the first transaction further comprises: (iii) a fifth transfer of a sixth amount of digital asset from the first scripted address to the third exchange public address, wherein the sixth amount of digital asset is a trading fee, and wherein the settlement transaction further comprises: (iii) a sixth transfer of a third settlement amount of digital asset from the first scripted address to the third exchange public address, wherein the third settlement amount is the sixth amount, wherein the fourth amount is less than the second amount, and wherein the fifth amount is less than the second amount of digital asset subtracted from the first amount of digital asset.

In embodiments, the first scripted address is provided by the first user device. In embodiments, the first scripted address is a result of the first user device applying an algorithm to at least one of: (i) the customer public key; (ii) the first exchange public key; (iii) the second exchange public key; (iv) the third exchange public key; and (v) the first mathematical puzzle.

In embodiments, the first scripted address is provided by the exchange computer system.

In embodiments, the first scripted address is a result of the exchange computer system applying an algorithm to at least one of: (i) the customer public key; (ii) the first exchange public key; (iii) the second exchange public key; (iv) the third exchange public key; and (v) the first mathematical puzzle.

In embodiments, the second scripted address is provided by the first user device. In embodiments, the second scripted address is a result of the first user device applying an algorithm to at least one of: (i) the customer public key; (ii) the first exchange public key; (iii) the second exchange public key; (iv) the third exchange public key; and (v) the first mathematical puzzle.

In embodiments, the first scripted account is a first pay-to-script-hash account. In embodiments, the second scripted account is a second pay-to-script hash account.

Figure 71A:
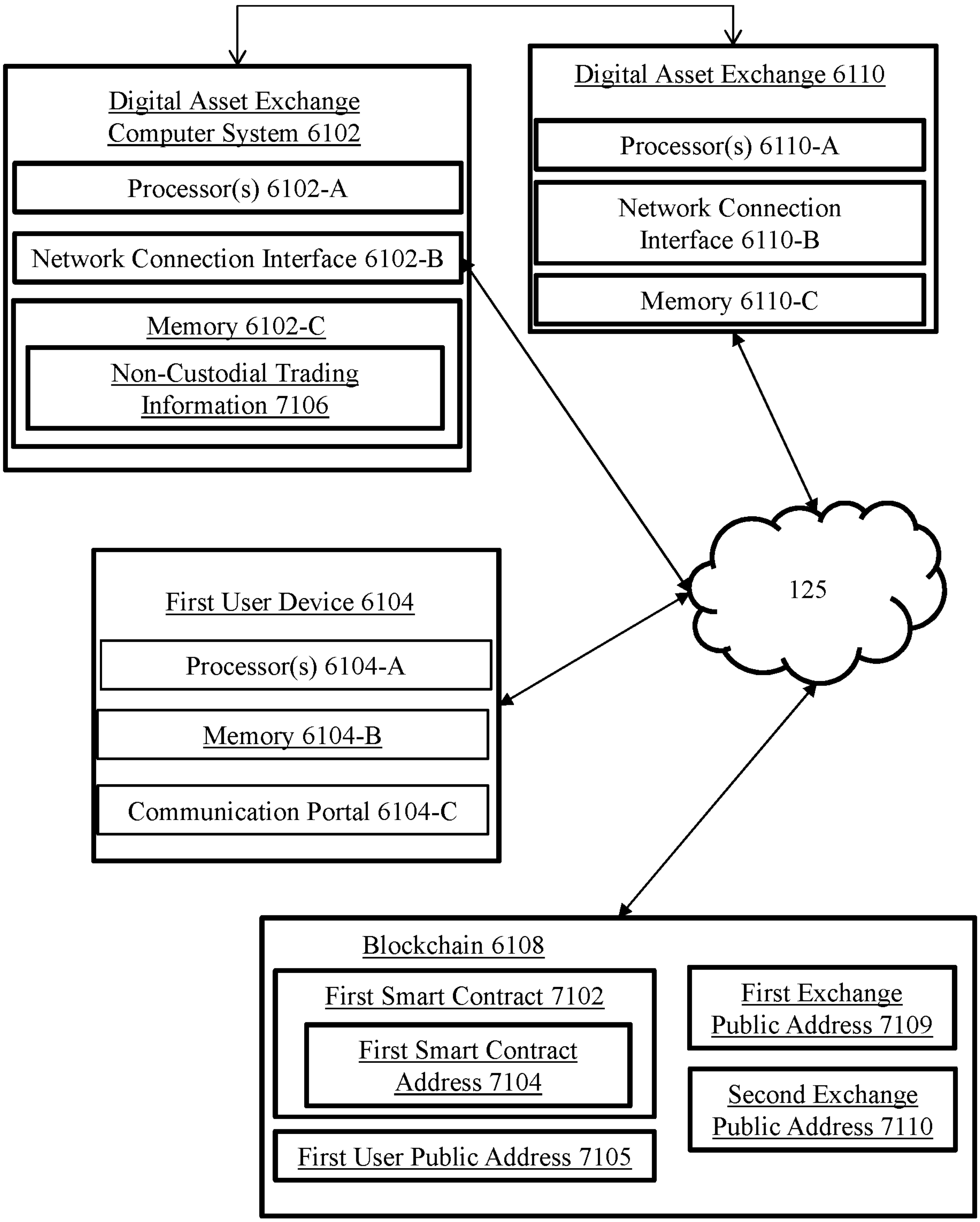
FIG. 71A is an exemplary block diagram illustrating a digital asset exchange computer system communicating with a first user device in accordance with exemplary embodiments of the present invention.

Referring to the process illustrated in connection with FIGS. 72A-72G, in embodiments, the process of trading on a digital asset exchange 6110 using bi-directional channels and a smart contract via an application programing interface (API) 6107 may begin at step S77202. At step S77202, non-custodial trading information may be obtained by a first customer device, e.g. the first user device 6104, associated with a first customer. Referring to FIG. 71A, the non-custodial trading information 7106 may be stored on memory 6102-C of the digital asset exchange computer system 6102. Referring to FIG. 71C, the non-custodial trading information 7106 may include one or more of the following, the exchange public key 7120, the first exchange public address 7109, the second exchange public address 7110, and/or non-custodial formatting requirements 7122. In embodiments, the non-custodial formatting requirements 7122 may include formatting requirements for trading on the digital asset exchange 6110 using a smart contract (e.g. first smart contract 7102). For example, the non-custodial formatting requirements 7122 may include one or more of the following: deposit information requirement module 7124, settlement time requirement module 7126, first waiting period requirement module 7128, second waiting period requirement module 7130, a white list associated with the digital asset exchange 6110, and/or a black list associated with the digital asset exchange 6110.

The modules within the non-custodial formatting requirements 7122 may allow for one or more customers to customize their non-custodial trading session. The customization of the non-custodial trading session, in embodiments, may be shaped by the modules of the non-custodial formatting requirements 7122. For example, the deposit information requirement module 7124 may require one or more of the following: a disclosure of the amount the customer intends to deposit for trading, a minimum deposit amount and/or a maximum deposit amount (which, in embodiments, may be related to the customer and/or information thereof). As another example, the settlement time requirement module 7126 may allow the customer to choose a time and/or date at which the non-custodial trading session (e.g. the time between deposit and settlement) begins and/or ends. In embodiments, as another example, the first waiting period requirement module 7128 may allow the customer to decide how much time should transpire between initiating settlement and finalizing settlement. In embodiments, the first waiting period requirement module 7128 may put limits on the amount of time—e.g. not zero, more than 10 minutes, less than two weeks, and/or less than one year, to name a few. In embodiments, as another example, the second waiting period requirement module 7130 may allow the customer to decide how much time of inaction on the part of the digital asset exchange computer system 6102 before the customer can get a refund of their deposit. In embodiments, the second waiting period requirement module 7130 may put limits on the amount of time—e.g. not zero, more than 10 minutes, less than two weeks, and/or less than one year, to name a few.

In embodiments, the digital asset exchange computer system 6102 may limit the customers who can use non-custodial trading via a white list associated with the digital asset exchange 6110 and/or a black list associated with the digital asset exchange 6110.

In embodiments, the non-custodial trading information 7106 may be obtained by the first user device 6104 by receiving the non-custodial trading information 7106 from the digital asset exchange computer system, via a network connection and/or an API. In embodiments, the non-custodial trading information 7106 may be obtained by the first user device 6104 by accessing the information on a website associated with the digital asset exchange computer system 6102.

The exchange public key 7120, in embodiments, may be a public key associated the digital asset exchange 6110 and blockchain 6108. Referring to FIG. 71A, the digital asset exchange computer system 6102 may be associated with one or more public addresses on the blockchain 6108. The first exchange public address 7109, in embodiments, may be a public address used by the digital asset exchange computer system 6102 to receive sums of digital assets being traded on the digital asset exchange 6110. In embodiments, the second exchange public address 7110 may be a public address used by the digital asset exchange computer system 6102 to receive fees relating to trading on the digital asset exchange 6110. In embodiments, the digital asset exchange computer system 6102 may use one public address for fees and traded digital assets.

In embodiments, the non-custodial trading information 7106, in embodiments, may also include the first smart contract instructions 7108 and/or the first smart contract address 7104.

Referring back to FIG. 72A, to begin a non-custodial trading session, the first user device 6104 may, at step S77204, generate a non-custodial trading request. In embodiments, the non-custodial trading request may include one or more of the following: a first customer public address (e.g. first user public address 7105), the exchange public key 7120, a first smart contract address (e.g. first smart contract address 7104) associated with the blockchain and the digital asset, and first smart contract instructions (e.g. first smart contract instructions 7108). In embodiments, the first smart contract address 7104 is provided by the first user device 6104. In embodiments, the first smart contract address 7104 is provided by the digital asset exchange computer system 6102. In embodiments, the first smart contract address 7104 is generated by applying an algorithm to one or more of: the first customer public key, the exchange public key 7120, the first exchange public address 7109, the second exchange public address 7110, and/or the first user public address 7105, to name a few.

In embodiments, the non-custodial trading request may be generated with the help of a graphical user interface displayed on the first user device 6104. Referring to FIG. 71D, the user may log into an application associated with the digital asset exchange 6110 and be presented with a GUI prompting the customer to input one or more data fields. For example, the graphical user interface may prompt the user to input one or more of the following: first customer public address 7134, first exchange public key 7136, second exchange public key 7138, settlement time 7140, first waiting period 7142, second waiting period 7144, and/or intended deposit amount 7146. Once inputted, the customer may select "SUBMIT" which may cause a non-custodial trading request to be sent to the digital asset exchange computer system 6102. In embodiments, the "SUBMIT" selection may also cause the first smart contract address 7104 to be generated and published.

Figure 71B:
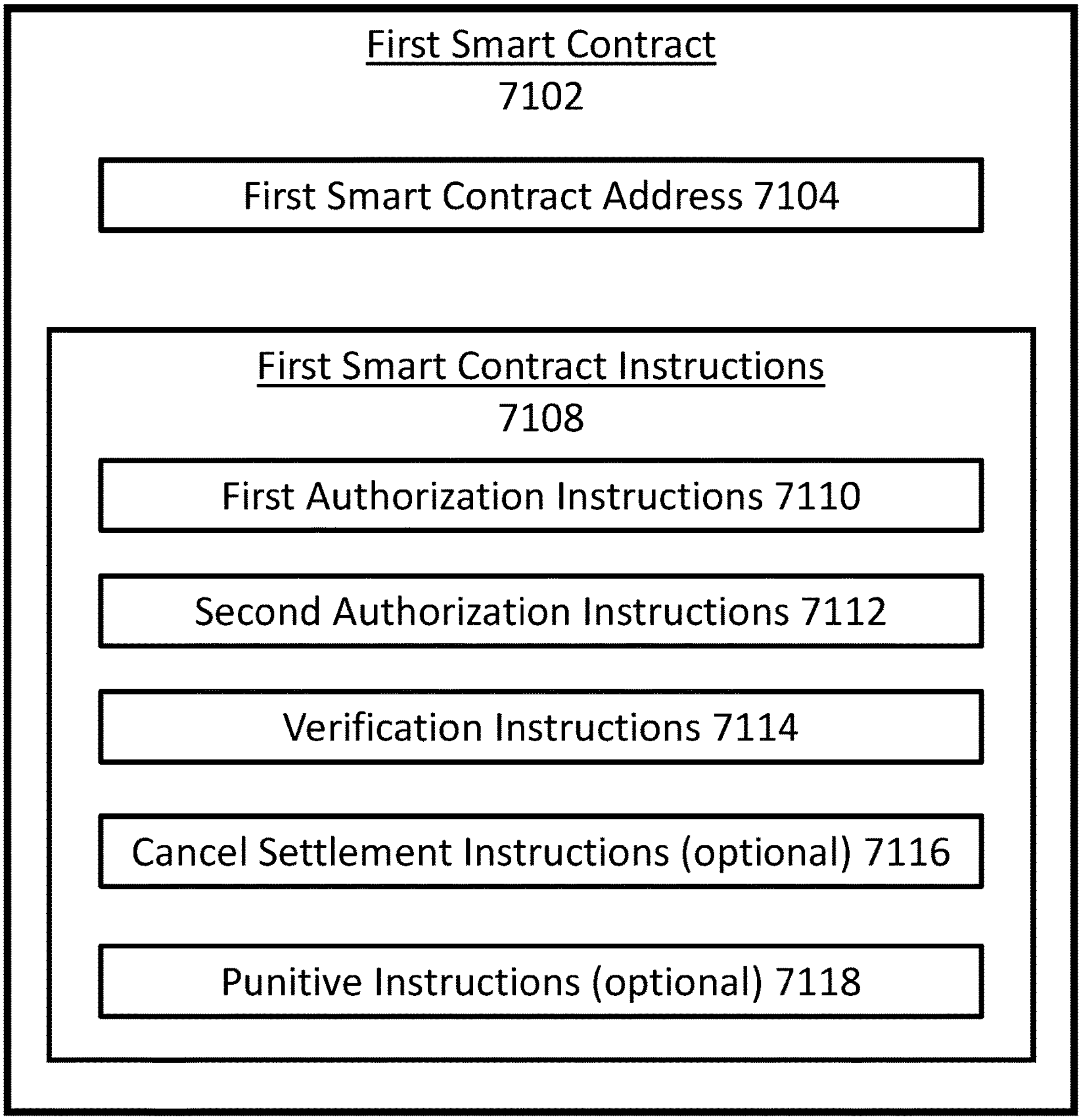
FIG. 71B is an exemplary block diagram illustrating a first smart contract in accordance with exemplary embodiments of the present invention.
Figure 71C:
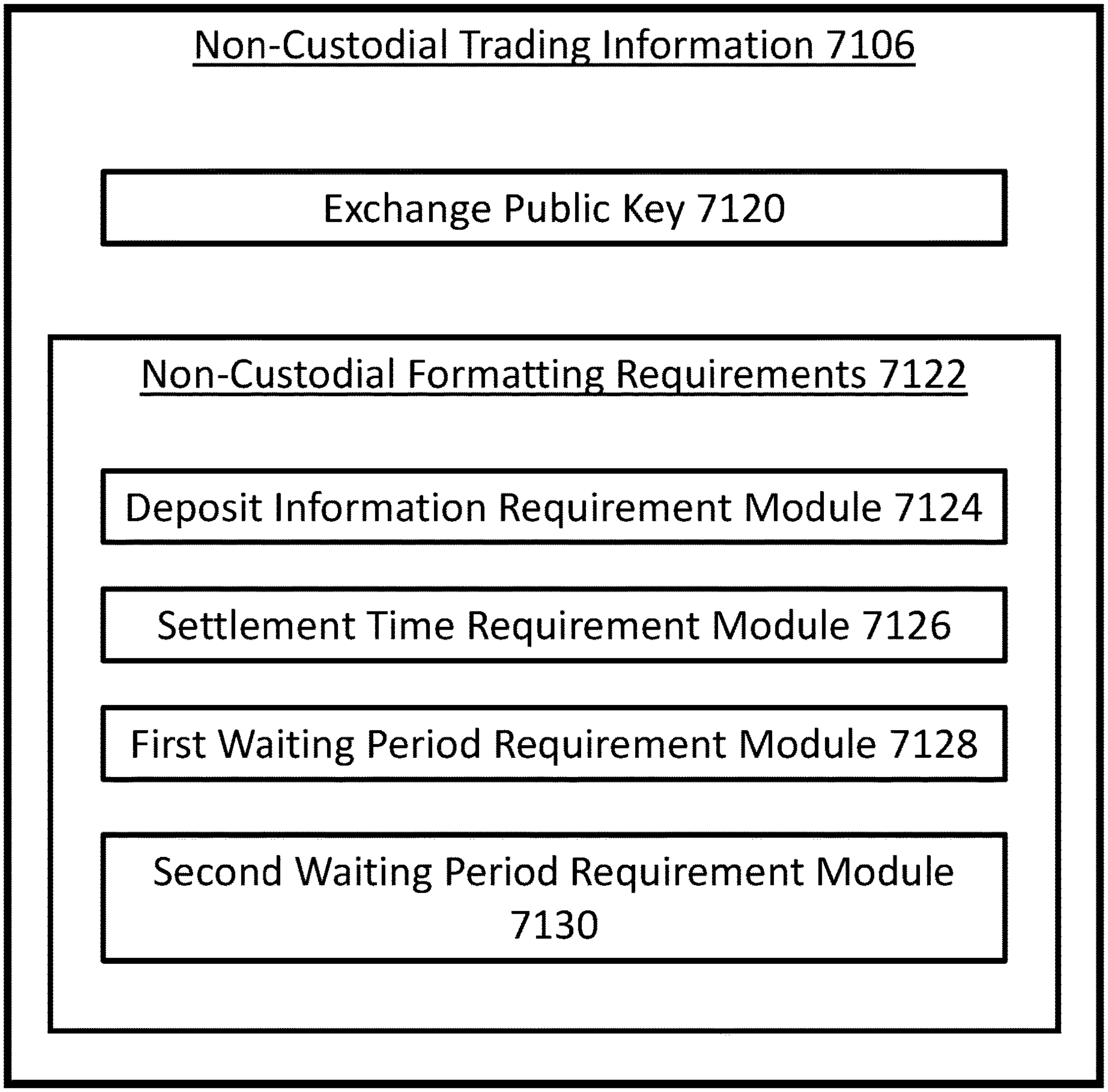
FIG. 71C is an exemplary block diagram illustrating non-custodial trading information in accordance with exemplary embodiments of the present invention.
Figure 71D:
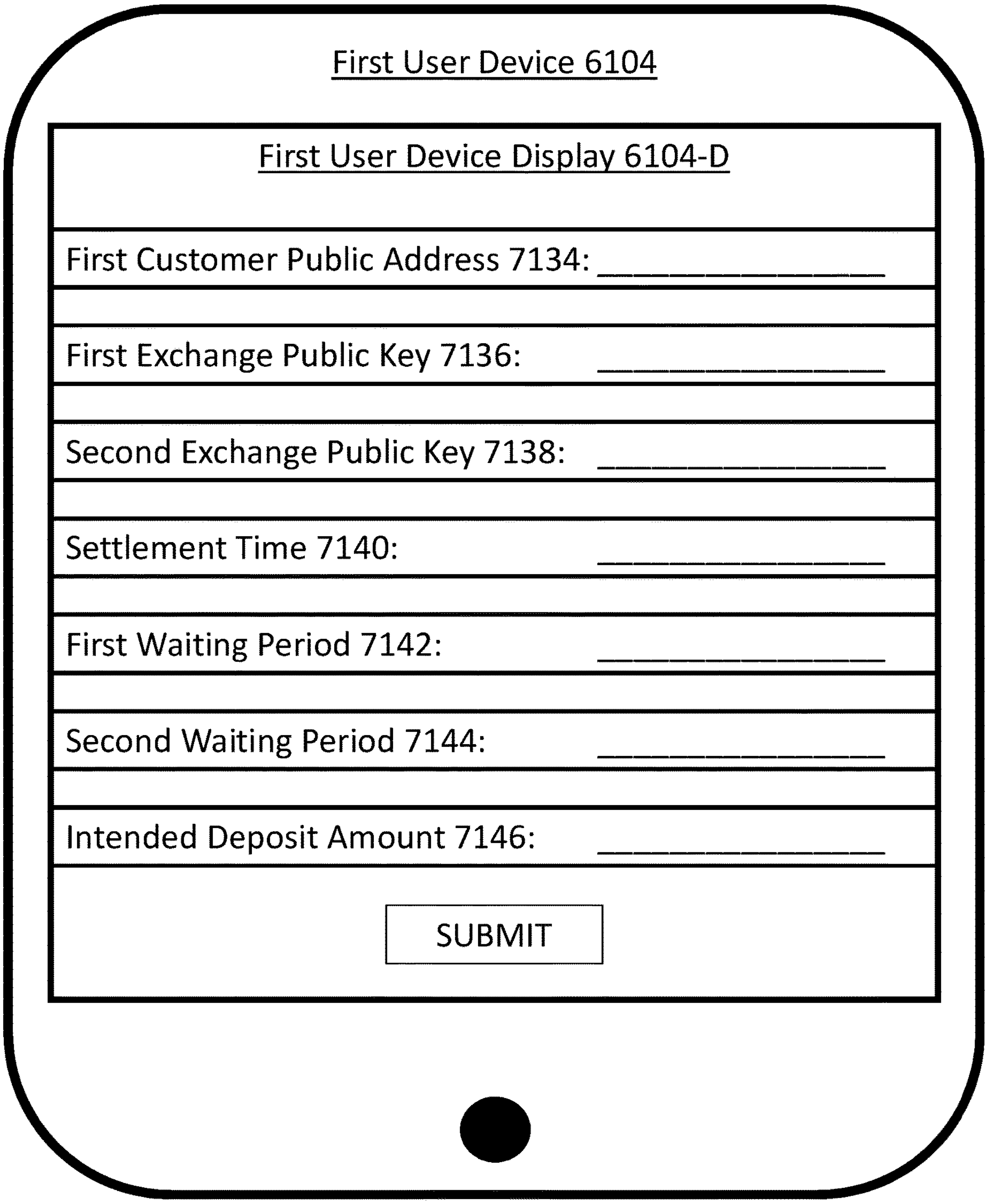
FIG. 71D is an exemplary graphical user interface being displayed on a first user device in accordance with exemplary embodiments of the present invention.

Referring to FIG. 71B, the first smart contract 7102 may be associated with the first smart contract address 7104 and first smart contract instructions 7108. The first smart contract instructions 7108, provided by the customer, may include one or more of the following: first authorization instructions 7110, second authorization instructions 7112, verification instructions 7114, cancel settlement instructions 7116, and/or punitive instructions 7118. In embodiments, the first authorization instructions may authorize transactions that are: (1) digitally signed by the customer private key; (2) received from the first user public address 7105; and (3) received after a first waiting period has transpired since an initiate settlement message was received by the first user public address 7105, first exchange public address 7109, and/or the second exchange public address 7110. In embodiments, the first waiting period may correspond to the amount of time to transpire between the initiate settlement message and a finalize settlement message (e.g. the information supplied regarding the first waiting period requirement module 7128). In embodiments, the first authorization instructions may authorize transactions that are: (1) digitally signed by the customer private key; (2) received from the first user public address 7105; and (3) received after the first smart contract address 7104 received an initiate settlement message from the first user public address 7105, first exchange public address 7109, and/or the second exchange public address 7110.

In embodiments, the second authorization instructions 7112 may authorize transactions that are: (1) digitally signed by the customer private key; (2) received from the first user public address 7105; and (3) received after a second waiting period has transpired since at least one order and/or transaction was transmitted to the digital asset exchange computer system 6102 and not executed by the digital asset exchange computer system 6102. In embodiments, the second waiting period may correspond to the amount of time to transpire that allows a customer to get a refund due to inactivity on the part of the digital asset exchange computer system 6102.

In embodiments, the verification instructions 7114 may correspond to instructions that verify initiate settlement messages when a dispute message is received by the first smart contract address 7104 during the first waiting period. For example, if a party to the contract disputes the initiate settlement message that is published by the first smart contract 7102, the party disputing the message may generate and transmit a dispute message to the first smart contract address 7104 during the first waiting period.

In embodiments, the cancel settlement instructions 7116 may control situations where a dispute message is received, and the initiate settlement message is deemed to be not verified. The cancel settlement instructions 7116, when a settlement message is not able to be verified, may cause the first smart contract 7104 to do one or more of the following: (1) cancel the settlement; (2) settle the contract based on the dispute message; and/or (3) communicate with the punitive instructions to determine the punitive penalty, to name a few.

In embodiments, the punitive instructions 7118 may impose a penalty on the party that transmitted the initiate settlement message that is not able to be verified. The penalty, in embodiments, may be a penalty fee, which, in embodiments, may be a percentage of the deposit, a static fee, a fee on a sliding scale based on the initiate settlement message, and/or the entirety of the amount of assets in the custody of the first smart contract 7102, to name a few.

In embodiments, the non-custodial trading request may also include a request to set up an API connection between the first user device 6104 and the digital asset exchange computer system 6102. In embodiments, to connect with the digital asset exchange computer system a user device associated with the customer (e.g. first customer 6202) may send a request from the first user device 6104 to the digital asset exchange computer system 6102 via network 125. In embodiments, in response to receiving the request, the digital asset exchange computer system 6102 may process and accept the request and set up the connection. In embodiments, a completed connection may be signaled and/or confirmed by the digital asset exchange computer system 6102 by generating and transmitting a confirmation message to the first user device 6104.

In embodiments, the generation of the first smart contract 7102, the first smart contract address 7104, the first smart contract instructions 7108 and/or the providing of the non-custodial trading information may be similar to the generation and providing of the non-custodial exchange key information 6104 and the scripted account information 6106 described above in connection with FIGS. 61A, 61B, 61C, and 63A-63D, the descriptions of which applying herein.

Referring to FIG. 72A, the process may continue with step S77206. At step S77206, the first user device 6104 transmits the non-custodial trading request to the digital asset exchange computer system via network 125 and/or an API connection between the first user device 6104 and the digital asset exchange computer system 6102. In embodiments, after receiving the non-custodial trading request, the digital asset exchange computer system 6102 may verify the non-custodial trading request (see, e.g. FIG. 73A, step S77306, the description of which applying herein). In embodiments, if the non-custodial trading request is verified, the digital asset exchange computer system 6102 may generate and send a confirmation message to one or more of the first user device 6104 and/or the first user public address 7105. In embodiments, if the non-custodial trading request is not verified, the digital asset exchange computer system 6102 may generate and send a failed verification message to one or more of the first user device 6104 and/or the first user public address 7105 and the process may stop.

In embodiments, the process of FIGS. 72A-72H may continue with step S77208. At step S77208, the first user device 6104 may generate a first transaction request. In embodiments, the first transaction request may include a transfer of a first amount of digital asset from the first user public address 7105 to the first smart contract address 7104.

The first transaction request, in embodiments, may be digitally signed by the first customer private key.

In embodiments, the process of FIGS. 72A-72H may continue with step S77210. At step S77210, the first user device 6104 may transmit the first transaction request. The first transaction request, in embodiments, may be transmitted to the first user public address 7105 via the blockchain. In embodiments, the first transaction request may be transferred to an administrator public address associated with the blockchain via the blockchain from the first user public address 7105. In embodiments, the first transaction request may be transferred to the first exchange public address 7109 or the second exchange public address 7110 via the blockchain from the first user public address 7105.

In embodiments, the first user device 6104 may generate one or more puzzles with one or more corresponding solutions. The generation of puzzles and corresponding solutions may be similar to the description above in connection with FIGS. 63A-63D, the description of which applying herein.

In embodiments, the process of FIGS. 72A-72H may continue with step S77212. At step S77212, the first user device 6104 may generate an initial channel state. The initial channel state may indicate that the first amount of digital asset was deposited into the first smart contract address 7105. In embodiments, the initial channel state may include a time stamp indicating the time at which the first amount of digital asset was deposited. In embodiments, the initial channel state may be similar to the first channel state 6406 described above in connection with FIG. 64 and the initial channel state described above in connection with FIGS. 63A-63D, the descriptions of which applying herein.

In embodiments, the process of FIGS. 72A-72H may continue with step S77214. At step S77214, the first user device 6104 may transmit the initial channel state to the digital asset exchange computer system via network 125. After receiving the initial channel state, the digital asset exchange computer system may verify the initial channel state by checking to see if the first smart contract 7104 is published and to see whether the first amount of digital asset was deposited into the first smart contract 7104. In embodiments, if the initial channel state is verified, the digital asset exchange computer system 6102 may generate and send a confirmation message to one or more of the first user device 6104 and/or the first user public address 7105. In embodiments, if the initial channel state is not verified, the digital asset exchange computer system 6102 may generate and send a failed verification message to one or more of the first user device 6104 and/or the first user public address 7105 and the process may stop.

In embodiments, the process of FIGS. 72A-72H may continue with step S77216. At step S77216, the first customer device may generate a first order. In embodiments, the first order may be to transfer a second amount of digital assets. For example, the first order may be to sell 5 bitcoin. In embodiments, the second amount of digital asset may be less than or equal to the first amount of digital asset, which may be verified by the digital asset exchange computer system 6102 (see e.g. FIG. 73, step S77316, the description of which applying herein). The first order, in embodiments, may be digitally signed by the first customer private key. In embodiments, the first order may include a timestamp indicating the time at which the first order was transmitted to and/or received by the digital asset exchange computer system 6102.

In embodiments, the process of FIGS. 72A-72H may continue with step S77218. At step S77218, the first customer device may generate a second transaction request. The second transaction request may be digitally signed by the first customer private key and include one or more of the following: (1) a first transfer of the second amount of digital asset from the first smart contract address 7104 to the first exchange public address 7109; (2) a second transfer of a third amount of digital asset from the first smart contract address 7104 to the second exchange public address 7110 (the third amount, for example, corresponding to a trading fee); (3) a third transfer of a fourth amount of digital asset from the first smart contract address 7104 to the first user public address 7105 (the fourth amount of digital asset may correspond to the first amount of digital asset less the sum of the second and third amount of digital asset); and/or (4) a first customer mathematical puzzle. In embodiments, the second transaction request may include a timestamp indicating the time at which the second transaction request was transmitted to and/or received by the digital asset exchange computer system 6102.

Figure 72B:
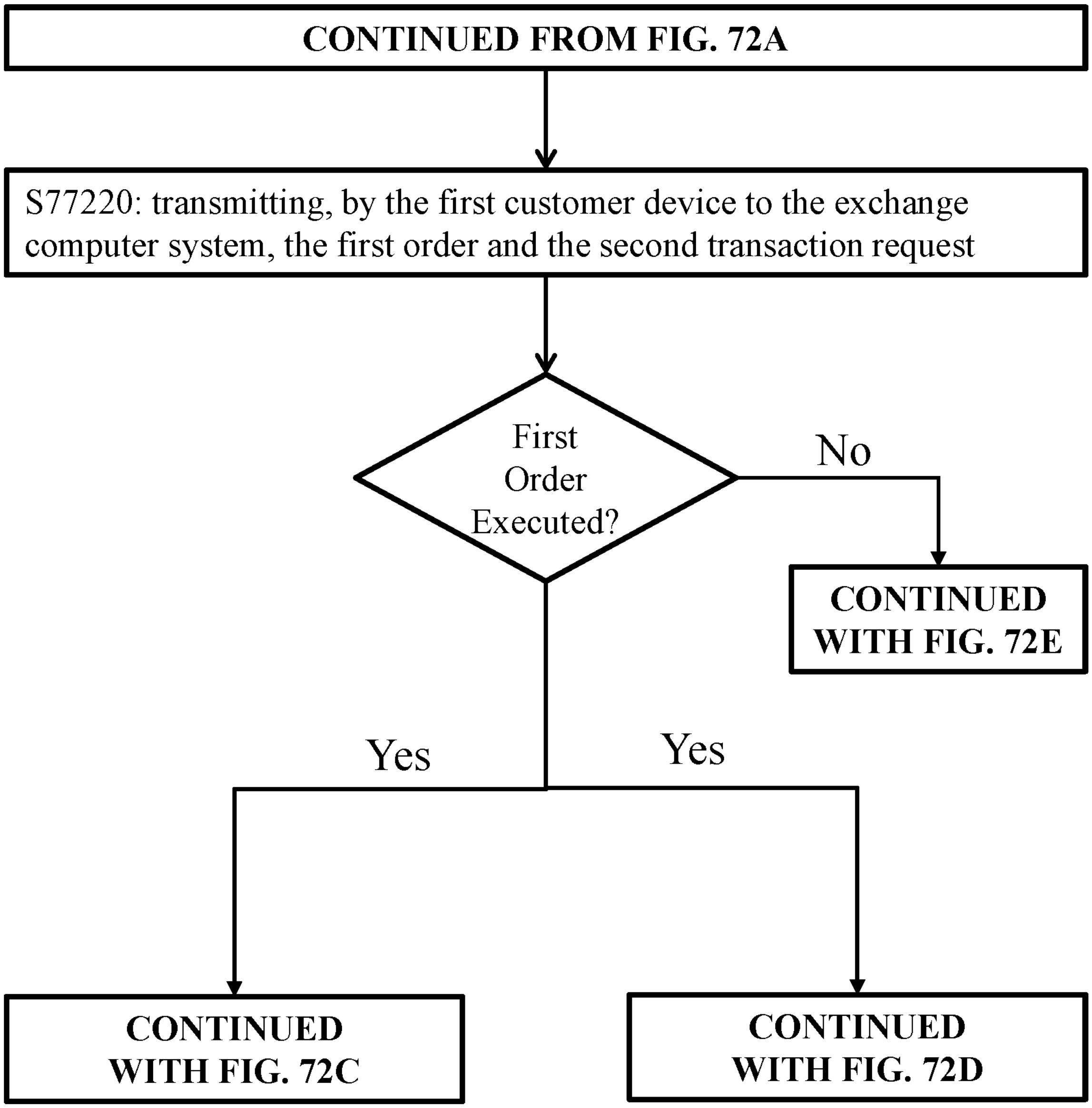

In embodiments, the process of FIGS. 72A-72H may continue with FIG. 72B. Referring to FIG. 72B, at step S77220, the first user device 6104 may transmit the first order and the second transaction request to the digital asset exchange computer system 6102 via network 125 and/or API connection 6107. In embodiments, the second transaction request may be transmitted to the first smart contract address 7104 from the first user public address 7105 via the blockchain 6108. In embodiments, upon receipt of the second transaction request, the first smart contract 7102 may store the second transaction request until the settlement time has arrived. In embodiments, the first order may be transmitted separately, together with, or contemporaneously with the second transaction request. In embodiments, the second transaction request may be transmitted before the first order. In embodiments, the first order may be transmitted before the second transaction request.

In embodiments, upon receipt of the first order, the digital asset exchange computer system 6102 may execute the first order (may be similar to the description of the execution of the first order in step S6328 of FIG. 63D, the description of which applying herein). Upon execution of the first order, in embodiments, the digital asset exchange computer system may generate and transmit a confirmation message, noting that the first order was executed. In embodiments, upon execution of the first order, the digital asset exchange computer system 6102 may note the execution of the first order in a ledger operatively connected to the digital asset exchange computer system 6102. The ledger, in embodiments, may be available to the public or to customers of the digital asset exchange 6110.

In embodiments, the first order may not be executed by the digital asset exchange computer system 6102. Referring to FIG. 72E, in the event that the first order was not executed, and the second waiting period has expired, the process of FIGS. 72A-72H may continue with step S77254. At step S77254, the first customer device determines that the first order was not executed. As mentioned above, this determination may be made by not receiving a confirmation message and/or seeing the first order is not on the ledger. This determination may also be made by a trusted third party computer system (e.g. a watch tower). In embodiments, as mentioned above, the second waiting period may correspond to a time of inactivity that may trigger a refund of the first customer's digital assets from the first smart contract 7102.

Figure 74:
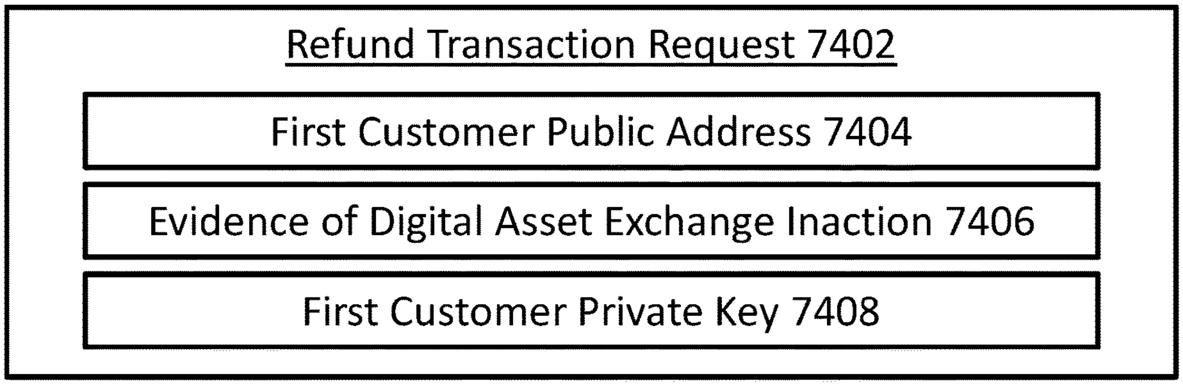
FIG. 74 is an exemplary block diagram illustrating a refund transaction request in accordance with exemplary embodiments of the present invention.

After determining that the first order was not executed, and the second waiting period has expired, the process may continue with step S77256. At step S77256, the first user device 6104 may generate a digitally signed refund transaction request. Referring to FIG. 74, a refund transaction request 7402 may include one or more of the following: (1) the first customer public address 7404 (e.g. the first user public address 7105); (2) evidence of the digital asset exchange inaction 7406; (3) the first customer private key 7408; (4) a public address the first customer wishes the refund to be transferred to; and/or (5) a timestamp, to name a few. The evidence of the digital asset exchange's inaction 7406 (and/or the digital asset exchange computer system's inaction) may include one or more of the following: (1) the first order; (2) the second transaction request; (3) a timestamp associated with the first order; (4) a timestamp associated with the second transaction request; (5) a third transaction request digitally signed by the customer private key requesting a transfer of the first amount of digital asset from the first smart contract address 7104 to the first user public address 7105; and/or (6) a copy of the entire and/or relevant portions of the ledger during the second waiting period, to name a few.

Referring to FIG. 72E, the process for a refund may continue with step S77258. At step S77258, the first customer device may transmit the digitally signed refund transaction request 7402 from the first user public address 7105 to the first smart contract address 7104 via the blockchain 6108. Once received, the first smart contract 7102 may verify whether the digital asset exchange computer system 6102 has been inactive with regards to the first order for the second waiting period.

In embodiments, if the refund transaction request 7402 is not verified, the first smart contract 7102 may generate and transmit a failure message indicating as such to the first user device 6104 and/or the first user public address 7105. In embodiments, if the refund transaction request is not verified, the first smart contract 7102 may impose a penalty fee on the first customer.

In embodiments, the refund transaction request 7402 may be verified. If the refund transaction request 7402 is verified, the process may continue with step S77260. At step S77260, the first smart contract transfers the first amount of digital asset from the first smart contract address 7104 to the first user public address 7105. In embodiments, the first smart contract instructions 7108 may include a penalty fee for inactivity on the part of the digital asset exchange computer system 6102. If a penalty fee may be imposed, in embodiments, the digital asset exchange computer system 6102 may, prior to verifying the initial channel state, deposit collateral into the first smart contract 7102 to cover any potential fees. The collateral may be used at step S77260'. At step S77260' the first smart contract may transfer the first amount of digital asset and a first penalty fee in digital asset to the first user public address 7105.

In embodiments, the first order may be executed by the digital asset exchange computer system 6102. In embodiments, the first user device 6104 may continue to generate and transmit orders and transaction requests before the settlement time has arrived (repeating steps S77216-S77220). Each time a new order is transmitted to the digital asset exchange computer system 6102, in embodiments, the second waiting period may reset. In embodiments, if a second order is sent before the first order has been executed, the second waiting period may continue to toll until the first order has been executed.

Figure 72C:
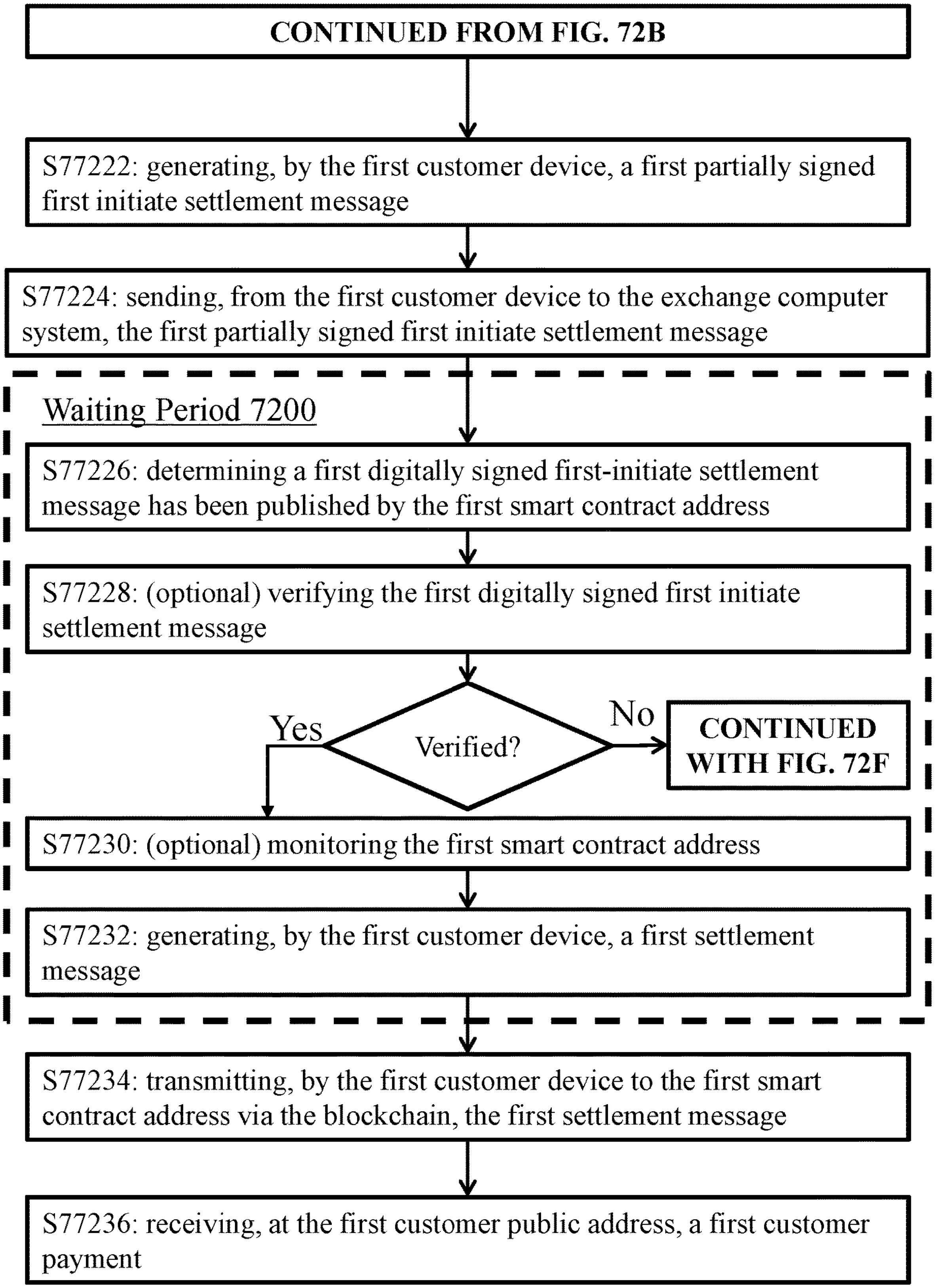
Figure 72D:
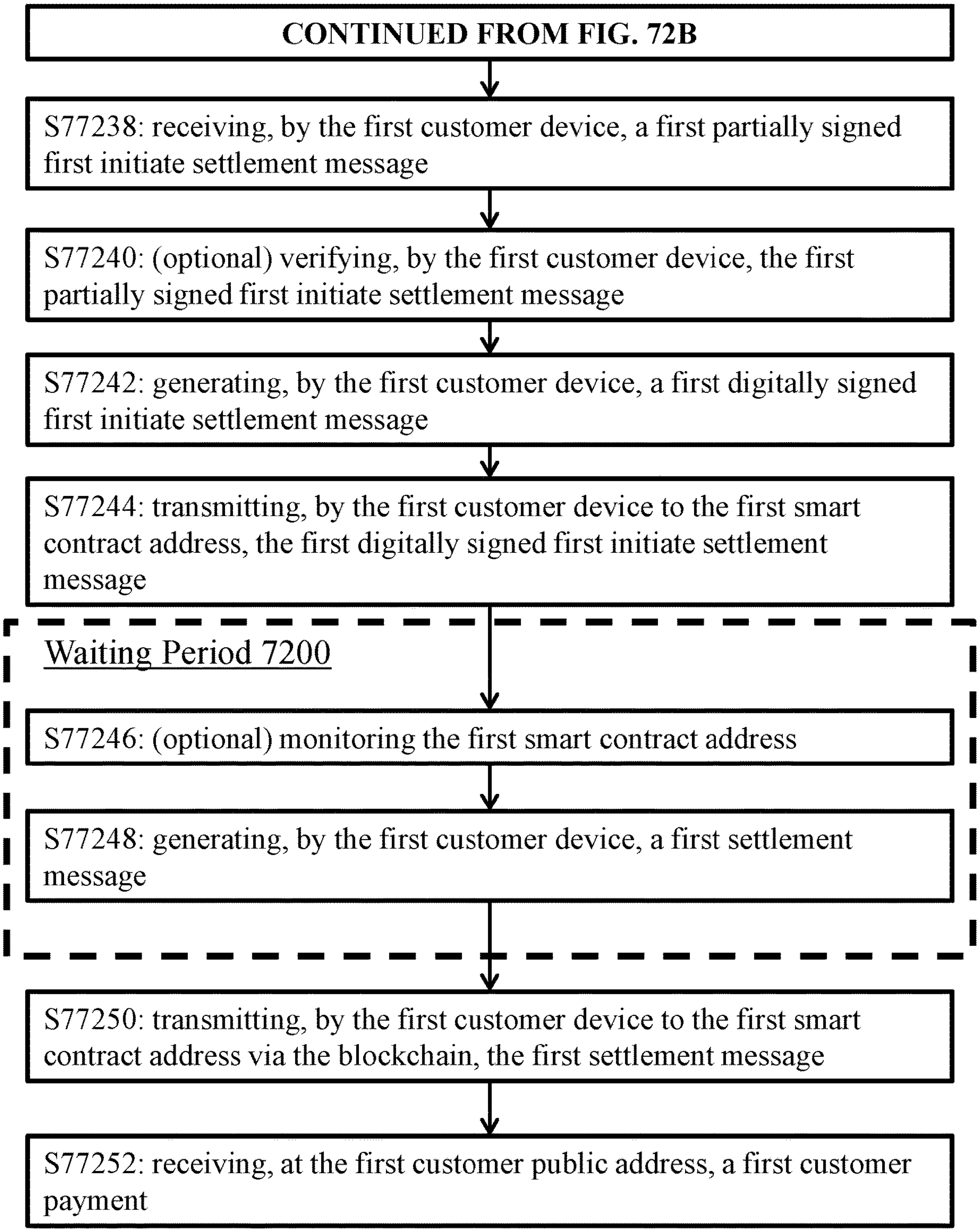
Figure 72E:
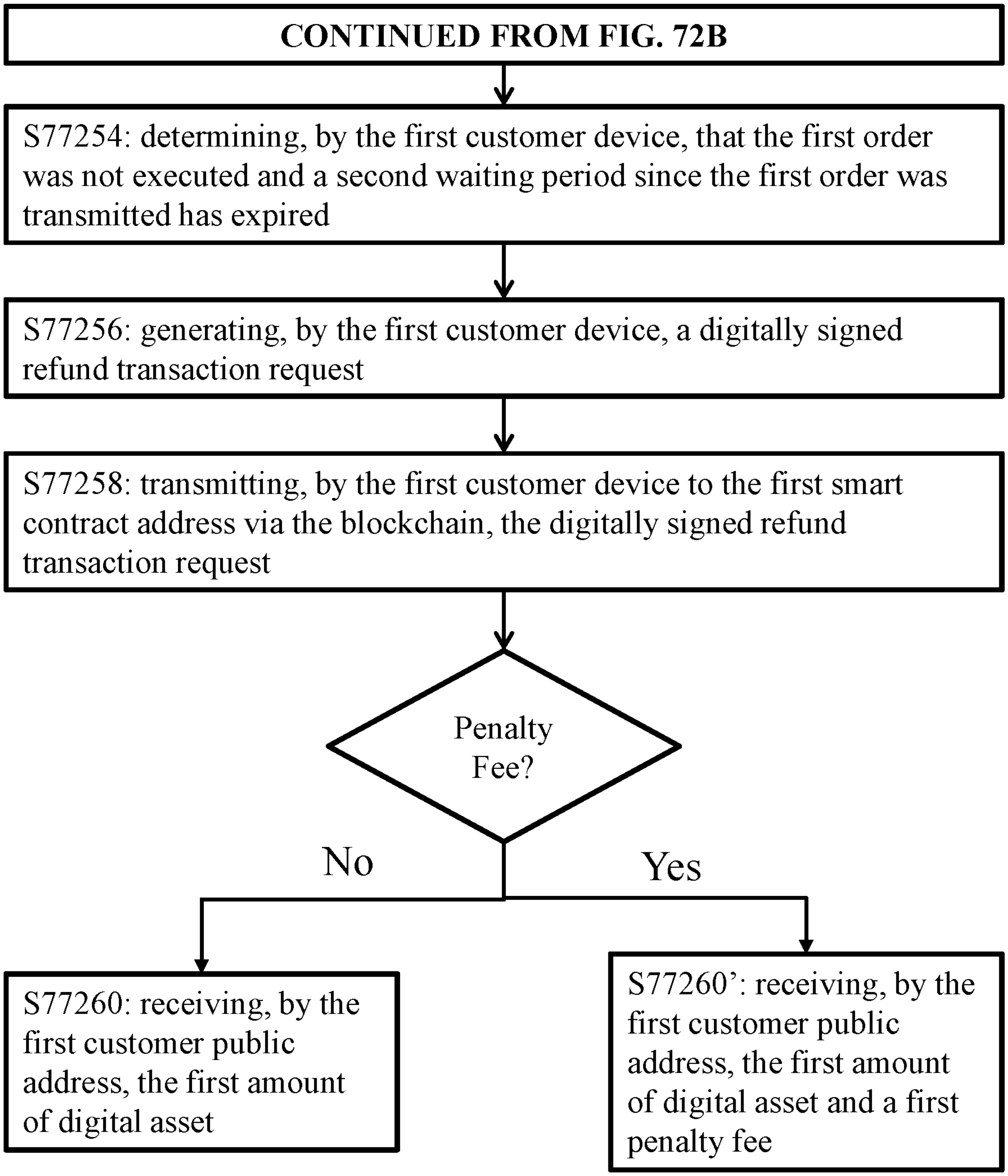

Referring to FIG. 72B, if the first order was executed, the process of FIGS. 72A-72H may continue with either FIG. 72C. Referring to FIG. 72C, at step S77222 the first customer device may generate a first partially signed first initiate settlement message. To initiate settlement when the non-custodial trading session has expired, an initiate settlement message digitally signed by the first customer private key and the digital asset exchange private key may be sent to the first smart contract address 7104. A partially signed initiate settlement message, in embodiments, may include one or more of the following: (1) a customer payment amount indicating a final amount of digital asset owned by the customer and/or in the custody of the first smart contract 7102; (2) an exchange payment amount indicating a final amount of digital asset owned by the digital asset exchange 6110 and/or in the custody of the first smart contract 7102; (3) a customer digital signature or an exchange digital signature (e.g. partially signed); and/or (4) a most recent mathematical puzzle associated with the digital asset exchange computer system 6102 and/or the first user device 6104, to name a few. The most recent mathematical puzzle, in embodiments, may be used alternatively or in combination with a timestamp.

Once generated, at step S77224, the first user device 6104 may transmit the partially signed first initiate settlement message to the digital asset exchange computer system via network 125 and/or API 6107. After the digital asset exchange computer system 6102 receives the first partially signed initiate settlement message, the digital asset exchange computer system 6102 may verify the first partially signed first initiate settlement message (see e.g. step S77326 of FIG. 73C, the description of which applying herein). In embodiments, the digital asset exchange computer system 6102 may not verify the first partially signed initiate settlement message. If the first partially signed initiate settlement message is not verified, in embodiments, the process may continue with FIG. 72D. In embodiments, if the first partially signed initiate settlement message is verified by the digital asset exchange computer system 6102, the digital asset exchange computer system may digitally sign the first partially signed initiate settlement message, generating a digitally signed first initiate settlement message. In embodiments, the digitally signed first initiate settlement message may be transmitted by the digital asset exchange computer system to the first smart contract address 7104 via the blockchain 6108

Continuing the process of FIG. 72C, at step S77226, it is determined that the first digitally signed initiate settlement message has been received by the first smart contract address 7104. This determination, in embodiments, may be made by one or more of the following: the first user device 6104, a confirmation message received by the first user device 6104 from the digital asset exchange computer system 6102; and/or a trusted third party notifying the first user device 6104, to name a few. The receipt of the digitally signed initiate settlement message may, in embodiments, trigger the waiting period 7200 (e.g. the first waiting period).

In embodiments, during waiting period 7200 at step S77228, the first digitally signed first initiate settlement message may be verified by the first user device 6104. In embodiments, the first user device 6104 may verify that the payment amounts—e.g. the second amount and the third amount going to the digital asset exchange 6110 and the fourth amount going to the first user public address 7105—are correct. In embodiments, the payment amounts may be incorrect—e.g. the amount being transferred to the first user is incorrect and/or the amount being transferred to the digital asset exchange 6110 is incorrect, the process may continue with FIG. 72F. The verification may be completed by a trusted third party and/or the first user device 6104, to name a few.

Figure 72F:
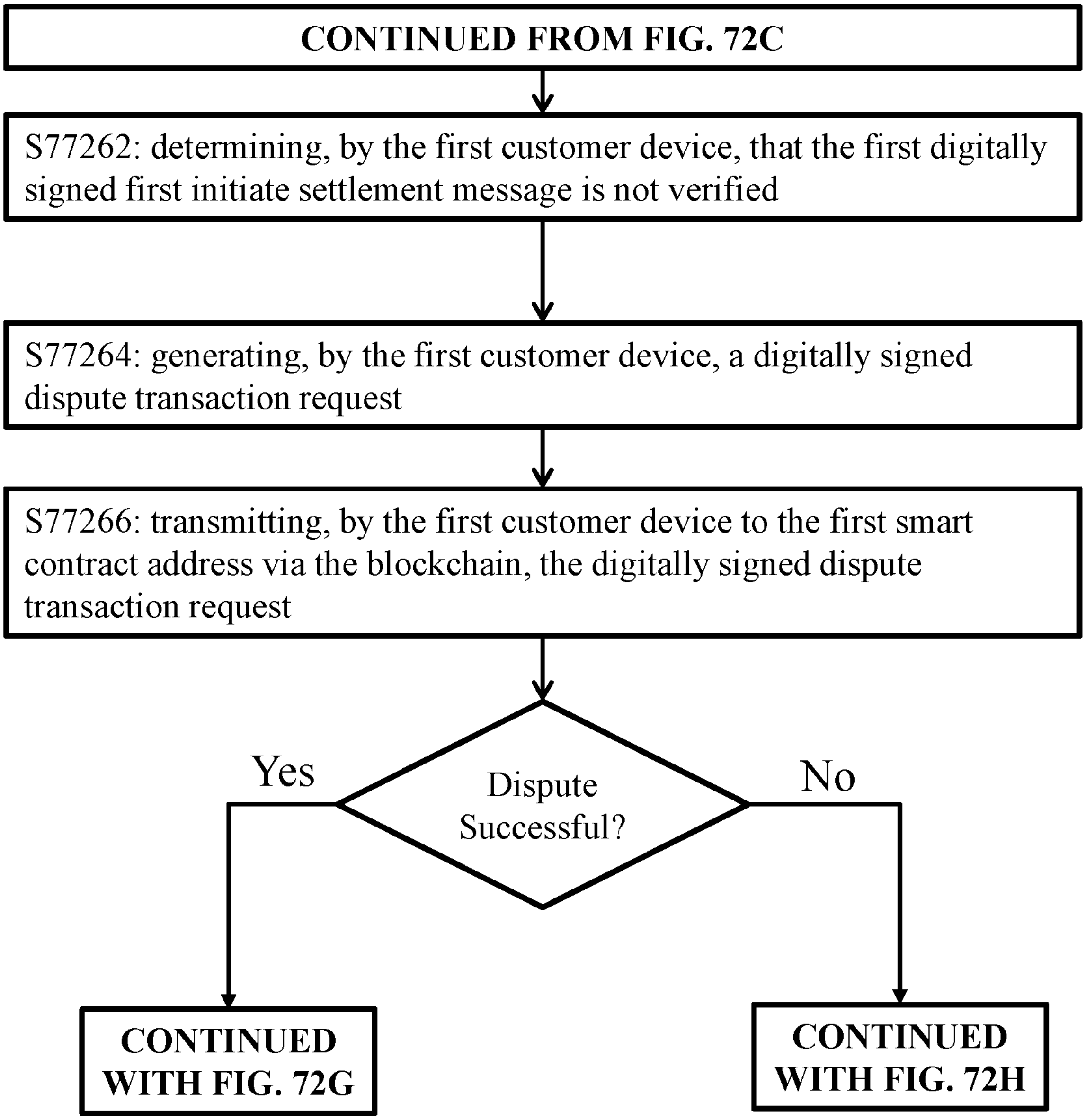

Referring to FIG. 72F, at step S77262, the first user device 6104 may determine that the first digitally signed first initiate settlement message is not verified.

Figure 75A:
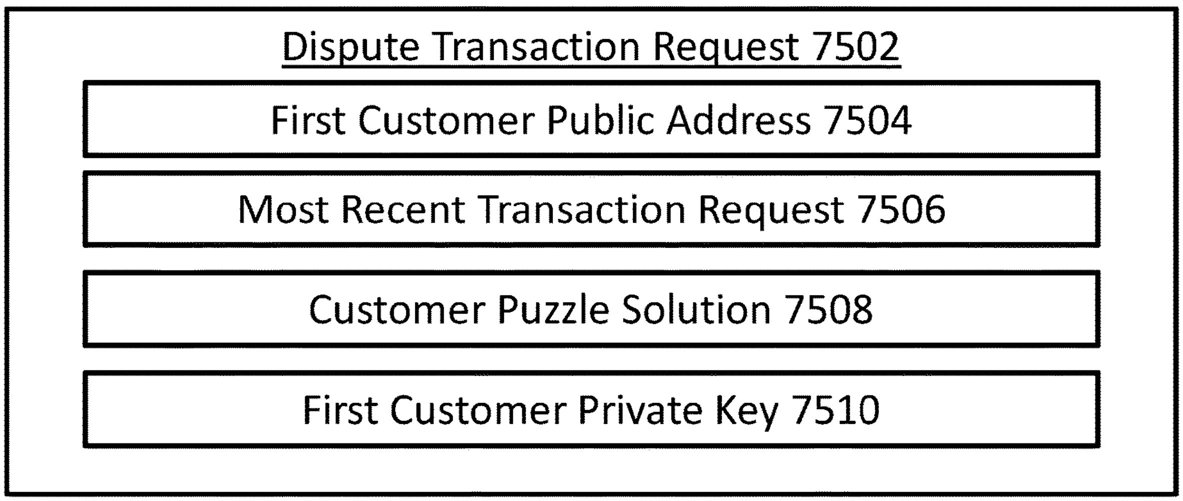
FIG. 75A is an exemplary block diagram of a dispute transaction request in accordance with exemplary embodiments of the present invention.
Figure 75B:
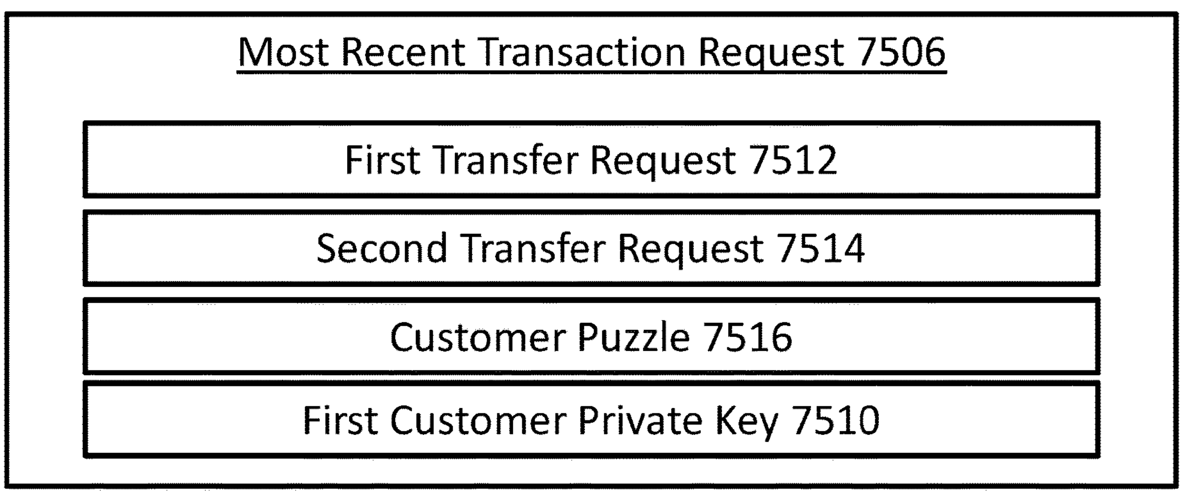
FIG. 75B is an exemplary block diagram of a most recent transaction request included within a dispute transaction request in accordance with exemplary embodiments of the present invention.

Once the digitally signed first initiate settlement message is not verified, if the smart contract is still within waiting period 7200, at step S77264, the first user device 6104 may generate a digitally signed dispute transaction request. Referring to FIG. 75A, a dispute transaction request 7502 may include one or more of the following: the first customer public address 7504 (e.g. the first user public address 7105); the most recent transaction request 7506 (e.g. the second transaction request); the customer puzzle solution 7508; the first customer private key 7510; and/or a brief description of what is incorrect about the first digitally signed first initiate settlement message, to name a few. The customer puzzle solution 7508, in embodiments, may be the corresponding solution to the puzzle included with the most recent transaction request 7506. In embodiments, referring to FIG. 75B, the most recent transaction request may include: the first transfer request 7512 (e.g. transferring the second amount of digital assets to the first exchange public address 7109); the second transfer request 7514 (e.g. transferring of the fourth amount of digital assets to the first user public address 7105); the third transfer request (e.g. transferring the third amount of digital asset to the second exchange public address 7110); the customer puzzle 7516 (e.g. the customer puzzle corresponding to the customer puzzle solution 7508); and/or the first customer private key 7510, to name a few. In embodiments, the most recent transaction request is a copy of the second transaction request.

The process for disputing an initiate settlement message may continue with step S77266. At step S77266 the first user device 6104 transmits the digitally signed dispute transaction request to the first smart contract address 7104 from the first user public address 7105 via the blockchain 6108. Upon receipt, the first smart contract 7102 may verify the dispute transaction request in accordance with the verification instructions 7114. In embodiments, the dispute transaction request may be verified by checking the customer puzzle solution 7508 to determine whether it corresponds to the customer puzzle 7516 of the most recent transaction. If the customer puzzle solution 7508 proves the most recent transaction request 7506 is the correct transaction request to be used for settlement, the dispute may be successful. If the customer puzzle solution 7508 does not prove the most recent transaction request 7506 is the correct transaction request to be used for settlement, the dispute may not be successful.

Figure 72G:
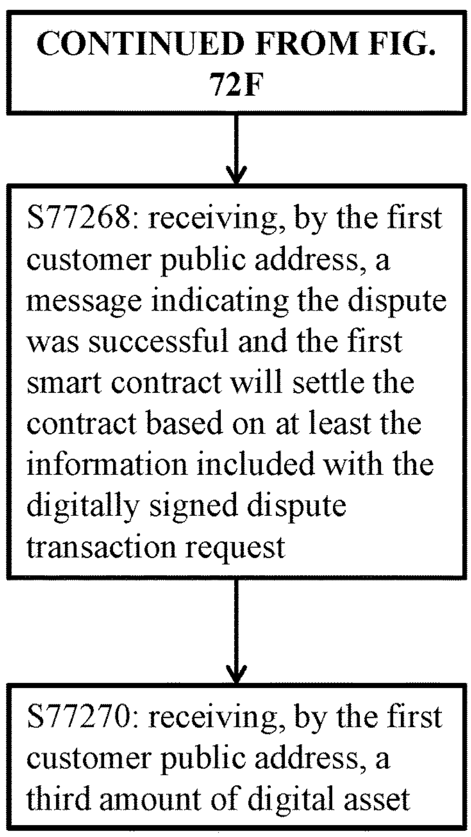

In embodiments, the dispute may be successful. Referring to FIG. 72G, if the dispute is successful, the process may continue at step S77268. At step S77268 the first customer public address 7105 and/or the first user device 6104 may receive a message from the first smart contract address 7104. The message, in embodiments, may indicate the dispute was successful. The message, in embodiments, may also indicate the next steps for the first smart contract 7102. In embodiments, a successful dispute may cause the first smart contract 7102 to settle using the most recent transaction request 7506 (e.g. the first smart contract 7102 executes the most recent transaction request 7506). In embodiments, a successful dispute may incur a penalty fee on the party submitting the digitally signed first initiate settlement message. For example, the penalty fee may be taken out of the second and/or third amount of digital asset and added to the fourth amount of digital asset. Based upon the new amounts associated with the digital assets in the custody of the first smart contract 7102, the first smart contract 7102, in embodiments, may execute the transaction request.

In embodiments, the dispute may be successful, but the amounts of digital asset to be distributed may still be incorrect. In those embodiments, the first smart contract 7102 may generate and send a notification, requesting a second initiate settlement message with correct amounts. The notification, in embodiments may be sent to the first user public address 7105, the first exchange public address 7109, and/or the second exchange public address 7110, to name a few.

In embodiments, the process for a successful dispute may continue with step S77270. At step S77270, in embodiments, the first user public address 7105 may receive an amount of digital asset. The amount of digital asset, in embodiments, may be the fourth amount of digital asset. In embodiments, the amount of digital asset may be the fourth amount of digital asset plus the penalty fee.

Figure 72H:
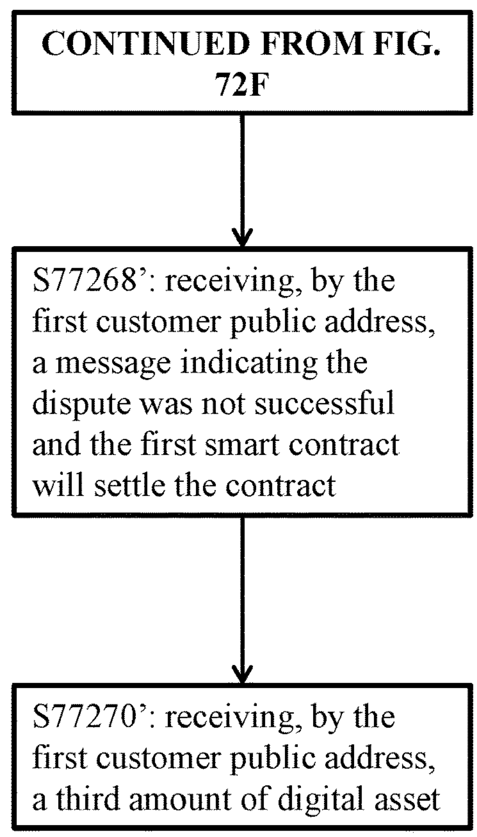

In embodiments, the dispute may be unsuccessful. Referring to FIG. 72H, if the dispute is not successful, the process may continue at step S77268'. At step S77268' the first customer public address 7105 and/or the first user device 6104 may receive a message from the first smart contract address 7104. The message, in embodiments, may indicate the dispute was not successful. The message, in embodiments, may also indicate the next steps for the first smart contract 7102. In embodiments, an unsuccessful dispute may cause the first smart contract 7102 to settle immediately, even if there is time left on waiting period 7200. In embodiments, an unsuccessful dispute may merely cause the first smart contract 7102 to generate and send the message, continuing to wait for the waiting period 7200 to transpire, then wait for a finalize settlement message (e.g. continuing the process of FIG. 72C). In embodiments, an unsuccessful dispute may incur a penalty fee on the party submitting the dispute transaction request. For example, the penalty fee may be taken out of the fourth amount and added to the second and/or third amount of digital asset. Based upon the new amounts associated with the digital assets in the custody of the first smart contract 7102, the first smart contract 7102, in embodiments, may settle the contract.

In embodiments, the process for an unsuccessful dispute may continue with step S77270'. At step S77270', in embodiments, the first user public address 7105 may receive an amount of digital asset. The amount of digital asset, in embodiments, may be the fourth amount of digital asset. In embodiments, the amount of digital asset may be the fourth amount of digital asset minus the penalty fee.

Referring back to FIG. 72C, in embodiments, the digitally signed initiate settlement message may be verified. In embodiments, during the waiting period 7200, at step S77230, the first smart contract address 7104 may be monitored by the first user device 6104, a trusted third party, and/or an entity operating on behalf of the first customer and/or digital asset exchange 6110, to name a few. In embodiments, the monitoring may occur in substantially real-time during the first waiting period. The monitoring, in embodiments, may be to determine if another transaction request and/or message has been sent to the first smart contract address 7104.

In embodiments, the first smart contract address 7104 may be monitored by a third-party computer system. In embodiments, the first user device 6104 and/or the digital asset exchange computer system 6102 may transmit monitoring information to the trusted third-party computer system. The monitoring information, in embodiments, may include one or more of the following: (1) the first smart contract address 7104; (2) the first user public address 6105; (3) the first exchange public address 7109; (4) the second exchange public address 7110; and/or (5) the first waiting period, to name a few. The monitoring information, in embodiments, may enable the trusted third-party computer system to monitor the first smart contract address 7104. If the third-party computer system detects activity at the first smart contract address 7104 (e.g. a message, transaction, to name a few), the third-party computer system may generate and send a notification to one or more of the following: the first user device 6104, the digital asset exchange computer system 6102, the first user public address 7105, the first exchange public address 7109, and/or the second exchange public address 7110, to name a few.

Next, at step S77232, the first customer device may generate a first settlement message (e.g. a finalize settlement message). The first settlement message may direct the first smart contract 7102 to settle based on the initiate settlement message received by the first smart contract address 7104. In embodiments, the first settlement message may be digitally signed by the first customer private key.

After generating the first settlement message, at step S77234, the first user device 6104 may transmit the first settlement message to the first smart contract address 7104 via the blockchain. In embodiments, the first settlement message may be transmitted from the first user public address 7105. The first settlement message, in embodiments, may cause the first smart contract 7102 to settle.

In embodiments, because the digital asset exchange computer system 6102 sent the initiate settlement message, the first customer may not have to wait the first waiting period. The first waiting period, in embodiments, may allow for a customer and/or digital asset exchange 6110 to dispute the initiate settlement message. Thus, the party that did not send the message, in embodiments, may be the party to use the first waiting period to verify and/or dispute the initiate settlement message In embodiments, alternative to generating and sending a settlement message, the first user device 6104 may send a message and/or notification to the digital asset exchange computer system 6102, indicating that the customer verified the initiate settlement message and would like to finalize the settlement. In embodiments, in response to the message and/or notification, the digital asset exchange computer system 6102 may generate and send a first settlement message to the first smart contract address 7104 via the blockchain 6108.

Continuing the process, the first smart contract 7102 may settle and transfer the fourth amount of digital asset to the first user public address 7105. At step S77236, the first user public address 7105 may receive the first customer payment (e.g. the fourth amount of digital asset).

In embodiments, referring back to FIG. 72B, if the first order was executed, the process of FIGS. 72A-72H may continue from step S77220 with FIG. 72D. Referring to FIG. 72D, at step S77238, the first user device 6104 may receive a first partially signed first initiate settlement message. In embodiments, the partially signed first initiate settlement message may be received from the digital asset exchange computer system 6102 via network 125 and/or API 6107.

After receiving the partially signed first initiate settlement message, at step S77240, the first user device 6104 may verify the partially signed first initiate settlement message. The verification of the partially signed first initiate settlement message may be similar to the description of step S77228 of FIG. 72C, the description of which applying herein. In embodiments, the first user device 6104 may not be able to verify the partially signed first initiate settlement message. If the partially signed first initiate settlement message is not verified, in embodiments, the first user device 6104 may generate a second partially signed second initiate settlement message and continue the process described in connection with FIG. 72C. In embodiments, step S77240 may be omitted.

In embodiments, the partially signed first initiate settlement message may be verified by the first user device 6104. At step S77242, the first user device 6104 may generate a first digitally signed first initiate settlement message. The first user device 6104 may generate the digitally signed initiate settlement message by digitally signing the partially signed first initiate settlement message with the customer private key.

Once the digitally signed initiate settlement message is generated, in embodiments, the first user device 6104 may transmit the digitally signed initiate settlement message to the first smart contract address 7104 via the blockchain 6108. In embodiments, the digitally signed initiate settlement message may be transmitted from the first user public address 7105 to the first smart contract address 7104.

In embodiments, receipt of the digitally signed initiate settlement message may cause the first smart contract 7102 to begin waiting for the waiting period 7200 to transpire (e.g. the first waiting period). During the waiting period 7200, at step S77246, the first user device 6104 and/or a party acting on behalf of the first customer may monitor the first smart contract address 7104 for activity (e.g. a transaction, message, etc.). In embodiments, during waiting period 7200, the digital asset exchange computer system 6102 may either dispute the digitally signed initiate settlement message (similar to the process described in connection with FIGS. 72F-72H, the description of which applying herein) or generate and send a finalize settlement message to the first smart contract address 7104.

After sending the digitally signed initiate settlement message, the first user device 6104, at step S77248, may generate a first settlement message (e.g. finalize settlement message). The first settlement message may direct the first smart contract 7102 to settle based on the initiate settlement message received by the first smart contract address 7104. In embodiments, the first settlement message may be digitally signed by the first customer private key.

After generating the first settlement message, at step S77250, the first user device 6104 may transmit the first settlement message to the first smart contract address 7104 via the blockchain. In embodiments, the first settlement message may be transmitted from the first user public address 7105. The first settlement message, in embodiments, may cause the first smart contract 7102 to settle. In embodiments, the first settlement message may be transmitted prior to the waiting period 7200 transpiring. In embodiments, if the first settlement message is sent too soon, the first smart contract 7102 may generate and send a failed notification, indicating that the first settlement message was sent prior to the waiting period 7200 transpiring and/or the first settlement message has been rejected. In embodiments, the failed notification may be sent to one or more of the following: the first user public address, the first exchange public address 7109, and/or the second exchange public address 7110, to name a few. In embodiments, a second settlement message may be required if the first settlement message was rejected.

In embodiments, the first settlement message may be transmitted contemporaneous with or after the waiting period 7200 has transpired. The first settlement message, in embodiments, may cause the first smart contract 7102 to settle. At step S77252, the first customer public address may receive a first customer payment (e.g. the fourth amount of digital asset).

In embodiments, the steps of FIGS. 72A-72H may be rearranged or omitted.

Referring to the process illustrated in connection with FIGS. 73A-73D, in embodiments, the process of trading on a digital asset exchange 6110 using bi-directional channels and a smart contract via an application programing interface (API) 6107 may begin at step S77302. At step S77302, non-custodial trading information 7106 may be provided by the digital asset exchange computer system 6102 to one or more devices associated with one or more customers of the digital asset exchange 6110. In embodiments, to provide the non-custodial trading information 7106, the digital asset exchange computer system 6102 may transmit the non-custodial trading information 7106 to the first user device 6104 via network 125. In embodiments, to provide the non-custodial trading information 7106, the digital asset exchange computer system 6102 may publish the non-custodial trading information 7106 on a website associated with the digital asset exchange 6110.

In embodiments, the digital asset exchange computer system may authenticate an access request received by the first user device 6104. The process of authenticating an access request may begin by receiving an authentication request from the first user device 6104. In embodiments, the authentication request may include first customer credential information. The first customer credential information may include one or more of the following: first customer log-in credentials and/or the first customer public key, to name a few. The first customer log-in credentials may include one or more of the following: a username and password combination; biometric data (e.g. a finger print, facial recognition, etc.), an electronic mail address, a telephone number, a social security number, a partial social security number, a government issued identification number, a shape, and/or a code, to name a few. After receiving the authentication request, in embodiments, the digital asset exchange computer system 6102 verifies the that the customer is authorized to access the digital asset exchange computer system 6102. Once the customer is verified and/or identified, in embodiments, the digital asset exchange computer system 6102 may verify that the customer is a registered user of the digital asset exchange based at least in part on the first customer credential information. If either the user is not verified and/or not registered, the digital asset exchange computer system may generate and send a failed notification to the first user device 6104. The failed notification, in embodiments, may indicate that the user credential information is incorrect and/or the user is not a registered user of the digital asset exchange 6110. In embodiments, logging into the digital asset exchange computer system 6104 may be accomplished through a mobile device operating a mobile application associated with the digital asset exchange 6110. In embodiments, logging into the digital asset exchange computer system 6104 may give the customer access to the non-custodial trading information and/or the GUI illustrated in connection with FIG. 71D.

The process of FIGS. 73A-73D may continue with step S77304. At step S77304, the digital asset exchange computer system 6102 may receive a non-custodial trading request. The non-custodial trading request described herein may be similar to the non-custodial trading request described above in connection with FIGS. 72A and 71D, the descriptions of which applying herein.

The process of FIGS. 73A-73D may continue with step S77306. At step S77306, the digital asset exchange computer system 6102 may verify the non-custodial trading request. In embodiments, the digital asset exchange computer system 6102 may verify one or more of the following: the first smart contract address 7104 is an authorized smart contract address; the first smart contract instructions 7108 are authorized instructions, the first user public address 7105 is an authorized public address associated with the first user device 6104, the first exchange public address 7109 is an authorized public address, and/or the second exchange public address 7110 is an authorized public address, to name a few. If one or more of pieces of information in the non-custodial trading request are not verified, the digital asset exchange computer system may generate and send a failed notification to the first user device 6104 via network 125. The failed notification may indicate that the non-custodial trading request cannot be verified and/or what part of the non-custodial trading request is not verified.

In embodiments, the non-custodial trading request is verified. At step S77308, an initial channel state may be received by the digital asset exchange computer system 6102 from the first user device 6104. Step S77308 may be similar to the description of step S77212, the description of which applying herein.

The process may continue with step S77310. At step S77310, the digital asset exchange computer system may confirm: (1) that the first smart contract 7102 has been published on the blockchain 6108 and/or (2) the first amount of digital asset was received by the first smart contract 7102. The verification of the first smart contract 7102 and the deposit of the first amount of digital asset may be similar to the description of step S6316 described above in connection with FIG. 63B and the process described above in connection with FIG. 63E, the descriptions of which applying herein.

In embodiments, once the deposit of the first amount of digital asset is confirmed, the digital asset exchange computer system 6102 may deposit collateral into the first smart contract 7102. In embodiments, the collateral may be used to impose penalty fees on the digital asset exchange computer system 6102 in accordance with the first smart contract instructions 7108. In embodiments, the collateral may be deposited by generating a transaction request to transfer the collateral from a public address associated with the digital asset exchange 6110 to the first smart contract address 7104. In embodiments, the transaction request may be digitally signed by an exchange private key. In embodiments, if no penalty fee is imposed on the digital asset exchange 6110, the settlement of the first smart contract 7102 may cause the deposited collateral to return to the public address associated with the digital asset exchange 6110.

In embodiments, the digital asset exchange computer system may generate a first exchange mathematical puzzle and a corresponding first exchange mathematical solution. In embodiments, generating a first exchange mathematical puzzle and a corresponding first exchange mathematical solution as described herein may be similar to the description of step S6304 described above in connection with FIG. 63A, the description of which applying herein.

The process may continue with step S77312. At step S77312, the digital asset exchange computer system 6102 may receive a first order from the first user device 6104 via network 125 and/or API 6107. In embodiments, the first order may be to transfer a second amount of digital asset on the digital asset exchange. In embodiments, the second amount may be less than or equal to the first amount. The first order may be similar to the first order described in connection with the processes of FIGS. 63A-F, 64, 62A-E, and 72A-H, the descriptions of which applying herein.

The process may continue with step S77314. At step S77314, the digital asset exchange computer system 6102 may receive a first transaction request from the first user device 6104 via network 125 and/or API6107. The first transaction request may be digitally signed by the first customer private key and include one or more of the following: (1) a first transfer of the second amount of digital asset from the first smart contract address 7104 to the first exchange public address 7109; (2) a second transfer of a third amount of digital asset from the first smart contract address 7104 to the second exchange public address 7110 (the third amount, for example, corresponding to a trading fee); (3) a third transfer of a fourth amount of digital asset from the first smart contract address 7104 to the first user public address 7105 (the fourth amount of digital asset may correspond to the first amount of digital asset less the sum of the second and third amount of digital asset); and/or (4) a first customer mathematical puzzle. In embodiments, the first transaction request may include a timestamp indicating the time at which the first transaction request was transmitted to and/or received by the digital asset exchange computer system 6102.

In embodiments, the initial channel state, first order, and/or first transaction request may be received together and/or contemporaneously. In embodiments, the first order may be received before the first transaction request. In embodiments, the first transaction request may be received before the first order.

The process may continue with step S77316. At step S77316, the digital asset exchange computer system 6102 may verify the first order and/or the first transaction request. The first order may be verified, in embodiments, by verifying that the second amount is less than or equal to the first amount. In embodiments, the first transaction request may be verified by verifying that the first amount equals the sum of the second, third, and fourth amount. In embodiments, the first transaction request may be verified by verifying that the transaction request is digitally signed by the first customer private key The process may continue with FIG. 73B. Referring to FIG. 73B, at step S77318, the digital asset exchange computer system 6102 may store the first order, the first transaction request, and/or the initiate channel state. In embodiments, the first order, first transaction request, and/or the initial channel state may be stored by the digital asset exchange computer system 6102 in memory 6102-C as the first order, first transaction request, and/or initial channel state are received respectively.

The process may continue with Step S77320. At step S77320, the first order is executed by the digital asset exchange computer system 6102. Once executed, in embodiments, the record of the execution may be stored in a transaction log. The transaction log may, in embodiments, be made available to the first customer for the purposes of verifying the execution of the first order. In embodiments, the digital asset exchange computer system 6102 may generate and send a confirmation message to the first user device 6104 via the network 125 and/or API 6107. The confirmation message, in embodiments, may indicate the first order was executed. In embodiments, the first order may not be executed because of a lack of an entity willing to buy the second amount of digital asset on the digital asset exchange 6110. In those embodiments, the digital asset exchange computer system 6102 may generate and send a message indicating that the first order was not executed to the first user device 6104 via the network 125 and/or API 6107.

In embodiments, the customer may transmit additional orders and transaction requests via the network 125 and/or API 6107, which may result in the repetition of steps S77312 through S77320 for each order/transaction request combination. For example, the digital asset exchange computer system 6102 may receive a second order from the first user device 6104. The second order may be to transfer a fifth amount of digital asset on the digital asset exchange computer system. In embodiments, the fifth amount is less than or equal to the fourth amount. The digital asset exchange computer system 6102 may also receive a second transaction request from the first user device 6104.

The second transaction request may be digitally signed by the first customer private key and include one or more of the following: (1) a first transfer of the second amount of digital asset from the first smart contract address 7104 to the first exchange public address 7109; (2) a second transfer of a third amount of digital asset from the first smart contract address 7104 to the second exchange public address 7110 (the third amount, for example, corresponding to a trading fee); (3) a third transfer of a fourth amount of digital asset from the first smart contract address 7104 to the first user public address 7105 (the fourth amount of digital asset may correspond to the first amount of digital asset less the sum of the second and third amount of digital asset); (4) a fifth transfer of a sixth amount of digital asset from the first smart contract address 7104 to the second exchange public address 7110 (the sixth amount, for example, corresponding to a trading fee); (5) a sixth transfer of a seventh amount of digital asset from the first smart contract address 7104 to the first user public address 7105 (the seventh amount of digital asset may correspond to the fourth amount of digital asset less the sum of the fifth and sixth amount of digital asset); and/or (6) a second customer mathematical puzzle.

In embodiments, each transaction request includes each transfer during the trading session, including the transfers from previous transaction requests except for the transfer to the public address associated with the customer where the most up to date transaction will only include one transfer to the customer public address (e.g. the amount of digital asset left over after the trades on the digital asset exchange have been executed). In embodiments, the second transaction request is identified as the most recent transaction request by the second customer mathematical puzzle. In embodiments, the second transaction request may include a timestamp indicating the time at which the first transaction request was transmitted to and/or received by the digital asset exchange computer system 6102.

In embodiments, second order, and/or second transaction request may be received together and/or contemporaneously. In embodiments, the second order may be received before the second transaction request. In embodiments, the second transaction request may be received before the second order.

Continuing the example, in embodiments, the digital asset exchange computer system 6102 may verify the second order and/or the second transaction request. The second order may be verified, in embodiments, by verifying that the fifth amount is less than or equal to the fourth amount. In embodiments, the second transaction request may be verified by verifying that the first amount equals the sum of the second, third, fifth, sixth, and seventh amount. In embodiments, the second transaction request may be verified by verifying that the transaction request is digitally signed by the first customer private key Continuing the example, the digital asset exchange computer system 6102 may store the second order and/or the second transaction request. In embodiments, the second order and/or the second transaction request may be stored by the digital asset exchange computer system 6102 in memory 6102-C as the second order and/or the second transaction request are received respectively.

Continuing the example, the digital asset exchange computer system 6102 may execute the second order and/or generate and send a confirmation message to the first use device 6104

Figure 73A:
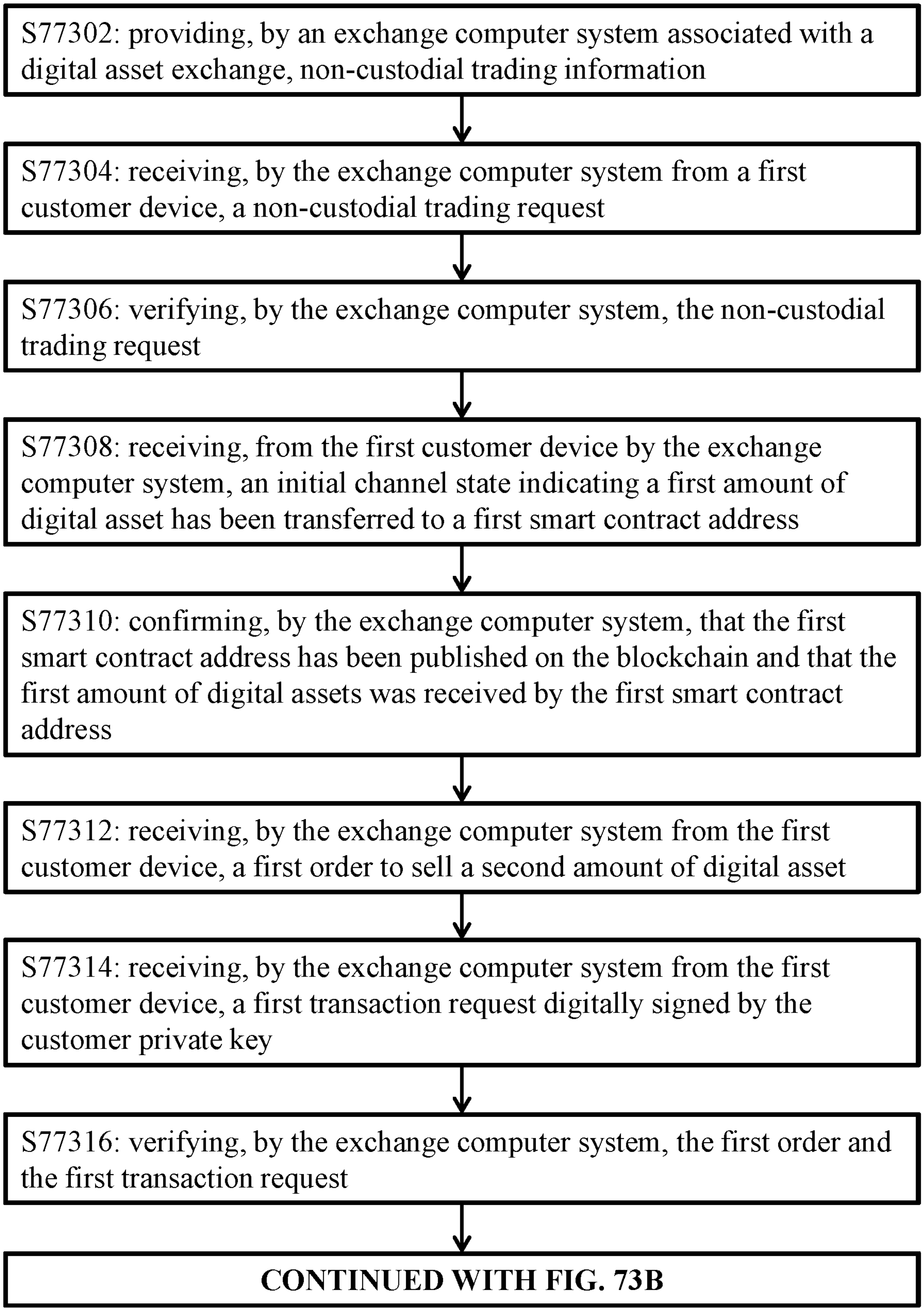
Figure 73C:
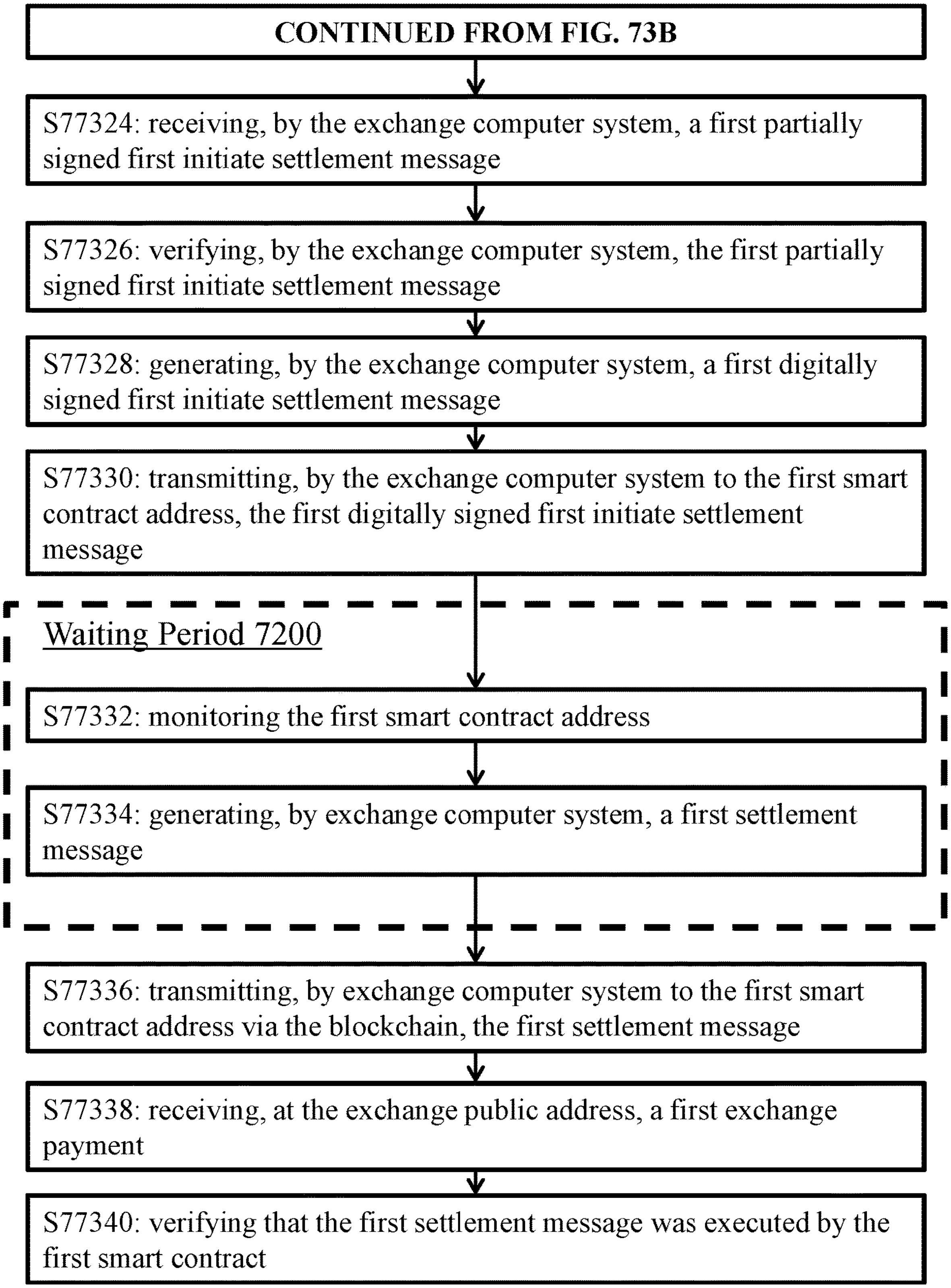

The process of FIGS. 73A-73D may continue with FIG. 73C. Referring to FIG. 73C, the process may continue with step S77324. At step S77324, the digital asset exchange computer system 6102 may receive a first partially signed first initiate settlement agreement In embodiments, the partially signed first initiate settlement message may be received by the digital asset exchange computer system 6102 from the first user device 6104 via network 125 and/or API 6107. After receiving the partially signed first initiate settlement message, at step S77326, the digital asset exchange computer system 6102 may verify the partially signed first initiate settlement message. The verification of the partially signed first initiate settlement message may be similar to the description of step S77228 of FIG. 72C, the description of which applying herein. In embodiments, the digital asset exchange computer system 6102 may not be able to verify the partially signed first initiate settlement message. If the partially signed first initiate settlement message is not verified, in embodiments, the digital asset exchange computer system 6102 may generate a second partially signed second initiate settlement message and continue the process described in connection with FIG. 73D. In embodiments, step S77326 may be omitted.

In embodiments, the partially signed first initiate settlement message may be verified by the digital asset exchange computer system 6102. At step S77328, the digital asset exchange computer system 6102 may generate a first digitally signed first initiate settlement message. The digital asset exchange computer system 6102 may generate the digitally signed initiate settlement message by digitally signing the partially signed first initiate settlement message with the exchange private key.

Once the digitally signed initiate settlement message is generated, in embodiments, at step S77330, the digital asset exchange computer system 6102 may transmit the digitally signed initiate settlement message to the first smart contract address 7104 via the blockchain 6108. In embodiments, the digitally signed initiate settlement message may be transmitted from the first exchange public address 7109 and/or the second exchange public address 7110 to the first smart contract address 7104.

In embodiments, receipt of the digitally signed initiate settlement message may cause the first smart contract 7102 to begin waiting for the waiting period 7200 to transpire (e.g. the first waiting period). During the waiting period 7200, at step S77332, the digital asset exchange computer system 6102 and/or a party acting on behalf of the digital asset exchange 6110 may, at step S77332, monitor the first smart contract address 7104 for activity (e.g. a transaction, message, etc.). In embodiments, during waiting period 7200, the first user device 6104 may either dispute the digitally signed initiate settlement message (similar to the process described in connection with FIGS. 72F-72H, the description of which applying herein) or generate and send a finalize settlement message to the first smart contract address 7104.

After sending the digitally signed initiate settlement message, the digital asset exchange computer system 6102, at step S77334, may generate a first settlement message (e.g. finalize settlement message). The first settlement message may direct the first smart contract 7102 to settle based on the initiate settlement message received by the first smart contract address 7104. In embodiments, the first settlement message may be digitally signed by the exchange private key.

After generating the first settlement message, at step S77336, the digital asset exchange computer system 6102 may transmit the first settlement message to the first smart contract address 7104 via the blockchain. In embodiments, the first settlement message may be transmitted from the first exchange public address 7109 and/or the second exchange public address 7110. The first settlement message, in embodiments, may cause the first smart contract 7102 to settle. In embodiments, the first settlement message may be transmitted prior to the waiting period 7200 transpiring. In embodiments, if the first settlement message is sent too soon, the first smart contract 7102 may generate and send a failed notification, indicating that the first settlement message was sent prior to the waiting period 7200 transpiring and/or the first settlement message has been rejected. In embodiments, the failed notification may be sent to one or more of the following: the first user public address, the first exchange public address 7109, and/or the second exchange public address 7110, to name a few. In embodiments, a second settlement message may be required if the first settlement message was rejected.

In embodiments, the first settlement message may be transmitted contemporaneous with or after the waiting period 7200 has transpired. The first settlement message, in embodiments, may cause the first smart contract 7102 to settle. At step S77338, the first exchange public address 7109 and/or the second exchange public address 7110 may receive a first exchange payment (e.g. the second and third amount of digital asset, or, from the example, the second, third, fifth, and sixth amount of digital asset).

The process may continue with step S77340. At step S77340, the digital asset exchange computer system 6102 may verify the first settlement message was executed by the first smart contract 7102. Verification, in embodiments, may include verifying that the correct amount of digital assets was received by the first user public address 7105, the first exchange public address 7109 and/or the second exchange public address 7110.

Figure 73D:
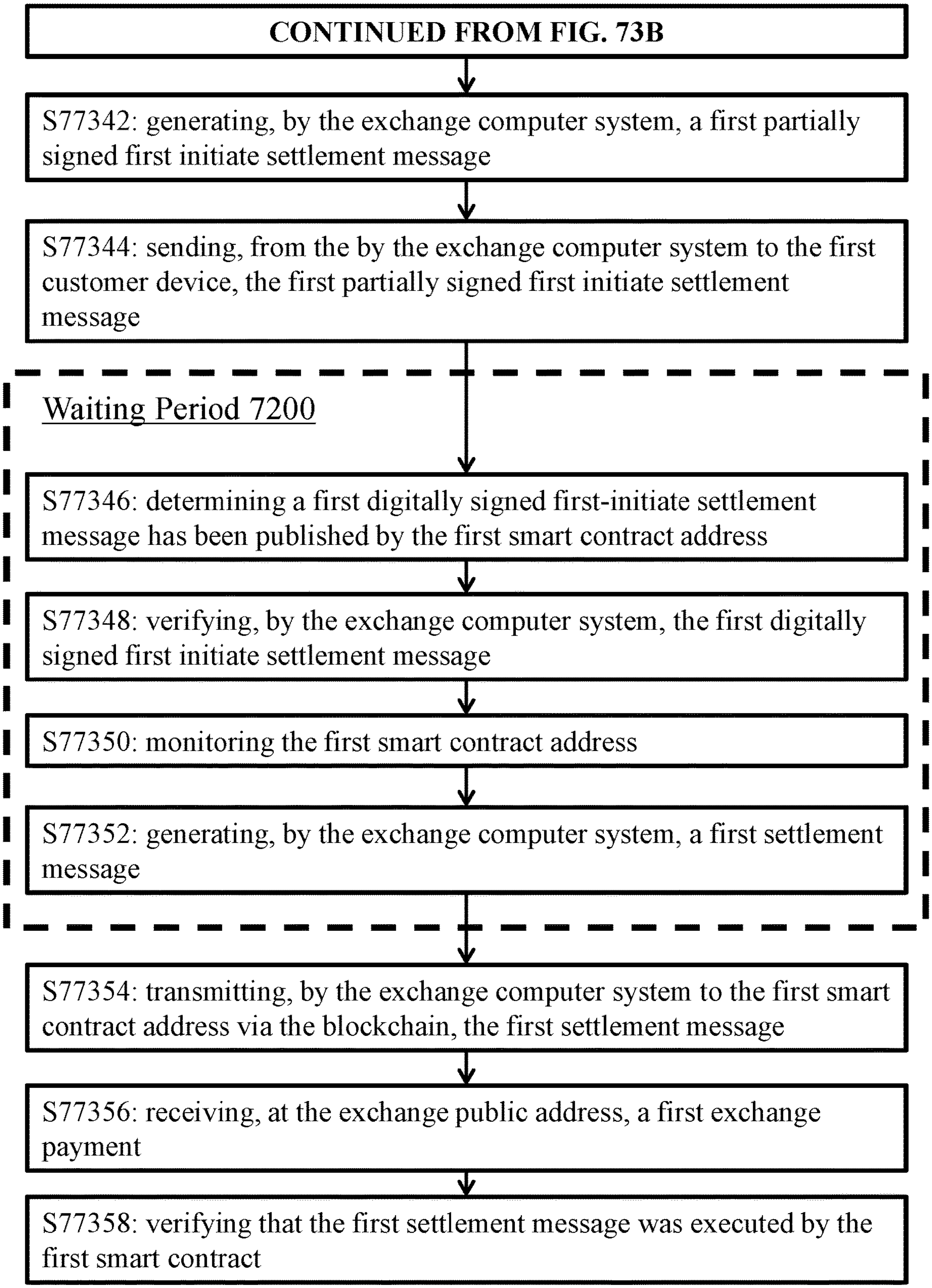

Referring back to FIG. 73B, the process of FIGS. 73A-73D may continue with FIG. 73D. Referring to FIG. 73D, the process may continue with step S77342. At step S77342, the digital asset exchange computer system 6102 may generate a first partially signed first initiate settlement message. To initiate settlement when the non-custodial trading session has expired, an initiate settlement message digitally signed by the first customer private key and the digital asset exchange private key may be sent to the first smart contract address 7104. A partially signed initiate settlement message, in embodiments, may include one or more of the following: (1) a customer payment amount indicating a final amount of digital asset owned by the customer and/or in the custody of the first smart contract 7102; (2) an exchange payment amount indicating a final amount of digital asset owned by the digital asset exchange 6110 and/or in the custody of the first smart contract 7102; (3) a customer digital signature or an exchange digital signature (e.g. partially signed); and/or (4) a most recent mathematical puzzle associated with the digital asset exchange computer system 6102 and/or the first user device 6104, to name a few. The most recent mathematical puzzle, in embodiments, may be used alternatively or in combination with a timestamp.

Once generated, at step S77344, the digital asset exchange computer system 6102 may transmit the partially signed first initiate settlement message to the first user device 6104 via network 125 and/or API 6107. After the first user device 6104 receives the first partially signed initiate settlement message, first user device 6104 may verify the first partially signed first initiate settlement message (see e.g. step S77228 of FIG. 72C, the description of which applying herein). In embodiments, the first user device 6104 may not verify the first partially signed initiate settlement message. If the first partially signed initiate settlement message is not verified, in embodiments, the process may continue with FIG. 72C and/or restarting the process of FIG. 73D. In embodiments, if the first partially signed initiate settlement message is verified by the first user device 6104, the first user device 6104 may digitally sign the first partially signed initiate settlement message, generating a digitally signed first initiate settlement message. In embodiments, the digitally signed first initiate settlement message may be transmitted by the first user device 6104 to the first smart contract address 7104 via the blockchain 6108

Continuing the process of FIG. 73D, at step S77346, it is determined that the first digitally signed initiate settlement message has been received by the first smart contract address 7104. This determination, in embodiments, may be made by one or more of the following: the digital asset exchange computer system 6102, a confirmation message received by the digital asset exchange computer system 6102 from the first user device 6104; and/or a trusted third party notifying the digital asset exchange computer system 6102, to name a few. The receipt of the digitally signed initiate settlement message may, in embodiments, trigger the waiting period 7200 (e.g. the first waiting period).

In embodiments, during waiting period 7200 at step S77228, the first digitally signed first initiate settlement message may be verified by the digital asset exchange computer system 6102. In embodiments, the digital asset exchange computer system 6102 may verify that the payment amounts—e.g. the second amount and the third amount going to the digital asset exchange 6110 and the fourth amount going to the first user public address 7105—are correct. In embodiments, the payment amounts may be incorrect—e.g. the amount being transferred to the first user is incorrect and/or the amount being transferred to the digital asset exchange 6110 is incorrect, the process may continue with the dispute process of FIG. 72F. The verification may be completed by a trusted third party, digital asset exchange computer system 6102, and/or the first user device 6104, to name a few.

In embodiments, the digitally signed initiate settlement message may be verified. In embodiments, during the waiting period 7200, at step S77350, the first smart contract address 7104 may be monitored by the digital asset exchange computer system 6102, a trusted third party, and/or an entity operating on behalf of the first customer and/or digital asset exchange 6110, to name a few. In embodiments, the monitoring may occur in substantially real-time during the first waiting period. The monitoring, in embodiments, may be to determine if another transaction request and/or message has been sent to the first smart contract address 7104.

Continuing the process, at step S77352, the digital asset exchange computer system 6102 may generate a first settlement message (e.g. a finalize settlement message). The first settlement message may direct the first smart contract 7102 to settle based on the initiate settlement message received by the first smart contract address 7104. In embodiments, the first settlement message may be digitally signed by the exchange private key.

After generating the first settlement message, at step S77354, the digital asset exchange computer system 6102 may transmit the first settlement message to the first smart contract address 7104 via the blockchain. In embodiments, the first settlement message may be transmitted from the first exchange public address 7109 and/or the second exchange public address 7110. The first settlement message, in embodiments, may cause the first smart contract 7102 to settle.

In embodiments, because the first user device 6104 sent the initiate settlement message, the digital asset exchange 6110 may not have to wait until the first waiting period has transpired. The first waiting period, in embodiments, may allow for a customer and/or digital asset exchange 6110 to dispute the initiate settlement message. Thus, the party that did not send the message, in embodiments, may be the party to use the first waiting period to verify and/or dispute the initiate settlement message In embodiments, alternative to generating and sending a settlement message, the digital asset exchange computer system 6102 may send a message and/or notification to the first user device 6104, indicating that the customer verified the initiate settlement message and would like to finalize the settlement. In embodiments, in response to the message and/or notification, the first user device 6104 may generate and send a first settlement message to the first smart contract address 7104 via the blockchain 6108.

Continuing the process, the first smart contract 7102 may settle and transfer: the fourth amount of digital asset to the first user public address 7105, the second amount of digital asset to the first exchange public address 7109, and/or the third amount of digital asset to the second exchange public address 7110. At step S77236, the first user public address 7105 may receive the first customer payment (e.g. the fourth amount of digital asset).

In embodiments, the first settlement message may be transmitted contemporaneous with or after the waiting period 7200 has transpired. The first settlement message, in embodiments, may cause the first smart contract 7102 to settle. At step S77356, the first exchange public address 7109 and/or the second exchange public address 7110 may receive a first exchange payment (e.g. the second and third amount of digital asset, or, from the example, the second, third, fifth, and sixth amount of digital asset).

The process may continue with step S77358. At step S77358, the digital asset exchange computer system 6102 may verify the first settlement message was executed by the first smart contract 7102. Verification, in embodiments, may include verifying that the correct amount of digital assets was received by the first user public address 7105, the first exchange public address 7109 and/or the second exchange public address 7110.

In embodiments, the steps of FIGS. 73A-73D may be rearranged or omitted.

In embodiments, a method for conducting an electronic auction of a first digital asset pair including a first digital asset and a first fiat on a digital asset exchange computer system includes steps of: (a) on or after a first time associated with opening the electronic auction until a second time associated with closing the electronic auction, generating a first electronic auction order book for the first digital asset pair, by the digital asset exchange computer system, including: (i) receiving, by a digital asset exchange computer system from a first plurality of user devices associated with a first plurality of users, a first plurality of auction trade orders associated with the first digital asset pair, wherein each auction trade order specifies order characteristics including: (1) the first digital asset by digital asset type; (2) a respective quantity of units of the first digital asset; (3) a respective side of the transaction; and (4) a respective price in first fiat per unit of the first digital asset; (ii) for each of the first plurality of auction trade orders, verifying, by the digital asset exchange computer system, each respective first auction trade order is a qualified trade, based on the steps of: (1) verifying, by the digital asset exchange computer system, the order characteristics of the respective auction trade order are valid auction order characteristics; (2) in the case where the side of the transaction is buy, verifying, by the digital asset exchange computer system, the respective user has sufficient amounts of the first fiat to cover the first auction trade order if filled in full; (3) in the case where the side of the transaction is sell, verifying, by the digital asset exchange computer system, the respective user has sufficient amounts of the first digital asset to cover the first auction trade order if filled in full; (iii) upon successful verification of each respective auction trade order in step (a)(ii), the steps of: (1) updating, by the digital asset exchange computer system, each respective user account associated with each respective user to set aside sufficient reserves in the first digital asset or the first fiat, as applicable, sufficient to cover each respective auction trade order which has been successfully verified if filled in full; and (2) storing in first electronic auction order book, by the digital asset exchange computer system on one or more computer readable mediums, each respective auction trade order which has been successfully verified; (b) for at least a first time period starting with a third time associated with the opening of an indicative auction publication, and continuing at least until the second time, obtaining, by the digital asset exchange computer system, blended digital asset pricing information comprising, for each of a plurality of fourth times between the third time and the second time, a respective blended digital asset price at each respective fourth time calculated by a volume weighted average of executed trading data for a second time period preceding the respective fourth time through the fourth time, of the first digital asset for the first fiat from a plurality of specified digital asset exchanges for the respective second time period, wherein the executed trading data excludes (i) a first fixed percentage of the highest priced trades of the first digital asset pair on the plurality of specified digital asset exchanges during the second time period, and (ii) a second fixed percentage of the lowest priced trades of the first digital asset pairs on the plurality of specified digital asset exchanges during the second time period; (c) starting with the third time and continuing until the second time, electronically publishing, by the digital asset exchange computer system, at set time intervals between the third time and the second time, respective indicative results of the first auction order book if the auction were to close at the end of each respective time interval, wherein the respective indicative results include: (i) a respective highest bid price, which is calculated, by the digital asset exchange computer system, using the first auction order book, by determining the highest bid price in first fiat per unit of first digital asset included in the first auction order book at the end of each respective time interval; (ii) a respective lowest ask price, which is calculated, by the digital asset exchange computer system, using the first auction order book, by determining the lowest ask price in first fiat per unit of first digital asset included in the first auction order book at the end of each respective time interval; (iii) a respective indicative price, which is calculated, as of a respective sixth time, by: (1) determining, by the digital asset exchange computer system, using the first auction order book, a respective indicative auction price in terms of the first fiat for the first digital asset that will execute the greatest quantity of the first digital assets being transacted for the first fiat; (2) in the case where more than one respective indicative auction price is identified as having the same greatest quantity of the first digital assets being transaction for the first fiat, selecting as the respective indicative auction price by applying the following order of priority: (A) the indicative auction price which is closest to the blended digital asset price for the respective sixth time; (B) the midpoint of the two adjacent indicative auction prices identified for the sixth time; (iv) a respective auction quantity, which is determined by the digital asset exchange computer system, as the quantity of units of the first digital asset which would match the respective indicative price as of the sixth time; (d) at the second time, close the first auction order book, by the digital asset exchange computer system, and stop accepting new auction orders to be added to the first auction order book; (e) after step (d), calculating, by the digital asset exchange computer system, a collar price range by: (i) obtaining, by the digital asset exchange, the blended digital asset price for the second time; (ii) determining, by the digital asset exchange computer system, the minimum collar as the blended digital asset price for the second time less a third fixed percentage of the blended digital asset price for the second time; and (iii) determining, by the digital asset exchange computer system, the maximum collar as the blended digital asset price for the second time plus a fourth fixed percentage of the blended digital asset price for the second time; (f) after step (e), calculating, by the digital asset exchange computer system, final results of the first auction order book, wherein the final results include: (i) a final auction price at the second time, which is calculated by: (1) determining, by the digital asset exchange computer system, using the first auction order book at the second time, a final auction price in terms of the first fiat for the first digital asset that will execute the greatest quantity of the first digital assets being transacted for the first fiat; (2) in the case where more than one respective final auction price is identified as having the same greatest quantity of the first digital assets being transaction for the first fiat, selecting as the respective final auction price by applying the following order of priority: (A) the final auction price which is closest to the blended digital asset price for the second time; (B) the midpoint of the two adjacent final auction prices for the second time; (ii) a final auction quantity, which is determined by the digital asset exchange computer system, as the quantity of units of the first digital asset which match the final auction price as of the second time; (g) verifying, by the digital asset exchange computer system, that the final auction price is greater than or equal to the minimum collar price and less than or equal to the maximum collar price; (h) in the case where the final auction price is verified to be greater than or equal to the minimum collar price and less than or equal to the maximum collar price, electronically publishing the final auction price and the final auction quantity as the results of the auction along with the second time; and (i) in the case where the final auction price is not verified to be greater than or equal to the minimum collar price and less than or equal to the maximum collar price, electronically publishing the auction failed along with the second time.

In embodiments, the first digital asset is a digital math-based asset.

In embodiments, the first digital asset is one of Bitcoin, Ether, Litecoin, Bitcoin Cash or Ripple.

In embodiments, the first digital asset is a token.

In embodiments, the first fiat is U.S. dollars.

In embodiments, the third time is 10 minutes prior to the second time.

In embodiments, each of the plurality of fourth times are one minute apart from each other.

In embodiments, the executed trading data is received from a respective continuous order book of each of the plurality of specified digital asset exchanges.

In embodiments, the plurality of specified digital asset exchanges includes a digital asset exchange associated with the digital asset exchange computer system.

In embodiments, a method for conducting an electronic auction of a first digital asset pair including a first digital asset and a second digital asset on a digital asset exchange computer system includes steps of: (a) on or after a first time associated with opening the electronic auction until a second time associated with closing the electronic auction, generating a first electronic auction order book for the first digital asset pair, by the digital asset exchange computer system, including: (i) receiving, by a digital asset exchange computer system from a first plurality of user devices associated with a first plurality of users, a first plurality of auction trade orders associated with the first digital asset pair, wherein each auction trade order specifies order characteristics including: (1) the first digital asset by digital asset type; (2) a respective quantity of units of the first digital asset; (3) a respective side of the transaction; and (4) a respective price in units of the second digital asset per unit of the first digital asset; (ii) for each of the first plurality of auction trade orders, verifying, by the digital asset exchange computer system, each respective first auction trade order is a qualified trade, based on the steps of: (1) verifying, by the digital asset exchange computer system, the order characteristics of the respective auction trade order are valid auction order characteristics; (2) in the case where the side of the transaction is buy, verifying, by the digital asset exchange computer system, the respective user has sufficient amounts of the second digital asset to cover the first auction trade order if filled in full; (3) in the case where the side of the transaction is sell, verifying, by the digital asset exchange computer system, the respective user has sufficient amounts of the first digital asset to cover the first auction trade order if filled in full; (iii) upon successful verification of each respective auction trade order in step (a)(ii), the steps of: (1) updating, by the digital asset exchange computer system, each respective user account associated with each respective user to set aside sufficient reserves in the first digital asset or the second digital asset, as applicable, sufficient to cover each respective auction trade order which has been successfully verified if filled in full; and (2) storing in first electronic auction order book, by the digital asset exchange computer system on one or more computer readable mediums, each respective auction trade order which has been successfully verified; (b) for at least a first time period starting with a third time associated with the opening of an indicative auction publication, and continuing at least until the second time, obtaining, by the digital asset exchange computer system, blended digital asset pricing information comprising, for each of a plurality of fourth times between the third time and the second time, a respective blended digital asset price at each respective fourth time calculated by a volume weighted average of executed trading data for a second time period preceding the respective fourth time through the fourth time, of the first digital asset for the second digital asset from a plurality of specified digital asset exchanges for the respective second time period, wherein the executed trading data excludes (i) a first fixed percentage of the highest priced trades of the first digital asset pair on the plurality of specified digital asset exchanges during the second time period, and (ii) a second fixed percentage of the lowest priced trades of the first digital asset pairs on the plurality of specified digital asset exchanges during the second time period; (c) starting with the third time and continuing until the second time, electronically publishing, by the digital asset exchange computer system, at set time intervals between the third time and the second time, respective indicative results of the first auction order book if the auction were to close at the end of each respective time interval, wherein the respective indicative results include: (i) a respective highest bid price, which is calculated, by the digital asset exchange computer system, using the first auction order book, by determining the highest bid price in units of the second digital asset per unit of first digital asset included in the first auction order book at the end of each respective time interval; (ii) a respective lowest ask price, which is calculated, by the digital asset exchange computer system, using the first auction order book, by determining the lowest ask price in units of the second digital asset per unit of first digital asset included in the first auction order book at the end of each respective time interval; and (iii) a respective indicative price, which is calculated, as of a respective sixth time, by: (1) determining, by the digital asset exchange computer system, using the first auction order book, a respective indicative auction price in terms of the second digital asset for the first digital asset that will execute the greatest quantity of the first digital assets being transacted for the second digital assets; (2) in the case where more than one respective indicative auction price is identified as having the same greatest quantity of the first digital assets being transaction for the second digital assets, selecting as the respective indicative auction price by applying the following order of priority: (A) the indicative auction price which is closest to the blended digital asset price for the respective sixth time; (B) the midpoint of the two adjacent indicative auction prices identified for the sixth time; (i) a respective auction quantity, which is determined by the digital asset exchange computer system, as the quantity of units of the first digital asset which would match the respective indicative price as of the sixth time; (d) at the second time, close the first auction order book, by the digital asset exchange computer system, and stop accepting new auction orders to be added to the first auction order book; (e) after step (d), calculating, by the digital asset exchange computer system, a collar price range by: (i) obtaining, by the digital asset exchange, the blended digital asset price for the second time; (ii) determining, by the digital asset exchange computer system, the minimum collar as the blended digital asset price for the second time less a third fixed percentage of the blended digital asset price for the second time; and (iii) determining, by the digital asset exchange computer system, the maximum collar as the blended digital asset price for the second time plus a fourth fixed percentage of the blended digital asset price for the second time; (f) after step (e), calculating, by the digital asset exchange computer system, final results of the first auction order book, wherein the final results include: (i) a final auction price at the second time, which is calculated by: (1) determining, by the digital asset exchange computer system, using the first auction order book at the second time, a final auction price in terms of the second digital asset for the first digital asset that will execute the greatest quantity of the first digital assets being transacted for the second digital assets; (2) in the case where more than one respective final auction price is identified as having the same greatest quantity of the first digital assets being transaction for the second digital asset, selecting as the respective final auction price by applying the following order of priority: (A) the final auction price which is closest to the blended digital asset price for the second time; (B) the midpoint of the two adjacent final auction prices for the second time; (ii) a final auction quantity, which is determined by the digital asset exchange computer system, as the quantity of units of the first digital asset which match the final auction price as of the second time; (g) verifying, by the digital asset exchange computer system, that the final auction price is greater than or equal to the minimum collar price and less than or equal to the maximum collar price; (h) in the case where the final auction price is verified to be greater than or equal to the minimum collar price and less than or equal to the maximum collar price, electronically publishing the final auction price and the final auction quantity as the results of the auction along with the second time; and (i) in the case where the final auction price is not verified to be greater than or equal to the minimum collar price and less than or equal to the maximum collar price, electronically publishing the auction failed along with the second time.

In embodiments, the first digital asset is a digital math-based asset.

In embodiments, the first digital asset is one of Bitcoin, Ether, Litecoin, Bitcoin Cash or Ripple.

In embodiments, the first digital asset is a token.

In embodiments, the second digital asset is a digital math-based asset.

In embodiments, the second digital asset is one of Bitcoin, Ether, Litecoin, Bitcoin Cash or Ripple.

In embodiments, the second digital asset is a token.

A digital asset exchange computer system includes (1) one or more processors; (2) a non-transitory computer-readable memory operatively connected to the one or more processors, the non-transitory computer-readable memory having stored thereon machine-readable instructions that, when executed by the one or more processors, cause the one or more processors to perform a method including: (a) on or after a first time associated with opening the electronic auction until a second time associated with closing the electronic auction, generating a first electronic auction order book for the first digital asset pair, by the digital asset exchange computer system, including: (i) receiving, by a digital asset exchange computer system from a first plurality of user devices associated with a first plurality of users, a first plurality of auction trade orders associated with the first digital asset pair, wherein each auction trade order specifies order characteristics including: (1) the first digital asset by digital asset type; (2) a respective quantity of units of the first digital asset; and (3) a respective side of the transaction; and (4) a respective price in first fiat per unit of the first digital asset; (ii) for each of the first plurality of auction trade orders, verifying, by the digital asset exchange computer system, each respective first auction trade order is a qualified trade, based on the steps of: (1) verifying, by the digital asset exchange computer system, the order characteristics of the respective auction trade order are valid auction order characteristics; (2) in the case where the side of the transaction is buy, verifying, by the digital asset exchange computer system, the respective user has sufficient amounts of the first fiat to cover the first auction trade order if filled in full; (3) in the case where the side of the transaction is sell, verifying, by the digital asset exchange computer system, the respective user has sufficient amounts of the first digital asset to cover the first auction trade order if filled in full; (iii) upon successful verification of each respective auction trade order in step (a)(ii), the steps of: (1) updating, by the digital asset exchange computer system, each respective user account associated with each respective user to set aside sufficient reserves in the first digital asset or the first fiat, as applicable, sufficient to cover each respective auction trade order which has been successfully verified if filled in full; and (2) storing in first electronic auction order book, by the digital asset exchange computer system on one or more computer readable mediums, each respective auction trade order which has been successfully verified; (b) for at least a first time period starting with a third time associated with the opening of an indicative auction publication, and continuing at least until the second time, obtaining, by the digital asset exchange computer system, blended digital asset pricing information comprising, for each of a plurality of fourth times between the third time and the second time, a respective blended digital asset price at each respective fourth time calculated by a volume weighted average of executed trading data for a second time period preceding the respective fourth time through the fourth time, of the first digital asset for the first fiat from a plurality of specified digital asset exchanges for the respective second time period, wherein the executed trading data excludes (i) a first fixed percentage of the highest priced trades of the first digital asset pair on the plurality of specified digital asset exchanges during the second time period, and (ii) a second fixed percentage of the lowest priced trades of the first digital asset pairs on the plurality of specified digital asset exchanges during the second time period; (c) starting with the third time and continuing until the second time, electronically publishing, by the digital asset exchange computer system, at set time intervals between the third time and the second time, respective indicative results of the first auction order book if the auction were to close at the end of each respective time interval, wherein the respective indicative results include: (i) a respective highest bid price, which is calculated, by the digital asset exchange computer system, using the first auction order book, by determining the highest bid price in first fiat per unit of first digital asset included in the first auction order book at the end of each respective time interval; (ii) a respective lowest ask price, which is calculated, by the digital asset exchange computer system, using the first auction order book, by determining the lowest ask price in first fiat per unit of first digital asset included in the first auction order book at the end of each respective time interval; (iii) a respective indicative price, which is calculated, as of a respective sixth time, by: (1) determining, by the digital asset exchange computer system, using the first auction order book, a respective indicative auction price in terms of the first fiat for the first digital asset that will execute the greatest quantity of the first digital assets being transacted for the first fiat; and (2) in the case where more than one respective indicative auction price is identified as having the same greatest quantity of the first digital assets being transaction for the first fiat, selecting as the respective indicative auction price by applying the following order of priority: (A) the indicative auction price which is closest to the blended digital asset price for the respective sixth time; (B) the midpoint of the two adjacent indicative auction prices identified for the sixth time; and (iv) a respective auction quantity, which is determined by the digital asset exchange computer system, as the quantity of units of the first digital asset which would match the respective indicative price as of the sixth time; (d) at the second time, closing the first auction order book, by the digital asset exchange computer system, and stop accepting new auction orders to be added to the first auction order book; (e) after step (d), calculating, by the digital asset exchange computer system, a collar price range by: (i) obtaining, by the digital asset exchange, the blended digital asset price for the second time; (ii) determining, by the digital asset exchange computer system, the minimum collar as the blended digital asset price for the second time less a third fixed percentage of the blended digital asset price for the second time; and (iii) determining, by the digital asset exchange computer system, the maximum collar as the blended digital asset price for the second time plus a fourth fixed percentage of the blended digital asset price for the second time; (f) after step (e), calculating, by the digital asset exchange computer system, final results of the first auction order book, wherein the final results include: (i) a final auction price at the second time, which is calculated by: (1) determining, by the digital asset exchange computer system, using the first auction order book at the second time, a final auction price in terms of the first fiat for the first digital asset that will execute the greatest quantity of the first digital assets being transacted for the first fiat; and (2) in the case where more than one respective final auction price is identified as having the same greatest quantity of the first digital assets being transaction for the first fiat, selecting as the respective final auction price by applying the following order of priority: (A) the final auction price which is closest to the blended digital asset price for the second time; (B) the midpoint of the two adjacent final auction prices for the second time; and (ii) a final auction quantity, which is determined by the digital asset exchange computer system, as the quantity of units of the first digital asset which match the final auction price as of the second time; (g) verifying, by the digital asset exchange computer system, that the final auction price is greater than or equal to the minimum collar price and less than or equal to the maximum collar price; (h) in the case where the final auction price is verified to be greater than or equal to the minimum collar price and less than or equal to the maximum collar price, electronically publishing the final auction price and the final auction quantity as the results of the auction along with the second time; and (i) in the case where the final auction price is not verified to be greater than or equal to the minimum collar price and less than or equal to the maximum collar price, electronically publishing the auction failed along with the second time.

A digital asset exchange computer system includes (1) one or more processors; (2) a non-transitory computer-readable memory operatively connected to the one or more processors, the non-transitory computer-readable memory having stored thereon machine-readable instructions that, when executed by the one or more processors, cause the one or more processors to perform a method including: (a) on or after a first time associated with opening the electronic auction until a second time associated with closing the electronic auction, generating a first electronic auction order book for the first digital asset pair, by the digital asset exchange computer system, including: (i) receiving, by a digital asset exchange computer system from a first plurality of user devices associated with a first plurality of users, a first plurality of auction trade orders associated with the first digital asset pair, wherein each auction trade order specifies order characteristics including: (1) the first digital asset by digital asset type; (2) a respective quantity of units of the first digital asset; (3) a respective side of the transaction; and (4) a respective price in units of the second digital asset per unit of the first digital asset; (ii) for each of the first plurality of auction trade orders, verifying, by the digital asset exchange computer system, each respective first auction trade order is a qualified trade, based on the steps of: (1) verifying, by the digital asset exchange computer system, the order characteristics of the respective auction trade order are valid auction order characteristics; (2) in the case where the side of the transaction is buy, verifying, by the digital asset exchange computer system, the respective user has sufficient amounts of the second digital asset to cover the first auction trade order if filled in full; and (3) in the case where the side of the transaction is sell, verifying, by the digital asset exchange computer system, the respective user has sufficient amounts of the first digital asset to cover the first auction trade order if filled in full; (iii) upon successful verification of each respective auction trade order in step (a)(ii), the steps of: (1) updating, by the digital asset exchange computer system, each respective user account associated with each respective user to set aside sufficient reserves in the first digital asset or the second digital asset, as applicable, sufficient to cover each respective auction trade order which has been successfully verified if filled in full; and (2) storing in first electronic auction order book, by the digital asset exchange computer system on one or more computer readable mediums, each respective auction trade order which has been successfully verified; (b) for at least a first time period starting with a third time associated with the opening of an indicative auction publication, and continuing at least until the second time, obtaining, by the digital asset exchange computer system, blended digital asset pricing information comprising, for each of a plurality of fourth times between the third time and the second time, a respective blended digital asset price at each respective fourth time calculated by a volume weighted average of executed trading data for a second time period preceding the respective fourth time through the fourth time, of the first digital asset for the second digital asset from a plurality of specified digital asset exchanges for the respective second time period, wherein the executed trading data excludes (i) a first fixed percentage of the highest priced trades of the first digital asset pair on the plurality of specified digital asset exchanges during the second time period, and (ii) a second fixed percentage of the lowest priced trades of the first digital asset pairs on the plurality of specified digital asset exchanges during the second time period; (c) starting with the third time and continuing until the second time, electronically publishing, by the digital asset exchange computer system, at set time intervals between the third time and the second time, respective indicative results of the first auction order book if the auction were to close at the end of each respective time interval, wherein the respective indicative results include: (i) a respective highest bid price, which is calculated, by the digital asset exchange computer system, using the first auction order book, by determining the highest bid price in units of the second digital asset per unit of first digital asset included in the first auction order book at the end of each respective time interval; (ii) a respective lowest ask price, which is calculated, by the digital asset exchange computer system, using the first auction order book, by determining the lowest ask price in units of the second digital asset per unit of first digital asset included in the first auction order book at the end of each respective time interval; and (iii) a respective indicative price, which is calculated, as of a respective sixth time, by: (1) determining, by the digital asset exchange computer system, using the first auction order book, a respective indicative auction price in terms of the second digital asset for the first digital asset that will execute the greatest quantity of the first digital assets being transacted for the second digital assets; and (2) in the case where more than one respective indicative auction price is identified as having the same greatest quantity of the first digital assets being transaction for the second digital assets, selecting as the respective indicative auction price by applying the following order of priority: (A) the indicative auction price which is closest to the blended digital asset price for the respective sixth time; (B) the midpoint of the two adjacent indicative auction prices identified for the sixth time; and (i) a respective auction quantity, which is determined by the digital asset exchange computer system, as the quantity of units of the first digital asset which would match the respective indicative price as of the sixth time; (d) at the second time, closing the first auction order book, by the digital asset exchange computer system, and stop accepting new auction orders to be added to the first auction order book; (e) after step (d), calculating, by the digital asset exchange computer system, a collar price range by: (i) obtaining, by the digital asset exchange, the blended digital asset price for the second time; (ii) determining, by the digital asset exchange computer system, the minimum collar as the blended digital asset price for the second time less a third fixed percentage of the blended digital asset price for the second time; and (iii) determining, by the digital asset exchange computer system, the maximum collar as the blended digital asset price for the second time plus a fourth fixed percentage of the blended digital asset price for the second time; (f) after step (e), calculating, by the digital asset exchange computer system, final results of the first auction order book, wherein the final results include: (i) a final auction price at the second time, which is calculated by: (1) determining, by the digital asset exchange computer system, using the first auction order book at the second time, a final auction price in terms of the second digital asset for the first digital asset that will execute the greatest quantity of the first digital assets being transacted for the second digital assets; and (2) in the case where more than one respective final auction price is identified as having the same greatest quantity of the first digital assets being transaction for the second digital asset, selecting as the respective final auction price by applying the following order of priority: (A) the final auction price which is closest to the blended digital asset price for the second time; and (B) the midpoint of the two adjacent final auction prices for the second time; (ii) a final auction quantity, which is determined by the digital asset exchange computer system, as the quantity of units of the first digital asset which match the final auction price as of the second time; (g) verifying, by the digital asset exchange computer system, that the final auction price is greater than or equal to the minimum collar price and less than or equal to the maximum collar price; (h) in the case where the final auction price is verified to be greater than or equal to the minimum collar price and less than or equal to the maximum collar price, electronically publishing the final auction price and the final auction quantity as the results of the auction along with the second time; and (i) in the case where the final auction price is not verified to be greater than or equal to the minimum collar price and less than or equal to the maximum collar price, electronically publishing the auction failed along with the second time.

Similarly, in embodiments, the digital asset exchange computer system 6102 may have one or more corresponding exchange key sets. Each of the one or more exchange key sets, in embodiments, may include an exchange public key and an exchange private key. In embodiments, each exchange private key may be mathematically related to a respective exchange public key. Each exchange public key, in embodiments, may be associated with an exchange public address. Each exchange public address be an address on the blockchain 6108 associated with the digital asset exchange computer system 6102. As used herein, the one or more exchange key sets, corresponding exchange public keys, corresponding exchange private keys, and corresponding exchange public address may be similar to the key sets, public keys, private keys, and public addresses described above, the descriptions of which applying herein.

In embodiments, the blockchain 6108 may maintain a digital asset on a distributed public transaction ledger. The digital asset, in embodiments, may be a digital math-based asset, such as bitcoins, Namecoins, Litecoins, PPCoins, Tonal bitcoins, bitcoin cash, zcash, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf; WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; and/or DEW, to name a few. In embodiments, the underlying digital asset may be a digital asset that is supported by its own digital asset network (like ether supported by the Ethereum Network). The digital asset token, in embodiments, may be a stable value token (such as Gemini Dollar), security tokens, and/or non-fungible token (such as Cryptokitties), to name a few. Unlike other types of digital asset tokens, a Cryptokitty is a non-fungible token. A non-fungible token may be stored on a peer-to-peer distributed network in the form of a blockchain network (or other distributed networks). Examples of non-fungible tokens include one or more of the following: Cryptokitties, Cryptofighters, Decentraland, Etherbots, Ethermon, Rare peppes, Spells of Genesis, Crafty. Superarre, Terra0, Unico, to name a few. In embodiments, non-fungible tokens, (e.g. 5 Crytpokitties) may be transferable and accounted for as a digital asset token on an underlying blockchain network (e.g., Ethereum Network). In embodiments, a first non-fungible token (e.g. a First CryptoKitty) may have attributes (e.g. characteristics of a non-fungible token) that are different from a second non-fungible token (e.g. a Second CryptoKitty), even if both are the same type of non-fungible token (e.g., a CryptoKitty). For example, the First CryptoKitty may be a striped CryptoKitty, while the Second CryptoKitty may be a droopy-eyed CryptoKitty. In embodiments, the attributes of each non-fungible tokens may be customizable.

In embodiments, the first user device 6104 may initiate the connection with the digital asset exchange computer system 6102 by transmitting a connection request to the digital asset exchange computer system 6102 via network 125. The connection request may include a request to set up a channel (e.g. via the API 6107) for the purposes of trading on the digital asset exchange 6110. Trading, in embodiments, may refer to a user transferring one or more digital assets and/or one or more fiat or types of fiat for one or more digital assets and/or one or more fiat or types of fiat. In embodiments, the first user device 6104 may be a plurality of electronic devices. In embodiments, the first user device 6104 may be a mobile electronic device operating a mobile application for the purposes of trading on the digital asset exchange 6102. The digital asset exchange computer system 6102, in the embodiments where the first user device 6104 is a plurality of electronic devices, may be able to communicate with the plurality of electronic devices via the API 6107. In embodiments, each of the plurality of electronic devices may communicate with the digital asset exchange computer system 6102, each using a channel dedicated to one device of the plurality of electronic devices. An API, as used herein, may refer to machine-readable software that enables two applications to communicate and/or transfer information.

In embodiments, first user device 6104, as used herein, may, in embodiments, correspond to one or more suitable types of electronic devices including, but not limited to, desktop computers, mobile computers (e.g., laptops, ultrabooks), servers, mobile phones, portable computing devices, such as smart phones, tablets and phablets, televisions, set top boxes, smart televisions, personal display devices, personal digital assistants ("PDAs"), gaming consoles and/or devices, virtual reality devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few. In some embodiments, first user device 6104 may be relatively simple or basic in structure such that no, or a minimal number of, mechanical input option(s) (e.g., keyboard, mouse, track pad) or touch input (s) (e.g., touch screen, buttons) are included. For example, first user device 6104 may be able to receive and output audio, and may include power, processing capabilities, storage/memory capabilities, and communication capabilities. However, in other embodiments, first user device 6104 may include one or more components for receiving mechanical inputs or touch inputs, such as a touch screen and/or one or more buttons.

First user device 6104 may, in embodiments, be a voice activated electronic device. A voice activated electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device may be one or more of the following: Amazon Echo®; Amazon Echo Show®; Amazon Echo Dot®; Smart Television (e.g., Samsung® Smart TVs); Google Home®; Voice Controlled Thermostats (e.g., Nest®; Honeywell® Wi-Fi Smart Thermostat with Voice Control), smart vehicles, smart transportation devices, wearable devices (e.g., Fitbit®), and/or smart accessories, to name a few.

In embodiments, first user device 6104 may include one or more processor(s) 6104-A, memory 6104-B, and communication portal 6104-C. One or more processor(s) 6104-A, may include any suitable processing circuitry capable of controlling operations and functionality of first user device 6104, as well as facilitating communications between various components within first user device 6104. In some embodiments, processor(s) 6104 A may include a central processing unit ("CPU"), a graphic processing unit ("GPU"), one or more microprocessors, a digital signal processor, or any other type of processor, or any combination thereof. In some embodiments, the functionality of processor(s) 6104 A may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 6104 A may include its own local memory, which may store program systems, program data, and/or one or more operating systems. However, processor(s) 6104 A may run an operating system ("OS") for first user device 6104, and/or one or more firmware applications, media applications, and/or applications resident thereon. In some embodiments, processor(s) 6104 A may run a local client script for reading and rendering content received from one or more websites. For example, processor(s) 6104 A may run a local JavaScript client for rendering HTML or XHTML content received from a particular URL accessed by first user device 6104.

In embodiments, as mentioned above, first user device 6104 may also include memory 6104-B. Memory 6104-B may include one or more types of storage mediums such as any volatile or non-volatile memory, or any removable or non-removable memory implemented in any suitable manner to store data for first user device 6104. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 6104-B may be implemented as computer-readable storage media ("CRSM"), which may be any available physical media accessible by processor(s) 6104-A to execute one or more instructions stored within memory 6104-B. In some embodiments, one or more applications (e.g., mobile application software, gaming, music, video, calendars, lists, banking, social media etc.) may be run by processor(s) 6104-A, and may be stored in memory 6104-B.

In embodiments, as mentioned above, first user device 6104 may also include communications portal 6104-C. Communications portal 6104-C may include any circuitry allowing or enabling one or more components of the first user device 6104 to communicate with one another, with the digital asset exchange computer system 6102 (e.g. via the API 6107), and/or with one or more additional devices, servers, and/or systems. As an illustrative example, data retrieved from memory 6104-B may be transmitted via the API 6107, to the digital asset exchange computer system 6102 using any number of communications protocols. For example, the API 6107 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between first user device 6104 and the digital asset exchange computer system 6102. In some embodiments, first user device 6104 and digital asset exchange computer system 6102 may communicate with one another via a web browser using HTTP. Various additional communication protocols may be used to facilitate communications between first user device 6104 and/or digital asset exchange computer system 6102, include the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Communications portal 6104-C may use any communications protocol, such as any of the previously mentioned exemplary communications protocols. In some embodiments, first user device 6104 may include one or more antennas to facilitate wireless communications with a network using various wireless technologies (e.g., Wi-Fi, Bluetooth, radiofrequency, etc.). In yet another embodiment, first user device 6104 may include one or more universal serial bus ("USB") ports, one or more Ethernet or broadband ports, and/or any other type of hardwire access port so that communications portal 6104-C allows first user device 6104 to communicate with one or more communications networks.

In embodiments, the first user device 6104 may include one or more display screens or other type of display device. The one or more display screens may correspond to a display device and/or touch screen, which may be any size and/or shape and may be located at any portion of the first user device 6104. Moreover, the display screen, in embodiments, may be operationally connected to the first user device 6104 (e.g. connected via one or more cables and/or wires, wireless connection, etc., to name a few). Various types of display devices may include, but are not limited to, liquid crystal displays ("LCD"), LED, OLED, QLED, monochrome displays, color graphics adapter ("CGA") displays, enhanced graphics adapter ("EGA") displays, video graphics array ("VGA") display, or any other type of display, or any variation or combination thereof. Still further, a touch screen may, in some embodiments, correspond to a display device including capacitive sensing panels capable of recognizing touch inputs thereon. For instance, the display screen may correspond to a projected capacitive touch ("PCT"), screen include one or more row traces and/or driving line traces, as well as one or more column traces and/or sensing lines. In some embodiments, the display screen may be an optional component for the first user device 6104. For instance, the first user device 6104 may not include the display screen. Such devices, sometimes referred to as "headless" devices, may output audio, or may be in communication with a display device for outputting viewable content.

In embodiments, the display screen, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen, a capacitance between the object and the conductive material may be formed. The one or more processor(s) 6104-A may be capable of determining a location of the touch screen associated with where the capacitance change is detected and may register a touch input as occurring at that location.

In some embodiments, the display screen may include multiple layers, such as a top coating layer, a driving line layer, a sensing layer, and a glass substrate layer. The glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any suitable number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen of the first user device 6104 corresponding to where a conductive object contacted the display screen.

A change in capacitance may be measured to determine a location on the touch screen where the object has contacted the surface. For example, if an individual touches a point on the display screen of the first user device 6104, then a corresponding driving line and sensing line that intersect at that point may be identified. A location of the point may have one or more pixels associated with that location, and therefore one or more actions may be registered for an item or items that are displayed at that location. The one or more processor(s) 6104-A of the first user device 6104 may be configured to determine which pixels are associated with a particular location point, and which item or items are also displayed at that pixel location. Furthermore, the first user device 6104 may be configured to cause one or more additional actions to occur to the item or items being displayed on the display screen of the first user device 6104 based on a temporal duration the touch input, and or if one or more additional touch inputs are detected. For example, an object (e.g. a user's hand, a stylus, etc., to name a few) that is contacted on the display screen at a first location may be determined, at a later point in time, to contact the display screen at a second location. In the illustrative example, the object may have initially contacted the display screen at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen having 100 driving lines and 100 sensing lines may have 100 intersection points, and therefore 100 individual capacitors, while a touch screen having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the first user device 6104, and therefore the fewer driving lines and/or sensing lines used, the smaller the amount of power that is needed to operate the touch display screen.

In some embodiments, the display screen of the first user device 6104 may correspond to a high-definition ("HD") display. For example, the display screen may display images and/or videos of 720p, 1080p, 1080i, or any other image resolution. In these exemplary scenarios, the display screen may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080-pixel image having 2,073,600 pixels. However, the aforementioned display ratios and pixel numbers are merely exemplary, and any suitable display resolution or pixel number may be employed for the display screen, such as non-HD displays, 4K displays, and/or ultra-displays.

The digital asset exchange computer system 6102, in embodiments, may include one or more processor(s) 6102-A, network connection interface 6102-B, and memory 6102-C. One or more processor(s) 6102-A, as used herein, may be similar to the one or more processor(s) 6104-A described above, the description of which applying herein. The network connection interface 6102-B may be similar to the communication portal 6104-C described above, the description of which applying herein. Memory 6102-C may be similar to memory 6104-B described above, the description of which applying herein. The digital asset exchange computer system 6102 may, in embodiments, be a plurality of computers and/or computer systems. In embodiments, the exchange computer system 6102 may further include one or more display screens, which may be similar to the display screen described above, the description of which applying herein.

The digital asset exchange 6110, in embodiments, may include one or more processor(s) 6110-A, network connection interface 6110-B, and memory 6110-C. One or more processor(s) 6110-A, as used herein, may be similar to the one or more processor(s) 6104-A described above, the description of which applying herein. The network connection interface 6110-B may be similar to the communication portal 6104-C described above, the description of which applying herein. Memory 6110-C may be similar to memory 6104-B described above, the description of which applying herein. The digital asset exchange 6110 may, in embodiments, be a plurality of computers and/or computer systems.

Figure 65:
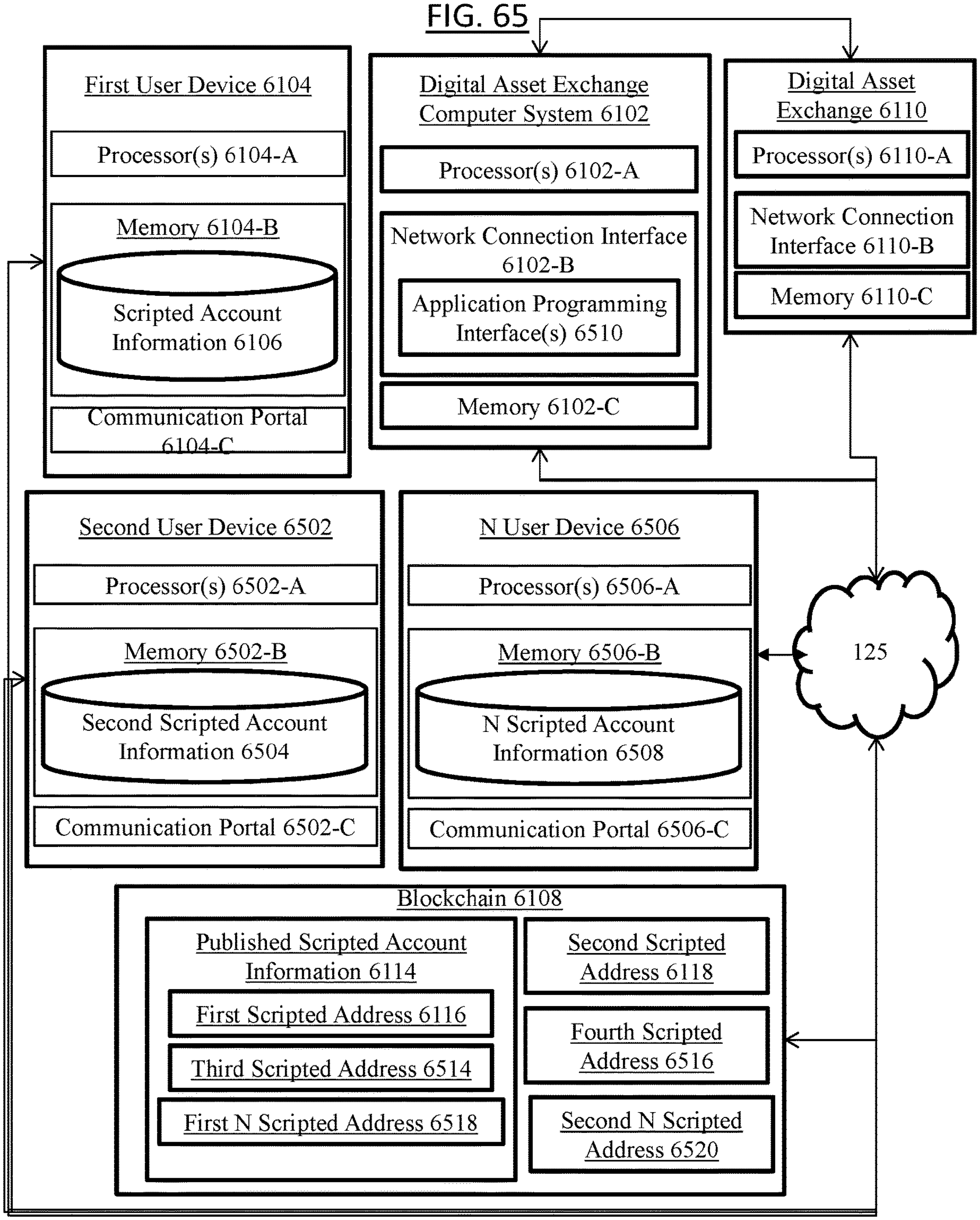
FIG. 65 is an exemplary block diagram illustrating a digital asset exchange computer system 6102 communicating with a plurality of user devices via a plurality of channels in accordance with exemplary embodiments of the present invention.

FIG. 65 is an exemplary block diagram illustrating a digital asset exchange computer system 6102 communicating with a plurality of user devices via a plurality of channels in accordance with exemplary embodiments of the present invention. In embodiments, the digital asset exchange computer system 6102 may receive requests to trade on the digital asset exchange 6110 via a channel from a plurality of user devices, which may include first user device 6104, second user device 6502 . . . N user device 6506. Each user device of the plurality of user devices may correspond to a different customer (e.g. first user device 6104 is associated with the first customer 6202, second user device 6502 is associated with a second customer . . . N user device 6506 is associated with a N customer, to name a few). In embodiments, as shown in FIG. 65, each user device may have its own channel with the digital asset exchange computer system 6102. In embodiments, each channel may have a different application programming interface of API 6510. In embodiments, each channel may communicate via API 6107. In embodiments, the API 6107, the second API 6510, and the N API 6512 are the same channel. In embodiments, the digital asset exchange computer system 6102 may perform the processes described in FIGS. 62A-62E and FIGS. 63A-63E with each user device of the plurality of user devices, the descriptions of which applying herein. In embodiments, the digital asset computer system 6102 may generate different mathematical puzzles with corresponding solutions for each user device. For example, the digital asset exchange computer system 6102 may generate a second mathematical puzzle and a second corresponding solution for the second user device 6502.

In embodiments, the second user device 6502 may include one or more processor(s) 6502-A, memory 6502-B, and communications portal 6502-C. The second user device 6502 and the components thereof may be similar to the first user device 6104, the description of which applying herein. In embodiments, the second user device 6502 may utilize scripted accounts and addresses to trade on the digital asset exchange 6110. The second user device may store, similar to the first user device 6104, second scripted account information 6504 which may be associated with the third scripted address 6514 and the fourth scripted address 6516. The second scripted account information 6504, third scripted address 6514, and fourth scripted address 6516 may be similar to the scripted account information 6106, the first scripted address 6116 and the second scripted address 6118 respectively, the descriptions of which applying herein.

In embodiments, the N user device 6505 may include one or more processor(s) 6506-A, memory 6506-B, and communications portal 6506-C. The N user device 6506 and the components thereof may be similar to the first user device 6104, the description of which applying herein. In embodiments, the N user device 6506 may utilize scripted accounts and addresses to trade on the digital asset exchange 6110. The N user device may store, similar to the first user device 6104, N scripted account information 6508 which may be associated with the first N scripted address 6518 and the second N scripted address 6520. The N scripted account information 6508, first N scripted address 6518, and the second N scripted address 6520 may be similar to the scripted account information 6106, the first scripted address 6116 and the second scripted address 6118 respectively, the descriptions of which applying herein.

Detection of Security Incident and Prevention of Fraud

In embodiments, a data incident or data breach may occur, causing a risk to digital assets owned by one or more customers of the digital asset exchange 6110. Referring to FIG. 63C, an incident or data breach response may be detected between steps S6324 and S6326. The digital asset exchange computer system 6102 may determine that a security incident has occurred, at any point of the process described in connection with FIGS. 63A-D. A security incident, in embodiments, may refer to an event that may indicate that the digital asset exchange's 6110 systems or data have been compromised or that measures put in place to protect the systems or data have failed. A data breach, in embodiments, may refer to a security incident in which sensitive, protected, or confidential data is copied, transmitted, viewed, stolen or used by an unauthorized source or individual. Referring to FIG. 63F, at step S6350, the digital asset exchange computer system 6102 may determine a security incident and/or data breach has occurred.

In the context of the process described in connection with FIGS. 63A-D, the digital asset computer exchange system 6102 may next determine whether the first transaction request was caused by the security incident. In embodiments, the first transaction request may have been caused by a security incident. Referring to FIG. 63F, at step S6352-1, the digital asset computer exchange system 6102 may determine that the first transaction request was the cause of the detected security incident. For example, the second transaction request may have been the result of an unauthorized individual accessing the first customer's 6202 account with the digital asset exchange 6110. That unauthorized user, in embodiments, may have sent the first transaction request.

In response to determining the second transaction request was caused by the security incident, at step S6352-1, the digital asset exchange computer system 6102 at step S6352-1, may transmit the first solution to the first mathematical puzzle. The first solution, in embodiments, may be obtained by the digital asset exchange computer system 6102 via memory 6102-C and transmitted to the first user device 6104 via the API 6107 and/or network 125. The transmission of solution to the puzzle may be based on the type of security incident the digital asset exchange 6110 is experiencing. For example, if data transmitted over the API 6107 and the network 125 is compromised, the digital asset exchange computer system 6102 may transmit the solution via network 125.

Once the first solution is received by the first user device 6104, the first user device 6104 may transmit a transaction request including the first solution to withdrawal the first amount of digital asset to the first scripted address 6116 and/or the second scripted address 6118. The transaction request, in embodiments, may be digitally signed by the customer private key. When the transaction request is received, the first scripted address 6116 and/or the second scripted address 6118 may transfer the first amount of digital assets deposited by the first customer 6202 to the first user public address. In embodiments, the first scripted address 6116 and/or the second scripted address 6118 may transfer the first amount of digital assets to the first user public address.

To ensure that the customer did not lose any digital assets as a result of the security incident, the digital asset exchange computer system 6102 may, at step S6356-1, may confirm that the first amount of digital assets has been received by the first user public address. To confirm receipt, the digital asset exchange computer system 6102 may send a call to the first user public address to confirm receipt of the digital assets. In return, the first user public address may send a return either confirming receipt or not confirming receipt. If receipt of the digital assets is not confirmed, the digital asset exchange computer system 6102 may generate and send a data breach notification to the first user device 6104, indicating what happened and how the first customer 6202 can proceed.

In embodiments, the first transaction request may not have been caused by the security incident. At a step S6352-2, the digital asset exchange computer system 6102 determines that the security incident did not cause the first transaction request. In these embodiments, the digital asset exchange computer system 6102 may take steps to end the trading of the first customer 6202 on the digital asset exchange 6110 via the API 6107.

At step S6354-2, the digital asset exchange computer system 6102 may digitally sign the first transaction request. After the digital asset exchange computer system 6102 digitally signs the first transaction request, the first transaction request would then have the transfer requests, the customer private key, and a private key associated with the digital asset exchange 6110 (e.g. the first exchange private key, the second exchange private key, and/or the third exchange private key, to name a few). As described above, the first authorization instructions of the first scripting limitations 6124 may authorize transactions that include both the customer private key and a private key associated with the digital asset exchange 6110.

In embodiments, the digital asset exchange computer system 6102 may generate a second transaction request reflecting the first order. In embodiments, the second transaction request may be to transfer the second amount of digital assets to a public address associated with the digital asset exchange 6110. Additionally, in embodiments, the second transaction request may have a second transfer to transfer a third amount (e.g. the first amount less the second amount) to the first user public address. Once the second transaction is generated, the digital asset exchange computer system 6102 may transmit the second transaction request to the first user device 6104. After receiving the second transaction request, the first user device 6104 may digitally sign the second transaction request and send the digitally signed transaction request back to the digital asset exchange computer system 6102. Once received, the digital asset exchange computer system 6102 may verify and sign the second transaction request.

Next, the digital asset exchange computer system 6102 at step S6356-2 may transmit the first transaction request (and/or the aforementioned second transaction request) to the first scripted address 6116 via network 125. The transmission of the first transaction request, in embodiments, may cause the first transaction request to be executed by the first scripted address. In embodiments, when publishing the first transaction request and/or the second transaction request on the blockchain 6108, in embodiments, the digital asset exchange computer system 6102 may flag the request as published as a result of a security incident detected that did not affect the transaction/order. In embodiments, publishing of the first and/or second transaction request on the blockchain 6108, in embodiments, may cause the remaining digital assets that are owned by the first user and located on the first scripted address 6116 and/or the second scripted address 6118 to be transferred to the first user public address.

As discussed above, to ensure that the customer did not lose any digital assets as a result of the security incident, the digital asset exchange computer system 6102 at step S6358-2 may confirm that a third amount of digital assets has been received by the first user public address. In embodiments, the third amount may refer to the first amount of digital assets less the second amount of digital assets. To confirm receipt, the digital asset exchange computer system 6102 may send a call to the first user public address to confirm receipt of the third amount of digital assets. In return, the first user public address may send a return either confirming receipt or not confirming receipt. If receipt of the digital assets is not confirmed, the digital asset exchange computer system 6102 may generate and send a data breach notification to the first user device 6104, indicating what happened and how the first customer 6202 can proceed.

The steps of the process described in connection with FIG. 63F may be rearranged or omitted.

Another security measure that may be implemented by the digital asset exchange computer system 6102 may be in the form of a whitelist. A whitelist, in embodiments, may be a list which may include a list of addresses that a user may authorize to withdraw digital asset tokens. For example, a whitelist associated with the first customer 6202 may include the first user public address associated with the first user public key 6120. As another example, a whitelist may contain a user's public address which may limit all withdrawals to the user's public address. Alternatively, in embodiments, a whitelist may be a list which may include a list of addresses that a user may not want digital asset tokens withdrawn to. For example, a whitelist may contain a user's old business partner's public address, limiting withdrawals to public addresses that are not the user's old business partner's public address. In embodiments, the digital asset exchange computer system 6102 may store a plurality of whitelists for a plurality of customers on memory 6102-C. Additionally, in embodiments, the digital asset exchange computer system 6102 may store a plurality of whitelists for a plurality of customers on a whitelist database on memory 6102-C.

Figure 66:
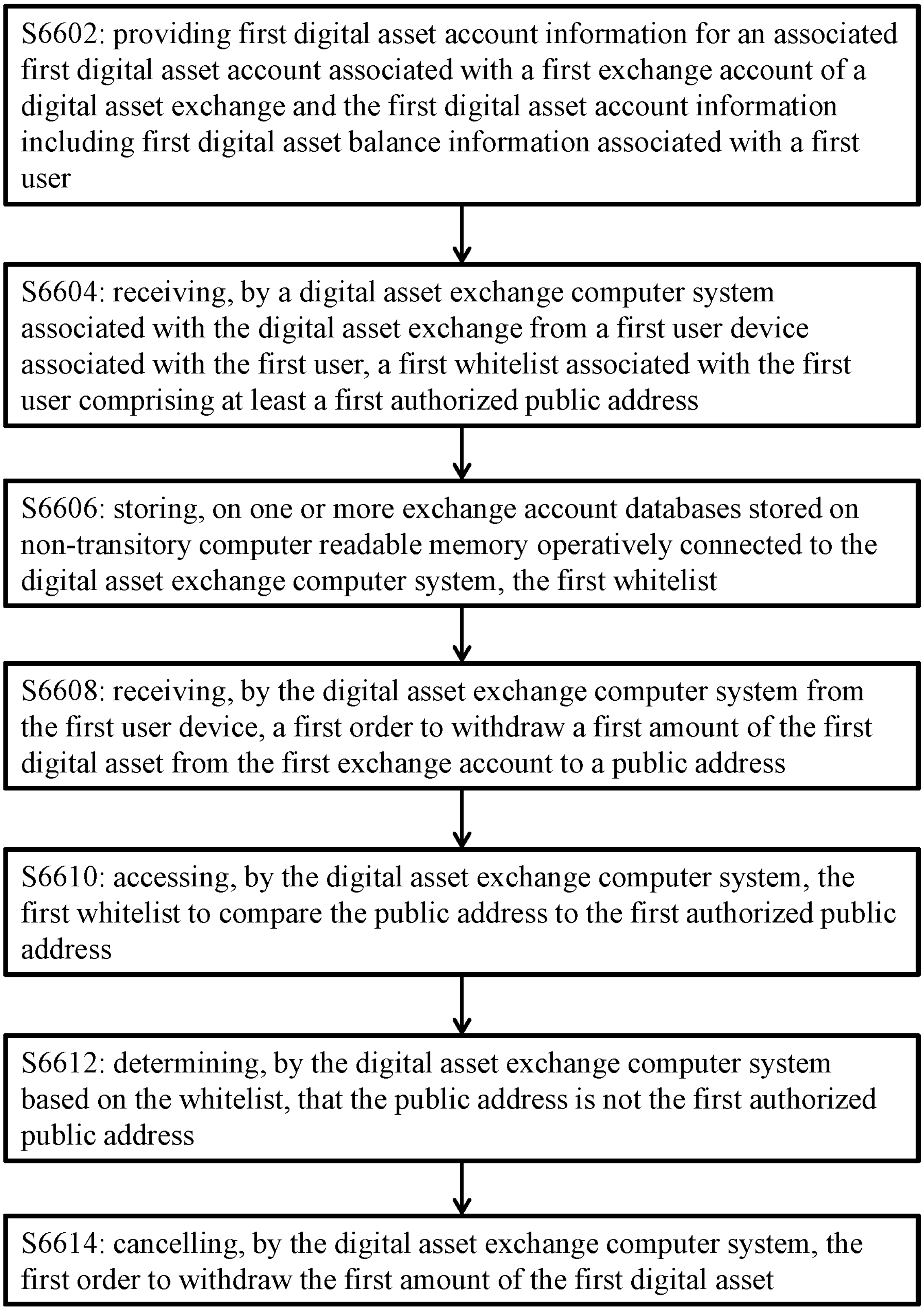
FIG. 66 is an exemplary flowchart of a process for protecting a user account from unauthorized transactions in accordance with embodiments of the present invention.

In embodiments, a whitelist may be used by the digital asset exchange computer system 6102 and first customer 6202 in accordance with the process of FIG. 66. FIG. 66 is an exemplary flowchart of a process for protecting a user account from unauthorized transactions. In embodiments, the process of FIG. 66 may begin at a step S6602. At step S6602, first digital asset account information for an associated first digital asset account associated with a first exchange account of a digital asset exchange may be provided. The first digital account information, in embodiments, may include first digital asset balance information associated with a first user (e.g. the first customer 6202). For example, the first digital asset account information may include information indicating the first customer has 100 Bitcoins.

The process of FIG. 66 may continue at a step S6604. At step S6604, the digital asset exchange computer system 6102 may receive a first whitelist from the first user device 6104. The first whitelist, which may be associated with the first customer 6202, may include a first authorized public address. In embodiments, the first white list may include a first blocked public address. In embodiments, the first whitelist may include one or more of: a plurality of blocked public addresses; and/or a plurality of authorized public addresses, to name a few.

The whitelist, as shown in step S6606, may be stored on one or more exchange account databases by the digital asset exchange computer system 6102. In embodiments, the one or more exchange account databases may be stored on non-transitory computer readable memory operatively connected to the digital asset exchange computer system (e.g. in memory 6102-C).

After storing the whitelist, the digital asset exchange computer system 6102 may receive a first order from the first user device 6104 via network 125, the API 6107. The first order, in embodiments, may be to withdraw a first amount of the first digital asset from a first exchange account to a public address. In embodiments, the first exchange account may be associated with the digital asset exchange computer system 6102 and the first customer 6202. The public address, in embodiments, may be a public address associated with a second customer. The public address, in embodiments, may be a public address associated with the first customer 6202. In embodiments, the first order may be related to a first transaction request to withdraw the first amount of the first digital asset. In embodiments, the first order and/or first transaction request may be digitally signed by the first user private key.

In embodiments, the digital asset exchange computer system 6102 may determine that the first customer 6202 has a whitelist associated with their account. In embodiments, at step S6710, the digital asset exchange computer system 6102 may access and/or obtain the first whitelist. In embodiments, the first whitelist may be accessed and/or obtained for the purposes of comparing the public address to the first authorized public address.

The process of FIG. 66 may proceed at a step S6612. At step S6612, the digital asset exchange computer system 6102 may determine that the public address is not the first authorized public address. This determination, in embodiments, may be based on the first whitelist. In embodiments, the determination may be made by comparing the public address to the first authorized public address.

In response to determining that the withdraw request is to be sent to a public address on that is not included in the first whitelist, as illustrated in step S6614, the digital asset exchange computer system 6102 may cancel the first order to withdraw the first amount of the first digital asset. In embodiments, the cancelling of the first order may occur before the digital asset exchange computer system 6102 transmits the order and/or transaction request to the blockchain 6108 for the purposes of executing the withdrawal. In embodiments, once the order is cancelled, the digital asset exchange computer system may generate and send a notification to the first user device 6104. The notification may explain why the order was cancelled and alert the first customer 6202 to a possible security incident, the possible security incident being related to the requested withdrawal of digital assets to an unauthorized public address.

The steps of the process described in connection with FIG. 66 may be rearranged or omitted.

In embodiments, a method comprising: (a) providing, by a first exchange computer system associated with a first digital asset exchange to a second exchange computer system associated with a second digital asset exchange, non-custodial trading information comprising: a first exchange public key associated with the first digital asset exchange, wherein the first exchange public key corresponds to a first exchange private key; wherein a first key pair comprises the first exchange public key and the first exchange private key, and wherein the first key pair corresponds to a first exchange public address associated with a digital asset; and (2) non-custodial formatting requirements, including at least one of the following: A. a first deposit amount to be deposited into a first smart contract; B. a settlement time indicating a first time of settlement of the first smart contract; C. a first waiting period corresponding to a first time to transpire between an initiate settlement message and a finalize settlement message; D. a second waiting period indicating a first unresponsive state of the first exchange computer system; and E. a third waiting period indicating a second unresponsive state of the second exchange computer system; wherein the digital asset is maintained on a distributed public transaction ledger in the form of a blockchain by a plurality of geographically distributed computer systems in a peer-to-peer network; (b) receiving, by the first exchange computer system from the second exchange computer system, a non-custodial trading request, wherein the non-custodial trade request comprises: (1) a second exchange public address associated with the second digital asset exchange, wherein the second exchange public key corresponds to a second exchange private key; wherein a second key pair comprises the second exchange public key and the second exchange private key, and wherein the second key pair corresponds to the second exchange public address; (2) the first exchange public key; (3) a first smart contract address associated with the blockchain and the digital asset; and (4) first smart contract instructions associated with the first smart contract, wherein the first smart contract instructions comprise: A. first authorization instructions which authorize transactions which: i. are received from the second exchange public address associated with the digital asset and the blockchain and digitally signed by the second exchange private key; ii. are digitally signed by second digital asset exchange based on the second exchange private key; and iii. are received after either: the first waiting period has transpired since the initiate settlement message was received by the first smart contract address from the second exchange public address; or the initiate settlement message was received by the first smart contract address from the first exchange public address, wherein the initiate settlement message includes at least the following: a. a second exchange payment amount indicating a first final amount of digital asset owned by the second digital asset exchange; b. a first exchange payment amount indicating a second final amount of digital asset owned by the first digital asset exchange; c. a second digital asset exchange digital signature of the second exchange computer system based on the second exchange private key; d. a first exchange digital signature of the first exchange computer system based on the first exchange private key; and e. a most recent mathematical puzzle associated with either the first digital asset exchange or the second digital asset exchange; B. second authorization instructions which authorize transactions which: i. are received from the second exchange public address; ii. are digitally signed by the second digital asset exchange based on the second exchange customer private key; and iii. are received after the second waiting period has transpired since at least one digitally signed message has been received by the first exchange computer system from the second exchange computer system and the at least one digitally signed message is not executed by the first exchange computer system; C. verification instructions regarding verifying the initiate settlement message in response to a dispute message received during the first waiting period; (c) verifying, by the first exchange computer system, the non-custodial trading request complies with the non-custodial trading formatting requirements, including verifying: (1) the first smart contract address is an authorized smart contract address; (2) the first smart contract instructions are authorized instructions; (3) the second exchange public address is a first authorized public address associated with the second digital asset exchange; and (4) the first exchange public address is a second authorized public address; (d) receiving, from the second exchange computer system by the first exchange computer system, an initial channel state indicating that a first amount of digital asset has been transferred via the blockchain to the first smart contract address, wherein the first amount of digital assets represents the first deposit amount; (e) confirming, by the first exchange computer system, that the first smart contract address has been published on the blockchain and that the first amount of digital asset has been received by the first smart contract address; (f) receiving, by the first exchange computer system from the second exchange computer system, a first order to sell a second amount of digital asset, wherein the second amount of digital asset is either less than the first amount of digital asset or equal to the first amount of digital asset; (g) receiving, by the first exchange computer system from the second exchange computer system, a first transaction request digitally signed based on the second exchange private key and associated with both the first order and a first transaction, wherein the first transaction comprises: (1) a first transfer of the second amount of digital asset from the first smart contract address to the first exchange public address; (2) a second transfer of a third amount of digital asset to the first smart contract address, wherein the third amount of digital asset is the first amount of digital asset less the second amount of digital asset; and (3) a second exchange mathematical puzzle, wherein the second exchange mathematical puzzle has a corresponding second exchange mathematical solution associated with the second exchange mathematical puzzle; (h) verifying, by the first exchange computer system, the first transaction request, including verifying: (1) the third amount plus the second amount equals the first amount; and (2) the first transaction request is digitally signed by a private key that corresponds with the second exchange public key; (i) storing, by the first exchange computer system, the first transaction request; (j) executing, by the first exchange computer system, the first order; (k) in the case where the first exchange computer system receives a first partially signed first initiate settlement message from the second exchange computer system, performing, by the first exchange computer system, the following steps: (1) receiving, by the first exchange computer system from the second exchange computer system, the first partially signed first initiate settlement message, wherein the first partially signed first initiate settlement message is digitally signed based on the second exchange private key and comprises: A. a first exchange payment amount indicating the final amount of digital asset owned by the first digital asset exchange; and B. a second exchange payment amount indicating the final amount of digital asset owned by the second digital asset exchange; (2) verifying, by the first exchange computer system, the first partially signed first initiate settlement message, wherein verifying comprises: A. verifying, by the first exchange computer system, that the second exchange payment amount equals the third amount of digital asset; and B. verifying, by the first exchange computer system, that the first exchange payment amount equals the second amount of digital asset; (3) generating, by the first exchange computer system, a first digitally signed first initiate settlement message by digitally signing the first partially signed first initiate settlement message based on the first exchange private key; (4) transmitting, by the first exchange computer system from the first exchange public address to the first smart contract address, the first digitally signed first initiate settlement message; (5) monitoring, during the first waiting period, the first smart contract address; (6) generating, by the first exchange computer system, a first finalize settlement message, wherein the first finalize settlement message comprises: A. first settlement instructions to settle the first smart contract by instructing the first smart contract address to transfer the second exchange payment amount to the second exchange public address and to transfer the first exchange payment amount to the first exchange public address; and B. a most recent transaction request, wherein the most recent transaction request is generated by digitally signing, by the first exchange computer system based on the first exchange private key, the first transaction request; (7) after the first waiting period has transpired, transmitting, by the first exchange computer system from the first exchange public address to the first smart contract address via the blockchain, the first finalize settlement message; and (8) receiving, at the first exchange public address, the first exchange payment amount; (1) in the case where the first exchange computer system sends a second partially signed first initiate settlement message to the second exchange computer system, performing, by the first exchange computer system, the following steps: (1) generating, by the first exchange computer system, the second partially signed first initiate settlement message, wherein the second partially signed first initiate settlement message is digitally signed based on the first exchange private key and comprises: A. the first exchange payment amount indicating the final amount of digital asset owned by the first digital asset exchange; and B. the second exchange payment amount indicating the final amount of digital asset owned by the second digital asset exchange; (2) transmitting, by the first exchange computer system to the second exchange computer system, the second partially signed first initiate settlement message; (3) determining, by the first exchange computer system, a second digitally signed first initiate settlement message has been published on the blockchain; (4) verifying, by the first exchange computer system, that the second digitally signed first initiate settlement message, wherein verifying comprises: A. verifying, by the first exchange computer system, that the second digitally signed first initiate settlement message was received by the first smart contract address from the second exchange public address; B. verifying, by the first exchange computer system, that the second exchange payment amount equals the third amount of digital asset; and C. verifying, by the first exchange computer system, that the first exchange payment amount equals the second amount of digital asset; (5) generating, by the first exchange computer system, a second finalize settlement message, wherein the second finalize settlement message comprises: A. second settlement instructions to settle the first smart contract by instructing the first smart contract address to transfer the second exchange payment amount to the second exchange public address and to transfer the first exchange payment amount to the first exchange public address; and B. the most recent transaction request; (6) transmitting, by the first exchange computer system to the first smart contract address via the blockchain, the second finalize settlement message; and (7) receiving, at the first exchange public address, the first exchange payment amount; and (m) verifying, by the first exchange computer system, that the second exchange payment amount was received by the second exchange public address and that the first exchange payment amount was received by the first exchange public address.

In embodiments, the first smart contract instructions further comprise: D. cancel settlement instructions regarding cancelling the initiate settlement message in a case where the settlement message is not verified; and E. punitive instructions, where the second exchange payment amount and the first exchange payment amount are transferred to a first public address in a case where the settlement message is not verified, wherein, in a case where the settlement message was received from the second exchange public address, the first public address is the first exchange public address, and wherein in a case where the settlement message was received from the first exchange public address, the first public address is the second exchange public address.

In embodiments, step (b) further comprises: (5) connecting, using an application programming interface associated with the first exchange computer system and the second exchange computer system.

In embodiments, the method further comprises: (n) generating, by the first exchange computer system, a first exchange mathematical puzzle and a first corresponding first mathematical solution associated with the first exchange mathematical puzzle. In embodiments, the initial channel state further comprises a timestamp indicating when the first amount of digital asset was transferred to the first smart contract address.

In embodiments, the first transaction request further comprises a timestamp indicating when the first order was received.

the method further comprises, prior to step (k), the following steps: (n) receiving by the first exchange computer system from the second exchange computer system, a second order to transfer a fourth amount of digital asset, wherein the fourth amount of digital asset is either less than the third amount of digital asset or equal to the third amount of digital asset; (o) receiving, by the first exchange computer system from the second exchange computer system, a second transaction request digitally signed by the second exchange private key and associated with a second transaction wherein the second transaction comprises: (i) a fourth transfer of the fourth amount of digital asset and the second amount of digital asset from the first smart contract address to the first exchange public address; and (ii) a fifth transfer of a fifth amount of digital asset and the third amount of digital asset from the first smart contract address to the second exchange public address, wherein the fifth amount of digital asset is the third amount of digital asset less the fourth amount of digital asset; (p) verifying, by the first exchange computer system, the second transaction request, including verifying: (i) the fourth amount is less than or equal to the third amount; (ii) the fifth amount is the third amount less the fourth amount; and (ii) the first transaction request is digitally signed based on a private key that corresponds with the second exchange public key; and (q) executing, by the first exchange computer system, the second order, wherein the second exchange payment amount is the fifth amount of digital asset, wherein the first exchange payment amount is the fourth amount of digital asset and the second amount of digital asset, wherein the most recent transaction request is the second transaction request, and wherein the first exchange computer system verifies: (iii) the second exchange payment amount is equal to the fifth amount of digital asset; and (iv) the first exchange payment amount is the fourth amount of digital asset plus the second amount of digital asset.

In embodiments, the second exchange mathematical puzzle and the corresponding second exchange mathematical solution are a first set of mathematical puzzles and corresponding mathematical solutions of a plurality of sets of mathematical puzzles and corresponding mathematical solutions.

In embodiments, the second exchange mathematical solution is a third exchange mathematical puzzle associated with a third exchange mathematical solution.

In embodiments, the second exchange mathematical puzzle and the corresponding second exchange mathematical solution associated with the second exchange mathematical puzzle are generated by performing the following steps: (i) providing an algorithm to generate the second exchange mathematical puzzle and the corresponding second exchange mathematical solution; (ii) obtaining a customer puzzle seed, wherein the second exchange puzzle seed is based in part on at least one of: (A) the second exchange public address; (B) the first exchange public key; and (C) the first smart contract address; (iii) generating, a first puzzle value based at least in part on the second exchange puzzle seed; (iv) generating a second puzzle value, such that the application of the algorithm to the first puzzle value results in the second puzzle value; and (v) generating a third puzzle value, such that the application of the algorithm to the second puzzle value results in the third puzzle value, wherein the second puzzle value is the second exchange mathematical puzzle, and wherein the third puzzle value is the second exchange mathematical solution.

In embodiments, the second exchange computer system is a mobile electronic device operating a mobile application.

In embodiments, prior to the first finalize settlement message and the second finalize settlement message being transmitted, the method further comprises the steps of (t) transmitting, by the first exchange computer system to a third-party computer system, monitoring information comprising: (i) the first smart contract address; (ii) the second exchange public address; (iii) the first exchange public address; and (iv) the first waiting period, wherein the third-party computer system monitors the first smart contract address for at least one published transaction, wherein the third-party computer system monitors the first smart contract address during the first waiting period, and wherein, in the event the third-party computer system detects the at least one published transaction, the third-party computer system generates and sends a first notification to at least one of the second exchange computer system and the first exchange computer system. In embodiments, the third-party computer system monitors the first smart contract address in substantially real-time during the first waiting period.

In embodiments, the non-custodial trading information is transmitted by the first exchange computer system to the second exchange computer system.

In embodiments, the digital asset includes at least one of the following: (i) bitcoin; (ii) ether; (iii) litecoin; (iv) bitcoin cash; (v) zcash; (vi) libra; and (vii) digital asset tokens. In embodiments, the digital asset tokens include Gemini dollar.

In embodiments, the non-custodial trading information is provided by the first exchange computer system by publishing the non-custodial trading information on a website associated with the first digital asset exchange.

In embodiments, the first transaction request is received with the first order.

In embodiments, the non-custodial trading request is received with at least one of the following: (i) the first order; and (ii) the first transaction request.

In embodiments, the first smart contract address receives the first amount of digital asset from the second exchange public address.

In embodiments, the first transaction further comprises: (iii) a fourth transfer of a fourth amount of digital asset from the first smart contract address to a public address to receive trading fees, wherein the fourth amount of digital asset is a first trading fee, wherein the third amount is equal to the first amount less the sum of the second amount and the fourth amount, and wherein the first exchange computer system verifies that the third amount is equal to the first amount less the second amount less the sixth amount.

In embodiments, the first smart contract address is provided by the second exchange computer system. In embodiments, the first smart contract address is a result of the second exchange computer system applying an algorithm to at least one of: (i) the second exchange public key; and (ii) the first exchange public key.

In embodiments, the first smart contract address is provided by the first exchange computer system. In embodiments, the first smart contract address is a result of the first exchange computer system applying an algorithm to at least one of: (i) the second exchange public key; and (ii) the first exchange public key.

In embodiments, the digital asset is bitcoin. In embodiments, the digital asset is ether. In embodiments, the digital asset is litecoin. In embodiments, the digital asset is bitcoin cash. In embodiments, the digital asset is zcash. In embodiments, the digital asset is a digital asset token. In embodiments, the digital asset token is Gemini dollar. In embodiments, the digital asset is Libra.

While the present application primarily discusses digital currency, the proof of custody method discussed herein may be used in conjunction with other products as well. Proof of custody systems and methods discussed herein, may be implemented for any type of financial product or service in which custodial wallets are used. Other embodiments of the present invention may also be used in conjunction with other financial products, such as using pricing discussions involving indices created with blended digital asset prices and/or auctions as benchmarks for financial products, such as exchange traded notes, futures products (such as options), derivative products (such a puts and calls), other indices (such as volatility indices), swaps, currencies, fixed income products, bonds, securities, equities to name a few.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method comprising:

providing one or more databases, operatively connected to a digital asset exchange system associated with a digital asset exchange, which include:

an electronic exchange ledger associated with a first digital asset and indicating exchange account information associated with a customer exchange account;

an electronic interest ledger associated with the first digital asset including interest information associated with a customer interest bearing account; and an electronic intermediary ledger associated with an intermediary including intermediary account information associated with a customer intermediary account;

receiving, by the digital asset exchange system and from a customer device, a first request to transfer an amount of the first digital asset from the customer exchange account to the customer interest bearing account;

transferring, by the digital asset exchange system, the amount of the first digital asset from the customer exchange account to the customer interest bearing account;

transferring, by the digital asset exchange system, the amount of the first digital asset from the customer interest bearing account to a customer intermediate account, the transferring including publishing a transfer message to a distributed public transaction ledger in the form of a blockchain wherein instructions to transfer are executed by geographically distributed computer systems in a peer-to-peer network;

determining, by the digital asset exchange system, a first interest payment for the first customer based at least in part on the interest information associated with the amount of the first digital asset;

storing, by the digital asset exchange system, data representing the first interest payment in the electronic interest ledger;

determining, by the digital asset exchange system, when to disburse the first interest payment based on a payment schedule;

transferring, by the digital asset exchange, the first interest payment from the customer interest bearing account to the customer exchange account;

determining a speed at which a block value was generated;

determining that the speed in which the block value was generated caused an increase in computing power that improves a likelihood of solving for new block values; and providing an incentive to a digital asset miner in response to the increase in computing power.

2. The method of claim 1, wherein at least a portion of the amount of the first digital asset as maintained in the customer intermediate account is loaned to third parties and return information indicates a return to be provided for allowing loaning of the at least a portion of the amount of the first digital asset.

3. The method of claim 1, further comprising causing at least a portion of the amount of the first digital asset to be traded on the digital asset exchange by a third party associated with the customer intermediary account and return information indicates a return amount to be provided for allowing trading of the at least a portion of the amount of the first digital asset.

4. The method of claim 3, wherein the payment schedule indicates when disbursements of the return amount are scheduled to be made.

5. The method of claim 1, further comprising authenticating the first request based at least in part on associating first customer access credentials with reference credentials associated with at least one of the customer exchange account or the customer interest bearing account.

6. The method of claim 1, further comprising:

determining that transfer of the amount from the customer exchange account will not cause a balance of the customer exchange account to be reduced to below a reserve amount indicated by the digital asset exchange system; and wherein transferring the amount from the customer exchange account is based at least in part on determining that the transfer will not cause the balance of the customer exchange account to be reduced to below the reserve amount.

7. The method of claim 1, further comprising determining the interest information based at least in part on a period of time that the amount is held in the customer intermediary account.

8. A system comprising:

one or more processors; and non-transitory computer-readable media storing instructions that, when executed by the one or more processors, cause the one or more processors to perform operations comprising:

providing one or more databases, operatively connected to a digital asset exchange system associated with a digital asset exchange, which include:

an electronic exchange ledger associated with a first digital asset and indicating exchange account information associated with a customer exchange account;

an electronic interest ledger associated with the first digital asset including interest information associated with a customer interest bearing account; and an electronic intermediary ledger associated with an intermediary including intermediary account information associated with a customer intermediary account;

receiving, by the digital asset exchange system and from a customer device, a first request to transfer an amount of the first digital asset from the customer exchange account to the customer interest bearing account;

transferring, by the digital asset exchange system, the amount of the first digital asset from the customer exchange account to the customer interest bearing account;

transferring, by the digital asset exchange system, the amount of the first digital asset from the customer interest bearing account to a customer intermediate account, the transferring including publishing a transfer message to a distributed public transaction ledger in the form of a blockchain wherein instructions to transfer are executed by geographically distributed computer systems in a peer-to-peer network;

determining, by the digital asset exchange system, a first interest payment for the first customer based at least in part on the interest information associated with the amount of the first digital asset;

storing, by the digital asset exchange system, data representing the first interest payment in the electronic interest ledger;

determining, by the digital asset exchange system, when to disburse the first interest payment based on a payment schedule;

transferring, by the digital asset exchange, the first interest payment from the customer interest bearing account to the customer exchange account;

determining a speed at which a block value was generated;

determining that the speed in which the block value was generated caused an increase in computing power that improves a likelihood of solving for new block values; and providing an incentive to a digital asset miner in response to the increase in computing power.

9. The system of claim 8, wherein at least a portion of the amount of the first digital asset as maintained in the customer intermediate account is loaned to third parties and return information indicates a return to be provided for allowing loaning of the at least a portion of the amount of the first digital asset.

10. The system of claim 8, the operations further comprising causing at least a portion of the amount of the first digital asset to be traded on the digital asset exchange by a third party associated with the customer intermediary account and return information indicates a return amount to be provided for allowing trading of the at least a portion of the amount of the first digital asset.

11. The system of claim 10, wherein the payment schedule indicates when disbursements of the return amount are scheduled to be made.

12. The system of claim 8, the operations further comprising authenticating the first request based at least in part on associating first customer access credentials with reference credentials associated with at least one of the customer exchange account or the customer interest bearing account.

13. The system of claim 8, the operations further comprising:

determining that transfer of the amount from the customer exchange account will not cause a balance of the customer exchange account to be reduced to below a reserve amount indicated by the digital asset exchange system; and wherein transferring the amount from the customer exchange account is based at least in part on determining that the transfer will not cause the balance of the customer exchange account to be reduced to below the reserve amount.

14. The system of claim 8, the operations further comprising determining the interest information based at least in part on a period of time that the amount is held in the customer intermediary account.

15. A digital asset exchange system comprising:

one or more processors; and non-transitory computer-readable media storing instructions that, when executed by the one or more processors, cause the one or more processors to perform operations comprising:

receiving, from a customer device associated with a customer, a first request to transfer an amount of a first digital asset representing cryptocurrency from a customer exchange account of an electronic exchange ledger to a customer interest bearing account of an electronic interest ledger;

transferring the amount of the first digital asset from the customer exchange account to the customer interest bearing account;

transferring the amount of the first digital asset from the customer interest bearing account to a customer intermediate account of an electronic intermediary ledger, the transferring including publishing a transfer message to a distributed public transaction ledger in the form of a blockchain wherein instructions to transfer are executed by geographically distributed computer systems in a peer-to-peer network;

determining a first interest payment for the customer based at least in part on interest information associated with the amount of the first digital asset;

storing data representing the first interest payment in an electronic interest ledger;

determining when to disburse the interest payment based at least in part on a payment schedule;

transferring the interest payment from the customer interest bearing account to the customer exchange account;

determining a speed at which a block value was generated;

determining that the speed in which the block value was generated caused an increase in computing power that improves a likelihood of solving for new block values; and providing an incentive to a digital asset miner in response to the increase in computing power.

16. The digital asset exchange system of claim 15, the operations further comprising:

determining a gross interest payment due to the customer;

determining an adjusted interest payment based at least in part on the gross interest payment and a reserve withholding amount associated with a balance of the customer exchange account; and wherein the interest payment corresponds to the adjusted interest payment.

17. The digital asset exchange system of claim 15, wherein the payment schedule indicates that the interest payment is to be transferred to the customer exchange account in response to a return amount being deposited into the customer intermediary account.

18. The digital asset exchange system of claim 15, the operations further comprising:

providing at least a second electronic intermediary ledger including a digital asset account balance of the first digital asset associated with a second customer interest bearing account; and wherein the first request includes an indication of a selection of the electronic intermediary ledger instead of the at least the second electronic intermediary ledger.

19. The digital asset exchange system of claim 15, wherein the first request is received in response to a setting indicating that the amount is to be transferred automatically to the customer interest bearing account upon occurrence of a trigger event.

20. The digital asset exchange system of claim 15, the operations further comprising:

determining that transfer of the amount from the customer exchange account will not cause a balance of the customer exchange account to be reduced to below a reserve amount indicated by the digital asset exchange system; and wherein transferring the amount from the customer exchange account is based at least in part on determining that the transfer will not cause the balance of the customer exchange account to be reduced to below the reserve amount.

* * * * *